US008821256B2

(12) United States Patent
Okada et al.

(10) Patent No.: US 8,821,256 B2
(45) **Date of Patent: *Sep. 2, 2014**

(54) GAME SYSTEM

(75) Inventors: Kazuo Okada, Tokyo (JP); Jun Fujimoto, Tokyo (JP); Takao Nireki, Tokyo (JP); Kunihiro Manabe, Tokyo (JP); Noritoshi Kukita, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/322,962

(22) PCT Filed: Jul. 16, 2009

(86) PCT No.: PCT/JP2009/062886

§ 371 (c)(1),
(2), (4) Date: Jan. 26, 2012

(87) PCT Pub. No.: WO2010/137184

PCT Pub. Date: Dec. 2, 2010

(65) Prior Publication Data

US 2012/0135799 A1 May 31, 2012

(30) Foreign Application Priority Data

May 29, 2009 (JP) ................................. 2009-131057
May 29, 2009 (JP) ................................. 2009-131360

(51) Int. Cl.
*A63F 9/24* (2006.01)
*A63F 13/00* (2014.01)
*G07F 17/32* (2006.01)

(52) U.S. Cl.
CPC ..................................... *G07F 17/32* (2013.01)
USPC ................... 463/25; 463/16; 463/20; 463/29; 463/42; 273/138.1; 273/138.2; 273/143 R

(58) Field of Classification Search
USPC ................................... 463/16, 20, 25, 29, 42
See application file for complete search history.

(56) References Cited

U.S. PATENT DOCUMENTS 4,420,751 A * 12/1983 Paganini et al. ................ 705/43
(Continued)

FOREIGN PATENT DOCUMENTS

JP 2000-093637 4/2000
JP 2005-165398 6/2005

OTHER PUBLICATIONS

United States Patent and Trademark Office, Non-final Office Action of U.S. Appl. No. 13/322,858 (Dec. 20, 2012).

(Continued)

*Primary Examiner* — William Brewster
*Assistant Examiner* — Ryan Hsu
(74) *Attorney, Agent, or Firm* — Lexyoume IP Meister, PLLC

(57) ABSTRACT

A game system that is capable of performing a game by employing an information card in place of a conventional paper-based system is provided. This game system includes: a plurality of gaming machines; a bill identifying device that is associated with each of the gaming machines, for identifying bills of different currencies and an amount of the bills, and outputting data representative of an identified result; a player tracking device that is integrated with each of the gaming machine, for converting data output from the bill identifying device to credit data for executing a game, based on a money exchange rate stored therein, and sending out the converted credit data to the gaming machine; a control device for inputting a money exchange rate from an outside, providing the input money exchange rate to the player tracking device, and updating the money exchange rate stored in the player tracking device; and an information card device that is integrated with the player tracking device, for causing an information card to store data equivalent to an amount of money to be awarded to a player according to a game result of the gaming machine, and sending out credit data for executing a game to the gaming machine.

6 Claims, 161 Drawing Sheets

(56) References Cited

U.S. PATENT DOCUMENTS

| | | | | |
|---|---|---|---|---|
| 6,012,983 | A | 1/2000 | Walker et al. | |
| 6,048,269 | A * | 4/2000 | Burns et al. | 463/25 |
| 6,093,102 | A | 7/2000 | Bennett | |
| 6,960,133 | B1 | 11/2005 | Marks et al. | |
| 7,118,478 | B2 | 10/2006 | Fayter et al. | |
| 2003/0083127 | A1 | 5/2003 | Weiss | |
| 2009/0054149 | A1* | 2/2009 | Brosnan et al. | 463/42 |

OTHER PUBLICATIONS

United States Patent and Trademark Office, Notice of Allowance of U.S. Appl. No. 13/322,858 (Apr. 2, 2013).

* cited by examiner

FIG. 24

| THE NUMBER OF CARDS LEFT | PROCESS |
|---|---|
| 0 CARD LEFT | STOP GAMING MACHINE |
| 1 TO 5 CARDS LEFT | EMIT LED YELLOW LIGHT |
| 6 TO 24 CARDS LEFT | EMIT LED BLUE LIGHT |
| 25 TO 29 CARDS LEFT | EMIT LED GREEN LIGHT |
| 30 CARDS LEFT | STOP GAME |

FIG. 28

| CARD ID | RECORDED IMAGE DATA |
|---|---|
| · · · · | · · · · · |
| · · · · | · · · · · |
| 001245 | 090715-131213-0012. avi |
| · · · · | · · · · · |
| · · · · | · · · · · |
| · · · · | · · · · · |

FIG. 30

| | |
|---|---|
| CARD ID (IDENTIFICATION INFORMATION) | 001245 |
| DENOMINATION | DOLLAR, YEN,..... |
| AMOUNT INFORMATION | 23. 005 |
| TYPE OF ALERT | 2 |
| TIME/DATE WHEN ALERT PRODUCED | 090715:131213 |
| MACHINE-IDENTIFICATION NUMBER | 0012 |
| ・・・・ | ・・・・・ |
| ・・・・ | ・・・・・ |

FIG. 35

REGULAR GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0-3277 | J | WILD | A | Q | J |
| 1 | 3278-6555 | Q | A | J | J | A |
| 2 | 6556-9833 | BAT | Q | BAT | BAT | BAT |
| 3 | 9834-13111 | J | HAMMER | SWORD | Q | J |
| 4 | 13112-16389 | Q | SWORD | RHINOCEROS | K | A |
| 5 | 16390-19667 | RHINOCEROS | WILD | BAT | BAT | BUFFALO |
| 6 | 19668-22945 | A | BUFFALO | FEATURE | A | RHINOCEROS |
| 7 | 22946-26223 | DEER | DEER | A | K | FEATURE |
| 8 | 26224-29501 | SWORD | K | J | HAMMER | K |
| 9 | 29502-32779 | HAMMER | RHINOCEROS | HAMMER | Q | HAMMER |
| 10 | 32780-36057 | A | WILD | A | DEER | Q |
| 11 | 36058-39335 | Q | A | Q | SWORD | BAT |
| 12 | 39336-42613 | SWORD | HAMMER | DEER | FEATURE | K |
| 13 | 42614-45891 | RHINOCEROS | DEER | K | K | DEER |
| 14 | 45892-49169 | K | J | BUFFALO | SWORD | SWORD |
| 15 | 49170-52447 | A | SWORD | Q | DEER | J |
| 16 | 52448-55725 | HAMMER | SWORD | FEATURE | A | WILD |
| 17 | 55726-59003 | J | BAT | A | HAMMER | HAMMER |
| 18 | 59004-62281 | Q | WILD | HAMMER | BUFFALO | SWORD |
| 19 | 62282-65535 | BUFFALO | FEATURE | SWORD | RHINOCEROS | Q |

RANGE OF RANDOM NUMBER:0-65535

FIG. 36

BONUS GAME SYMBOL TABLE

| | | FIRST COLUMN(L1) |
|---|---|---|
| CODE NO. | RANDOM NUMBER | SYMBOL |
| 0 | 0-2184 | J |
| 1 | 2185-4369 | Q |
| 2 | 4370-6553 | BAT |
| 3 | 6554-8737 | WILD |
| 4 | 8738-10921 | J |
| 5 | 10922-13105 | Q |
| 6 | 13106-15289 | RHINOCEROS |
| 7 | 15290-17473 | WILD |
| 8 | 17474-19657 | A |
| 9 | 18658-21841 | DEER |
| 10 | 21842-24025 | WILD |
| 11 | 24026-26209 | SWORD |
| 12 | 26210-28393 | HAMMER |
| 13 | 28394-30577 | A |
| 14 | 30578-32761 | WILD |
| 15 | 32762-34945 | Q |
| 16 | 34946-37129 | SWORD |
| 17 | 37130-39313 | WILD |
| 18 | 39314-41497 | RHINOCEROS |
| 19 | 41498-43681 | K |
| 20 | 43682-45865 | A |
| 21 | 45866-48049 | WILD |
| 22 | 48050-50233 | HAMMER |
| 23 | 50234-52417 | J |
| 24 | 52418-54601 | WILD |
| 25 | 54602-56785 | Q |
| 26 | 56786-58969 | WILD |
| 27 | 58970-61153 | WILD |
| 28 | 61154-63337 | BUFFALO |
| 29 | 63338-65535 | WILD |

---

| | | FIFTH COLUMN(L5) |
|---|---|---|
| CODE NO. | RANDOM NUMBER | SYMBOL |
| 0 | 0-2184 | WILD |
| 1 | 2185-4369 | J |
| 2 | 4370-6553 | A |
| 3 | 6554-8737 | WILD |
| 4 | 8738-10921 | WILD |
| 5 | 10922-13105 | BAT |
| 6 | 13106-15289 | J |
| 7 | 15290-17473 | A |
| 8 | 17474-19657 | BUFFALO |
| 9 | 18658-21841 | WILD |
| 10 | 21842-24025 | RHINOCEROS |
| 11 | 24026-26209 | FEATURE |
| 12 | 26210-28393 | K |
| 13 | 28394-30577 | WILD |
| 14 | 30578-32761 | WILD |
| 15 | 32762-34945 | WILD |
| 16 | 34946-37129 | HAMMER |
| 17 | 37130-39313 | Q |
| 18 | 39314-41497 | BAT |
| 19 | 41498-43681 | K |
| 20 | 43682-45865 | WILD |
| 21 | 45866-48049 | DEER |
| 22 | 48050-50233 | SWORD |
| 23 | 50234-52417 | J |
| 24 | 52418-54601 | WILD |
| 25 | 54602-56785 | WILD |
| 26 | 56786-58969 | HAMMER |
| 27 | 58970-61153 | SWORD |
| 28 | 61154-63337 | Q |
| 29 | 63330-65535 | WILD |

RANGE OF RANDOM NUMBER: 0-65535

FIG. 37

SYMBOL COLUMN DETERMINATION TABLE

| SYMBOL COLUMN NO. | RANDOM NUMBER |
|---|---|
| 1 | 0-13106 |
| 2 | 13107-26214 |
| 3 | 26215-39321 |
| 4 | 39322-52428 |
| 5 | 52429-65535 |

RANGE OF RANDOM NUMBER: 0-65535

FIG. 38

CODE NO.
DETERMINATION TABLE

| | |
|---|---|
| RANDOM NUMBER | CODE NO. |
| 0-3277 | 0 |
| 3278-6555 | 1 |
| 6556-9833 | 2 |
| 9834-13111 | 3 |
| 13112-16389 | 4 |
| 16390-19667 | 5 |
| 19668-22945 | 6 |
| 22946-26223 | 7 |
| 26224-29501 | 8 |
| 29502-32779 | 9 |
| 32780-36057 | 10 |
| 36058-39335 | 11 |
| 39336-42613 | 12 |
| 42614-45891 | 13 |
| 45892-49169 | 14 |
| 49170-52447 | 15 |
| 52448-55725 | 16 |
| 55726-59003 | 17 |
| 59004-62281 | 18 |
| 62282-64281 | 19 |
| 64282-65535 | END |

RANGE OF RANDOM NUMBER: 0-65535

FIG. 39

WILD SYMBOL INCREASE NUMBER DETERMINATION TABLE

| WILD SYMBOL INCREASE NUMBER | RANDOM NUMBER |
|---|---|
| 10 | 0-13106 |
| 30 | 13107-26214 |
| 50 | 26215-39321 |
| 70 | 39322-52428 |
| 90 | 52429-65535 |

FIG. 40

TRIGGER SYMBOL INCREASE NUMBER DETERMINATION TABLE

| TRIGGER SYMBOL INCREASE NUMBER | RANDOM NUMBER |
|---|---|
| 2 | 0–13106 |
| 4 | 13107–26214 |
| 6 | 26215–39321 |
| 8 | 39322–52428 |
| 10 | 52429–65535 |

FIG. 41

PAYOUT TABLE

| SYMBOL | THE NUMBER OF SYMBOLS REARRANGED | | | |
|---|---|---|---|---|
| | TWO | THREE | FOUR | FIVE |
| A | 2 | 4 | 6 | 8 |
| K | 10 | 20 | 30 | 40 |
| Q | 30 | 60 | 90 | 120 |
| J | 3 | 6 | 9 | 12 |
| SWORD | 2 | 4 | 6 | 8 |
| HAMMER | 2 | 4 | 6 | 8 |
| BAT | 5 | 10 | 15 | 20 |
| DEER | 15 | 30 | 45 | 60 |
| RHINOCEROS | 8 | 16 | 24 | 32 |
| BUFFALO | 25 | 50 | 75 | 100 |
| FEATURE | 2 | 4 | 6 | 8 |

FEATURE (FREE GAME): FREE GAME IS RUN WHEN THREE OR MORE TRIGGER SYMBOLS ARE REARRANGED

FIG. 68

| STAFF ID | FACE IMAGE DATA | TELEPHONE NUMBER TO MOBILE TERMINAL DEVICE |
|---|---|---|
| 001 | FACE IMAGE DATA A | TELEPHONE NUMBER A |
| 002 | FACE IMAGE DATA B | TELEPHONE NUMBER B |
| 003 | FACE IMAGE DATA C | TELEPHONE NUMBER C |
| 004 | FACE IMAGE DATA D | TELEPHONE NUMBER D |
| ⋮ | ⋮ | ⋮ |

FIG. 82

(A)

| PAYOUT TABLE WHEN BET AMOUNT IS ONE | |
|---|---|
| COMBINATION OF SYMBOLS | PAYOUT AMOUNT |
| 3bar-3bar-3bar | 60 |
| 2bar-2bar-2bar | 40 |
| 1bar-1bar-1bar | 20 |
| anybar-anybar-anybar | 10 |

(B)

| PAYOUT TABLE WHEN BET AMOUNT IS TWO | |
|---|---|
| COMBINATION OF SYMBOLS | PAYOUT AMOUNT |
| 3bar-3bar-3bar | 120 |
| 2bar-2bar-2bar | 80 |
| 1bar-1bar-1bar | 40 |
| anybar-anybar-anybar | 20 |

(C)

| PAYOUT TABLE WHEN BET AMOUNT IS THREE | |
|---|---|
| COMBINATION OF SYMBOLS | PAYOUT AMOUNT |
| blue7-blue7-blue7 | 1800 |
| red7-red7-red7 | 100 |
| white7-white7-white7 | 100 |

FIG. 89

| SYMBOL | POINT NUMBERS |
|---|---|
| blue7-blue7-blue7 | 7000 |
| blue7 | 300 |
| red7 | 150 |
| 3bar | 30 |
| 2bar | 20 |
| 1bar | 10 |

FIG. 90

(a)

| BENDING PORTION-USE EMISSION COUNT DETERMINATION TABLE | | | | | | | |
|---|---|---|---|---|---|---|---|
| POINT NUMBERS | SLOT MACHINE | | | | | | |
| | A | B | C | · | · | I | J |
| 1~5 | 5 | 8 | 10 | · | · | 8 | 5 |
| 6~10 | 10 | 16 | 20 | · | · | 16 | 10 |
| 11~15 | 15 | 24 | 30 | · | · | 24 | 15 |
| 16~20 | 20 | 32 | 40 | · | · | 32 | 20 |
| 21~25 | 25 | 40 | 50 | · | · | 40 | 25 |
| 30~ | 50 | 80 | 100 | · | · | 80 | 50 |

(b)

| STRAIGHT PORTION-USE EMISSION COUNT DETERMINATION TABLE | | | | | | | |
|---|---|---|---|---|---|---|---|
| POINT NUMBERS | SLOT MACHINE | | | | | | |
| | A | B | C | · | · | I | J |
| 1~5 | 5 | 5 | 5 | · | · | 5 | 5 |
| 6~10 | 10 | 10 | 10 | · | · | 10 | 10 |
| 11~15 | 15 | 15 | 15 | · | · | 15 | 15 |
| 16~20 | 20 | 20 | 20 | · | · | 20 | 20 |
| 21~25 | 25 | 25 | 25 | · | · | 25 | 25 |
| 30~ | 50 | 50 | 50 | · | · | 50 | 50 |

FIG. 125

DICTIONARY DATA

| No | LENGTH (PIXEL) (X) | DEVIATION $(X-\mu)$ | SQUARE OF DEVIATION $(X-\mu)^2$ | No | LENGTH (PIXEL) (X) | DEVIATION $(X-\mu)$ | SQUARE OF DEVIATION $(X-\mu)^2$ |
|---|---|---|---|---|---|---|---|
| 1 | 270.00 | 5.64 | 31.81 | 26 | 269.00 | 4.64 | 21.53 |
| 2 | 262.00 | -2.36 | 5.57 | 27 | 265.00 | 0.64 | 0.41 |
| 3 | 266.00 | 1.64 | 2.69 | 28 | 265.00 | 0.64 | 0.41 |
| 4 | 269.00 | 4.64 | 21.53 | 29 | 263.00 | -1.36 | 1.85 |
| 5 | 262.00 | -2.36 | 5.57 | 30 | 270.00 | 5.64 | 31.81 |
| 6 | 260.00 | -4.36 | 19.01 | 31 | 261.00 | -3.36 | 11.29 |
| 7 | 262.00 | -2.36 | 5.57 | 32 | 264.00 | -0.36 | 0.13 |
| 8 | 263.00 | -1.36 | 1.85 | 33 | 262.00 | -2.36 | 5.57 |
| 9 | 269.00 | 4.64 | 21.53 | 34 | 264.00 | -0.36 | 0.13 |
| 10 | 262.00 | -2.36 | 5.57 | 35 | 269.00 | 4.64 | 21.53 |
| 11 | 261.00 | -3.36 | 11.29 | 36 | 264.00 | -0.36 | 0.13 |
| 12 | 262.00 | -2.36 | 5.57 | 37 | 265.00 | 0.64 | 0.41 |
| 13 | 270.00 | 5.64 | 31.81 | 38 | 266.00 | 1.64 | 2.69 |
| 14 | 265.00 | 0.64 | 0.41 | 39 | 264.00 | -0.36 | 0.13 |
| 15 | 268.00 | 3.64 | 13.25 | 40 | 265.00 | 0.64 | 0.41 |
| 16 | 266.00 | 1.64 | 2.69 | 41 | 260.00 | -4.36 | 19.01 |
| 17 | 262.00 | -2.36 | 5.57 | 42 | 260.00 | -4.36 | 19.01 |
| 18 | 267.00 | 2.64 | 6.97 | 43 | 260.00 | -4.36 | 19.01 |
| 19 | 265.00 | 0.64 | 0.41 | 44 | 261.00 | -3.36 | 11.29 |
| 20 | 266.00 | 1.64 | 2.69 | 45 | 264.00 | -0.36 | 0.13 |
| 21 | 268.00 | 3.64 | 13.25 | 46 | 263.00 | -1.36 | 1.85 |
| 22 | 270.00 | 5.64 | 31.81 | 47 | 260.00 | -4.36 | 19.01 |
| 23 | 261.00 | -3.86 | 11.29 | 48 | 262.00 | -2.36 | 5.57 |
| 24 | 270.00 | 5.64 | 31.81 | 49 | 261.00 | -3.36 | 11.29 |
| 25 | 265.00 | 0.64 | 0.41 | 50 | 260.00 | -4.36 | 19.01 |

| AVERAGE $(\mu)$ |
|---|
| 264.36 |

| DISPERSION $(\sigma^2)$ (AVERAGE OF SQUARE OF DEVIATION) | STANDARD DEVIATION $(\sigma)$ |
|---|---|
| 10.27 | 3.20 |

(a)

| y \ x | 1 | 2 | 3 | 4 | 5 | 6 | 7 | | AVERAGE DENSITY VALUE OF HORIZONTAL LINE |
|---|---|---|---|---|---|---|---|---|---|
| 1 | 87 | 46 | 215 | 5 | 188 | 132 | 62 | → | 105 |
| 2 | 108 | 207 | 253 | 4 | 106 | 106 | 141 | → | 132 |
| 3 | 103 | 41 | 185 | 15 | 61 | 124 | 206 | → | 105 |
| 4 | 140 | 8 | 25 | 25 | 120 | 171 | 155 | → | 92 |
| 5 | 18 | 52 | 218 | 1 | 122 | 222 | 45 | → | 97 |
| 6 | 203 | 15 | 211 | 45 | 94 | 82 | 143 | → | 113 |
| 7 | 167 | 192 | 140 | 55 | 228 | 189 | 47 | → | 145 |
| 8 | 214 | 225 | 154 | 33 | 50 | 200 | 139 | → | 145 |
| 9 | 215 | 249 | 153 | 25 | 126 | 56 | 88 | → | 130 |
| 10 | 104 | 136 | 78 | 10 | 70 | 244 | 227 | → | 124 |
| 11 | 193 | 85 | 43 | 36 | 202 | 12 | 50 | → | 89 |
| 12 | 173 | 201 | 128 | 45 | 109 | 181 | 151 | → | 141 |
| | ↓ | ↓ | ↓ | ↓ | ↓ | ↓ | ↓ | | |
| AVERAGE DENSITY VALUE OF VERTICAL LINE | 144 | 121 | 150 | 25 | 123 | 143 | 121 | | |

DENSITY VALUE: 0 (BLACK) TO 255 (WHITE)

| | |
|---|---|
| AVERAGE DENSITY VALUE OF ENTIRE WATERMARK IMAGE | 118 |

(b)

(a)

| y \ x | 1 | 2 | 3 | 4 | 5 | 6 | 7 | AVERAGE DENSITY VALUE OF HORIZONTAL LINE |
|---|---|---|---|---|---|---|---|---|
| 1 | 75 | 56 | 196 | 112 | 196 | 120 | 72 | 118 |
| 2 | 69 | 190 | 207 | 84 | 87 | 67 | 124 | 118 |
| 3 | 91 | 51 | 166 | 122 | 69 | 112 | 216 | 118 |
| 4 | 141 | 31 | 19 | 145 | 141 | 172 | 178 | 118 |
| 5 | 14 | 70 | 207 | 116 | 139 | 218 | 63 | 118 |
| 6 | 182 | 17 | 184 | 143 | 94 | 62 | 145 | 118 |
| 7 | 114 | 162 | 81 | 131 | 196 | 137 | 17 | 118 |
| 8 | 162 | 195 | 95 | 100 | 18 | 148 | 109 | 118 |
| 9 | 177 | 234 | 109 | 106 | 109 | 19 | 73 | 118 |
| 10 | 73 | 127 | 40 | 98 | 59 | 213 | 218 | 118 |
| 11 | 197 | 111 | 41 | 158 | 227 | 17 | 77 | 118 |
| 12 | 125 | 175 | 73 | 116 | 81 | 133 | 125 | 118 |
| AVERAGE DENSITY VALUE OF VERTICAL LINE | 118 | 118 | 118 | 118 | 118 | 118 | 118 | |

| | |
|---|---|
| AVERAGE DENSITY VALUE OF ENTIRE WATERMARK IMAGE | 118 |

DENSITY VALUE:
0 (BLACK) TO 255 (WHITE)

(b)

| i \ j | 1 | 2 | 3 | 4 | 5 | 6 | 7 |
|---|---|---|---|---|---|---|---|
| 1 | 87 | 46 | 215 | 5 | 188 | 132 | 62 |
| 2 | 108 | 50 | 253 | 48 | 106 | 2 | 141 |
| 3 | 103 | 33 | 185 | 17 | 61 | 19 | 206 |
| 4 | 140 | 26 | 25 | 25 | 120 | 28 | 155 |
| 5 | 18 | 7 | 218 | 45 | 122 | 1 | 45 |
| 6 | 203 | 5 | 211 | 28 | 94 | 14 | 143 |
| 7 | 167 | 18 | 140 | 4 | 228 | 17 | 47 |
| 8 | 214 | 18 | 154 | 35 | 50 | 18 | 139 |
| 9 | 215 | 24 | 153 | 4 | 126 | 44 | 88 |
| 10 | 104 | 40 | 78 | 35 | 70 | 25 | 227 |
| 11 | 193 | 25 | 43 | 32 | 202 | 17 | 50 |
| 12 | 173 | 201 | 128 | 45 | 109 | 181 | 151 |

| AVERAGE DENSITY VALUE | F | 93 |
|---|---|---|

(a)

| i \ j | 1 | 2 | 3 | 4 | 5 | 6 | 7 |
|---|---|---|---|---|---|---|---|
| 1 | 168 | 209 | 40 | 250 | 67 | 123 | 193 |
| 2 | 147 | 205 | 2 | 207 | 149 | 253 | 114 |
| 3 | 152 | 222 | 70 | 238 | 194 | 236 | 49 |
| 4 | 115 | 229 | 230 | 230 | 135 | 227 | 100 |
| 5 | 237 | 248 | 37 | 210 | 133 | 254 | 210 |
| 6 | 52 | 250 | 44 | 227 | 161 | 241 | 112 |
| 7 | 88 | 237 | 115 | 251 | 27 | 238 | 208 |
| 8 | 41 | 237 | 101 | 230 | 205 | 237 | 116 |
| 9 | 40 | 231 | 102 | 251 | 129 | 211 | 167 |
| 10 | 151 | 215 | 177 | 220 | 185 | 230 | 28 |
| 11 | 62 | 230 | 212 | 223 | 53 | 238 | 205 |
| 12 | 82 | 54 | 127 | 210 | 146 | 74 | 104 |

| AVERAGE DENSITY VALUE | S | 162 |
|---|---|---|

(b)

FIG. 150
-EXAMPLE OF INCREASING/DECREASING PIXELS OF IMAGE DATA
-SOURCE DATA (VERTICAL DIRECTION : HORIZONTAL DIRECTION = 1 : 1)
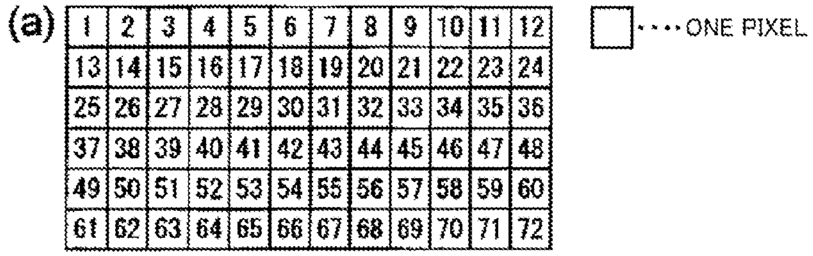
-TWO TIMES IN HORIZONTAL DIRECTION (VERTICAL DIRECTION : HORIZONTAL DIRECTION = 1 : 2)
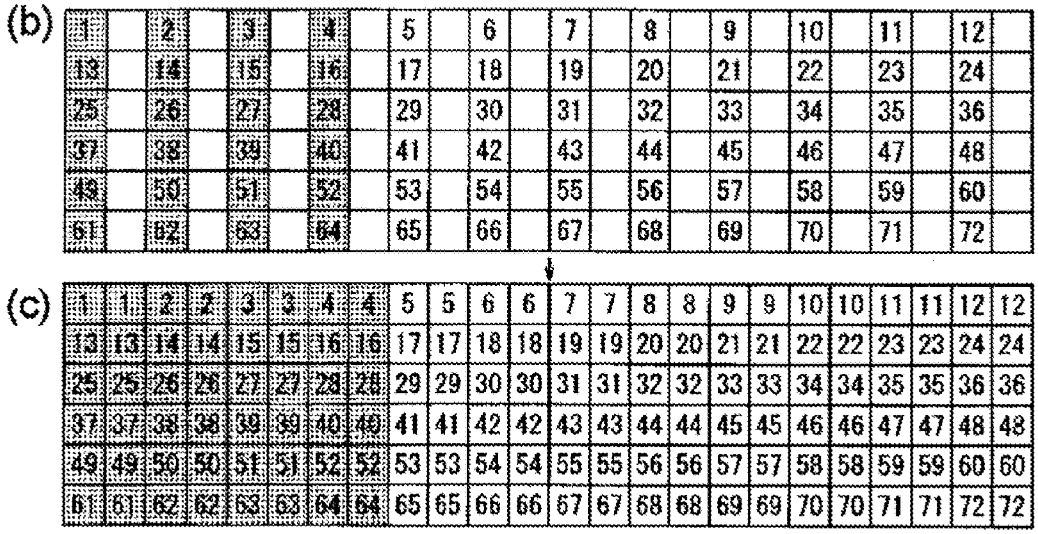
-0.25 TIME IN HORIZONTAL DIRECTION (VERTICAL DIRECTION : HORIZONTAL DIRECTON = 1 : 0.25)
* REDUCTION BY METHOD OF THINNING PIXELS IN HORIZONTAL DIRECTION
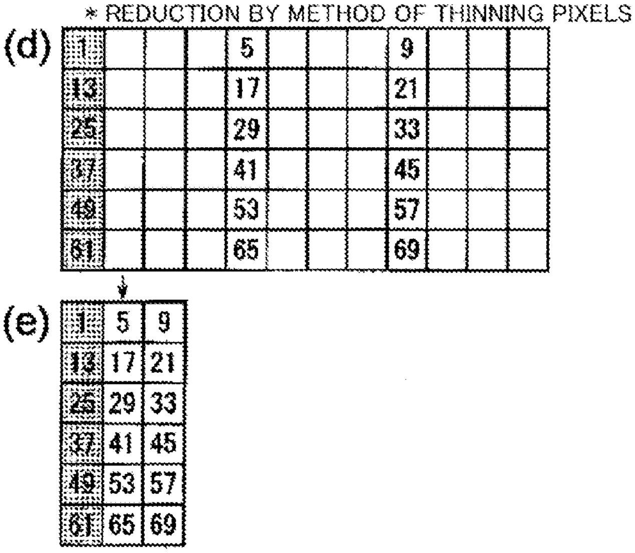

FIG. 158

- EXAMPLE OF THINNING PIXELS OF IMAGE DATA
- SOURCE DATA (VERTICAL DIRECTION : HORIZONTAL DIRECTION = 1 : 1)

(a)

| | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |

☐ ···· ONE PIXEL

- 0.25 TIMES IN HORIZONTAL DIRECTION
(VERTICAL DIRECTION : HORIZONTAL DIRECTION = 1 : 0.25)
* REDUCTION BY METHOD OF THINNING PIXELS IN HORIZONTAL DIRECTION (b)

| | | | | | | | | | | | |
|---|---|---|---|---|---|---|---|---|---|---|---|
| 1 | | | | 5 | | | | 9 | | | |
| 13 | | | | 17 | | | | 21 | | | |
| 25 | | | | 29 | | | | 33 | | | |
| 37 | | | | 41 | | | | 45 | | | |
| 49 | | | | 53 | | | | 57 | | | |
| 61 | | | | 65 | | | | 69 | | | |

↓

(c)

| | | |
|---|---|---|
| 1 | 5 | 9 |
| 13 | 17 | 21 |
| 25 | 29 | 33 |
| 37 | 41 | 45 |
| 49 | 53 | 57 |
| 61 | 65 | 69 |

GAME SYSTEM

TECHNICAL FIELD

The present invention relates to a game system having a plurality of gaming machines.

BACKGROUND ART

In the United State casinos, a money exchange system called EZ PAY for performing liquidation in a coinless manner is introduced (for example, refer to Patent Document 1). Conventionally, in order to play a game, money per se has been used as game coins, or alternatively, tokens that are exchanged with money have been used. In contrast, the system called EZ PAY employs paper-based tickets in place of coins or tokens. On a paper-based ticket, the number of credits is printed by means of barcodes. When a game is completed at one gaming machine, the number of credits at that time point is printed on the paper-based ticket at that gaming machine. After that, when a player moves to another gaming machine, the player causes such another gaming machine to read a paper-based ticket having the number of credits printed thereon and then starts a game. By doing this, even when the player moves a gaming machine also, the number of credits can be continued at another gaming machine. In addition, when exchanging money, a player shows the staff in gaming facility the paper-based ticket having the number of credits printed thereon or causes a money exchanger to read the paper-based ticket.

In addition, a game can be played by entering a variety of gaming mediums such as coins or cashes. Each slot machine is adapted to pay out a prize in accordance with a state of a winning prize (a game result) that occurs with the progress of game (refer to Patent Documents 2 to 4).

PRIOR ART DOCUMENT

Patent Document

[Patent Document 1] U.S. Pat. No. 7,118,478.
[Patent Document 2] U.S. Pat. No. 6,960,133.
[Patent Document 3] U.S. Pat. No. 6,012,983.
[Patent Document 4] U.S. Pat. No. 6,093,102.

SUMMARY OF THE INVENTION

Problems to be Solved by the Invention

In the EZ PAY system described above, paper mediums called paper-based tickets targeted for recording the number of credits have been thus employed. Therefore, when a player moves or eats and drinks something in casino, there has been a possibility that the user loses, stains, or damages a paper-based ticket. In addition, there has been a possibility that security is not sufficient because the number of credits has been printed by means of barcodes.

Means for Solving the Problem

The present invention provides a game system as described below.

The present invention has been made in view of the circumstance described above, and it is an object of the present invention to provide a game system that is capable of performing a game by employing an information card in place of a conventional paper-based system.

A game system according to the present invention comprising:

a plurality of gaming machines;

a bill identifying device that is associated with each of the gaming machines, for identifying bills of different currencies and an amount of the bills, and outputting data representative of an identified result;

a player tracking device that is integrated with each of the gaming machines, for converting data output from the bill identifying device to credit data for executing a game, based on a money exchange rate stored therein, and sending out the converted credit data to the gaming machine;

a control device for inputting a money exchange rate from an outside, providing the input money exchange rate to the player tracking device, and updating the money exchange rate stored in the player tracking device; and an information card device that is integrated with the player tracking device, for causing an information card to store data equivalent to an amount of money to be awarded to a player according to a game result of the gaming machine, and sending out credit data for executing a game to the gaming machine, based on data equivalent to the read money from the information card.

According to this game system, a game can be played by employing an information card in place of a conventional paper-based system. In a money identifying device, a variety of currencies can be entered, and according to a type of an entered currency, the entered currency is converted to amount-of-money data on a predetermined currency. The amount-of-money data is employed to play a game at a gaming machine, and the amount-of-money data that is equivalent to the amount of money according to a game result is written into an information card. By employing this information card, it becomes possible to play a game at another gaming machine as well.

The game system according to the present invention, wherein further, the player tracking device comprises a guidance output portion for, based on data representative of a type of a currency output from the bill identifying device, outputting guidance in a language according to the type of the currency.

According to this game system, guidance information is output in a language according to a type of a bill entered to a bill identifying device, thereby making it possible to perform guidance in an appropriate language for players of a variety of countries.

The game system according to the present invention, wherein the player tracking device comprises:

a card writer for storing information associated with a play result in gaming machine, in at least one information card;

a card stacker for stacking a plurality of the information cards;

a detection portion for detecting the number of cards that is stacked in the card stacker;

a memory for storing the detected number of cards;

a light emitting portion for emitting light according to the number of cards; and a controller programmed to execute processing operations of:

(A) causing the light emitting portion to emit light in a first mode in a case where the number of cards stored in the memory is equal to or smaller than a predetermined first reference number; and (B) causing the light emitting portion to emit light in a second mode in a case where the number of cards stored in the memory is equal to or more than a predetermined second reference number.

According to this game system, in a player tracking device that is capable of identifying a player and then providing useful information to the player, it is possible to visually recognize and keep track with the number of cards that remains in a card stacker from the outside in accordance with a light emission mode of a light emitting portion. In this manner, there is no need to check the number of cards by opening the inside of the card stacker. In particular, in a configuration in which units for identifying a player are mounted at their predetermined positions, in addition to these units, a light emitting portion is provided at its predetermined position, namely a light emitting portion is installed at an always same position as seen from the outside, thereby making it possible to easily recognize the light emitting portion. In addition, in a state in which a player keeps a playing posture, the light emitting portion is disposed at a position at which it can be visually recognize from its rear side or lateral side, thereby enabling the staff in casino facility to easily check the light emitting portion from the rear side while the player keeps a playing posture (that is, while a posture of picking up a player as an image is maintained).

The game system according to the present invention, wherein the player tracking device comprises:

a player detection device for detecting an existence of a player who is playing at the gaming machine;

a carrying device for carrying a removable information data recording medium to a housing position or an eject position;

a recording medium detection device for detecting that the information data recording medium exists at the eject position; and a controller programmed to execute processing operations of:

(A) determining whether or not the information data recording medium exists at the eject position by means of the recording medium detection device;

(B) determining whether or not a player exists by means of the player detection device; and (C) when it is determined that the information data recording medium exists at the eject portion and when it is determined that no player exists, carrying the information data recording medium from the eject position to the housing position by means of the carrying device.

According to this game system, in a case where an information data recording medium exists at an eject position and in a case where a player does not exist, the information data recording medium is transferred to a housing position. That is, in a case where an information data recording medium exists at an eject position and in a case where a player does not exist, the information data recording medium can be removed from the eject position. Thus, even if an IC card is left at a gaming machine, there is no need for the staff to move to the gaming machine and then remove the IC card, making it possible to reduce a burden on the work in gaming facility or to prevent the work from being cumbersome. Further, it is possible to prevent an illegal act that another player obtains a left IC card and illegally acquires a credit, for instance.

In addition, it is another object of the present invention to provide a device for reading information data storage medium, which is capable of reducing a situation that a player fails to take an IC card ejected from a gaming machine.

That is, the widespread use of IC cards in recent years has been remarkable; while in the beginning, there were contact-type IC cards at which electrical contacts exist, in the latest noncontact-type IC cards have been popular with lower pricing of RFID. However, in a case where an IC card become available in casino in place of paper-based tickets having barcodes printed thereon, a problem that a player fails to take an IC card ejected from a gaming machine may occur.

A device for reading information storage medium according to present invention, comprising:

a player detection device for detecting existence of a player who is playing at the gaming machine;

a carrying device for carrying a removable information data recording medium to a housing position or an eject position;

a recording medium detection device for detecting that the information data recording medium exists at the eject position; and a controller programmed to execute processing operations of:

(A) determining whether or not the information data recording medium exists at the eject position by means of the recording medium detection device;

(B) determining whether or not a player exists by means of the player detection device;

(C) when it is determined that the information data recording medium exists at the eject portion and when it is determined that no player exists, carrying the information data recording medium from the eject position to the housing position by means of the carrying device.

By employing such a configuration, in a case where an information data recording medium exists at an eject position and in a case where a player does not exist, the information data recording medium is transferred to a housing position. That is, in a case where an information data recording medium exists at an eject position and in a case where a player does not exist, the information data recording medium can be removed from the eject position. Thus, even if an IC card is left at a gaming machine, there is no need for the staff to move to the gaming machine and then remove the IC card, making it possible to reduce a burden on the work in gaming facility or to prevent the work from being cumbersome. Further, it is possible to prevent an illegal act that another player obtains a left IC card and illegally acquires a credit. Furthermore, it is possible to reduce a situation that a player fails to take an IC card that is ejected from a gaming machine.

The device for reading information data storage medium, according to the present invention, comprising an alert output device for outputting alert information, wherein the controller is programmed to execute a processing operation of (D) outputting alert information from the alert output device when it is determined that the information data recording medium exists at the eject position and when it is determined that no player exists.

By employing such a configuration, in a case where an information data recording medium exists at an eject position and in a case where a player does not exist, hall alert information is output. Thus, it is possible to inform that an IC card is left at a gaming machine. Therefore, in a case where a player is not far away from the gaming machine yet, it is possible to cause the player to recognize that he or she fails to take the IC card. Further, it is possible to immediately inform the staff or hall manager that the player fails to take the IC card, and appropriate work can be speedily done.

The device for reading information data storage medium, according to the present invention, comprising a reader/writer for reading or writing amount-of-money information relating to cash for a game to be played at a gaming machine from or into the information data recording medium, wherein the controller is programmed to execute processing operations of:

(E) writing amount-of-money information relating to cash for a game to be played at a gaming machine into the information data recording medium;

(F) executing a mini-game when an amount of money that is indicated by the amount-of-money information that is written into the information data recording medium is less than a predetermined number, and according to a result of the mini-game, changing the amount-of-money information; and (G) carrying the information data recording medium to an eject position by means of the carrying device when an amount of money that is indicated by the amount-of-money information that is written into the information data recording medium is equal to or more than a predetermined number.

By employing such a configuration, in a case where more money is stored in an information data recording medium in accordance with a mini-game, the value of an IC card is enhanced, causing a player to positively recognize the existence of the information data recording medium, and making it possible to prevent the player from failing to take the IC card.

In addition, it is another object of the present invention to provide a player tracking device and a gaming machine and a control method thereof, which is capable of providing a variety of information to a player in the gaming machine that is capable of performing a game by employing an IC card in place of coins or tokens.

That is, in conventional slot machines adapted to award a prize to a player by employing paper-based tickets, there has been apprehension that a player stains or breaks a printed paper-based ticket.

On the other hand, the widespread use of IC cards in recent years has been remarkable; and in the beginning, there were contact-type IC cards in which electrical contacts exist, whereas in the latest noncontact-type IC cards have been well known with lower pricing of an RFID.

Therefore, if an IC card is available for use in movement between gaming machines in casino or for use in money exchange in place of paper-based tickets, it is considered to be possible to solve a problem associated with breakage of a ticket which can occur in a case of employing paper-based tickets.

In a case where IC cards are employed in place of paper-based tickets, it is considered to provide a technique of stocking an IC card in gaming machine, causing the IC card to store credits awarded to a player according to a game result, and then, returning the IC card to the player through a card slot.

A player can use the returned IC card after moving to another gaming machine, and if the remaining number of credits in the IC card becomes 0 in accordance with a game result at the gaming machine, there is no need to return this IC card to the player, and the IC card is stocked in the gaming machine.

On the other hand, it is also considered to provide a system characterized in that player-specific identification information is stored in an IC card and then a player owns and utilizes this IC card as the player-specific IC card so as to thereby identify the player at a terminal into which this IC card has been inserted. As a system of such type, for example, there is a PTS (Player Tracking System) characterized in that, if a player card for identifying a player is inserted, information such as balance of an account of the player is displayed.

However, the conventional IC cards employed in place of coins or tokens, described above, are not those for specific players, and are intended to be used without specifying a player; and therefore, player-specific identification information or the like cannot be stored.

In casino, it is considered that an added value is remarkably enhanced and ability to attract players increases if specific useful information can be provided on a player-by-player basis, and there is a need for a method for specifying a player.

Thus, in a case where an IC card is employed in place of coins or tokens, as a method of identifying a player, it is considered to provide a method of picking up a player's face as an image by employing a camera or the like, and on the basis of the picked up images, authenticating the player.

In this manner, in a case of introducing a system of using an IC card in place of coins or tokens and a system such as PTS, there is a need to mount a variety of units such as a camera for identifying a player in addition to a slot for IC card, and depending on a layout of these units, it is presupposed that there may occur a problem that a player has difficulty in playing game or that it becomes difficult to appropriately display a player's face during the play of game within a screen and then pick up the player's face as an image. Therefore, full consideration is needed for the mounting positions of these units relative to gaming machines.

Therefore, it is the object of the present invention to provide a player tracking device and a gaming machine and a control method thereof, which are capable of providing a variety of information to a player in the gaming machine which is capable of performing a game by employing an IC card in place of coins or tokens.

A player tracking device of the present invention is characterized by including: a display panel for displaying information to be provided to a player who is playing at a gaming machine; a camera for picking up the player as an image; a card slot that is provided lateral of the display panel, for inserting and ejecting an information card for storing information associated with a play result in the gaming machine; and a cabinet in which the display panel, the camera, and the card slot are integrally provided.

According to this player tracking device, it is possible to pick up a player facing a display panel as an image by means of a camera, and in this state, a card slot is disposed lateral of the display panel, thereby enabling the player to insert an information card into the card slot without a need to change a posture facing the display panel, and receive the information card ejected from the card slot. That is, on the basis of the posture in which the player facing the display panel on which information is to be displayed, while this posture is maintained, the player can be picked up as an image by means of the camera, and while this posture is maintained, the player can insert or remove the information card into or from the card slot. In this manner, information can be provided to the player via the display panel, and based on the player's image picked up via the camera, for example, specific information prepared for the player can be provided via the display panel. That is, in a posture in which a player sees the display panel, the player can be authenticated by means of an image of the player picked up by means of the camera, and based on a result of the authentication, the specific information can be provided to the player via the display panel. In this manner, the specific information can be reliably provided to the player. Therefore, there can be provided a service achieving improvement of usability of enabling the player to insert or remove the information card into or from the card slot, and the specific information can be reliably provided to the player, whereby there can be provided a player tracking device that is capable of sufficiently providing service to the player. In addition, the display panel, the camera, and the card slot are integrally provided by means of the cabinet, and a positional relationship therebetween is limited, whereby, when the player tracking device is mounted on a gaming machine, the positions of the display panel, the camera, and the card slot can be maintained. In this manner, it is possible to reliably provide the above-described service that is obtained in accordance with the positional relationship between these units.

According to the tracking device of the present invention, in addition to the previously-described configuration, it is preferable that the cabinet include a human body detecting sensor for detecting the player upward of the card slot.

According to this player tracking device, a player inserting or removing an information into or from a card slot can be detected by means of the human body sensor that is provided upward of the card slot. In this manner, when an information card storing a prize is ejected from a card slot, for example, if a player has not been detected in front of the card slot for a predetermined period of time, ejection of the information card is canceled, whereby if a player eligible to receive the prize disappears, it is possible to avoid an occurrence of an inconvenience that the information card is ejected to another player.

With respect to the player tracking device of the present invention, in addition to the previously-described configuration, it is preferable that the cabinet provide a first speaker and a second speaker on a back face side of the display panel, and include ducts for voice output of the first and second speakers at the left and right of the display panel.

According to this player tracking device, an area of the player tracking device can be reduced by disposing the speakers of which areas unavoidably increase, on the back face side of the display panel. Voice output from the speakers is output from a front side of the display panel, via the ducts for voice output. In this manner, the voice from the speakers disposed behind the back face side of the display panel can be reliably output from the front side.

In addition to the previously-described configuration, it is preferable that the player tracking device of the present invention include: a card writer for storing information associated with a play result in gaming machine, in at least one information card; a card slot for inserting and ejecting the information card; a card stacker for stacking a plurality of the information cards; a detection portion for detecting the number of cards stacked in the card stacker; a memory for storing the detected number of cards; a light emitting portion for emitting light according to the number of cards; and a controller programmed to execute processing operations of: (A) causing the light emitting portion to emit light in a first mode in a case where the number of cards stored in the memory is equal to or smaller than a predetermined first reference number; and (B) causing the light emitting portion to emit light in a second mode in a case where the number of cards stored in the memory is equal to or smaller than a predetermined second reference number.

According to this player tracking device, in the player tracking device that is capable of identifying a player and then providing useful information to the player, it is possible to visually recognize and keep track with the number of cards that remains in a card stacker from the outside in accordance with a light emission mode. In this manner, there is no need to check the number of cards by opening the inside of the card stacker. In particular, in a configuration in which units for identifying a player are mounted at their predetermined positions, a light emitting portion is provided at a predetermined position in addition thereto, namely a light emitting portion is installed at an always same position as seen from the outside, thereby making it possible to easily recognize the light emitting portion. In addition, in a state in which a player keeps a playing posture, the light emitting portion is disposed at a position at which it can be visually recognize from its rear side or lateral side, thereby enabling the staff in casino facility to easily check the light emitting portion from the rear side while the player keeps a playing posture (that is, while a posture of picking up a player as an image is maintained).

With respect to the player tracking device of the present invention, in addition to the previously-described configuration, it is preferable that the controller be further programmed to execute a processing operation of (C) stopping the progress of game in the gaming machine in a case where the number of cards stored in the memory becomes 0.

According to this player tracking device, in a case where the remaining number of cards in card stacker becomes 0, the progress of game in gaming machine stops, thereby making it possible to prevent the progress of game from going on in a state in which an information card in which a prize is to be stored does not exist.

According to the player tracking device of the present invention, in addition to the previously-described configuration, it is preferable that the controller be further programmed to execute a processing operation of (D) stopping the progress of game in the gaming machine in a case where the number of cards stored in the memory becomes a predetermined upper limit.

According to this player tracking device, in a case where the remaining number of cards in card stacker becomes the upper limit, the progress of game in gaming machine stops, thereby making it possible to prevent a player to forcibly insert an information card having information stored therein.

A control method of a player tracking device, of the present invention, is directed to a control method of the player tracking device including: a display panel for displaying information to be provided to a player who is playing at a gaming machine; a camera for picking up the player as an image; a card slot that is provided lateral of the display panel, for inserting and ejecting at least one information card for storing information associated with a play result in the gaming machine; a cabinet in which the display panel, the camera, and the card slot are integrally provided; a card writer for storing the information associated with the play result in the gaming machine in the information card; a card stacker for stacking a plurality of the information cards; a detection portion for detecting the number of cards that is stacked in the card stacker; a memory for storing the detected number of cards; a light emitting portion for emitting light according to the number of cards; and a controller, the control method including the steps of: (A) the controller causing the light emitting portion to emit light in a first mode in a case where the number of cards stored in the memory is a predetermined first reference number; and (B) the controller causing the light emitting portion to emit light in a second mode in a case where the number of cards stored in the memory is equal to or greater than a predetermined second reference number According to the control method of the player tracking device, in the control method of the player tracking device for identifying a player and then providing useful information to the player, it is possible to visually recognize and keep track with the number of cards that remains in a card stacker from the outside in accordance with a light emission mode of a light emitting portion. In this manner, there is no need to check the number of cards by opening the inside of the card stacker. In particular, in a configuration in which units for identifying a player are mounted at their predetermined positions, in addition to these units, a light emitting portion is provided at a predetermined position, namely a light emitting portion is installed at an always same position as seen from the outside, thereby making it possible to easily recognize the light emitting portion. In addition, in a state in which a player keeps a playing posture, the light emitting portion is disposed at a position at which it can be visually recognize from its rear side or lateral side, thereby enabling the staff in casino facility to easily check the light emitting portion from the rear side while the player keeps a playing posture (that is, while a posture of picking up a player as an image is maintained).

A player tracking device of the present invention is characterized by including: a display for displaying a game, an operating portion that is provided downward of the display, for making an input for playing the game; a display panel for displaying information to be provided to a player who is playing at a gaming machine; a camera for picking up the player as an image; a card slot that is provided lateral of the display panel, for inserting and ejecting an information card for storing information associated with a play result in the gaming machine; and a cabinet in which the display panel, the camera, and the card slot are integrally provided in a region between the display and the card slot.

According to this gaming machine, it is possible to pick up a player facing a display, a display panel, and an operating portion (that is, a player who is playing a game while facing a gaming machine) as an image by means of a camera, and in this state, a card slot is disposed laterally of the display panel, thereby enabling the player to insert an information card into the card slot without changing his or her posture, and receive the information card ejected from the card slot. That is, on the basis of a posture in which a player facing a gaming machine, while this posture is maintained, the player can be picked up as an image by means of the player camera, and while this posture is maintained, the player can insert or remove the information card into or from the card slot. In this manner, information can be provided via the display panel to the player facing the gaming machine (the display, the display panel, and the operating portion), and based on a player's image picked up via the camera, for example, specific information prepared for the player can be provided via the display panel. That is, in the posture in which the player faces the gaming machine, the player can be authenticated by means of an image of the player picked up by means of the camera, and based on a result of the authentication, the specific information can be provided to the player via the display panel. In this manner, the specific information can be reliably provided to the player. Therefore, there can be provided a service achieving improvement of usability of enabling the player to insert or remove the information card into or from the card slot, and the specific information can be reliably provided to the player, whereby there can be provided a player tracking device that is capable of sufficiently providing service to the player. In addition, the display panel, the camera, and the card slot are integrally provided by means of the cabinet, and a positional relationship therebetween is limited, whereby, when the player tracking device is mounted on a gaming machine, the positions of the display panel, the camera, and the card slot can be maintained. In this manner, it is possible to reliably provide the above-described service that is obtained in accordance with the positional relationship between these units.

With respect to the tracking device of the present invention, in addition to the previously-described configuration, it is preferable that the cabinet include a human body detecting sensor for detecting the player upward of the card slot.

According to this gaming machine, a player inserting or removing an information into or from a card slot can be detected by means of the human body sensor that is provided upward of the card slot. In this manner, when an information card storing a prize is ejected from a card slot, for example, if a player has not been detected in front of the card slot for a predetermined period of time, ejection of the information card is canceled, whereby if a player eligible to receive the prize disappears, it is possible to avoid an occurrence of an inconvenience that the information card is ejected to another player.

With respect to the gaming machine of the present invention, in addition to the previously-described configuration, it is preferable that the cabinet provide a first speaker and a second speaker on a back face side of the display panel, and include ducts for voice output of the first and second speakers at the left and right of the display panel.

According to this gaming machine, an area of the player tracking device can be reduced by disposing the speakers of which areas unavoidably increase, on the back face side of the display panel. Voice output from the speakers is output from a front side of the display panel, via the ducts for voice output. In this manner, the voice from the speakers disposed behind the back face side of the display panel can be reliably output from the front side.

It is preferable that the gaming machine of the present invention include: a card writer for storing information associated with a play result in gaming machine, in at least one information card; a card slot for inserting and ejecting the information card; a card stacker for stacking a plurality of the information cards; a detection portion for detecting the number of cards that is stacked in the card stacker; a memory for storing the detected number of cards; a light emitting portion for emitting light according to the number of cards; and a controller programmed to execute processing operations of: (A) causing the light emitting portion to emit light in a first mode in a case where the number of cards stored in the memory is equal to or smaller than a predetermined first reference number; and (B) causing the light emitting portion to emit light in a second mode in a case where the number of cards stored in the memory is equal to or smaller than a predetermined second reference number.

This gaming machine is directed to a gaming machine that is capable of identifying a player and then providing useful information to the player, wherein it is possible to visually recognize and keep track with the number of cards that remains in a card stacker from the outside in accordance with a light emission mode. In this manner, there is no need to check the number of cards by opening the inside of the card stacker. In particular, in a configuration in which units for identifying a player are mounted at their predetermined positions, a light emitting portion is provided at a predetermined position in addition thereto, namely a light emitting portion is installed at an always same position as seen from the outside, thereby making it possible to easily recognize the light emitting portion. In addition, in a state in which a player keeps a playing posture, the light emitting portion is disposed at a position at which it can be visually recognize from its rear side or lateral side, thereby enabling the staff in casino facility to easily check the light emitting portion from the rear side while the player keeps a playing posture (that is, while a posture of picking up a player as an image is maintained).

With respect to the gaming machine of the present invention, in addition to the previously-described configuration, it is preferable that the controller be further programmed to execute a processing operation of (C) stopping the progress of game in the gaming machine in a case where the number of cards stored in the memory becomes 0.

According to this gaming machine, in a case where the remaining number of cards in card stacker becomes "0", the progress of game in gaming machine stops, thereby making it possible to prevent a player to forcibly insert an information card having information stored therein.

With respect to the gaming machine of the present invention, in addition to the previously-described configuration, it is preferable that the controller be further programmed to execute a processing operation of (D) stopping the progress of game in the gaming machine in a case where the number of cards stored in the memory becomes a predetermined upper limit.

According to this gaming machine, in a case where the remaining number of cards in card stacker becomes the upper limit, the progress of game in gaming machine stops, thereby making it possible to prevent a player to forcibly insert an information card having information stored therein.

A control method of a player tracking device, of the present invention, is directed to a control method of the player tracking device including: a display for displaying a game; an operating portion that is provided downward of the display, for making an input for playing the game; a display panel for displaying information to be provided to a player who is playing at a gaming machine; a camera for picking up the player as an image; a card slot that is provided lateral of the display panel, for inserting and ejecting at least one information card for storing information associated with a play result in the gaming machine; a cabinet in which the display panel, the camera, and the card slot are integrally provided between the display and the operating portion; a card writer for storing the information associated with the play result in the gaming machine in the information card; a card stacker for stacking a plurality of the information cards; a detection portion for detecting the number of cards that is stacked in the card stacker; a memory for storing the detected number of cards; a light emitting portion for emitting light according to the number of cards; and a controller, the control method including the steps of: (A) the controller causing the light emitting portion to emit light in a first mode in a case where the number of cards stored in the memory is a predetermined first reference number; and (B) the controller causing the light emitting portion to emit light in a second mode in a case where the number of cards stored in the memory is equal to or greater than a predetermined second reference number The control method of the gaming machine is directed to the gaming machine that is capable of identifying a player and then providing useful information to the player, wherein it is possible to visually recognize and keep track with the number of cards that remains in a card stacker from the outside in accordance with a light emission mode. In this manner, there is no need to check the number of cards by opening the inside of the card stacker. In particular, in a configuration in which units for identifying a player are mounted at their predetermined positions, a light emitting portion is provided at a predetermined position in addition thereto, namely a light emitting portion is installed at an always same position as seen from the outside, thereby making it possible to easily recognize the light emitting portion. In addition, in a state in which a player keeps a playing posture, the light emitting portion is disposed at a position at which it can be visually recognize from its rear side or lateral side, thereby enabling the staff in casino facility to easily check the light emitting portion from the rear side while the player keeps a playing posture (that is, while a posture of picking up a player as an image is maintained).

It is another object of the present invention to provide a sheet-of-paper identifying device that is capable of restraining higher costs, enabling authentication by utilizing a microprint that is formed on paper.

That is, in general, in order to prevent counterfeit, a variety of countermeasures for preventing counterfeit are taken for sheets of paper such as bills, coupon tickets, or commodity tickets. For example, one of such countermeasures for preventing counterfeit, a microprint (such as a very small character or pattern) is applied, information contained in this microprint is read, and the read information is compared with authentic data, thereby identifying (authenticating) its validity. That is, in such a microprint, since a line width is very small, it is known that a specific pattern (moire streak: moire pattern) is produced due to a light interference, and this moire streak (moire pattern) is acquired and then the acquired moire pattern is compared with valid data, thereby identifying validity of paper.

For example, Japanese Patent Application Publication No. 2004-78620 discloses a technique of forming a hidden pattern made of parallel lines in an information recording body as a sheet of paper or the like, irradiating this hidden pattern by means of a light source, and detecting the reflection light by means of an optical sensor via a check pattern (in which a parallel line pattern for check is formed). In this case, in the optical sensor, parallel lines of the hidden pattern respectively interfere with parallel lines of the check pattern, thereby making it possible to detect a specific moire pattern, and the detected moire pattern is compared with a standard moire pattern, thereby performing authentication.

In addition, like Japanese Patent Application Publication No. 2004-78620, Japanese Patent Application Publication No. 7-306964 discloses a technique of irradiating a sheet of paper having a microprint with light by means of a strobe illumination device, and detecting the reflection light by means of an image detection means (an area sensor) via a moire streak generation means (a lattice plate) for generating moire streaks. Specifically, the reflection light from the microprint transmits the abovementioned lattice plate, whereby moire streaks occur; and therefore, the moire streaks are detected by means of the area sensor that is the image detection means, and an affirmative determination is made in a case where a strength of a frequency component fm thereof exceeds a preset threshold value Th, and a negative determination is made in a case where the frequency component fm does not exceed the threshold value Th.

In the sheet-of-paper identifying device having the authentication technique described above, in order to improve authentication precision, a sensor with its resolution higher than that of a sensor that has been used up to now may be employed. In such a case, in the abovementioned techniques disclosed in Japanese Patent Application Publication No. 2004-78620 and Japanese Patent Application Publication No. 7-306964, there is a need to recheck a filter (lattice plate) having a check pattern so that a moire pattern is generated, and remanufacture a filter (lattice plate) according to the generated moire pattern, thus making it difficult to restrain higher costs.

The present invention has been made in view of the problem described above, and it is an object of the present invention to provide a sheet-of-paper identifying device that is capable of restraining higher costs, enabling authentication by utilizing a microprint that is formed on a sheet of paper.

In order to achieve the object described above, the sheet-of-paper identifying device is characterized by having: a reading means that includes color information having brightness and reads a sheet of paper on a pixel-by-pixel basis while a predetermined size is defined as one unit; a storage means for storing image data made of a plurality of pixels that are read by means of the reading means; an increasing or decreasing means for increasing or decreasing the number of pixels of the image data; and a sheet-of-paper identifying means for identifying authenticity of the sheet of paper, based on the image data that is increased or decreased by means of the increasing or decreasing means.

According to the above structured sheet-of-paper identifying device, by increasing or decreasing the number of pixels of image data recording to the acquired sheet of paper, it becomes possible to acquire moire data including a streak-like pattern (moire streaks) specific to the sheet of paper. In this manner, for example, in order to improve identification precision, even in a case where a sensor constituting the sheet-of-paper reading means is changed to another sensor having its high resolution, there is no need to newly manufacture a filter for generating moire streaks, and it becomes possible to restrain higher costs.

In addition, the sheet-of-paper identification device is characterized by increasing or decreasing the number of pixels by the increasing or decreasing means in a sheet-of-paper acquisition direction and in a direction orthogonal thereto.

According to such a configuration, moire streaks are likely to occur to image data merely by increasing or decreasing the number of pixels of image data relating to the acquired sheet of paper in the sheet-of-paper acquisition direction and in a direction orthogonal thereto, making it possible to easily acquire moire data.

In addition, the sheet-of-paper identifying device is characterized by having a parameter setting portion for setting an increment or decrement ratio so as to execute an increase or decrease of the number of pixels by the increasing or decreasing means at a predetermined increment or decrement ratio in a sheet-of-paper acquisition direction and in a direction orthogonal thereto.

According to such a configuration, it becomes possible to acquire optimal moire data according to a sensor resolution merely by changing parameters (such as longitudinal direction; 50% or transverse direction; 50%). Thus, it is sufficient if a parameter for expanding or compressing image data be ensured, there is no need to allocate an unwanted storage area, and it becomes possible to restrain higher costs.

According to the present invention, there can be provided a sheet-of-paper identifying device that is capable of restraining higher costs, enabling authentication by utilizing a microprint that is formed on a sheet of paper.

Advantageous Effect of the Invention

The present invention has been made in view of the circumstance, and it is an object of the present invention to provide a game system that is capable of performing a game by employing an information card in place of a conventional paper-based system.

BRIEF DESCRIPTION OF THE DRAWINGS

FIG. 24 is an outlined line drawing showing a table of a light emission mode in an LED module;

FIG. 28 is a table showing the configuration of stored data of a person image of a player stored on a hard disk drive of the PTS terminal;

FIG. 30 is a table showing items stored on the IC card used at the PTS terminal according to the embodiment of the present invention;

FIG. 35 is a diagram showing an arrangement of regular game symbols drawn on the circumferential surface of a reel of the slot machine according to the embodiment of the present invention;

FIG. 36 is a diagram showing an arrangement of bonus game-use symbols drawn on the circumferential surface of the reel of the slot machine according to the embodiment of the present invention;

FIG. 37 is an explanatory diagram of a symbol column determination table provided in the slot machine according to the embodiment of the present invention;

FIG. 38 is an explanatory diagram of a code No. determination table provided in the slot machine according to the embodiment of the present invention;

FIG. 39 is an explanatory diagram of a wild symbol increase count determination table provided in the slot machine according to the embodiment of the present invention;

FIG. 40 is an explanatory diagram of a trigger symbol increase count determination table provided in the slot machine according to the embodiment of the present invention;

FIG. 41 is an explanatory diagram of a payout table provided in the slot machine according to the embodiment of the present invention;

FIG. 68 is a diagram showing a staff management table stored in the staff management server shown in FIG. 67;

FIG. 82A is a diagram showing a correspondence relationship between a combination of symbols rearranged on a wining line and a payout amount;

FIG. 82B is a diagram showing the correspondence relationship between the combination of symbols rearranged on a wining line and the payout amount;

FIG. 82C is a diagram showing the correspondence relationship between the combination of symbols rearranged on a wining line and the payout amount;

FIG. 89 is a diagram showing a point number determination table;

FIG. 90A is a diagram showing an emission count determination table;

FIG. 90B is a diagram showing an emission count determination table;

FIG. 116 is a block diagram showing the configuration of control means for controlling drive of drive members such as the bill transport mechanism and bill reading means;

FIG. 117 is a diagram showing a state where a distal end of a transported bill is notched;

FIG. 118(*a*) is a plain view of a regular bill;

FIG. 118(*b*) is a lateral side view showing a state where the distal end of the transported bill is broken;

FIG. 118(*c*) is a plain view showing a state where the transported bill is notched;

FIG. 119 is a flowchart explaining the processing operation of a bill in the bill processing device of the third embodiment;

FIG. 120 is a flowchart explaining the processing operation of a bill in the bill processing device of the third embodiment;

FIG. 121 is a flowchart explaining a damage determining process;

FIG. 122 is a flowchart explaining a damage determining process;

FIG. 123 is a block diagram showing the configuration of control means for controlling drive of drive members such as the bill transport mechanism and bill reading means;

FIG. 124 is a schematic diagram exemplarily illustrating a range over which length data of a print area of a bill is obtained;

FIG. 125 is a diagram for explaining a method of deriving a permissive range from measured data of the print area of a sampled bill;

Figure 126:
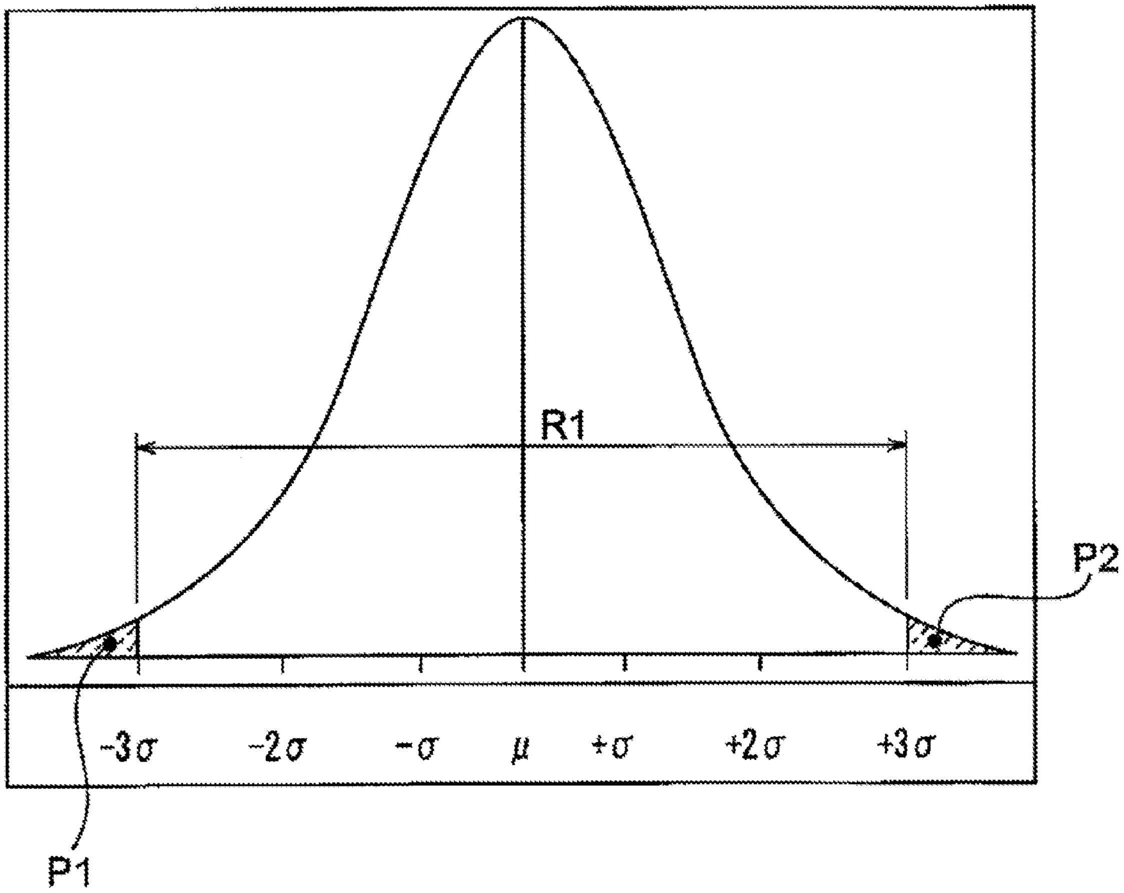
Figure 127:
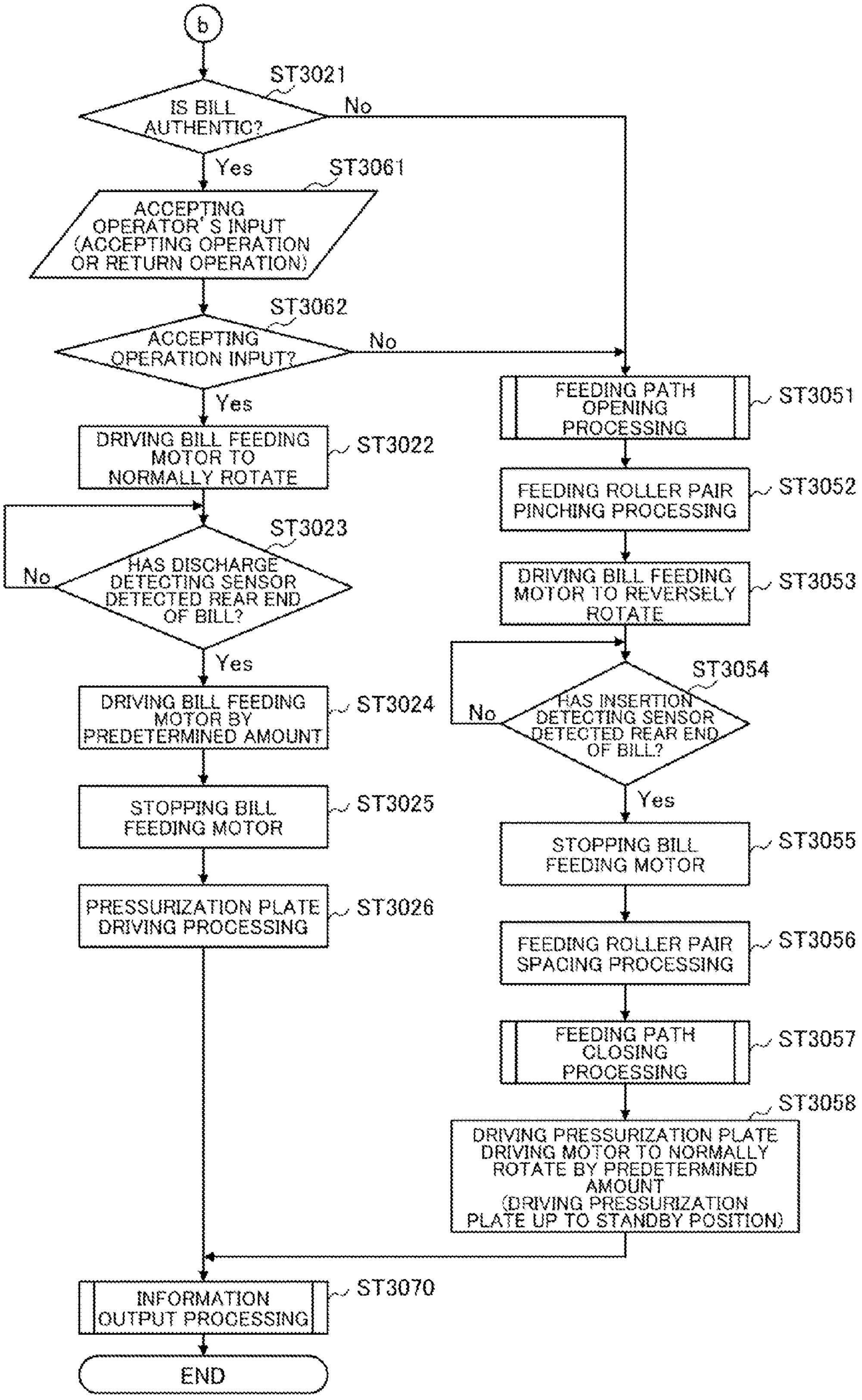
Figure 128:
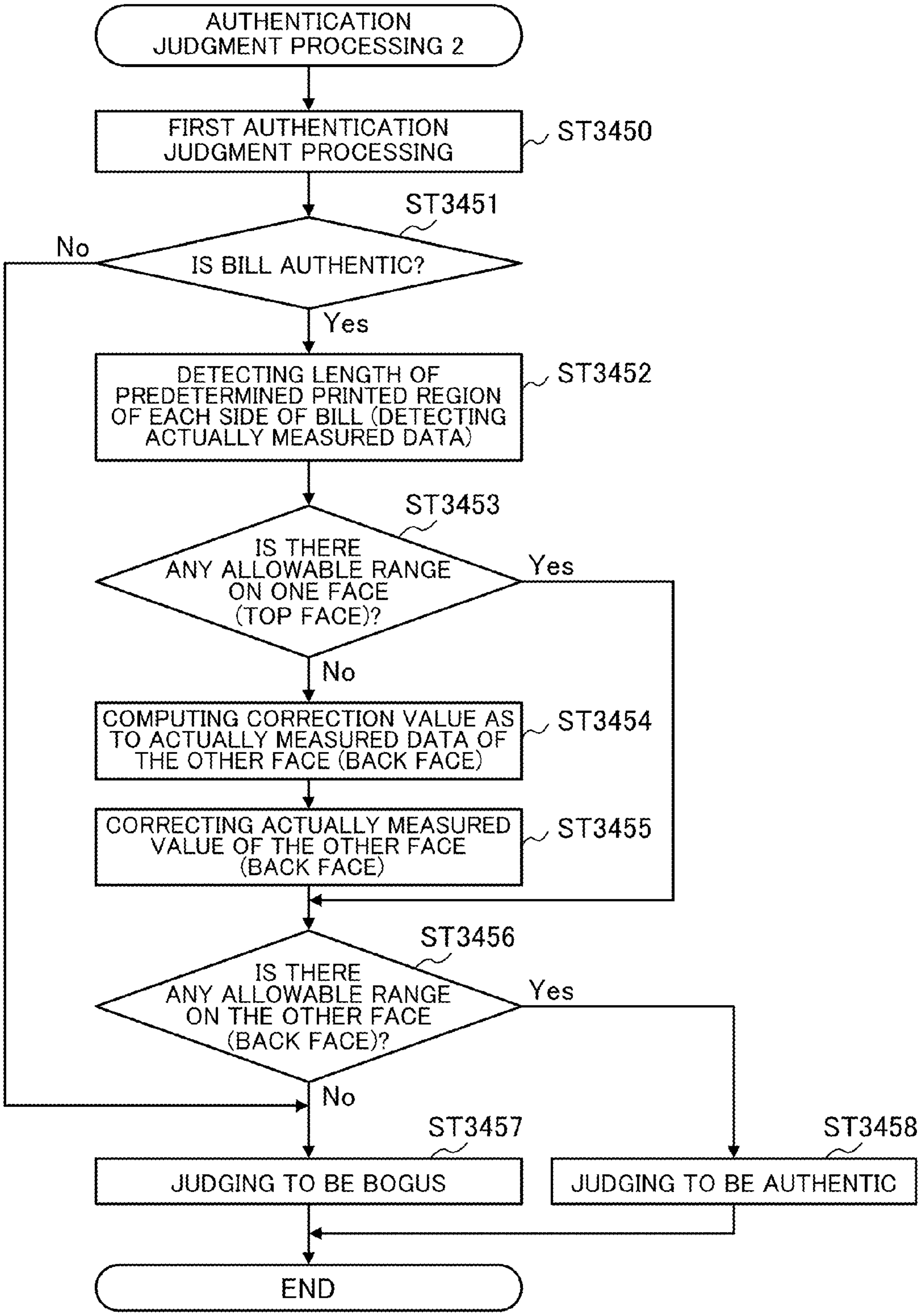
Figure 129:
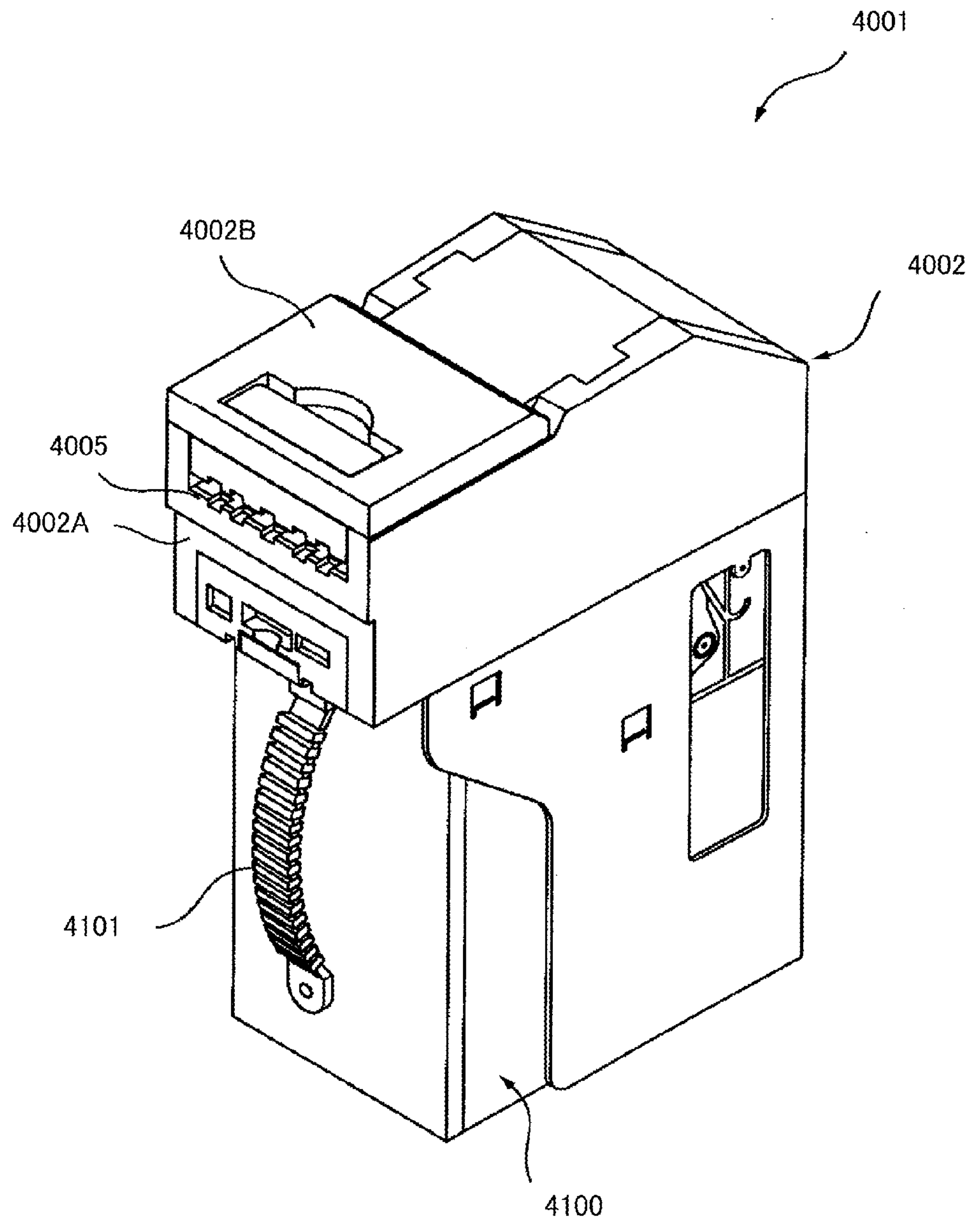
Figure 130:
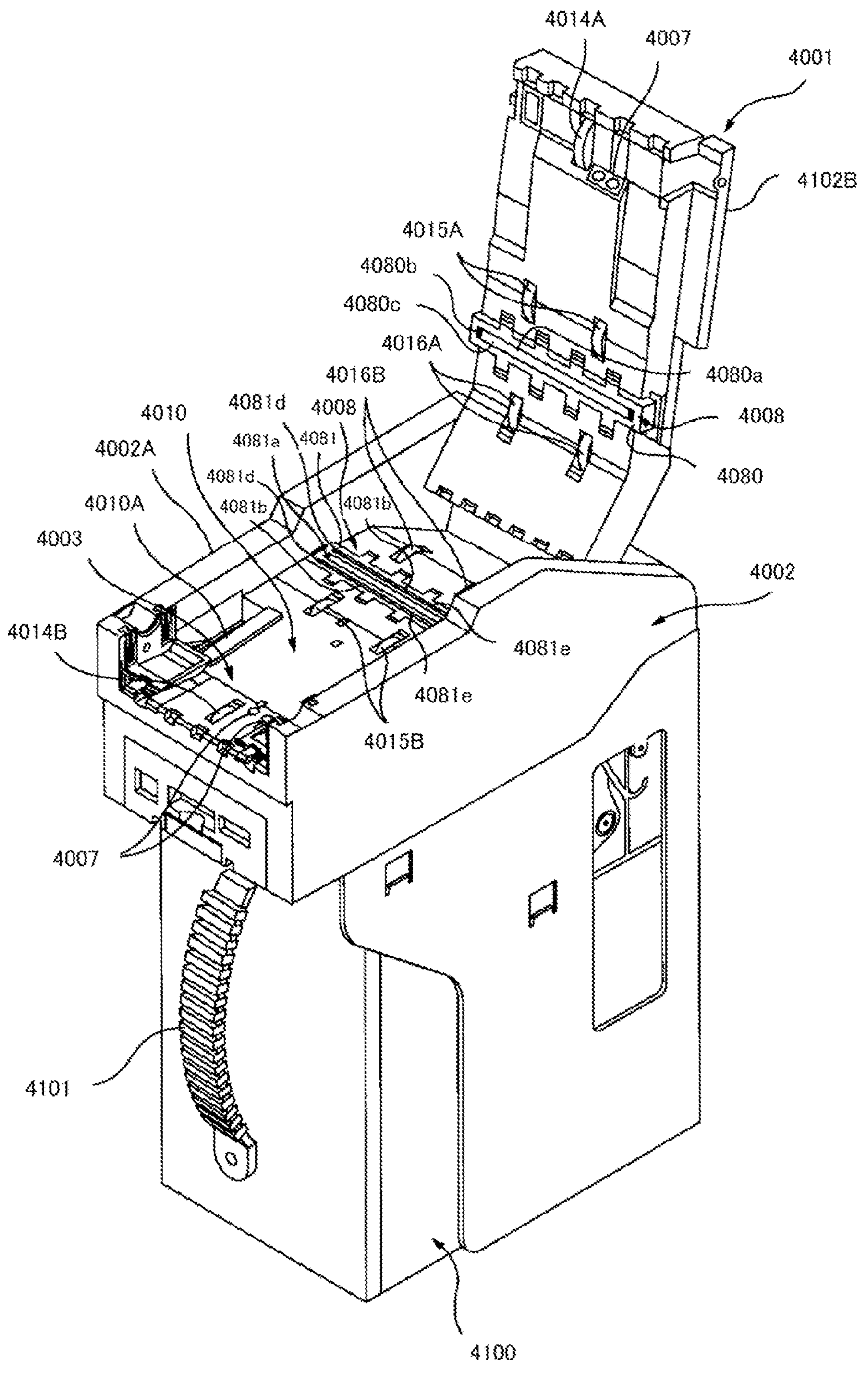
Figure 131:
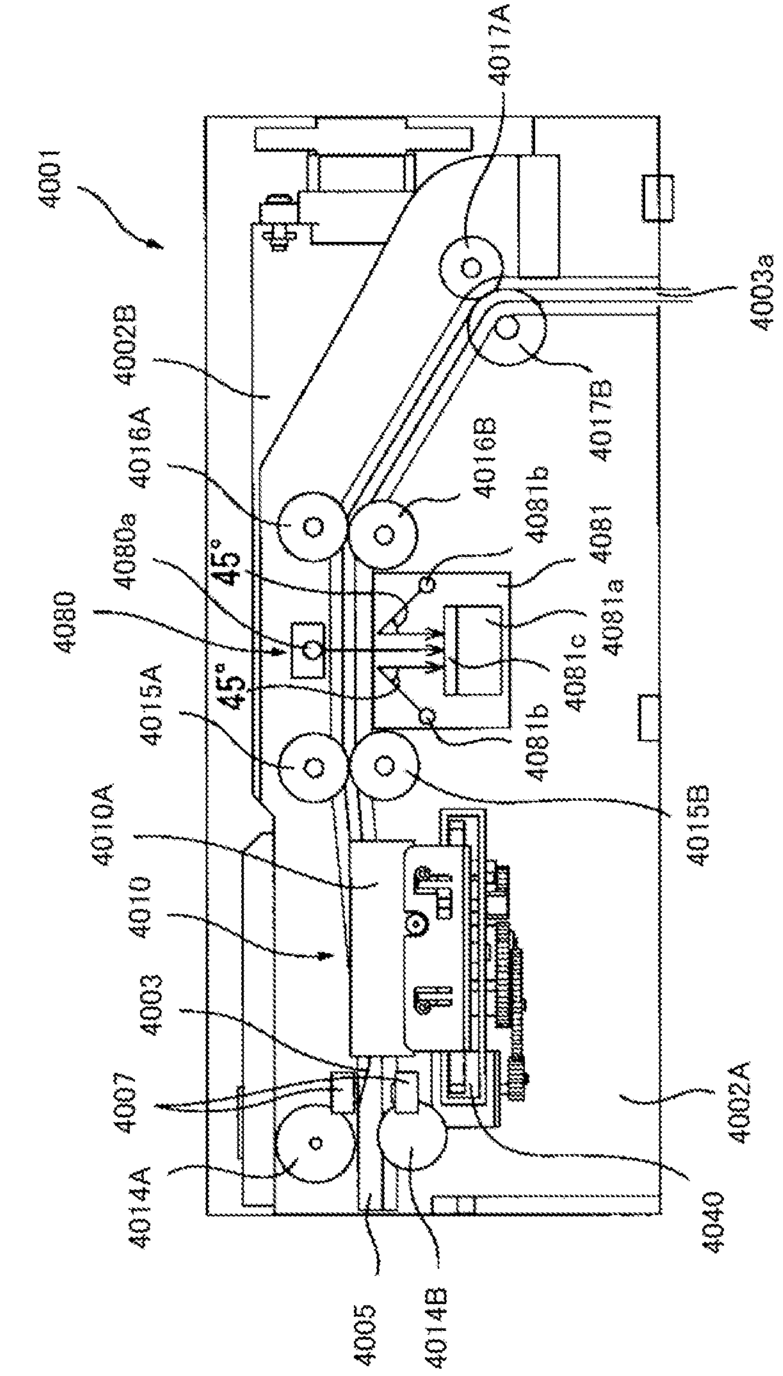
Figure 132:
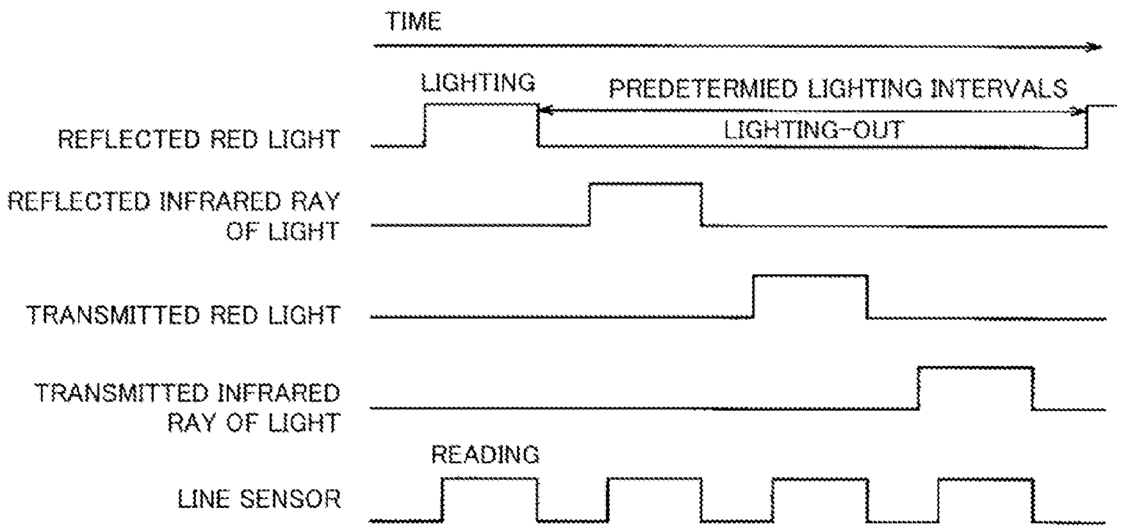
Figure 133:
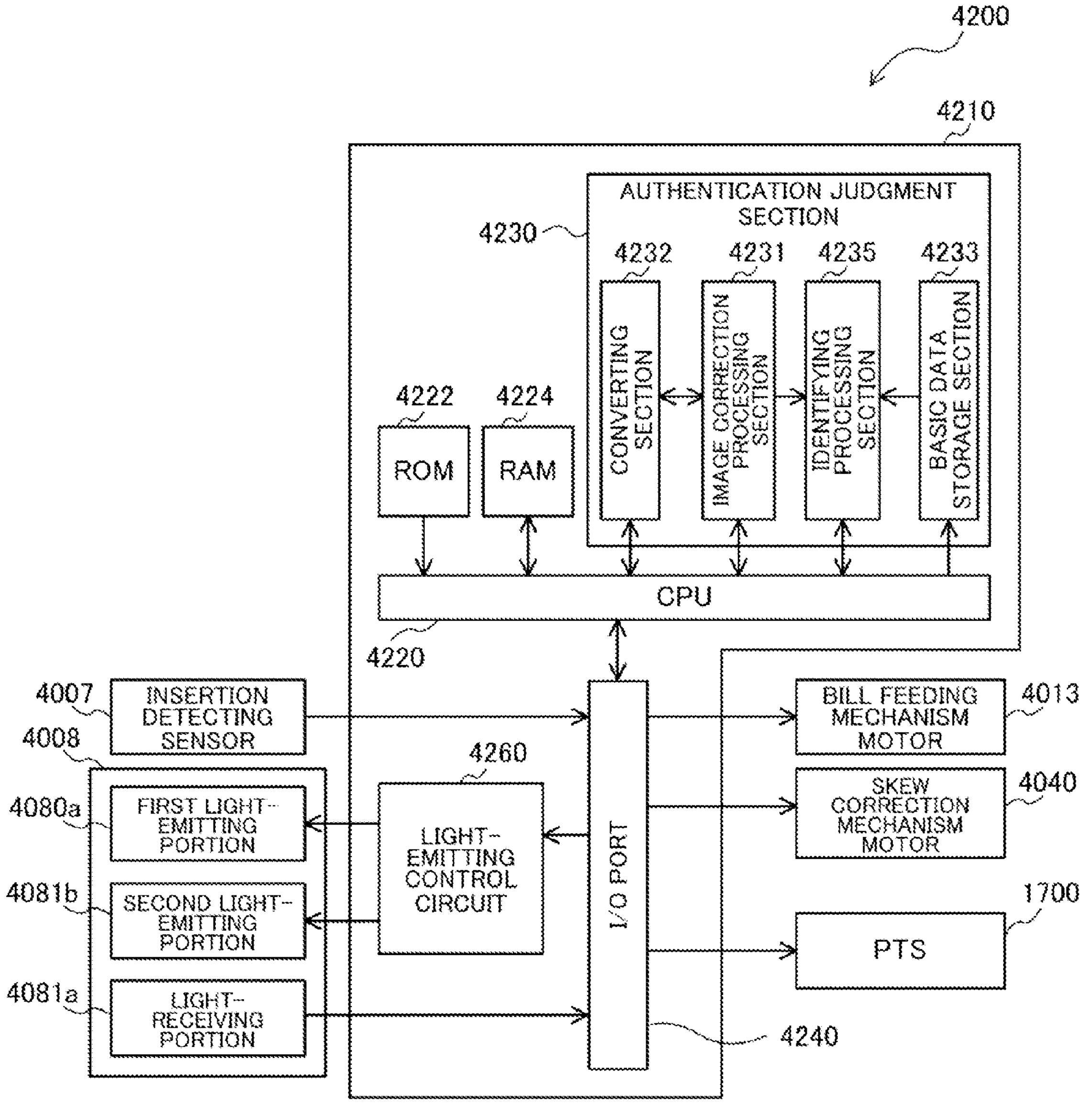
Figure 134:
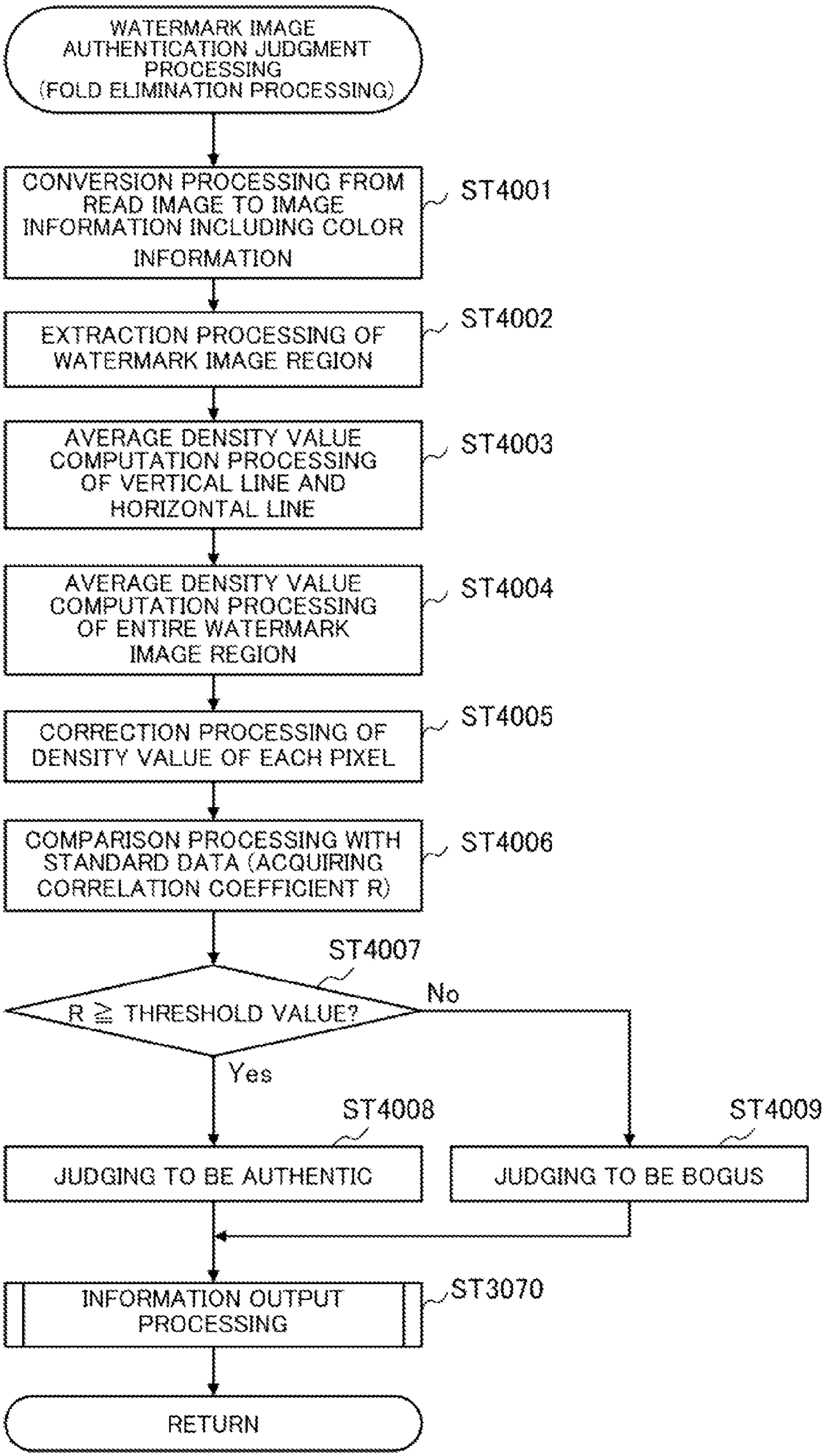
Figure 135:
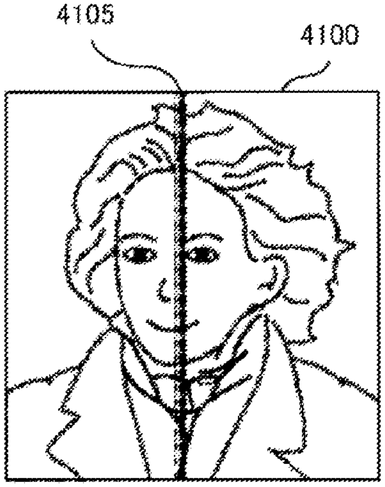
Figure 136:
Figure 137:
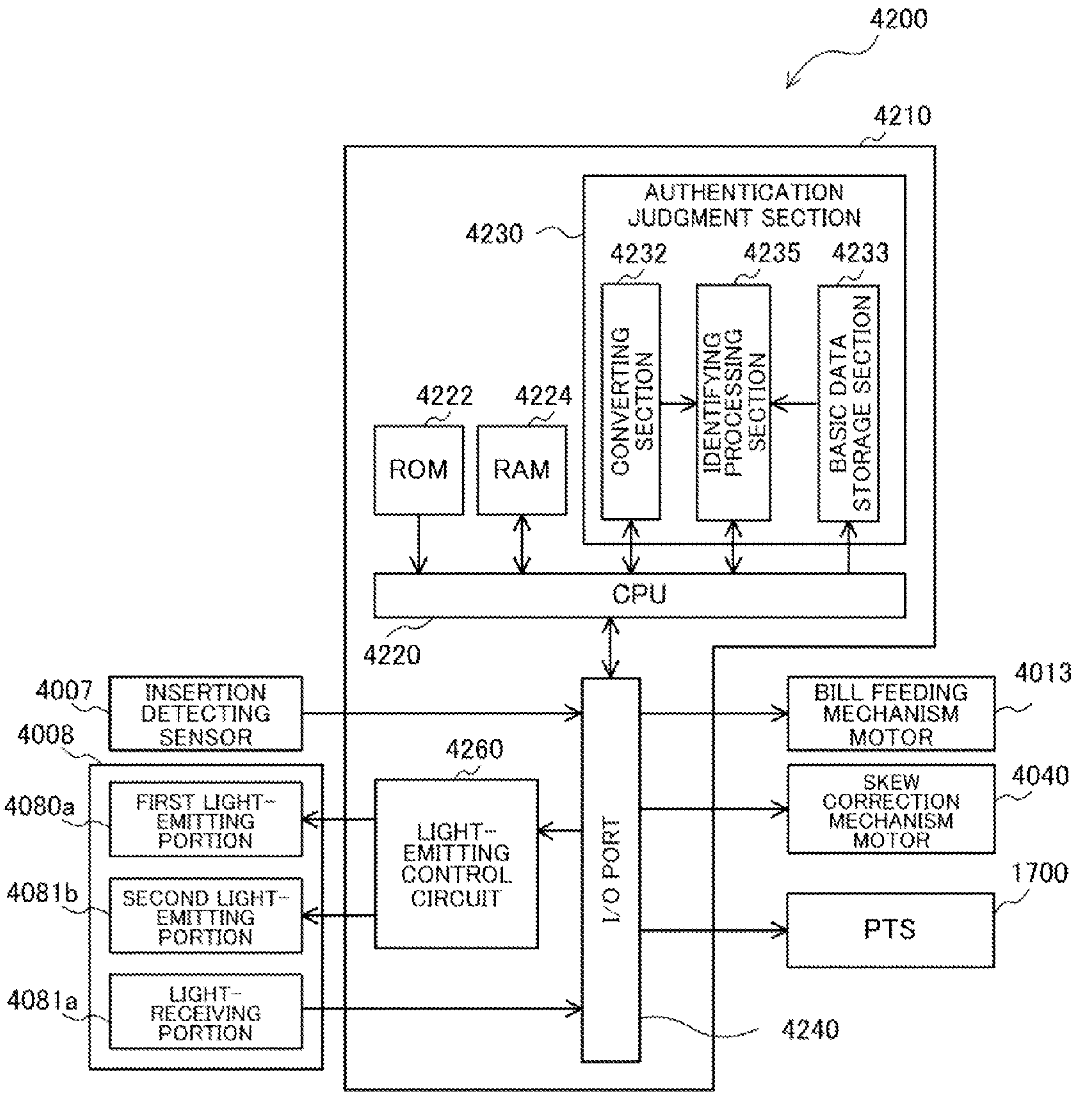
Figure 138:
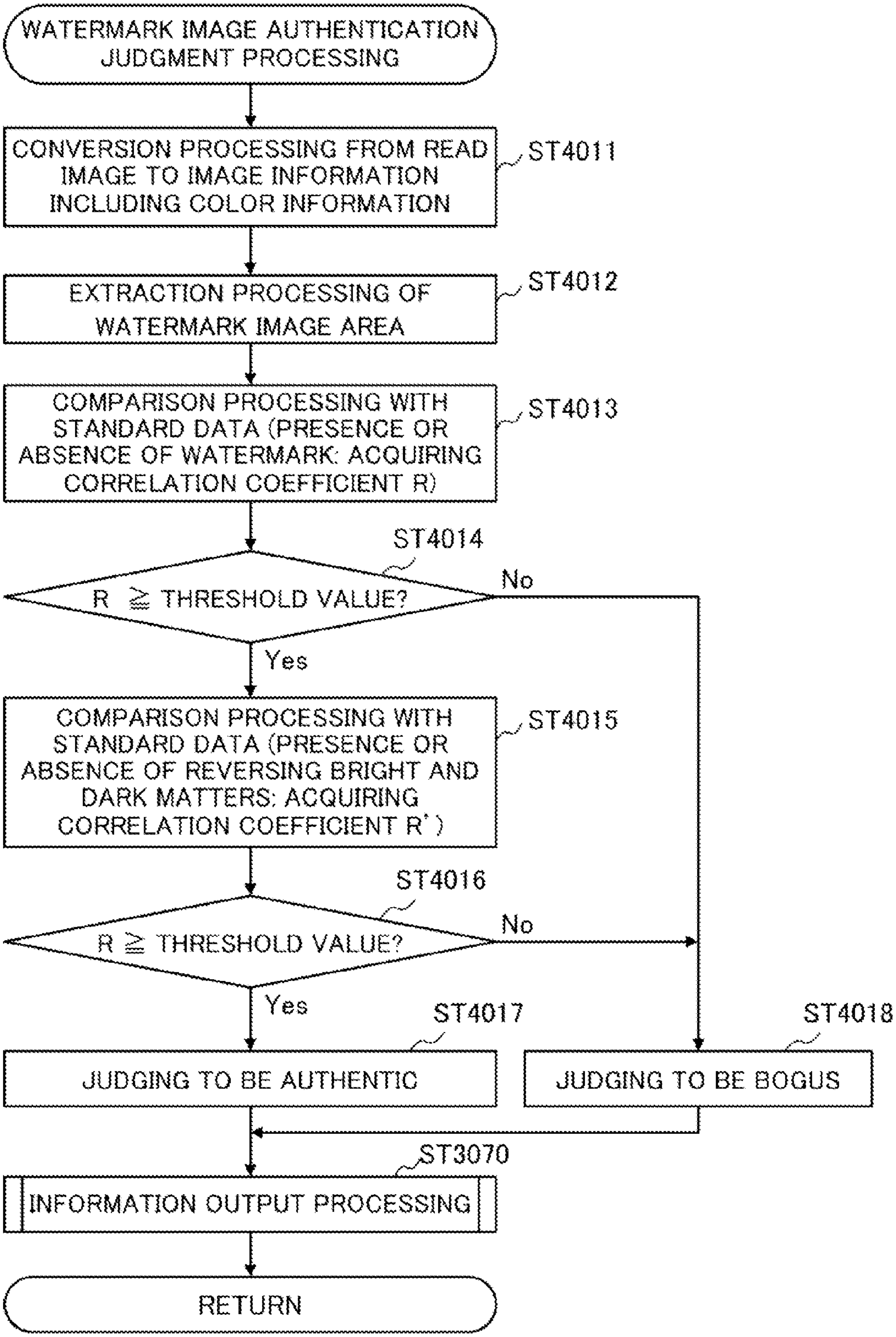
Figure 139:
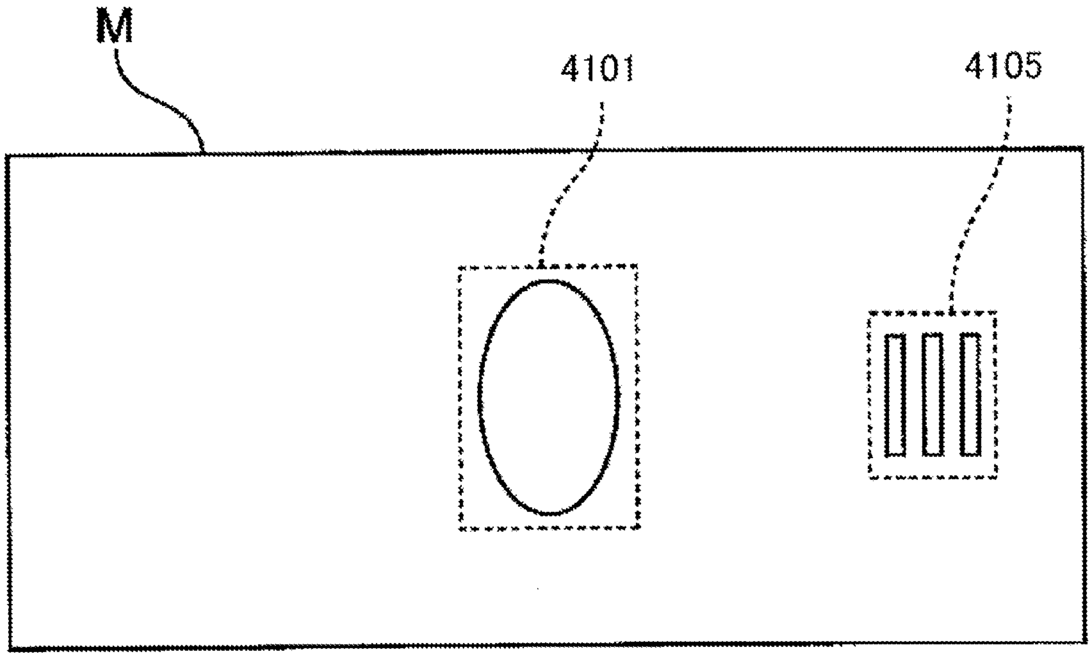
Figure 140:
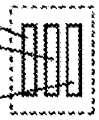
Figure 141:
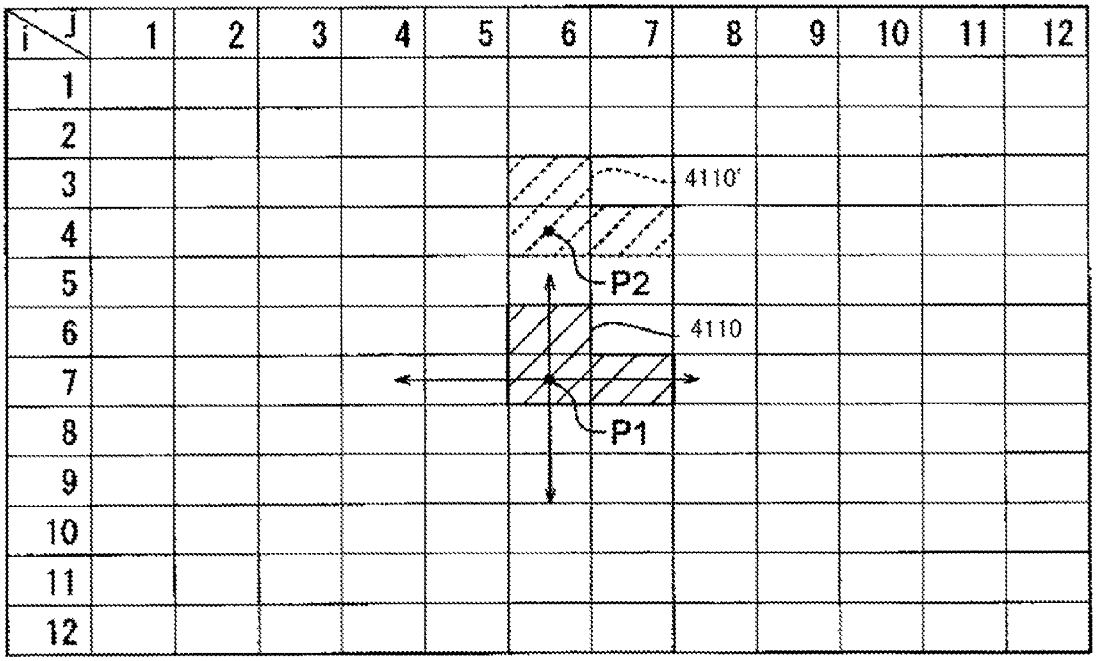
Figure 142:
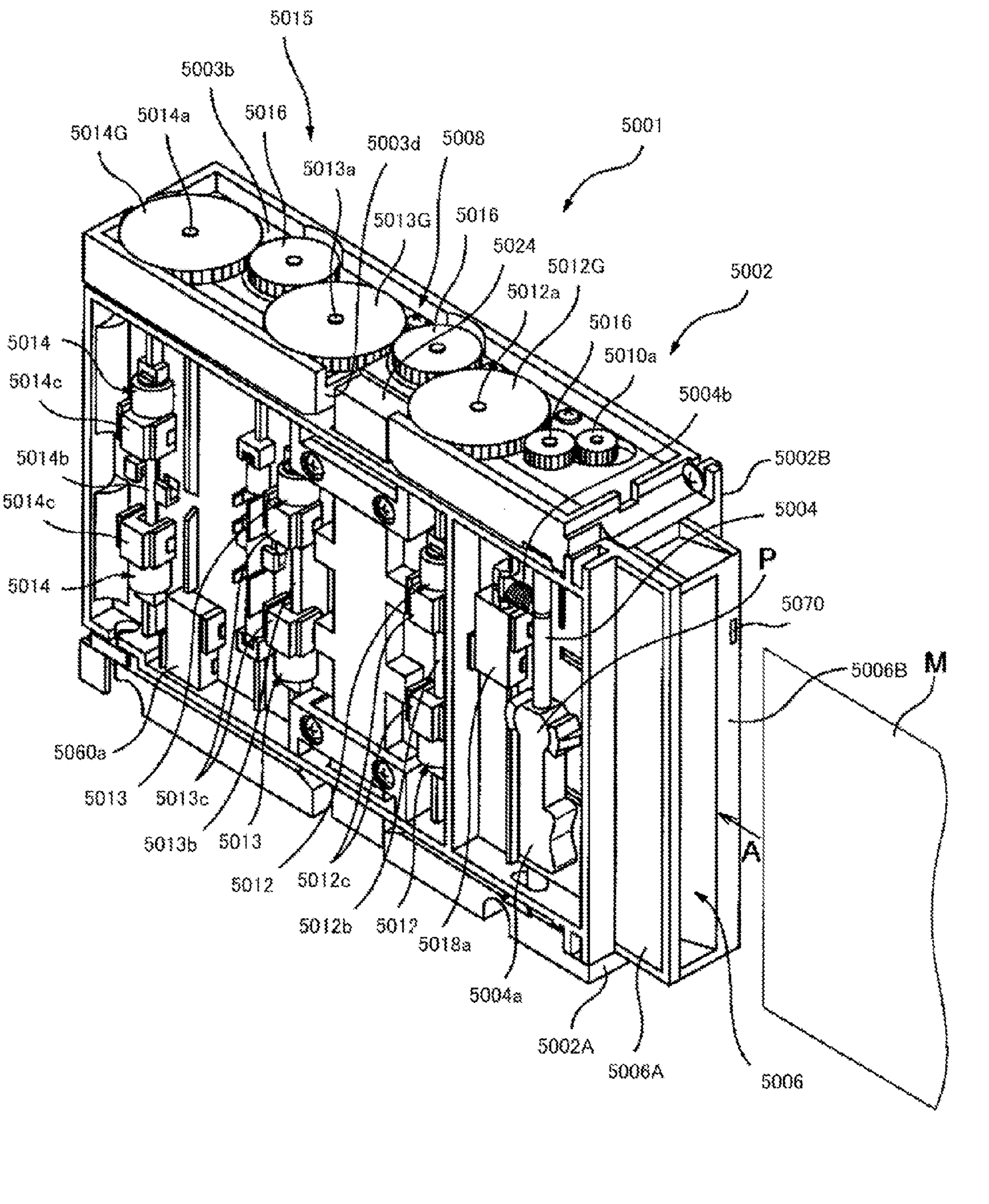
Figure 143:
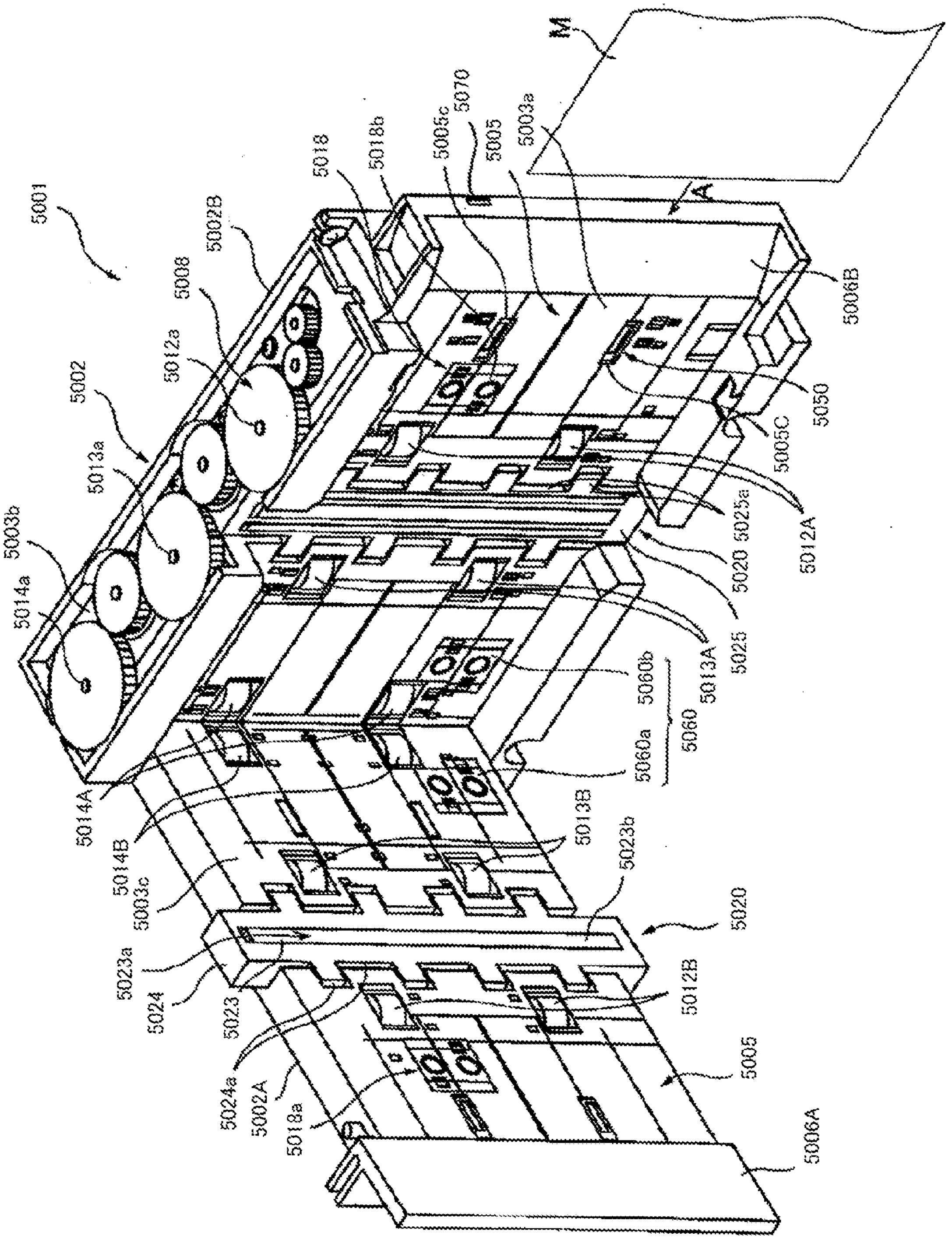
Figure 144:
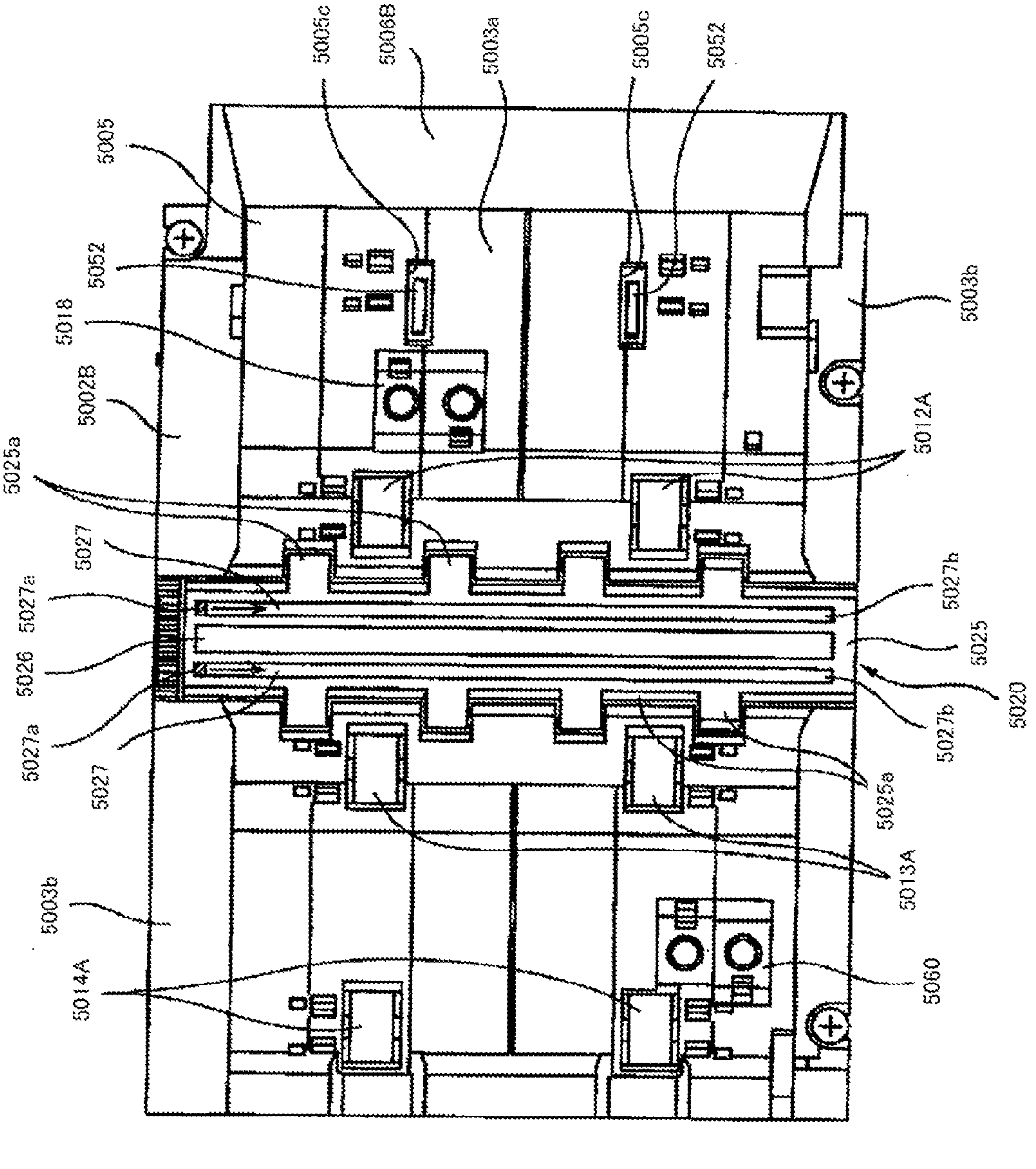
Figure 145:
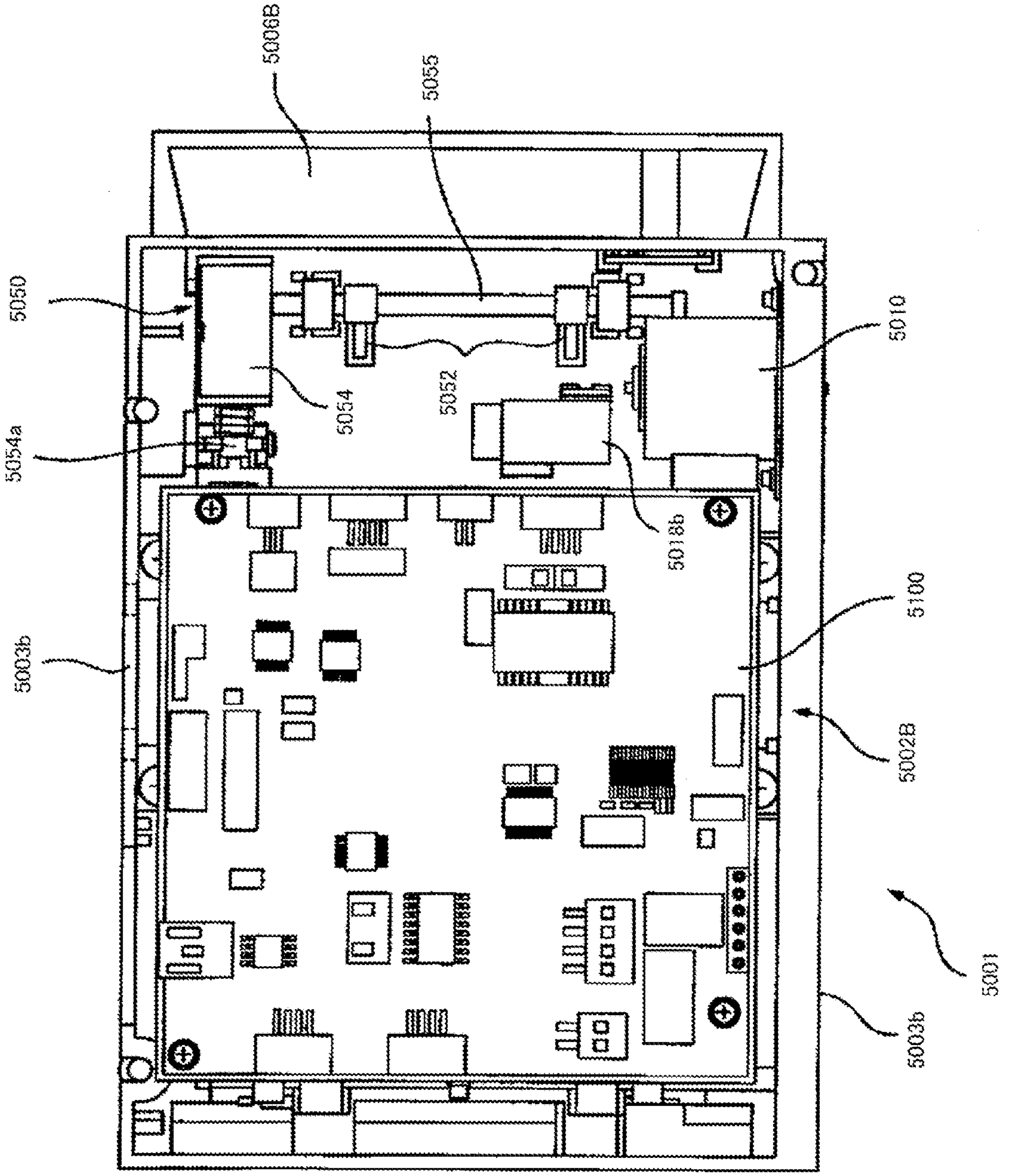
Figure 146:
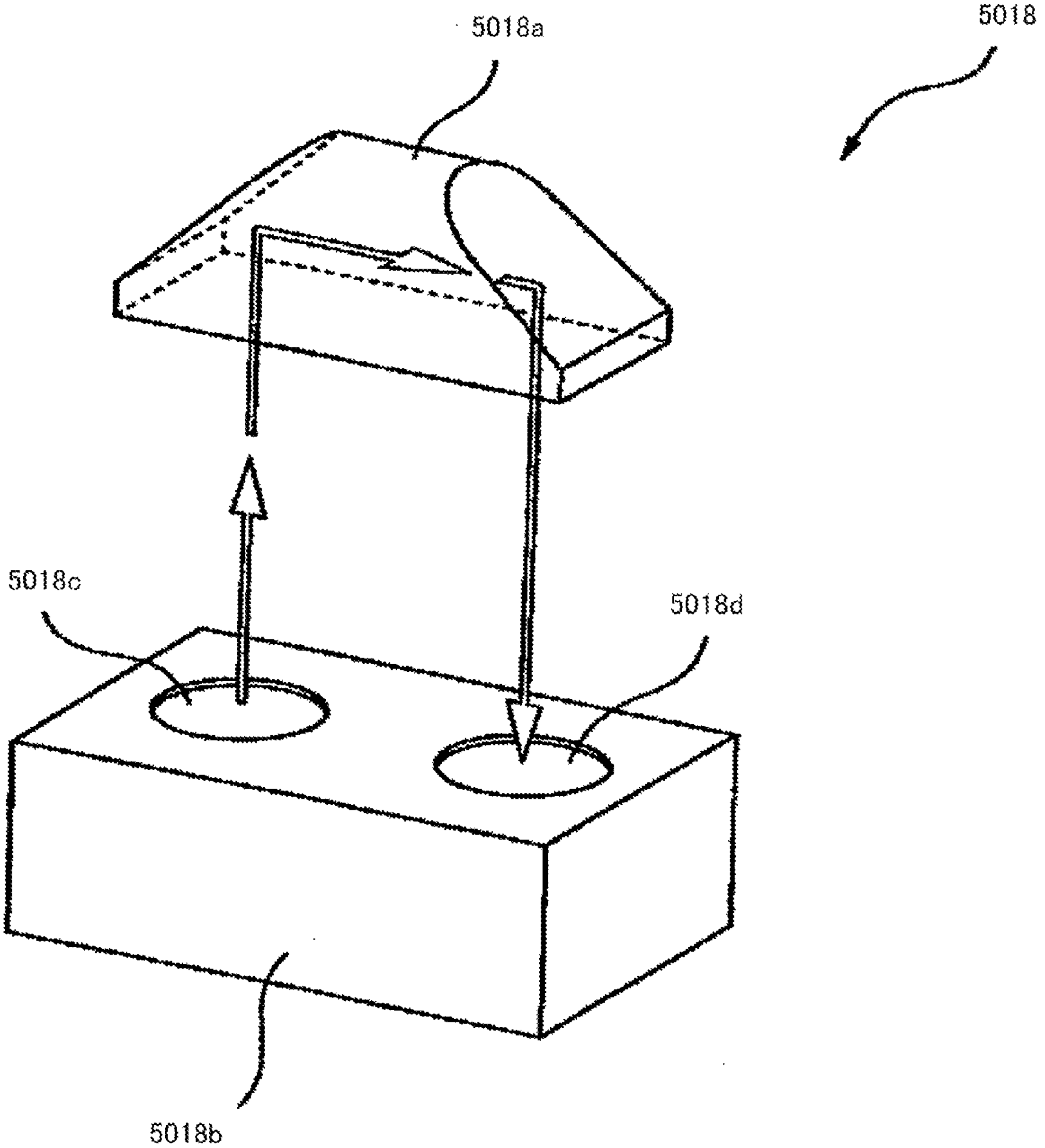
Figure 147:
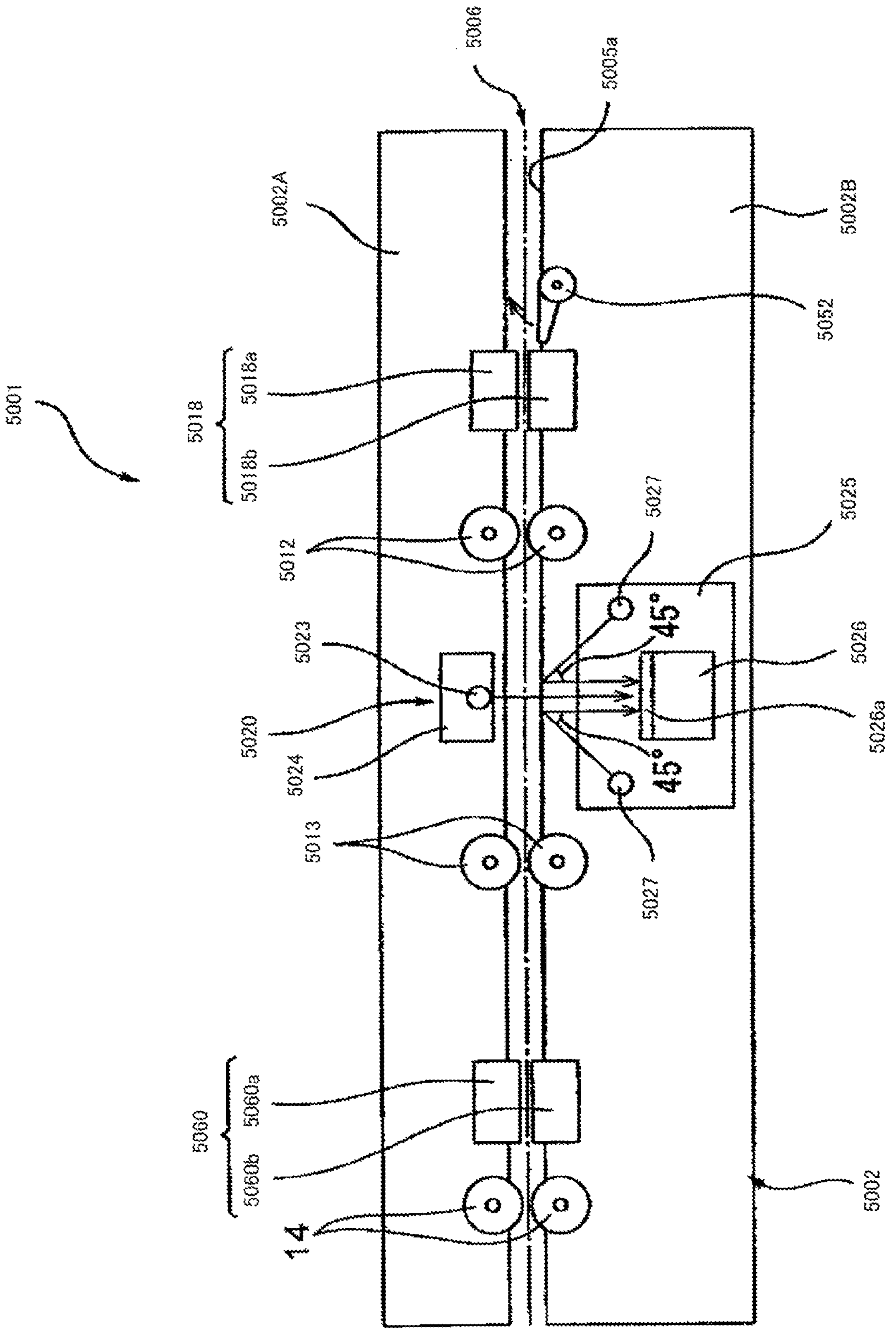
Figure 148:
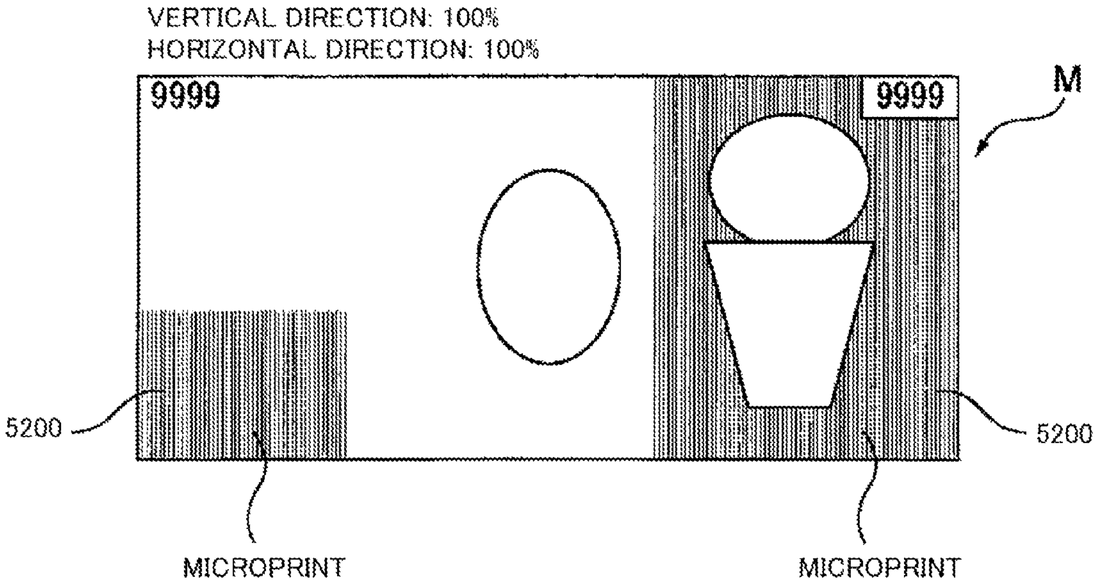
Figure 149:
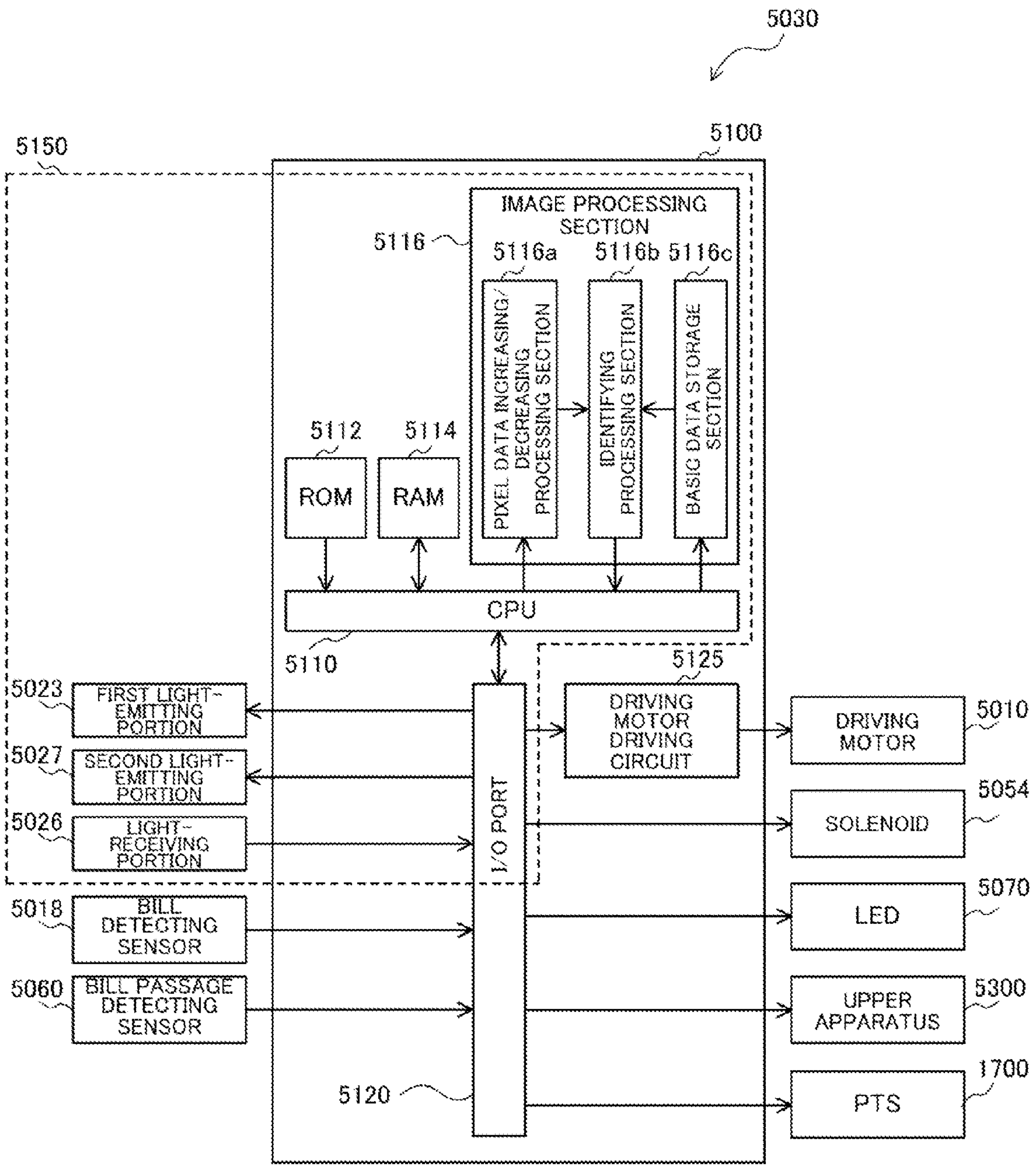
Figure 151:
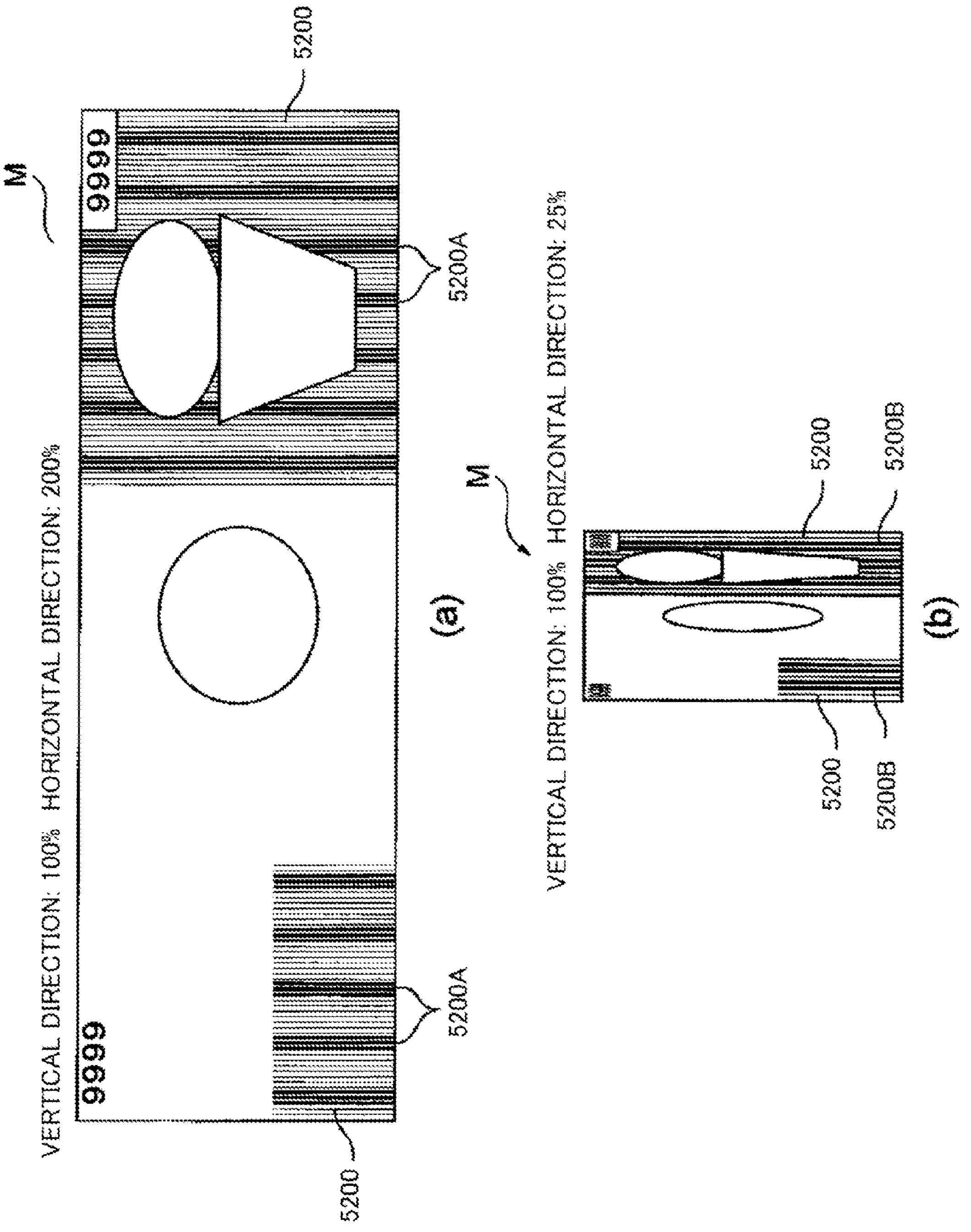
Figure 152:
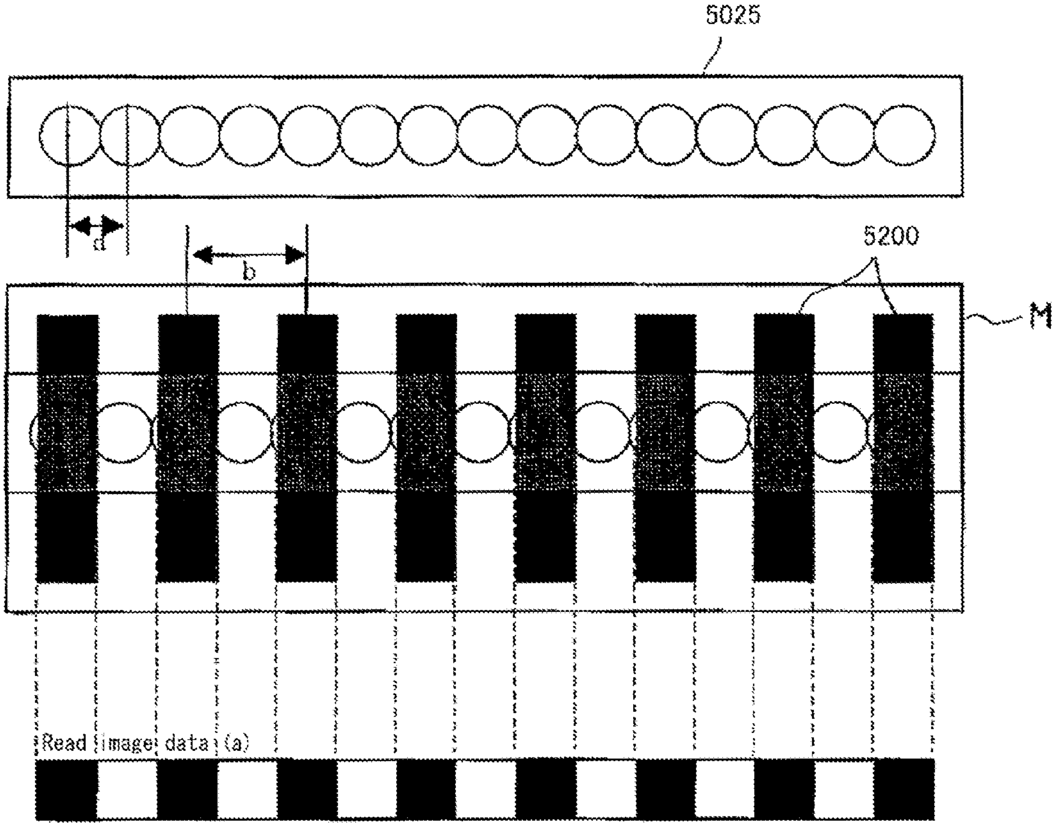
Figure 153:
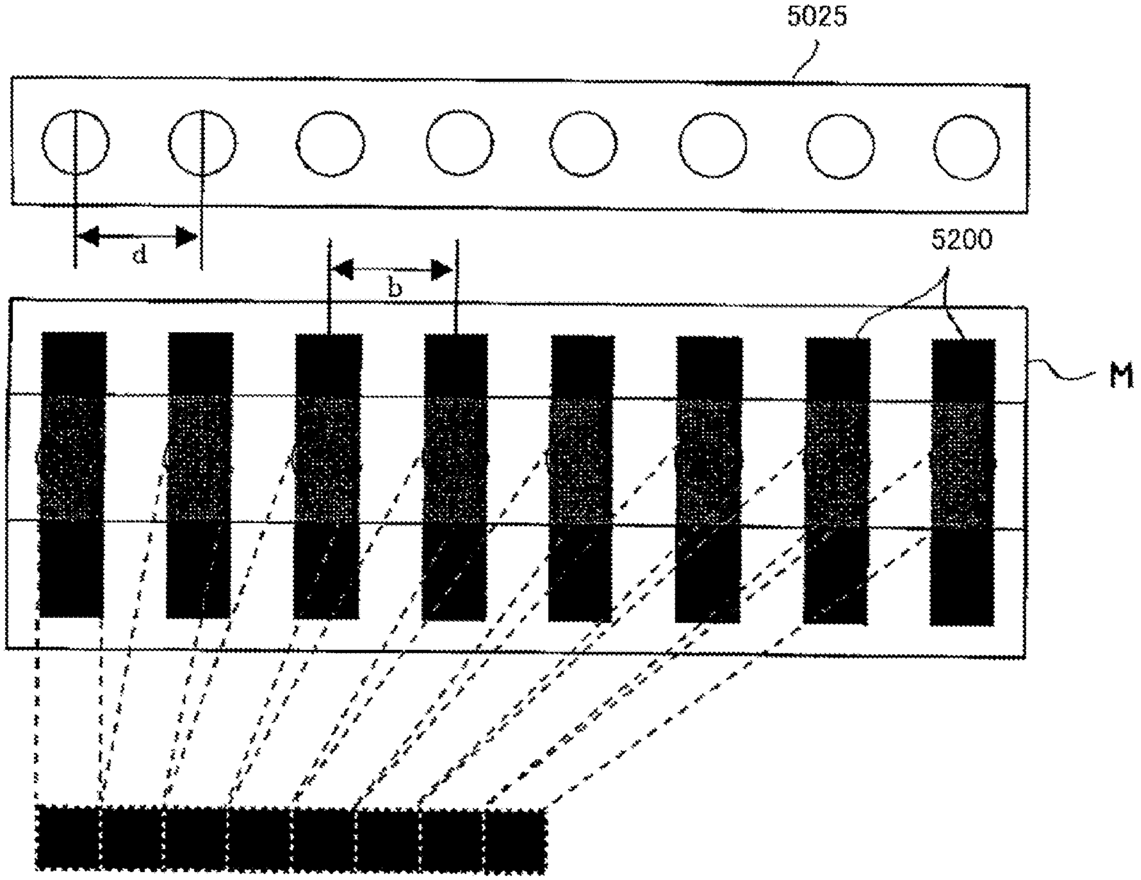
Figure 154:
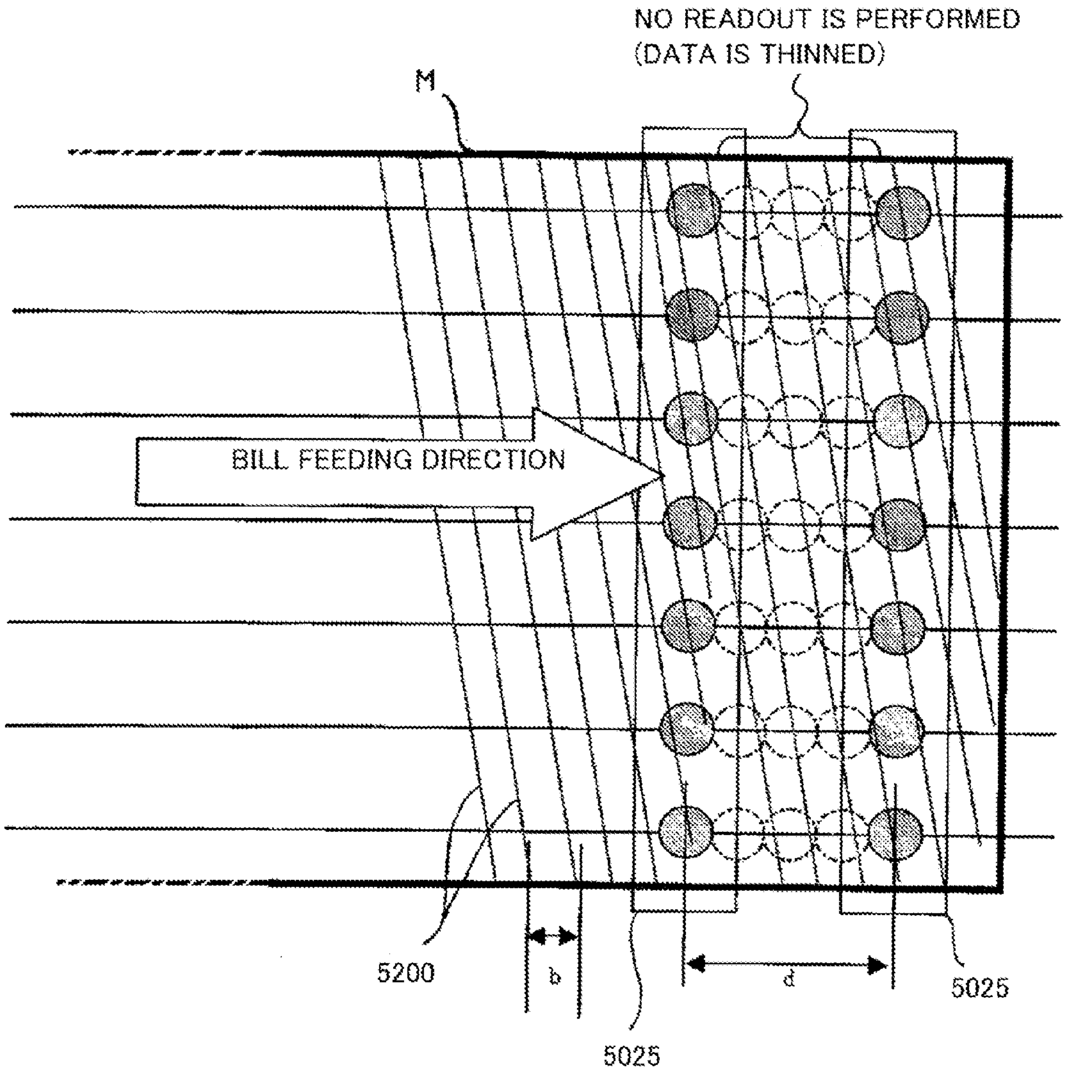
Figure 155:
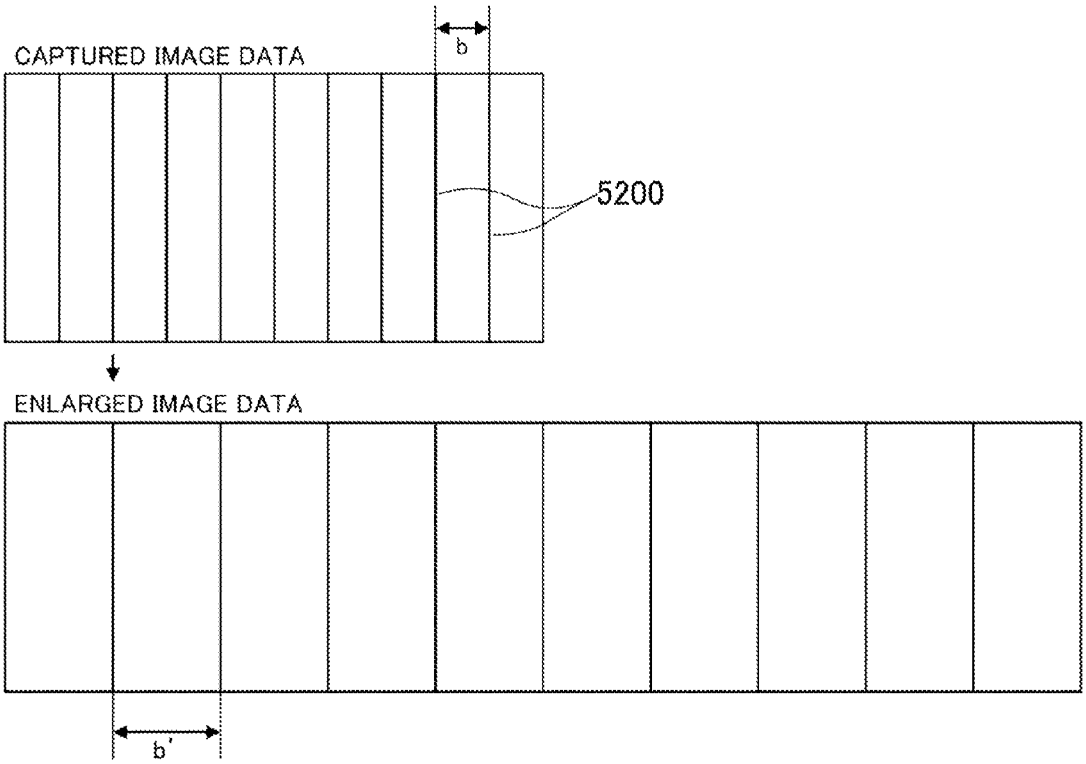
Figure 156:
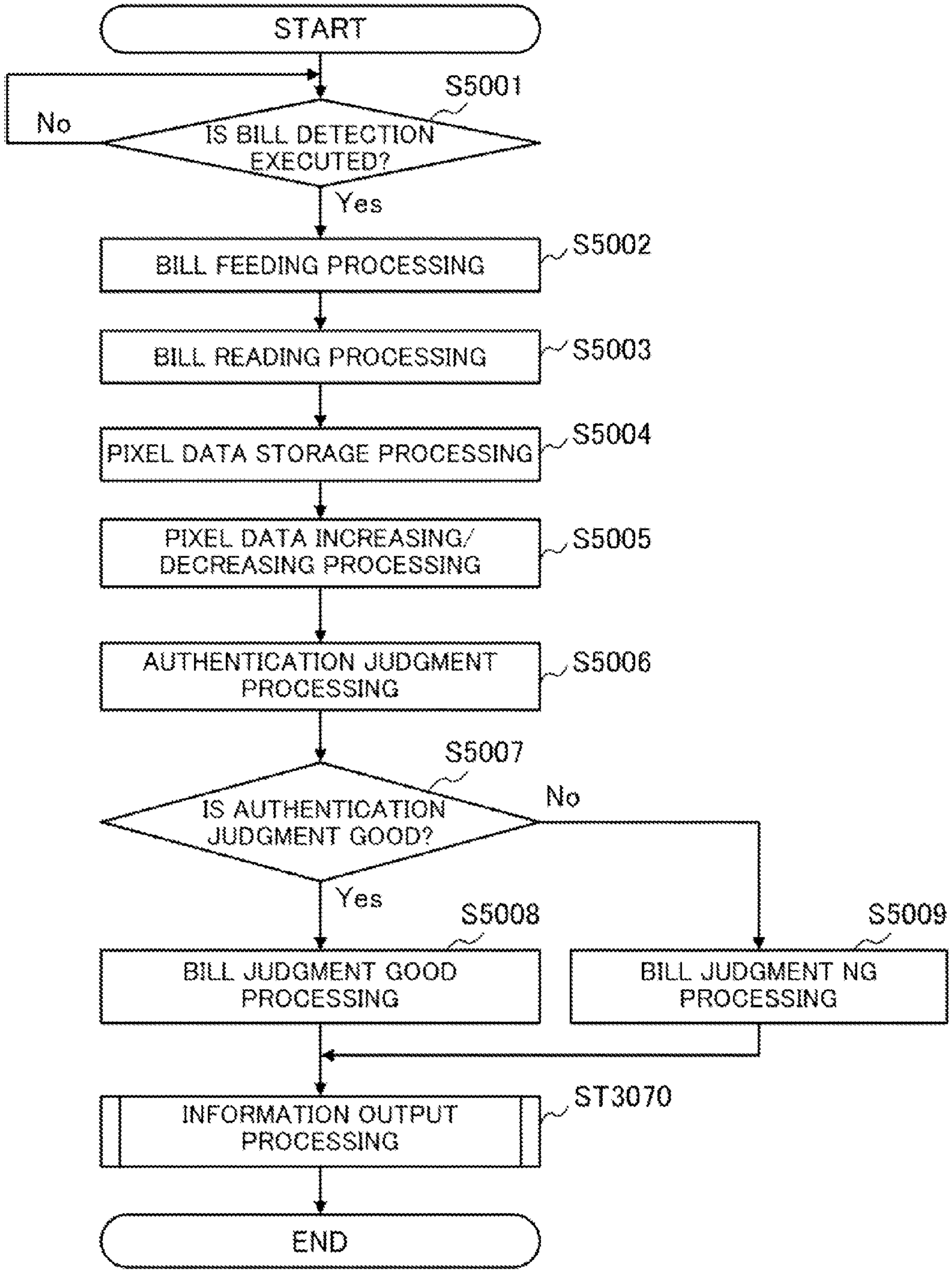
Figure 157:
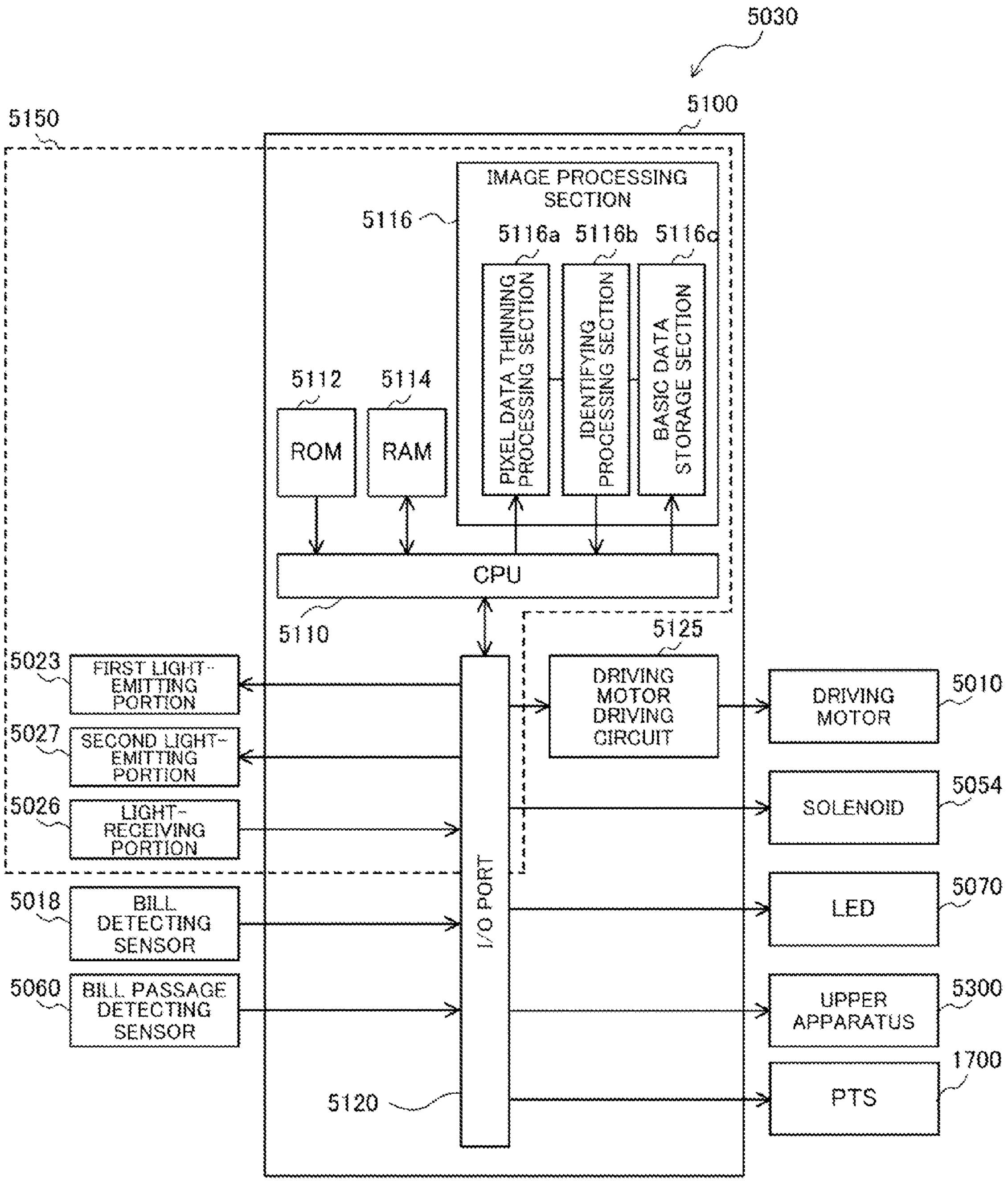
Figure 159:
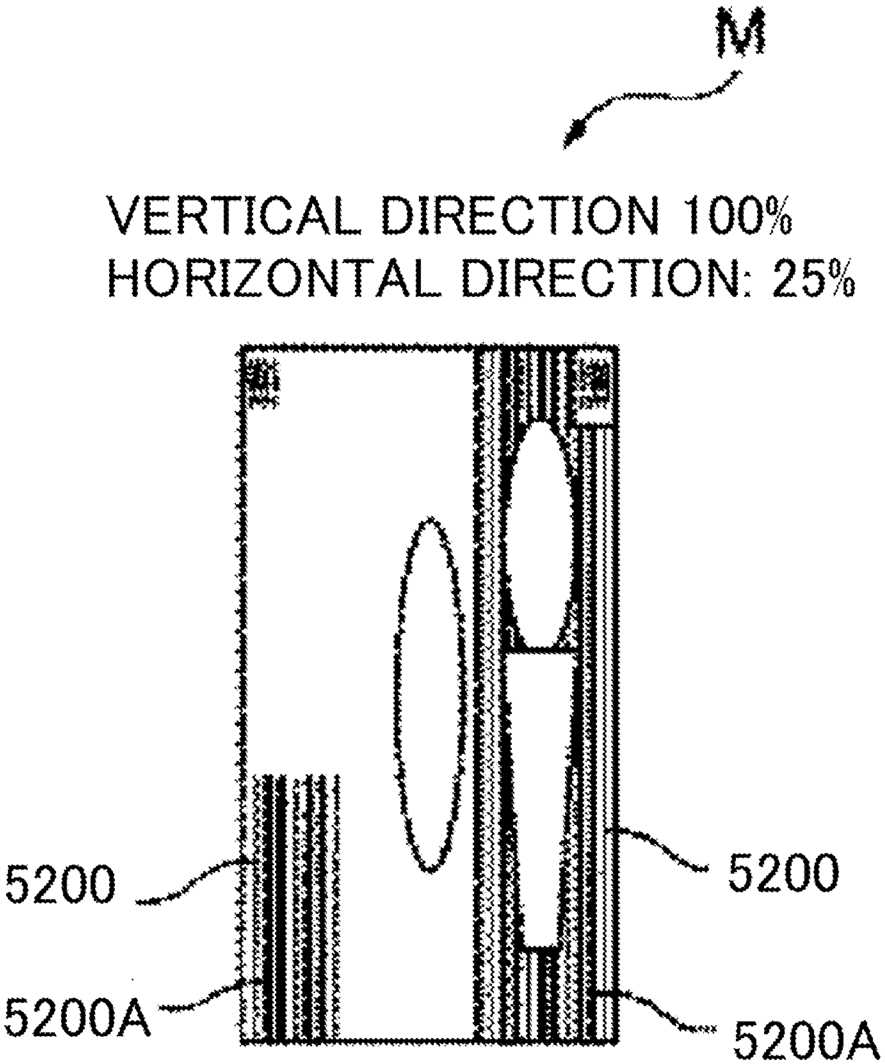
Figure 160:
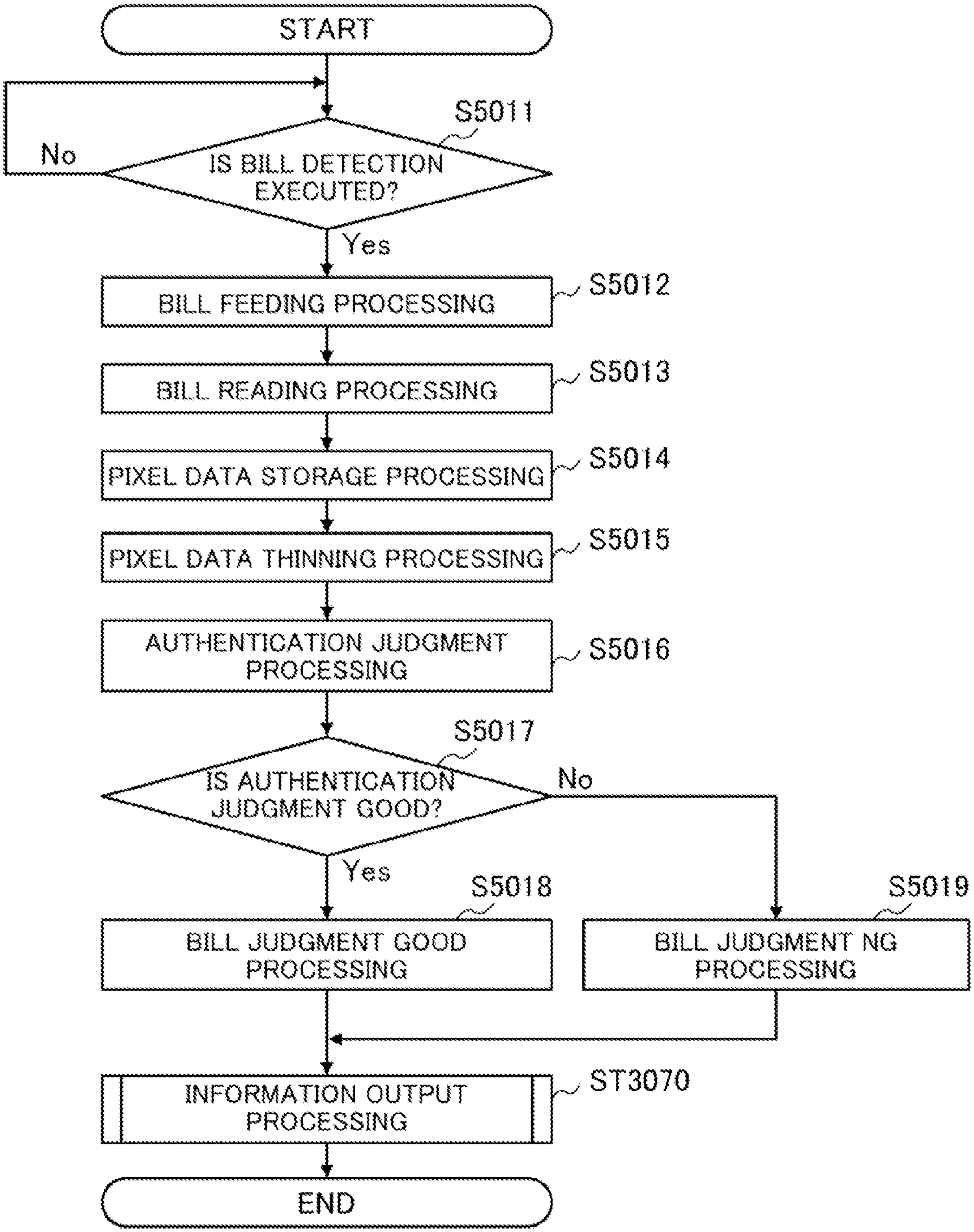
Figure 161:
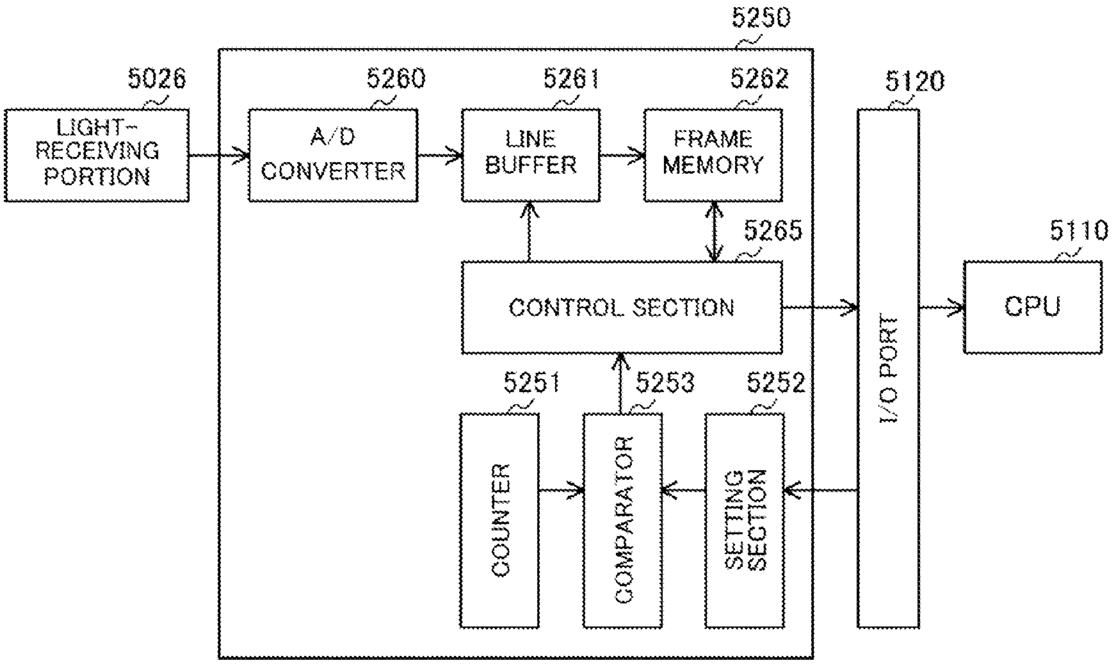

FIG. 126 is a graph showing a dispersed state of the measured data of the sampled bill in the example shown in FIG. 125;

FIG. 127 is a flowchart explaining the processing operation of a bill in the bill processing device of the third embodiment;

FIG. 128 is a flowchart explaining an authenticity determining process procedure;

FIG. 129 is a diagram showing one example of the bill identifying apparatus, which is a sheet identification device, and is a perspective view showing the entire configuration;

FIG. 130 is a perspective view showing a state where an opening/closing member is opened relative to a main body frame of the device main body;

FIG. 131 is a right-side lateral view schematically showing a transport route of a bill inserted from an insertion slot;

FIG. 132 shows lighting control of a light emission unit in the bill reading means, and is a timing chart showing the lighting control of the light emission unit when the bill is read;

FIG. 133 is a block diagram showing the configuration of the control means for controlling an operation of the bill identifying apparatus;

FIG. 134 is a flowchart explaining an authenticity determining processing operation of a bill;

FIG. 135(*a*) is a diagram showing the configuration of a bill with creasing;

FIG. 135(*b*) is a diagram showing an arrangement of pixels including color information obtained from the bill with creasing;

FIG. 136(*a*) is a diagram showing the configuration of a bill with creasing being corrected;

FIG. 136(*b*) is a diagram showing an arrangement of pixels including color information on which a correction process has been performed so as to correct the crease;

FIG. 137 is a block diagram showing the configuration of the control means for controlling an operation of the bill identifying apparatus;

FIG. 138 is a flowchart explaining an authenticity determining process of a bill;

FIG. 139 is a diagram schematically showing standard image data of a bill with a watermark being formed;

FIG. 140(*a*) is a diagram showing an arrangement of pixels including color information obtained by reflected light from the transported bill;

FIG. 140(*b*) is a diagram showing an arrangement of pixels including color information obtained by transmitted light from an authentic bill;

FIG. 141 is a diagram explaining an overview of neighborhood searching and is a diagram showing an arrangement of pixels including the color information;

FIG. 142 is a perspective view showing an entire configuration of one embodiment of a bill identifying apparatus of a fifth embodiment;

FIG. 143 is a perspective view showing a state where an upper frame is opened to a lower frame;

FIG. 144 is a plain view showing a bill transport path of the lower frame;

FIG. 145 is a backside diagram of the lower frame;

FIG. 146 is a perspective view showing the configuration of a bill detection sensor;

FIG. 147 is a diagram schematically showing the configuration of the bill identifying apparatus;

FIG. 148 is a diagram showing a schematic configuration of the bill;

FIG. 149 is a block diagram showing a control system of the bill identifying apparatus;

FIGS. 150(*a*) through 150(*e*) are diagrams each explaining one procedural example in which the pixels in image data are increased/decreased in a pixel data increase/decrease processing unit;

FIGS. 151(*a*) and 151(*b*) are diagrams each showing image data of a bill obtained after a pixel number increase/decrease process is performed;

FIG. 152 is a schematic diagram explaining a principle of generating Moire fringe (diagram explaining a condition under which the Moire fringe is not generated);

FIG. 153 is a schematic diagram explaining a principle of generating Moire fringe (diagram explaining a condition under which the Moire fringe is generated);

FIG. 154 is a diagram schematically showing a condition under which the Moire fringe is generated when a pixel number thinning-out process is performed at the time of reading the bill;

FIG. 155 is a diagram schematically showing a condition under which the Moire fringe is generated when a pixel number increase process is performed at the time of reading the bill;

FIG. 156 is a flowchart showing procedural examples of an operation process in the bill identifying apparatus and an authenticity determining process utilizing the above-described Moire data;

FIG. 157 is a block diagram showing the control system of the bill identifying apparatus;

FIGS. 158(*a*) through 158(*c*) are diagrams each explaining one procedural example in which the pixels in the image data are thinned out in the pixel data thinning-out processing unit;

FIG. 159 is a diagram showing the image data of a bill obtained after the pixel number thinning-out process is performed;

FIG. 160 is a flowchart showing procedural examples of an operation process in the bill identifying apparatus and an authenticity determining process utilizing the above-described Moire data; and FIG. 161 is a block diagram showing the configuration of changing means (image fetching cycle changing circuit for changing an image fetching cycle) for changing so that the number of pixels of the image data is decreased.

DESCRIPTION OF THE PREFERRED EMBODIMENTS

Embodiments of the present invention are described based on drawings.

[First Embodiment]

Figure 1:
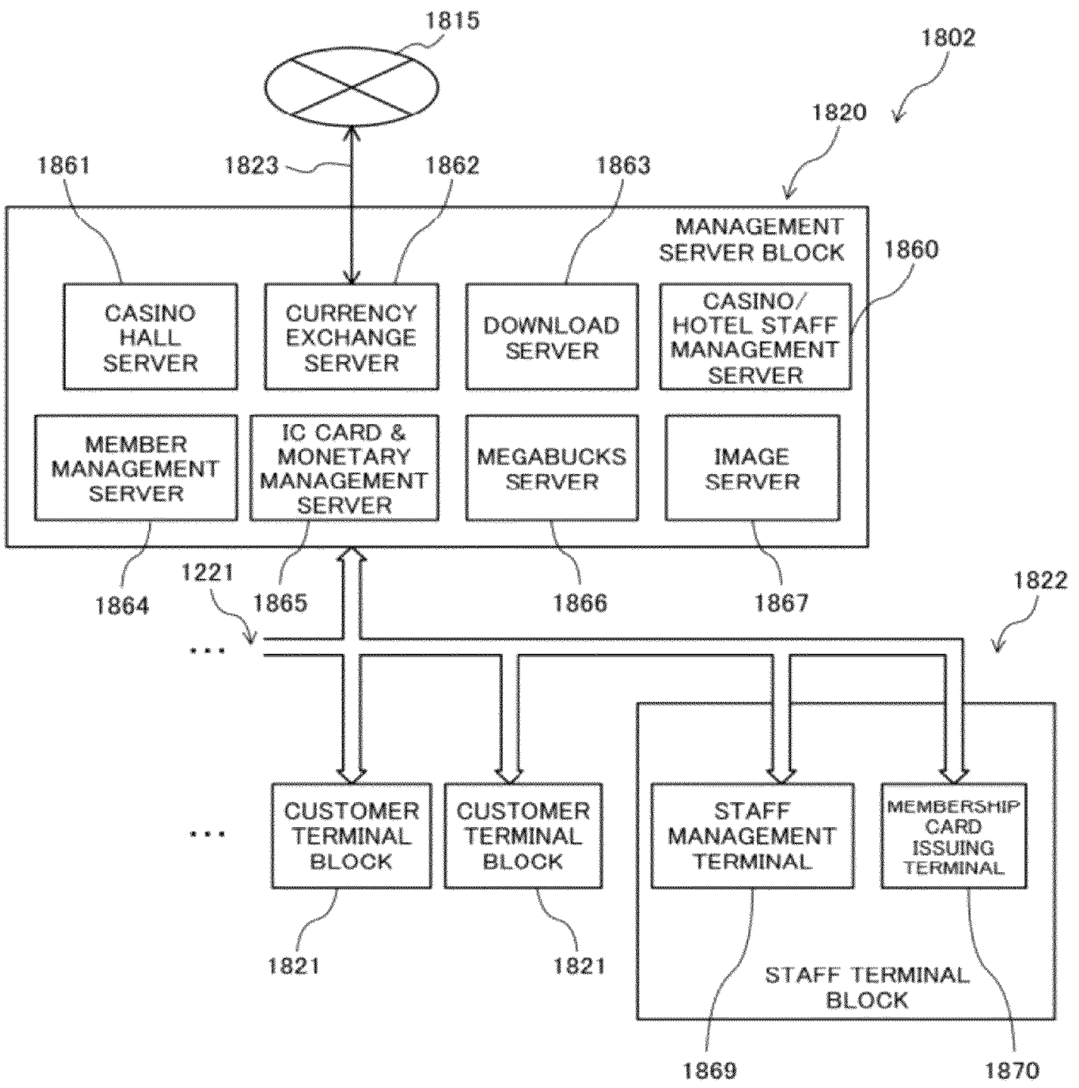
FIG. 1 is a block diagram showing a casino system including a gaming machine of the present invention.

First of all, an overview of the embodiment is presented by using FIG. 1. FIG. 1 is a diagram schematically showing the entire picture of a casino system according to the first embodiment of the present invention.

A casino system 1802 includes a management server block 2820, a customer terminal block 1821, and a staff terminal block 1822.

The management server block 2820 includes: a casino hall server 1861; a currency exchange server 2862; a casino/hotel staff management server 1860; a member management server 1864; an IC card & monetary management server 1865; a megabucks server 1866; and an image server 1867.

The casino hall server 1861 is used to compute the flow of cash within the casino and to create a lease chart, etc., and at the same time, to manage each server within the management server block 2820. The currency exchange server 2862 is used to acquire currency exchange information from outside (Internet 1815) via a communication line 1823. The casino/hotel staff management server 1860 is used to manage the attendance of the staff working at the casino or hotel, and also to grasp the current location of the staff within the casino. The member management server 1864 is used to manage personal information of members and also member information, such as past gaming results. The IC card & monetary management server 1865 is used to add up sales through cashless IC cards. The megabucks server 1866 is used to manage a cumulative value for progressive give-away and also to determine the progressive give-away. The image server 1867 is used to save and manage images of faces of the staff and players photographed through cameras installed within the casino.

Figure 2:
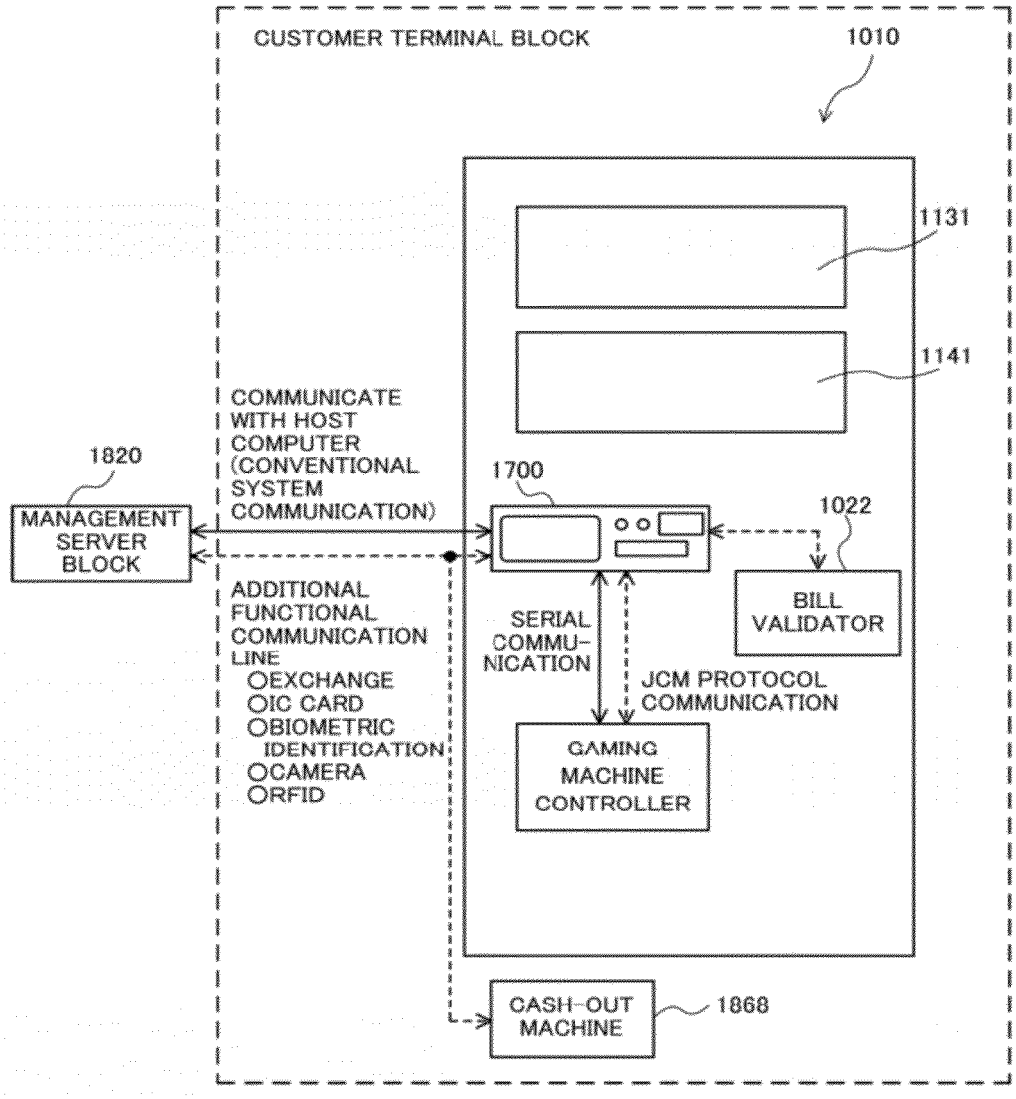
FIG. 2 is a concept diagram showing a connection state of the gaming machine.

As shown in FIG. 2, the customer terminal block 1821 includes a slot machine 1010 such as a slot machine equipped with a PTS (player tracking system) terminal 1700, and a reset machine 1868. The slot machine 1010 is connected by the management server block 2820 and the network via the PTS terminal 1700. In the present embodiment, one single PTS terminal 1700 is installed on a part of the casing of one slot machine 1010.

The staff terminal block 1822 (FIG. 1) includes a staff management terminal 1869 and a membership card issuing terminal 1870. The staff management terminal 1869 is controlled by the casino/hotel staff management server 1860. The staff management terminal 1869 sends information to a Personal Digital Assistant (PDA) (not shown) carried by the staff based on signals received from the hotel staff management server 1860, and initiates communication with the mobile telephones carried by the staff.

The membership card issuing terminal 1870 is equipped with a camera and photographs the face of the player to whom the IC card is issued during issuance of the member card (IC card). The photographed image is correlated with a customer ID and is saved in the image server 1867. Furthermore, the personal information of members entered during issuance of the member card and during member registration is correlated with the customer ID and saved in the member management server 1864.

In the present embodiment, the PTS terminal 1700 is connected to a bill validator 1022 (described later) via a communication line (or slot machine 1010).

FIG. 2 is a schematic diagram showing a configuration in which a money exchange function is integrated into the PTS terminal 1700. In this case, a player identification unit (a human body detection camera 1712 (1713), a microphone 1704 (1705), and a human body detection sensor 1115 (FIG. 12)) is installed in the PTS terminal 1700 for authentication of the player. In the PTS terminal 1700, by maintaining the conventional system communication, compatibility with the existing system can be secured, and at the same time, by having a communication line as an additional function, information related to authentication and money exchange can be added through a dedicated line. In the slot machine 1010 that is integrated with the PTS terminal 1700 as shown in FIG. 2, along with the capability of downloading various types of information from the management server block 2820 (FIG. 1), services such as megabucks, image recording, and personal rescue for individual players of the game can be provided through communication with the management server block 2820.

The bill validator 1022 can accept bills of a plurality of countries (currency), determines the denomination of the inserted bill (currency type) and money amount of the inserted bill, and outputs denomination data and money amount data representing the same. If the inserted bill cannot be identified, error data is output (described later). The currency of the country in which the PTS terminal 1700 (slot machine 1010) is installed is previously stored in the PTS terminal 1700, and based on the denomination data and money amount data output from the bill validator 1022, the PTS terminal 1700 converts the data into the currency value of the country in which the PTS terminal 1700 is installed (described later). A bill processing device 3001 described later with regard to FIG. 101 can be used as the bill validator 1022.

For example, if the country where the PTS terminal 1700 (slot machine 1010) is installed is US, and the bill of Japan is inserted in the bill validator, conversion (exchange) to America currency is performed by the PTS terminal 1700 based on the currency exchange rate. The converted currency amount data indicating the converted currency amount (exchange) is sent from the PTS terminal 1700 to the gaming machine. Therefore, the player can enjoy playing games on the gaming system by using the currency of countries other than America. The converted (exchanged) currency amount is equivalent to a currency amount obtained by subtracting a currency amount equal to a predetermined commission charge (hereinafter also called the exchange commission) from the currency amount prior to conversion (exchange).

The money exchange commission data indicating the currency amount equal to a money exchange commission is sent from the PTS terminal 1700 to the megabucks server 1866. Based on the currency amount indicated by the received money exchange commission data, the megabucks server 1866 updates the cumulative value for bonus. When the cumulative value for bonus reaches a specific value, coins are paid out to any one gaming machine as a jackpot. In this way, in the present embodiment, the bonus calculated by assuming the money exchange commission as the source fund is granted.

Figure 3:
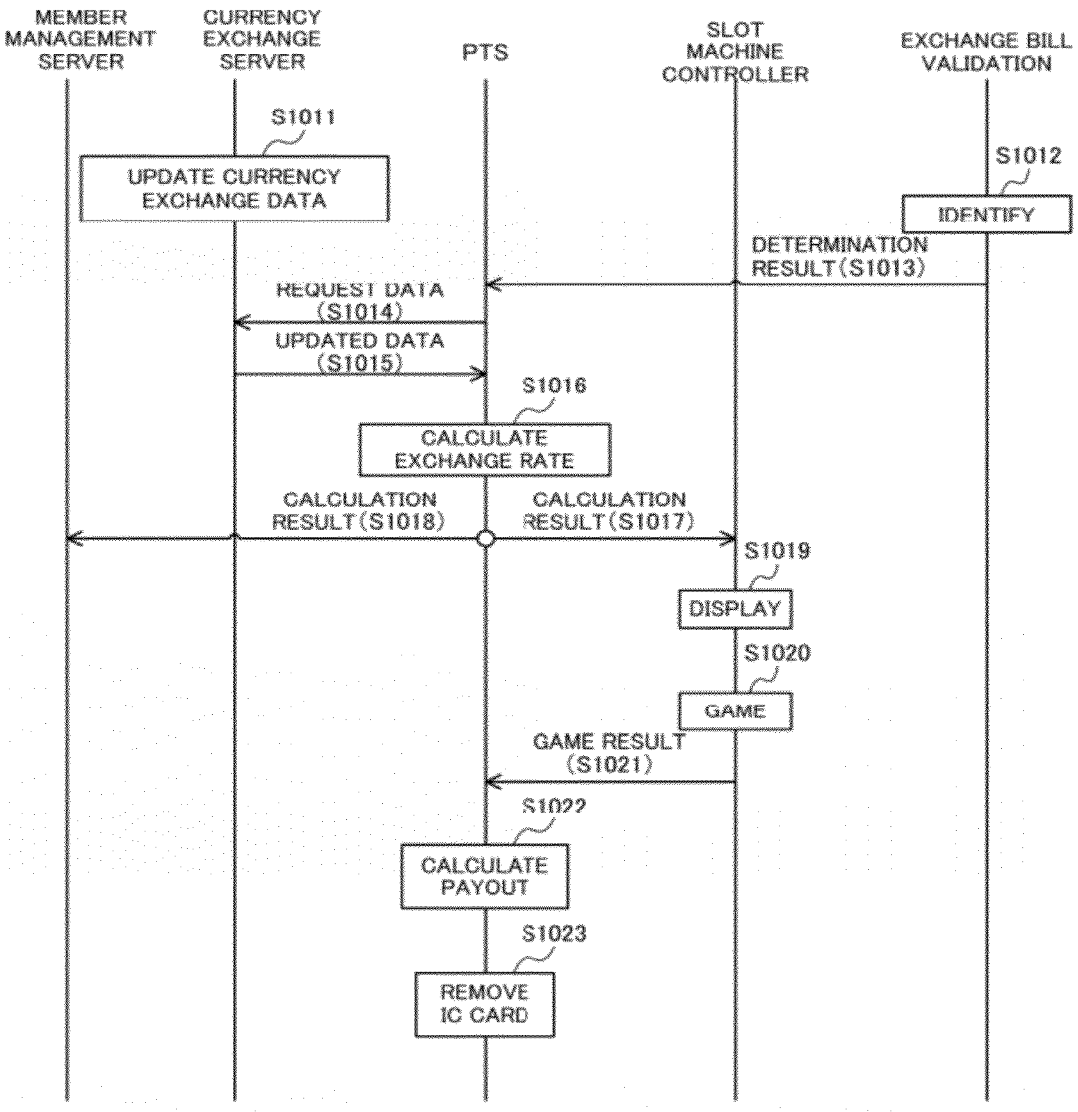
FIG. 3 is a timing chart of the game system.

FIG. 3 is a timing chart showing a process procedure in the casino system. As shown in FIG. 3, in the casino system 1802 of the present embodiment, the currency exchange server downloads the currency exchange data from the Internet 1815, and updates the currency exchange data stored in the memory within the currency exchange server 2862. Thus, the most recent current exchange data is always stored in the currency exchange server 2862.

On the other hand, when bill is inserted in the bill validator 1022 and the denomination and money amount is identified, the denomination data and money amount data are sent to the PTS terminal 1700 as identification result (step S1013). The identification result is saved in a memory of the PTS terminal 1700.

The PTS terminal 1700 periodically requests the currency exchange server 2862 for the currency exchange data, (step S1014), and in response, the currency exchange server 2862 sends the updated currency exchange data to the PTS terminal 1700 (step S1015).

Based on the updated currency exchange data, the PTS terminal 1700 performs rate calculation for conversion of the identification results sent from the bill validator 1022 to money amount data in local currency (step S1016). The PTS terminal 1700 further converts the money amount data obtained from the rate calculation and converted into the local currency to credit data for the game, and sends it to the gaming machine controller as calculation result (step S1017). The PTS terminal 1700 sends the money amount data obtained from rate calculation and converted to local currency to the IC card & monetary management server 1865 (step S1018).

The gaming machine controller displays the calculation results on a display unit (described later) (step S1019), and executes the game based on the money amount converted to the entered local currency value. The game results are sent from the gaming machine controller to the PTS terminal 1700 (step S1021), the payout calculation is performed based on the game results in the PTS terminal 1700 (step S1022), and the money amount to be paid out to the player is determined. In the PTS terminal 1700, this determined money amount is written on the IC card directly as the money amount data converted to the local currency, and this IC card is ejected (step S1023). When the IC card containing the stored money amount data is inserted in the PTS terminal 1700 by the player, the money amount data obtained from the game result is added to the money amount data of the inserted IC card and is thus updated.

Furthermore, by storing the money amount data obtained from the calculation results sent from the PTS terminal 1700 (step S1018) along with the current information for identifying the player playing on the slot machine 1010 on which the PTS terminal 1700 is installed, the IC card & monetary management server 1865 always manages the correspondence between the player and the money amount inserted in the PTS terminal 1700.

Figure 4:
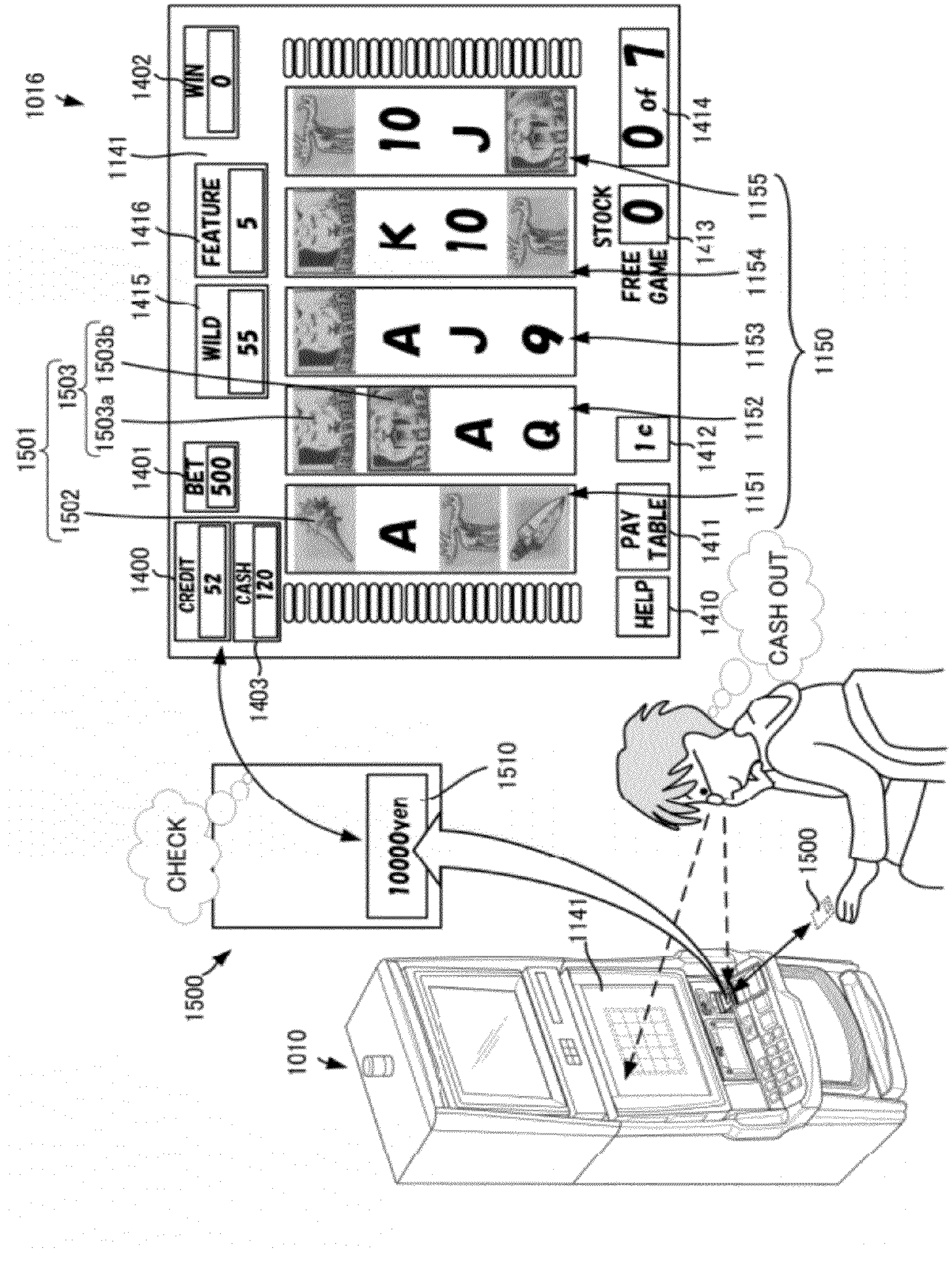
FIG. 4 is an explanatory view showing the overview of a slot machine according to an embodiment of the present invention.

FIG. 4 is an explanatory drawing showing an overview of the gaming machine (slot machine) 1010. Hereinafter, the explanation is based on the use of a slot machine as the gaming machine but the present invention is not limited to a slot machine and can be applied to gaming machines for playing various games.

As shown in FIG. 4, the slot machine 1010 of the present invention displays a display window 1150 including five columns of simulated reels 1151 to 1155 in a lower image display panel 1141 installed in a symbol display device 1016. A plurality of symbols 1501 is arranged on each of the simulated reels 1151 to 1155, and these reels rotate when operated by the player. The slot machine 1010 executes the so-called slot game of granting a payout in accordance with the predetermined action based on the positioning of a symbol 1501 when the rotated simulated reel 1151 to 1155 comes to a stop. The plurality of symbols 1501 are described later.

A credit amount display unit 1400 is displayed on top of the display window 1150 that displays the current credit amount. Here, “credit” is an imaginary playing medium related to the game that is used when a player performs a bet. The total number of credits currently owned by the player is displayed in the credit amount display unit 1400.

A broken number cash display unit 1403 is displayed at the bottom of the credit amount display unit 1400. The broken number cash is displayed in the broken number cash display unit 1403. “Broken number cash” refers to the cash that was not converted to credit because the inserted money amount was not any worth.

Here, in the present embodiment, the cash inserted from the PTS terminal 1700, as described later, is converted to credit by the PTS terminal 1700 by using the currency exchange rate data and denomination data. For example, based on the currency exchange information within the currency exchange rate data, one dollar is set as 95 yen, and based on the credit conversion rate within the denomination data, one credit is set as two dollars. At this point, if the cash inserted from the PTS terminal 1700 is 10000 yen in Japanese currency, the PTS terminal 1700 first of all converts the 10000 yen to 105 dollars and 25 yen. Next, the 105 dollars are converted to 52 credits and one dollar. Thus, the 10000 yen inserted from the PTS terminal 1700 will be converted to 52 credits and 120 yen. Here, 120 yen is the total of the broken number money based on dollar conversion and credit conversion, and the broken number cash data including the information about this broken number money is stored in the IC card & monetary management server 1865 of the management server block 2820. The IC card & monetary management server 1865 of the management server block 2820 accumulates and records the broken number cash data for each identification code owned by each IC card 1500 as described later.

Here, “IC card 1500” refers to a card in which an IC (Integrated Circuit) is incorporated for the purpose of recording and computing various data, such as credit data. By using an IC card 1500, a player can own credit-related data, and can freely use the IC card in different slot machines. Credit-related data implies data that at least includes cash data in the local currency unit and the identification code. Thus, by inserting the IC card 1500 in the PTS terminal 1700 of the slot machine 1010, the player can use the money amount data stored in the IC card 1500 for playing on the slot machine 1010.

A player can also accumulate cash such as coins and bill in the IC card 1500 in the form of cash data from the machines installed in the game arcade.

Also a display unit 1510 is provided in the IC card 1500 of the present embodiment, and by inserting the IC card 1500 in the slot machine 1010, the player can check the money amount data accumulated in the IC card 1500 during resetting. Furthermore, the money amount data accumulated in the IC card 1500 owned by the player is converted to credits and displayed in the credit amount display unit 1400 on the lower image display panel 1141 installed in the slot machine 1010. In other words, the player can check the amount of money he/she owns from the credit amount display unit 1400 of the slot machine 1010 and also from the display unit 1510 of the IC card 1500.

For example, as shown in FIG. 4, when the player resets the credit, the IC card 1500 inserted inside the slot machine 1010 is ejected up to a point where the player can easily extract the card. At this point, the display unit 1510 is exposed to the extent where it can be seen by the player. In the exposed display unit 1510, the “10000 yen”, which is the total amount of money owned by the player after the current resetting, is displayed. Also, in the lower image display panel 1141, the result of conversion of the “10000 yen” to credit, that is, the credit amount (“52” from the credit amount display unit 1400) and broken number cash (“120” from the broken number cash display unit 1403) is displayed. Following this, when the player completely removes the IC card 1500, the display on the display unit 1500, credit amount display unit 1400, and broken number cash display unit 1403 is erased. The broken number cash displayed in the broken number cash display unit 1403 may be in the local currency unit or in a specific common unit.

Also, instead of completely inserting the IC card 1500 into the slot machine 1010, it can be inserted to the extent where the display unit 1510 is exposed, and the player can play the game while checking the stage of usage of the credit within the IC card 1500. The cash data displayed in the display unit 1510 immediately after updating the credit can be updated and displayed.

Here, in the display writing IC 1505 (described later) installed in the IC card 1500, the credit-related data including information such as cash data is stored. As described earlier, “credit-related data” implies data related to credit, and in the present embodiment, it includes at least the cash data and identification code. This credit-related data is also used as display data for displaying the credit amount in the display unit 1510.

In this way, due to the display of the credit data of the display writing IC 1505 in the display unit 1510, the IC card

1500 of the present embodiment visually recognizes the credit-related data stored in the display writing IC 1505 from outside. Therefore, when the credit-related data of the display writing IC 1505 is rewritten by the slot machine 1010, the rewritten credit-related data can be checked from the display of the display unit 1510. Also, due to the fact that the credit-related data of the display writing IC 1505 that is rewritten by the slot machine 1010 is used for display of the display unit 1510, the credit-related data stored in the same storage unit is set to a state where it is used for both update and display by the slot machine 1010. Thus, in comparison to the case when the credit-related data of the storage unit is transported to another storage unit as data for display, and is stored and displayed as data for display in the other storage unit along with the update of the credit-related data of the storage unit, data mismatch due to generation of noise during data transport is prevented, and the credit data can be displayed in the display unit 1510 with high reliability.

Because the updated data can be checked from the display of the display unit 1510 immediately after it is updated by an external device, a sense of security can be achieved by being able to check the data of the IC card 1500 at all times during the game.

The symbols 1501 include "specific symbols 1503" and "regular symbols 1502", as shown in FIG. 4. That is, the "symbols 1501" is a superordinate conception of the specific symbols 1503 and regular symbols 1502. The specific symbols 1503 include wild symbols 1503*a* and trigger symbols 1503*b*. Each of the wild symbols 1503*a* is a symbol substitutable for any type of symbols 1501. Each of the trigger symbols 1503*b* is a symbol which triggers at least a bonus game. That is, a trigger symbol 1503*b* triggers transition from the regular game to the bonus game, and triggers stepwise increases in the number of specific symbols 1503 at an interval from the start of the bonus game. Further, the trigger symbol 1503*b* triggers increases in the number of specific symbols 1503 in the bonus game, that is, the trigger symbol 1503*b* triggers increases in the number of trigger symbols 1503*b* and/or wild symbols 1503*a*. Note that the trigger symbol 1503*b* may trigger an increase in the number of games in the bonus game.

The "bonus game" has a same meaning as a "feature game." In the present embodiment, the bonus game is a game in which free games are repeated. However, the bonus game is not particularly limited and may be any type of game, provided that the bonus game is more advantageous than the regular game for a player. Another bonus game may be adopted in combination, provided that a player is given more advantageous playing conditions than the regular game. For example, the bonus game may be a game that provides a player with a chance of winning more game values than the regular game or a game that provides a player with a higher chance of winning game values than the regular game. Alternatively, the bonus game may be a game that consumes fewer amounts of game values than the regular game. In the bonus game, these games may be provided alone or in combination.

The "free game" is a game runnable with a bet of fewer game values than the regular game. Note that "bet of fewer amounts of game values" encompasses a bet of zero game value. The "free game" therefore may be a game runnable without a bet of a game value, which free game awards an amount of game values based on symbols 1501 rearranged. In other words, the "free game" may be a game which is started without consumption of a game value. To the contrary, the "regular game" is a game runnable on condition that a game value is bet, which regular game awards an amount of game value based on the symbols 1501 rearranged. In other words, the "regular game" is a game which starts with consumption of a game value.

The expression "rearrange" in this specification means dismissing an arrangement of symbols 1501, and arranging symbols 1501 once again. "Arrangement" means a state where the symbols 1501 can be visibly confirmed by a player.

(Functional Flow of the Gaming Machine)

The basic functions of the slot machine 1010 according to the present embodiment are explained with reference to FIG. 5.

Figure 5:
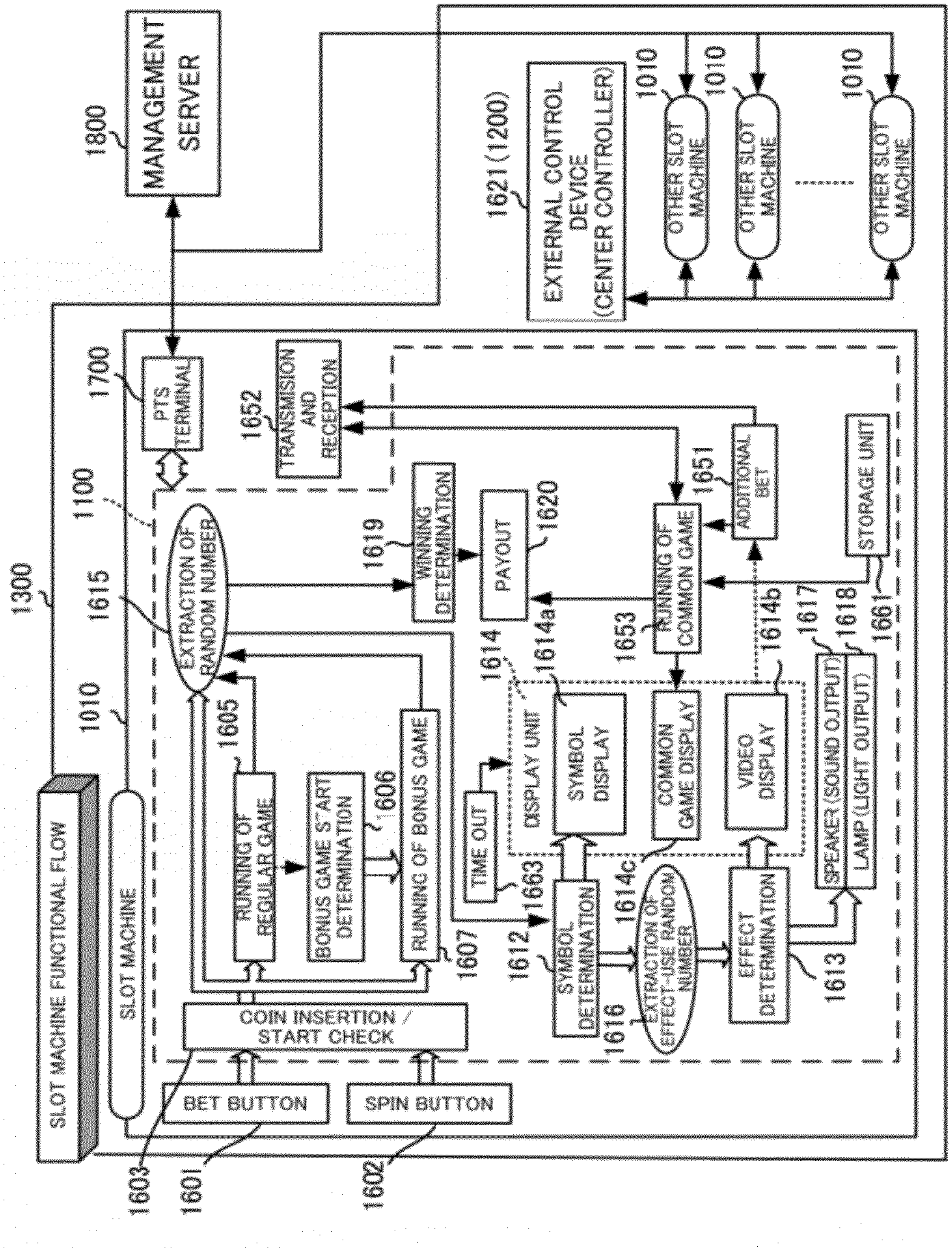
FIG. 5 is a diagram showing a functional flow of the gaming machine according to the embodiment of the present invention.

The slot machines 1010 has an external control device 1621 (center controller 1200) connected to the slot machine 1010 so as to allow data communication therebetween, as shown in FIG. 5. The external control device 1621 is connected to the slot machines 1010 installed in a hall so as to allow data communication therebetween.

The slot machines 1010 each include a bet button unit 1601, a spin button unit 1602, a display unit 1614, and a game controller 1100 which controls these units. Note that the bet button unit 1601 and the spin button unit 1602 each are a kind of an input device. Further, the slot machine 1010 includes a send-receive unit 1652 which enables data communication with the external control device 1621.

The bet button unit 1601 has a function of accepting a bet amount through a player's operation. The spin button unit 1602 has a function of accepting a start of a game such as regular game through a player's operation, that is, a start operation. The display unit 1614 has a function of displaying still-image information and moving-image information. Examples of the still-image information are various types of symbols 1501, numeral values, and signs. Examples of the moving-image information include effect video. Further, the display unit 1614 has a touch panel 1069 as an input device, and has a function which accepts various commands inputted through a player's push operation. The display unit 1614 has a symbol display region 1614*a*, a video display region 1614*b*, and a common game display region 1614*c*. The symbol display region 1614*a* displays symbols 1501, as shown in FIG. 1. The video display region 1614*b* displays various types of effect video information to be displayed during a game, in the form of a moving image or a still image. The common game display region 1614*c* is a region where a common game such as a jackpot game is displayed. Note that the common game display region 1614*c* may be formed with the symbol display region 1614*a* and a video display region 1614*b*. The common game display region 1614*c* may appear only when the common game is run, in replacement of the symbol display region 1614*a* or the video display region 1614*b*.

The game controller 1100 includes: a coin insertion/start-check unit 1603; a regular game running unit 1605; a bonus game start determination unit 1606; a bonus game running unit 1607; a random number extraction unit 1615; a symbol determination unit 1612; an effect-use random number extraction unit 1616; an effect determination unit 1613; a speaker unit 1617; a lamp unit 1618; a winning determination unit 1619; and a payout unit 1620.

The regular game running unit 1605 has a function of running a regular game on condition that the bet button unit 1601 has been operated. The bonus game start determination unit 1606 determines whether to run a bonus game, based on a combination of rearranged symbols 1501 resulted from the regular game. In other words, the bonus game start determination unit 1606 has functions of: (i) determining that the player is entitled to a bonus game when one or more trigger symbols 1503*b* rearranged satisfy a predetermined condition;

and (b) activating the bonus game running unit 1607 so as to run a bonus game from the subsequent unit game.

Note that a unit game includes a series of operations executed within a period between a start of receiving a bet and a point where a winning may be resulted. For example, bet reception, rearrangement of symbols 1501 having been stopped, and a payout process to award a payout are executed once each within a single unit game of the regular game. Note that a unit game in a regular game is referred to as a unit regular game.

The bonus game running unit 1607 has a function of running a bonus game which repeats free games for a plurality of times equivalent to the number of games, merely in response to an operation on the spin button unit 1602.

The symbol determination unit 1612 has functions of: determining symbols 1501 to be rearranged with a random number given from the random number extraction unit 1615; rearranging the determined symbols 1501 in the symbol display region 1614*a* of the display unit 1614; outputting information on rearrangement of the rearranged symbols 1501 to the winning determination unit 1619; adding the increased specific symbols 1503 as part of symbols 1501 used for symbol determination; replacing part of or the entire symbols 1501 used for symbol determination with part of or the entire specific symbols 1503; outputting an effect designation signal to the effect-use random number extraction unit 1616, based on the rearrangement of the symbols 1501.

The effect-use random number extraction unit 1616 has functions of: when receiving the effect instruction signal from the symbol determination unit 1612, extracting an effect-use random number; and outputting the effect-use random number to the effect determination unit 1613. The effect determination unit 1613 has functions of: determining an effect by using the effect-use random number; outputting video information on the determined effect in the video display region 1614*b* of the display unit 1614; outputting audio and illumination information on the determined effect to the speaker unit 1617 and the lamp unit 1618, respectively.

The winning determination unit 1619 has functions of: determining whether a winning is achieved when information on symbols 1501 rearranged and displayed on the display unit 1614 is given; calculating an amount of payout based on a winning combination formed when it is determined that a winning has been achieved; outputting to the payout unit 1620 a payout signal which is based on the amount of payout. The payout unit 1620 has a function of paying out a game value to a player in the form of a coin, a medal, a credit, or the like. Further, the payout unit 1620 has a function of adding credit data to credit data stored on an IC card 1500 inserted into a later-described PTS terminal 1700, the credit data to be added corresponding to the credit to be paid out.

Further, the game controller 1100 has a storage unit 1661 which stores therein various types of bet amount data. The storage unit 1661 is a device which re-writably stores data in a hard-disk device, a memory, or the like. The timeout part 1663 has the function of displaying the non-input time when the start operation of the spin button 1602 is not input, together with the timeout period on the display 1614.

Further, the game controller 1100 has a common game running unit 1653, an additional bet unit 1651, and a game mode selection unit 1662. The additional bet unit 1651 has a function of allowing a bet increase through the touch panel 1069 of the display unit 1614, at the start of a common game or when no win or loss is resulted from a common game.

The common game running unit 1653 has functions if: accepting a bet input through the bet button unit 1601, based on a bet amount stored in the storage unit 1661 and corresponding to common game bet amount data indicating a bet amount bettable on the common game; executing the regular game after a bet input is completion, and then outputting bet amount information to the external control device 1621 for each unit base game, the bet amount information being based on a bet amount placed as a bet on a regular game; running a common game in response to a game start command from the external control device 1621; accepting a bet input through the bet button unit 1601, based on a bet amount stored in the storage unit 1661 and corresponding to common game bet amount data indicating a bet amount bettable on the common game.

Further, the game controller 1100 is connected to the PTS terminal 1700. The PTS terminal 1700 is a unit where an LCD 1719, microphones 1704 and 1705, human body detection cameras 1712 and 1713 are integrally configured. The PTS terminal 1700 has a function of communicating with the game controller 100 to execute a game effect, for example. Particularly, the PTS terminal 1700 is provided with a card insertion slot 1706, where an IC card 1500 can be inserted. Thus allows a player to use a credit stored on an IC card 1500 at a slot machine 1010, by inserting the IC card 1500 into the card insertion slot 1706. Note that a mechanical structure of the PTS terminal 1700 is detailed later.

Further, when receiving credit data from the PTS terminal 1700, the game controller 100 updates a credit display on the display unit 1614.

Further, when a cash out occurs, the game controller 1100 outputs cash-out credit data to the PTS terminal 1700.

Further, the PTS terminal 1700 of each of the slot machines 1010 is connected in communication with a management server block 2800, which performs central management of image downloading, IC cards 1500, and credits.

(Operations of Slot Machine 1010)

The basic operations of the slot machine 1010 having the above-mentioned functions are described below.

(Coin Insertion/Start Check)

First, the slot machine 1010 checks whether the BET button 1601 and the spin button 1602 are sequentially pushed by a player in this order.

(Symbol Determination)

Next, when the player presses the spin button 1602, the slot machine 1010 extracts a random number value for symbol determination. Then, for each of the plurality of video reels displayed on the display 1614, the slot machine 1010 determines symbols 1501 to be presented to the player when scrolling of symbol columns is stopped.

(Symbol Display)

Next, the slot machine 1010 starts scrolling a symbol column of each video reel, and stops the scroll so that the symbols 1501 determined are presented to the player.

(Winning Determination)

Next, when the symbol column of each video reel stops scrolling, the slot machine 1010 determines whether a combination of the symbols 1501 presented to the player yields a winning.

(Paying Out)

Next, when a combination of the symbols 1501 presented to the player yields a winning, the slot machine 1010 awards the player a benefit according to the combination of the symbols 1501.

For instance, when a combination of symbols 1501 is displayed which awards a payout of one or more coins to the player, the slot machine 1010 pays out the number of coins according to the combination of symbols 1501.

The slot machine 1010 starts a bonus game when a combination of trigger symbols 1503*b* leading to a bonus game trigger is displayed. In the present embodiment, instead of consumption of coins for the bonus game, a game (free game) that is played through lottery for a predetermined number of times leading to determination of the earlier-mentioned stop proposed symbols is assumed as the bonus game.

When a combination of symbols 1501 leading to the jackpot trigger is displayed, the slot machine 1010 pays out the jackpot amount to the player. The jackpot is a function of accumulation of a part of the coins consumed by the players in each slot machine 1010 as the jackpot amount, and then paying out the accumulated jackpot amount to the slot machine 1010 on which the jackpot trigger is realized.

The slot machine 1010 calculates the amount (cumulative amount) accumulated in the jackpot amount for each game, and sends it to the external control device 1621. The external control device 1621 keeps accumulating the cumulative amount sent from each slot machine 1010 in the jackpot amount.

Furthermore, apart from the above-mentioned benefits, other benefits such as mystery bonus and insurance are provided in the slot machine 1010.

Mystery bonus refers to paying out of a predetermined amount due to winning a special lottery prize. When the spin button is pressed, the slot machine 1010 extracts a random number value for mystery bonus, and determines whether the mystery bonus is realized by a lottery.

Insurance is a function that is provided with the purpose of rescuing a player from a situation where a bonus game has not been played for a long time. In the present embodiment, the player can select upon his/her wish whether or not to enable the insurance function. Insurance is enabled in exchange for a predetermined insurance accession amount.

When insurance is enabled, the slot machine 1010 starts the game frequency count. Instead of paying out large amounts due to bonus games, the slot machine 1010 pays out the amount set for insurance when the game frequency count reaches the predetermined number.

When paying out the cash dividend in various games, the slot machine 1010 pays out the cash dividend converted into credit by performing rewrite update of the credit data stored in IC card 1500 inserted in the PTS terminal 1700.

(Effect Determination)

The slot machine 1010 executes an effect through the display of images from display 1614, output of light from lamp 1111, and output of sound from speaker 1112. The slot machine 1010 extracts an effect-use random number value, and then based on symbols 1501 determined by a lottery, determines the effect.

(Overall Gaming System)

The basic functions of the slot machine 1010 are as described above. Next, the game system 1350, including the slot machines 1010, is described. The game system 1350 constitutes a part of the casino system 1802.

The game system 1350 is equipped with a plurality of slot machines 1010 and an external control device 1621 connected via each slot machine 1010 and communication line 1301.

The external control device 1621 is for controlling the slot machines 1010. In the present embodiment, the external control device 1621 is a so-called hall server installed in a game arcade where the plurality of slot machines 1010 are provided. Each slot machine 1010 is allotted a unique identification number. The external control device 1621 distinguishes an origin of data transmitted from each slot machine 1010. Further, the external control device 1621 determines transmission destination of data with the identification number when transmitting data to a slot machine 1010.

Note that the gaming system 1350 may be installed in one game arcade where various games take place such as a casino, or between a plurality of game arcades. In a case of the gaming system 1350 being installed in one game arcade, gaming systems 1350 may be provided for each floor or each unit of the game arcade. The communication line 1301 may have a wired or wireless structure. A dedicated line or exchange line may be employed as the communication line 1301.

Figure 7:
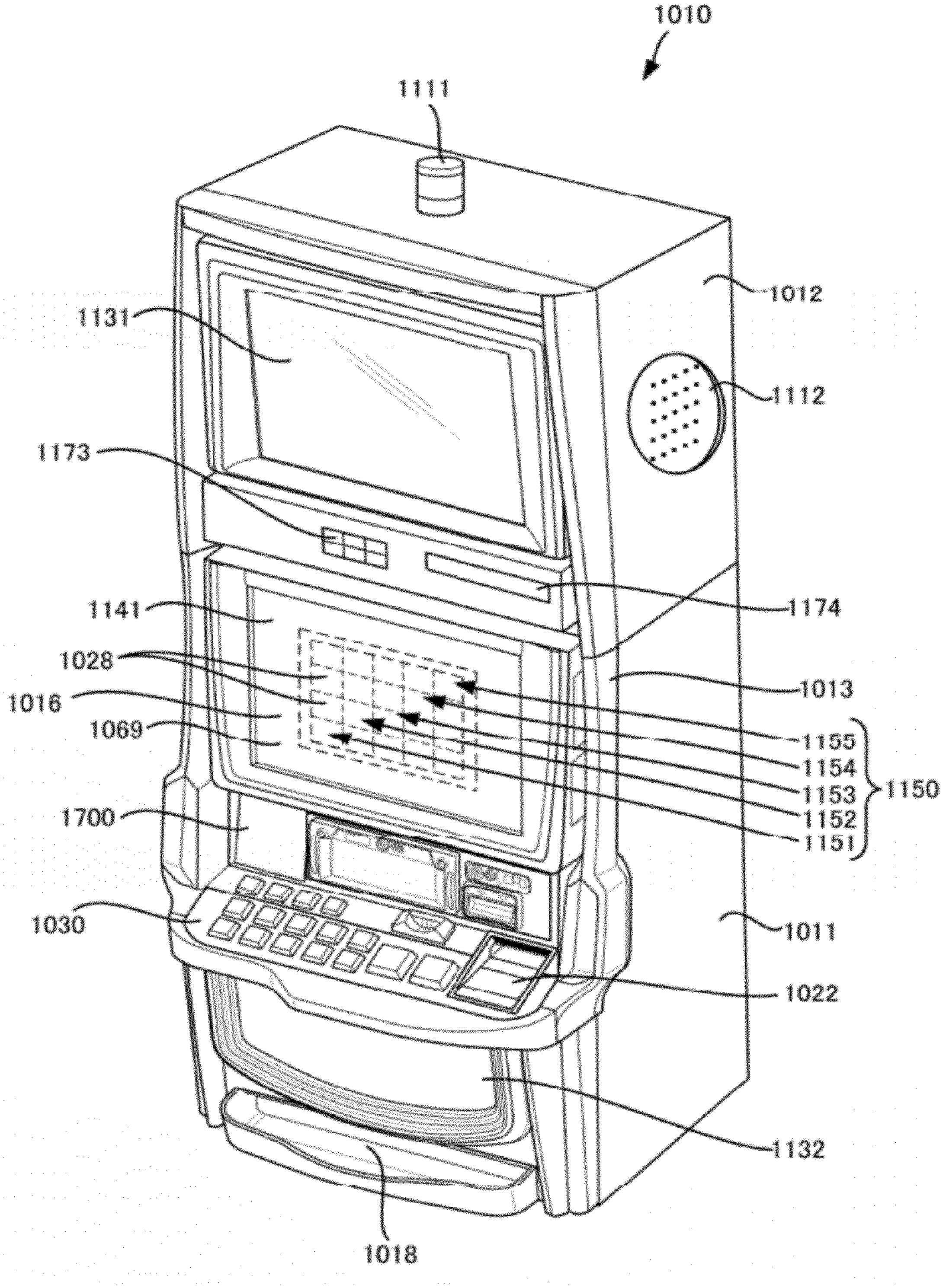
FIG. 7 is a diagram showing the entire configuration of the slot machine according to the embodiment of the present invention.

Next, FIG. 7 is a drawing showing a block image of the PTS system in the slot machine 1010 according to the embodiment of the present invention.

As shown in FIG. 7, the PTS terminal 1700 provided to a slot machine 1010 is connected in communication with the game controller 1100 and a bill validation controller 1890 of the slot machine 1010.

Through communication with the game controller 1100, the PTS terminal 1700 executes an effect of a game with a sound or an image, updates credit data, and the like. Further, through communication with the bill validation controller 1890, the PTS terminal 1700 transmits credit data necessary for a cash-out.

Further, the PTS terminal 1700 is connected in communication with the management server block 2820. The PTS terminal 1700 communicates with the management server block 2820 through the two lines: a general communication line and an additional functional communication line.

Through the general communication line, the PTS terminal 1700 communicates data such as gash data, identification code data, player membership information, and the like. Meanwhile, through the additional functional communication line, the PTS terminal 1700 executes communication related to an additional function. In the present embodiment, through the additional functional communication line, the PTS terminal 1700 executes communication related to an exchange function, and IC card function, a biometric identification function, a camera function, a RFID (Radio Frequency Identification) function which is for executing a solid-matter identification function with radio wave.

(Functional Structure of Slot Machine)

Next, the following describes an entire structure of a slot machine 1010 with reference to FIG. 7.

At a slot machine 1010, a coin, bill, or electronic valuable information corresponding to these are utilized as game medium. Specifically, credit-related data such as cash data stored on the IC card 1500 is utilized in the present embodiment.

The slot machine 1010 has a cabinet 1011, a top box 1012 provided above the cabinet 1011, and a main door 1013 provided on the front face of the cabinet 1011.

The main door 1013 has the symbol display device 1016 which is also referred to as a lower image display panel 1141. The symbol display device 1016 is made of a transparent liquid crystal panel. A screen displayed on the symbol display device 1016 has display windows 1150 at its center portion. The display window 1150 includes twenty display blocks 1028 which are arranged in five columns and four rows. The columns form simulated reels 1151 to 1155, each having four display blocks 1028. The four display blocks 1028 in each of the simulated reels 1151 to 1155 are displayed as if all the display blocks 1028 are moving downward at various speeds. This enables rearrangement, in a manner that symbols 1501 respectively displayed in the display blocks 1028 are rotated in a longitudinal direction and stopped thereafter.

Figure 42:
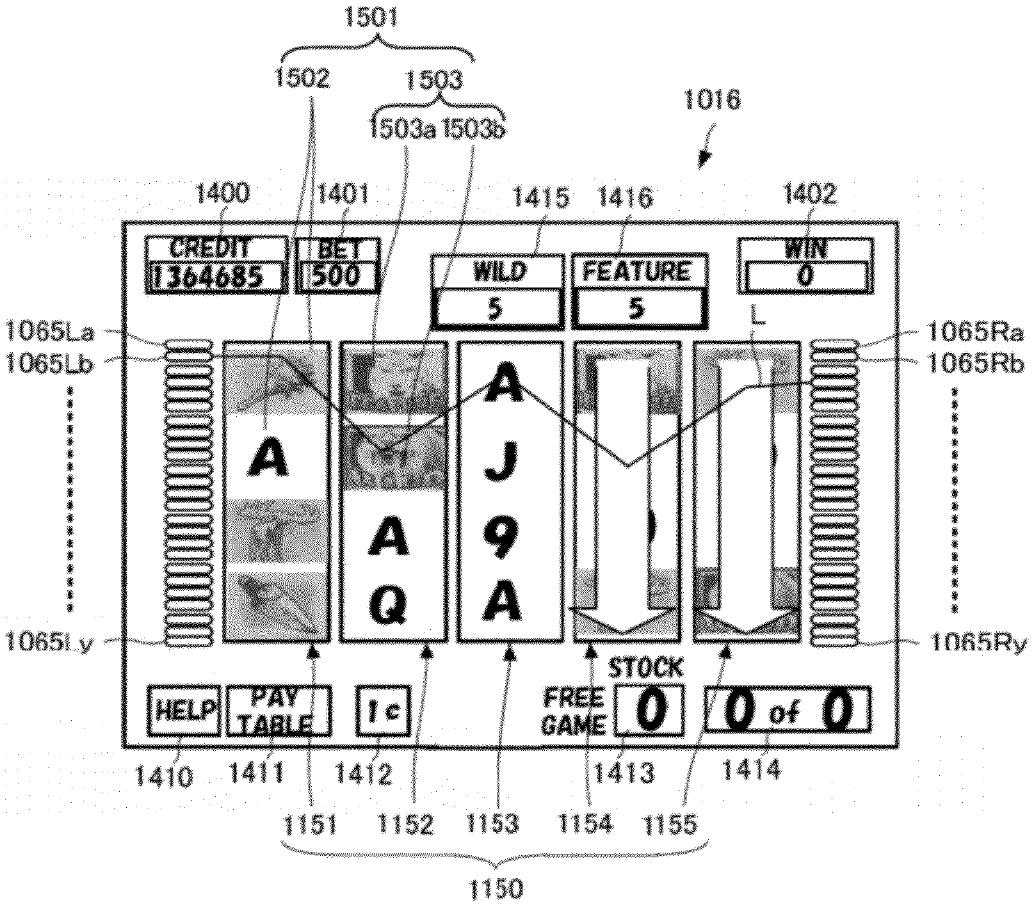
FIG. 42 is an explanatory diagram showing one example of a display state in the symbol display device provided in the slot machine according to the embodiment of the present invention.

Here, as shown in FIG. 42, payline occurrence columns are provided to the left and the right of the display windows 1150 in a symmetrical manner. A payline occurrence column on the left when viewed from the player includes 25 payline occurrence parts 1065L (1065La, 1065Lb, 1065Lc, 1065Ld, 1065Le, 1065Lf, 1065Lg, 1065Lh, 1065Li, 1065Lj, 1065Lk, 1065Ll, 1065Lm, 1065Ln, 1065Lo, 1065Lp, 1065Lq, 1065Lr, 1065Ls, 1065Lt, 1065Lu, 1065Lv, 1065Lw, 1065Lx, and 1065Ly).

On the other hand, a payline occurrence column on the right includes 25 payline occurrence parts 1065R (1065Ra, 1065Rb, 1065Rc, 1065Rd, 1065Re, 1065Rf, 1065Rg, 1065Rh, 1065Ri, 1065Rj, 1065Rk, 1065Rl, 1065Rm, 1065Rn, 1065Ro, 1065Rp, 1065Rq, 1065Rr, 1065Rs, 1065Rt, 1065Ru, 1065Rv, 1065Rw, 1065Rx, and 1065Ry).

Each payline occurrence part 1065L is paired with one of the payline occurrence parts 1065R. Paylines L are prescribed, each extending from one of the payline occurrence parts 1065L to one of the payline occurrence parts 1065R which are paired with each other. Although there are 25 paylines L in the present embodiment, FIG. 42 only shows one payline L for the sake of easier understanding.

Each payline L is activated when the payline L connects a pair of payline occurrence parts 1065L and 1065R. The payline L otherwise is inactivated. The number of paylines L to be activated is determined based on a bet amount. In such a case where a MAXBET indicating the maximum amount of bet allowed, the maximum number of paylines L, that is, 25 paylines L are activated. Various winning combinations of symbols 1501 are formed along activated paylines L. Winning combinations are detailed later.

The present embodiment deals with a case where the slot machine 1010 is a so-called video slot machine. However, the slot machine 1010 of the present invention may partially adopt a so-called mechanical reel in place of the simulated reels 1151 to 1155.

Further, a touch panel 1069 is disposed on a front face of the symbol display device 1016, and a player is able to input various instructions by operating the touch panel 1069. From the touch panel 1069, an input signal is transmitted to the main CPU 1071.

Provided on a front face of the top box 1012 is the upper image display panel 1131. The upper image display panel 1131 is made of a liquid crystal panel, and it constitutes a display unit. The upper image display panel 1131 displays an image related to an effect, or an image showing introduction or rules of the game. Further, the top box 1012 is provided with a speaker 1112 and a lamp 1111. At the slot machine 1010, an effect is executed with an image display and sound and light output.

Below the upper image display panel 1131 is a data display 1174 and the keypad 1173. The data display 1174 is made of a fluorescent display, an LED, and the like. The data display 1174 displays membership data read our from the IC card 1500 inserted into the PTS terminal 1700, and data inputted by the player through the keypad 1173, for example. The keypad 1173 is for inputting data.

Further, below the lower image display panel 141 is the PTS terminal 700.

(Mechanical Structure of the PTS Terminal)

Figure 8:
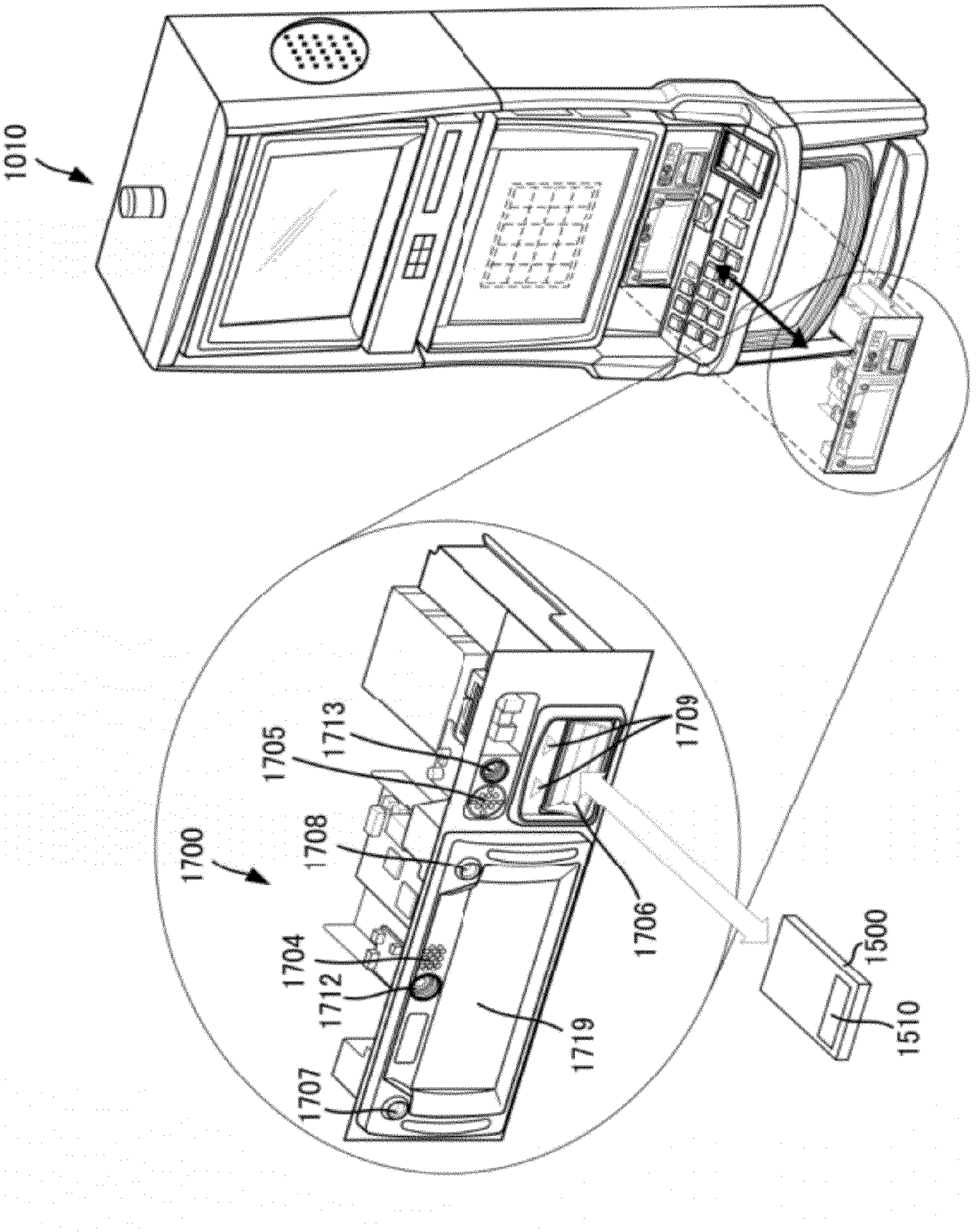
FIG. 8 is an enlarged view of a PTS terminal provided in the slot machine according to the embodiment of the present invention.

Here, FIG. 8 is a magnified perspective view of a PTS terminal. The PTS terminal 1700 has an LCD 1719, as shown in FIG. 8. The LCD 1719 is provided to a center portion of the PTS terminal 1700. The LCD 1719 displays an effect image which brings an effect into the game, for example.

Provided to an upper portion of the PTS terminal 1700 is human body detection cameras 1712 and 1713, microphones 1704 and 1705, and bass reflex speakers 1707 and 1708.

The human body detection cameras 1712 and 1713 detects presence of a player with the camera function thereof, and outputs a signal to a later-described unit controller 1730. The microphones 1704 and 1705 are utilized for allowing a player to vocally participate in a game, authenticating a player through vocal authentication, and the like. The speakers 1707 and 1708 execute an effect through a sound, and output a notification sound when an IC card 1500 is left. The speakers 1707 and 1708 also output a notification sound when authentication of an IC card 1500 inserted fails. Note that the speakers 1707 and 1708 is disposed to allow a sound to reach beyond the LCD (to the player) 1719 from the back of the LCD 1719 through a duct. This saves space where the speakers 1707 and 1708 are provided.

Further, the PTS terminal 1700 is provided with an LED 1718 and a card insertion slot 1706. The LED 1718 lights up in multiple colors to report the number of IC cards 1500 stored in the later-described card stacker 1714. Specifically, the LED 1718 lights in yellow when five or fewer IC cards 1500 are left, blue when 6 to 24 IC cards 1500 are left, and green when 25 or more IC cards 1500 are left. Note that when no IC cards 1500 is left, or 30 IC cards 1500 are left, the LED 1718 lights in gray and the ongoing game is halted. Thus, the LED 1718 lighting in yellow enables a staff member at the casino hall to immediately determine that there are a few IC cards 1500 left so that he/she can replenish IC cards 1500. Meanwhile, the LED 1718 lighting in green enables a staff member at the casino hall to immediately determine that the card stacker 1714 is full of IC cards 1500 left, so that he/she can remove some IC cards 1500 therefrom. A staff member inserts his/her exclusive IC card 1500 into the card insertion slot 1706 when replenishing IC cards 1500. On the other hand, a staff member inserts what is called a replenish card through the card insertion slot 1706 to remove 10 IC cards 1500 and the replenish card. Accordingly, staff members are not required to confirm the number of IC cards 1500 left in the slot machine 1010 on the management server, or actually open the main door 1013 of the slot machine 1010 to confirm the number of IC cards 1500 left. This improves the security of the casino hall.

The card insertion slot 1706 has a mechanism which allows insertion and ejection of IC cards 1500. An IC card 1500 is inserted with a display unit 1510 on its upper side and in such a manner that the IC card 1500 faces the direction opposite to the card insertion slot 1706. Further, the IC card 1500 is completely inside the slot machine 1010 while the player is playing a game. The IC card 1500 is ejected in such a manner that the display unit 1510 is exposed during a cash-out. This allows the player to confirm credit-related data such as updated cash data. Note that the IC card 1500 is not required to completely stay inside the slot machine 1010 while the player is playing a game. Instead, the IC card 1500 may be kept in such a manner that the display unit 1510 is exposed during the game. This allows the player to constantly confirm the credit being updated during the game. When the human body detection cameras 1712 and 1713 are detects absence of the player during a credit cash out, the IC card 500 is drawn into the slot machine 1010 and kept in the card stacker 1714. This prevents such an occurrence where the IC card stays inserted into the card insertion slot 1706 for a long period of time, even when a player having confirmed few credits left on the IC card 1500 displayed on the display unit 1510 leaves the seat with the IC card 1500 purposely left inserted therein. Note that in the present embodiment, that card stacker 1714 is capable of holding 30 and fewer IC cards 1500.

As described above, the PTS terminal 1700 of the present embodiment is configured as a unit where various devices having the microphone function, the camera function, the speaker function, the display function, and the like are put together integrally. This realizes a small space necessary for the PTS terminal 1700. Accordingly, this prevents such an inconvenience which is possible with each mechanism configured as a single device, where an LCD facing the player hinders the speakers to be provided facing the player.

(Electrical Structure of Slot Machine)

Figure 9:
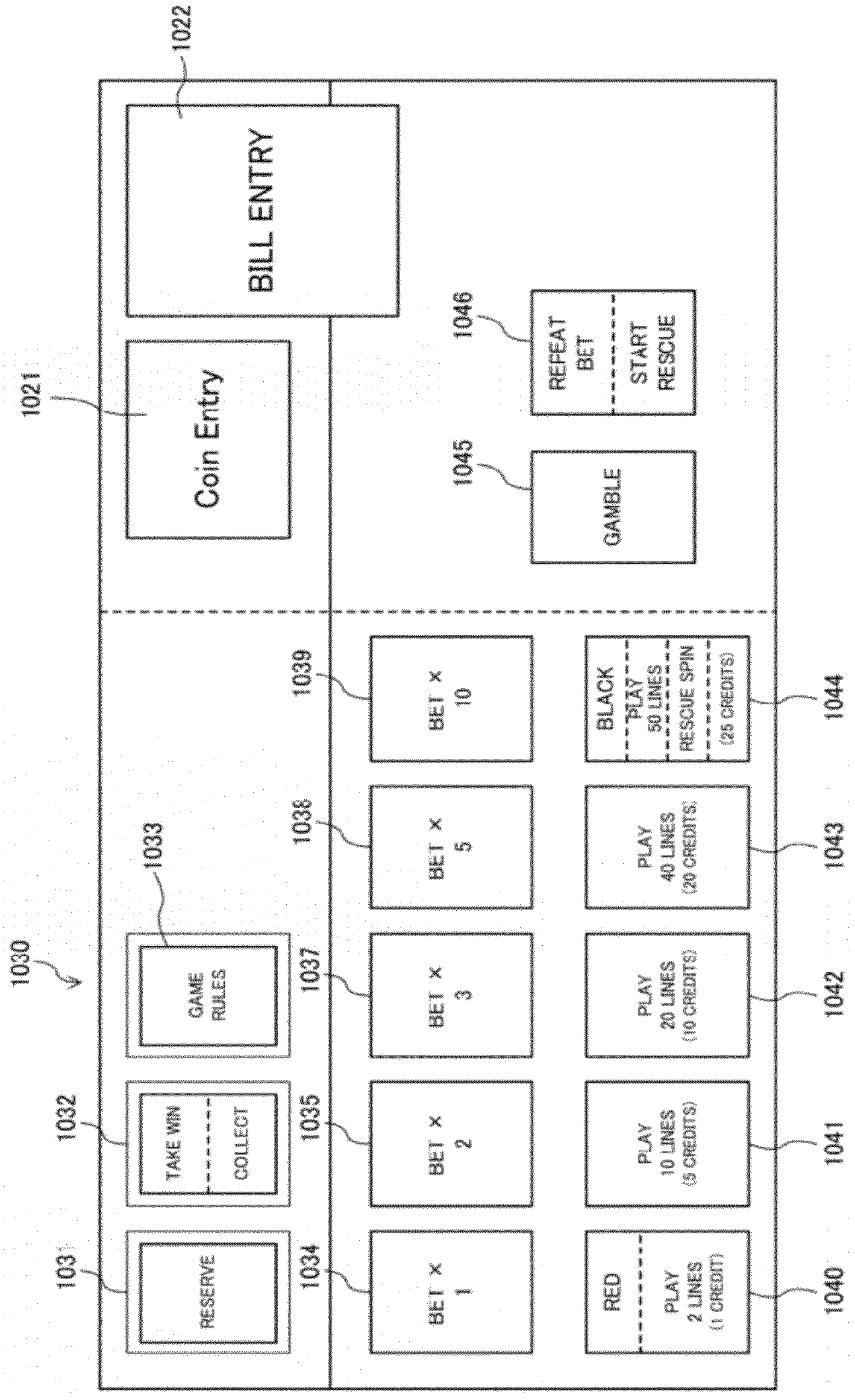
FIG. 9 is an enlarged view of a control panel provided in the slot machine according to the embodiment of the present invention.

As shown in FIG. 9, a start button 1046; a GAMBLE button 1045; BET buttons (1-BET button 1034 to 10-BET button 1039); line selection buttons (2-line selection button 1040 to 50-line selection button 1044); a RESERVE button 1031; a TAKE WIN/COLLECT button 1032, and a GAME RULES button 1033 are provided on the control panel 1030.

The start button 1046 is for inputting an instruction to start scrolling the symbols. The TAKE WIN/COLLECT button 1032 is for inputting an instruction to pay out the credited coins to the coin tray 1018, or to write the credit information corresponding to the credited coins to the IC card.

The 1-BET button 1034 is for inputting an instruction to bet one coin of all the credited coins in the game; the 2-BET button 1035 is for inputting an instruction to bet two coins of all the credited coins in the game; the 3-BET button 1036 is for inputting an instruction to bet three coins of all the credited coins in the game; the 5-BET button 1038 is for inputting an instruction to bet five coins of all the credited coins in the game; and the 10-BET button 1039 is for inputting an instruction to bet 10 coins of all the credited coins in the game.

The line selection buttons 1040 to 1044 are used to specify the symbol columns of a plurality of display blocks 1028 displayed in the lower image display panel 1141 that are to be used for betting. The 2-line selection button 1040 is for selecting two symbol columns; the 10-line selection button 1041 is for selecting 10 symbol columns; the 20-line selection button 1042 is for selecting 20 symbol columns; the 40-line selection button 1043 is for selecting 40 symbol columns; and the 50-line selection button 1044 is for selecting 50 symbol columns.

The bill validator 1022 is for validating the legitimacy of bill (basic currency), and accepting legitimate bill into the cabinet 1011. In this bill validator 1022, as described earlier, the bill of a plurality of countries other than the basic currency of the country in which the slot machine 1010 is installed can also be received, and the legitimacy of the accepted bill, its type and quantity can be read.

As shown in FIG. 7, on a lower part of a front face of the main door 1013, that is, below the control panel 1030 is provided a belly glass 132 with a character related to the slot machine 1010 thereon. As shown in FIG. 7, on a lower part of a front face of the main door 1013, that is, below the control panel 1030 is provided a belly glass 1132 with a character related to the slot machine 1010 thereon.

An area for the PTS terminal (PTS terminal unarranged area) is provided in between the lower image display panel 1141 and control panel 1030, and the PTS terminal 1700 is laid out in this PTS terminal unarranged area.

Figure 12:
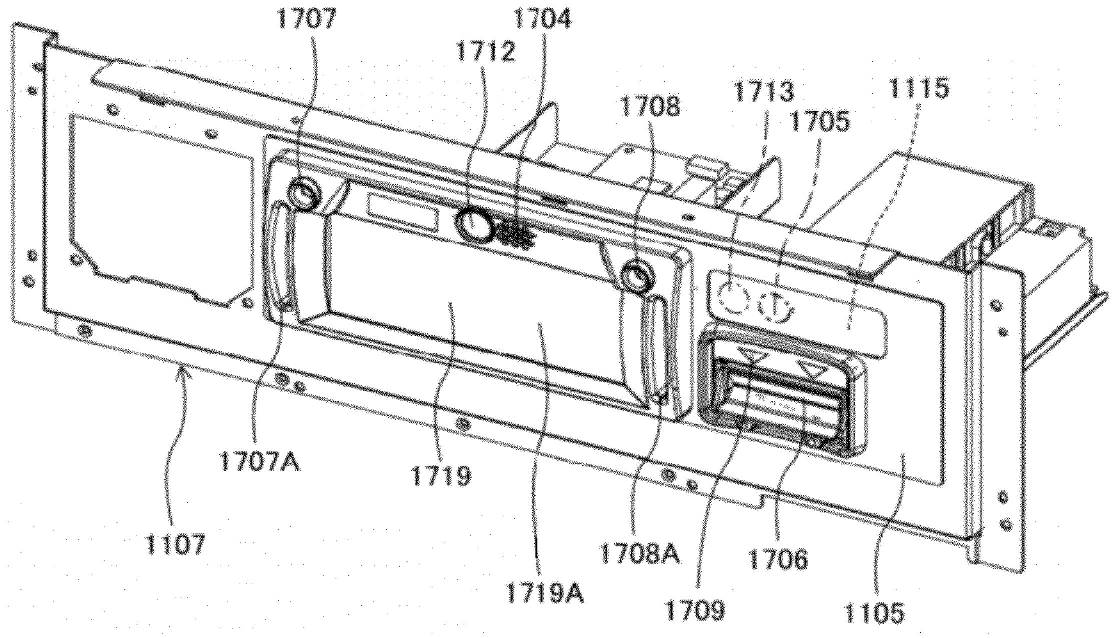
FIG. 12 is a perspective view showing the PTS terminal.

The PTS terminal 1700 is a device for receiving different kinds of information from the management server block 2820 (FIG. 1), and providing it to a specific player. An LCD 1719 for displaying the different kinds of information received from the management server block 2820; a card insertion slot 1706 for inserting and ejecting IC cards; a player identification part (human body detection cameras 1712 and 1713, mikes 1704 and 1705, and a human body detection sensor 1115); an LED 1709 that lights up in a color corresponding to the number of remaining IC cards stocked internally; and ducts 1707A and 1708A for the output of the sound effect are installed on the front face of the PTS terminal 1700. A touch panel is installed on the LCD 1719. As shown in FIG. 12, the human body detection camera 1713 and mike 1705 are installed if there is no space to install the legitimate human detection camera 1712 and mike 1704.

The card insertion slot 1706 is provided on the side (on the right side in the present embodiment) of the LCD 1719. Thus, without changing his/her posture, the player can insert the IC card in the card insertion slot 1706 with a dingle hand (right hand in the case of the present embodiment) while looking at the LCD 1719, or can accept the IC card ejected from the card insertion slot 1706.

Furthermore, an IC card R/W (reading/writing device) (antenna 1701 and modem unit 1721 in FIG. 16, which are described later) for reading the data from the IC card and writing data to the IC card; a card stacker (FIG. 8 and FIG. 9) for stocking a plurality of IC cards; a card insertion slot 1706; an IC card transport module 1253 (FIG. 14) for transporting the IC card between the IC card R/W an card stacker 1714; speakers 1707 and 1708 for the output of audio and sound effect to the front face of the PTS terminal 1700 via the ducts 1707A and 1708A; and a controller (such as the CPU 1731 shown in FIG. 16) for controlling each of the above units installed in the PTS terminal 1700 are installed inside the PTS terminal 1700.

The IC card transport module 1253 (FIG. 14) includes a rotor that is provided rotating drive by a motor, and is used to pull in the IC cards inserted in the card insertion slot 1706 to an internal prescribed location through rotation of this roller in the pull-in direction, and to eject the IC cards to the outside from the card insertion slot 1706 through the rotation of the roller in the discharge direction.

The IC card R/W is used to read data from the IC card and also to write data to the IC card through RFID (Radio Frequency Identification). The IC card R/W reads the credit information stored in the IC card inserted from the card insertion slot 1706 in a non-contact manner, or writes the credits to be offered to the player according to the results of the game in the IC card in a non-contact manner.

In the player identification unit, the human body detection camera 1712 (1713) is installed on the upper side of the LCD 1719 and photographs the face of the player looking at the LCS 1719 from the front. The camera installed in a way to take pictures of the face of the player is not particularly restricted, and can be, for example, a CCD camera and CMOS sensor camera. The mike 1704 (1705) is installed on the upper side of the LCD 1719, and collects the voice of the player from the front. The human body detection sensor 1115 is installed on the upper side of the card insertion slot 1706, and detects the insertion of an IC card by the player into the card insertion slot 1706. An infrared laser ranging sensor can be used as the human body detection sensor 1115, but it is not particularly restricted thereto. In the player identification unit, the existence of a player is detected by the human body detection camera 1712 (1713), the mike 1704 (1705), and the human body detection sensor 1115.

As for the mounting location of the human body detection camera 1712 (1713) and mike 1704 (1705), they may be mounted on the upper side of the card insertion slot 1706 instead of the upper side of the LCD 1719, as shown by the dashed line in FIG. 12. In other words, instead of installing the human body detection camera 1712 and mike 1704, the camera 1713 and mike 1705 may also be installed. In this way, it is possible to deal with cases in which instead of installing the LCD 1719, some other unit is mounted in the place of the LCD 1719. The human body detection camera 1713 installed on the upper side of the card insertion slot 1706 has the same configuration as the human body detection camera 1712, and photographs the player from an inclination. Also, the mike 1705 installed on the upper side of the card insertion slot 1706 has the same configuration as mike 1704 and collects the sound of the player at an inclined direction.

The LCD 1719, card insertion slot 1706, player identification unit, and the speaker and ducts 1707A and 1708A are installed as one part in the PTS panel 1105. This PTS panel 1105 is fixed to the cabinet 1011 via a bracket. In other words, in the slot machine 1010, a PTS panel 1105 equipped with each unit comprising the PTS terminal 1700 as one part, such as the LCD 1719, card insertion slot 1706, player identification unit, speaker 1704 (1705), and ducts 1707A and 1708A, is fixed with a bracket in the PTS terminal installation area between the lower image display panel 1141 and control panel 1030.

Furthermore, the LCD 1719, the human body detection camera 1712 (1713), the microphone 1704 (1705), and the ducts 1707A and 1708A are installed as one part on the bezel.

Figure 11:
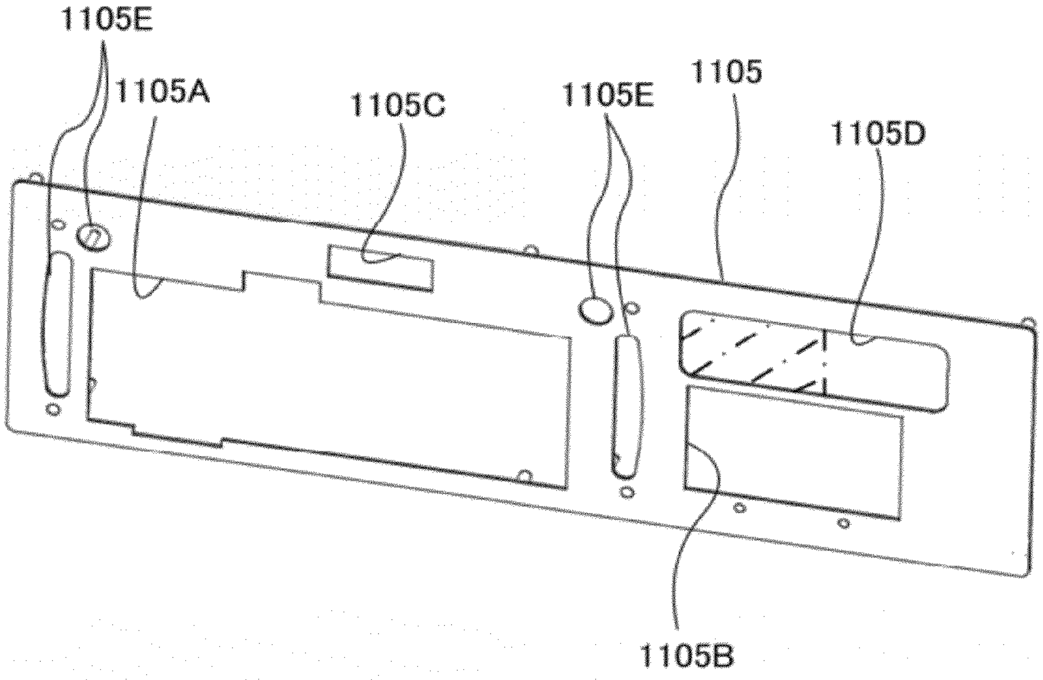
FIG. 11 is a perspective view showing a PTS panel.

As shown in FIG. 12, the PTS terminal 1700 includes the LCD 1719, the card insertion slot 1706, the human body detection camera 1712 (1713), and the microphone 1704 (1705) installed as one part on the PTS panel 1105 (FIG. 11). As shown in FIG. 11, the mounting position of these units configuring the PTS terminal 1700 is determined by the mounting holes formed in the PTS panel 1105.

FIG. 11 is a perspective view showing the PTS panel 1105. As shown in FIG. 11, a mounting hole 1105A for mounting the LCD 1719; a mounting hole 1105B for mounting the card insertion slot 1706; a mounting hole 1105C for mounting the human body detection camera 1712 and microphone 1704; a mounting hole 1105D for mounting the human body detection sensor 1115; and a mounting hole 1105E for mounting the ducts 1707A and 1708A for the speaker are formed in the PTS panel 1105. By mounting the corresponding units (LCD 1719, the card insertion slot 1706, the human body detection camera 1712, the microphone 1704, the human body detection sensor 115, and the ducts 1707A and 1708A for speaker) in these mounting holes 1105A to 1105E, these units are positioned and mounted at the predetermined positions.

In FIG. 11, an opening for mounting only the human body detection sensor 1115 may be formed as the mounting hole 1105D, when the human body detection camera 1713 and microphone 1705 are to be mounted on the upper side of the LCD 1719 (in other words, mounting hole 1105C), and the area shown by the dashed line (area for mounting the human body detection camera 1713 and microphone 1705) need not be provided as an opening. However, in view of the case in which the human body detection camera 1713 and microphone 1705 are to be mounted on the upper side of the card insertion slot 1706, this area shown by the dashed line may be provided beforehand as an opening, and a decorative laminate may be set.

As shown in FIG. 12, the PTS panel 1105 is installed on a plate-shaped bracket 1107, and this bracket 1107 is fixed to the cabinet 1011 of the slot machine 110. Even in FIG. 12, the human body detection camera 1713 and microphone 1705 that can be mounted in place of the human body detection camera 1712 and microphone 1704 are shown by a dashed line.

Figure 13:
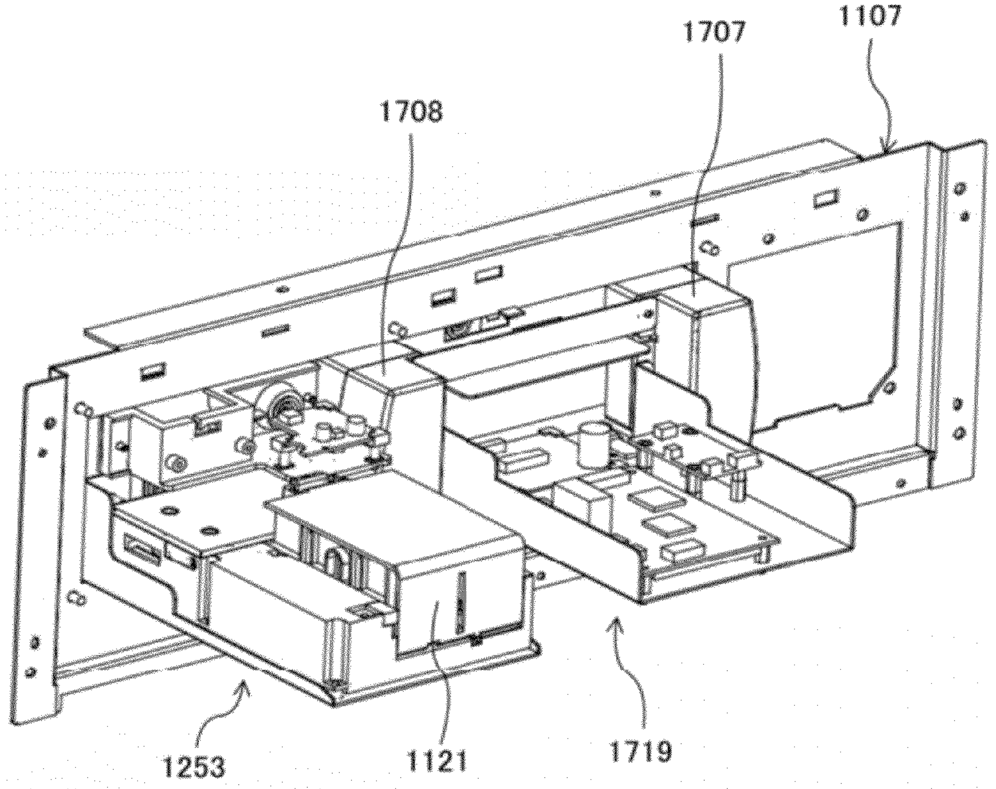
FIG. 13 is a perspective view showing the backside of the PTS terminal.

FIG. 13 is a perspective view showing the backside of the PTS terminal 1700. As shown in FIG. 13, units, such as an IC card transport module 1253, a card stacker 1121, speakers 1707 and 1708, and an LCD 1719 are mounted on the backside of the PTS panel 1105. These units are integrated by the PTS panel 1105, and are fixed to the cabinet 1011 of the slot machine 1010 via the bracket 1107.

Figure 14:
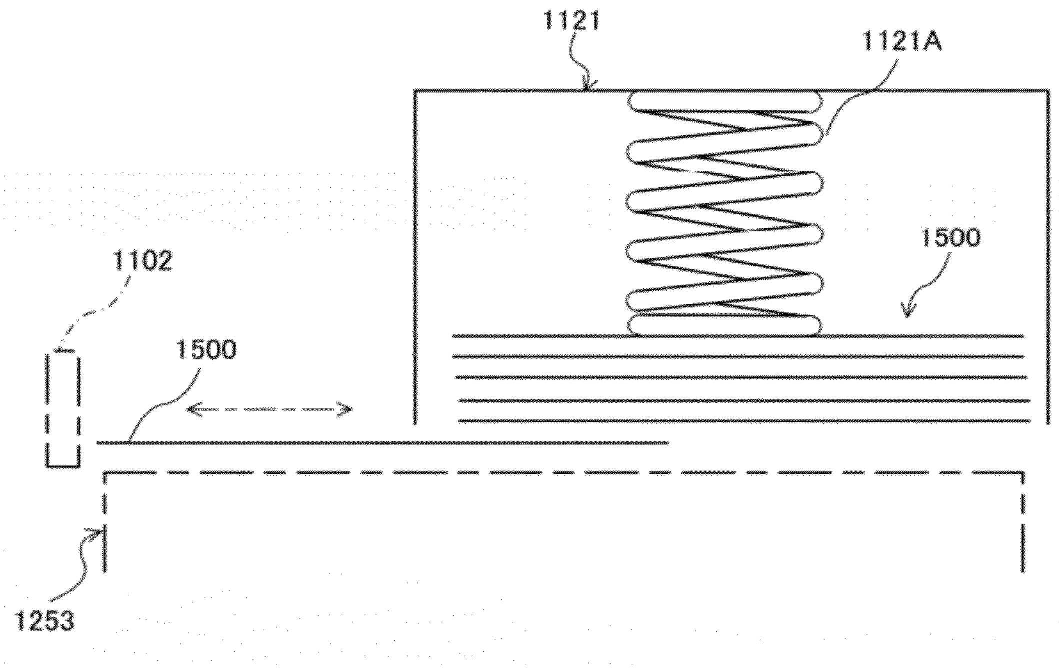
FIG. 14 is an outlined line drawing showing a card stacker.

As shown in FIG. 14, the card stacker 1121 is configured such that a plurality of IC cards 1500 are stored one on top of the other in a case with an open bottom. The IC cards inside the case are biased to the lower side by a coil spring 1121A, and the IC cards 1500 inserted via the card insertion slot 1706 are transported up to a prescribed location at the bottom of the case by the IC card transport module 1253 comprising a motor and rotor, the information is written and read, and when these card are no longer needed, they are stacked back in the case.

Figure 15:
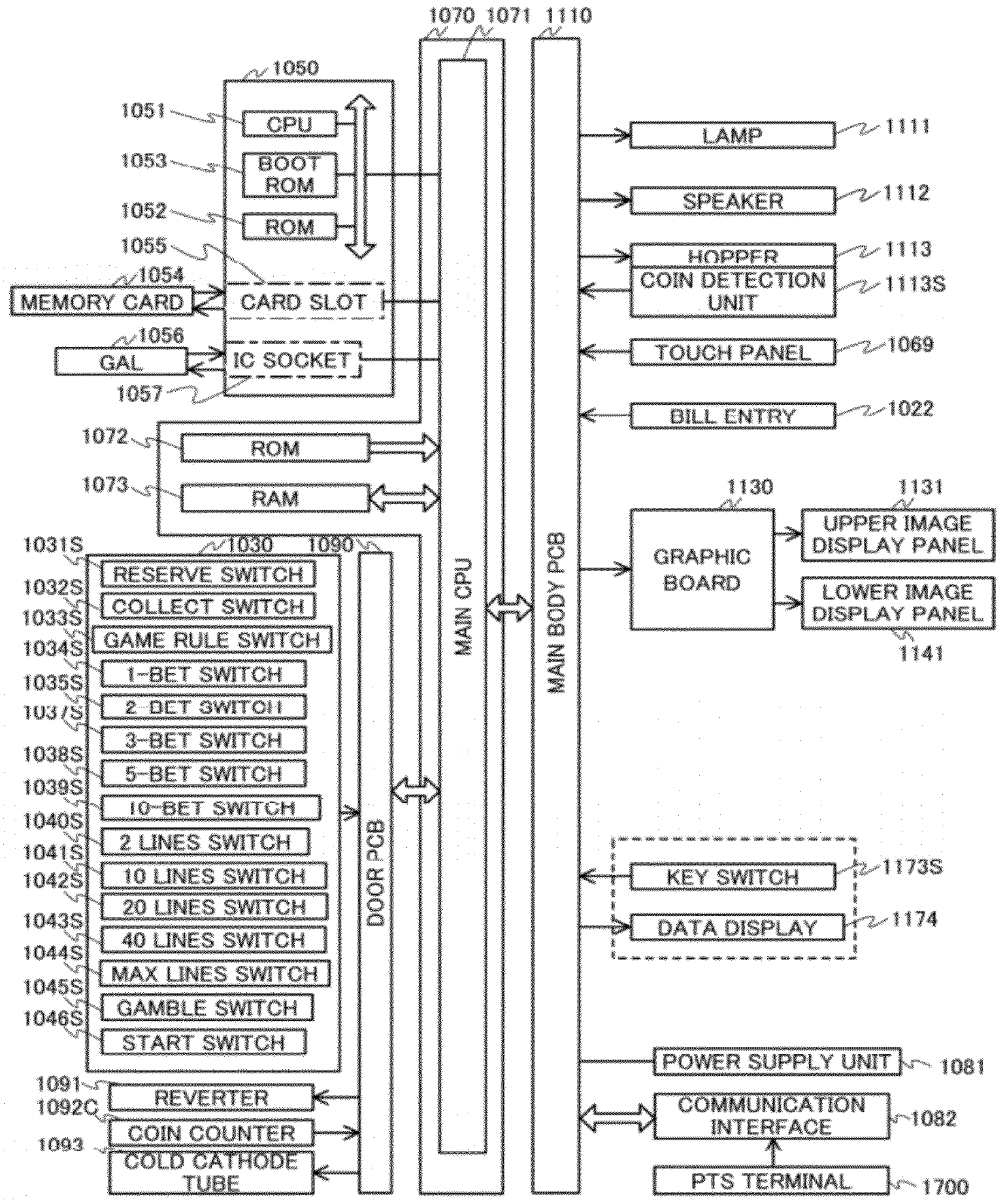
FIG. 15 is a block diagram showing the internal configuration of the slot machine according to the embodiment of the present invention.

The following describes a circuitry structure of the slot machine 1010, with reference to FIG. 15.

The gaming board 1050 has a CPU 1051, a ROM 1052, a boot ROM 1053 which are connected via an internal bus, a card slot 1055 corresponding to the memory card 1054, and an IC socket 1057 corresponding to a GAL (Generic Array Logic) 1056.

The memory card 1054 is of a non-volatile memory, and stores therein a game program and a game system program. The game program includes a program related to progress of a game, and a program for executing an effect with an image and a sound. Further, the game program includes a symbol determination program. The symbol determination program is for determining symbols to be rearranged in the display blocks 1028.

Further, the game program includes: a regular game symbol table data showing a regular game symbol table showing each symbol of each symbol column of the display blocks in association with a code No. and a random number (see FIG. 35); a bonus game symbol table data showing a bonus game symbol table showing each symbol of each symbol column of the display blocks in association with a code number and a random number (see FIG. 36); symbol number determination table data showing a symbol column determination table (see FIG. 37); a code No. determination table data showing a code No. determination table (see FIG. 38); wild symbol increase number determination table data showing a wild symbol increase number determination table (see FIG. 39); trigger symbol increase number determination table data showing a trigger symbol increase number determination table (see FIG. 40); odds data showing the number and types of symbols to be rearranged on a payline L in association with a payout amount (see FIG. 41); and the like.

Further, the card slot 1055 is structured to allow insertion and ejection of a memory card 1054. The card slot 1055 is connected to the motherboard 1070 through an IDE bus. Thus, it is possible to remove a memory card 1054 from the card slot 1053S, write another game program onto the memory card 1054, and insert the memory card 1054 back into the card slot 1053S to change the type or content of a game to be run at the slot machine 1010.

The GAL 1056 is a type of a PLD (Programmable Logic Device) having an OR fixed array structure. The GAL 1056 has input ports and output ports. When an input port receives a predetermined input, corresponding data is outputted through an output port.

Further, the IC socket 1057 is structured to allow insertion/removal of the GAL 1056. The IC socket 1057 is connected to the motherboard 1070 through a PCI bus. The content of a game to be run at the slot machine 1010 can be changed by replacing a memory card 1054 with another one with another program written thereon, or replacing the program written onto the memory card 1054 with another program.

The CPU 1051, the ROM 1052, and the boot ROM 1053 connected to each other through internal buses are connected to the motherboard 1070 through a PCI bus. The PCI bus transmits signals between the motherboard 1070 and the gaming board 1050, and supplies power from the motherboard 1070 to the gaming board 1050.

The ROM 1052 stores an authentication program. The boot ROM 1053 stores a pre-authentication program, a program (boot code) for the CPU 1051 to boot the auxiliary authentication program, and the like.

The authentication program is for authenticating a game program and a game system program (tamper check program). The pre-authentication program is for authenticating the authentication program. The authentication program and the pre-authentication program is described along procedures for authenticating (authentication procedure) that program to be authenticated is not falsified.

The motherboard 1070 is constituted with a motherboard for market use (printed circuit board with fundamental parts of a personal computer built thereon), and includes a main CPU 1071, a ROM (Read Only Memory) 1072, a RAM (Random Access Memory) 1073, and a communication interface 1082. Note that the motherboard 1070 corresponds to the game controller 1100 of the present embodiment.

The ROM 1072 is made of a memory device such as a flash memory. The ROM 1072 stores therein a program such as a BIOS (Basic Input Output System) run by the main CPU 1071, and permanent data. When the main CPU 1071 runs the BIOS, predetermined peripheral devices are initialized. Further, the game program and the game system program stored in the memory card 1054 are installed via the gaming board 1050. Note that, in the present invention, the ROM 1072 may be rewritable or non-rewritable.

The RAM 1073 stores data utilized when the main CPU 1071 operates, program such as a symbol determination program, and the like. For example, the game program, game system program, and the authentication program are stored in the RAM 1073 after the programs are installed. Further, the RAM 1073 is provided with an operation region for executing the above programs. Examples of the operation region is a region for storing a counter which manages a game count, a bet amount, a payout amount, and a credit amount, and a region for storing a symbol determined by a lottery (code number).

The communication interface 1082 is for communicating with the external control device 1621 such as a server, through the communication line 1301. Further, the motherboard 1070 is connected to a later-described door PCB (Printed Circuit Board) 1090 and the main body PCB 1110 via USBs. The motherboard 1070 is connected to a power supply unit 1081. Further, the motherboard 1070 is connected to the PTS terminal 1700 via a USB.

When power is supplied from the power supply unit 1081 to the motherboard 1070, the main CPU 1071 of the motherboard 1070 is booted, and power is supplied to the gaming board 1050 via the PCI bus and the CPU 1051 is booted.

The door PCB 1090 and the main body PCB 1110 is connected to an input device such as a switch and a sensor, and peripheral devices whose operations are controlled by the main CPU 1071.

The door PCB 1090 is connected to the control panel 1030, a reverter 1091, a coin counter 1092C and a cold cathode tube 1093.

The control panel 1030 is provided with a reserve switch 10315, a collect switch 1032S, a game rule switch 1033S, a 1-bet switch 1034S, a 2-bet switch 1035S, a 3-bet switch 1037S, a 5-bet switch 1038S, a 10-bet switch 1039S, a play 2 lines switch 1040S, a play 10 lines switch 1041S, a play 20 lines switch 1042S, a play 40 lines switch 1043S, a max lines switch 1044S, a gamble switch 1045S, and a start switch 1046S, respectively corresponding to the buttons described above. Each switch detects that it is pushed by a player, and outputs a signal to the main CPU 1071.

Inside the coin entry 1036 is provided with the reverter 1091 and the coin counter 1092C. The reverter 1091 detects validity of a coin inserted into the coin entry 1021, and discharges those other than valid coins through a coin payout exit. Further, a coin counter 1092C detects valid coins accepted, and counts the numbers thereof.

The reverter 1091 operates based on a control signal outputted from the main CPU 1071, and distributes valid coins determined by the coin counter 1092C into a hopper 1113 or a not-shown cash box. When the hopper 1113 is not full of coins, a valid coin is distributed there. On the other hand, when the hopper 1113 is filled with coins, a valid coin is distributed into the cash box.

The cold cathode tube 1093 functions as a backlight provided at a back of the upper image display panel 1131 and the lower image display panel 1141. The cold cathode tube 1093 lights based on a control signal from the main CPU 1071.

The main body PCB 1110 is connected to the lamp 1111, the speaker 1112, the hopper 1113, the coin detection unit 1113S, the touch panel 1069, the bill entry 1022, the graphic board 1130, the key switch 1173S, and the data display 1174. As shown in FIG. 15, in addition to the configuration in which the bill entry (bill validator) 1022 is installed directly in the slot machine 1010, a configuration in which the bill validator 1022 is installed in the PTS terminal 1700 is also possible.

The lamp 1111 lights based on a control signal outputted from the main CPU 1071. The speaker 1112 outputs a sound such as background music, based on a control signal outputted from the main CPU 1071.

The hopper 1113 operates based on a control signal outputted from the main CPU 1071, and pays out the number of coins determined to be paid out to a not-shown coin tray through the coin payout exit. The coin detection unit 1113S detects a coin to be paid out from the hopper 1113, and outputs a signal to the main CPU 1071.

The touch panel 1069 detects a position touched on the lower image display panel 1141 by a player with a finger, and outputs a signal corresponding to the position detected to the main CPU 1071.

The bill entry 1022 is for detecting validity of a piece of bill and accepts a valid piece of bill into the cabinet 1011. The bill accepted into the cabinet 1011 is converted into coins, and credits corresponding to the number of coins calculated are added as credits that the player has.

The graphic board 1130 controls display of an image to be displayed on the upper image display panel 1131 and the lower image display panel 1141, based on a control signal outputted from the main CPU 1071. The graphic board 1130 has a VDP (Video Display Processor) which generates image data, a video RAM which stores the image data generated by the VDP, and the like. Note that the image data utilized when image data is generated by the VDP is included in a game program read out from the memory card 1054 and stored in the RAM 1073.

Further, the graphic board 1130 is provided with a VDP (Video Display Processor) for generating image data on the basis of a control signal from the main CPU 1071, a video RAM for temporarily storing the image data generated by the VDP, and the like. Note that image data used at the time of generating the image data by the VDP is in a game program which is read out from the memory card 1054 and stored in the RAM 1073.

The key switch 1173S is provided to the keypad 1173. The key switch 1173 outputs a predetermined signal to the main CPU 1071 when the player operates the keypad 1173.

Based on a control signal output from the main CPU 1071, the data display 1174 displays data read by the card reader 1172, or data inputted through the keypad 1173 by the player.

(Electrical Structure of PTS Terminal)

Figure 16:
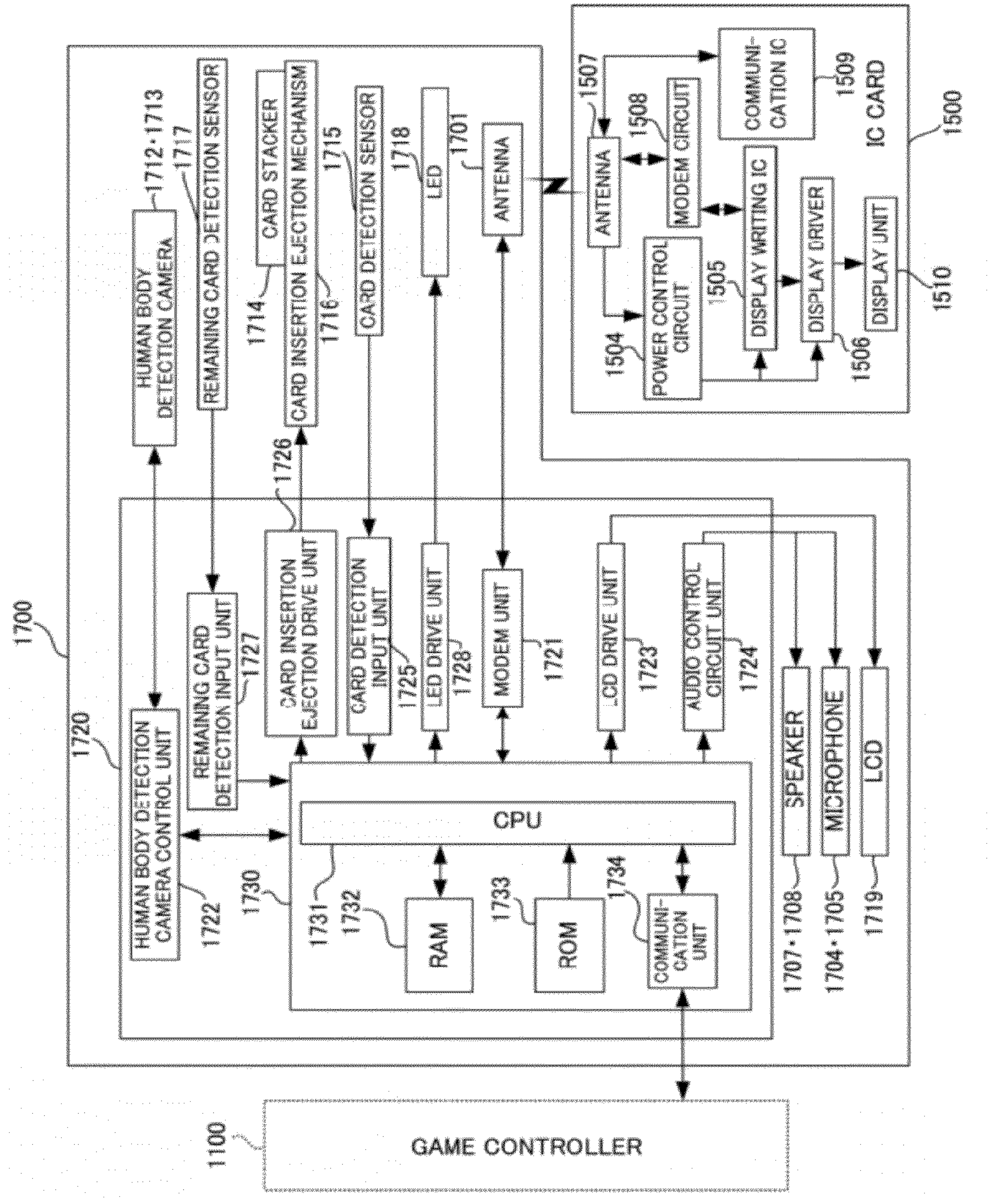
FIG. 16 is a block diagram showing the internal configuration of a card unit and an IC card provided in the slot machine according to the embodiment of the present invention.

Next, the following describes a structure of a circuitry provided to the PTS terminal 1700, with reference to FIG. 16. The following describes a circuit provided in the PTS terminal 1700 with reference to FIG. 16.

A PTS controller 1720 which controls the PTS terminal 1700 is connected to various functional parts as a unit controller 1730 its main part. The PTS controller 1720 has a CPU 1731, a communication unit 1734, a ROM 1733, and a RAM 1732.

The CPU 1731 runs various programs stored in the later-described ROM 1733, executes calculation, and the like. Specifically, the CPU 1731 runs a credit update program and converts credit data retrieved from the game controller 1100 into cash data, adds the cash data to broken number cash data in the management server 1800, and transmits the data to the IC card 1500.

Further, the CPU 1731 runs a human body detection operation program. When the credit amount based on the credit data retrieved by the game controller 1100 does not equal "0," the CPU 1731 determines whether to accept the IC card 1500 into the card stacker 1714, with the human body detection cameras 1712 and 1713.

Further, the CPU 1731 runs the authentication program to cross verify an identification code on the IC card 1500 and the identification code in the management server block 2820.

Further, the CPU 1731 runs an audio control program to control a later-described audio control circuit unit 1724 based on a result of the authentication. The audio control here refers to such a control in which the case of authentication failure, the CPU 1731 controls the audio control circuit unit 1724 and reports authentication failure through the speakers 1707 and 1708. The communication unit 1734 enables communication with the game controller 1100.

Further, the CPU 1731 runs a device program to control operations of the LCD 1719, the microphones 1704 and 1705, and the speakers 1707 and 1708. The CPU 1731 runs the LED control program to cause the LED 1718 to light in accordance with the remaining number of IC cards 1500.

The ROM 1733 is made of a memory device such as a flash memory. The ROM 1733 stores therein permanent data to be executed by the CPU 1731. For example, the ROM 1733 stores therein a credit update program which re-writes credit data stored on the IC card 1500 on the basis of an instruction from the game controller 1100, a human body detection operation program, an authentication program, an audio control program, a device program, and an LED control program.

The RAM 1732 temporarily stores therein data necessary for running the various programs stored in the ROM 1733. For example, the RAM 1732 stores credit data to be updated, based on a signal from the game controller 1100. Further, the RAM 1732 stores the time that a player is detected with the human body detection cameras 1712 and 1713, and the period of time which is counted from the point that the player is detected.

Further, the unit controller 1730 is connected to a human body detection camera control unit 1722, an LCD drive unit 1723, an audio control circuit unit 1724, a remaining card detection input unit 1727, a card insertion ejection drive unit 1726, a card detection input unit 1725, an LED drive unit 1728, and a modem unit 1721.

The human body detection camera control unit 1722 controls the operations of the human body detection cameras 1712 and 1713, on the basis of an instruction from the unit controller 1730.

The LCD drive unit 1723 controls operations of the LCD 1719, on the basis of an instruction from the unit controller 1730

The audio control circuit unit 1724 controls operations of the microphones 1704 and 1705, and the speakers 1707 and 1708, no the basis of an instruction from the unit controller 1730.

The remaining card detection input unit 1727 inputs to the unit controller 1730 a signal for determining the remaining number of IC cards 1500 stacked in the card stacker 1714 determined by the remaining card detection sensor 1717. Here, the remaining card detection sensor 1717 has a function of detecting the remaining number of IC cards 1500 stacked in the card stacker 1714, with a not-shown infrared detection mechanism or the like, for example.

The card insertion ejection drive unit 1726 controls operations of the card insertion ejection mechanism 1716, on the basis of an instruction from the unit controller 1730. Here, the card insertion ejection mechanism 1716 has a mechanism for receiving an IC card 1500 inside, and a mechanism for ejecting the IC card 1500 to outside.

The card detection input unit 1725 is for inputting a signal from the card detection sensor 1715 to the unit controller 1730. Here, the card detection sensor 1715 obtains various types of data such as cash data and an identification code, from the inserted IC card 1500.

The LED drive unit 1728 controls operations of the LED 1718 on the basis of an instruction from the unit controller 1730, to light the LED 1718.

The modem unit 1721 converts a high frequency signal from an antenna 1701 to a signal controllable by the unit controller 1730, and converts a signal from the unit controller 1730 to a signal transmittable to the IC card 1500 through the antenna 1701.

Figure 6:
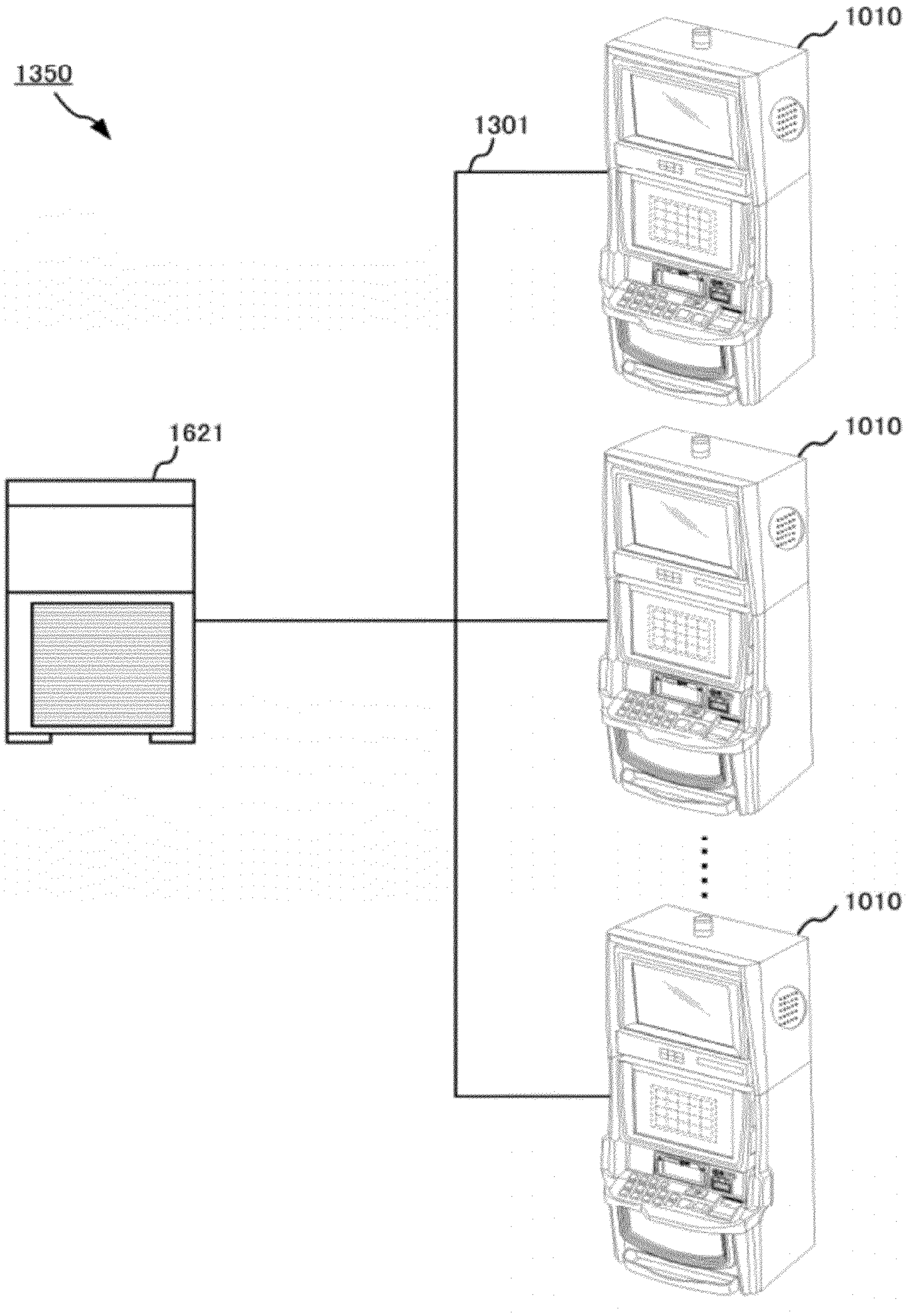
FIG. 6 is a diagram showing a game system including the slot machine according to the embodiment of the present invention.
Figure 17:
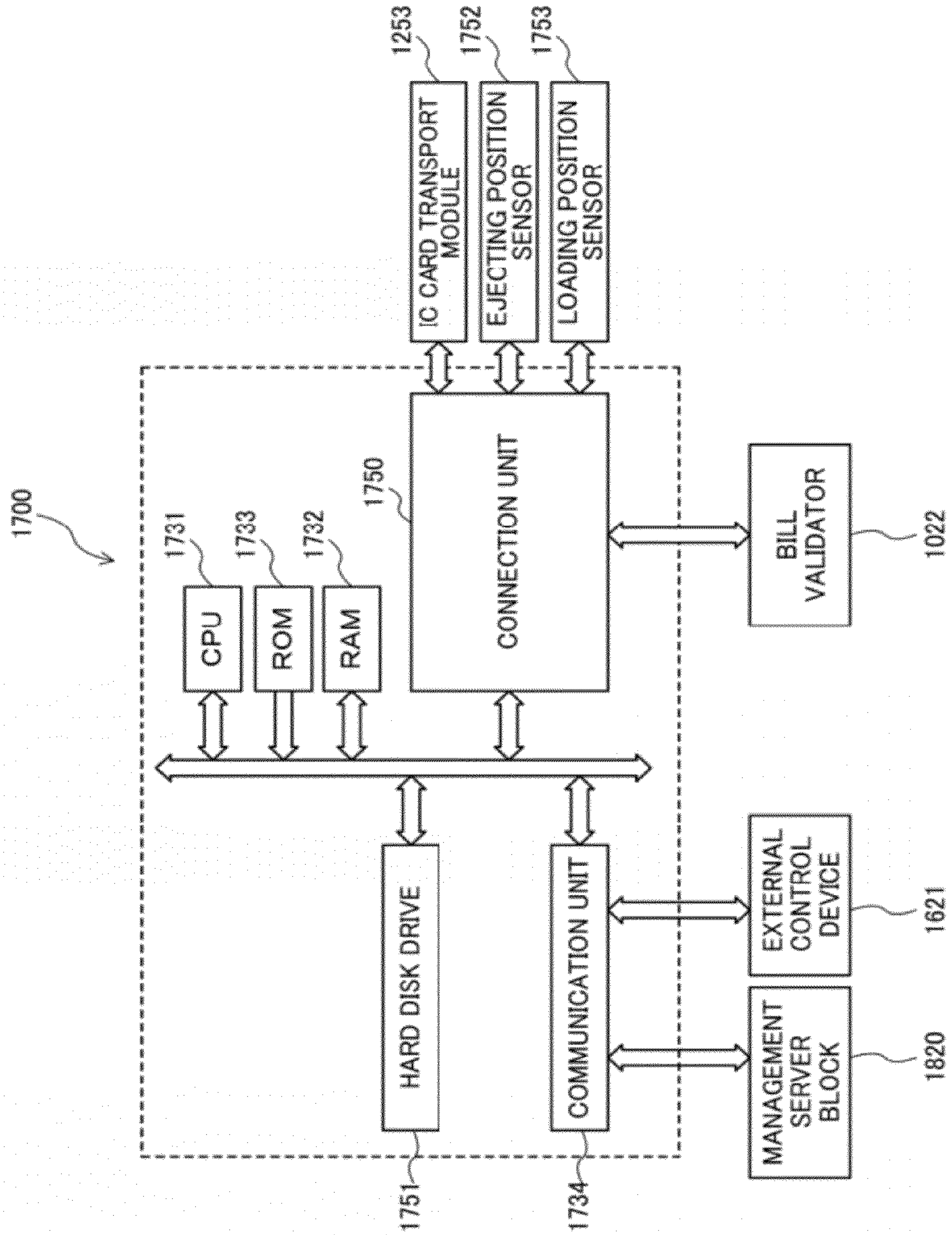
FIG. 17 is a block diagram showing the configuration of the PTS terminal.

Note that the unit controller 1730, the card insertion ejection drive unit 1726, the card detection input unit 1725, and the modem unit 1721 are also referred to as a card unit controller as a unit. (Electrical Structure of IC Card) Note that the PTS terminal 1700 also has the configuration shown in FIG. 17 in addition to the configuration shown in FIG. 16. FIG. 17 shows some parts that are duplicated with the configuration shown in FIG. 16, and in such cases, the same numbers as those assigned in FIG. 6 have been used.

As shown in FIG. 17, in addition to the configuration shown in FIG. 16, the PTS terminal 1700 has a connection unit 1750 and a hard disk drive 1751. The communication unit 1734 is connected to the communication interface of the slot machine 1010 on which the said PTS terminal 1700 is loaded via a communication line, and is also connected to the management server block 2820 via a communication line. The ROM 1733 stores a system program for controlling the operation of the PTS terminal 1700; currency exchange commission calculation value data; and permanent data. The currency exchange commission calculation value data indicates the currency exchange commission calculation value P/1−P (P is the currency exchange commission rate). The RAM 1732 temporarily stores the currency exchange rate data showing the currency exchange rate stipulated for each type of currency other than the basic currency to show the corresponding relationship between the amount of basic currency (America currency) and the amount of different types of currencies other than the basic currency.

The hard disk drive 1751 is for storing the image data of images photographed by the human body detection camera 1712 (1713) that is controlled by the player identification unit (human body detection camera 1712 (1713), the microphone 1704 (1705), and the human body detection sensor 1115 (FIG. 4)). The hard disk drive 1751 corresponds to a memory in the present invention. After power has been supplied and the predetermined startup process has been executed, the CPU 1731 stores the image data obtained through photography by the human body detection camera 1712 (1713) in the hard disk drive 1751. Storing of the image data is performed at a prescribed time interval (for example, at 0.5-second interval). The time (time stamp) at which data is stored in the hard disk drive 1751 is added to each image data. The PTS terminal 1700 has a clock function, and sets the time every time the prescribed time period elapses. The time is set by acquiring the time data from either the clock provided in the management server block 2820 or from outside via the Internet. When the storable area in the hard disk drive 1751 becomes lesser than a predetermined amount (for example 100 MB), the CPU 1731 performs sequential deletion starting from the image data to which the oldest time stamp is added. However, image data that is not set to a state in which it can be deleted is not deleted.

In addition to the configuration shown in FIG. 16, the IC card transport module 1253 is connected to the connection unit 1750. As shown in FIG. 15, in place of the configuration in which the bill entry (bill validator) 1022 is installed directly in the slot machine 1010, a configuration in which the bill validator 1022 is installed in the PTS terminal 1700 is also possible, and in such a case, as shown in FIG. 17, the bill validator 1022 is connected to the connection unit 1750.

The bill validator 1022 is for validating the legitimacy of bill (basic currency), and accepting legitimate bill. When the bill validator 1022 accepts legitimate bill, it outputs an input signal to the CPU 1731 based on the amount of the bill. In other words, the input signal includes information about the denomination data, money amount data, and error data regarding the accepted bill.

The IC card transport module 1253 has a sensor (such as an optical sensor) for detecting an IC card 1500 inserted from the card insertion slot 1706, and a motor for transporting the IC card to the prescribed position, and when an IC card is inserted from the card insertion slot 1706, the insertion status is detected by the sensor, the motor is driven, and the inserted IC card is pulled in up to the prescribed position. Furthermore, when the credit information is written on the IC card after the prescribed operation of the TAKE WIN/COLLECT button 1032 (FIG. 9) is performed by the player, the IC card transport module 1253 performs reverse rotation of the motor to eject the IC card on which the credit information has been written outside from the card slot.

The ejecting position sensor 1752 is used to detect the IC card ejected from the IC card insertion slot 1706, and an optical sensor may be used for this purpose. The loading position sensor 1753 is used to detect the IC card inserted from the IC card insertion slot 1706 to the prescribed position, and an optical sensor may be used for this purpose.

Figure 18:
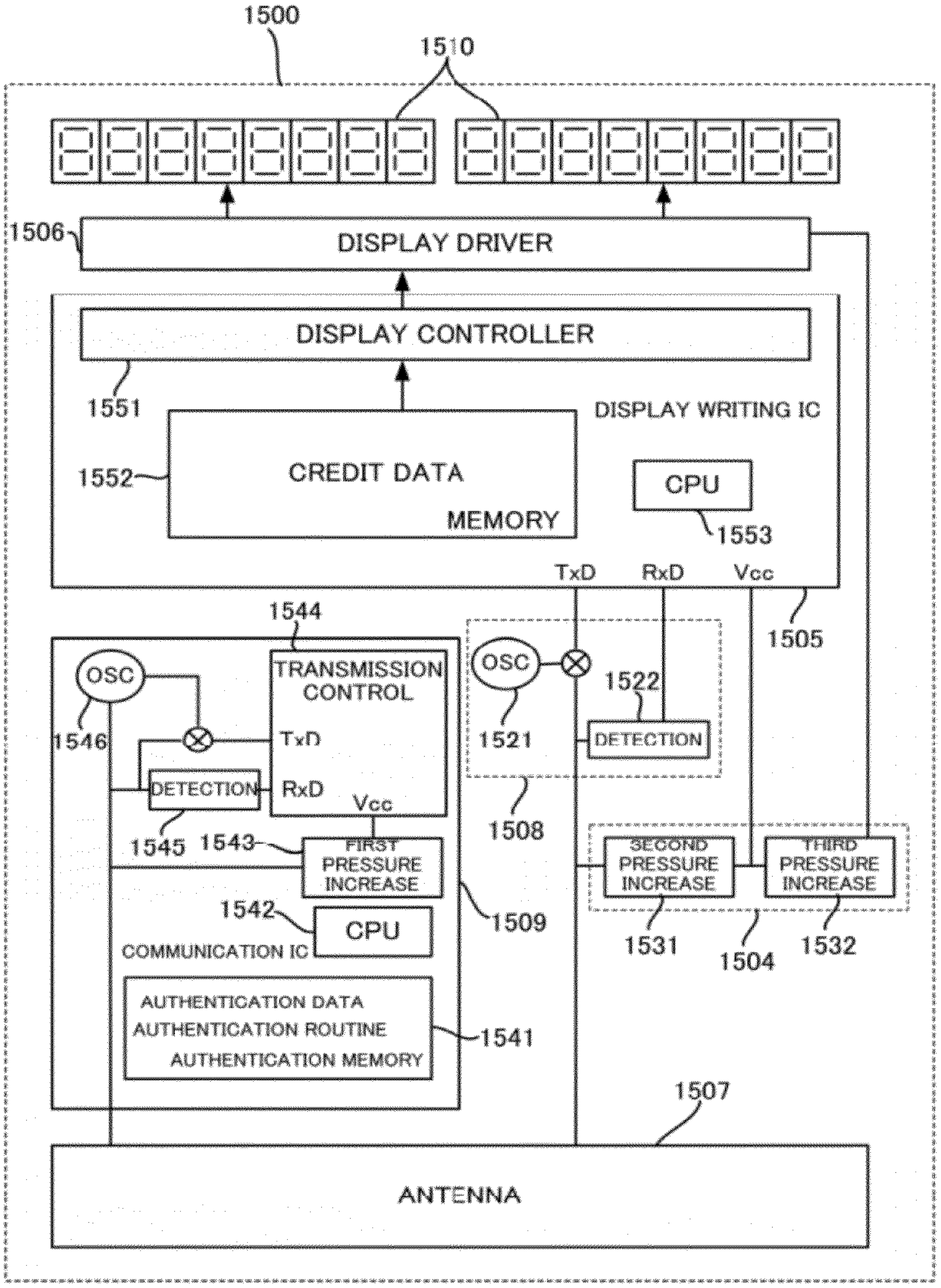
FIG. 18 is a block diagram showing a circuit configuration of the IC card according to the embodiment of the present invention.

The following describes a circuit of the IC card 1500 with reference to FIG. 16 and FIG. 18.

As shown in FIG. 16, the IC card 1500 has an antenna 1507, a power control circuit 1504, a modem circuit 1508, a display writing IC 1505, a display driver 1506, and a display unit 1510.

The antenna 1507 transmits and receives various signals which belong to the PTS terminal 1700, via the antenna 1701.

The power control circuit 1504 has a second pressure increase circuit 1531 and a third pressure increase circuit 1532 as shown in FIG. 18. The second pressure increase circuit 1531 raises the voltage of a signal from the antenna 1507 to a voltage that the later-described modem circuit 1508 can handle. The third pressure increase circuit 1532 raises the voltage from the power supply to a voltage with which the later-described display driver 1506 can be driven.

As shown in FIG. 18, the modem circuit 1508 has a transmitter 1521 and a detection circuit 1522. The transmitter 1521 outputs a signal having a specific frequency, and converts the signal to a signal that the later-described display writing IC 1505 can handle, by mixing the signal with a signal received from the antenna 1507. The detection circuit 1522 detects a signal received from the antenna 1507.

As shown in FIG. 18, the display writing IC 1505 has a CPU 1553, a credit data memory 1552, and a display controller 1551.

The CPU 1553 rewrites and updates cash data stored in the credit at a memory 1552, based on cash data retrieved from the PTS terminal 1700.

Further, the CPU 1553 controls the display controller 1551 so as to cause the display controller 1551 to use the cash data stored in the credit data memory 1552 as data for displaying cash data, and to display the cash data on the display unit 1510 through the later-described display driver 1506.

The credit data memory 1552 stores therein the earlier-mentioned cash data rewrite and update program, and credit-related data such as cash data, an identification code and cash data for display.

The display controller 1551, based on a control signal from the CPU 1553, acquires credit data for display that is stored in the credit data memory 1552, and displays it on the display unit 1510 via the display driver 1506.

As shown in FIG. 16, the IC card 1500 has a communication IC 1509.

As shown in FIG. 18, the communication IC 1509 has a first pressure increase circuit 1543, a transmitter 1546, a detection circuit 1545, a transmission control unit 1544, a CPU 1542, and an authentication memory 1541.

The first pressure increase circuit 1543 increases the voltage of terminal-side authentication data acquired from the PTS terminal 1700 to a voltage that the CPU 1542 can handle.

The transmitter 1546 outputs a signal having a specific frequency, and converts it to a signal that the CPU 1542 can handle, by mixing the signal with a signal received from the antenna 1507. The detection circuit 1522 detects a signal received from the antenna 1507.

The CPU 1542 executes an authentication routine program and transmits an identification code stored in a later-described authentication memory 1541 to the PTS terminal 1700, when an authentication request is issued by the PTS terminal 1700.

The authentication memory 1541 stores therein an authentication routine program used by the CPU 1542 and an identification code.

In this way, the IC card 1500 includes the credit data memory 1552 that stores a plurality of types of data such that it can be rewritten; the antenna 1507 that performs data communication with the PTS terminal 1700; the CPU 1542 that performs authentication based on data communication with the PTS terminal 1700 and that allows access to the credit-related data stored in the credit data memory 1552 from the PTS terminal 1700 when authentication has been performed correctly; and the display unit 1510 that displays at least a part of the credit-related data stored in the credit data memory 1552.

According to the above-mentioned configuration, by displaying at least a part of the credit-related data of the credit data memory 1552 on the display unit 1510, at least a part of the credit-related data stored in the credit data memory 1552 is visible from outside. Thus, when the credit-related data of the credit data memory 1552 is rewritten by the PTS terminal 1700, and the rewritten credit-related data is the credit-related data that is displayed on the display unit 1510, the rewritten results can be checked from the display of the display unit 1510. Also, due to the fact that the credit-related data of the credit data memory 1552 that is rewritten by the PTS terminal 1700 is used for display of the display unit 1510, the credit-related data stored in the same credit data memory 1552 is set to a state where it is used for both update and display by the PTS terminal 1700. Thus, in comparison to the case when the credit-related data of the credit data memory 1552 is transported to another storage unit as data for display, and is stored and displayed as data for display in the other storage unit along with the update of the credit-related data of the credit data memory 1552, data mismatch due to generation of noise during data transport is prevented, and the credit-related data of the credit data memory 1552 can be displayed in the display unit 1510 with high reliability.

Furthermore, in the IC card 1500, the credit data memory 1552 and the authentication memory 1541 store the card-side authentication data and credit-related data as a plurality of types of data, the CPU 1542 performs authentication based on the card-side authentication data and enables access of the credit data by the PTS terminal 1700, and the display unit 1510 displays the credit-related data.

According to the above-mentioned configuration, by displaying the credit-related data of the credit data memory 1552 on the display unit 1510, the credit-related data stored in the credit data memory 1552 is visible from outside. Thus, when the credit-related data of the credit data memory 1552 is rewritten by the PTS terminal 1700, and the rewritten credit-related data is the credit-related data that is displayed on the display unit 1510, the rewritten results can be checked from the display of the display unit 1510. Also, due to the fact that the credit-related data of the credit data memory 1552 that is rewritten by the PTS terminal 1700 is used for display of the display unit 1510, the credit-related data recorded in the same credit data memory 1552 is set to a state where it is used for both update and display by the PTS terminal 1700. Thus, in comparison to the case when the credit-related data of the credit data memory 1552 is transported to another storage unit as data for display, and is stored and displayed as data for display in the other storage unit along with the update of the credit-related data of the credit data memory 1552, data mismatch due to generation of noise during data transport is prevented, and the credit-related data of the credit data memory 1552 can be displayed in the display unit 1510 with high reliability.

Furthermore, in the IC card 1500, even if data communication with the PTS terminal 1700 is being performed, the display unit 1510 may be made visible from outside.

According to the above-mentioned configuration, because the updated data can be checked from the display of the display unit 1510 immediately after it is updated by the PTS terminal 1700, a sense of security can be achieved by being able to check the data of the IC card 1500 at all times during the game (Symbols, Combinations, and the like).

The symbols 1501 displayed on the simulated reels 1151 to 1155 of the slot machine 1010 forms symbol columns. Each symbol 1501 forming a symbol column is given any one of the code Nos. 0 to 19 or more, as shown in FIG. 35. Each symbol column has a combination of symbols 1501 which are: "WILD," "FEATURE," "A," "Q," "J," "K," "BAT," "HAMMER," "SWORD," "RHINOCEROS," "BUFFALO," and "DEER."

As shown in FIG. 7, any four consecutive symbols 1501 of a symbol column are displayed (arranged) in the uppermost tier, the upper tier, the lower tier, and the lowermost tier of the corresponding one of the simulated reels 1151 to 1155, respectively, thereby forming a symbol matrix of five columns and four rows under the display window 1150. Scrolling of symbols 1501 forming a symbol matrix starts when a game is started at least by pushing the start button 1046. The scrolling of the symbols 1501 stops (rearrangement) after a predetermined period of time has elapsed since the scrolling began.

Further, various winning combinations are set beforehand for each symbol 1501. A formed winning combination means achieving a winning. A winning combination is a combination of symbols 1501 stopped on the payline L, which combination of symbols 1501 puts a player into an advantageous state. Examples of the advantageous state includes: when a predetermined number of coins corresponding to the winning combination are paid out; when the number of coins to be paid out is added to a credit amount; when a bonus game is started; and the like.

In the present embodiment, a winning combination is a combination of symbols 1501 which is formed on an activated payline L and includes a predetermined number of at least one kind of the following symbols 1501: "WILD," "FEATURE," "A," "Q," "J," "K," "BAT," "HAMMER," "SWORD," "RHINOCEROS," "BUFFALO," and "DEER." When a predetermined kind of symbols 501 are set as scatter symbols, a winning combination is regarded as to be formed if a predetermined number or more of those symbols are rearranged, irrespective of the activation/inactivation status of the paylines L.

Specifically, a winning combination relative to "FEATURE" (a trigger symbol 1503*b*) stopped on a payline L serves as a bonus trigger and causes (i) transition of the gaming modes from the regular game to the bonus game and (ii) a payout according to the bet amount. Further, when a winning combination relative to a symbol 1501 of "BAT" stops on a payline L during the regular game, there is paid out an amount of coins (value) which is a product of a basic payout amount corresponding to the "BAT" multiplied by the bet amount.

(Regular Game Symbol Table)

Figure 19:
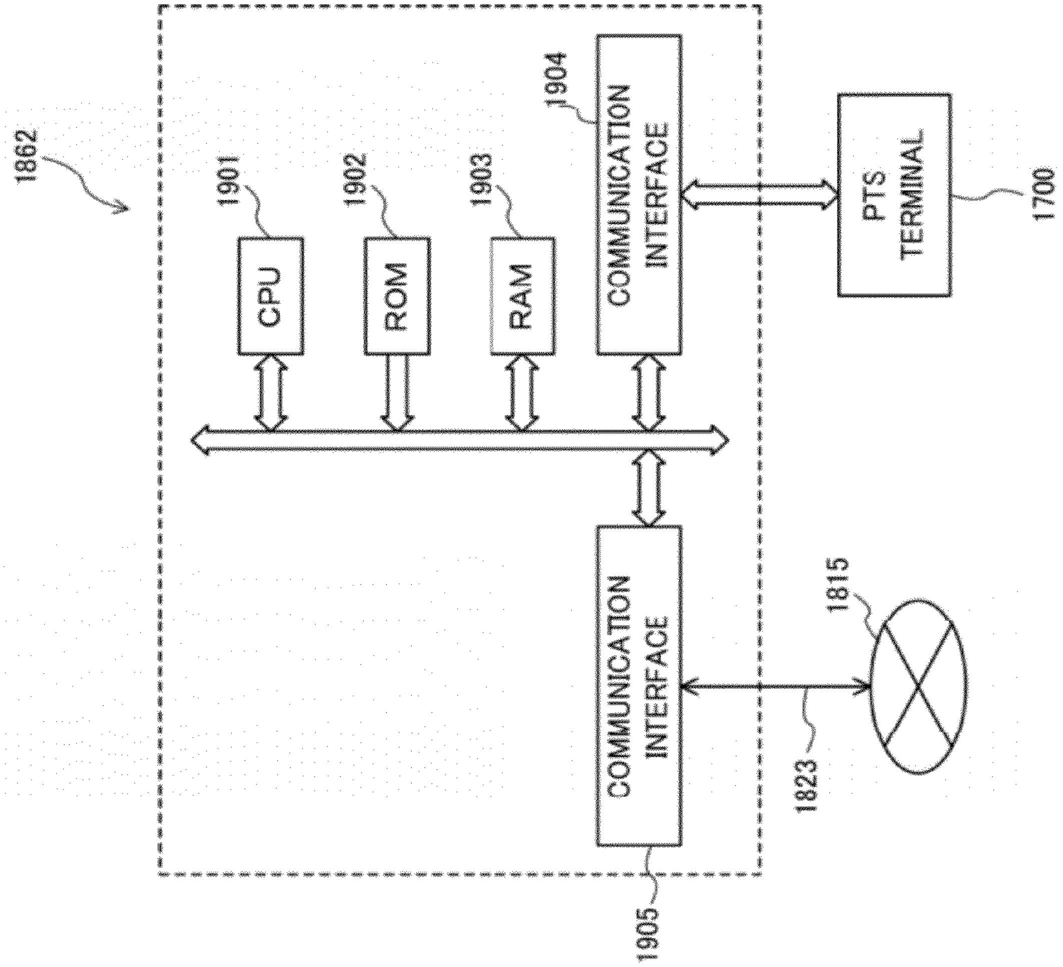
FIG. 19 is a block diagram showing the configuration of a currency exchange server.

FIG. 19 is a block diagram showing the internal configuration of the currency exchange server configuring the casino system according to the present embodiment. The currency exchange server 2862 includes a CPU 1901, a ROM 1902, a RAM 1903, a communication interface 1904, and a communication interface 1905. The communication interface 1904 is connected to the communication unit 1734 of the PTS terminal 1700 via a communication line. The communication interface 1905 is connected to the Internet 1015 via the communication line 1823. The ROM 1902 stores a system program for controlling the operation of the currency exchange server 2862; a currency exchange information acquisition program for acquiring the most recent exchange information via the Internet 1015; the permanent data; and the commission data showing the currency exchange commission rate P. The RAM 1903 temporarily stores the currency exchange information as well as the commission-subtracted currency exchange information.

Figure 20:
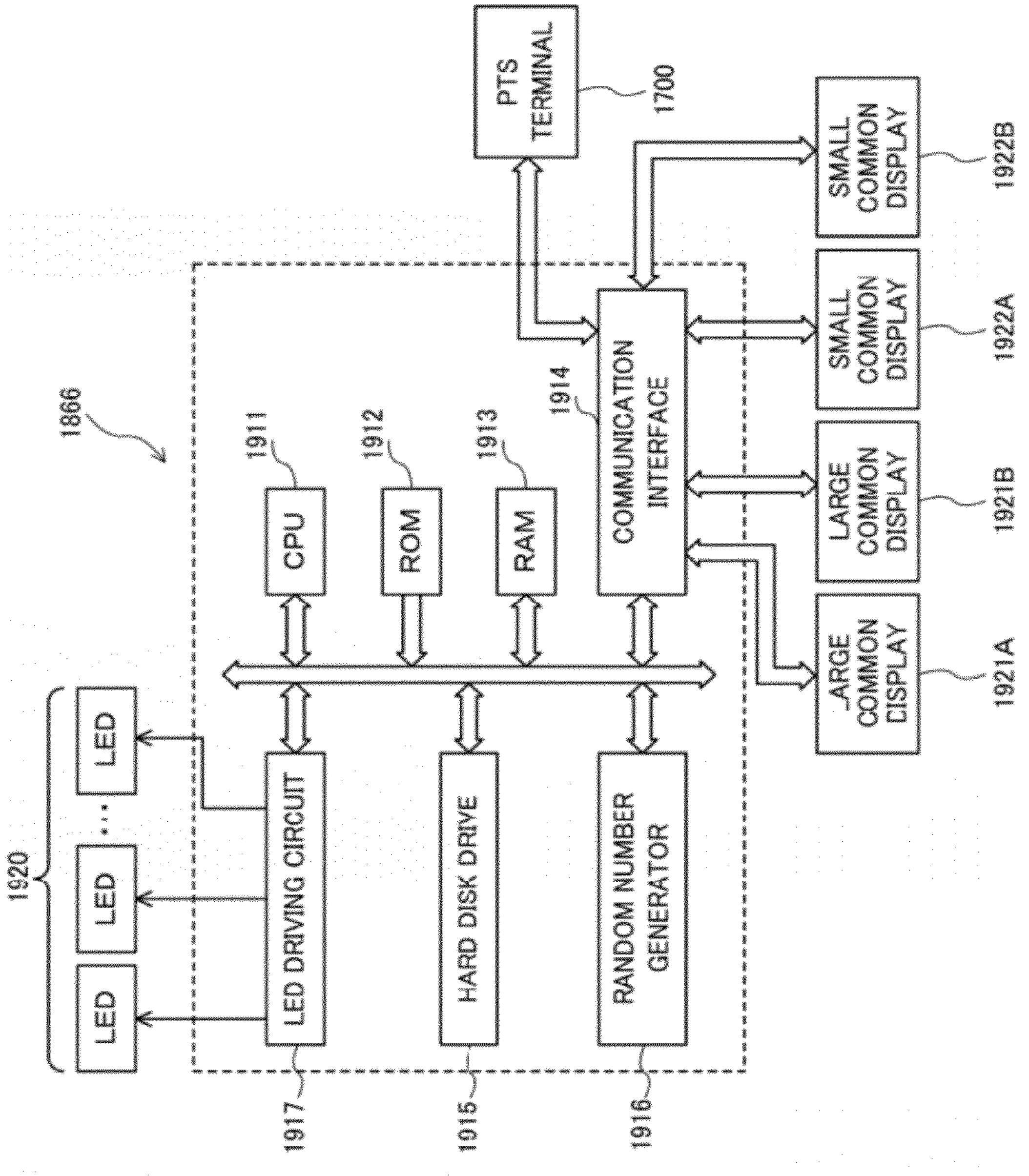
FIG. 20 is a block diagram showing the configuration of a megabucks server.

FIG. 20 is a block diagram showing the internal configuration of the megabucks server configuring the gaming system according to the present embodiment. The megabucks server 1866 includes a CPU 1911, a ROM 1912, a RAM 1913, a communication interface 1914, an LED drive circuit 1917, a random number generator 1916, and a hard disk drive 1915 as the memory. The random number generator 1916 generates a random number at a predetermined timing. The communication interface 1914 is connected to the communication unit 1734 of the PTS terminal 1700 via a communication line and at the same time is connected to a large common display 1921A installed in the casino, a large common display 1921B, a small common display 1922A, and a small common display 1922B via a communication line. The ROM 1912 stores a system program for controlling the operation of the progressive server 1866 and the permanent data. The RAM 1913 temporarily stores the cumulative value data for EVENT TIME showing the cumulative value for EVENT TIME; the cumulative value data for bonus showing the cumulative value for bonus; lit count data showing the number of lit LEDs 1920 from among the LEDs 1920 provided in a connected luminescent belt installed on each slot machine 1010; and data received from each slot machine 1010.

The hard disk drive 1915 stores the emission count determination table data showing a plurality of types of emission count determination tables (bending portion-use emission count determination table and straight portion-use emission count determination table).

Furthermore, the hard disk drive 1915 stores the point number determination table data that is referenced when determining the number of points in a common game. The hard disk drive 1915 also stores data showing the prescribed values and data showing the specific values.

A plurality of LEDs 1920 are connected to the LED drive circuit 1917. An identification number is assigned to each LED 1920, and the LED drive circuit 1917 turns ON and turns OFF the LED 1920 based on the signal received from the CPU 1911.

Figure 21:
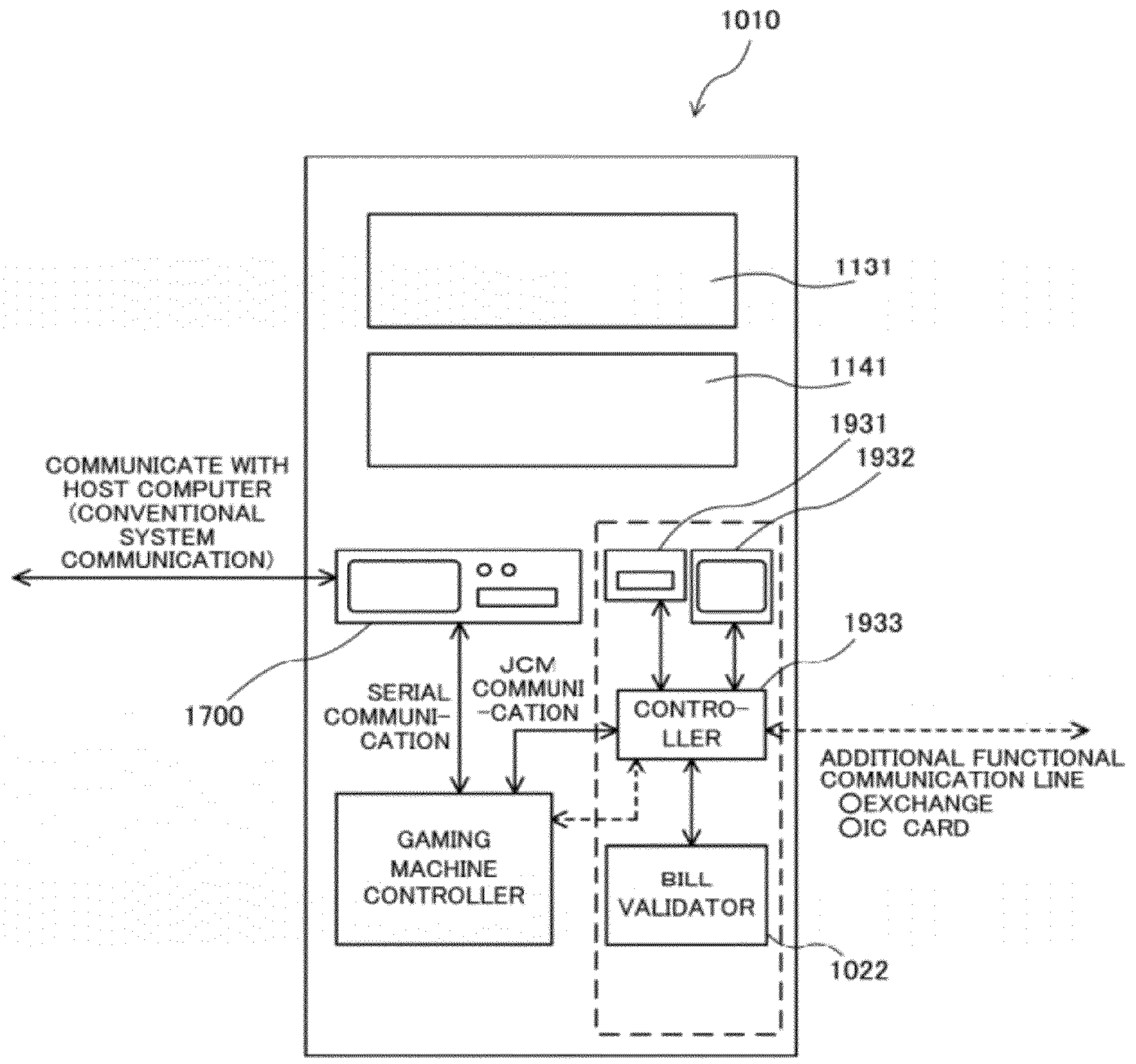
FIG. 21 is an outlined line drawing showing a communication connection state of the PTS terminal.

FIG. 21 is a schematic diagram showing the configuration example when the PTS terminal 1700 and the money exchange unit (an IC card R/W 1931, an LCD display unit 1932, and a controller 1933) are installed separately in the slot machine 1010. In the configuration shown in FIG. 21, by inserting a player-unique IC card in which the identification information for identifying the player is written into the IC card R/W 1931, the player is authenticated, after which the exchange function can be used. In such a case, the bill validator line of the slot machine 1010 is bypassed, and as far as money exchange is concerned, the communications with the bill validator and management server block 2820 (FIG. 1) are performed by the controller 1933. The controller 1933 forwards the money exchange results to the motherboard 1070 (FIG. 15) of the slot machine 1010.

FIG. 2 describing the configuration of the present embodiment is a schematic drawing showing the configuration in which the exchange function is integrated into the PTS terminal 1700. In this case, a player identification unit (a human body detection camera 1712 (1713), a microphone 1704 (1705), and a human body detection sensor 1115 (FIG. 12)) are installed in the PTS terminal 1700 for authentication of the player. In the PTS terminal 1700, by maintaining the conventional system communication, compatibility with the existing system can be secured, and at the same time, by having a communication line as an additional function, information related to authentication and money exchange can be added through a dedicated line. In the slot machine 1010 that is integrated with the PTS terminal 1700 as shown in FIG. 2, along with the capability of downloading various types of information from the management server block 2820 (FIG. 1), services such as megabucks, image recording, and personal rescue for individual players of the game can be provided through communication with the management server block 2820.

Figure 22:
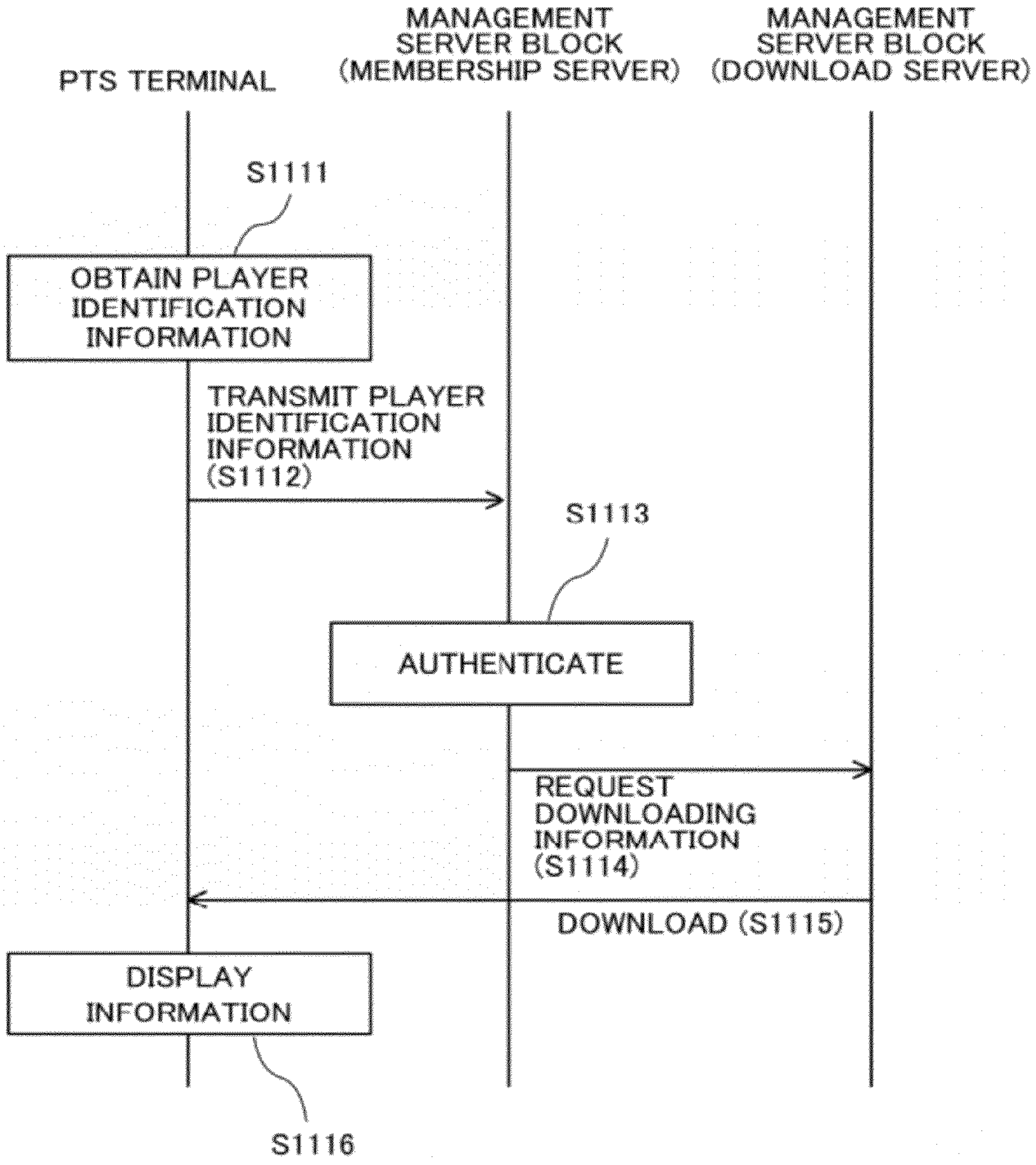
FIG. 22 is a timing chart showing a process procedure of the PTS terminal and a management server block.

For example, as shown in FIG. 22, in the PTS terminal 1700, the player identification information such as images and audio is acquired (step S1111) by the player identification unit (the human body detection camera 1712 (1713), the microphone 1704 (1705), and the human body detection sensor 1115 (FIG. 12)), and this information is sent to the member management server 1864 of the management server block 2820 (step S1112). In the member management server 1864, the player is identified based on the received player identification information, and authentication is performed based on these identification results (step S1113). If the authentication results indicate an already registered member, a download request, for example, is sent to the download server 1863 from the member management server 1864 along with the information for identifying the PTS terminal 1700 (step S1114). Thus, specific service information is downloaded from the download server 1863 to the PTS terminal 1700 of the slot machine 1010 on which the player is playing (step S1115). For example, if this player is a player who is already registered in the member management server 1864 (FIG. 2) of the management server block 2820, valuable information (such as information about product sales and information about performance in the gaming arcade) is downloaded to the PTS terminal 1700 that transmits the information about the concerned player to the download server from the member management server 1864. This information is displayed on the LCD 1719 of the PTS terminal 1700 (step S1116).

In this way, the PTS terminal 1700 is installed as one unit in the slot machine 1010, and an LCD 1719 is installed at the front of this PTS terminal 1700 where it is easily visible according to the posture of the player playing on the slot machine 1010. Thus, a human body detection camera 1712 (1713), which takes images of the face of the player from the front and at an angle when the posture of the player is maintained, is installed in the PTS terminal 1700, the microphone 1704 (1705) that collects the audio of the player when his/her posture is maintained is installed in the PTS terminal 1700, and finally, the human body detection sensor 1115 that detects the player at his/her maintained posture is also installed as the player identification unit.

This player identification unit, LCD 1719, and card insertion slot 1706 are positioned at specific positions in the PTS terminal 1700 by the PTS panel 1105 (FIG. 11). As described above, these positions correspond to the natural posture of the player when playing games on the slot machine 1010. By integrating such a PTS terminal 1700 having a fixed positional relationship into the slot machine 1010, the player can be identified precisely.

Furthermore, because it is necessary to install the PTS terminal 1700 at a restricted location in the slot machine 1010 called the PTS terminal installation area, the speakers 1707 and 1708 (FIG. 13) of the PTS terminal 1700 are installed at the backside of the LCD 1719, and the sound effect from these speakers 1707 and 1708 is output to the front face from ducts 1707A and 1708A opening to the front of the LCD 1719. Thus, the PTS terminal 1700 can be further reduced in size to the extent that speakers 1707 and 1708 can be installed on the backside, and the PTS terminal 1700 can be arranged in the limited PTS terminal installation area.

Next, the process procedure according to the controller (CPU 1731, ROM 1733, and RAM 1732) of the PTS terminal 1700 is described.

Figure 23:
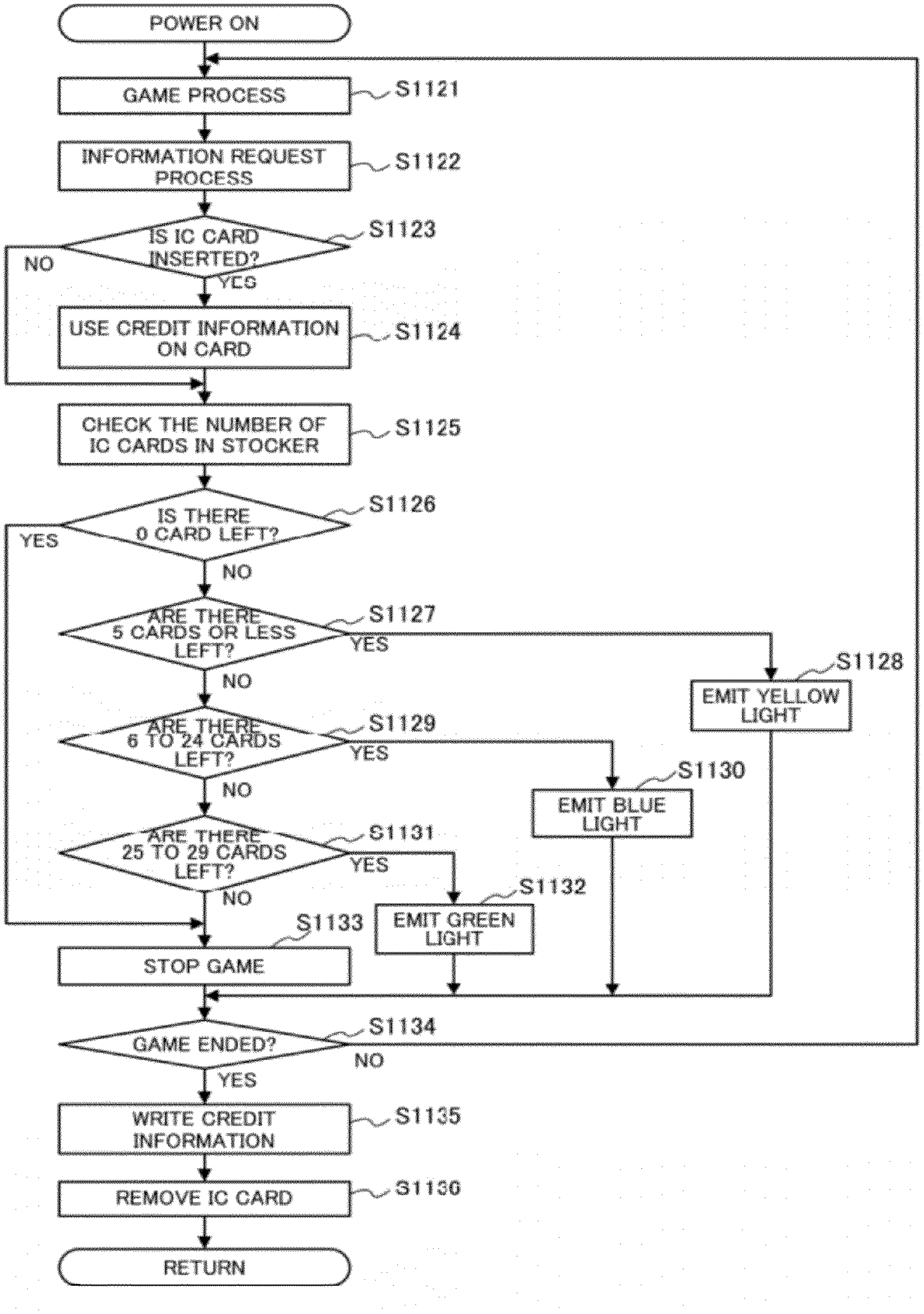
FIG. 23 is a flowchart showing a process procedure in the PTS terminal.

FIG. 23 is a flowchart showing the process procedure according to the controller of the PTS terminal 1700. As shown in FIG. 23, when power is supplied to the PTS terminal 1700 (slot machine 1010), the game process of the slot machine 1010 is executed in the step S1121. Thus, during the game, the controller of the PTS terminal 1700 executes the information request process in step S1122. This request process includes acquisition of the player identification information by the player identification unit (human body detection camera 1712 (1713), the microphone 1704 (1705), and the human body detection sensor 1115) installed in the PTS terminal 1700, and presentation of specific service information to the player from the management server block 2820 based on this identification information.

During this process, the controller uses the human body detection camera 1712 (1713) from the player identification unit to photograph the face of the player from the front (or at an angle) and acquires face images to identify the player. This face image data is saved in the hard disk drive 1751 of the PTS terminal 1700. Furthermore, the controller uses the microphone 1704 (1705) from the player identification unit to collect the audio of the player from the front (or at an angle). In such a case, by performing such a display on the LCD 1719 so as to prompt the occurrence of the audio, the controller can precisely acquire the audio of the player. This audio data is saved in the hard disk drive 1751 of the PTS terminal 1700.

The process executed above in step S1122 corresponds to the player identification information acquisition process (step S1111) shown in FIG. 22. As described above with regard to FIG. 22, by sending this acquired information to the management server block 2820 (FIG. 1), the controller authenticates the information in the member management server 1864 of the management server block 2820, and if it is determined that the player is a legitimate registered player, information significant for the player is downloaded to the PTS terminal 1700 from the download server 1863. This information is displayed on the LCD 1719.

After the information request process, the controller moves the process to the step S1123, and determines whether or not an IC card has been inserted in the card insertion slot 1706 of the PTS terminal 1700 (FIG. 12). The insertion of the IC card is detected by the sensor installed in the card insertion slot 1706. As for this sensor, it can be detected whether the shutter is moved by the IC card, or an optical sensor may even be used.

If positive results are acquired in step S1123, this implies that an IC card is inserted, and the controller moves the process from step S1123 to step S1124 to use the credit information written in the card for the gaming purpose. In other words, this credit information is stored in the RAM 1073 of the slot machine 1010 and is set to a state in which it can be used in the game, and this condition is displayed in the credit amount display unit 1400 of the lower image display panel 1141 of the slot machine 1010.

After the process of step S1124, or if negative results are obtained in step S1123, the controller moves the process to step S1125, and checks the number of IC cards stocked in stocker 1121 (FIG. 14). The number of the stocked IC cards can be acquired by the IC card R/W (antenna 1701 and modem unit 1721 shown in FIG. 16) connected to the PTS terminal 1700 by reading the identification information specific to each stocked IC card. The method for detection of the stock count is not limited thereto, for example, an optical sensor may also be used for the purpose of detection.

Once the checking process of step S1125 is complete, the controller moves the process to step S1126, and determines whether or not the number of stocked IC cards detected in step S1125 is 0. If the number of remaining cards is 0 (zero), the controller moves the process from step S1126 to step S1133, and stops the game. Thus, the situation in which game results that must be written in the corresponding IC card are acquired can be avoided when there is no IC card.

On the other hand, if negative results are obtained in step S1126, this implies that the number of stocked cards is one or more, and the controller moves the process from step S1126 to step S1127, and determines whether or not the remaining number of stocked cards is between one and five. If positive results are obtained here, this implies that the remaining number of stocked cards is between one and five, and the controller moves the process from step S1127 to step S1128 and lights up the LED in yellow. Thus, it can be appealed to the staff of the casino that the remaining number of stocked IC cards is becoming less. Note that the condition of illumination in accordance with the remaining number of IC cards is stored in the RAM 173 (FIG. 16 and FIG. 17) as a table shown in FIG. 24.

On the other hand, if negative results are obtained in step S1127, this implies that the remaining number of stocked cards is not less than five, and the controller moves the process from step S1127 to step S1129, and determines whether or not the remaining number of stocked cards is between six and 24. If positive results are obtained here, this implies that the remaining number of stocked cards is between six and 24, and the controller moves the process from step S1129 to step S1130 and lights up the LED in blue. Thus, it can be appealed to the staff of the casino that a sufficient number of stocked IC cards is remaining.

On the other hand, if negative results are obtained in step S1129, this implies that the remaining number of stocked cards is not between six and 24 (in other words, not less than 24), and the controller moves the process from step S1129 to step S1131, and determines whether or not the remaining number of stocked cards is between 25 and 29. If positive results are obtained here, this implies that the remaining number of stocked cards is between 25 and 29, and the controller moves the process from step S1131 to step S1132 and lights up the LED in green. Thus, it can be appealed to the staff of the casino arcade that the remaining number of stocked IC cards is approaching the full status.

On the other hand, if negative results are obtained in step S1131, this implies that the remaining number of stocked cards is 30 (full status), and the controller moves the process from step S1131 to step S1133, and stops the game. Thus, the situation in which an IC card is put again in the card insertion slot 1706 by a new player when IC cards are already full can be prevented.

After the process of step S1128, step S1130, step S1132, or step S1133, the controller moves the process to step S1134, determines whether or not the game on slot machine 1010 is over, and if the game is not over, returns the processing to the above-mentioned step S21 and repeats the same process.

On the other hand, if the game is over, the controller moves the process from step S1134 to step S1135, and writes the payout resulting from the game as credit information on the IC card inserted into the card insertion slot 1706 by the player at that point, or to the IC cards stocked in the card stacker 1121 when no IC card has been inserted.

Thus, in the continuing step S1136, by controlling the IC card transport module 1253 (FIG. 17), the controller ejects the IC card on which the credit information is written from the card insertion slot 1706. During this ejection process, if the player leaves his/her seat based on the identification results of the player identification unit, he/she may forget to take the ejected IC card. Note that in this ejection process, when the player leaves from his/her seat based on the identification result of the player identification unit, there is a possibility that the ejected IC card is left behind. Therefore, by lighting up the LED 1709 (FIG. 16) to a specific illumination condition (such as blinking), the player may be urged to take notice. In fact, regardless of the identification results of the player identification unit, when the IC card is ejected out, the LED can be set to light up to a specific condition at all times. Furthermore, if the player is not detected for a certain period of time based on the detection results of the human body detection sensor 1115, the acquisition of the IC card by a person other than the player can be prevented by stopping (returning back) the ejection of the IC card.

Based on the explained process procedure, in the PTS terminal 1700, significant information can be provided to the player playing on the slot machine 1010 at that point from the management server block 2820 (FIG. 1), and by lighting up the LED 1709 installed in the vicinity of the card insertion slot 1706 (FIG. 12) in accordance with the remaining number of IC cards stocked in the IC card stocker 1121 (FIG. 8), the remaining number of stocked IC cards can be displayed such that it is understood well from outside the PTS terminal 1700 (slot machine 1010). Thus, instead of opening up the slot machine 1010 for checking, the staff of the casino arcade can easily and precisely understand the remaining number of IC cards in the card stocker 1121.

As described above, by installing beforehand a human body detection camera 1712 (1713), microphone 1704 (1705), human body detection sensor 1115, LCD 1719, and card insertion slot 1706 for acquiring information to identify a player as one unit at the predetermined position in the slot machine 1010 in which the PTS terminal 1700 of the present embodiment has been loaded, the player can be identified with sufficient precision based on the positional relationship of this integrated unit.

That is, if the player sits in front of the slot machine 1010, he/she would be almost opposite the PTS terminal 1700 installed at the lower side of the lower image display panel 1141 of the slot machine 1010. In this condition, the LCD 1719 installed at the center on the front face of the PTS terminal 1700 would be positioned in front of the player. Thus, the player can view the LCD 1719 without changing his/her posture while playing on the slot machine 1010.

The human body detection camera 1712 (1713) and the microphone 1704 (1705) are installed on the upper side of the LCD 1719, and can be used to photograph the face of the player playing on the slot machine 1010 from the front, and also to collect the audio of the concerned player from the front.

The card insertion slot 1706 is provided on the right side of the LCD 1719. Thus, the player can insert and eject the IC card from the card insertion slot 1706 with his/her right hand without changing his/her posture while playing on the slot machine 1010. The human body detection camera 1712 (1713) and the microphone 1704 (1705) are installed on the upper side of the card insertion slot 1706, and can be used to photograph the face of the player playing on the slot machine 1010 from an angle, and also to collect the audio of the concerned player from an angle.

This information is compared with the player data already registered in the member management server 1864 of the management server block 2820.

In this way, in the PTS terminal 1700, due to the fact that each unit of the PTS terminal 1700 that is placed at the decided angle is mounted precisely at the position predetermined by the PTS panel 1105 (FIG. 11), authentication errors arising due to the error in the mounting position of the units used to identify the player, such as the camera and microphone can be prevented beforehand.

Also, due to the fact that the configuration within the PTS terminal 1700 is such that the speakers 1707 and 1708 are installed on the back side of the LCD 1719, and the sound output from these speakers 1707 and 1708 is output from the ducts 1707A and 1708A installed on both sides of the LCD 1719, the need of securing the installation area of speakers 1707 and 1708 that comparatively require an area is nullified, and the area of the front face of the PTS terminal 1700 can be reduced by that much amount. Also, the area on the front face of the PTS terminal 1700 that is not needed for the installation of the speakers 1707 and 1708 can be used for installing other units.

Also, in the slot machine 1010 of the present embodiment in which the PTS terminal 1700 is loaded, the number of IC cards remaining in the card stocker 1121 can be known from outside based on the illumination condition of the LED 1709 installed on the front face of the PTS terminal 1700. Thus, inconvenient situations such as exhaustion of IC cards in the card stocker 1121 during the game can be prevented beforehand.

<<IC Card Process>>

Figure 25:
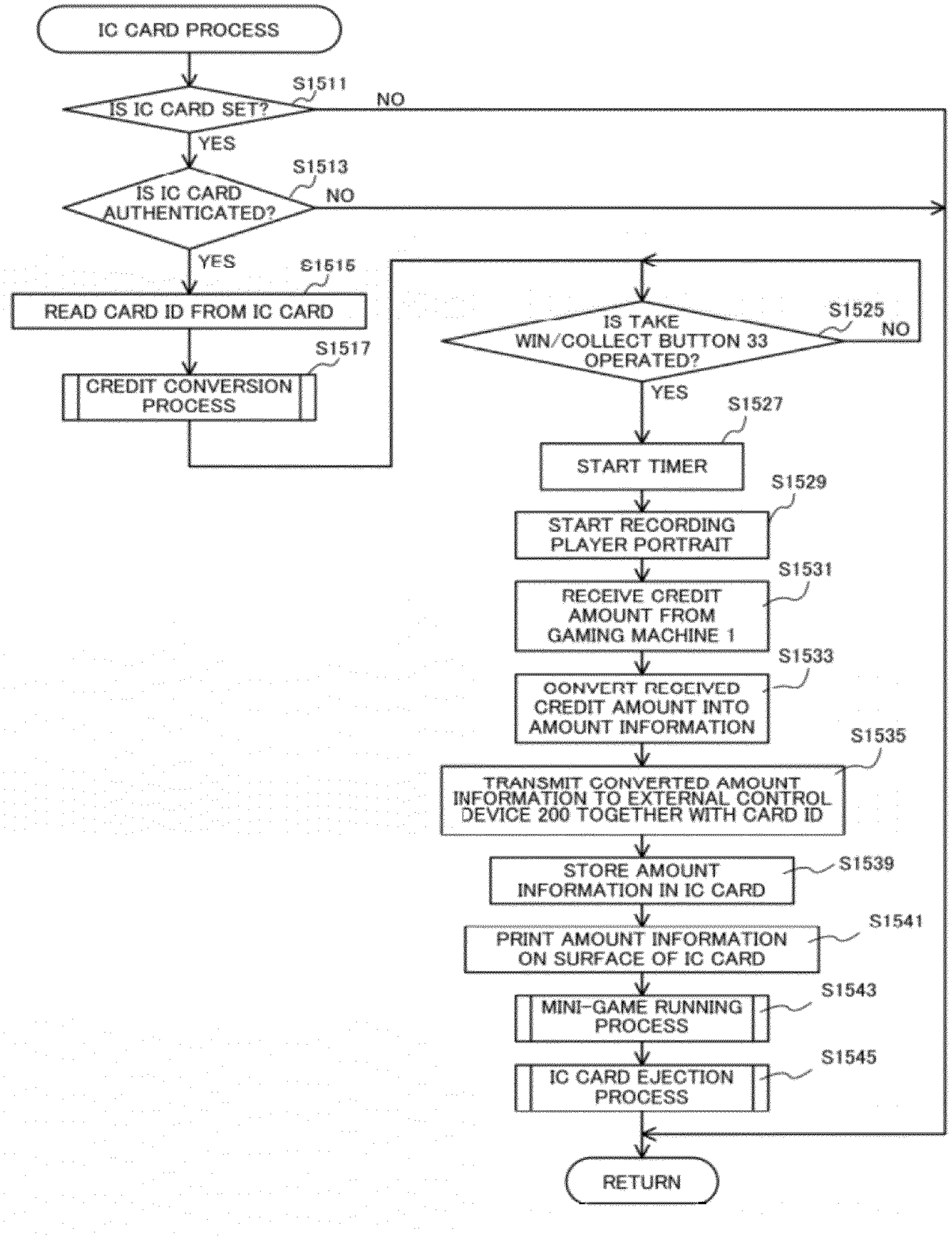
FIG. 25 is a flowchart showing a subroutine of a process of the IC card used at the PTS terminal according to the embodiment of the present invention.

FIG. 25 is a subroutine for executing the process related to the IC card. The IC card is inserted from the card insertion slot based on the operation by the player. When the motor for IC card transport in the IC card transport module 1253 (FIG. 14) is driven, the IC card inserted in the card insertion slot 1706 is loaded up to a position (hereinafter called the loading position) where it can be read and written. Also due to driving of the motor, the IC card can even be transported to the position of the stacker 1121. The stacker is of two types, namely the normal stacker (not shown in the figure) and the alert stacker (not shown in the figure). Both these stackers can hold only as many IC cards as the predetermined number.

The normal stacker is used to contain the initialized IC cards. The PTS terminal 1700 is electrically connected to the slot machine 1010, and when the player operates the TAKE WIN/COLLECT button 1032 of the slot machine 1010, a signal indicating this operation is supplied to the PTS terminal 1700. When the PTS terminal 1700 receives this signal, it transports one IC card from the normal stacker to the loading position through the pull-in motor. When the IC card is transported up to the loading position, the amount information indicating the amount of money corresponding to the number of credits remaining as a result of the game played by the player up to that point is stored, and the card is transported up to the eject position. The eject position is the position where a part of the IC card is exposed and protruding from the card insertion slot 1706. When this happens, the player can take out the IC card by holding it from the part that is exposed and protruding out from the card insertion slot 1706.

The alert stacker is used to contain IC cards for which an alert has been issued when the predetermined alert condition is satisfied. This alert condition is the condition when an IC card that has been transported to the eject position has not been removed by the player from the IC card insertion slot 1706 even after the passage of a predetermined time period. When this alert condition is satisfied, the motor is driven, the IC card is transported from the eject position up to the alert stacker, and is contained in the alert stacker.

First of all the CPU 1731 determines whether or not an IC card exists at the loading position (step S1511). This judgment process is based on whether or not a detection signal is issued from the sensor mounted at the IC card loading position. The sensor can be either an optical type or a mechanical type, which can detect the existence of the IC card and output a detection signal. Based on the existence of a detection signal, it is possible to determine whether or not the IC card is set at the loading position in a way that it can be read and written.

An IC card and an IC card R/W (reader/writer) for reading and writing (such as the antenna 1701 and modem unit 1721 described later in FIG. 16) are set at the above-mentioned loading position. By setting an IC card at the loading position, information can be written on the IC card and at the same time information can be read from the IC card through the reader/writer. When it is determined that no IC card exists at the loading position (NO), this subroutine is ended immediately.

When the CPU 1731 determines that an IC card exists at the loading position (YES), it is determined whether or not authentication could be performed (step S1513). Authentication is the process of reading the information specific to the IC card, and determining whether or not the card can be processed by the PTS terminal 1700. In this way, it can be confirmed that a card that has no relationship with the PTS terminal 1700 has not been set. Furthermore, if a user ID has been stored in the IC card, then by determining the contents of that user ID, it can also be determined if the IC card issued by that store is a legitimate card or not. If it is determined that authentication was not possible (NO), this subroutine is ended immediately.

If it is determined that authentication is possible, the CPU 1731 reads the card ID stored in the IC card (step S1515). The card ID is information for identifying an IC card, and a serial number may be used as a card ID. Next, the CPU 1731 invokes and executes the subroutine of the credit conversion process shown later in FIG. 31 (step S1517).

Following this, the CPU 1731 determines whether or not the TAKE WIN/COLLECT button 1032 of the slot machine 1010 has been operated by the player (step S1525). When it is determined that the player has not operated the TAKE WIN/COLLECT button 1032 of the slot machine 1010 (NO), the process is returned to step S1525. In this way, when the judgment process of step S1525 is repeated, the game progresses in accordance with the operation performed by the user in the slot machine 1010. Meanwhile, in the slot machine 1010, the credit amount changes in accordance with the progress of the game.

During the judgment process of step S1525, if it is determined that the TAKE WIN/COLLECT button 1032 of the slot machine 1010 has been operated (YES), the CPU 1731 starts the timer of the PTS terminal 1700 (not shown in the figure) (step S1527). This timer may be configured with either hardware or software.

Next, the CPU 1731 takes images of the figure of the player with the human body detection camera 1712 (1713) installed in the PTS terminal 1700, and stores this image data in the hard disk drive 1751 of the PTS terminal 1700 (step S1529). In this way, images of the figure of the player can be recorded.

Next, the CPU 1731 receives the credit amount sent from the slot machine 1010 (step S1533), converts the received credit amount to money amount information (step S1535), and then sends the converted money amount information to the external control device 1621 along with the card ID of the IC card (step S1537). In the external control device 1621, the sent money amount information is associated with the card ID and stored in the storage device of the external control equipment 1621.

By executing the process of the above-mentioned steps S1519 to S1535, the credit amount stored in the RAM 1073 of the slot machine 1010 is sent to the PTS terminal 1700 when the TAKE WIN/COLLECT button 1032 of the slot machine 1010 is operated by the player, and the amount information corresponding to the credit amount can be stored in the storage device of the external control device 1621. In this way, the money amount information managed in the external control device 1621 can be updated to the most recent status. Also whenever the game progresses in a slot machine 1010, the credit amount may be sent to the PTS terminal 1700 from the slot machine 1010.

Next, during the process of the step S1535, the CPU 1731 stores the converted money amount information in the IC card (step S1539), and prints the money amount information on the surface of the IC card (step S1541). The surface of the IC card is such that changeable character information can be printed by using E-INK, memory-type liquid crystal or electronic paper. The loading position of the above-mentioned IC card is equipped not only with a reader/writer for the storage area inside the IC card, but also with a printing mechanism for printing letters on the surface of this IC card.

Next, the CPU 1731 reads and executes the subroutine for running the mini-game 1 shown later in FIG. 27 or the subroutine for running the mini-game 2 shown in FIG. 33 (step S1543), and also reads and executes the subroutine for ejecting the IC card shown later in FIG. 26 (step S1545), and ends these subroutines.

By executing the subroutine shown in FIG. 25, the money amount information resulting from the game played on the slot machine 1010 can be stored in the storage area inside the IC card, and the money amount information can be printed on the surface of the IC card. In this way, instead of using the IC card reader, the player can understand information about the amount of money he/she owns at that point of time from the money amount information printed on the surface of the IC card.

Note that during the process of the above-mentioned step S1543, it may be stipulated to run only one of the mini-game 1 and mini-game 2 at all times, or either one may be executed selectively. During selective execution, either one of the games may be invoked through a drawing process.

<<IC Card Ejection Process>>

Figure 26:
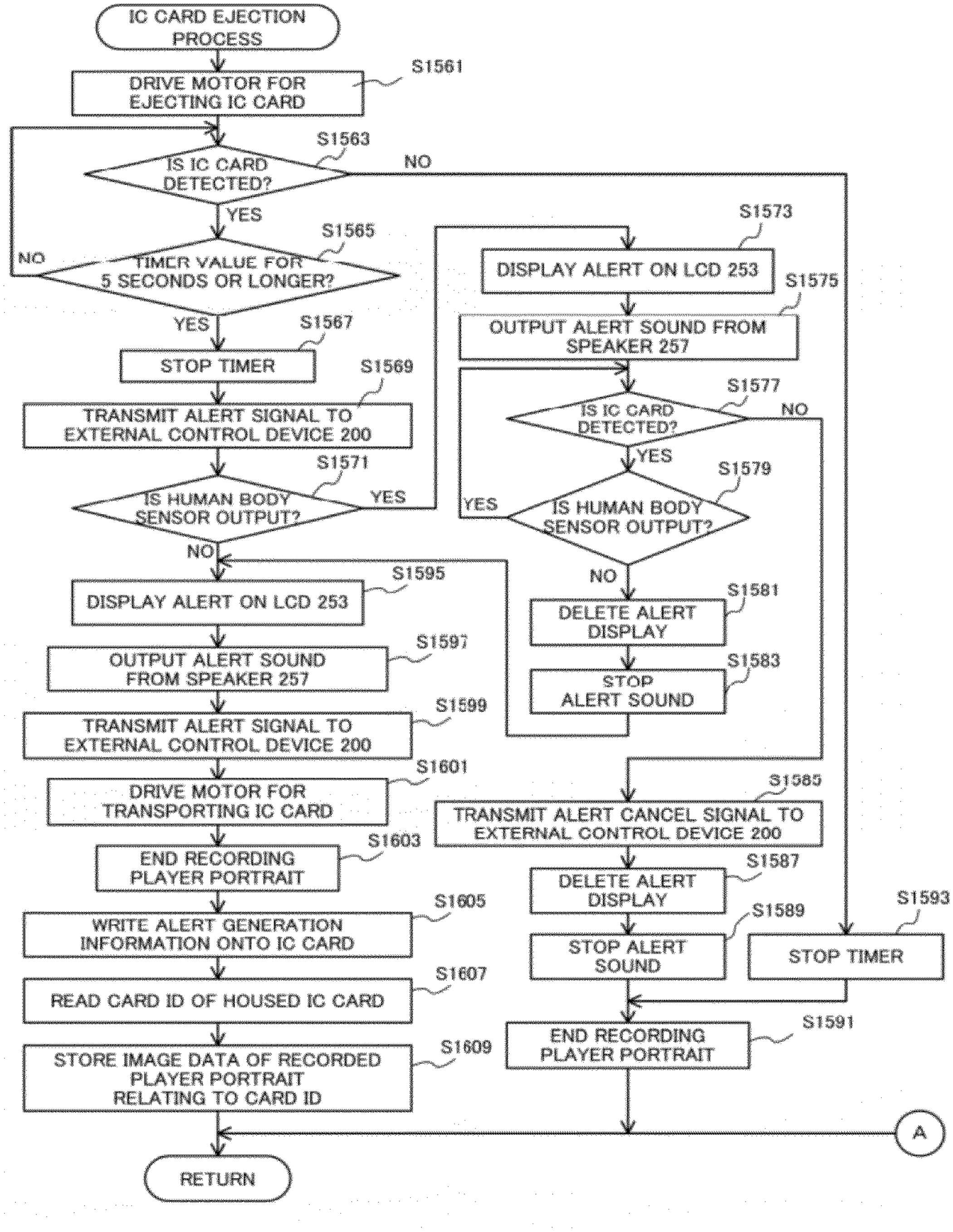
FIG. 26 is a flowchart showing a subroutine of a process of ejecting the IC card used at the PTS terminal according to the embodiment of the present invention.

FIG. 26 is the subroutine for running the process for transporting the IC card from the loading position to the eject position and then ejecting it.

First of all, the CPU 1731 drives the motor for transporting the IC card (step S1561). Next, the CPU 1731 determines whether or not an IC card exists in the card insertion slot 1706, in other words, whether or not an IC card exists at the eject position (step S1563). A sensor for detecting the IC card is installed in the card insertion slot 1706. The judgment process of step S1563 is executed by determining whether or not a detection signal is issued from this sensor. The sensor can be either an optical type or a mechanical type, which can detect the existence of the IC card and output a detection signal. Based on the existence of a detection signal, it is possible to determine whether or not the IC card is set in the card insertion slot 1706 (eject position).

Next, when it is determined that an IC card exists in the card insertion slot 1706 (YES), the CPU 1731 determines whether or not the timer value started during the process of the above-mentioned step S1527 is the predetermined time or more, for example, five seconds or more (step S1565). The predetermined time may be decided based on the time required from the moment the IC card is transported to the card insertion slot 1706 until the player takes out the IC card. When it is determined that the timer value is below the predetermined time (YES), the process is returned to step S1563.

On the other hand, when it is determined during the judgment process of step S1565 that the timer value is the predetermined time or more, the CPU 1731 stops the timer (step S1567), and sends an alert signal to the external control device 1621 (so-called hall server) (step S1569). In this way, if there is a possibility that the IC card has not been retrieved at the slot machine 1010, the same can be notified to the external control device 1621. Note that during the step S1569, it is desirable that an alert signal be sent to the external control device 1621 along with the specific identification number assigned to the slot machine 1010. In this way, along with the fact that the IC card has not been retrieved from the card insertion slot 1706, the external control device 1621 can identify the slot machine 1010 from which the IC card has not been retrieved.

Following this, the CPU 1731 determines whether or not an output signal has been issued from the human body detection sensor (step S1571). The human body detection sensor is used to determine whether or not a player exists in front of a slot machine 1010. Besides the above-mentioned human body detection camera 1712 (1713), the human body detection sensor can be the above-mentioned human body detection sensor 1115, or any sensor that can generally detect the presence of a human being in front of the slot machine 1010, such as a reflective photointerrupter based on an optical sensor. The human body detection sensor issues a detection signal when it detects the existence of a human body.

During the judgment process of step S1571, if it is determined that an output signal is issued from the human body detection sensor (YES), in other words, if it is determined that a player exists in front of the slot machine 1010, the CPU 1731 displays an alert on the LCD 1719 of the PTS terminal 1700 (step S1573), and outputs an alert sound from speakers 1707 and 1708 of the PTS terminal 1700 (step S1575). This alert display or the output of the alert sound is for the player playing a game on the slot machine 1010, and is used to urge the player to retrieve the IC card by making him/her aware of the fact that there is a possibility of failing to retrieve the IC card.

Next, the CPU 1731 determines whether or not an IC card exists in the card insertion slot 1706, in other words, whether or not an IC card exists at the eject position (step S1577). This judgment is similar to the judgment process of the above step S1563. The judgment is based on whether or not a detection signal is issued from the sensor installed in the card insertion slot 1706.

When the CPU 1731 determines that an IC card exists in the card insertion slot 1706 (YES), it determines whether or not a detection signal is issued from the human body detection sensor (step S1579). The judgment process of step S1579 is the same as the above step S1571. When it is determined that a detection signal is issued from the human body detection sensor (YES), the process is returned to step S1577. In other words, because a player exists in front of the slot machine 1010, he/she can be made aware that there is a possibility of failing to retrieve the IC card and thereby urged to retrieve the IC card through the display of an alert and output of an alert sound.

In the judgment process of the above step S1577, when it is determined that no IC card exists in the card insertion slot 1706, in other words, no IC card exists at the eject position (NO), the CPU 1731 sends an alert cancellation signal to the external control device 1621 indicating that the alert has been cancelled (step S1585). Based on the display of an alert and output of an alert sound in the above step S1573, the player recognizes that he/she has forgotten to retrieve the IC card, and then when the player takes out the IC card from the card insertion slot 1706, the cancellation of the alert condition can be notified to the external control device 1621 by sending an alert cancellation signal to the external control device 1621.

After the execution of the process of step S1585, the CPU 1731 cancels the alert display that is displayed during the process of step S1585 (step S1587), and at the same time, stops the alert sound issued during the process of step S1575 (step S1589). Following this, the CPU 1731 ends the recording of images of the figure of the player that is started in the process of the step S1529 of FIG. 25 (step S1591), and ends this subroutine.

Furthermore, during the judgment process of the above step S1563, when it is determined that no IC card exists in the card insertion slot 1706 (NO), in other words, when it is determined that there is no alert display and output of alert sound and the player has retrieved the IC card from the card insertion slot 1706, the CPU 1731 stops the timer that is started during the process of step S1527 (step S1593), and moves the process to the above-mentioned step S1591.

In this way, the process is executed by the above-mentioned procedure when there is no alert display and output of alert sound and the player retrieves the IC card from the card slot, and when the player recognizes that he/she has forgotten to retrieve the IC card based on the alert display and output of the alert sound and then retrieves the IC card from the card insertion slot 1706.

On the other hand, during the judgment process of step S1579, when it is determined that no detection signal is output from the human body detection sensor (NO), the CPU 1731 cancels the alert display that was displayed during the process of step S1573 (step S1581), and at the same time, stops the alert sound issued during the process of step S1575 (step S1583). In other words, because no player already exists in front of the slot machine 1010, there is no need to display an alert and to output an alert sound to the player, and the alert display and output of the alert sound is stopped.

During the judgment process of the above-mentioned step S1571, when it is determined that no output signal has been issued from the human body detection sensor (NO), in other words, when it is determined that no player is present in front of the slot machine 1010, or when the process of the above-mentioned step S1583 is executed, the CPU 1731 displays an alert on the LCD 1719 of the PTS terminal 1700 (step S1595), outputs an alert sound from speakers 1707 and 1708 of the PTS terminal 1700 (step S1597), and sends an alert signal to the external control device 1621 (the so-called hall server) (step S1599).

The processes of these steps S1595, S1597, and S1599 are the judgment process of steps S1571 and S1579, and is executed when it is determined that no player exists in front of the slot machine 1010. In other words, the processes of steps S1595, S1597, and S1599 are not meant to make the player aware of the fact that he/she has failed to retrieve the IC card, but is the process for the gaming arcade where the slot machine 1010 is installed. Therefore, the processes of step S1573 and S1575 including the alert display and alert sound must be different. In this way, the staff at the gaming arcade can be accurately notified about the existence of a slot machine 1010 on which the IC card has not been retrieved. Based on this alert display and alert sound, the staff can quickly reach the slot machine 1010 to take prompt action.

Furthermore, by storing the date and time of issue of the alert signal during the process of step S1599, as well as the identification information of the slot machine 1010 in the external control device 1621, cases of failure in retrieving the IC card can be managed. This facilitates accurate response when the gaming arcade is contacted by a player at a later date.

Following this, the CPU 1731 stores the IC card inside the PTS terminal 1700 from the eject position (step S1601) by driving the motor for pulling in the IC card (step S1601). Particularly, it is desirable that the IC card be contained in the alert stacker. The alert stacker is used to contain IC cards for which an alert has been issued when the predetermined alert condition is satisfied. This alert condition is the condition when an IC card that has been transported and is positioned at the eject position (step S1561) has not been removed by the player from the IC card insertion slot 1706 (step S1571 or S1575) even after the passage of a predetermined time period (step S1565). When this alert condition is satisfied, the motor is driven by the process in step S1601, the IC card is transported from the eject position up to the alert stacker, and is contained in the alert stacker. As described later, to execute the process of writing the alert occurrence information on the IC card and reading the card ID of the IC card, before containing in the alert stacker, the IC card must be transported to the loading position once and then it must be stored in the alert stacker after executing these processes.

When an IC card is not claimed, the staff must rush there to take appropriate action as described above. However, enough consideration is also given to the fact that the staff may not be able to rush there when they are busy with some other service. In such cases, some other player may procure an IC card that has not been retrieved, and may acquire credits illegally. Thus, by containing the unclaimed IC cards in the alert stacker, illegal actions can be prevented even when the staff cannot rush there.

After executing the process of step S1601, the CPU 1731 ends the process of taking images of the figure of the player that was started during the process of step S1529 of FIG. 25 (step S1603), transports the IC card once to the loading position, and writes the alert occurrence information showing the fulfillment of the alert condition (step S1605). In this way, it can be identified that the IC card has not been retrieved.

Next, the CPU 1731 reads the card ID of the IC card (step S1607), correlates the read card ID with the recorded data of images taken of the human figures, stores it in the hard disk drive 1751 of the PTS terminal 1700 (step S1609), and ends this subroutine.

Based on the process of step S1609, the table of the card IDs and the recorded data of images taken of the human figures that is stored in the hard disk drive 1751 of the PTS terminal 1700 is shown in FIG. 28. The table shown in FIG. 28 is a conceptual illustration of the data stored in the hard disk drive 1751 of the PTS terminal 1700. In the example shown in FIG. 28, the card ID is "001245", and the information must be such that the card ID can be identified. For example, the serial number of the card ID and the identification number assigned at the gaming arcade may be used. The recorded data can be, for example, movie data and various formats for the movie data that can be stored in the hard disk drive 1751 can be used. In the example shown in FIG. 28, the recorded data is "090715-131213-0012.avi", and this is the file name for storing in the hard disk drive 1751.

By storing the read-out card IDs and the recorded data of images taken of human figures in the hard disk drive 1751, if there is a query about any unclaimed IC cards from a player to the gaming arcade at a later date, the IC card can be promptly and precisely returned to the proper player by referencing the card ID and the recorded data of images taken of human figures.

During the judgment process of step S1571 of FIG. 26, when the human body detection sensor detects the presence of a player, first of all, an alert display and alert sound are issued to the player as the first level of alert. In spite of such an alert display and alert sound, if the player does not recognize the failure to retrieve the IC card and leaves the slot machine 1010 without retrieving the IC card, an alert display and alert sound are issued to the game arcade as the second level of alert.

In this way, by actively urging the player to recognize the failure to retrieve the IC card and at the same time, switching to an alert to the gaming arcade when the player fails to recognize the unclaimed IC card, illegal acts of retrieval of credits by another player can be prevented beforehand.

Note that various types of alert displays and alert sounds to be issued to the player must be stipulated beforehand, and the alert display and alert sound must be changed in accordance with the amount indicated in the money amount information. For example, an alert determination table that stipulates beforehand the type of alert in accordance with the amount indicated in the money amount information is stored in the ROM 1733 of the PTS terminal 1700. The types of alerts vary with the message contents, size and color of the characters, and the form of blinking as the types of alerts displayed on the LCD 1719. The types of sound alerts output from speakers 1707 and 1708 include the music and warning sound, and the loudness and magnitude of the sound.

The alert determination table is searched by using the amount indicated in the money amount information stored in the IC card, and the type of the alert is determined in accordance with amount indicated in the money amount information. Even if the amount indicated in the money amount information is large, if the IC card is left in the card insertion slot 1706, it may be simply that the IC card has been forgotten, and therefore, an alert that is easily recognized by the player and that stands out is desired. This process can also be executed by using the credit amount instead of the amount of money indicated in the money amount information.

In the judgment process of steps S1571 and S1579, instead of performing the judgment of whether or not a player is present by the human body detection sensor only one time, the judgment process can be executed a plurality of times, and can also be executed until a predetermined time period elapses. Because there is a possibility of change in the posture and bending when a player prepares to leave or when preparations are made for moving the slot machine 1010, if the judgment of whether or not a player exists is executed a plurality of times or for a predetermined period of time, it can be precisely determined whether or not the player exists.

<<Mini-Game 1 Running Process>>

Figure 27:
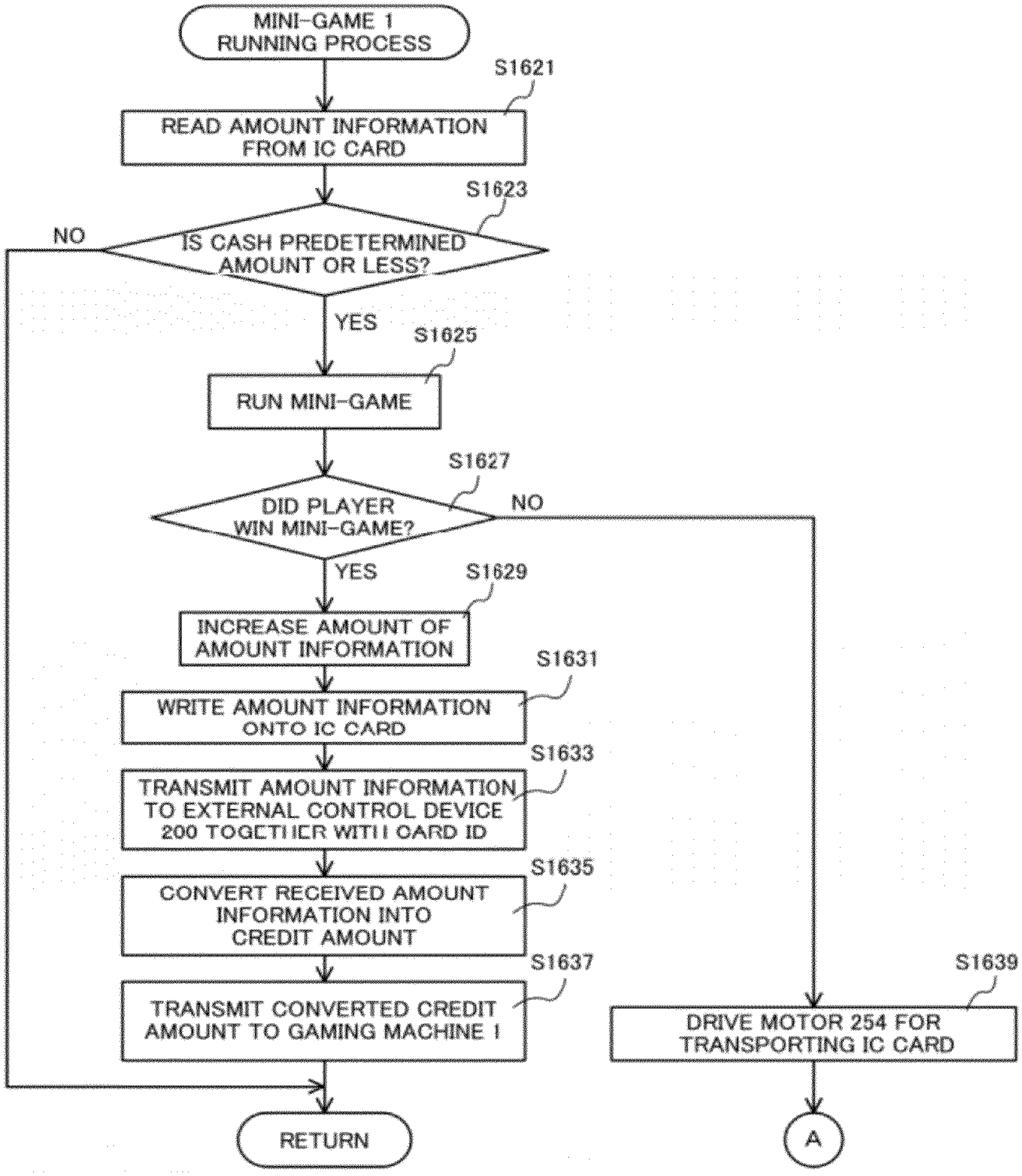
FIG. 27 is a flowchart showing a subroutine of a process of a mini-game 1 played at the PTS terminal according to the embodiment of the present invention.

FIG. 27 is the subroutine for running the mini-game 1 that is invoked and executed during the process of step S1543 of the above-mentioned FIG. 25. Therefore, in the present embodiment, mini-game 1 is executed in the PTS terminal 1700.

In the PTS terminal 1700 of the present embodiment, a bill of a different denomination can be converted to credits for the game. In other words, by inserting bill in the bill validator 1022 of the slot machine 1010, the amount indicated by the bill can be converted to credit amount in the PTS terminal 1700.

Specifically, conversion to credit amount takes place by the following process. First of all, when bill is inserted in the bill validator 1022 of the slot machine 1010 (or PTS terminal 1700), the denomination of the bill is determined. For example, it is determined whether the inserted bill is Hong Kong dollar or not. As described above, the bill validator 1022 of the slot machine 1010 (or PTS terminal 1700) is configured such that the bill of a different denomination can be inserted. When the inserted bill is of a specific denomination, it is immediately converted to credit amount in accordance with the amount of money of the inserted bill by the predetermined conversion standard (using a conversion formula). For example, if the inserted bill is Hong Kong dollar, it is converted as is to credit amount in accordance with the predetermined amount of bill.

On the other hand, when the inserted bill is not of a specific denomination, the amount of inserted bill is converted to an amount of money of a specific denomination in accordance with the rate at that point of time. For example, US dollars and yen are converted to Hong Kong dollars. By storing the rate at that point of time in the RAM 1732 of the PTS terminal 1700 for each denomination, conversion to an amount of a particular denomination is possible.

Next, the amount of money converted to a specific denomination is converted to credit amount by a predetermined conversion standard mentioned above (by using a conversion formula). For example, if the denomination of the inserted bill is US dollars and yen, first of all, the predetermined amount of bill is converted to Hong Kong dollars. Next, the converted amount of money is converted to credit amount.

As described above, when the amount of money is converted to a different denomination, the amount of money after conversion may include broken numbers depending on the rate. Thus, to avoid giving the player any disadvantage owing to conversion, even when the amount of money after conversion includes broken numbers, this amount of money after conversion is stored in the IC card.

<<Credit Conversion Process>>

Figure 31:
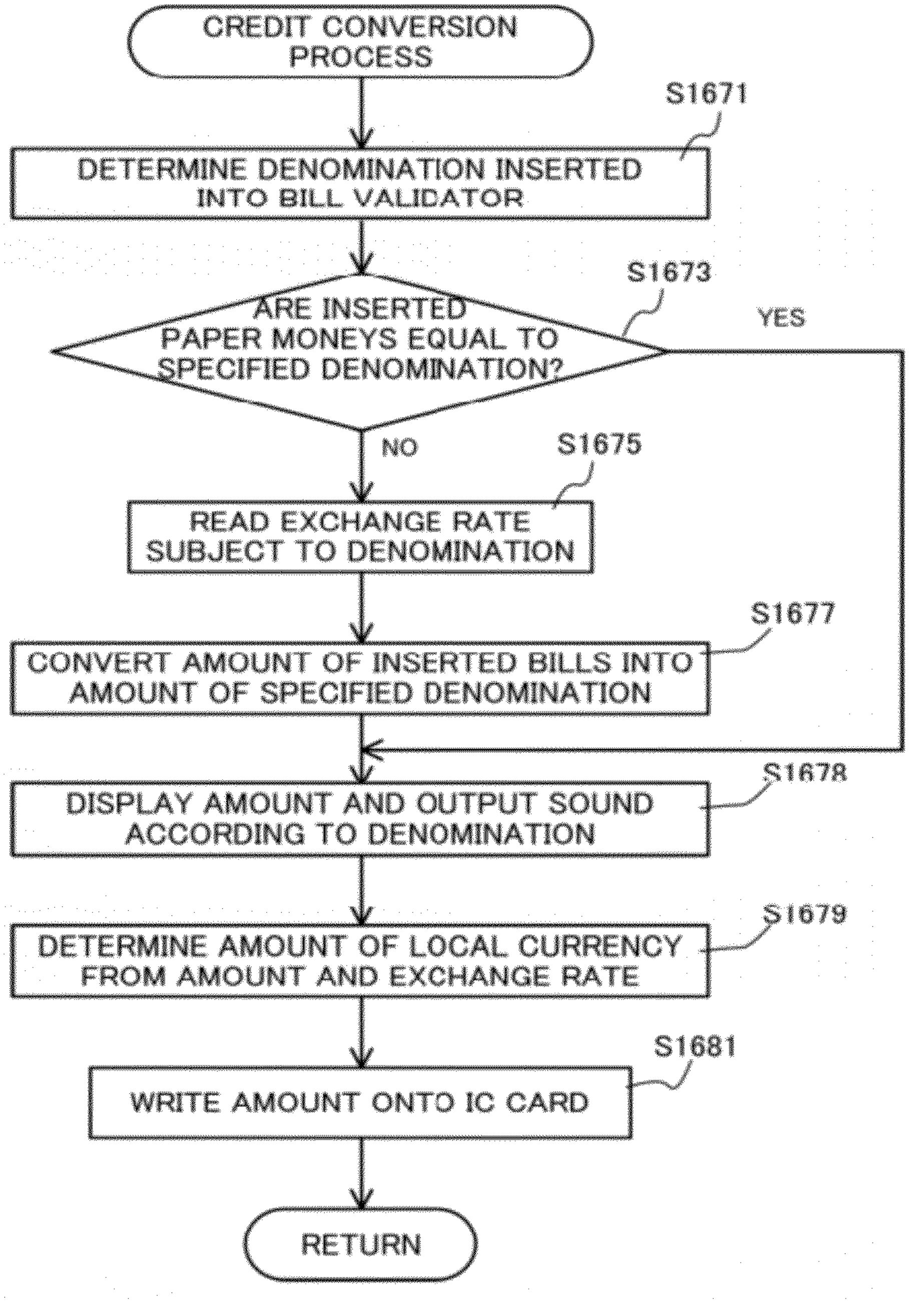
FIG. 31 is a flowchart showing a subroutine for converting into a credit amount according to a denomination of a bill inserted into a bill validator of a gaming machine in which the PTS terminal according to the embodiment of the present invention is installed.

FIG. 31 is the process executed in the PTS terminal 1700, and is the flowchart showing the subroutine for conversion to money amounts of a different denomination and to credit amount in accordance with the denomination of the bill inserted in the bill validator 1022 of the slot machine 1010. This subroutine is invoked and executed when it is detected that bill has been inserted in the bill validator 1022.

First of all, the CPU 1731 determines the denomination of the bill inserted in the bill validator 1022 of the slot machine 1010 (step S1671). This determining process is executed based on the denomination data expressing the type of money output from the bill validator 1022. Following this, the CPU 1731 determines whether or not the inserted bill is of a specific denomination (step S1673). When the CPU 1731 determines that the inserted bill is not of a specific denomination (NO), it reads the rate stored in the RAM 1732 of the PTS terminal 1700 in accordance with the denomination (step S1675). Next, the CPU 1731 converts the inserted amount of bill to an amount of money of a specific denomination by using the read-out rate (step S1677).

In the judgment process of the above step S1673, if the CPU 1731 determines that the inserted bill is not of a specific denomination (NO), or if the process of step 1677 is executed, a display in the language corresponding to the denomination is performed on the LCD 1719, and at the same time, audio output in a language corresponding to the denomination is performed from speakers 1707 and 1708. The display data and audio data corresponding to the denomination is already stored in the ROM 1733 of the PTS terminal 1700 (FIG. 16). Thus, the display and audio output are performed in a language corresponding to the denomination of the bill inserted in the bill validator 1022. For example, when a dollar bill is inserted in the bill validator 1022, the display will be performed in English on the LCD 1719, and at the same time, the instructions audio will be output in English from speakers 1707 and 1708.

The CPU 1731 determines the credit amount from the amount of money indicated by the inserted bill, the amount of money converted during the process of step S1677, and the rate corresponding to the denomination (step S1679). Finally, the CPU 1731 writes the amount of money on the IC card (step S1681), and ends this subroutine.

Note that because the rate changes progressively, it must be stored in the RAM 1732 of the PTS terminal 1700 in such a way that it can be updated at every fixed number of hours, or it can be updated to the most recent rate at every fixed period of time. The most recent value of the rate must be sent from the external control device 1621 to the PTS terminal 1700.

Figure 32:
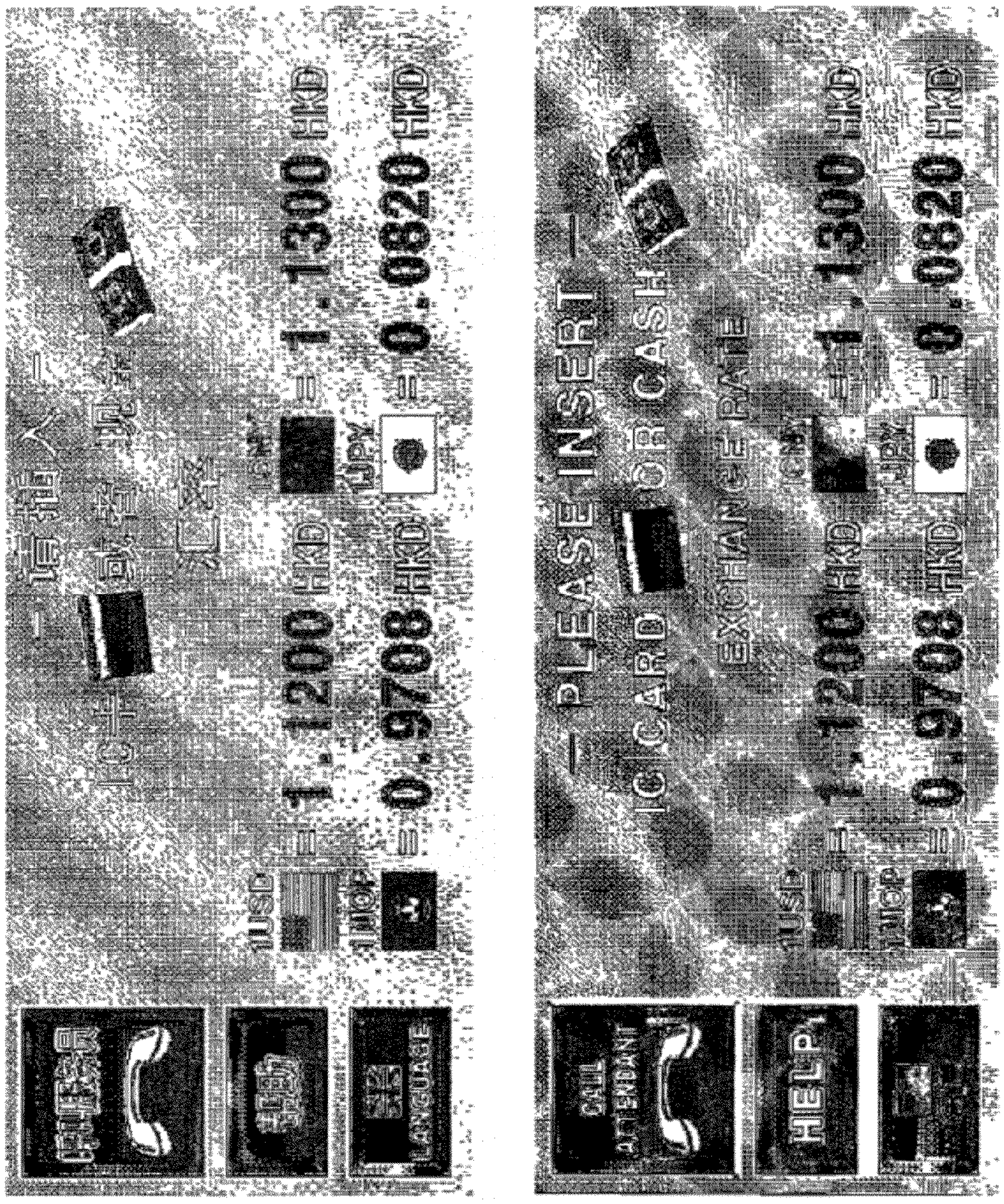
FIG. 32 is a diagram showing an example of a screen displayed on the LCD of the PTS terminal when the bill is inserted into the bill validator of the gaming machine in which the PTS terminal according to the embodiment of the present invention is installed.

FIG. 32 shows an example of the screen displayed on the LCD 1719 of the PTS terminal 1700 when bill is inserted in the bill validator 1022 of the slot machine 1010. FIG. 32(*a*) is the screen displayed before inserting the bill, and a Chinese message is displayed on the upper side of the screen. Furthermore, the respective rates of various denominations are displayed on the lower side of the screen when the amount of money is converted to Hong Kong dollars. In this way, each rate is stipulated up to four decimal points such that there are no disadvantages to the player during conversion of the denomination. Further, FIG. 32(*b*) is the screen displayed when US bill is inserted. It is determined that US bill is inserted in the bill validator 1022, and an English message appears on the upper side of the screen.

As described above, each rate corresponding to the denomination is stipulated up to four decimal points. Therefore, when conversion is performed based on the calculation process of the CPU 1731 of the PTS terminal 1700, no disadvantages are posed to the player because conversion can be performed accurately, but broken numbers may arise in the amount of money due to conversion of the denomination. Note that it is desired that the display on the LCD 1719 include the broken numbers as well. Particularly, when a mini-game is executed based on the process of step S1625 described later, the display must be performed on the LCD 1719. In this way, the player can be made aware of the fact that a mini-game is being executed due to the occurrence of broken numbers.

Thus, in cases wherein the amount of money remaining in an IC card is extremely less, such as in the case of broken numbers arising due to conversion of the denomination, a player may intentionally leave the IC card in the slot machine 1010 because cash-out is cumbersome. However, in such cases, if the configuration is such that an alert is issued when an IC card is not claimed, the frequency of occurrence of an alert would become high. Therefore, as described later, the amount of money stored in the IC card must be changed intentionally by executing a mini-game.

In the subroutine of the mini-game shown in FIG. 27, first of all, the CPU 1731 reads out the money amount information from the IC card set in the loading position (step S1621). Next, the CPU 1731 determines whether or not the amount of money indicated by the read-out money amount information is the predetermined count or less, for example, below the count equivalent to minimum cash-out unit 1 dollar (step S1623). When it is determined that the amount of money indicated by the read-out money amount information is more than the predetermined count (NO), this subroutine is ended immediately.

On the other hand, when the amount of money indicated by the read-out money amount information is the predetermined count or less (YES), the CPU 1731 executes a mini-game in the PTS terminal 1700 (step S1625). For the mini-game, it is desirable to use the LCD 1719 of the PTS terminal 1700. For example, a mini-game for selecting one card from two cards may be played. When the player selects the card with the larger number from among the two cards, he/she is considered to have won, and as described later, the amount of money indicated by the read-out money amount information ×120% is considered as the new money amount information, and when the player selects the card with the smaller number, he/she is considered to have lost. As described later, when a player loses a mini-game, the IC card is contained inside the PTS terminal 1700 instead of being ejected from the card insertion slot 1706. Note that the selection of the card can be performed by using the signal issued from the touch panel 1719A when the player presses the touch panel 1719A.

Next, the CPU 1731 determines whether or not the player has won the mini-game executed in step S1625 (step S1627). When it is determined that the player has lost the mini-game (NO), as described above, the CPU 1731 contains the IC card inside the PTS terminal 1700 (step S1639), and ends this subroutine. In this way, if the amount of money indicated by the money amount information is the predetermined count or less, the IC card is not ejected from the card insertion slot 1706.

On the other hand, when it is determined in the judgment process of step S1627 that the player has won the mini-game (YES), the CPU 1731 performs the calculation process as (amount of money indicated by the read-out money amount information)×120%, and increases the amount of money (step S1629).

Following this, the CPU 1731 writes the money amount information corresponding to the increased amount of money on the IC card (step S1631), and sends the money amount information corresponding to the increased amount of money to the external control device 1621 along with the card ID of the IC card (step S1633). In the external control device 1621, the sent money amount information is associated with the card ID and stored in the storage device of the external control equipment 1621.

Next, the CPU 1731 converts the money amount information to credit amount (step S1635), sends the converted credit amount to the slot machine 1010 (step S1637), and then ends this subroutine. In this way, a player who could increase his/her credit amount by playing the mini-game can continue to play his/her game. Further, if the game cannot be continued even after increasing the credit amount by playing the mini-game, the game can be ended by operating the TAKE WIN/COLLECT button 1032 of the slot machine 1010.

Thus, if money amount information corresponding to a substantial amount of money is remaining in the IC card, the chances of a player forgetting to retrieve his/her IC card are thought to be less unless something unusual happens. However, in cases wherein the amount of money remaining in an IC card is extremely less, the player may intentionally leave the IC card in the slot machine 1010 because the cash-out process is cumbersome. Therefore, if the configuration is such that an alert is issued when an IC card is not claimed, the frequency of occurrence of an alert would become high.

However, when the mini-game shown in the above FIG. 27 is executed and the player loses the game, it needs to be acknowledged that the IC card is contained inside the PTS terminal 1700. In this way, by preventing the IC cards from remaining back in the card insertion slot 1706, the time and labor of the staff can be reduced. Furthermore, because the IC cards are contained inside the PTS terminal 1700, the next player can immediately start playing on the slot machine 1010 without having to wait, and the operability of the slot machine 1010 can be increased.

If a player ejects the IC card from the PTS terminal 1700 and takes it out even though only a small amount of money is remaining in the IC card, the player may discard the IC card by considering it worthless since not much amount of money is remaining in the IC card. Thus, if the IC cards are discarded by players, the number of IC cards that can be used at the arcade would become less. Therefore, to replenish the IC cards, an arcade has to buy new IC cards. However, when a mini-game is played and the player loses the game, the IC cards can be contained inside the PTS terminal 1700, which enables the gaming arcade to precisely recover usable IC cards. Thus, by reusing the recovered IC cards at the gaming arcade, the expenditure required for IC cards can also be reduced.

On the other hand, when the amount of money of an IC card is increased through a mini-game, the value of the IC card can be increased and failure on the part of the players to retrieve the IC card can be prevented by making the players aware of the presence of the IC card.

<<IC Card Initialization/Replenishment Process>>

Figure 29:
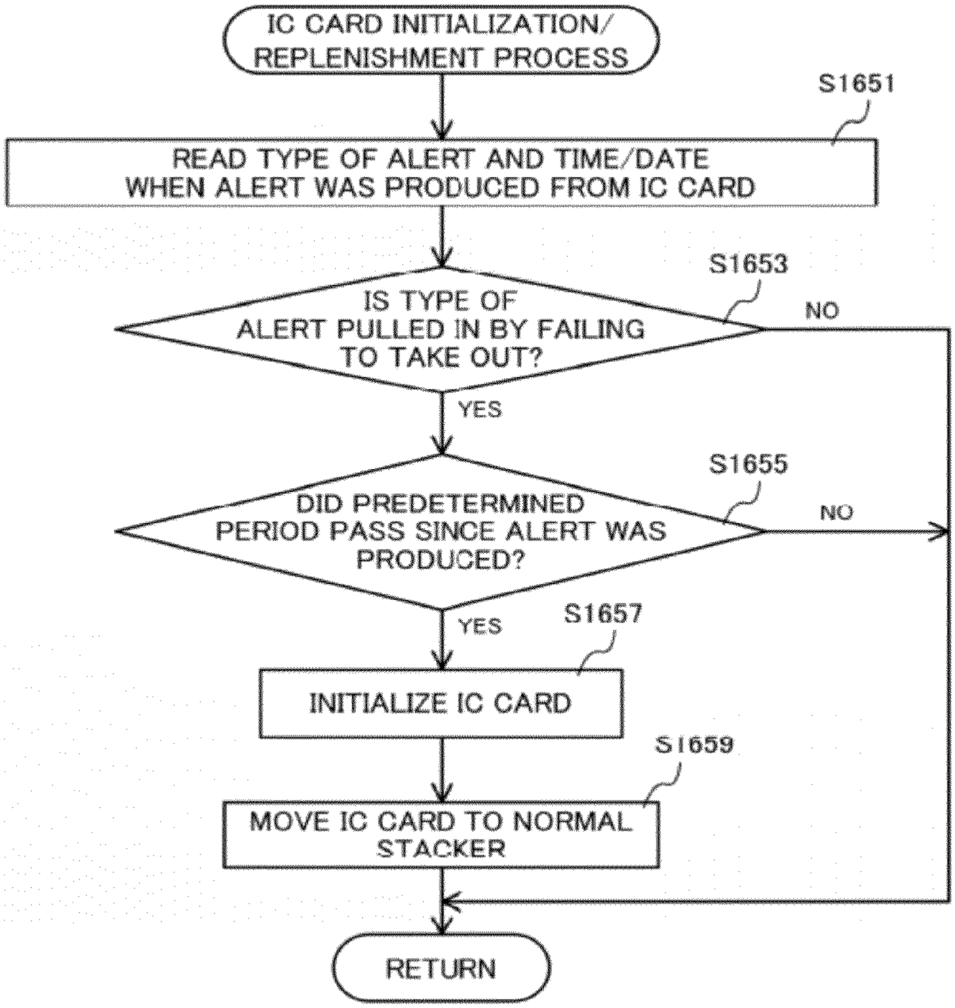
FIG. 29 is a flowchart showing a subroutine of a process of initializing and replenishing the IC card used at the PTS terminal according to the embodiment of the present invention.

FIG. 29 is the subroutine for initializing an IC card for which an alert is issued, and then replenishing it as a new card in the regular stacker. This process is invoked and executed in the slot machine 1010 when the game is not played after at least a predetermined period of time, for example, at least 10 minutes. In this way, instead of disturbing the game being played on slot machine 1010, the IC card initialization/replenishment process can be executed.

First of all, the CPU 1731 transports the IC cards contained in the alert stacker to the loading position, and then reads the type of the alert and the date and time when the alert was issued from the IC card (step S1651). As described above, the IC cards contained in the alert stacker are those for which an alert was issued.

The CPU 1731 determines whether or not the type of alert issued for the IC card is based on failure to claim the IC card (step S1653). When the type of the alert is not based on failure to claim the IC card (NO), this subroutine is ended immediately. Alerts concerning the IC cards may be issued for other reasons as well, but in this IC card initialization/replenishment process, only cases wherein a player has forgotten the IC card in the card insertion slot 1706 are considered. This is because this process may not be suitable for initializing and reusing IC cards in other alerts. This is to exclude cases wherein the IC card may have failed due to hardware reasons.

On the other hand, when the type of the alert is based on failure to claim the IC card (YES), the CPU 1731 determines whether or not the predetermined time period, for example, one month has elapsed since the date and time of the alert (step S1655). When it is determined that the predetermined time period has not elapsed since the date and time of the alert (NO), this subroutine is ended immediately. Because there is a possibility of receiving a query regarding an unclaimed IC card from the player until the predetermined time period has elapsed, the IC card must be initialized after the predetermined time period has elapsed.

On the other hand, when it is determined that the predetermined time period has elapsed since the date and time of the alert (YES), the CPU 1731 initializes the IC card at the loading position (step S1657). FIG. 30 is a table showing an example of the information stored in the predetermined storage area of the IC card. In the example shown in FIG. 30, information such as the card ID (identification information described above), money amount information, type of the alert, date and time of the alert, and identification number of the gaming machine is stored in the IC card. Of this information, by deleting information other than the card ID, the IC card can be initialized. In this way, by initializing an IC card, it is possible to reuse the IC card at the gaming arcade.

Next, the CPU 1731 transports the IC card from the loading position to the regular stacker, and replenishes it as a new IC card in the regular stacker (step S1659). In this way, instead of buying new IC cards, the gaming arcade can replenish the IC cards, and therefore, the cost required for IC cards can be reduced. Furthermore, because an IC card can be replenished without opening the slot machine 1010, security can be strengthened, and at the same time, the task of replenishing IC cards can be prevented from becoming complex.

<<Mini-Game 2 Running Process>>

Figure 33:
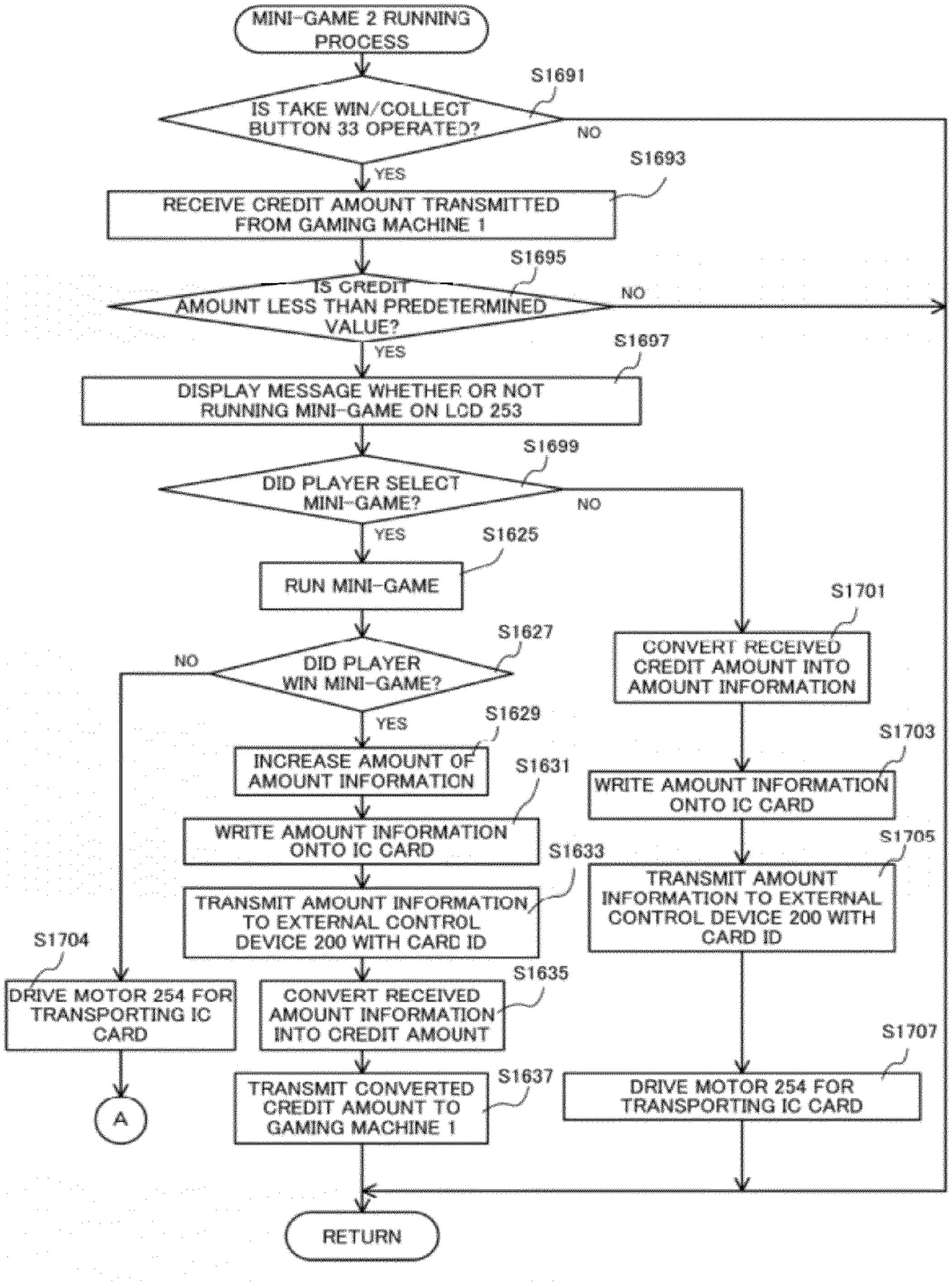
FIG. 33 is a flowchart showing a subroutine of a process of a mini-game 2 played at the PTS terminal according to the embodiment of the present invention.

FIG. 33 is the subroutine for running the mini-game 2 that is invoked and executed during the process of step S1543 of the above-mentioned FIG. 25. Similarly to the mini-game 1, this mini-game 2 is executed in the PTS terminal 1700. Note that the same numbers are used for steps in which the same process as mini-game 1 shown in FIG. 27 is executed.

First of all, the CPU 1731 determines whether or not the TAKE WIN/COLLECT button 1032 of the slot machine 1010 has been operated by the player (step S1691). When it is determined that the player has not operated the TAKE WIN/COLLECT button 1032 of the slot machine 1010 (NO), this subroutine is ended immediately.

During the judgment process of step S1525, if it is determined that the TAKE WIN/COLLECT button 1032 of the slot machine 1010 has been operated (YES), the CPU 1731 receives the credit amount sent from the slot machine 1010 (step S1693). Following this, the CPU 1731 determines whether or not the received credit amount is below the predetermined value (step S1695). When the CPU 1731 determines that the received credit amount is the predetermined value or more (NO), this subroutine is ended immediately.

On the other hand, when the CPU 1731 determines that the received credit amount is below the predetermined value (YES), it displays a message on the LCD 1719 asking about whether or not to execute a mini-game (step S1697). Following this, the CPU 1731 determines whether or not the player has selected a mini-game (step S1699). When the CPU 1731 determines that the player has selected a mini-game (YES), it moves the process to step S1625. The process of step S1625 to step S1709 shown in FIG. 33 is the same as that of mini-game 1 shown in FIG. 27. Note that the judgment process of step S1699 can be performed by using the signal issued from the touch panel 1719A when the player presses the touch panel 1719A.

When the CPU 1731 determines that the player has not selected a mini-game (NO), the credit amount sent from the slot machine 1010 is converted to money amount and the money amount information is generated during the process of step S1693 (step S1701). Next, the CPU 1731 writes the money amount information on the IC card (step S1703), sends this money amount information to the external control device 1621 along with the card ID (step S1705), transports the IC card to the eject position by driving the motor for the transport of the IC card (step S1707), and ends this subroutine.

In this way, for the players who do not play the mini-game, the money amount information is stored in the IC card even when the credit amount is below the predetermined value, and the IC card is returned to the player. Thus, cash is returned to the player even if it is a small amount, and therefore, no disadvantages are posed to the player.

Note that it is desirable that the predetermined value used in the judgment process of the above-described step S1695 be set for each slot machine 1010. For example, it is desirable to have a configuration in which a predetermined value setup change switch is connected to the connection unit 1750 of the PTS terminal 1700. In this way, by operating the predetermined value setup change switch, the predetermined value can be changed and determined.

By enabling the setup of a predetermined value for each slot machine 1010, the wish of the players on the slot machine 1010 can be fulfilled. For example, in the case of a high roller gaming machine, a higher predetermined value is set. In this way, the remaining amount in the IC card can be increased to a certain extent, and therefore, the probability of discard of IC cards even by players of a high roller gaming machine can be lowered.

<<Credit Conversion Process>>

Figure 34:
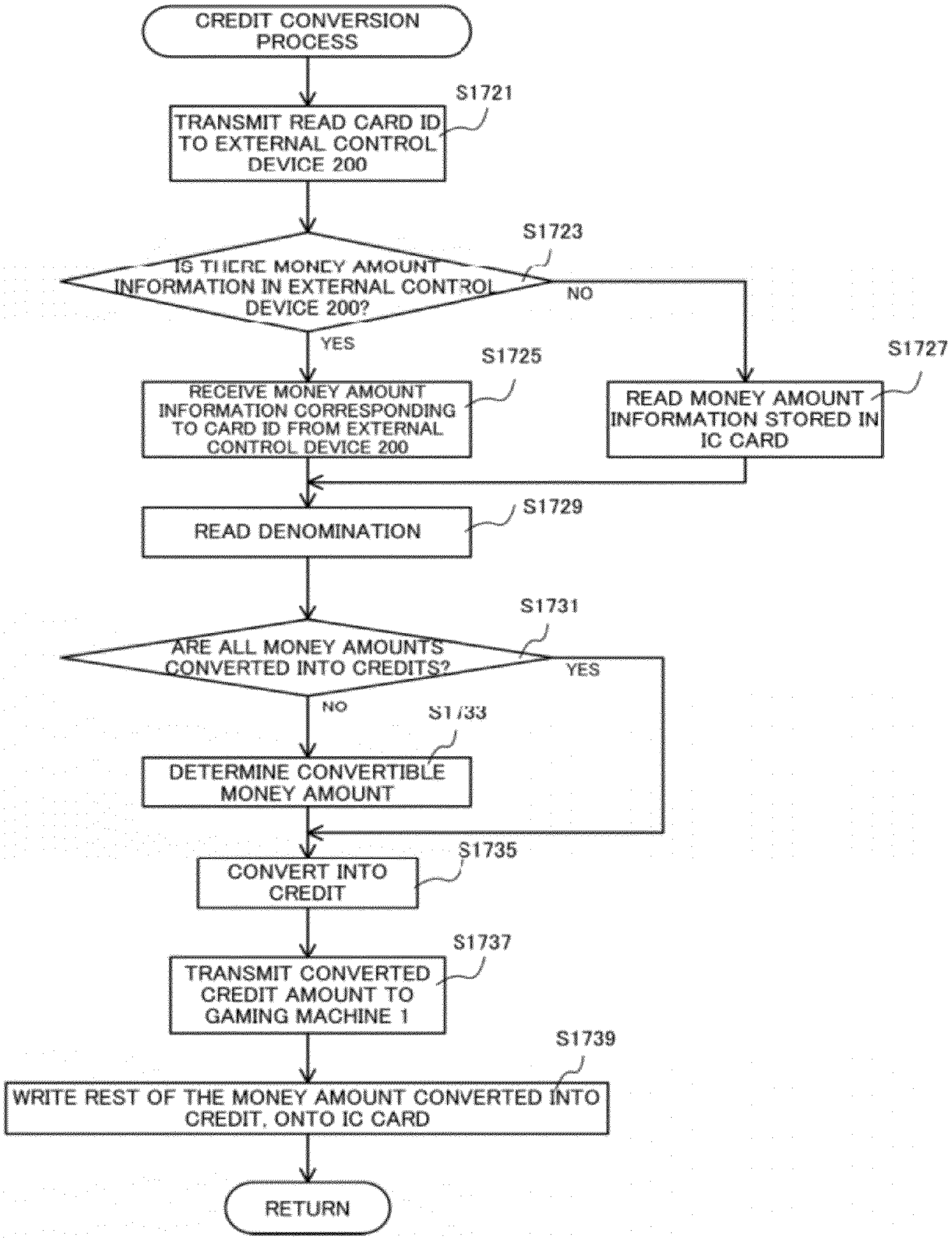
FIG. 34 is a flowchart showing a subroutine of a credit conversion process executed at the PTS terminal according to the embodiment of the present invention.

FIG. 34 is the subroutine for the credit Conversion Process that is invoked and executed during the process of step S1517 of the above-mentioned FIG. 25.

First of all, the CPU 1731 sends the card ID read out from the IC card to the external control device 1621 (step S1721). The external control device 1621 receives the card ID, reads out the money amount information corresponding to the card ID, and sends it to the PTS terminal 1700 that had sent the card ID.

When the card ID is sent, the external control device 1621 uses the card ID to look for the money amount information associated with the card ID, and determines whether or not the money amount information associated with the card ID is stored in the storage device of the external control device 1621. When the money amount information associated with the card ID has been stored, the money amount information is sent to the PTS terminal 1700. On the other hand, when the money amount information is not stored, information indicating the same is sent to the PTS terminal 1700.

A plurality of slot machines 1010 are installed in a gaming arcade. A player plays a game by changing the slot machine 1010, and keeps looking for that one machine that seems to be his/her favorite among a plurality of slot machines 1010. Therefore, in cases wherein after playing a game on one slot machine 1010, a player plays a game on another slot machine 1010, the money amount information while a game was being played on one slot machine 1010 is already stored in the storage device of the external control device 1621. Therefore, when playing a game on another slot machine 1010, the money amount information can be managed precisely in the external control device 1621 by invoking the money amount information stored in the storage device of the external control device 1621 into the other slot machine 1010, and thereby invalid actions can be prevented beforehand.

Next, the CPU 1731 determines whether or not the money amount information exists in the external control device 1621 (step S1723). When the CPU 1731 determines that the money amount information exists in the external control device 1621 (YES), it receives the money amount information sent from the external control device 1621 (step S1725). On the other hand, when the CPU 1731 determines that the money amount information does not exist in the external control device 1621 (NO), it reads out the money amount information stored in the IC card (step S2917).

Following this, the CPU 1731 reads out the denomination stored in the RAM 1073 of the slot machine 1010 (step S1729). Denomination implies the minimum unit of the bet for a one-time game. The denomination in the present embodiment preferably is the denomination of the currency value. Denomination of the currency value implies, for example, that one credit in the gaming machine can be set to 0.001 Hong Kong dollar, 0.01 Hong Kong dollar, and 0.1 Hong Kong dollar. By stipulating the denomination for each gaming machine, different minimum bets and game unit values can be set for each gaming machine. Thus, the player can play games by selecting a gaming machine according to the amount of money he/she has and can enjoy games for a long time with less bet amounts or can aim at potfuls of money with large bet amounts.

Note that denomination must be decided by the external control device 1621, the decided denomination must be sent from the external control device 1621 to the slot machine 1010, and must be stored in the RAM 1073 of the slot machine 1010.

Next, the CPU 1731 determines whether or not the entire amount of money indicated by the money amount information received during the process of step S1725 and the entire amount of money indicated by the money amount information read out from the card ID during the process of step S1727 can be converted to credits (step S1731). When an amount of money that cannot be converted to credits is included (NO), i.e., when broken numbers occur in the credit unit, the maximum amount of money that can be converted to credits is determined (step S1733).

Next, when an amount of money that cannot be converted to credits is not included (YES), or the process of step S1733 is executed, the CPU 1731 converts the amount of money that can be converted to credits into credits in accordance with the denomination read out during the process of step S1729 (step S1735), and sends the converted the credit amount to the slot machine 1010 (step S1737). Furthermore, the CPU 1731 writes the amount of money that could not be converted to credits, in other words, the remaining money amount that is converted to credits on to the IC card (step S1739), and ends this subroutine.

FIG. 35 shows a table used for determining symbols 1501 to be rearranged during a regular game. The regular game symbol table indicates each symbol 1501 of the display blocks 1028 in each symbol column, and code Nos. respectively associated with the symbols 1501, and twenty number ranges respectively associated with the code Nos. ranging from 0 to 65535.

Note that the above numbers may be equally or unequally divided into twenty ranges. The latter case enables adjustment of a rearrangement probability for each symbol 1501 by adjusting the associated range of random number values. Further, the range of random numbers associated with "FEATURE" corresponding to the trigger symbol 1503*b* among the specific symbols 1503, or "WILD" corresponding to the wild symbol 1503*a* among the specific symbols 1503 may be narrower than ranges of random numbers associated with other symbols 1501. In this case, winning or losing can be easily adjusted by lowering probability of winning of a valuable symbol 1501 in accordance with the status of a game.

For example, when a random number value randomly selected for the first column is "10000," the symbol "J" whose code No. "3" is associated with a range of random numbers including "10000" is selected as a symbol to be rearranged in the first simulated reel 1151. Further, for example, when a random number value randomly selected for the fourth column is "40000," the symbol "FEATURE" whose code No. "12" is associated with a range of random numbers including "40000" is selected as a symbol to be rearranged in the fourth simulated reel 1151.

(Bonus Game Symbol Table)

FIG. 36 shows a table used for determining symbols 1501 to be rearranged during a bonus game. As is the case with regular game symbol table, the bonus game symbol table contains symbols 1501 of the display blocks 1028 in each symbol column, code Nos. respectively associated with the symbols 1501, and number ranges respectively associated with the code Nos. The number ranges cover the numbers 0 to 65535. These numbers 0 to 65535 are divided into the ranges in the same manner as the case with the regular game symbol table.

Furthermore, specific symbols 1503 are used as additional symbols or for replacement in the bonus game symbol table. Here, the word "replacement" means that new symbol data is written over already existing symbol data. The number of symbols to be added or replaced, or the target symbol column may be randomly selected, or determined in advance. In the present embodiment, the number of symbols to be added or replaced is randomly selected with the wild symbol increase count determination table of FIG. 39 and a trigger symbol increase count determination table of FIG. 40. When symbol data is replaced with another set of symbol data, an image based on the overwritten symbol data (replacement symbol data) may be displayed, in place of a symbol 1501 having been stopped and displayed.

For example, in the bonus game symbol table of FIG. 36, ten wild symbols 1503*a* are evenly added to symbol columns (L1) to (L5). This achieves conditions whereby a wild symbol 1503*a* is more likely to be selected through random selection in all the symbol columns (L1) to (L5).

(Symbol Column Determination Table)

FIG. 37 shows a symbol column determination table used at the time of determining a symbol column, out of the symbol columns (L1) to (L5), in which addition of or replacement with the specific symbols 1503 takes place. The symbol column determination table indicates a correspondence relationship between the symbol column Nos. and random number values. The symbol column No. 1 indicates the first column of the display block 1028; the symbol column No. 2 indicates the second column of the display block 1028; the symbol column No. 3 indicates the third column of the display block 1028; the symbol column No. 4 indicates the fourth column of the display block 1028; and the symbol column No. 5 indicates the fifth column of the display block 1028.

The present embodiment deals with a case where an increase in the number of specific symbols 1503 or the number of specific symbols 1503 to replace the other symbols is determined for each symbol column based on the acquired random number value and the symbol column determination table. However, this is not always the case, and the increase in the number of the specific symbols or the number of specific symbols 1503 may be determined beforehand for each symbol column. Furthermore, the number of specific symbols 1503 to be increased or to replace the other symbols may be determined in accordance with the type of the specific symbol 1503.

(Code No. Determination Table)

FIG. 38 shows a code No. determination table. The code No. determination table indicates a correspondence relationship between the code Nos. and the random number values. For example, when the random number values for the first symbol column No. (the first column) are 40567, 63535, 65323, then "12," "end," and "end" are selected as the code Nos., respectively.

The present embodiment deals with a case where the code Nos. of specific symbols to be increased is determined for each of the symbol columns based on the random number values obtained and the code No. determination table, however, in the present invention, the code No. of a specific symbol 1503 to be increased may be set in advance for each symbol column.

(Wild Symbol Increase Count Determination Table)

FIG. 39 shows a wild symbol increase count determination table. The wild symbol increase count determination table indicates a correspondence relationship between wild symbol increase counts and random number values. The wild symbol increase count has five numerical values: "10," "30," "50," "70," and "90." For example, when the random number value is 17235, the wild symbol count selected is "30." Note that the wild symbol increase counts may have a plurality of types of values that increase by at least 1. Further, the increase in the number may be variable at a predetermined timing, such as for every unit game.

(Trigger Symbol Increase Count Determination Table)

FIG. 40 shows a trigger symbol increase count determination table. The trigger symbol increase count determination table indicates a correspondence relationship between trigger symbol increase counts and random number values. The trigger symbol increase count has five numerical values: "2," "4," "6," "8," and "10". For example, when the random number value is 17235, the trigger symbol increase count selected is "4". Note that the trigger symbol increase counts may have a plurality of types of values that increase by at least 1. Further, the increase in the number within the table may be variable at a predetermined timing, such as for every unit game.

(Payout Table)

FIG. 41 shows a payout table that manages payouts each awarded in association with a winning combination. This payout table is stored in the ROM 1072 of the motherboard 1070, and information on a payout (payout multiplying factor) is associated with a type of winning combination. For example, a payout multiplying factor corresponding to a winning combination including three "A"s is "4". This means that a player is awarded a payout where the bet amount is multiplied by four. A payout multiplying factor corresponding to a winning combination including five "BUFFALO"s is "100". Note that the setting of payout multiplying factor for the regular game is the same as that of the free game; however, the present invention is not limited thereto. That is, the setting of payout multiplying factor may be different between the regular game and the free game.

The data of each of the above tables is stored in the ROM 1072 or the RAM 1073 of the motherboard 1070 (game controller 1100) of the slot machine 1010. Thus, the slot machine 1010 is capable of running a base game even when it is separated from the external control device 1621 (center controller 1200) to operate as a single machine.

(Display State)

The following specifically describes a display state of the symbol display device 1016 while the slot machine 1010 is in operation.

(Slot Game: Regular Game Screen)

FIG. 42 shows an example of a regular game screen that is a screen showing a regular game displayed on the symbol display device 1016.

More specifically, the regular game screen is arranged in a center portion of the symbol display device 1016, and includes: the display window 1150 having the five simulated reels 1151 to 1155, and the payline occurrence parts 1065L and 1065R that are arranged on both sides of the display window 1150 and symmetrical with respect to the display window 1150. Note that FIG. 42 shows a regular game screen in which the first to third simulated reels 1151, 1152, and 1153 are stopped, while the fourth and fifth simulated reels 1154 and 1155 are rotating.

Above the display window 1150 are: the credit amount display unit 1400, a broken number cash display unit 1403, the BET amount display unit 1401, a wild symbol count display unit 1415, a trigger symbol count display unit 1416, and the payout display unit 1402. Each of these units 1400, 1401, 1415, 1416, and 1402 is sequentially arranged in this order from the left side to the right side as seen from the player.

The credit amount display unit 1400 displays the credit amount. The broken number cash display unit 1403 displays a fractional amount of cash. The BET amount display unit 1401 displays a BET amount placed on the current unit game. The wild symbol count display unit 1415 displays the number of wild symbols 1503*a* in a unit game in progress. With this, it is possible to notify the player in advance that there are five wild symbols 1503*a* in a regular game. The trigger symbol count display unit 1416 displays the number of trigger symbols 1503*b* in a unit game in progress. With this, it is possible to notify the player in advance that there are five trigger symbols 1503*b* in a regular game. The payout display unit 1402 displays the number of coins to be paid out when a winning combination is achieved.

On the other hand, below the display window 1150 are: a help button 1410; a pay-table button 1411; a BET unit display unit 1412; a stock display unit 1413; and a free game count display unit 1414. Each of these units 1410, 1411, 1412, 1413, and 1414 is sequentially arranged in this order from the left side to the right side as seen from the player.

The help button 1410, when pressed by a player, activates the help mode. The help mode provides a player with information to solve his/her problem regarding the game. The pay-table button 1411, when pressed by a player, activates the payout display mode in which an amount of payout is displayed. The payout display mode displays to the player a guidance screen indicating the relationship between a winning combination and the payout multiplying factor.

The BET unit display unit 1412 displays a BET unit (payout unit) at the current point. With the BET unit display unit 1412, the player is able to know that, for example, he/she is allowed to participate in a game with a bet by an increment of one cent.

The stock display unit 1413 displays a bonus game carry-over number. Here, the "bonus game carry-over number" means the remaining number of bonus games that can be executed subsequently when the currently-run bonus game ends. That is, when the stock display unit 1413 displays "3," three more bonus games can be played consecutively after the currently-run bonus game. Note that the stock display unit 1413 displays the number "0" in the regular game.

The free game count display unit 1414 displays the total number of times the bonus game is to be repeated, and how many times the bonus game has been repeated. In other words, when the free game count display unit 1414 displays "0 of 0," the total number of times free games are to be repeated ("free game total number") is 0, that is, the game in progress is not a bonus game. Furthermore, when the free game count display unit 1414 displays "5 of 8," during the bonus game, the free game total number is eight, and the current game in progress is the fifth free game.

(Bonus Winning Screen During a Regular Game)

Figure 43:
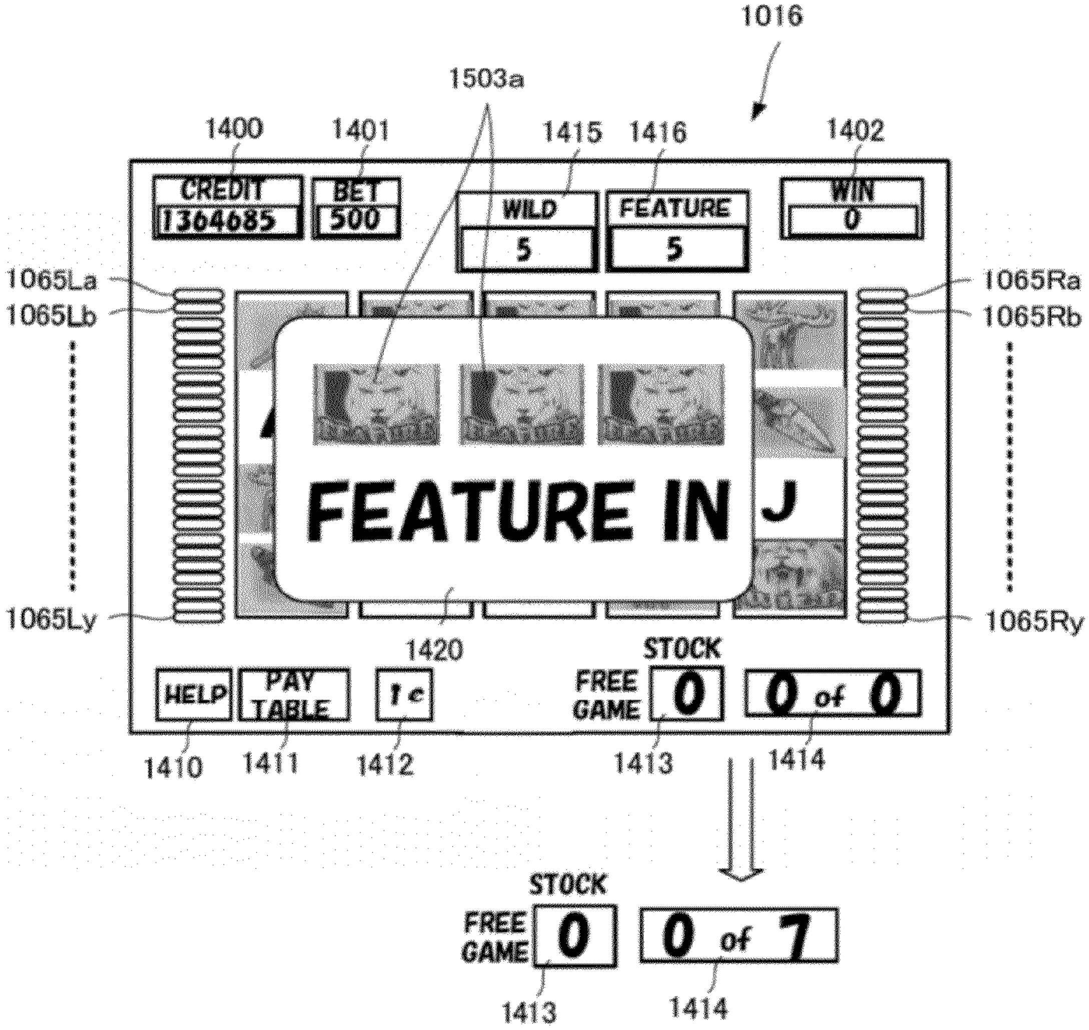
FIG. 43 is an explanatory diagram showing one example of the display state in the symbol display device provided in the slot machine according to the embodiment of the present invention.

FIG. 43 shows a screen displayed for a certain period of time after a bonus is won. More specifically, the screen shows that a bonus is won with three trigger symbols 1503*b* being rearranged. The trigger symbol 1503*b* preferably has a readable text such as "FEATURE", so as to have a player clearly understand the symbol related to a bonus win.

On this screen, a bonus winning screen 1420 is displayed as a popup to notify a player of the winning of bonus using a symbol image and an image of text "FEATURE IN". Then, at the same time or immediately after displaying the bonus winning screen 1420, the free game total number "0" of the free game count display unit 1414 is switched to "7". Thus, the player is able to know that he/she has won a bonus, and that the game will shift to a bonus game in which the free game is repeated seven times.

(Slot Game: Bonus Game Screen)

Figure 44:
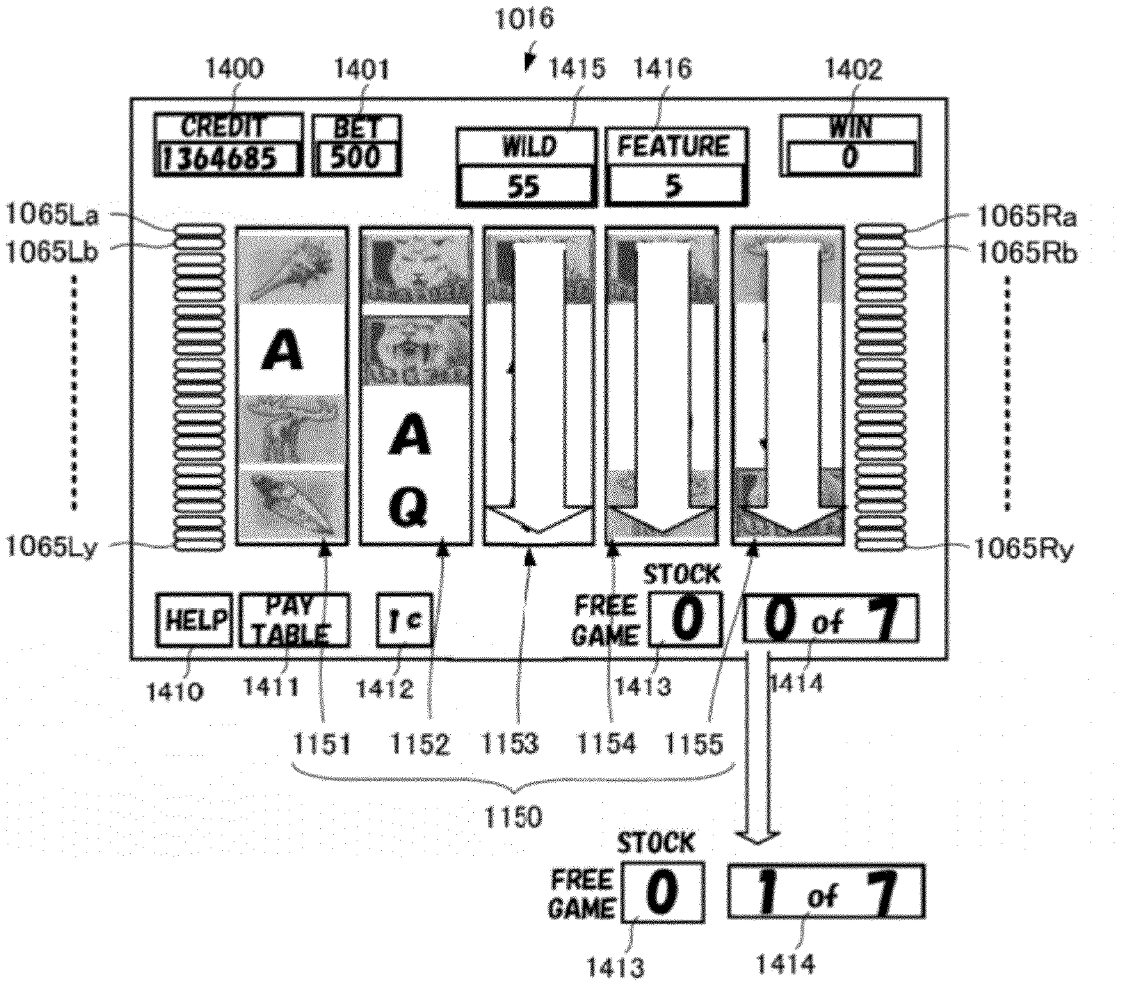
FIG. 44 is an explanatory diagram showing one example of the display state in the symbol display device provided in the slot machine according to the embodiment of the present invention.

FIG. 44 shows an example of a bonus game screen that is a screen showing a bonus game displayed on the symbol display device 1016.

Specifically, the free game count display unit 1414 displays the free game total count and the game count of the current game. For example, the free game count display unit 1414 indicates that the first free game out of seven free games is running. Other operations are the same as those of the regular game.

(Operations of Slot Machine: Regular Game Running Process)

Figure 45:
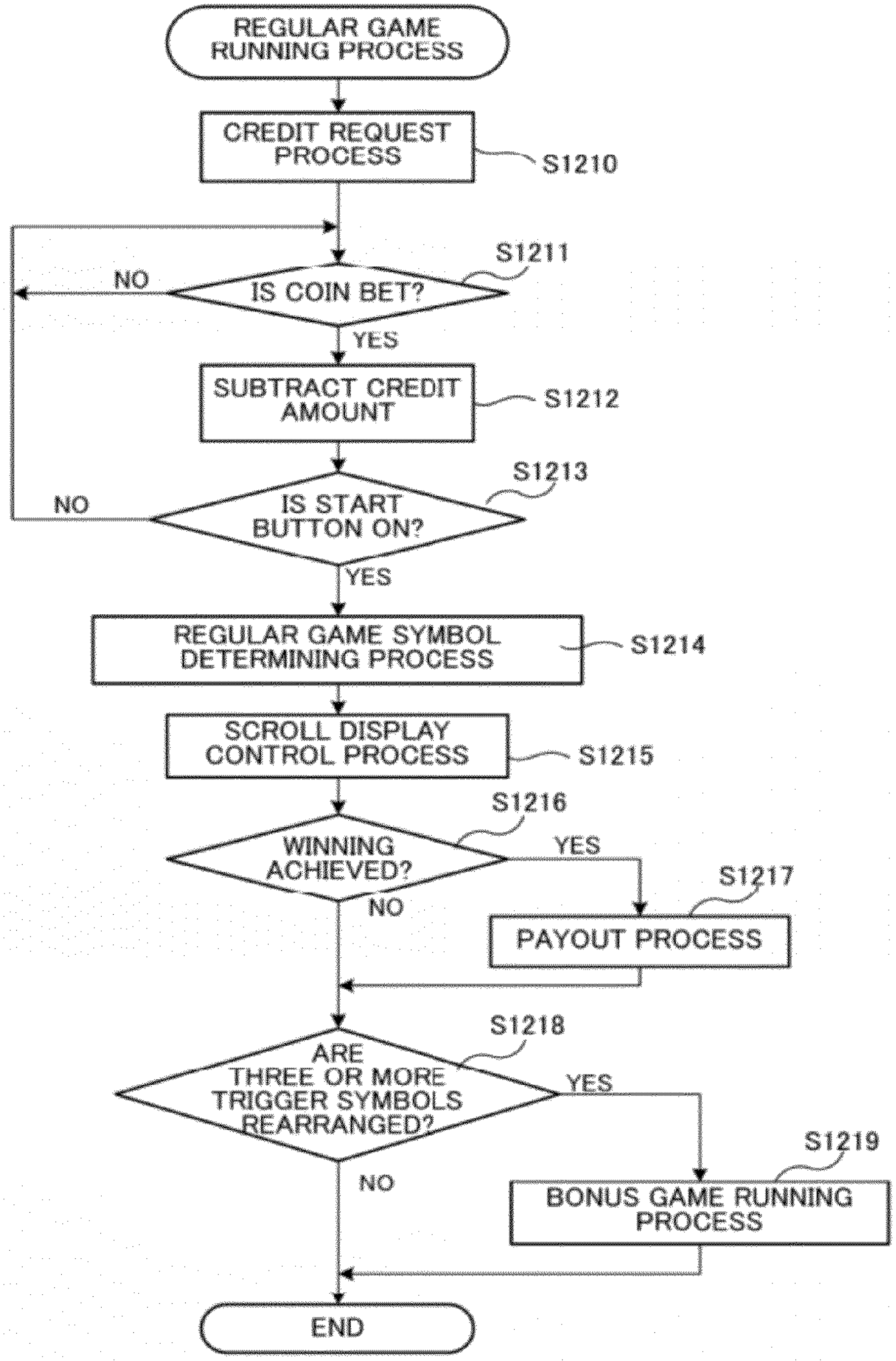
FIG. 45 is a flowchart of a regular game running process of the slot machine according to the embodiment of the present invention.

FIG. 45 to FIG. 49 describe the operations of the slot machine 1010 with the above structure. The regular game running process shown in FIG. 45 is run by the main CPU 1071 of the slot machine 1010. Note that the slot machine 1010 is started before this process.

As shown in FIG. 45, first of all, the main CPU 171 runs a credit request process (S1210). During the process, the player determines whether or not to use some of the credits stored on the IC card 1500. The credit request process is described later in detail.

The main CPU 71 determines whether a coin is BET (S1211). During this process, the main CPU 1071 determines whether an input signal output from the 1-BET switch 1034S when the 1-BET button 34 is operated, or an input signal output from the 10-BET switch 1039S when the 10-BET button 1039 is operated is received. When it is determined that no coin is BET, the process is returned to S1210.

Meanwhile, when the main CPU 1071 determines that a coin is BET in step S1211, the main CPU 1071 executes a process to reduce the credit amount stored in the RAM 1073 according to the number of the coins that are BET (S1212). Note that when the number of coins that are BET exceeds the credit amount stored in the RAM 1073, the main CPU 1071 returns the processing S1211 without reduction of the credit amount stored in the RAM 1073. Furthermore, when the number of coins that are BET exceeds the maximum value bettable on one game (500 coins in the present embodiment), the process proceeds to S13 without the reduction the credit amount stored in the RAM 1073.

Next, the main CPU 1071 determines whether or not the start button 1046 has been turned ON (S13). During this process, the main CPU 171 determines whether or not an input signal output from the start switch 1046S when the start button 1046 was pushed is received. When it is determined that the start button 1046 has not been turned ON, the process is returned to S1211. Note that when the start button 1046 has not been turned ON (for example, when an instruction to end a game is input without the start button 1045 being turned ON), the main CPU 1071 cancels the result of reduction executed in S1212.

Meanwhile, when the main CPU 1071 determines in S1213 that the start button 1046 has been turned ON, the main CPU 1071 executes the regular game symbol determining process (S1214). The regular game symbol determining process is explained later in detail by using drawings.

Here, as shown in FIG. 35, 14 wild symbols (also known as specific symbols 1503) 1503*a* exist in the regular game symbol table. The wild symbol 1503*a* can be used in place of any other symbol.

Next, in S1215, the main CPU 1071 executes the scroll display control process. This process is used to control the display whereby scrolling of symbols 1501 is started and the symbols 1501 determined in S1214 are rearranged thereafter.

Next, the main CPU 1071 determines whether or not a winning is achieved (S1216). During the process of S1216, the main CPU 71 counts the number of symbols 1501 of each type that are rearranged on each payline L, among the symbols 1501 rearranged in step S1215. Then, the main CPU 1071 determines whether or not the counted number of symbols is two or more.

When it is determined that a winning is achieved, the main CPU 1071 performs the process related to coin payout (S1217). In this process, the main CPU 1071 references the odds data stored in the RAM 1073, and determines the payout multiplying factor based on the number of certain symbols 1501 rearranged on a payline L. The odds data indicates the corresponding relationship between the number of symbols 1501 rearranged on a payline L and the payout multiplying factors (see FIG. 18). Note that each "WILD" symbol arranged on a winning payline L doubles the payout. That is, if three "WILD" symbols are displayed on the winning payline L, the payout is eight times as much as the original payout amount.

The present embodiment deals with a case where it is determined that a winning is achieved when symbols 1501 arranged on a single payline L includes at least two symbols 1501 of the same type. The present embodiment, however, is not limited thereto. For example, the paylines may be omitted from the present invention, and it may be determined that a winning is achieved when symbols 1501 rearranged in the display blocks 1028 include at least two symbols 1501 of the same type.

When it is determined that no winning is achieved in S1216, or after the execution of the process of S1217, the main CPU 71 determines whether or not three or more trigger symbols 1503*b* are rearranged (S1218). During this process, the main CPU 1071 determines whether or not three or more trigger symbols 1503*b* are rearranged in the display blocks 1028 without giving consideration to the payline L. In S1218, as shown in FIG. 20, when it is determined that three or more trigger symbols 1503*b* are rearranged, the main CPU 1071 executes the bonus game running process (S1219). During the bonus game running process, a free game with an increased number of wild symbols 1503*a* is run. The bonus game running process is described later in detail.

When it is determined in S1218 that few than three trigger symbols 1503*b* are rearranged, or after the execution of the process of S1219, the main CPU 1071 ends this subroutine.

(Operations of the Slot Machine: Regular Game Symbol Determining Process)

Figure 46:
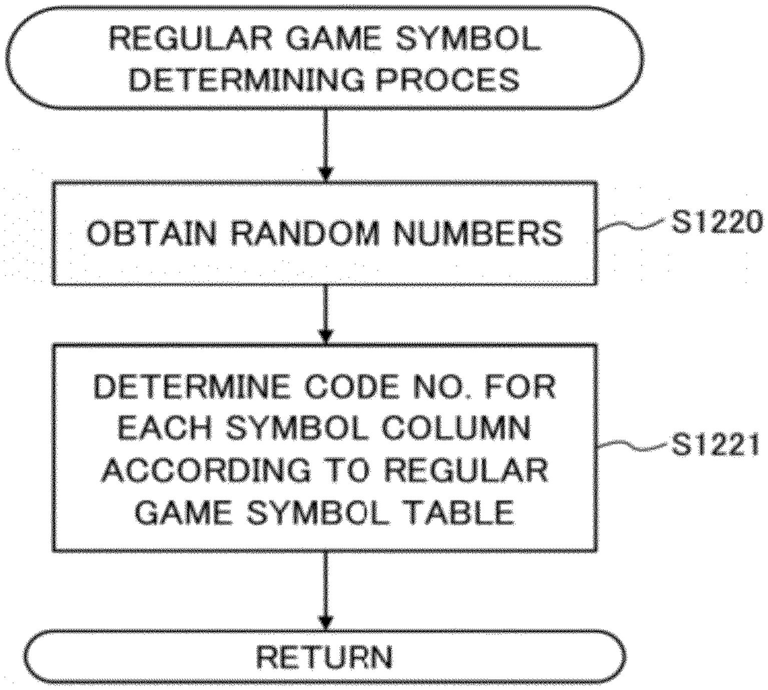
FIG. 46 is a flowchart of a regular game symbol determining process of the slot machine according to the embodiment of the present invention.

FIG. 46 is a flowchart showing the subroutine of the regular game symbol determining process. This process is executed when the main CPU 1071 runs the symbol determination program stored in the RAM 1073.

First of all, the main CPU 1071 acquires a random number value from the random number generator 2063 (step S1220). During this process, the main CPU 1071 acquires five random number values corresponding to each symbol column of the display block 1028.

Next, the main CPU 1071 determines the code No. when a symbol stops in each symbol column of the display block 1028 based on the acquired five random number values and regular game symbol table (see FIG. 35) (step S1221). For example, if the random number value for the first column is 23035, 07 is determined as the code No. of the first column. Note that of the display blocks 1028 arranged in four rows, the code No. of the symbol column corresponds to the code No. of the symbols rearranged in the display block 1028 of the first row. After the execution of the process of step S21, the main CPU 1071 ends this subroutine.

(Operations of Slot Machine: Bonus Game Running Process)

Figure 47:
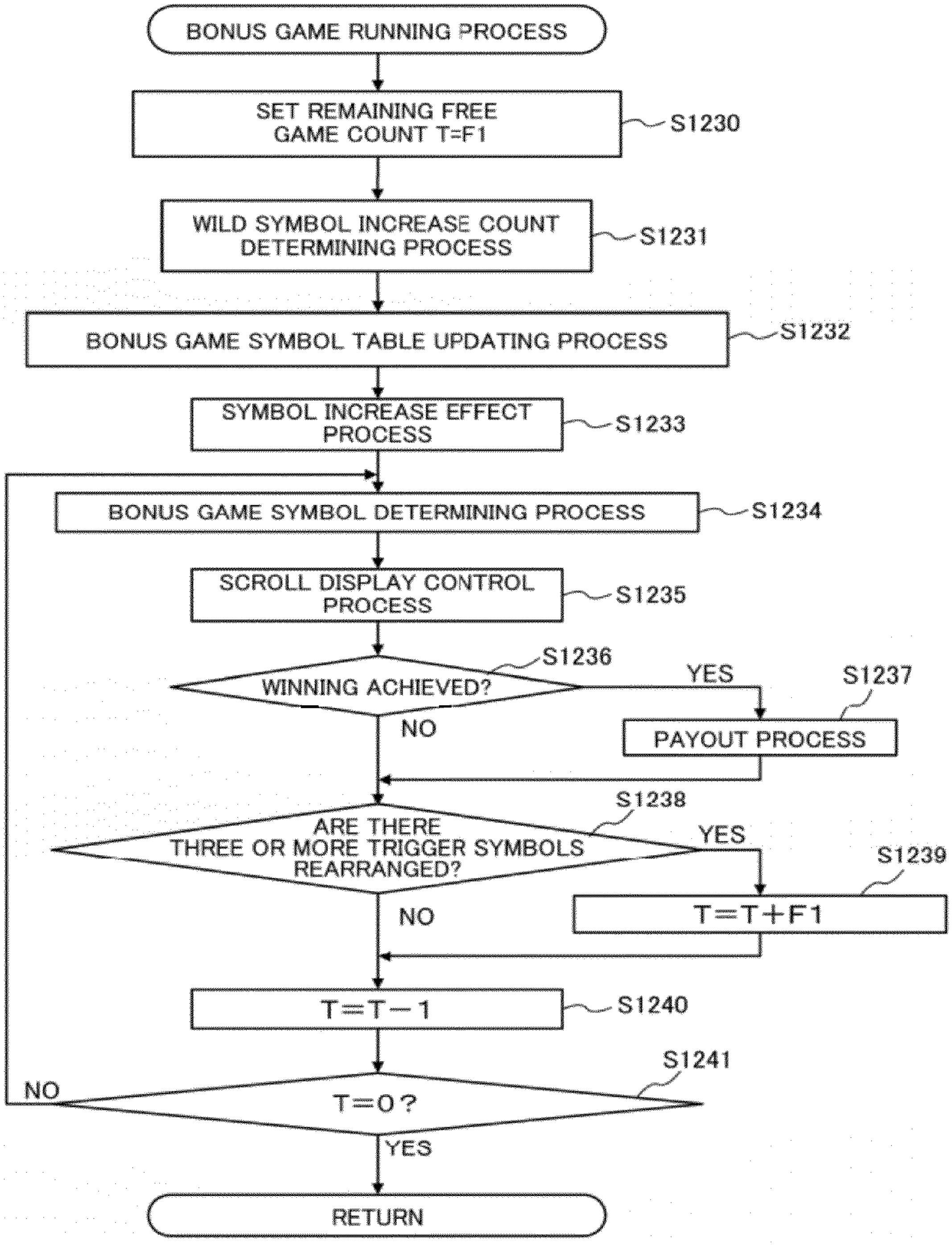
FIG. 47 is a flowchart of a bonus game running process of the slot machine according to the embodiment of the present invention.

Next, the bonus game running process is executed with reference to FIG. 47.

The player is able to play a game without betting a coin in the bonus game. First, the main CPU 1071 sets remaining free game count T to T=F1 (specific count=7) in a free game count storage region of the RAM 1073 (S1230).

Further, the main CPU 1071 displays a bonus winning screen 1420 on the symbol display device 1016 as a popup, as shown in FIG. 43.

Next, the main CPU 1071 executes a wild symbol increase count determining process (S1231). Specifically, when three or more trigger symbols 1503*b* are rearranged, a random number is obtained first. Then, a total increase in the number of wild symbols is determined based on that random number and the wild symbol increase number determination table. The number of wild symbols is increased in a stepwise manner, or increased as a group.

Further, the main CPU 1071 executes a bonus game symbol table updating process (S1232). In the bonus game symbol table updating process, the main CPU 1071 updates the bonus game symbol table based on an increase in the number of wild symbols 1503*a* determined in the additional wild symbol increase count determining process.

Next, in step S1233, the main CPU 1071 executes a symbol increase effect process.

Next, the main CPU 1071 executes a bonus game symbol determining process (S1234). In the bonus game symbol determining process, the main CPU 1071 determines a code No. at the time of stopping the symbols 1501, by running the symbol determination program stored in the RAM 1073. More specifically, the main CPU 1071 obtains random numbers, and determines the code No. of each symbol column of the display blocks 1028, at the time of stopping the symbols, based on the random numbers obtained, and the bonus game symbol table.

Next, in step S1235, the main CPU 1071 executes a scroll display control process. This process is a display control whereby scrolling of symbols 1501 is started and symbols determined in S1234 are rearranged thereafter.

Next, the main CPU 1071 determines whether a winning is achieved (S1236). In the present embodiment, a winning is achieved when symbols 1501 rearranged along a payline L includes at least two symbols of the same type, as described above. The "WILD" symbol which is a wild symbol 1503*a* is a symbol 1501 which can substitute for another type of symbol 1501. In the bonus game, the number of wild symbols 1503*a* is increased compared to that of the regular game. Therefore, the possibility of winning is higher than the regular game.

In step S1236, the main CPU 1071 counts each type of the symbols 1501 rearranged on each payline L, among the symbols 1501 rearranged in step S1235. Then, the main CPU 1071 determines whether two or more types of symbols 1501 are rearranged.

When it is determined that a winning is achieved, the main CPU 1071 performs a process related to coin payout (S1237).

When it is determined that a winning is not achieved in S1236, or after the process of S1237, the main CPU 1071 determines whether three or more trigger symbols 503*b* are rearranged (S1238). In this process, whether or not three or more trigger symbols 1503*b* are rearranged in the display blocks 1028 is determined, without taking into consideration the paylines L.

In step S1238, when it is determined that three or more trigger symbols 1503*b* are rearranged, the main CPU 1071 sets the free game remaining count T to T=T+F1 (F1=first specific count=7) in the free game count storage region in the RAM 1073 (S1239).

In step S1238, when it is determined that fewer than three trigger symbols 1503*b* are rearranged, or after step S1239 is executed, the main CPU 1071 sets the free game remaining count T to T=T−1 in the free game count storage region in the RAM 1073 (S1240).

Next, the main CPU 1071 determines whether T equals 0, based on remaining count data stored in the free game count storage region of the RAM 1073 (S1241).

When it is determined that T does not equal 0, the main CPU 1071 brings the process back to step S1234. Meanwhile, when it is determined that T equals 0, the main CPU 1071 ends the sub routine.

(Operations of Slot Machine: Display Updating Process)

Figure 48:
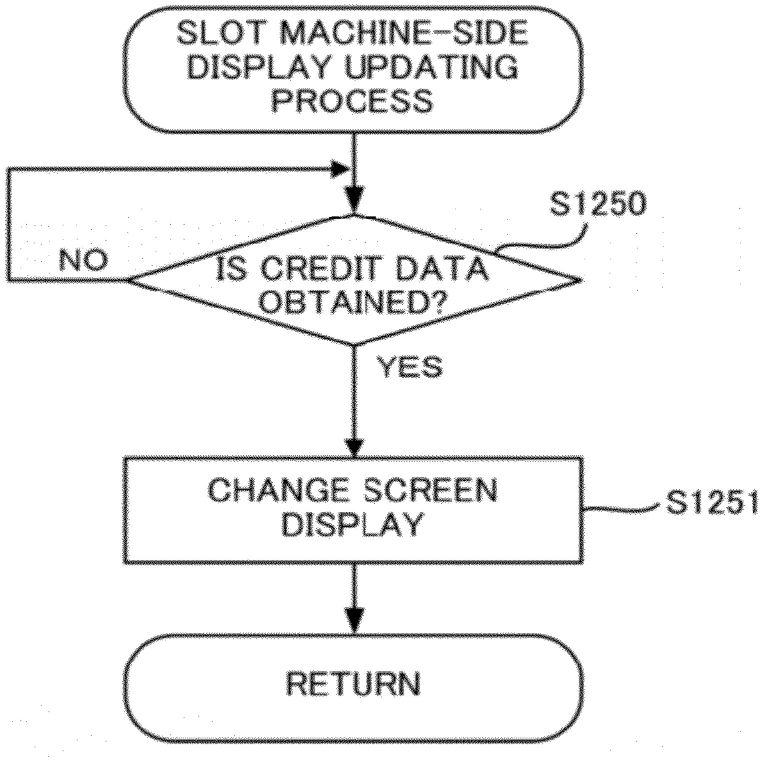
FIG. 48 is a flowchart of a display updating process of the slot machine according to the embodiment of the present invention.

Next, the display updating process is explained by using FIG. 48.

First of all, the main CPU 1071 determines whether or not the credit data has been acquired from the PTS terminal 1700 (step S1250). When the main CPU 1071 determines that the credit data has not been acquired, the main CPU 1071 waits.

On the other hand, when the main CPU 1071 determines that the credit data has been acquired, it updates the display of the credit amount display unit 1400 and broken number cash display unit 1403 on the lower image display panel 1141 (step S1251). Following this, the main CPU 1071 ends this subroutine.

(Operations of the Slot Machine: Cash-Out Process)

Figure 49:
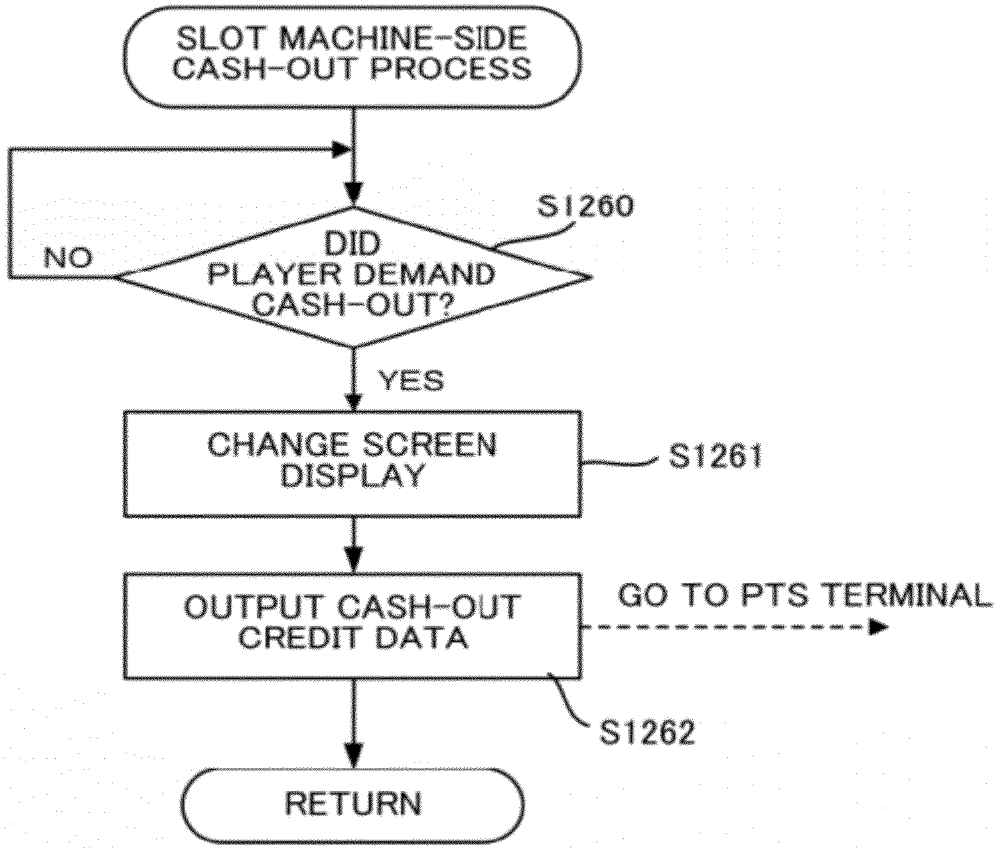
FIG. 49 is a flowchart of a cash-out process of the slot machine according to the embodiment of the present invention.

Next, the cash-out process is explained by using FIG. 49.

First of all, the main CPU 1071 determines whether or not there has been a cash-out by the player (step S1260). When the main CPU 1071 determines that no cash-out has been performed, the main CPU 1071 waits.

On the other hand, when the main CPU 1071 determines that a cash-out has been performed by the player in step S1260, it updates the display of the credit amount display unit 1400 and broken number cash display unit 1403 (step S1261). Following this, the main CPU 1071 outputs the cash-out credit data to the PTS terminal 1700 (step S1262), and ends this subroutine.

(Operations of the PTS Terminal: Credit Conversion Process)

Next, the operation of the PTS terminal 1700 is explained based on FIG. 50 to FIG. 54.

Figure 50:
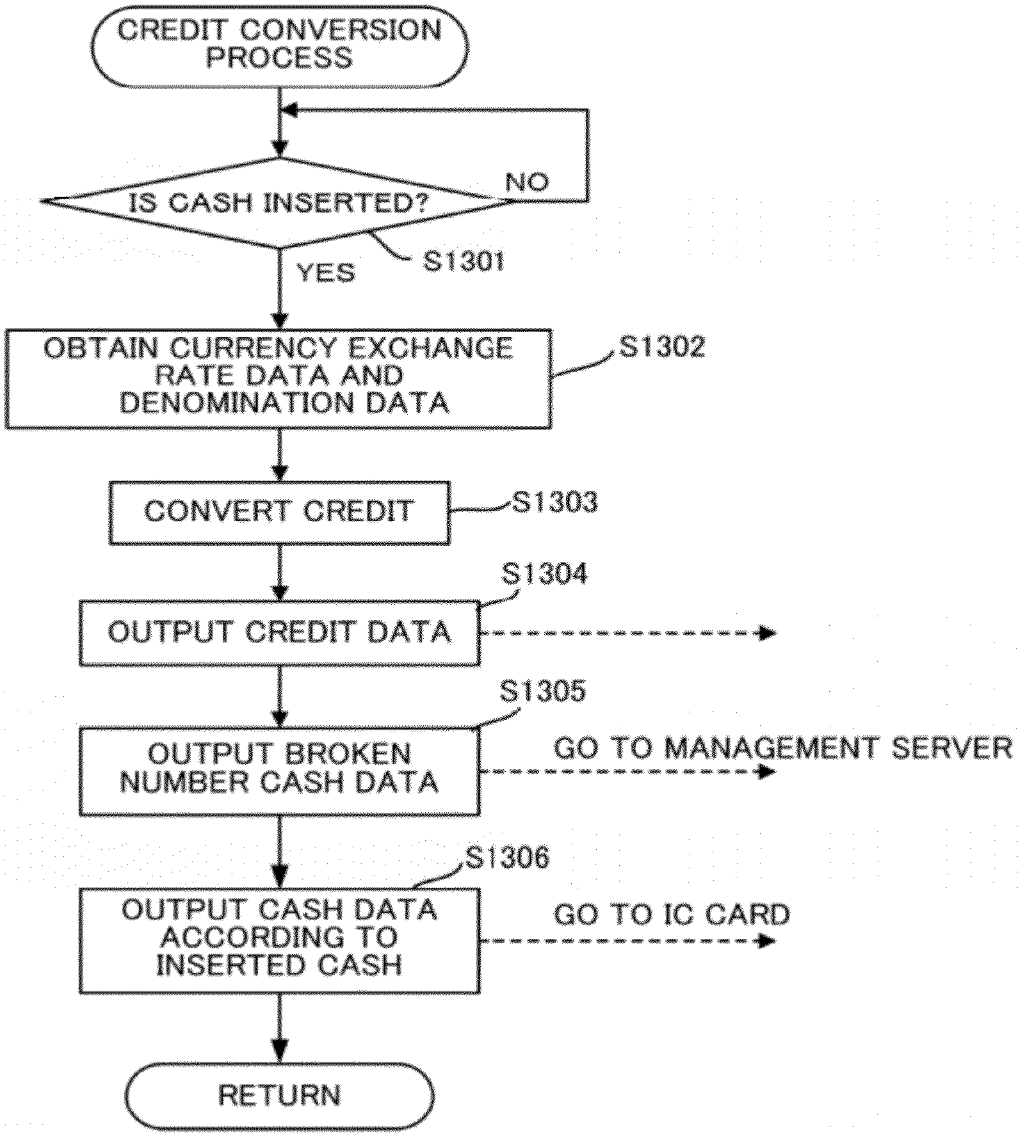
FIG. 50 is a flowchart showing a credit conversion process of the PTS terminal according to the embodiment of the present invention.

FIG. 50 is a flowchart of the credit Conversion Process in the PTS terminal 1700. First of all, the CPU 1731 determines whether or not cash has been inserted (step S1301). When the CPU 1731 determines that cash has not been inserted, the CPU 1731 waits.

On the other hand, when the CPU 1731 determines that cash has been inserted, it acquires the currency exchange rate data and denomination data from the management server block 2820 (step S1302).

Next, the CPU 1731 converts the inserted cash to credits based on the acquired currency exchange rate data and denomination data (step S1303).

Following this, the CPU 1731 outputs the credit data based on the converted credits to the game controller 1100 (step S1304).

Next, the CPU 1731 outputs the broken number cash data based on the broken number cash obtained from credit conversion to the management server block 2820 (step S1305).

Following this, the CPU 1731 outputs the cash data based on the inserted cash to the IC card 1500. Thus, each time cash is inserted, the cash data is updated in the IC card 1500 (step S1306). Following this, the CPU 1731 ends this subroutine.

(Operations of the PTS Terminal: Cash-Out Process)

Figure 51:
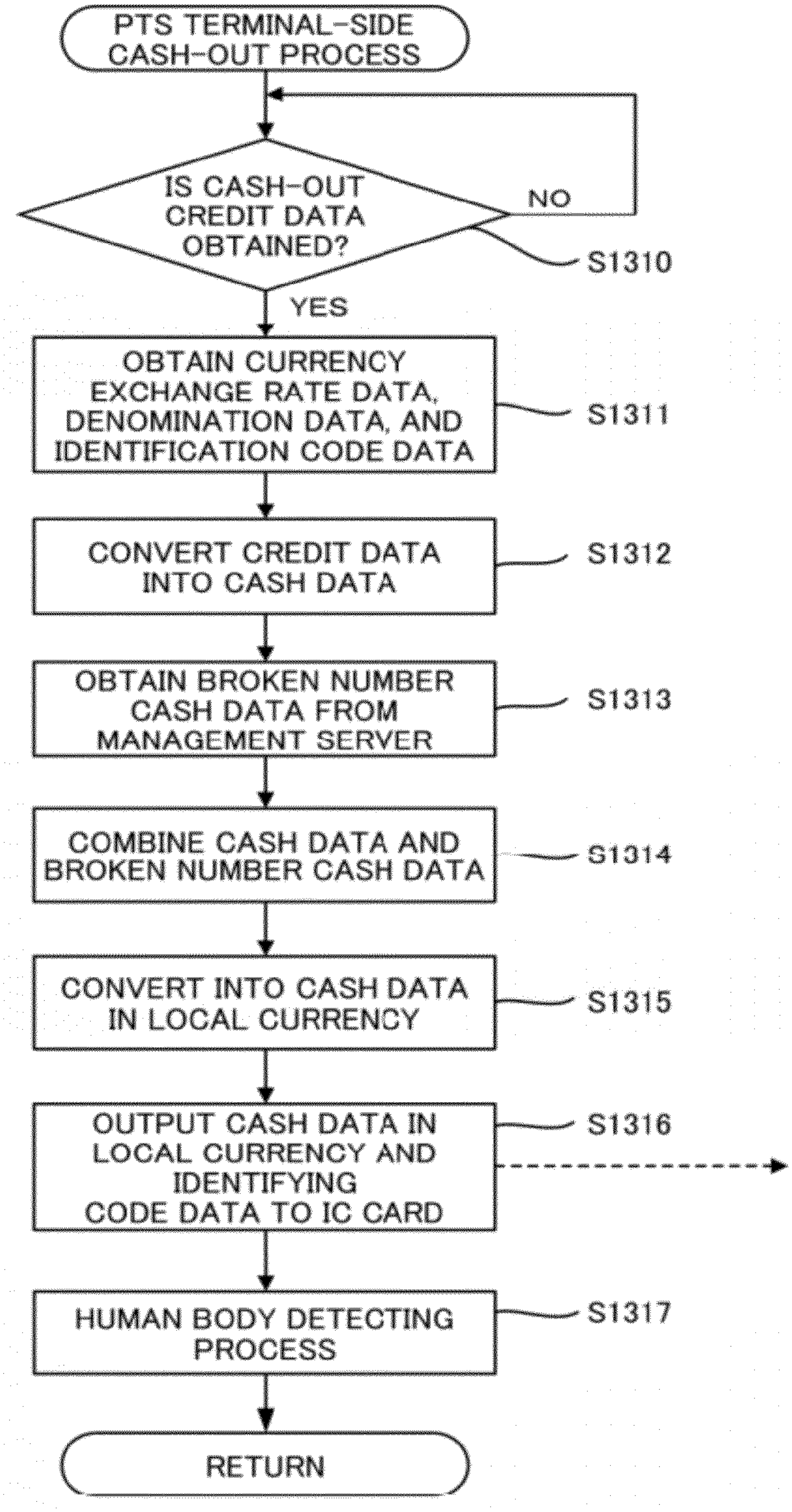
FIG. 51 is a flowchart showing the cash-out process of the PTS terminal according to the embodiment of the present invention.

FIG. 51 is a flowchart of the cash-out process in the PTS terminal 1700. First of all, the CPU 1731 determines whether or not the cash-out credit data has been acquired from the game controller 1100 of the slot machine 1010 (step S1310). When the CPU 1731 determines that the cash-out credit data has not been acquired, the CPU 1731 waits.

Meanwhile, the CPU 1731 acquires the currency exchange rate data, denomination data, and identification code data from the management server block 2820 (step S1311).

Next, based on the denomination data, the CPU 1731 converts the cash-out credit data to cash data (step S1312).

Following this, the CPU 1731 acquires the stored broken number cash data from the management server block 2820 (step S1313).

Next, the CPU 1731 combines the converted cash data and the acquired broken number cash data (step S1314).

Following this, the CPU 1731 converts the combined cash data to cash data of the local currency based on the currency exchange rate data (step S1315).

Next, the CPU 1731 outputs the cash data in local currency and the identification code to the IC card 1500 (step S1316).

After this, the CPU 1731 executes the human body detection process (step S1317), and ends this subroutine.

(Operations of the PTS Terminal: Authentication Process)

Figure 52:
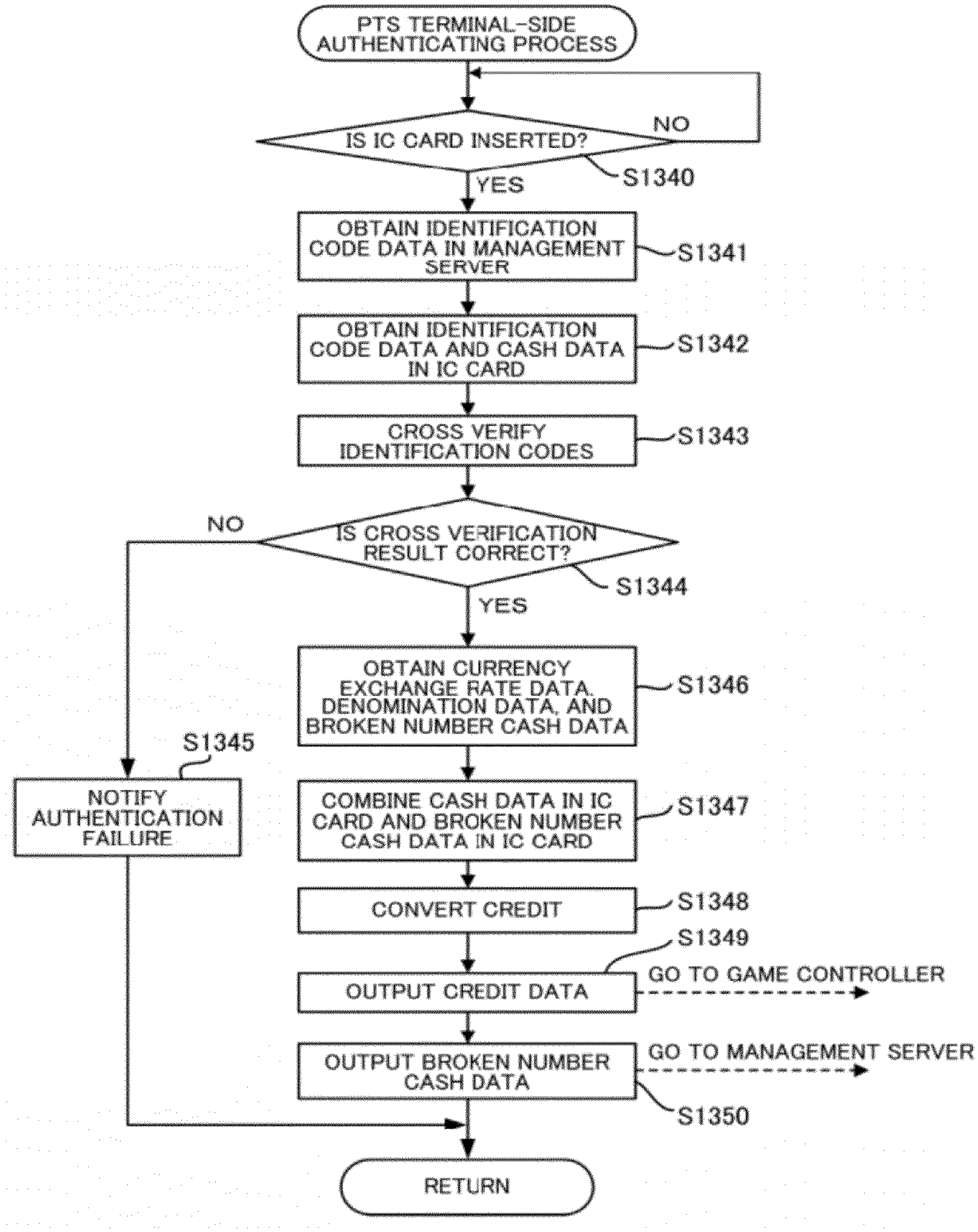
FIG. 52 is a flowchart showing an authenticating process of the PTS terminal according to the embodiment of the present invention.
Figure 53:
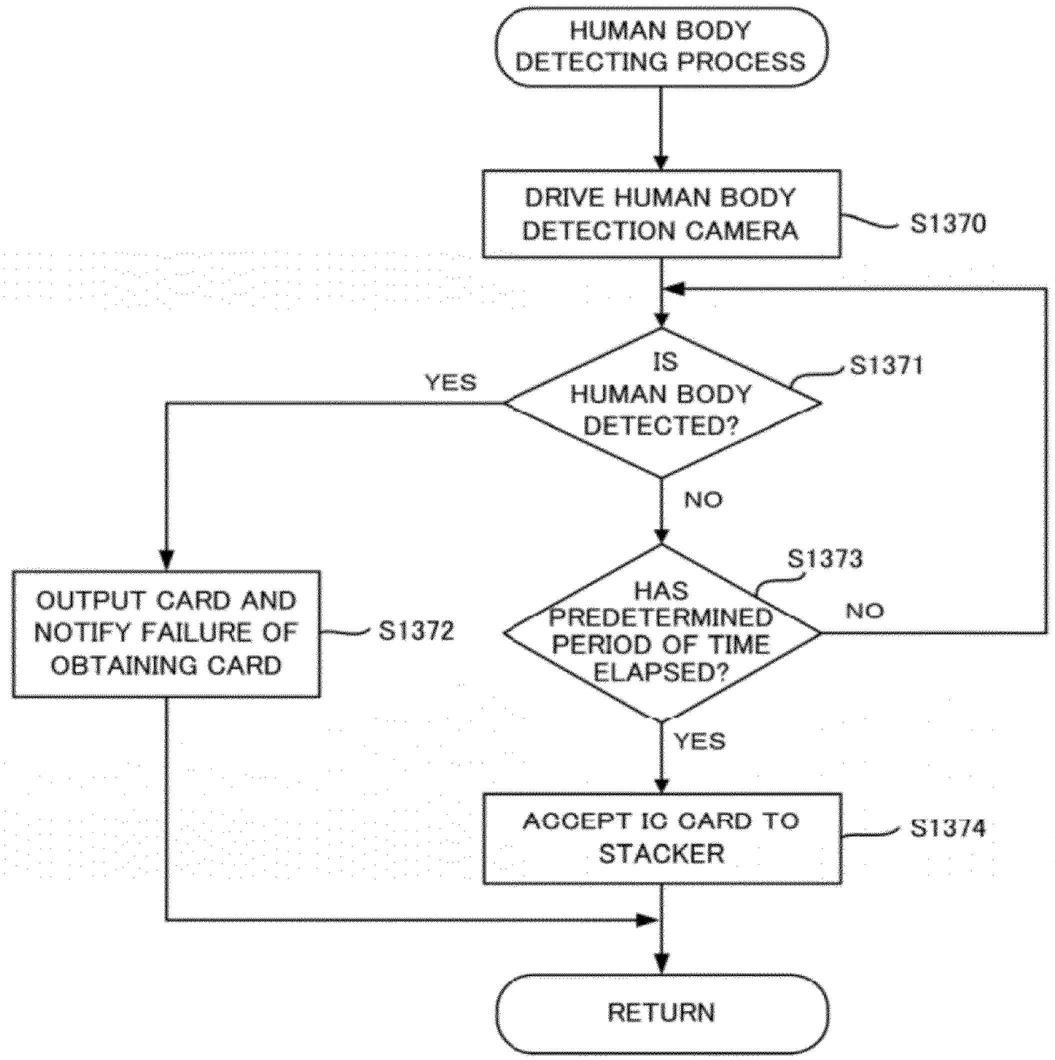
FIG. 53 is a flowchart showing a human body detecting process of the PTS terminal according to the embodiment of the present invention.

FIG. 52 is a flowchart of the authentication process in the PTS terminal 1700. First of all, the CPU 1731 determines whether or not the IC card 1500 has been inserted (step S1340).

Following this, the CPU 1731 acquires the identification code data of the inserted IC card 1500 from the management server block 2820 (step S1341).

Following this, the CPU 1731 acquires the identification code data and cash data from the IC card 1500 (step S1342).

Next, the CPU 1731 cross-verifies the identification code acquired from the management server block 2820 and the identification code within the IC card 1500 (step S1343).

Then, the CPU 1731 determines whether or not the cross verification result are correct (step S1344). When the CPU 1731 determines that the cross verification results are not correct, an authentication failure notification sound is output from speakers 1707 and 1708 (step S1345). Following this, the CPU 1731 ends this subroutine.

On the other hand, if the CPU 1731 determines that the cross verification results are correct in step S1344, it acquires the currency exchange rate data, denomination data, and broken number cash data from the management server block 2820 (step S1346).

Next, the CPU 1731 combines the cash data acquired from the IC card 1500 and the broken number cash data acquired from the management server block 2820 (step S1347).

Next, the CPU 1731 converts the combined cash data to credits (step S1348).

Following this, the CPU 1731 outputs the credit data based on the converted credits to the game controller 1100 (step S1349).

Next, the CPU 1731 outputs the broken number cash data based on the broken number cash obtained from credit conversion to the management server block 2820 (step S1350). Following this, the CPU 1731 ends this subroutine.

(Operations of the PTS Terminal: Human Body Detection Process)

Figure 54:
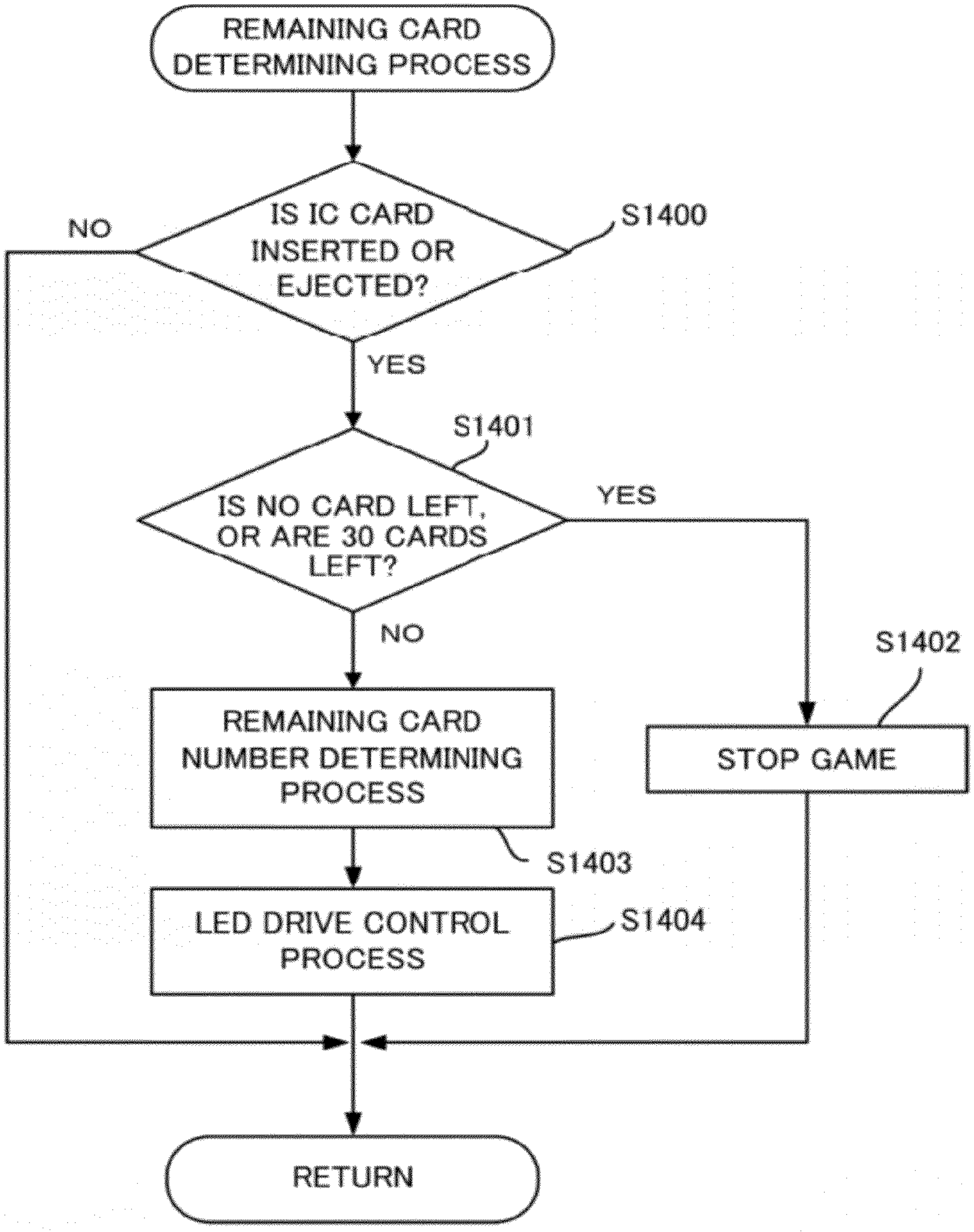
FIG. 54 is a flowchart showing a remaining card determining process of the PTS terminal according to the embodiment of the present invention.

FIG. 54 is a flowchart of the human body detecting process in the PTS terminal 1700. First of all, the CPU 1731 drives the human body detection camera 1712 (1713) (step S1370).

Then, the CPU 1731 determines whether or not human body detection has been performed (step S1371). When the CPU 1731 determines that a human body has been detected, it ejects the IC card 1500 and at the same time, outputs a notification sound from speakers 1707 and 1708 to notify that the IC card has not been claimed (step S1372). Following this, the CPU 1731 ends this subroutine.

On the other hand, when the CPU 1731 determines that no human body has been detected in step S1371, it stores the time during detection in the RAM 1732, and determines whether or not the predetermined time period has elapsed since that time (step S1373).

In step S1373, when the CPU 1731 determines that the predetermined time period has not elapsed, it returns the process to step S1371. On the other hand, in step S1373, when the CPU 1731 determines that the predetermined time period has elapsed, it fetches the IC card 1500 in the card stacker 1121 (step S1374). Following this, the CPU 1731 ends this subroutine.

(Operations of the PTS Terminal: Remaining Cards Judgment process)

FIG. 54 is a flowchart of the remaining cards determining process in the PTS terminal 1700. First of all, the CPU 1731 determines whether or not an IC card 1500 has been inserted or removed (step S1400).

When the CPU 1731 determines that an IC card 1500 has neither been inserted nor removed, it ends this subroutine.

On the other hand, in step S1400, if it is determined that an IC card 1500 has been inserted or removed, the CPU 1731 determines whether or not the remaining number of IC cards 1500 in the card stacker 1121 is either 0 or 30 (step S1400). If it is determined that the remaining number of IC cards 1500 in the card stacker 1121 is either 0 or 30, the CPU 1731 stops the game in progress (step S1402). Note that at this point, the CPU 1731 lights up the LED 1709 in gray color. Following this, the CPU 1731 ends this subroutine.

On the other hand, in step S1401, if it is determined that the remaining number of cards is neither 0 nor 30, the CPU 1731 executes the remaining card number determining process (step S1403).

Following this, the CPU 1731 executes the LED drive control process (step S1404). During this process, the CPU 1731 lights up the LED 1709 in a color corresponding to the number of remaining cards as determined in step S1403. Following this, the CPU 1731 ends this subroutine.

(Operations of the IC Card: Display Updating Process)

Figure 55:
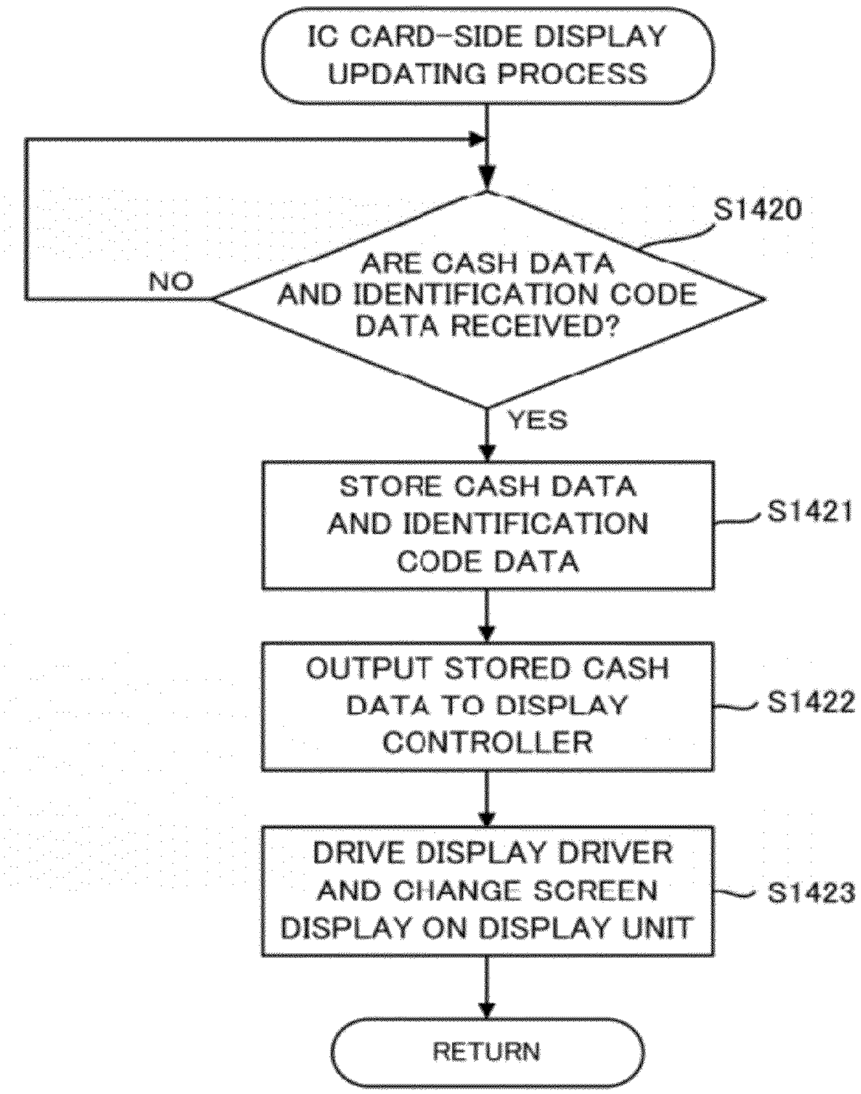
FIG. 55 is a flowchart of a display updating process of the IC card according to the embodiment of the present invention.

Next, the operation of the IC card 1500 is explained based on FIG. 55.

FIG. 55 is a flowchart of the display updating process in the IC card 1500. First of all, the CPU 1542 determines whether or not the cash data and identification code data have been received from the PTS terminal 1700 (step S1420).

When the CPU 1542 determines that the cash data and identification code data have not been received, the CPU 1542 waits. On the other hand, when the CPU 1542 determines that the cash data and identification code data have been received, it stores the acquired cash data and identification code data in the credit data memory 1552 (step S1421).

Next, the CPU 1542 outputs the stored cash data to the display controller 1551 (step S1422). Following this, it drives the display driver 1506, and changes or updates the screen display of the display part 1510 (step S1423). Following this, the CPU 1542 ends this subroutine.

(Operations of the Management Server: Storing Process)

Figure 56:
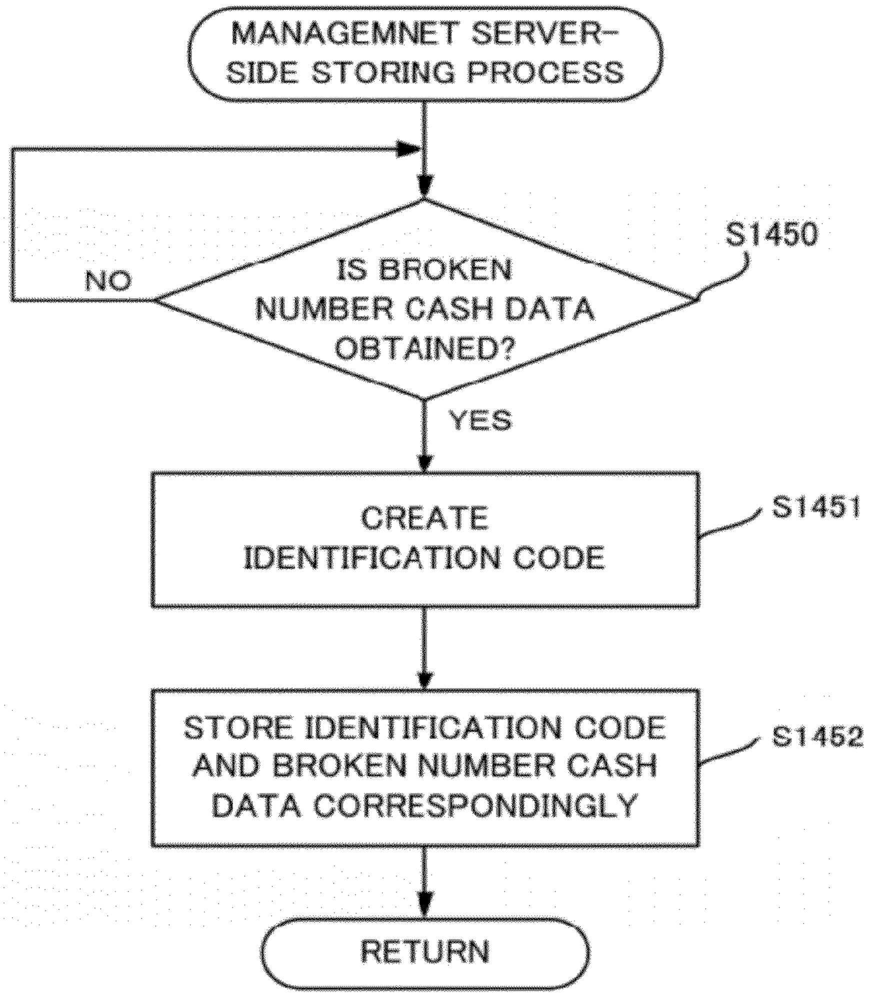
FIG. 56 is a flowchart showing a storing process of a management server according to the embodiment of the present invention.

Next, the operation of the management server block 2820 is explained based on FIG. 56.

First of all, the management server block 2820 determines whether or not the broken number cash data has been acquired from the PTS terminal 1700 (step S1450).

When the management server block 2820 determines that the broken number cash data has not been acquired, the management server block 2820 waits. On the other hand, when the management server block 2820 determines that the broken number cash data has been acquired, it creates an identification code (step S1451).

Next, the management server block 2820 associates the created identification code with the broken number cash data, and stores it (step S1452). Following this, the management server block 2820 ends this subroutine.

According to the above process, by displaying the credit-related data of the credit data memory 1552 on the display unit 1510 of the IC card 1500, the credit-related data stored in the credit data memory 1552 can be viewed from outside. Therefore, when the credit-related data of the display writing IC 1505 is rewritten by the slot machine 1010, the rewritten credit-related data can be checked from the display of the display unit 1510. Also, due to the fact that the credit-related data of the credit data memory 1552 that is rewritten by the slot machine 1010 is used for display of the display unit 1510, the credit-related data stored in the same storage unit is set to a state where it is used for both update and display by the slot machine 1010. Thus, in comparison to the case when the credit-related data of the storage unit is transferred to another storage unit as data for display, and is stored and displayed as data for display in the other storage unit along with the update of the credit-related data of the storage unit, data mismatch due to generation of noise during data transfer is prevented, and the credit data can be displayed in the display unit 1510 with high reliability.

Because the updated data can be checked from the display of the display unit 1510 immediately after it is updated by the PTS terminal 1700, a sense of security can be achieved by being able to check the data of the IC card 1500 at all times during the game.

This embodiment is thus described as above; however, the present invention can have the following embodiment as well.

Figure 57:
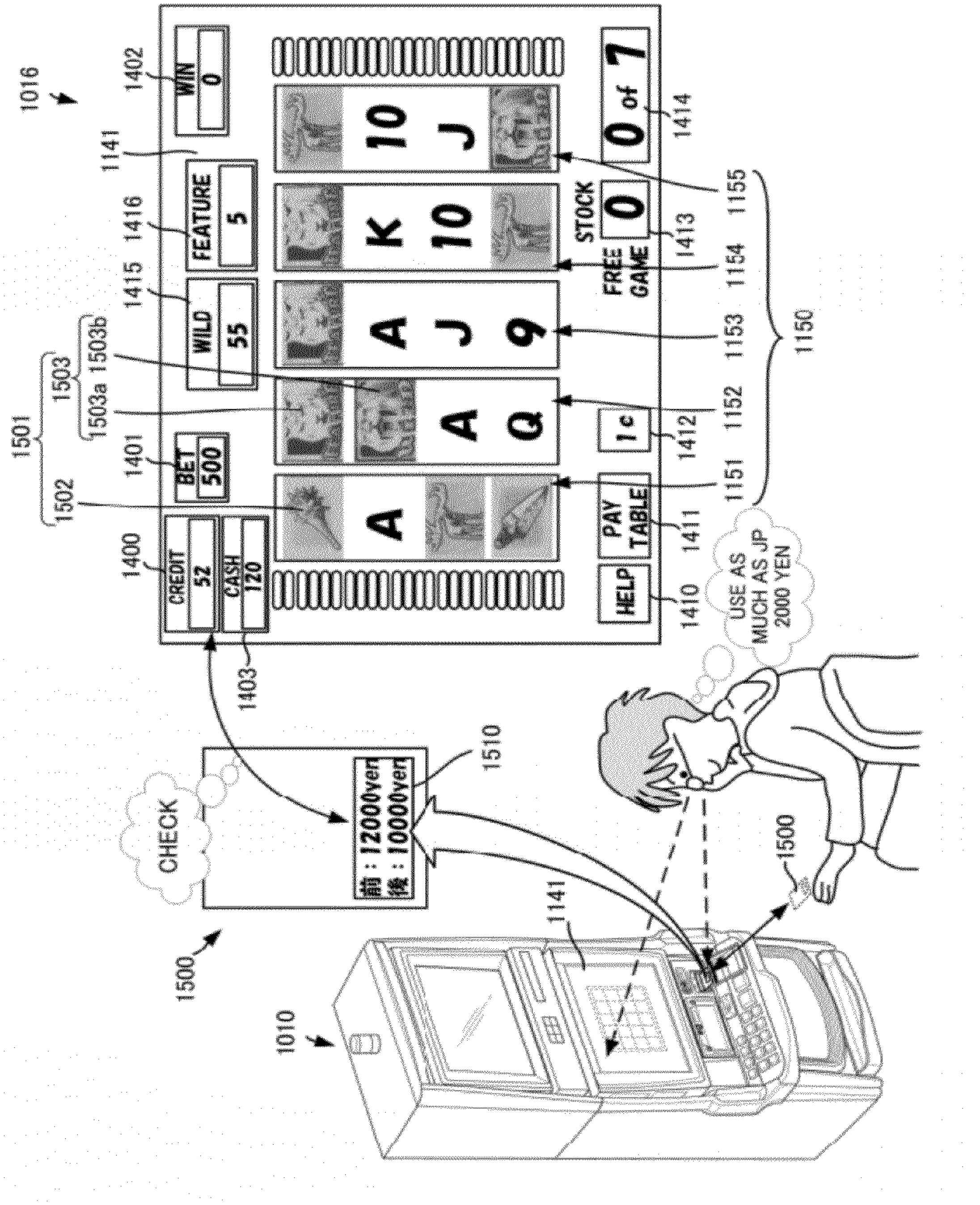
FIG. 57 is an explanatory view showing the overview of the slot machine according to another embodiment of the present invention.

For example, as shown in FIG. 57, the player can proceed with his/her game while checking the course of usage of credits within the IC card 1500. The example in FIG. 57 shows how the display unit 1510 is updated immediately after 2000 yen is used in the game. In this way, the display unit 1510 of the IC card 1500 may display the cash data before and after 2000 credits have been deducted.

In other words, in the IC card 1500 of the present embodiment, the display unit 1510 may display the cash data immediately before and immediately after being rewritten by the PTS terminal 1700.

According to the above configuration, because it is possible to check the data before and after the cash data is updated by the PTS terminal 1700, the understanding of the update contents can be made easier.

Note that in the present embodiment, the explanation is for a case with 25 paylines L, however, in the present invention, the number of paylines L is not particularly limited, for example, it may be 30 as well.

In the present embodiment, bonus winning has been explained for a case wherein three or more trigger symbols 1503*b* are rearranged, however, this is not particularly restricted. For example, a bonus winning may also be possible when the predetermined time elapses after the previous bonus game has ended.

Furthermore, in the present embodiment, the explanation is given for a slot machine 1010, however, other playing games such as the so-called pachinko machines are also applicable.

Further, in the present embodiment, the authentication of the IC card is performed by the PTS terminal 1700, however, it can also be performed by the management server block 2820 or the IC card 1500.

Further, in the present embodiment, the conversion of the cash data into credits is performed by the PTS terminal 1700, however, it can also be performed by the management server block 2820 or the IC card 1500.

Further, in the present embodiment, the free game is a game in which display of symbols on display blocks 1028 are varied and stopped, and then an amount of payout is determined according to the symbols having stopped or a combination of the stopped symbols (i.e. a game normally run in a slot machine). However, the free game of the present invention is not limited to this, and the free game may be different from a game run in a slot machine. Examples of the free game include: a card game such as poker, a shooting game, a fighting game, or the like. The free game may be a game that awards a game medium or a game awarding no game medium.

The free game in the present invention may be suitably designed, and is not particularly limited, as long as the free game requires no bet of a game medium.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process executed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes executed in the steps or blocks, these processes are essentially executed by various devices. Further, the other structures necessary for the steps or blocks are obvious from the above descriptions.

Figure 58:
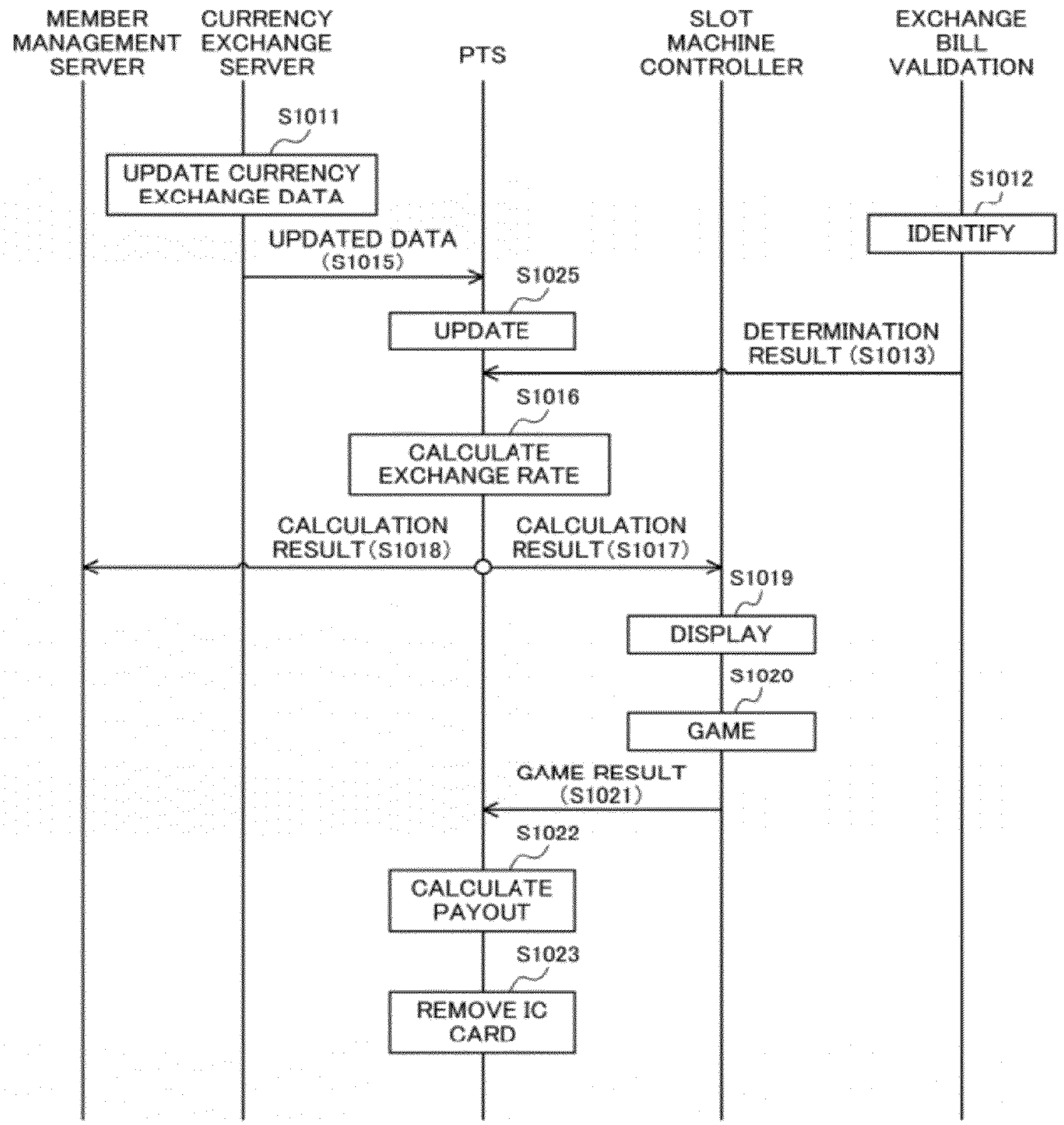
FIG. 58 is a timing chart of the game system according to the other embodiment of the present invention.

FIG. 58 is a timing chart showing another embodiment of the timing chart shown in FIG. 3. In the embodiment shown in FIG. 3, the description is given for the case when the identification results are sent from the bill validator, a data request is sent to the currency exchange server 2862 in the PTS terminal 1700, and then the updated most recent data is received by the PTS terminal 1700 from the currency exchange server 2862, however, in the example shown in FIG. 58, updated data related to currency exchange is downloaded periodically from the currency exchange server 2862 to the PTS terminal 1700. In the PTS terminal 1700, the currency exchange data stored in the RAM 1732 is updated based on the data downloaded from the currency exchange server 2862 (step S1025). Thus, when identification results from the bill validator are received in the PTS terminal 1700 (step S1013), rate calculation can be performed immediately by using the most recent currency exchange data (step S1016).

Figure 59:
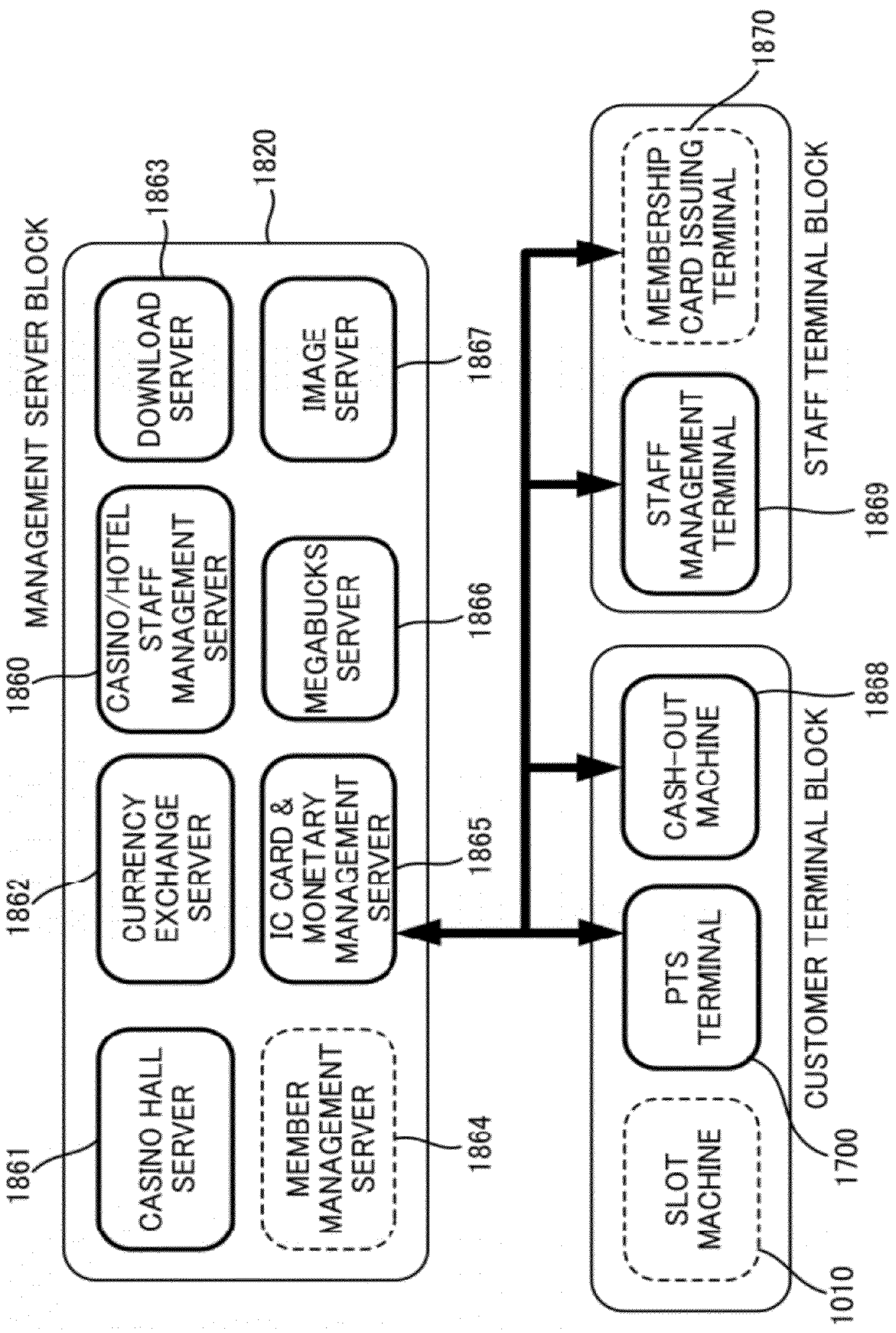
FIG. 59 is a diagram showing a block image of the game system including the slot machine according to the other embodiment of the present invention.

FIG. 59 shows the block image of a game system including the slot machine 1010 according to another embodiment of the present invention. As shown in FIG. 58, the game system is broadly classified into three namely the management server block, customer terminal block, and staff terminal block.

The management server block includes a casino hall server 1861, a currency exchange server 2862, a casino/hotel staff management server 1860, and a download server 1863.

The casino hall server 1861 is the server which manages the entire casino hall in which the slot machines 1010 are installed. The currency exchange server 2862 is used to create the currency exchange rate data based on the currency exchange information. The casino/hotel staff management server 1860 is used to manage the casino hall staff, or the hotel staff related to the casino hall. The download server 1863 is used to download information about games and the most recent information such as news, etc. and to notify the same to the player through the PTS terminal 1700 of each slot machine 1010.

Furthermore, the management server block 2820 comprises a member management server 1864, an IC card & monetary management server 1865, a megabucks server 1866, and an image server 1867.

The member management server 1864 is used to manage the member information of players playing on the slot machines 1010. The IC card & monetary management server 1865 is used to manage the IC cards 1500 used on the slot machines 1010. More specifically, the IC card & monetary management server 1865 is used to associate the broken number cash data with the identification codes and store them, and then to output the broken number cash data to PTS terminal 1700. Note that the IC card & monetary management server 1865 creates and manages the denomination rate data as well. The megabucks server 1866 manages a megabucks which is a game where the total amount of wagers is utilized as a payout, the wagers being placed at slot machines 1010 provided at a plurality of casino halls and the like, for example. The image server 1867 is used to download information about games and the most recent image such as news, etc. and to notify the same to the player through the PTS terminal 1700 of each slot machine 1010.

Next, the customer terminal block includes the slot machines 1010, the PTS terminal 1700, and a cash-out machine 1868.

Here, as described earlier, the PTS terminal 1700 is attachable to the slot machine 1010, and is capable of communicating with the management server block 2820. The cash-out machine 1868 performs a cash-out by converting cash data into cash, stores coins or bill as cash data onto the IC card 1500, and the like, the cash data being stored on the IC card 1500 carried by the player.

Next, the staff terminal block has a staff management terminal 1869 and a membership card issuing terminal 1870.

The staff management terminal 1869 is for the staff at the casino hall to manage the various types of slot machines 1010. Particularly in the present embodiment, the staff at the casino hall manages whether the number of IC cards 1500 stocked in the PTS terminal 1700 is in excess, or there is a shortage of IC cards 1500. The membership card issuing terminal 1870 is meant for players playing games at the casino hall to obtain a membership card.

Figure 60:
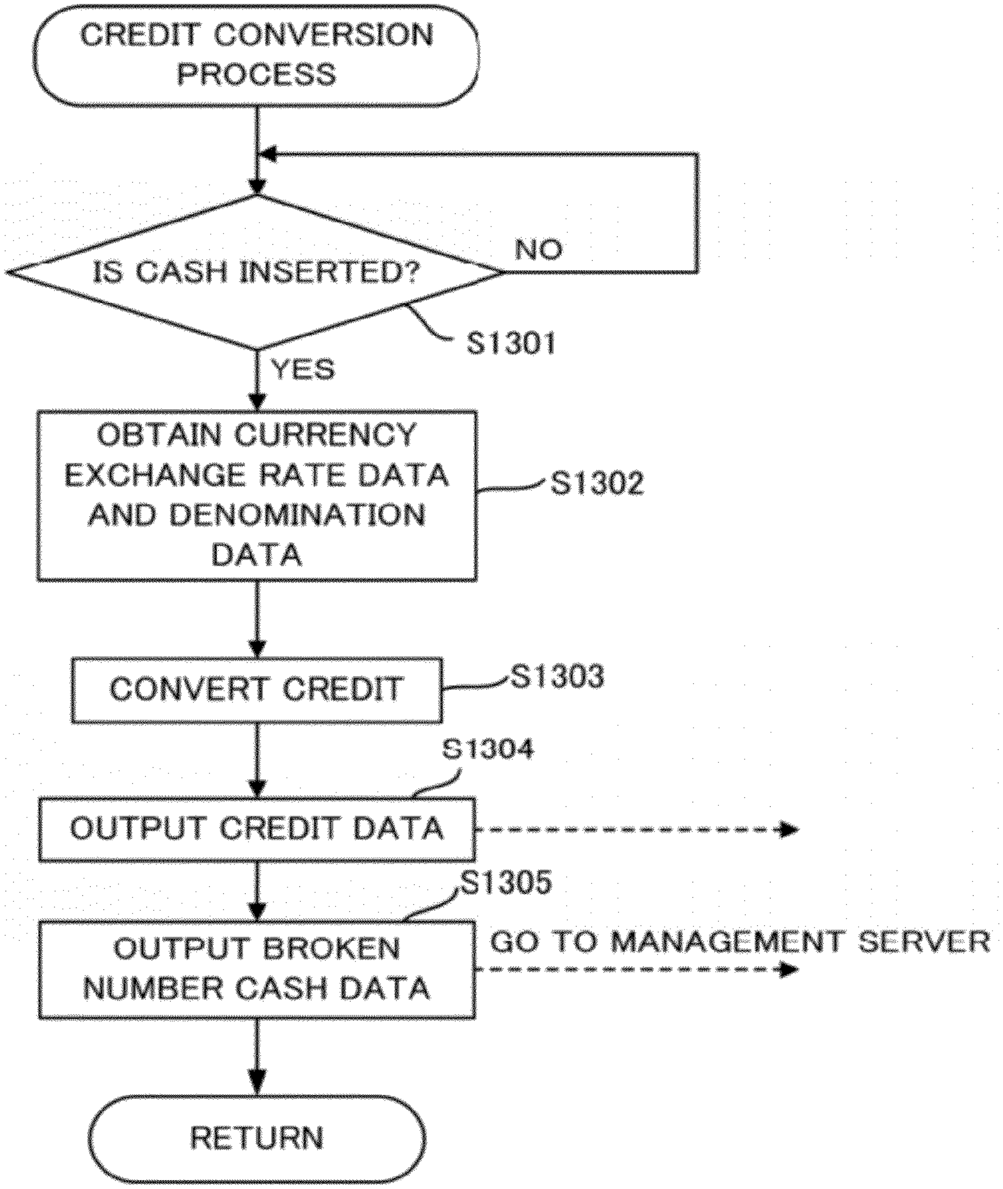
FIG. 60 is a flowchart of the credit conversion process according to the other embodiment of the present invention.

FIG. 60 is a flowchart showing another embodiment of the credit conversion process in the PTS terminal 1700 shown in FIG. 50. In FIG. 60, the cash data (money amount data) is not sent to the IC card shown in FIG. 50. Thus, the data based on the inserted cash is sent to the game controller, and after the game is started, the money amount data presented to the player in accordance with the game results is written on the IC card.

Figure 61:
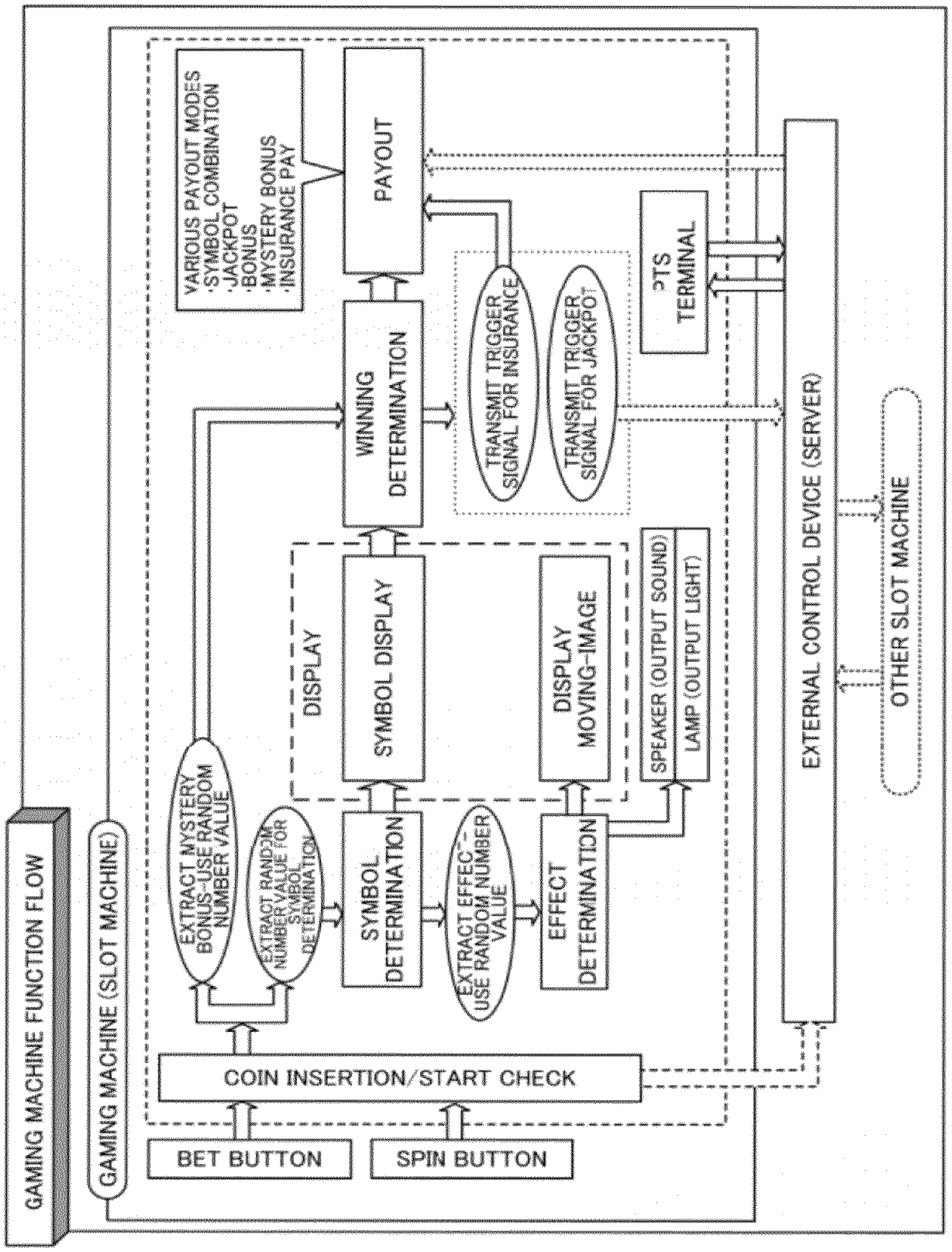
FIG. 61 is a diagram showing a functional flow of the game system according to the other embodiment of the present invention.

FIG. 61 is a functional flow describing the basic functions of the gaming machine according to the other embodiment.

<Coin Insertion/Start Check>

First, the gaming machine checks whether the BET button and the start button 1046 (FIG. 5) are sequentially pushed by a player in this order.

<Symbol Determination>

Next, when the player presses the spin button, the gaming machine extracts a random number value for symbol determination. Then, for each of the plurality of video reels displayed on the display, the gaming machine determines the symbols to be presented to the player when scrolling of symbol columns is stopped.

<Symbol Display>

Next, the gaming machine starts scrolling a symbol column of each video reel, and stops the scroll so that the determined symbols are presented to the player.

<Winning Determination>

Next, when the symbol column of each video reel stops scrolling, the gaming machine determines whether a combination of the symbols presented to the player yields a winning.

<Payout>

Next, when a combination of the symbols presented to the player yields a winning, the gaming machine awards the player a benefit (payout) according to the combination of the symbols. For instance, when a combination of symbols leading to a payout of coins is displayed, the gaming machine pays out the number of coins according to the combination of the symbols to the player. Instead of paying out real coins, the payout can also be performed by writing the credit information corresponding to the number of coins to be paid out on the IC card.

Furthermore, the gaming machine starts a free game when a combination of symbols (trigger symbols) leading to a free game trigger is displayed.

When a combination of symbols leading to the jackpot trigger is displayed, the gaming machine pays out the jackpot amount to the player. Jackpot is a function of accumulation of a part of the coins consumed by the players in each gaming machine as the jackpot amount, and then paying out the accumulated jackpot amount to the gaming machine on which the jackpot trigger is realized. The gaming machine calculates the amount (cumulative amount) accumulated in the jackpot amount for each game, and sends it to the external control device. The external control device keeps accumulating the cumulative amount sent from each gaming machine in the jackpot amount.

Furthermore, apart from the above-mentioned benefits, other benefits such as mystery bonus and insurance are provided in the gaming machine. Mystery bonus refers to paying out of a predetermined amount due to winning a special lottery prize. When the spin button is pressed, the gaming machine extracts a random number value for mystery bonus, and determines whether the mystery bonus is realized by a lottery.

Insurance is a function that is provided with the purpose of rescuing a player from a situation where a free game has not been played for a long time. In the present embodiment, the player can select upon his/her wish whether or not to enable the insurance function. Insurance is enabled in exchange for a predetermined insurance accession amount. When insurance is enabled, the gaming machine starts the game frequency count. Instead of paying out large amounts due to free games, the gaming machine 1010 pays out the amount set for insurance when the game frequency count reaches the predetermined number.

<Effect Determination>

The gaming machine executes an effect through the display of images from the display, output of light from the lamp, and output of sound from the speaker. The gaming machine extracts an effect-use random number value, and then based on the symbols determined by a lottery, determines the effect.

Figure 62:
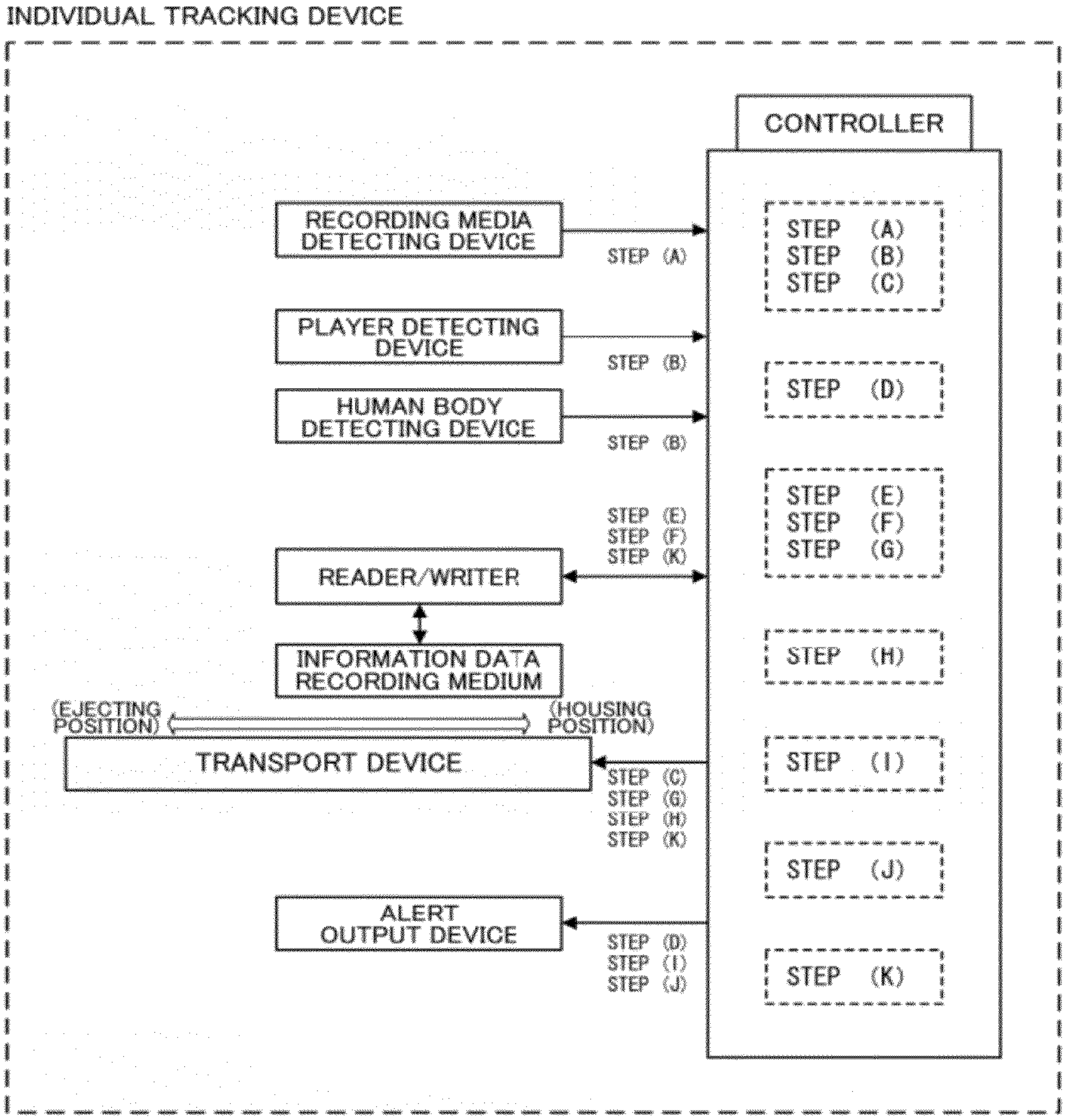
FIG. 62 is a functional block diagram of the game system according to the other embodiment of the present invention.

FIG. 62 is a block diagram showing the PTS terminal (reading and writing device for the information data storage medium) according to the other embodiment of the present invention. The PTS terminal comprises a player detection device, a transport device, a recording medium detection device, and a controller. Note that the later-described PTS terminal 1700 corresponds to the "Reading and writing device for the information data storage medium" and "Player tracking system", the human body detection camera 1712 (1713) and the human body detection sensor 1115 corresponds to the "Player detection device", the motor for transporting the IC card corresponds to the "Transport device", the IC card ejecting position sensor corresponds to the "Recording medium detection device", and the CPU 1731, the ROM 1733, and the RAM 1732 correspond to the "Controller".

The player detection device is used to detect the presence of a player playing on the gaming machine. This device may detect an image of the player either optically, or even thermally or mechanically. When the presence of a player is detected, a detection signal must be issued. Thus, the player detection device must be a device installed in front of the gaming machine that can detect whether or not a human body is present.

The transport device transports the information data recording medium. The transport device must be supplied with electric power and driven. The information data recording medium is transported to and positioned at the housing position or ejecting position by the transport device.

The ejecting position is the position to which the information data recording medium is transported by the transport device, a part of the information data recording medium is exposed and projected, and the player can hold the information data recording medium and can also remove it from the player tracking system.

The housing position is a predetermined position within the player tracking system. The housing position is not limited to just one position, but a plurality of positions are applicable. For example, one of the housing positions is the loading position. The loading position is the position where communication with the player tracking system can be performed by the later-described reader/writer, the predetermined information and data can be written to the information data recording medium and can also be read from the information data recording medium.

Further, the housing position can also be the stacker position that is used to transport the information data recording medium to the stacker for storage. Two stacker positions must be available. First is the regular stacker and the second is the alert stacker. Both these stackers can hold only as many IC cards as the predetermined number. The regular stacker is used to hold the initialized IC cards. The second stacker is used to hold IC cards for which an alert has been issued when the predetermined alert condition is satisfied.

Thus, the player tracking system according to the embodiment of the present invention must have a loading position, a regular stacker housing position, and an alert stacker storage position as the housing positions.

Furthermore, the information data recording medium must be such that it can be mounted to and dismounted from the player tracking system. As described above, when the information data recording medium is positioned at the ejecting position, the player can remove the information data recording medium from the player tracking system. Furthermore, by inserting the information data recording medium inside the player tracking system from outside the player tracking system, the player can even position the information data recording medium at the ejecting position. When the information data recording medium is positioned at the ejecting position, the information data recording medium is transported to any one position from among the housing positions by the transport device.

Furthermore, the information data recording medium may be a contact type or non-contact type medium. When the information data recording medium is positioned at the loading position, it must be possible to perform communication with the player tracking system, and be able to write to and read the predetermined information or data from the information data recording medium. For example, the information data recording medium may be an IC card.

A recording medium detection device is installed at the above-mentioned ejecting position. The recording medium detection device detects the presence of the information data recording medium at the ejecting position when the information data recording medium is positioned at the ejecting position. When the recording medium detection device detects that the information data recording medium is present at the ejecting position, it must issue a detection signal. The information data recording medium is positioned at the ejecting position not just by the transport device through transport to the ejecting position and then positioning thereat, but the player can also position the information data recording medium at the ejecting position by inserting it inside the player tracking system from outside the player tracking system The controller must comprise a Central Processing Unit (CPU), a Read Only Memory (ROM), and a Random Access Memory (RAM). This controller can execute the below-mentioned processes (A) to (C).

The process (A) is used to determine whether or not the information data recording medium exists at the ejecting position by using the recording medium detection device. The determining process of (A) must be executed based on the detection signal issued from the recording medium detection device. The process of step S1563 of FIG. 26 that is described later corresponds to the process (A).

The process (B) is used to determine whether or not a player is present by using the player detection device. The determining process of (B) must be executed based on the detection signal issued from the player detection device. The process of step S1571 of FIG. 26 corresponds to the process (B).

The process (C) is used to transport the information data recording medium from the ejecting position to the housing position by the transport device when it is determined that the information data recording medium exists at the ejecting position, and that no player is present. During the process (C), the transport device must be driven by issuing a drive control signal to the transport device, and then transporting the information data recording medium from the ejecting position to the housing position when it is determined that the information data recording medium exists at the ejecting position, and that no player is present. The process of step S1601 of FIG. 26 that is described later corresponds to the process (C).

By setting up such a configuration, the information data recording medium is transported to the housing position when the information data recording medium exists at the ejecting position and when no player is present at the gaming machine. In other words, the information data recording medium can be removed from the ejecting position when the information data recording medium exists at the ejecting position and when no player is present. Furthermore, the information data recording medium removed from the ejecting position is held inside the player tracking system.

Thus, even if the information data recording medium is left behind in the gaming machine, the complex task of removing the information data recording medium by the staff members by going up to the gaming machine can be made unnecessary, the workload of the gaming arcade can be reduced, and tasks can be prevented from becoming complex. Furthermore, illegitimate actions such as illegal acquisition of credits by other players through possession of unclaimed information data recording medium can also prevented.

Furthermore, the player tracking system (PTS) according to the embodiment of the present invention must have an alert output device for the output of alert information. In such a case, the above-mentioned controller must execute the below-mentioned process (D).

The process (D) is used to execute the process for the output of the hall alert information from the alert output device when it is determined that the information data recording medium exists at the ejecting position, and that no player is present. In this process (D), when it is determined that the information data recording medium exists at the ejecting position, and that no player is present, the hall alert information must be output from the alert output device by supplying the hall alert information for showing an alert to the alert output device. The processes of step S1595, S1597, or S1599 of FIG. 26 described later correspond to the process (D).

The players and staff members must be able to recognize the output of this hall alert information. Furthermore, information and data that can be identified not just by the players and staff members but also by control devices such as hall computers must be included in the hall alert information. Recording in control devices such as hall computers and precise management of events occurring at the gaming arcade is possible.

By setting up such a configuration, the hall alert information can be output when the information data recording medium exists at the ejecting position and when no player is present. Thus, the fact that an IC card has been left behind in a gaming machine can be notified. Therefore, if the player has not yet gone far away from the gaming machine, the fact that the player has left behind the IC card can be recognized to him/her. Furthermore, the fact that an IC card has been left behind can be immediately notified to the staff members and hall as well, and the appropriate task can be performed promptly.

Furthermore, the player tracking system (PTS) according to the embodiment of the present invention must include a reader/writer. This reader/writer is used to write the predetermined information to the information data recording medium and also read the predetermined information from the information data recording medium. This predetermined information includes money amount information regarding the cash used to play a game on the gaming machine. The money amount information is information showing the amount of money of the inserted cash that is converted from the cash owned and managed by the player and inserted in the gaming machine by the player for the purpose of playing a game on the gaming machine. The contents of this money amount information (for example, numbers) change when the player plays a game on the gaming machine. Note that as described later, when a player plays a game on a gaming machine, the credit amount obtained by converting the money amount information is used. Thus, when a player plays a game on a gaming machine, the credit amount is changed, and there is no need to change the money amount information. At the predetermined timing, such as when a game gets over, the credit amount can be converted to money amount information and the money amount information may be changed.

Conversion to credit amount corresponding to the amount of money shown by the money amount information is possible. Credit is a virtual playing medium that can be used as wager for a game by inserting in the gaming machine, and is also considered as a virtual playing medium that can be used as wager in continuity until it is stored in the gaming machine and converted to cash.

Further, the controller can execute the below-mentioned processes (E) to (G).

The process (E) is used to write the money amount information concerning the cash used to play a game on a gaming machine to the information data recording medium. As described above, the money amount information is converted to credit amount. Credit is used as wager for a game, and the credit amount changes as the game progresses. Note that the money amount information is written to the information data recording medium when a game gets over on a gaming machine and also each time a game is played on a gaming machine. In either case, the credit amount is sent from the gaming machine to the player tracking system, this credit amount is converted to money amount information, and the converted money amount information is written to the information data recording medium. The process of step S1539 of FIG. 25 that is described later corresponds to the process (E).

The process (F) is used to execute a mini-game when the money amount information written to the information data recording medium is below the predetermined count, and is also used to change the amount of money indicated by the money amount information in accordance with the results of the mini-game. The mini-game must get over in a shorter time period than the game played on the gaming machine. A mini-game is executed to adjust the amount of money indicated by the money amount information of the information data recording medium after a game on a gaming machine has ended. By setting a game that can be completed in a short period of time, the next player can immediately play a game on the gaming machine, and the operating efficiency of the gaming machine can be maintained. The processes of step S1623 to S1631 of FIG. 27 described later correspond to the process (F).

The process (G) is used to transport the information data recording medium to the ejecting position by using the transport device when the amount of money indicated by the money amount information written to the information data recording medium is the predetermined count or more. When the amount of money indicated by the money amount information is the predetermined count or more, the value of the information data recording medium is still high, and therefore, the possibility of being left behind by the player is less, and thus, the information data recording medium must be transported to the ejecting position such that the player can take out the information data recording medium. The process of step S1629 of FIG. 27 and step S1561 of FIG. 26 that are described later corresponds to the process (G).

By setting up such a configuration, when the amount of money indicated by the money amount information is increased through a mini-game, the value of the information data recording medium can be increased and failure on the part of the players to collect the information data recording medium can be prevented by making the players aware of the presence of the information data recording medium.

Furthermore, the controller can execute the below-mentioned process (H).

The process (H) is used to convert the cash inserted in the gaming machine to the amount of money indicated by the money amount information in accordance with the rate corresponding to the denomination. The process of the subroutine of FIG. 31 corresponds to the process (G).

By setting up such a configuration, when the cash owned by the player is converted to the money amount information based on the rate corresponding to the predetermined denomination, even if the amount of money indicated by the money amount information includes broken numbers, the amount of cash can be converted accurately by including the broken numbers, and the money amount information can be converted without posing any disadvantages to the player.

Furthermore, the controller can execute the below-mentioned process (I).

The process (I) is used to transport the information data recording medium to the housing position by using the transport device when the amount of money indicated by the money amount information written to the information data recording medium is below the predetermined count. In other words, by executing a mini-game, the information data recording medium is seized in the case of losing the mini-game, and the information data recording medium is transported to the housing position. Even by doing this, there is no discontent among the players as the value of the information data recording medium is not high because the amount of money indicated by the money amount information written to the information data recording medium is below the predetermined count. The processes of step S1627 and S1639 of FIG. 27 described later correspond to the process (I).

In this way, by containing the information data recording medium inside the player tracking system, the information data recording medium can be prevented from being left behind in the player tracking system, and thus, the time and efforts of the staff members can be reduced. Furthermore, because the information data recording medium is contained inside the player tracking system, the next player can immediately start a game on the gaming machine without having to wait, and the operating efficiency of the gaming machine can be increased. Furthermore, by containing the information data recording medium inside the player tracking system, the gaming arcade can precisely recover the information data recording medium, and can reuse the recovered information data recording medium at the gaming arcade, and therefore, the expenditure required for the information data recording medium can also be reduced.

Furthermore, the controller can execute the below-mentioned process (J).

The process (J) is used to output the player alert information from the earlier-mentioned alert output device when it is determined that the information data recording medium exists at the ejecting position, and that a player is present. The process of step S1573 or S1575 of FIG. 26 that is described later corresponds to the process (J).

During the above-mentioned process (D), the hall alert information is output from the alert output device when it is determined that the information data recording medium exists at the ejecting position, and that no player is present. This hall alert information is output when it is determined that no player is present. Therefore, even when the hall alert information is output, cases wherein a player moves away fast from the gaming machine and cannot be made aware of the hall alert information can be assumed. Thus, first of all, by executing the process (J), the player alert information must be output to the player when a player is present. In this way, the fact that there may be a possibility of the player leaving behind the information data recording medium can be notified to the player.

Furthermore, the controller can execute the below-mentioned process (K).

The process (K) is used to output the hall alert information from the alert output device when it is determined that no player is present after the output of the player alert information from the alert output device. The processes of step S1573 or S1575, and step S1595, S1597, or S1599 of FIG. 26 described later correspond to the process (K).

In other words, when a player is present, the hall alert information is output in place of the player alert information if the player moves away from the gaming machine without paying attention to the player alert information even if the player alert information is output. Thus, through the output of the alert information in two stages and by changing the notification target from the player to the staff (staff members and hall computer), the task to be performed when a player fails to claim the information data recording medium can be executed precisely and promptly.

Furthermore, the controller can execute the below-mentioned process (L).

The process (L) is used to initialize the information data recording medium and to replenish the information data recording medium by transporting it to the regular stacker after the predetermined time period has elapsed since the transport of the information data recording medium to the housing position by the above-mentioned processes (C) and (I). The processes of step S1655, S1657, and S1659 of FIG. 29 described later correspond to the process (L).

In this way, instead of buying new information data recording medium, the gaming arcade can replenish the information data recording medium, and therefore, the cost required for the information data recording medium can be reduced. Furthermore, since replenishment of the information data recording medium can be performed without having to open the gaming machine, the fairness and safety of the game can be maintained and at the same time, the task of replenishing the information data recording medium can be prevented from becoming complex.

Above, only the player tracking system according to the embodiment of the present invention has been described, however, the gaming machine containing the player tracking system according to the embodiment of the present invention, and the method of executing the above-mentioned processes (A) to (L) in the player tracking system according to the embodiment of the present invention can also be explained.

Embodiments of the present invention will be described based on drawings.

[Second Embodiment]

Figure 63:
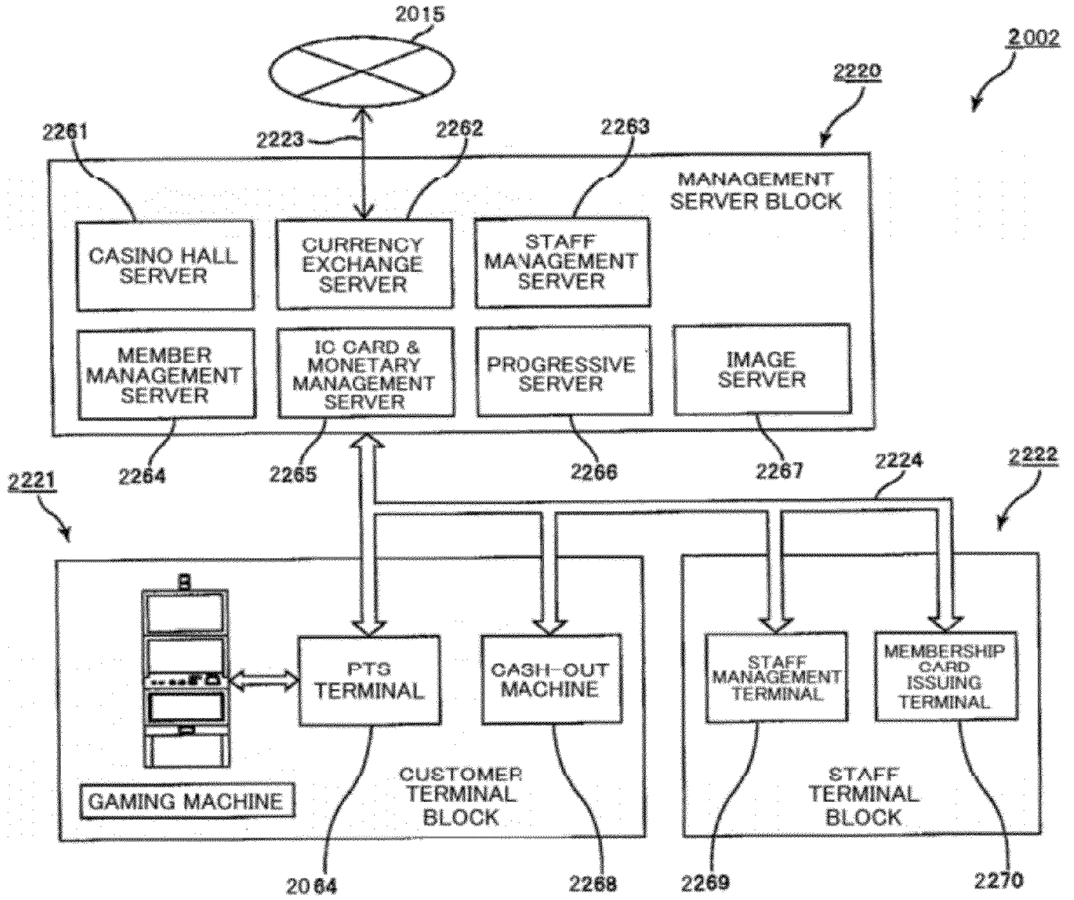
FIG. 63 is a schematic diagram schematically showing the entire picture of the casino system according to a second embodiment of the present invention.

An overview of a second embodiment is presented by using FIG. 63.

FIG. 63 is a schematic diagram schematically showing the entire picture of the casino system according to a second embodiment of the present invention.

The casino system 2002 comprises a management server block 2820, a customer terminal block 2221, and a staff terminal block 2222.

The management server block 2820 comprises a casino hall server 2261; a currency exchange server 2262; a staff management server 2263; a member management server 2264; an IC card & monetary management server 2265; a progressive server 2266; and an image server 2267.

The casino hall server 2261 is used to compute the flow of cash within the casino and to create a lease chart, and at the same time, it manages each server within the management server block 2820. The currency exchange server 2262 is used to acquire the currency exchange information from outside (Internet 2015) via a communication line 2223. The staff management server 2263 is used to manage the attendance of the staff working at the casino, and also to acquire the current location of the staff within the casino. The member management server 2264 is used to manage the personal information of members and also member information, such as past gaming results. The IC card & monetary management server 2265 is used to compute sales through cashless IC cards. The progressive server 2266 is used to manage the cumulative value for progressive give-away and also to determine the progressive give-away. The image server 2267 is used to save and manage the images of faces of the staff and players photographed through cameras installed within the casino. The staff management server 2263 corresponds to the server of the present invention.

The customer terminal block 2221 comprises the player tracking system (PTS) terminal 2064, gaming machines, and a cash-out machine 2268. A gaming machine is connected by the management server block 2820 and the network via the PTS terminal 2064. In the present embodiment, one PTS terminal 2064 is installed for one gaming machine. The PTS terminal 2064 corresponds to the individual tracking device of the present invention.

The staff terminal block 2222 comprises the staff management terminal 2269 and the membership card issuing terminal 2270. The staff management terminal 2269 is controlled by the staff management server 2263. The staff management terminal 2269 sends information to Personal Digital Assistant (PDA) (not shown in the drawings) carried by the staff based on the signals received from the staff management server 2263, and initiates communication with the mobile telephones carried by the staff. The membership card issuing terminal 2270 is equipped with a camera and photographs the face of the player to whom the IC card is issued during dispensing of the member card (IC card). The photographed image is correlated to the customer ID and is saved in image server 2267. Furthermore, the personal information of members entered during dispensing of the IC card is associated with the customer ID and saved in the member management server 2264.

Figure 72:
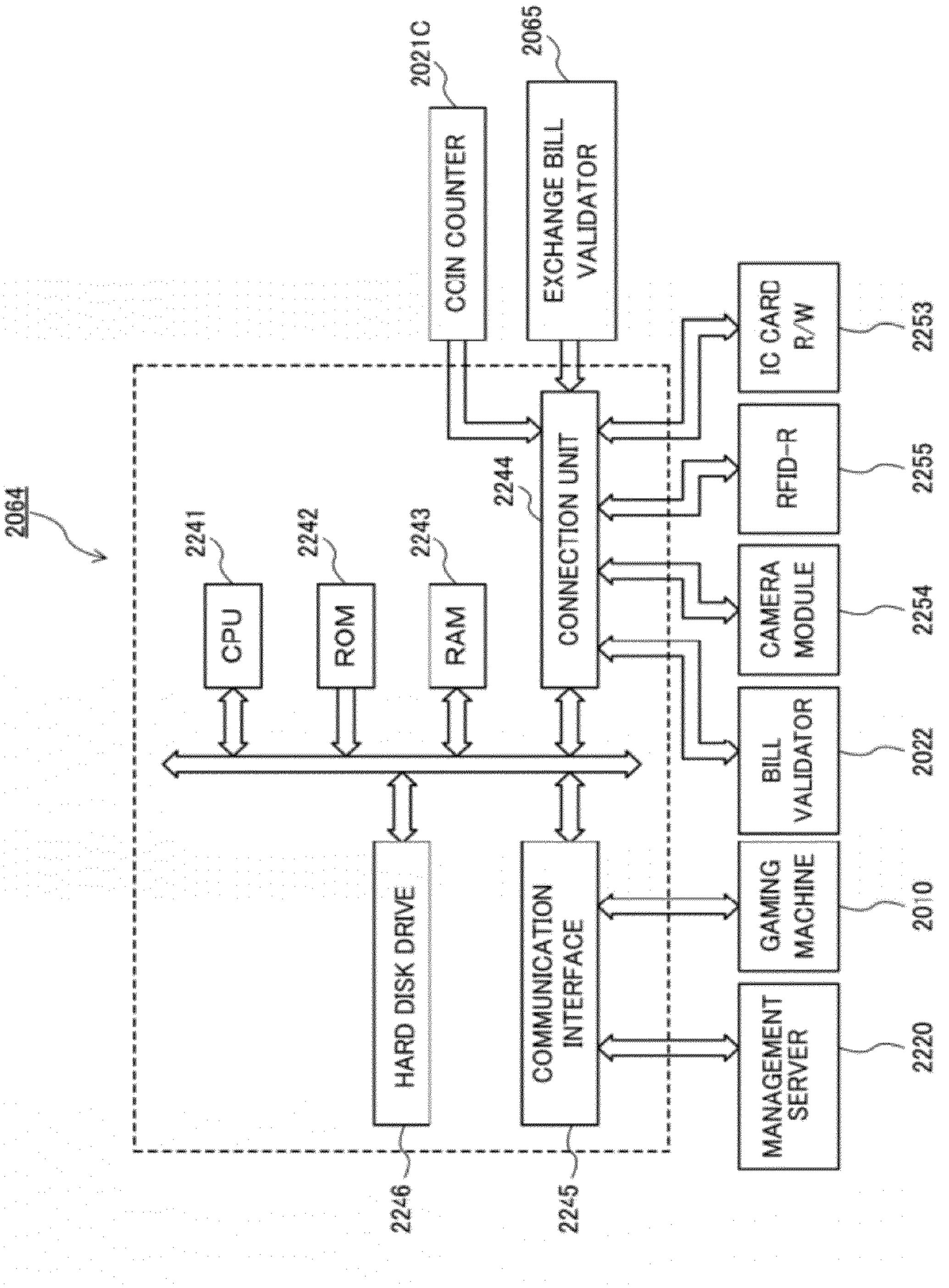
FIG. 72 is a block diagram showing an internal configuration of the PTS terminal configuring the gaming system.

In the present embodiment, the PTS terminal 2064 is connected to the exchange bill validator 2065 via a communication line (see FIG. 72). The exchange bill validator 2065 can accept bill of a plurality of countries. For example, if the bill of Japan is inserted in the exchange bill validator 2065, conversion (exchange) to American currency is performed by the PTS terminal 2064 based on the currency exchange rate. The converted currency amount data indicating the converted currency amount (exchange) is sent from the PTS terminal 2064 to the gaming machine. Therefore, the player can enjoy games on the gaming system by using the currency of countries other than America. The converted (exchanged) currency amount is equivalent to a currency amount obtained by subtracting a currency amount equal to a predetermined commission charge (hereinafter also called the exchange commission) from the currency amount prior to conversion (exchange).

Furthermore, the exchange commission data indicating the currency amount equal to the exchange commission is sent from the PTS terminal 2064 to the progressive server 2266. Based on the currency amount indicated by the received exchange commission data, the progressive server 2266 updates the cumulative value for bonus. When the cumulative value for bonus reaches a specific value, coins are paid out to any one gaming machine as jackpot. In this way, in the present embodiment, the bonus calculated by assuming the exchange commission as the source fund is granted. Hereinafter, the explanation is provided for the case when the gaming machine of the present invention is a slot machine 2010.

Figure 64:
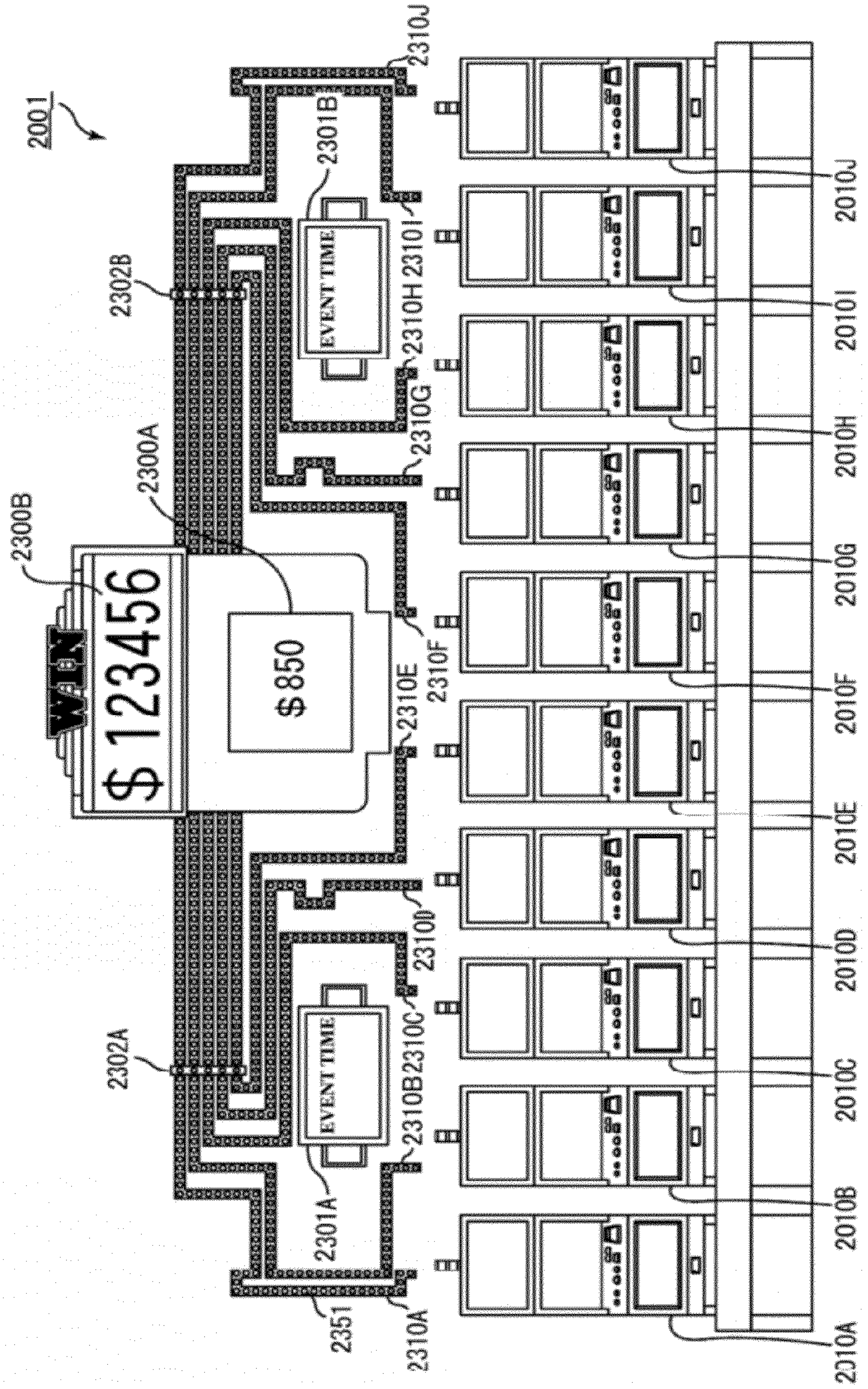
FIG. 64 is a front view schematically showing the gaming system according to the second embodiment of the present invention.

FIG. 64 is a front view schematically showing the gaming system according to the first embodiment of the present invention.

Figure 65:
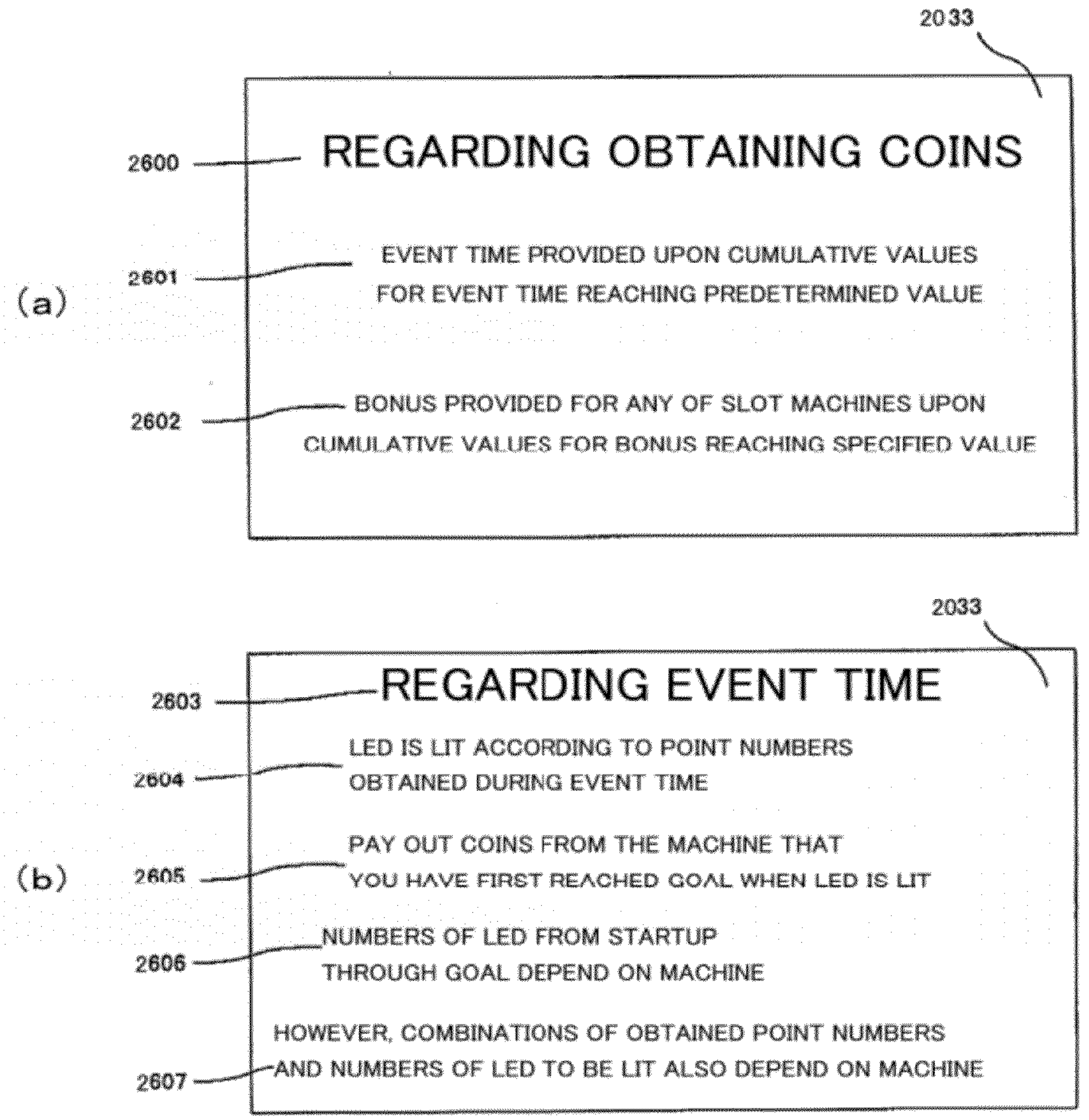
FIG. 65A is a diagram showing one example of an image displayed on an upper image display panel provided in the slot machine configuring the gaming system according to the second embodiment of the present invention.
FIG. 65B is a diagram showing one example of an image displayed on the upper image display panel provided in the slot machine configuring the gaming system according to the second embodiment of the present invention.

FIG. 65A and FIG. 65B show an example of the image displayed on the upper image display panel of the slot machine configuring the gaming system according to the second embodiment of the present invention.

As shown in FIG. 64, the gaming system 2001 comprises a plurality (10 in the present embodiment) of slot machines 2010 (slot machine 2010A, slot machine 2010B, slot machine 2010C, slot machine 2010D, slot machine 2010E, slot machine 2010F, slot machine 2010G, slot machine 2010H, slot machine 20101, and slot machine 2010J), PTS terminal 2064, currency exchange server 2262, progressive server 2266, a plurality of large common display 2300 (large common display 2300A and large common display 2300B), and a plurality of small common display 2301 (small common display 2301A and small common display 2301B), which are connected in a network. Further, a connected luminescent belt 2310 (connected luminescent belt 2310A, connected luminescent belt 2310B, connected luminescent belt 2310C, connected luminescent belt 2310D, connected luminescent belt 2310E, connected luminescent belt 2310F, connected luminescent belt 2310G, connected luminescent belt 2310H, connected luminescent belt 2310I, and connected luminescent belt 2310J) comprising a plurality of LED 2351 arranged from the large common display 2300 to the slot machine 2010 is installed on each slot machine. The connected luminescent belt 2310 comprises a straight section from the large common display 2300 to the boundary plate 2302 (boundary plate 2302A and boundary plate 2302B), and a bending portion from the boundary plate 2302 to the slot machine 2010.

The slot machine 2010 corresponds to the gaming machine of the present invention.

In the gaming system 2001 according to the present embodiment, a part of the coins that are bet on each slot machine 2010 is calculated in a cumulative way as the cumulative value for EVENT TIME. An image showing the calculated cumulative value for EVENT TIME is displayed on the large common display 2300B. In FIG. 64, 123456 is displayed on the large common display 2300B, which indicates that the cumulative value for EVENT TIME is 123456. When the cumulative value for EVENT TIME reaches the predetermined value, EVENT TIME (common game) is executed.

Furthermore, in the gaming system 2001 according to the present embodiment, if bill other than the basic currency is inserted in the exchange bill validator 2065, the exchange commission for conversion of the bill is calculated in a cumulative manner as the cumulative value for bonus. An image showing the calculated cumulative value for the bonus is displayed on the large common display 2300A. In FIG. 64, 850 is displayed on the large common display 2300A, which indicates that the cumulative value for bonus is 850. When the cumulative value for bonus reaches a specific value, coins are paid out as a jackpot on any one slot machine 2010.

Acquisition of coins for a jackpot is explained below by using FIG. 65A to FIG. 65B.

As shown in FIG. 65A, a character image showing the precautions to be taken during the acquisition of a jackpot is displayed on the upper image display panel 2033.

Using as a trigger the event when the cumulative value for EVENT TIME reaches the predetermined value, the character image 2601 indicates the occurrence of EVENT TIME (common game).

Using as a trigger the event when the cumulative value for bonus reaches the specified value, the character image 2601 indicates the occurrence of bonus in any one slot machine 2010.

FIG. 65B further explains the EVENT TIME (common game).

In the present embodiment, using as a trigger the event when the predetermined location is touched on the touch panel (not shown in the figure) installed in the upper image display panel, the displayed character image switches from the character image shown in FIG. 65A to the character image shown in FIG. 65B.

The character image 2604 indicates that the LED 2351 lights up in accordance with the point number acquired in each slot machine 2010 during the EVENT TIME (COMMON GAME).

In the EVENT TIME (common game), the point number is determined based on the type and number of the rearranged symbols.

The character image 2605 indicates that coins equivalent to the cumulative value for EVENT TIME will be paid out as jackpot on the slot machine 2010 on which a connected luminescent belt 2310 in which all LEDs 2351 have been lit up is installed.

In the present embodiment, the LEDs light up in a sequence starting from the LED 2351 closest to the slot machine 2010 in accordance with the acquired point number. Thus, the array of lit up LEDs 2351 seems to extend towards the large common display 2300.

The character image 2606 indicates that the number of LEDs 2351 installed on the connected luminescent belt 2310 differs depending on the connected luminescent belt 2310. In the present embodiment, the number of LEDs 2351 installed on the two connected luminescent belts 2310 mentioned in each of the below mentioned (I) to (V) is the same.

(I) Connected luminescent belt 2310A and connected luminescent belt 2310J (II) Connected luminescent belt 2310B and connected luminescent belt 2310I (III) Connected luminescent belt 2310C and connected luminescent belt 2310H (IV) Connected luminescent belt 2310D and connected luminescent belt 2310G (V) Connected luminescent belt 2310E and connected luminescent belt 2310F.

However, the number of LEDs 2351 of (I) to (V) is mutually different.

This difference is due to the different number of LEDs 2351 in the bending portion. The number of LEDs 2351 in the straight section is the same in all connected luminescent belts 2310.

Note that FIG. 64 illustrates the gaming system 2001 according to the present embodiment, and the number of LEDs 2351 shown in FIG. 64 does not have any relationship with the number of LEDs 2351 in the present embodiment.

The character image 2607 indicates that even the corresponding relationship between the acquired point number and the number of lit LEDs 2351 differs depending on the connected luminescent belt 2310. More specifically, in each of (I) to (V), the corresponding relationship between the acquired point number and the number of lit LEDs 2351 is different (see FIG. 24A).

Next, the individual tracking system used to manage the staff at the casino arcade where the above-mentioned casino system 2002 is adopted is described. Note that hereinafter, the explanation is provided for the case when the gaming machine of the present invention is a slot machine 2010.

Figure 66:
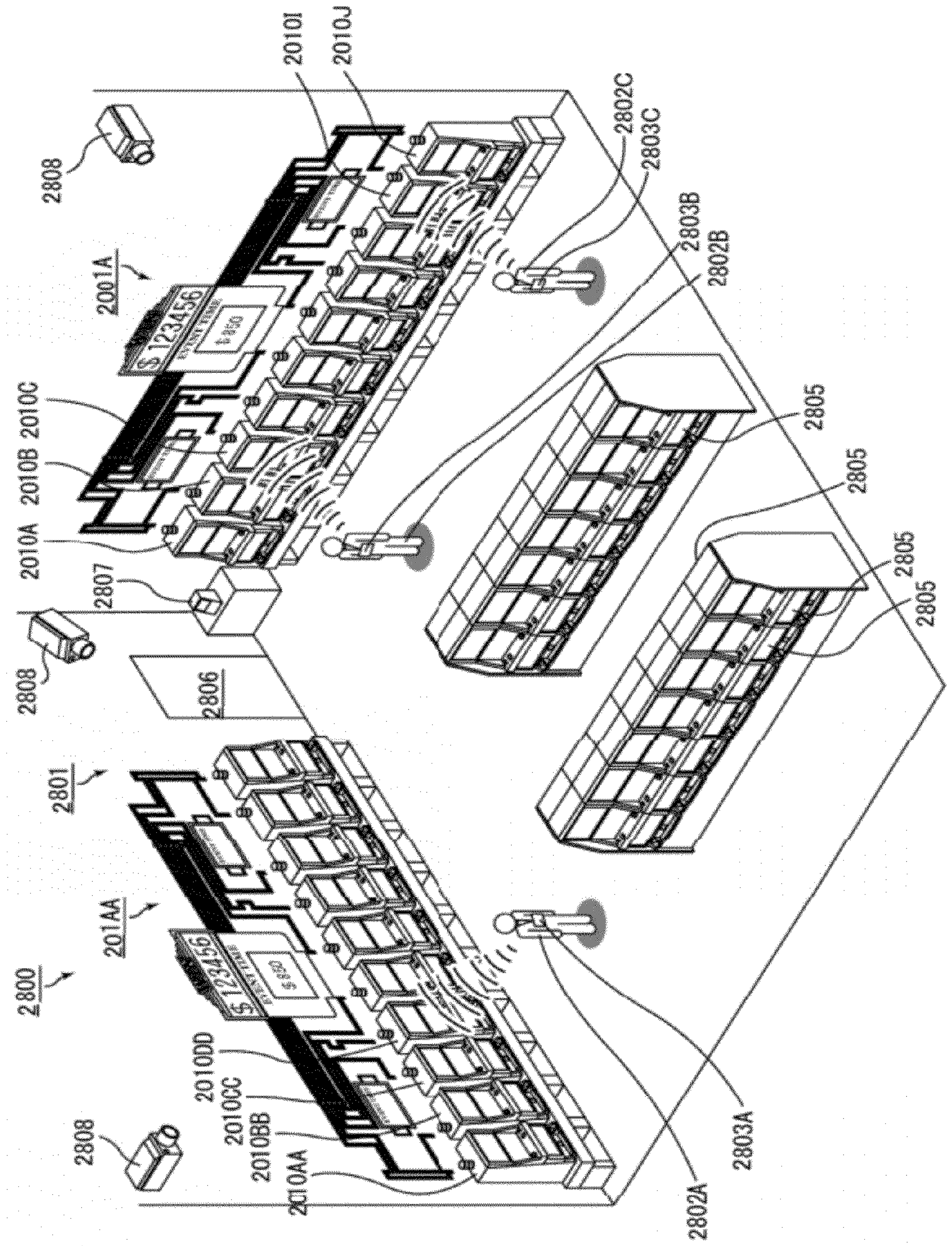
FIG. 66 is a bird's eye view schematically showing an individual tracking system provided in the casino system shown in FIG. 63.

FIG. 66 is a bird's eye view schematically showing an individual tracking system provided in the casino system shown in FIG. 63.

The individual tracking system 2800 is used to manage the staff 2802 (staff 2802A, staff 2802B, and staff 2802C in FIG. 66) present inside the casino arcade 2801. In FIG. 66, only the staff 2802 is present within the casino arcade 2801.

Note that casino arcade 2801 corresponds to the facility of the present invention.

Figure 10:
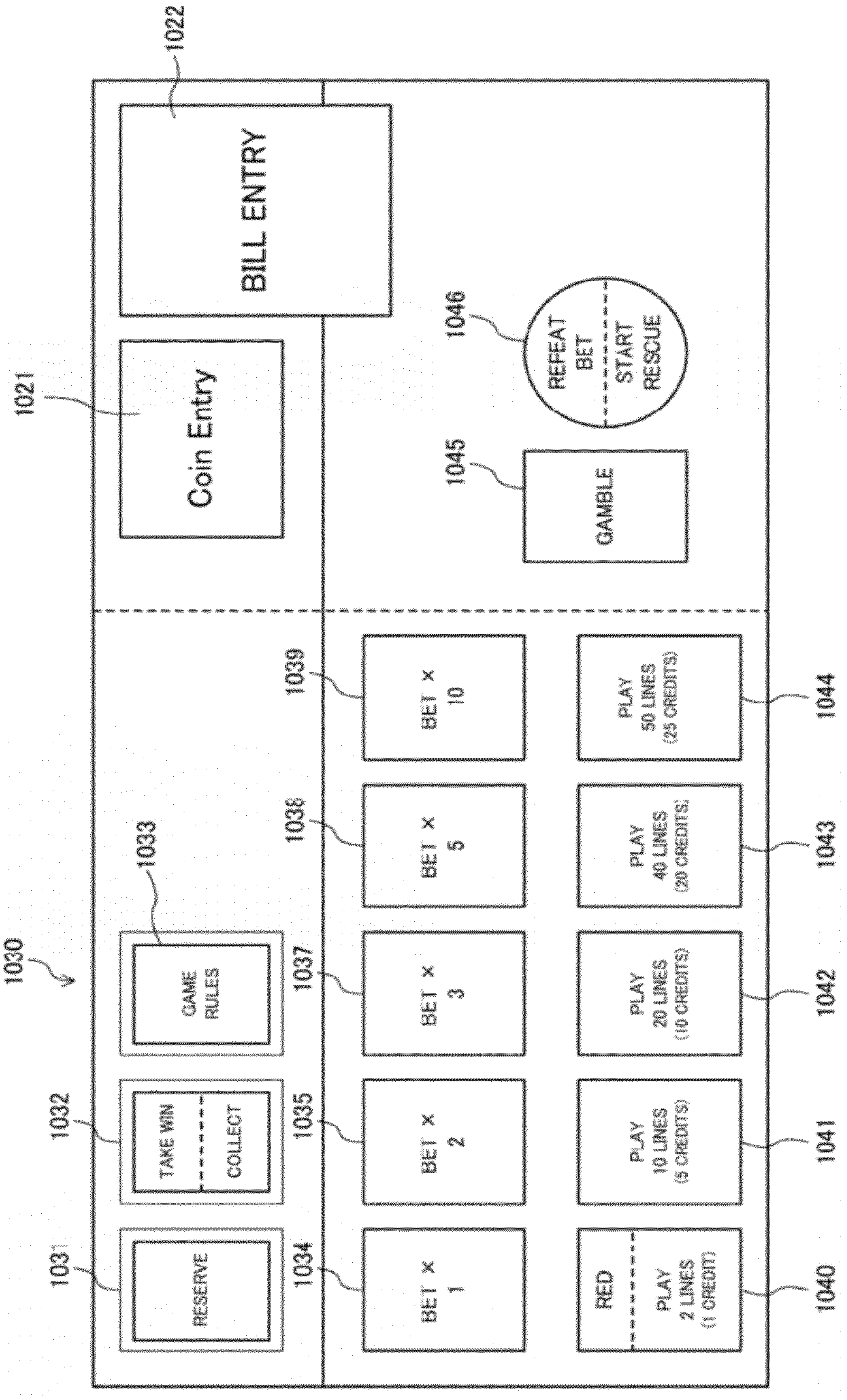
FIG. 10 is an enlarged view of the control panel provided in the slot machine according to the embodiment of the present invention.

The individual tracking system 2800 comprises a plurality of PTS terminals 2064, a staff management server 2263, and a plurality of RFID (Radio Frequency Identification) readers 2255 (hereinafter also referred to as RFID-R 2255) (see FIG. 10). One PTS terminal 2064 is installed within each cabinet 2011 of each slot machine 2010 installed inside the casino arcade 2801. One RFID-R 2255 is installed within each cabinet 2011 of each slot machine 2010 installed inside the casino arcade 2801.

The RFID-R 2255 installed in each slot machine 2010 wirelessly reads out the staff ID from the staff ID card 2803 possessed by the staff 2802. Note that the staff ID is read out when the staff ID card 2803 is inserted within the attainment range of the radio waves of each RFID-R 2255. In the present embodiment, an active type RFID tag that allows communication within a distance of 10 m is used as the RFID tag provided on the staff ID card 2803.

With the staff ID read from each RFID-R 2255, the information for identifying the RFID-R 2255 and the reception strength are appended, and it is then sent to the staff management server 2263. In the staff management server 2263, based on the staff ID that is sent, the position of each RFID tag (staff) is detected. Note that the detection of the position of the RFID tag is performed by using the reception strength of the electric waves transmitted by the RFID tag provided on the staff ID card 2803 in the RFID-R 2255. The explanation of the method for detecting the position of the RFID tag by using the reception strength of the electric waves transmitted by the RFID tag in the reader is omitted here because the conventionally known methods, such as the trilateration method can be adopted.

Meanwhile, when a problem is detected in the slot machine 2010, an error signal is sent to the management server 2200. The management server 220 identifies the staff closest to the slot machine 2010 for which the error signal is output, and initiates communication with that staff through a mobile terminal device. In this way, an instruction asking to report promptly to the slot machine 2010 in which the error was detected can be issued to the staff 2802 closest to that slot machine 2010.

Furthermore, as shown in FIG. 66, a card reader for entry 2807 is installed at the entry gate 2806 of the casino arcade 2801, and when the staff 2802 enters the casino arcade 2801, the staff ID is read from the staff ID card 2803 by the card reader for entry 2807. Note that when read at the time of entry, the staff ID is stored in the RAM of the staff management server 2263, and when read at the time of departure, it is deleted from the RAM of the staff management server 2263. In this way, it is possible to manage the number of staff 2802 inside the casino arcade 2801, and also which staff 2802 is inside the casino arcade 2801.

As shown in FIG. 66, a security camera 2808 is installed inside the casino arcade 2801, which photographs the situation inside the casino arcade 2801. The image data of images photographed with the security camera 2808 is sent to the staff management server 2263. The staff IDs of the entire staff are already stored in the staff management server 2263. Furthermore, the face image data showing the face of the staff whose staff ID has been provided is associated with each staff ID and stored in the staff management server 2263. At all times, the staff management server 2263 compares each case of the image data sent from the security camera 2808 with the face image data already stored in the staff management server 2263, and determines whether the standard for judging that the person indicated by the face image data matches the person indicated by the image data is fulfilled. When it is determined that the standard is fulfilled, 1 is added as the staff count. In this way, the number of staff inside the casino arcade 2801 can be counted. Further, by comparing the number of staff IDs read from the card reader for entry 2807 with the staff count obtained based on the image data, the number of staff 2802 who have forgotten to bring in their staff ID cards 2802 can be acquired. Further, even if image data acquired from the security camera 2808 indicates that the staff is the same person as that shown by the face image data already stored in the staff management server 2262, if the staff ID corresponding to that staff is not read from the card reader for entry 2807, it can be identified that the staff corresponding to the face image data has forgotten to carry his/her staff ID card 2802. The security camera 2808 corresponds to the camera installed inside the facility of the present invention in a way that it can take images.

Furthermore, a gaming machine 2805 that provides games of a different type than the gaming system 2001 is also installed in the casino arcade 2801.

Figure 67:
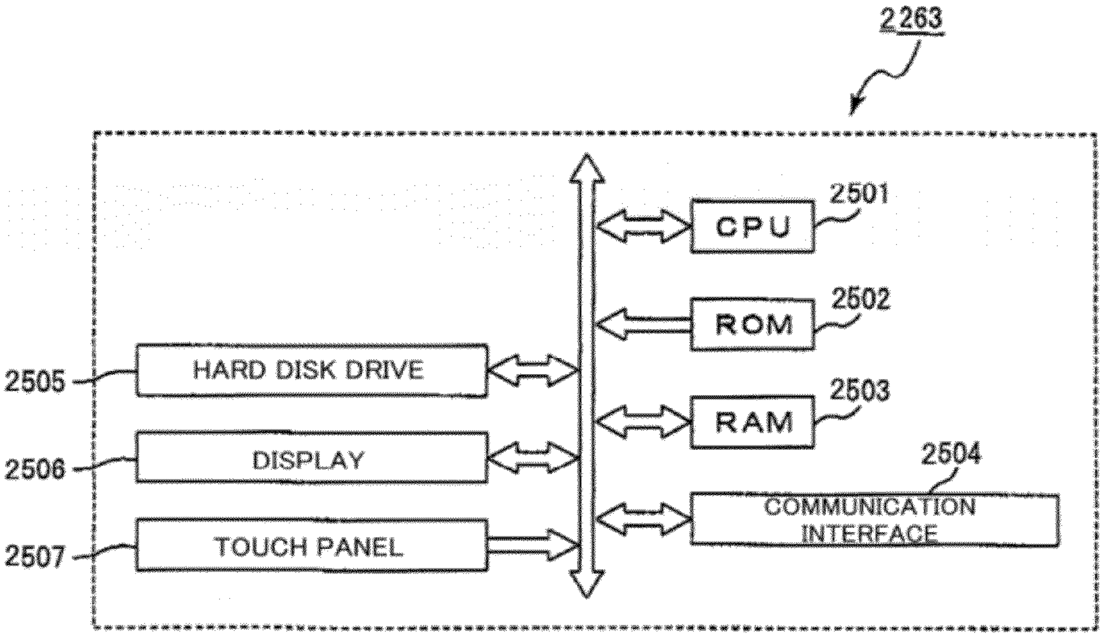
FIG. 67 is a block diagram showing an internal configuration of a staff management server provided in the individual tracking system.

FIG. 67 is a block diagram showing an internal configuration of a staff management server provided in the individual tracking system.

The staff management server 2263 comprises a CPU 2501 as a processor, a ROM 2502, a RAM 2503, a communication interface 2504, a hard disk drive 2505 as a memory, a display 2506 as the output device, and a touch panel 2507 installed on the front face of the display 2506. The communication interface 2504 is connected to the communication interface 2245 of the PTS terminal 2064 via a communication line. The ROM 2502 stores a system program for controlling the operation of the staff management server 2263 and the permanent data. Further, the RAM 2503 stores the data and programs used when operating the CPU 2501.

FIG. 68 is a diagram showing a staff management table stored in the staff management server shown in FIG. 67.

As shown in FIG. 68, a staff management table in which the staff ID, face image data, and telephone number to the mobile terminal device have been correlated is stored in the hard disk drive 2505.

The staff is already provided with a staff ID and their faces are photographed with a camera. The face image data showing the photographed face is associated with the staff ID and stored in the hard disk drive 2505. Note that the mobile terminal device associated with the staff ID is lent to the staff by the manager. For example, the staff ID "001" is provided to the staff 2802A (see FIG. 66), and at the same time, the staff ID "001" is associated with the face image data A and stored. Further, the telephone number A is associated with the staff ID "001" and stored. Also, the staff ID "002" is provided to the staff 2802B (see FIG. 66), and at the same time, the staff ID "002" is associated with the face image data B and stored. Further, the telephone number B is associated with the staff ID "002" and stored.

Figure 69:
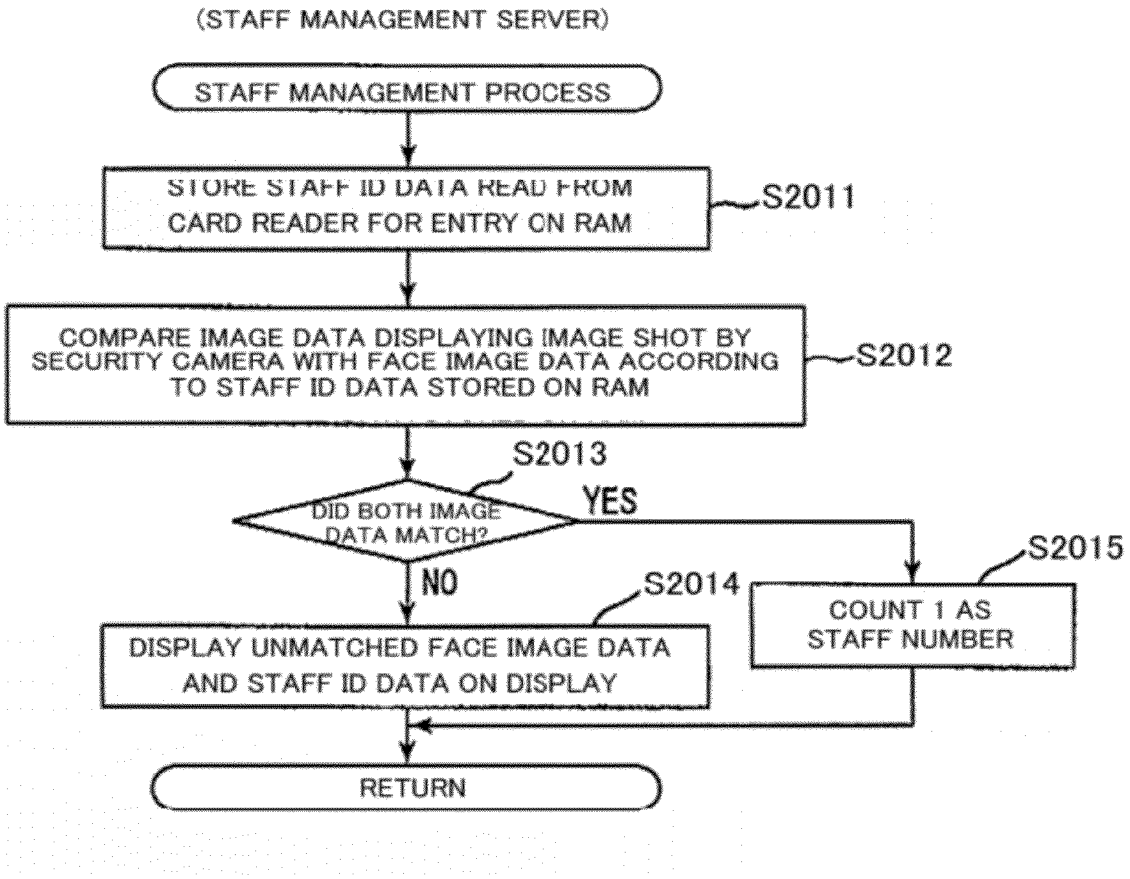
FIG. 69 is a flowchart showing a staff management process executed in the staff management server.

FIG. 69 is a flowchart showing a staff management process executed in the staff management server according to one embodiment of the present invention.

First of all, the CPU 2501 provided in the staff management server 2263 stores the staff ID data read from the staff ID card 2803 by using the card reader for entry 2807 in the RAM 2503 (step S2651).

Next, the CPU 2501 compares the image data sent from the security camera 2208 with the face image data corresponding to the staff ID data that is already stored in the RAM 2503 in step S2651, and determines whether the standard for judging that the person indicated by the face image data matches the person indicated by the image data is fulfilled (step S2652).

When it is determined that the standard for judging that the person indicated by the face image data matches the person indicated by the image data is fulfilled (step S2653: YES), the CPU 2501 counts 1 as the staff count. Note that the face image data that is included in the staff count is removed from the comparison target in step S2652. Thus, the same face image data is prevented from being counted twice as staff count.

On the other hand when it is determined that the standard for judging that the person indicated by the face image data matches the person indicated by the image data is not fulfilled (step S2653: NO), the CPU 2501 displays the image based on the face image data that is judged as a mismatch and the staff ID associated with that face image data on the display 2506 (step S2654). This subroutine is ended after the process of the step S2654 or step S2655.

Next, the configuration of the slot machine 2010 is explained.

Figure 70:
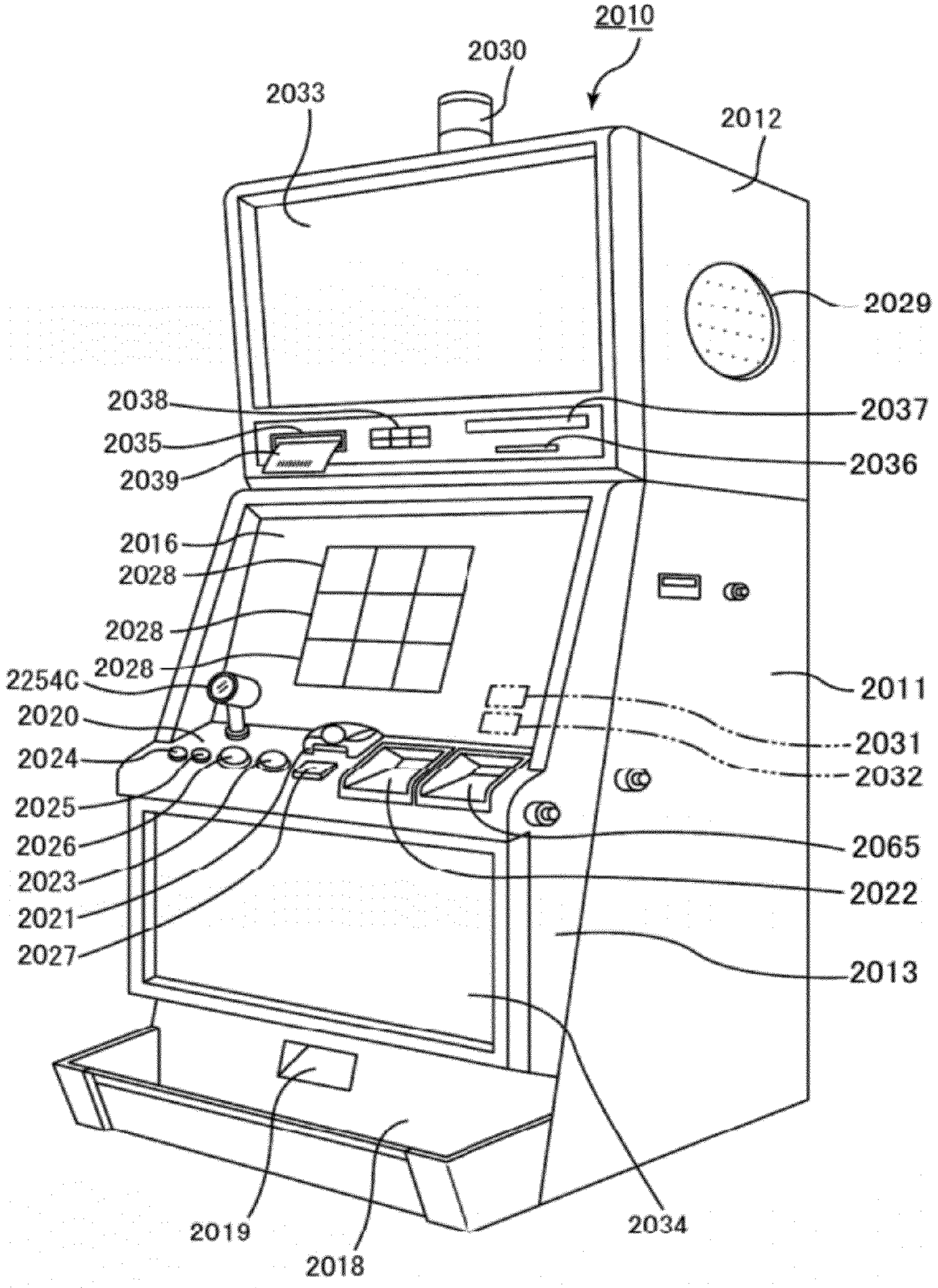
FIG. 70 is a perspective view showing the appearance of the slot machine configuring the gaming system.
Figure 71:
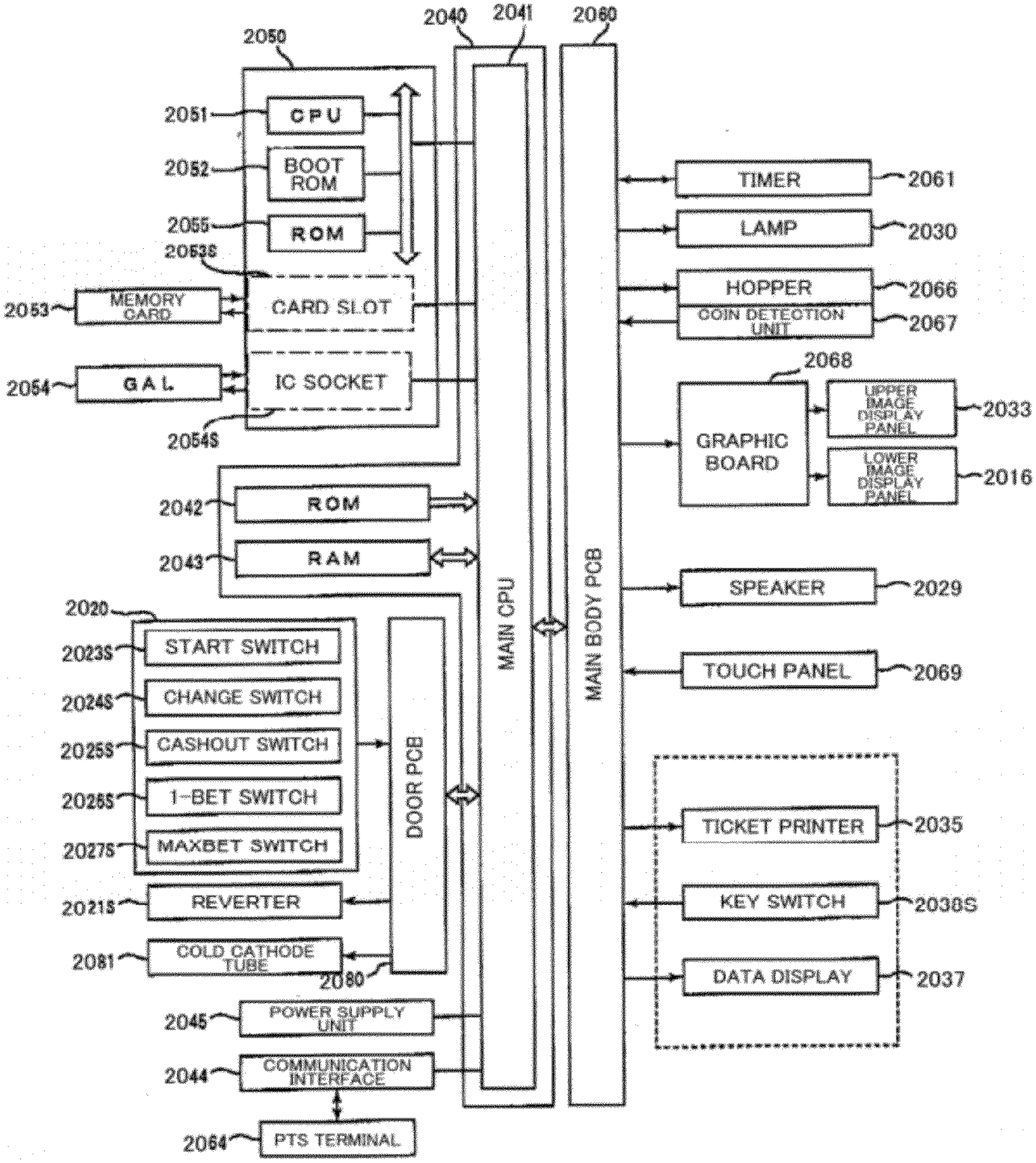
FIG. 71 is a block diagram showing an internal configuration of the slot machine shown in FIG. 70.

FIG. 70 is a perspective view showing the appearance of the slot machine configuring the gaming system of the first embodiment.

At a slot machine 2010, a coin, bill, (basic currency and a currency other than basic currency), or electronic valuable information corresponding to these is utilized as the game medium. In the present invention, however, the gaming media are not limitative thereto in particular, and can include medals, tokens, electric money, and tickets, for example. Note that the above-mentioned ticket is not particularly restricted, for example, a barcoded ticket, as described later, can also be used.

The slot machine 2010 has a cabinet 2011, a top box 2012 provided above the cabinet 2011, and a main door 2013 provided on the front face of the cabinet 2011.

The main door 2013 has a lower image display panel 2016. The lower image display panel 2016 is made of a transparent liquid crystal panel, and displays nine display blocks 2028 which are arranged in three columns and three rows. One symbol each is displayed on every display block 2028.

Further, although not shown in the figure, other than the above images, the lower image display panel 2016 displays various images for effects as well.

Further, a credit amount display unit 2031 and a payout amount display unit 302 are set in the lower image display panel 2016. In the credit amount display unit 2031, the number of credited coins is displayed as an image. In the payout display unit 2032, the number of coins to be paid out is displayed by an image.

Further, a touch panel 2069, which is not shown in the figure, is disposed on a front face of the lower image display panel 2016, and a player is able to input various instructions by operating the touch panel 2069.

On the lower side of the lower image display panel 2016 is a control panel 2020 comprising a plurality of buttons 2023 to 2027 through which instructions for proceeding with the game are input by the player; a coin entry 21 for receiving coins into the cabinet 2011; a bill validator 2022; an exchange bill validator 2065; and a camera 2254C.

The control panel 2020 is provided with a start button 2023, a change button 2024, a cash-out button 2025, a 1-BET button 2026, and a MAXBET button 2027. The start button 2023 is used to input the instruction for starting the scrolling process of symbols. The change button 2024 is used when requesting the person-in-charge of the gaming facility for exchange. The cash-out button 2025 is used to input the instruction for paying out the credited coins to the coin tray 2018.

The 1-BET button 2026 is used to input the instruction for betting one coin of all the credited coins in the game. The MAXBET button 2027 is used to input the instruction for betting the maximum number of coins (three coins in the present embodiment) in the game that can be bet in one game of all the credited coins.

The bill validator 2022 is for validating the legitimacy of bill (basic currency), and accepting legitimate bill into the cabinet 2011. Note that the bill validator 2022 can be configured such that it can read the later-described ticket 2039 with a bar code. On a lower part of a front face of the main door 2013, that is, below the control panel 2020 is provided a belly glass 2034 with a character related to the slot machine 2010 thereon.

The exchange bill validator 2065 is used to accept the bill of a plurality of countries other than the basic currency, and can read the legitimacy, type, and quantity of the accepted bill.

The camera 2254C is used to photograph the face of the player. The camera 2254C corresponds to the camera installed in such a way in the present invention that it can photograph the face of the player. The camera installed in a way to take pictures of the face of the player is not particularly restricted, and can be, for example, a CCD camera and CMOS sensor camera.

Provided on a front face of the top box 2012 is the upper image display panel 2033. The upper image display panel 2033 is made of a liquid crystal panel, and it displays an image showing introduction to the contents of the game or the rules of the game as shown in FIG. 67A.

Further, the top box 2012 is provided with a speaker 2029. Below the upper image display panel 2033 is a ticket printer 2035, an IC card reader/writer 2253 (hereinafter also referred to as the IC card R/W 2253), a data display 2037, and a keypad 2038. The ticket printer 2035 is used to print a bar code on a ticket by coding data such as the credit amount, date and time, and identification number of the slot machine 2010, and to output a barcoded ticket 2039. The player can use the barcoded ticket 2039 on another slot machine by making that slot machine read the data, and can also convert the barcoded ticket 2039 to bill at the predetermined location (such as casher within the casino) of the gaming facility.

The IC card R/W 2253 is used to read data from the IC card and also to write data to the IC card. The IC card is a card possessed by the player and stores, for example, data for identifying the player, and data concerning the history of games played by the player. Data corresponding to coins, bill, or credit can also be stored in the IC card. The data display 2037 is made of a fluorescent display and the like, and displays data read by the IC card R/W 2253, and data entered by the player through the keypad 2038, for example. The keypad 2038 is used to input instructions concerning issuing of tickets and to input data.

FIG. 69 is a block diagram showing the internal configuration of the slot machine shown in FIG. 68.

The gaming board 2050 has a CPU (Central Processing Unit) 2051, a ROM 2055, and a boot ROM 2052 which are connected via an internal bus, a card slot 2053S corresponding to the memory card 2053, and an IC socket 2054S corresponding to a GAL (Generic Array Logic) 2054.

The memory card 2053 is of a non-volatile memory such as CompactFlash (registered trademark), and stores therein a game program. The game program includes a symbol determination program. The above-mentioned symbol determination program is for determining symbols to be rearranged in the display blocks 2028.

Fourteen types of symbols are determined by the symbol determination program, which include "3bar", "2bar", "1bar", "blue7", "red7", "white7", "RIBBON", "HEART", "STAR", "MOON", "SUN" "JEWEL", "CROWN", and "SMILE".

Further, the card slot 2053S is structured to allow insertion and ejection of a memory card 2053, and is connected to the motherboard 2040 through an IDE bus. Thus, it is possible to remove a memory card 2053 from the card slot 2053S, write another game program onto the memory card 2053, and insert the memory card 2053 back into the card slot 2053S to change the type or content of a game to be run at the slot machine 2010. The game program includes a program related to progress of a game. Further, the game program includes an image data and sound data output during the game.

The CPU 2051, ROM 2055, and boot ROM 2052 that are mutually connected via internal buses are connected to the motherboard 2040 via a PCI bus. The PCI bus transmits signals between the motherboard 2040 and the gaming board 2050, and supplies power from the motherboard 2040 to the gaming board 2050.

The motherboard 2040 is constituted with a motherboard for market use (printed circuit board with fundamental parts of a personal computer built thereon), and includes a main CPU 2041, a ROM (Read Only Memory) 2042, a RAM (Random Access Memory) 2043, and a communication interface 2044. Note that the motherboard corresponds to the controller of the present invention.

The ROM 2042 is made of a memory device such as a flash memory and stores therein a program such as BIOS (Basic Input Output System) run by the main CPU 2041, and permanent data. When the main CPU 2041 runs the BIOS, predetermined peripheral devices are initialized, and the game program stored in the memory card 2053 is installed via the gaming board 2050. Note that, in the present invention, the ROM 2042 may be either rewritable or non-rewritable.

The ROM 2042 includes data indicating the predetermined time T, odds data indicating the corresponding relationship between the combination of symbols rearranged on the winning line and the payout amount (see FIG. 82A to FIG. 82C), data indicating the first constant, and data indicating the second constant.

Further, the RAM 2043 stores the data and programs used when the main CPU 2041 is operated. Further, the RAM 2043 can store a game program.

The RAM 2043 also stores data about the credit amount and the inserted amount and payout amount for a one-time game.

Further, the motherboard 2040 is connected to a later-described main body PCB (Printed Circuit Board) 2060 and the door PCB 2080 via USBs. The motherboard 2040 is connected to a power supply unit 2045 and communication interface 22044. The communication interface 22044 is connected to the communication interface 2245 of the PTS terminal 2064 via a communication line.

The main body PCB 2060 and the door PCB 2080 are connected to equipment and devices that transmit input signals that are input in to the main CPU 2041, and equipment and devices whose operations are controlled by control signals output from the main CPU 2041. The main CPU 2041 executes the game program stored in the RAM 2043 based on the input signal that is input into the main CPU 2041, and thereby performs a predetermined calculation process and stores the results in the RAM 2043, and sends control signals to every equipment and device as the control process for every equipment and device.

The main body PCB 2060 is connected to the lamp 2030, the hopper 2066, the coin detection unit 2067, the graphic board 2068, the speaker 2029, the touch panel 2069, the ticker printer 2035, the key switch 1038S, the data display 2037, and the timer 2061.

The hopper 2066 is installed inside the cabinet 2011, and based on a control signal output from the main CPU 2041, it pays out the number of coins determined to be paid out to the coin tray 2018 through the coin payout exit 2019. The coin detection unit 2067 is installed inside the coin payout exit 2019, and outputs an input signal to the main CPU 2041 upon detecting that the number of coins determined to be paid has been paid out from the coin payout exit 2019.

The timer 2037 is used for clocking the time.

The graphic board 2068 controls display of an image to be displayed on the upper image display panel 2033 and the lower image display panel 2016, based on a control signal output from the main CPU 2041. Symbols to be scrolled or stopped are displayed in each display block 2028 of the lower image display panel 2016. The credit amount stored in the RAM 2043 is displayed on the credit amount display unit 2031 of the lower image display panel 2016. Also, the number of coins to be paid out is displayed on the payout amount display unit 32 of the lower image display panel 2016. The graphic board 2068 is provided with a VDP (Video Display Processor) for generating image data on the basis of a control signal from the main CPU 2041, a video RAM for temporarily storing the image data generated by the VDP, and the like. Note that image data used at the time of generating the image data by the VDP is in a game program that is read out from the memory card 2053 and stored in the RAM 2043.

The ticket printer 2035 prints a bar code on a ticket by coding data such as the credit amount, date and time, and identification number of the slot machine 2010 that is stored in the RAM 2043 based on the control signal output from the main CPU 2041, and outputs it as a barcoded ticket 2039. The key switch 2038S is provided to the keypad 2038, and outputs a predetermined input signal to the main CPU 2041 when the player operates the keypad 2038. The data display 2037 displays data input by the player through the keypad 2038.

The door PCB 2080 is connected to the control panel 2020, a reverter 1021S, and a cold cathode tube 2081. A start switch 2023S corresponding to the start button 2023, a change switch 2024S corresponding to the change button 2024, a CASHOUT switch 2025S corresponding to the CASHOUT button 2025, a 1-BETswitch 2026S corresponding to the 1-BET button 2026, and a MAXBET switch 2027S corresponding to the MAXBET button 2027 are provided on the control panel 2020. Each of the switches from 2023S to 2027S outputs an input signal to the main CPU 2041 when the corresponding buttons 2023 to 2027 are operated by the player.

The reverter 20215 operates based on a control signal output from the main CPU 2041, and distributes coins into a cash box (not shown in the figure) or the hopper 2066 installed inside the slot machine 2010. In other words, when the hopper 2066 is filled with coins, a valid coin is distributed into the cash box by the reverter 10215. On the other hand, when the hopper 2066 is not full of coins, a valid coin is distributed into the hopper 2066. The cold cathode tube 2081 functions as a backlight provided at the back of the lower image display panel 2016 and the upper image display panel 2033, and lights up based on the control signal output from the main CPU 2041.

FIG. 72 is a block diagram showing an internal configuration of the PTS terminal configuring the gaming system according to the second embodiment of the present invention.

The PTS terminal 2064 comprises a CPU 2241, a CPU 2241, a RAM 2243, a connection unit 2244, a communication interface 2245, and a hard disk drive 2246. The controller comprising the CPU 2241, the CPU 2241, and the RAM 2243 corresponds to the controller of the present invention. The communication interface 2245 is connected to the communication interface 22044 of one slot machine 2010 having a corresponding relationship with the said PTS terminal 2064 via a communication line, and is also connected to the management server block 2820 via a communication line. The CPU 2241 stores a system program for controlling the operation of the PTS terminal 2064; exchange commission calculation value data; and permanent data. The exchange commission calculation value data indicates the exchange commission calculation value P/1−P (P is the exchange commission rate). The RAM 2243 temporarily stores the currency exchange rate data showing the currency exchange rate stipulated for each type of currency other than the basic currency to show the corresponding relationship between the amount of basic currency (American currency) and the amount of different types of currencies other than the basic currency.

The hard disk drive 2246 is used to store the image data of images photographed by the camera 2254C. The hard disk drive 2246 corresponds to the memory in the present invention. After power has been supplied and the predetermined startup process has been executed, the CPU 2241 stores the image data obtained through photography by the 2254C in the hard disk drive 2246. Storing of the image data is performed at a prescribed time interval (for example, at 0.5-second interval). The time (time stamp) at which data is stored in hard disk drive 2246 is added to each image data. The PTS terminal 2064 has a clock function, and sets the time every time the prescribed time period elapses. The time is set by acquiring the time data from either the clock provided in the management server 2200 or from outside via the Internet.

When the storable area in the hard disk drive 2246 becomes lesser than the predetermined amount (for example 100 MB), the CPU 2241 performs sequential deletion starting from the image data to which the oldest time stamp is added. However, image data that is not set to a state in which it can be deleted is not deleted.

A bill validator 2022, an exchange bill validator 2065, a coin counter 2021C, a camera module 2254, an RFID (Radio Frequency Identification) reader 2255 (hereinafter also referred to as RFID-R 2255), and an IC card R/W 2253 are connected to the connection unit 2244 via a communication line.

The bill validator 2022 is for validating the legitimacy of bill (basic currency), and accepting legitimate bill. When the bill validator 2022 accepts legitimate bill, it outputs an input signal to the CPU 2241 based on the amount of the bill. In other words, the input signal includes information about the amount of bill that is accepted. Note that the bill processing device 3001 described later with regard to FIG. 101 can be used as the exchange bill validator 2065.

The exchange bill validator 2065 is for identifying the type and legitimacy of bill of a plurality of countries other than the basic currency, and accepting legitimate bill. When the exchange bill validator 2065 accepts legitimate bill, it outputs an input signal to the CPU 2241 based on the type and amount of the bill. The input signal includes the currency type data indicating the type of the identified currency and the currency amount data indicating the amount of the said currency. In other words, the input signal includes information about the type and amount of bill that is accepted. Note that the bill processing device 3001 described later with regard to FIG. 101 can be used as the exchange bill validator 2065. Further, a single bill validator 3001 can be used as the bill validator 2022 and exchange bill validator 2065.

Inside the coin entry 21 is provided with the coin counter 2021C that identifies the legitimacy of coins inserted in the coin entry 21 by the player. Coins other than valid coins are discharged through the coin payout exit 2019. The coin counter 2021C outputs an input signal to the CPU 2241 when it detects a legitimate coin.

The camera module 2254 controls the operation of the camera 2254C connected therewith. Note that the image data obtained through photography is stored in the hard disk drive 2246 of the PTS terminal 2064.

The RFID-R 2255 receives the electric waves transmitted from the RFID tag carried by the casino staff. Based on the received electric waves, the RFID-R 2255 outputs a receipt signal to the CPU 2241. The receipt signal includes information (staff ID) for identifying the RFID tag that is the source of transmission of the received electric waves. Then, the CPU 2241 sends the said receipt signal to the staff management server 2263. The staff management server 2263 that receives the receipt signal sent from the CPU 2241 acquires the current position of each staff inside the casino based on the reception signal.

The IC card R/W 2253 is used to read data from the IC card and then send it to the CPU 2241, and also to write data to the IC card based on the control signal from the CPU 2241.

Figure 73:
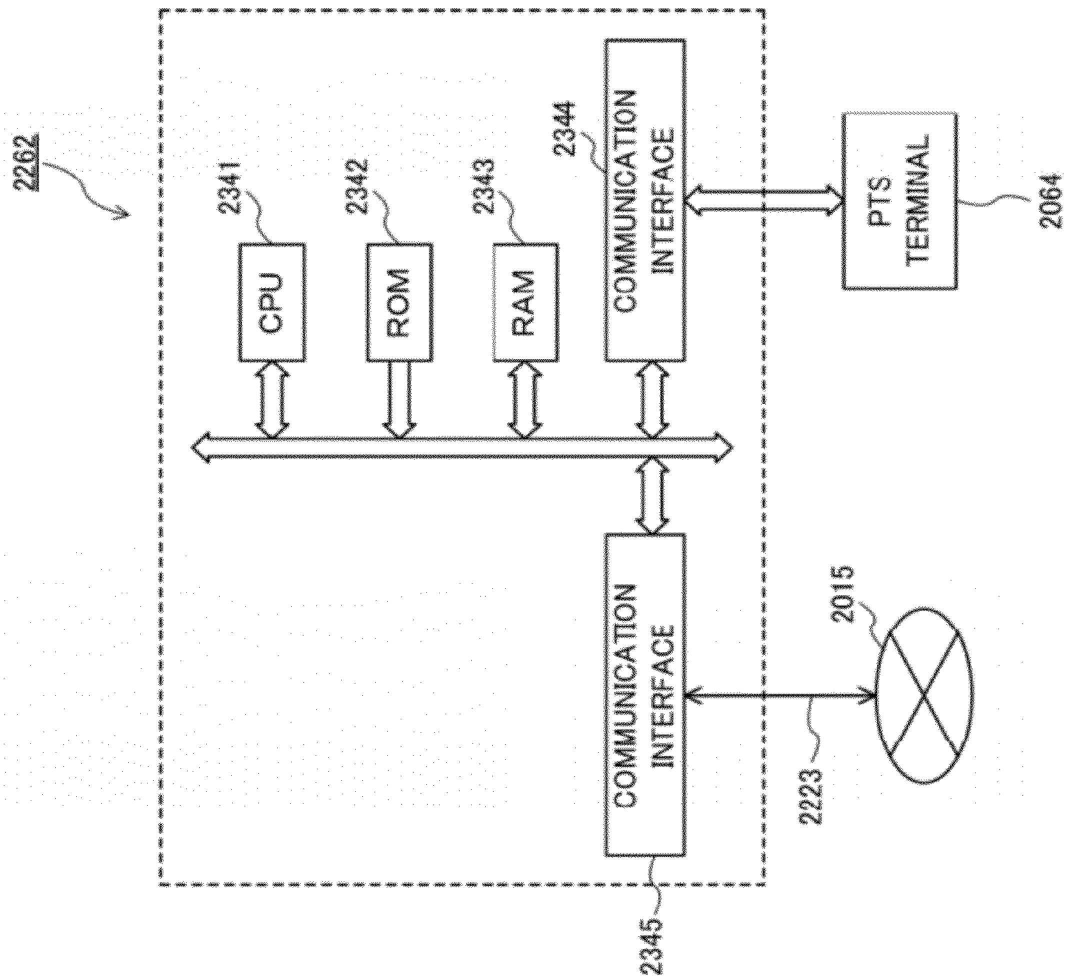
FIG. 73 is a block diagram showing an internal configuration of the currency exchange server configuring the gaming system.

FIG. 73 is a block diagram showing the internal configuration of the currency exchange server configuring the gaming system according to the second embodiment of the present invention.

The currency exchange server 2262 comprises a CPU 2341, a ROM 2342, a RAM 2343, a communication interface 2344, and a communication interface 2345. The communication interface 2344 is connected to the communication interface 2245 of the PTS terminal 2064 via a communication line. The communication interface 2345 is connected to the Internet 2015 via the communication line 2223. The ROM 2342 stores a system program for controlling the operation of the currency exchange server 2262; an exchange information acquisition program for acquiring the most recent exchange information via the Internet 2015; the permanent data; and the commission data showing the exchange commission rate P. The RAM 2343 temporarily stores the currency exchange information as well as commission-subtracted currency exchange information.

Figure 74:
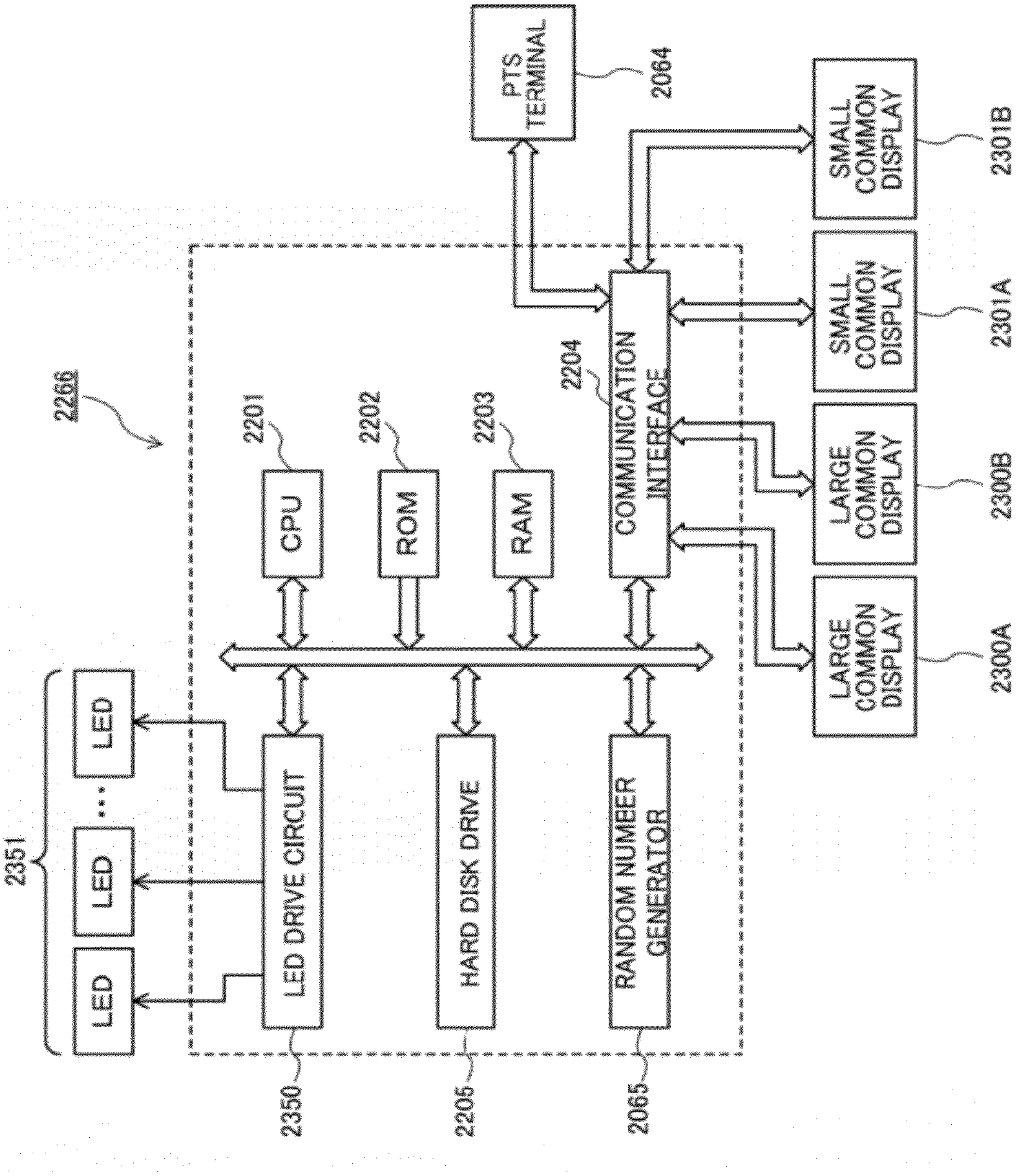
FIG. 74 is a block diagram showing an internal configuration of the progressive server configuring the gaming system.

FIG. 74 is a block diagram showing the internal configuration of the progressive server configuring the gaming system according to the second embodiment of the present invention.

The progressive server 2266 comprises a CPU 2201, a ROM 2202, a RAM 2203, a communication interface 2204, an LED drive circuit 2350, a random number generator 2063, and a hard disk drive 2205 as the memory. The random number generator 2063 generates a random number at the prescribed timing. The communication interface 2204 is connected to the communication interface 2245 of the PTS terminal 2064 via a communication line and at the same time is connected to a large common display 2300A, a large common display 2300B, a small common display 2301A, and a small common display 2301B via a communication line. The ROM 2202 stores a system program for controlling the operation of the progressive server 2266 and the permanent data. The RAM 2203 temporarily stores the cumulative value data for EVENT TIME showing the cumulative value for EVENT TIME; the cumulative value data for bonus showing the cumulative value for bonus; lit count data showing the number of lit LED 2351 from among the LED 2351 constituting a connected luminescent belt 2310 installed on each slot machine 2010; and data received from each slot machine 2010.

The hard disk drive 2205 stores the emission count determination table data showing a plurality of types of emission count determination tables (bending portion-use emission count determination table and straight portion-use emission count determination table).

Furthermore, the hard disk drive 2205 stores the point number determination table data that is referenced when determining the number of points in a common game. The hard disk drive 2205 also stores data showing the prescribed values and data showing the specific values.

A plurality of LEDs 2351 are connected to the LED drive circuit 2350. An identification number is assigned to each LED 2351, and the LED drive circuit 2350 turns ON and turns OFF the LED 2351 based on the signal received from the CPU 2201.

Figure 75:
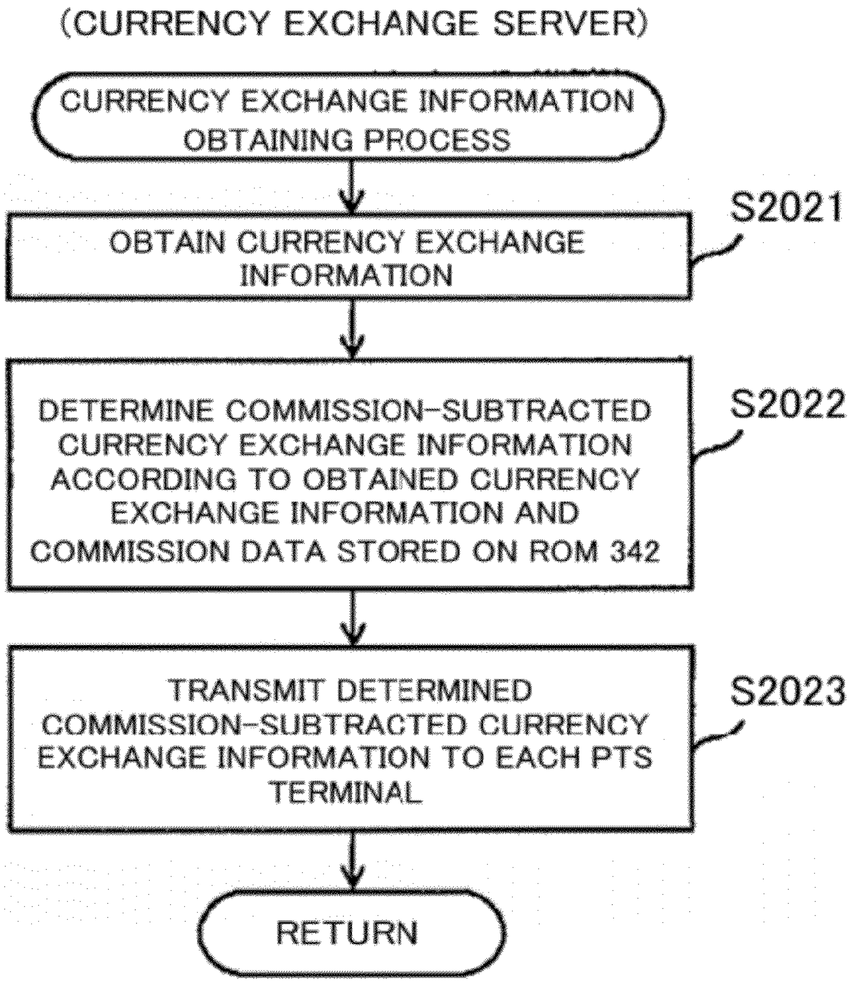
FIG. 75 is a flowchart showing a currency exchange information obtaining process performed in the currency exchange server.

FIG. 75 is a flowchart showing a currency exchange information obtaining process performed in the currency exchange server.

The currency exchange information obtaining process is executed at the predetermined timing.

First of all, the CPU 2341 executes the currency exchange information acquisition program stored in the ROM 2342 to acquire the most recent currency exchange information via the Internet 2015 (step S22001). During this process, for example, the CPU 2341 acquires the information showing the corresponding relationship between the amount of American currency and the amount of Japanese currency (for example, 1 dollar=100 yen) at a certain timing. Further, for example, the CPU 2341 acquires the information showing the corresponding relationship between the amount of American currency and the amount of Chinese currency (for example, 1 dollar=6.85 Yuan) at another timing. Note that in the present text of specifications, the association between the amount of American currency M and the amount of currency N of another country is described as M=N.

The commission-subtracted currency exchange information is determined based on the currency exchange information acquired in step S2021, and the commission data stored in the ROM 2342 (step S22022). During this process, the commission-subtracted currency exchange information is determined based on the corresponding relationship indicated by the currency exchange information, by multiplying the value obtained by subtracting the exchange commission rate (0.02 in the present embodiment) indicated by the commission data from 1 to the amount of currency of a country other than America. For example, when the acquired currency exchange information indicates that 1 dollar and 100 yen are equivalent, the information indicating that 0.98 dollar obtained by multiplying (1−0.02) with 1 dollar and 100 yen are equivalent is determined as the commission-subtracted currency exchange information.

The commission-subtracted currency exchange information that is determined in step S2022 is sent to each PTS terminal 2064 (step S3). After the execution of the process of step S2023, the CPU 2341 ends the currency exchange information obtaining process.

Figure 76:
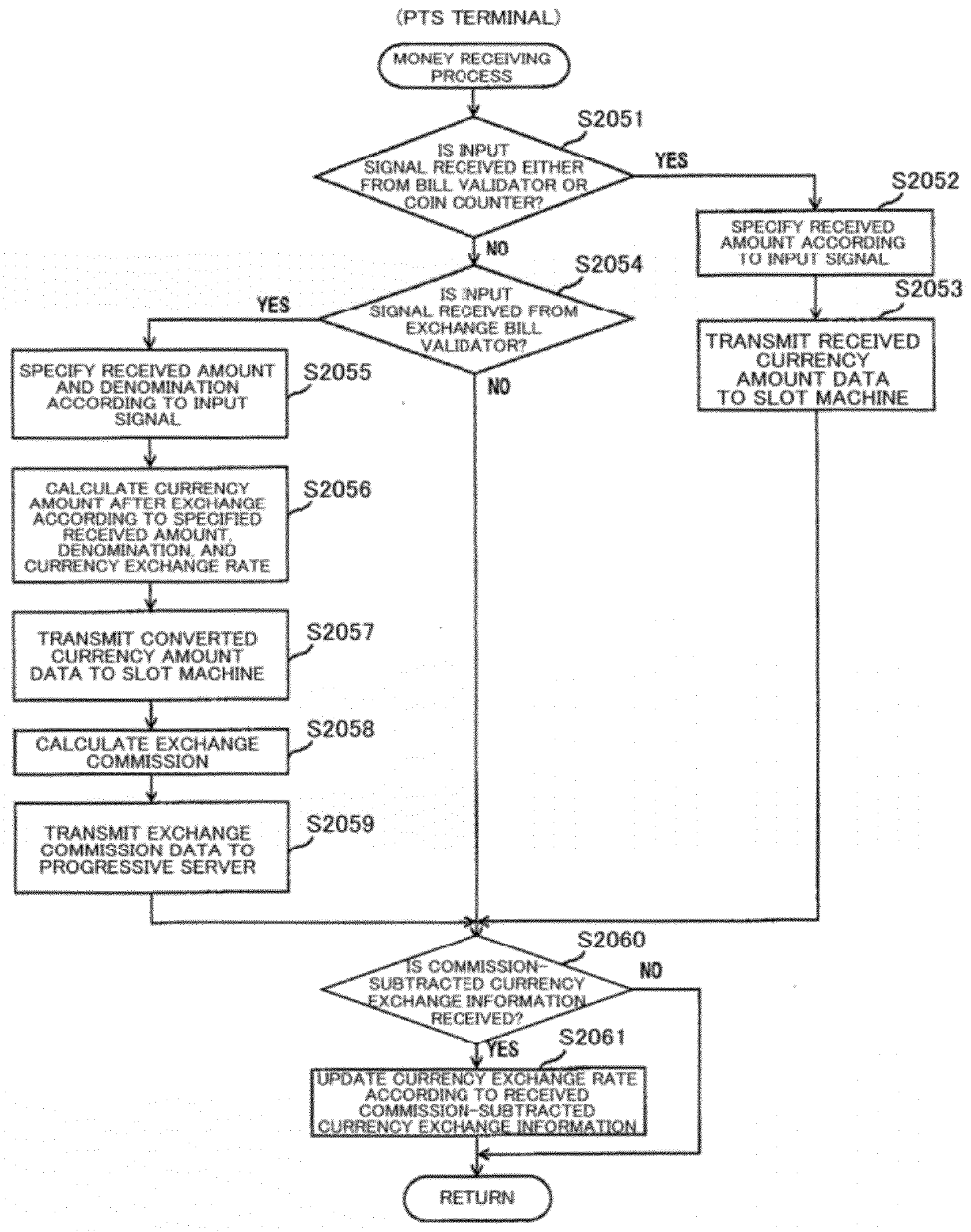
FIG. 76 is a flowchart showing a money receiving process performed at the PTS terminal shown in FIG. 72.

FIG. 76 is a flowchart showing a money receiving process performed at the PTS terminal shown in FIG. 72.

First of all, at the predetermined timing, the CPU 2241 determines whether or not an input signal is received from the bill validator 2022 or coin counter 2021C (step S2051).

In step S2051, if it is determined that an input signal is received, the CPU 2241 identifies the received amount based on the received input signal (step S2052). Then, the CPU 2241 sends the received currency amount data indicating the identified received amount to the corresponding slot machine 2010 (step S2053).

On the other hand, in step S2051, if it is determined that an input signal is not received, the CPU 2241 determines whether or not an input signal is received from the exchange bill validator 2065 (step S2054).

In step S2054, if it is determined that an input signal is received, the CPU 2241 identifies the received amount and the type of bill accepted by the exchange bill validator 2065 based on the currency type data and currency amount data included in the received input signal (step S2055).

The CPU 2241 calculates the converted currency amount to the American currency (for example, 98 dollars), which is the basic currency, based on the received amount (for example, 10000 yen) that is identified in step S2055, type of bill, and the currency exchange rate (for example, 0.98 dollar=100 yen) indicated by the currency exchange rate data stored in the RAM 2243 (step S2056). Then, the CPU 2241 sends the converted currency amount data indicating the currency amount after exchange (hereinafter also referred to as the converted currency amount) to the corresponding slot machine 2010 (step S2057). Note that hereinafter the received currency amount data and the converted currency amount data are together referred to as currency amount data.

The CPU 2241 calculates the exchange commission based on the converted currency amount data that indicates the converted currency amount as calculated in step S2056, and the exchange commission calculation value data that indicates the exchange commission calculation value stored in the CPU 2241 (step S2058). The exchange commission corresponds to the amount of money (for example, 2 dollars) obtained by multiplying the exchange commission calculation value P/1−P (P is the exchange commission rate (0.02 in the present embodiment)) (In the present embodiment, the exchange commission calculation value is 2/98) with the converted currency amount as calculated in step S2056 (for example, 98 dollars). Then, the CPU 2241 sends the exchange commission data indicating the exchange commission to the progressive server 2266 (step S2059).

When the process of step S2053 or step S2059 is executed, or it is determined in step S2054 that an input signal is not received, the CPU 2241 determines whether or not the commission-subtracted currency exchange information is received from the currency exchange server 2262 (step S2060).

When it is determined in step S2060 that the post-commission-subtracted exchange information is received, the CPU 2241 updates the currency exchange rate data stored in the RAM 2243 based on the received commission-subtracted currency exchange information (step S2061). For example, when the corresponding relationship of the various amounts of currencies in the currency exchange rate indicated by the currency exchange rate data stored in the RAM 2243 is 1 dollar=100 yen=0.68 euro=6.85 yuan, the CPU 2241 stores the currency exchange rate data indicating a new currency exchange rate, that is, 1 dollar=110 yen=0.68 euro=6.85 yuan in the RAM 2243 when the commission-subtracted currency exchange information that indicates the corresponding relationship of 1 dollar=110 yen is received.

In the present embodiment, the explanation is based on the fact that the currency exchange server 2262 that receives the currency exchange information determines the commission-subtracted currency exchange information based on the received currency exchange information, and the determined commission-subtracted currency exchange information is sent to the PTS terminal 2064. In other words, the processing of collecting the exchange commission is executed by the currency exchange server 2262. However, in the present invention, it may be possible that the processing of collecting the exchange commission is executed by the PTS terminal.

In such a case, for example, the following configuration can be adopted.

That is, the ROM of the PTS terminal stores the commission data indicating the exchange commission rate P. The CPU of the PTS terminal receives the currency exchange information from the currency exchange server. Then, the CPU of the PTS terminal determines the commission-subtracted currency exchange information based on the commission data stored in the ROM. Then, the CPU of the PTS terminal updates the currency exchange rate data based on the determined commission-subtracted currency exchange information.

Further, in the present invention, it may be possible that the currency exchange rate data is stored in the RAM of the currency exchange server, and at the same time, the CPU of the currency exchange server updates the currency exchange rate data based on the commission-subtracted currency exchange information, and the updated currency exchange rate data is sent to the PTS terminal. Furthermore, the currency exchange server may receive the currency exchange rate data from outside as well.

When the process of step S2061 is executed, or when it is determined in step S2060 that the commission-subtracted currency exchange information is not received, the CPU 2241 ends the money receiving process.

Figure 77:
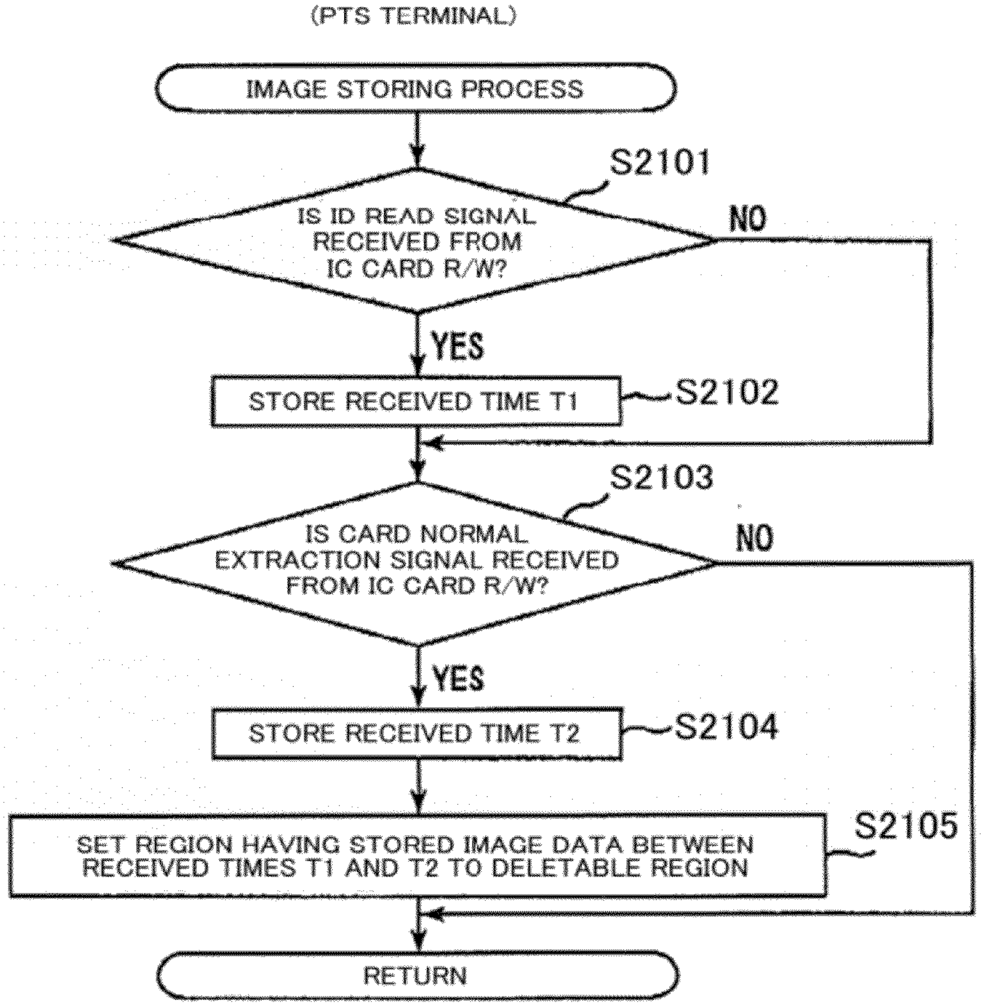
FIG. 77 is a flowchart depicting a subroutine of an image storing process performed at the PTS terminal shown in FIG. 72.

FIG. 77 is a flowchart depicting a subroutine of an image storing process performed at the PTS terminal shown in FIG. 72. As explained before using FIG. 72, the image data obtained by photographing with the camera 2254C is kept stored in the hard disk drive 2246 of the PTS terminal 2064 at every 0.5 second.

First of all, in step S2101, the CPU 2241 provided in the PTS terminal 2064 determines whether or not an ID read signal is received from the IC card R/W 2253. When it is determined that an ID read signal is received, the CPU 2241 stores the received time T1 at a predetermined area of the RAM 2243 (step S2102).

When it is determined in step S2101 that an ID read signal is not received, or after the process of step S2102, the CPU 2241 determines whether or not a card normal extraction signal is received from the IC card R/W 2253 (step S2103). When it is determined that a card normal extraction signal is received from the IC card R/W 2253, the CPU 2241 stores the received time T2 at a predetermined area of the RAM 2243 (step S2104).

Next, in step S2105, the CPU 2241 sets the area of the hard disk drive 2246 in which the image data from the received time T1 to the received time T2 is stored to a deletable region. During this process, the CPU 2241 sets the image data on which the time stamp from the received time T1 to the received time T2 is provided to a deletable state. When it is determined in step S2103 that a card normal extraction signal is not received from the IC card R/W 2253, or after the process of step S2105, this subroutine is ended. Note that the image data stored in the area that is set as the deletable region of the hard disk drive 2246 is deleted when the storeable area becomes lesser than 100 MB.

Figure 78:
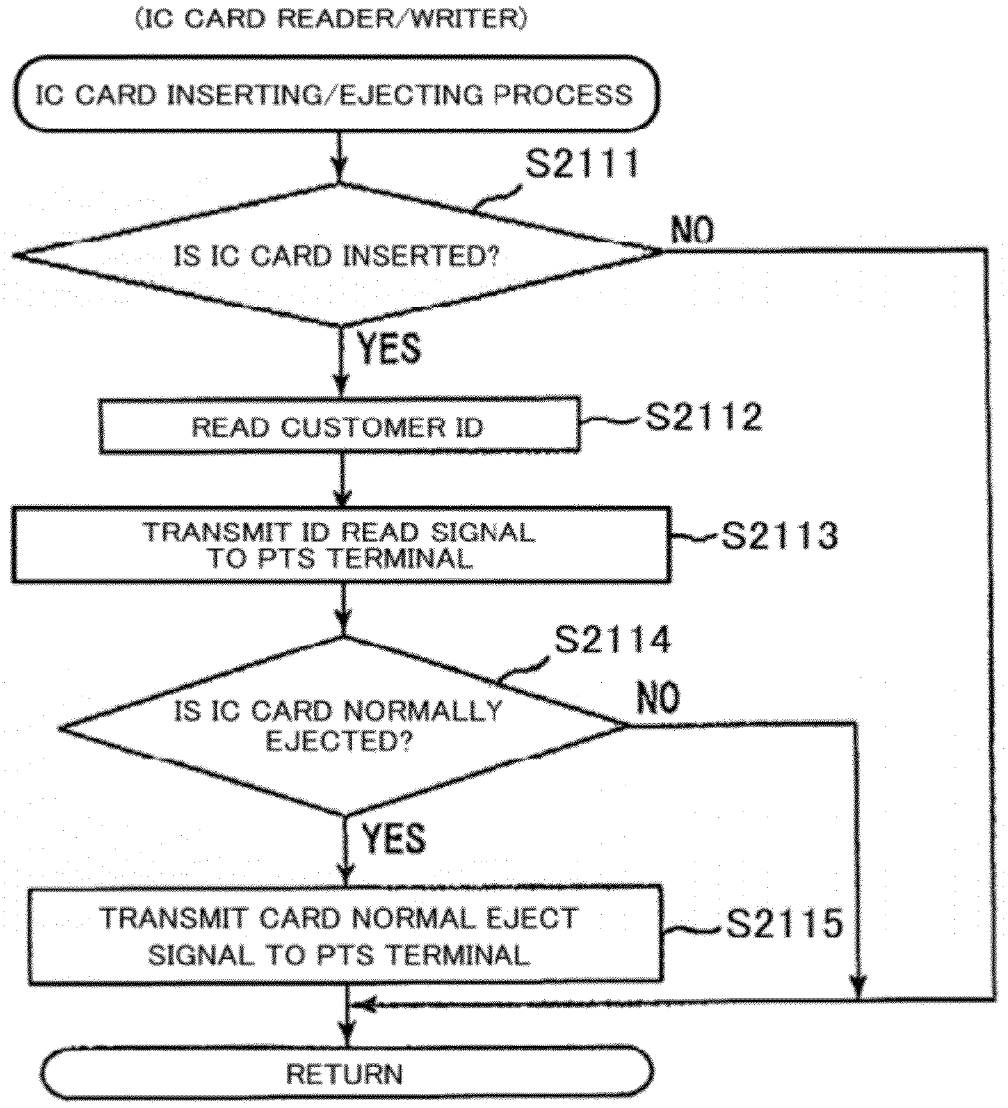
FIG. 78 is a flowchart depicting a subroutine of a card inserting/ejecting process executed in an IC card reader/writer.

FIG. 78 is a flowchart depicting a subroutine of a card inserting/ejecting process executed in an IC card reader/writer.

First of all, the IC card R/W 2253 determines whether or not an IC card has been inserted (step S2111). When it is determined that an IC card has been inserted, the IC card R/W 2253 reads out the customer ID from the IC card. Next, in step S2113, the IC card R/W 2253 sends an ID read signal to the PTS terminal 2064 indicating that the customer ID has been read out. Note that when it is determined in step S2111 that an IC card has been inserted, if the customer ID has already been read out, the process is moved to step S2114 without executing the processes of step S2112 and step S2113.

The customer ID corresponds to the identification data of the present invention. Further, the ID read signal corresponds to the detection signal of the present invention.

In step S2114, the IC card R/W 2253 determines whether or not the IC card has been ejected normally. When it is determined that the IC card has been ejected normally, the IC card R/W 2253 sends the card normal extraction signal to the PTS terminal 2064 (step S2115). When it is determined in step S2111 that an IC card has not been inserted, or when it is determined in step S2114 that the IC card has not been ejected normally, or else after the process of step S2115, this subroutine is ended.

The card normal extraction signal corresponds to the non-detection signal of the present invention.

Figure 79:
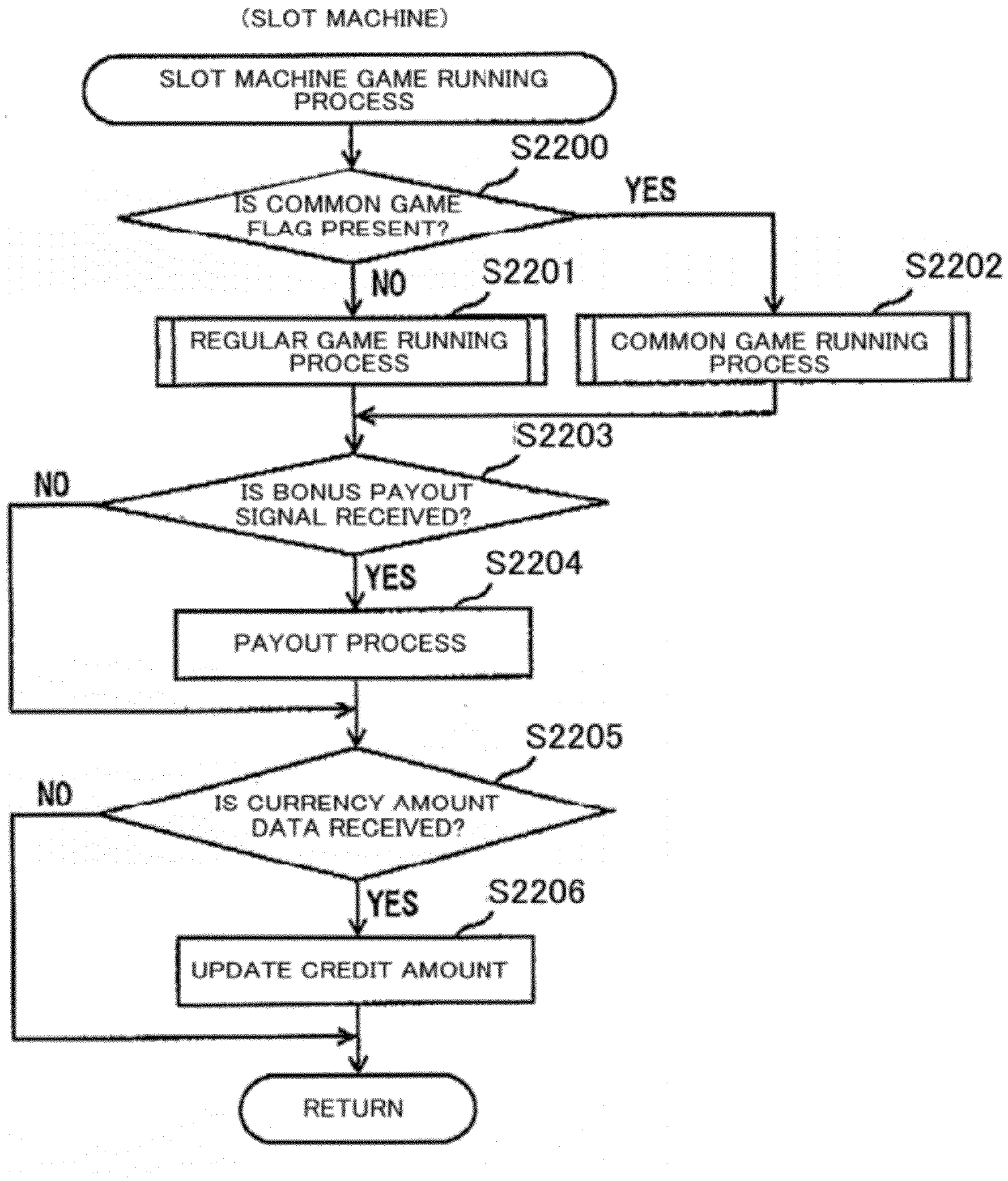
FIG. 79 is a flowchart showing a slot machine game running process performed in the slot machine.

FIG. 79 is a flowchart showing a slot machine game running process performed in the slot machine.

Note that transmission and reception of data between the slot machine 2010 and progressive server 2266 is executed via the PTS terminal 2064, however to provide a concise description below, direct transmission and reception of data is assumed between the slot machine 2010 and progressive server 2266.

First of all, the main CPU 2041 determines whether or not a common game flag has been set (step S2200).

Figure 80:
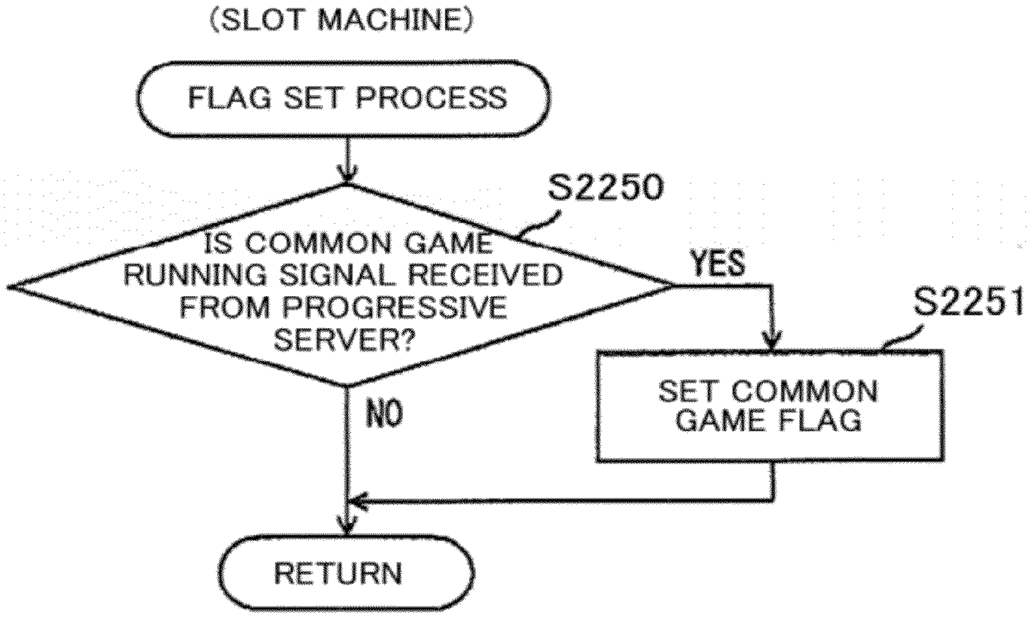
FIG. 80 is a flowchart showing a subroutine of a flag set process.

The common game flag is explained by using FIG. 80.

FIG. 80 is a flowchart showing a subroutine of a flag set process.

First of all, the main CPU 2041 determines at the predetermined timing whether or not a common game running signal (see FIG. 84) is received from the progressive server 2266 via the PTS terminal 2064 (step S2250).

When it is determined that the common game running signal is not received, the main CPU 2041 ends this subroutine.

On the other hand, when it is determined that the common game running signal has been received, the main CPU 2041 sets the common game flag (step S2251) and ends this subroutine.

Thus, the common game flag shows that the conditions for executing a common game have been established.

When it is determined in step S2200 of FIG. 79 that the common game flag has not been set, the main CPU 2041 executes the regular game running process (step S2201). The regular game running process is described later in detail by using drawings.

On the other hand, when it is determined that the common game flag has been set, the main CPU 2041 performs the common game running process (step S2202). The common game running process is described later in detail by using drawings.

Next, the main CPU 2041 determines whether or not a bonus payout signal (see FIG. 86) is received from the progressive server 2266 via the PTS terminal 2064 (step S2203).

When it is determined that a bonus payout signal is received, the main CPU 2041 pays out coins (step S2204). When a bonus payout signal including information indicating that the said machine is the first winning slot machine 2010 is received, the coins of the first constant are paid out. On the other hand, when a bonus payout signal including information indicating that the said machine is the second winning slot machine 2010 is received, the coins of the second constant are paid out. The first constant is a larger number than the second constant. In other words, the number of coins paid out on the first winning slot machine 2010 is more than the number of coins paid out on the second winning slot machine 2010.

After the execution of the process of step S2204, or when it is determined in step S2203 that a bonus payout signal is not received, the main CPU 2041 determines whether or not the currency amount data (received currency amount data and converted currency amount data) is received from the PTS terminal 2064 (step S2205). In other words, it is determined whether or not the received currency amount data sent in step S2053, or the converted currency amount data that is sent in step S2057 has been received.

When it is determined in step S2205 that the currency amount data is received, the main CPU 2041 updates the credit amount based on the currency amount data that is received (step S2206). In other words, the process is executed to add a credit amount equivalent to the currency amount indicated by the currency amount data that is received to the credit amount stored in the RAM 2043.

The credit amount equivalent to the currency amount indicated by the currency amount data that is received corresponds to the BET value of the present invention.

When the process of step S2206 is executed, or when it is determined in step S2205 that the currency amount data is not received, the main CPU 2041 ends this subroutine.

Figure 81:
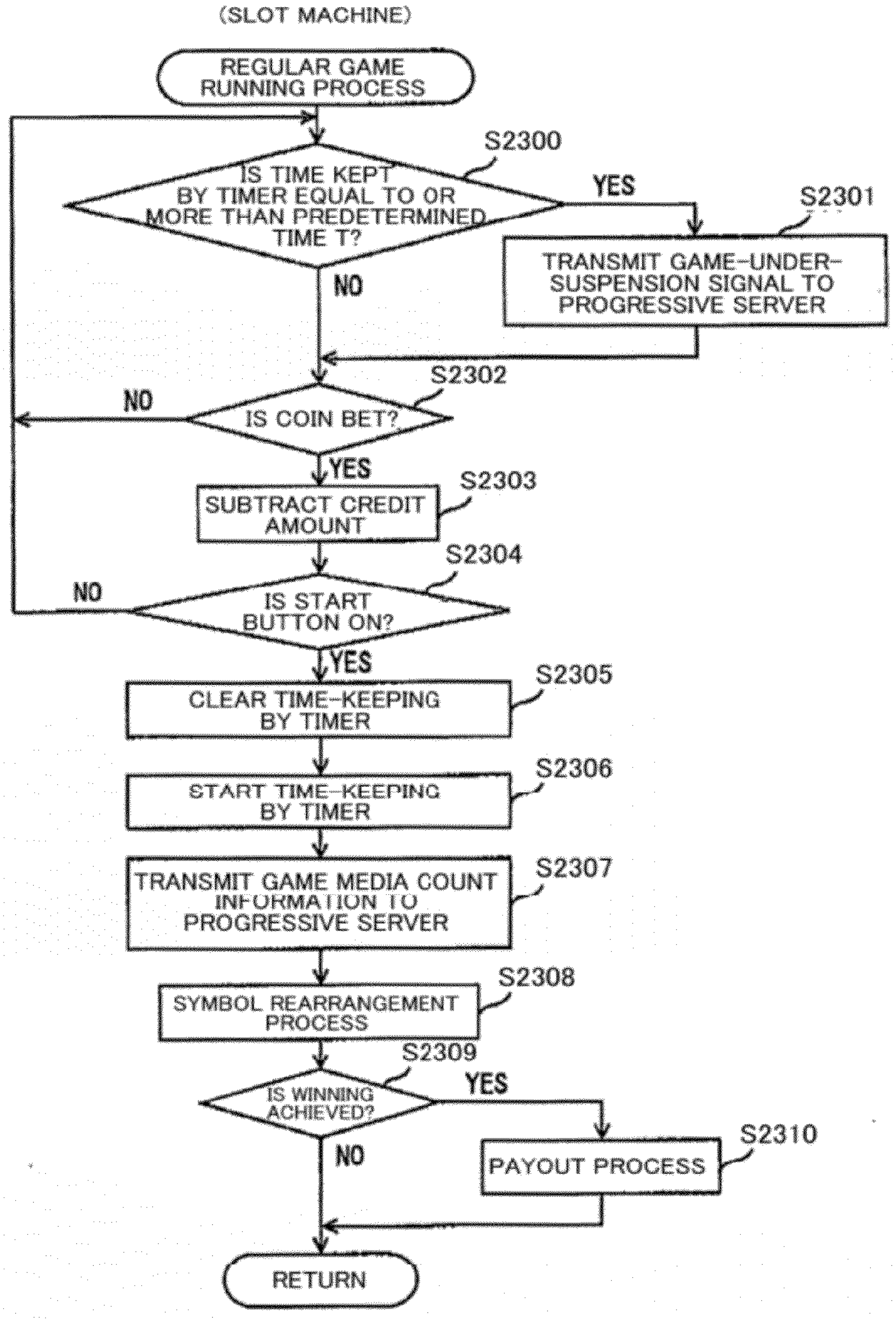
FIG. 81 is a flowchart showing a subroutine of a regular game running process.

FIG. 81 is a flowchart showing a subroutine of a regular game running process.

FIG. 82A to FIG. 82C show the corresponding relationship between the combination of the symbols rearranged on the winning line and the payout number.

Figure 83:
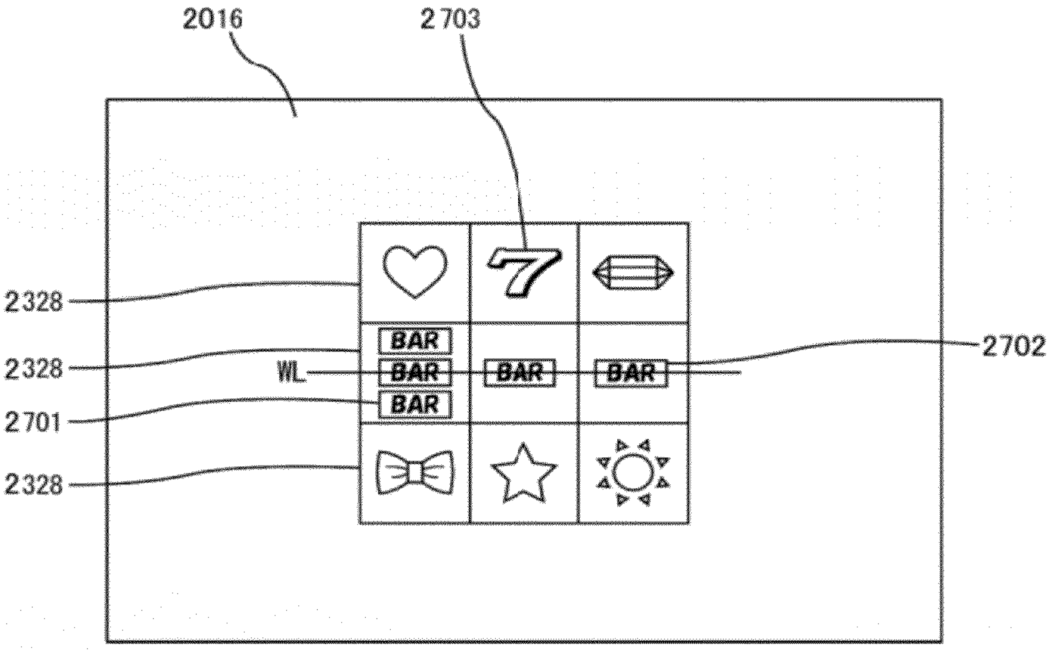
FIG. 83 is a diagram showing one example of symbols rearranged in a display block.

FIG. 83 is a diagram showing one example of symbols rearranged in a display block. First of all, the main CPU 2041 determines whether or not the time clocked by the timer 2037 is above the predetermined time T (step S10).

When it is determined in step S2300 that the predetermined time T has not exceeded, the main CPU 2041 moves the process to step S2302. On the other hand, when it is determined in step S2300 that the predetermined time T has exceeded, the main CPU 2041 sends the game-under-suspension signal to the progressive server 2266 via the PTS terminal 2064 (step S2301). The game-under-suspension signal includes the identification number of the slot machine 2010.

The main CPU 2041 determines whether or not a coin has been BET (step S2302). During this process, the main CPU 2041 determines whether an input signal output from the 1-BET switch 2026S when the 1-BET button 2026 is operated, or an input signal output from the MAXBET switch 2027S when the MAXBET button 2027 is operated is received. When it is determined that no coin is BET, the process returns to step S2300.

On the other hand, when it is determined in step S2302 that a coin is BET, the main CPU 2041 executes a process to reduce the credit amount stored in the RAM 2043 in accordance with the number of coins that are BET (S2303). Note that when the number of coins that are BET exceeds the credit amount stored in the RAM 2043, the main CPU 2041 returns the process to step S2300 without executing the process for reducing the credit amount stored in the RAM 2043. Furthermore, when the number of coins that are BET exceeds the maximum value that can be BET on one game (3 coins in the present embodiment), the process proceeds to step S2304 without the execution of the process for reducing the credit amount stored in the RAM 2043.

Next, the main CPU 2041 determines whether or not the start button 2023 has been turned ON (step S14). During this process, the main CPU 2041 determines whether or not an input signal output from the start switch 2023S when the start button 2023 is pushed is received.

When it is determined that the start button 2023 has not been turned ON, the process returns to step S2390. Note that when the start button 2023 has not been turned ON (for example, when an instruction to end a game is input without the start button 2023 being turned ON), the main CPU 2041 cancels the result of reduction executed in step S2303.

On the other hand, when it is determined in step S2304 that the start button 2023 has been turned ON, the time clocked by the timer 2037 is cleared (step S2305), and clocking of time by the timer 2037 starts (step S2306).

The main CPU 2041 sends the game medium count information indicating the number of coins that are BET to the progressive server 2266 via the PTS terminal 2064 (step S2307). The game medium count information includes the identification number of the slot machine 2010.

Next, the main CPU 2041 executes the symbol rearrangement process (step S2308).

During this process, first of all, the main CPU 2041 starts the scroll display of symbols in the display blocks 2028. Then, the main CPU 2041 executes the above-mentioned symbol determination program, determines the rearranged symbols, and then rearranges the symbols in the display blocks 2028.

Next, the main CPU 2041 determines whether or not a winning is achieved (step S2309).

As shown in FIG. 83, it is possible to rearrange nine symbols in three columns and three rows in the display blocks 2328 according to the present embodiment. The winning line WL is set in the center-most line. When the symbols rearranged on the winning line WL are in a predetermined combination, it is determined that a winning is achieved, and thereby, coins are paid out.

As shown in FIG. 82A to FIG. 82C, in the present embodiment, the relationship between the combination of the symbols and the number of coins paid out differs when the number of coins that are bet is 1, or when the number of coins that are bet is 2, or else when the number of coins that are bet is 3. In the figure, "3bar" is the symbol 2701 shown in FIG. 83. "1bar" is the symbol 2702 shown in FIG. 83. "anybar" is any symbol from among "3bar", "2bar", and "1bar".

Here, when the number of coins that are bet is two or less, a winning is achieved when at least one symbol combination from among "3 bar×3", "2 bar×3", "1bar×3", or "anybar×3" is established on the winning line WL (see FIGS. 82A and 82B). When the number of coins that are bet is three, a winning is achieved when at least one symbol combination from among "blue7×3", "red7×3", or "white7×3" is established on the winning line WL (see FIG. 82C).

When it is determined that a winning is achieved, the main CPU 2041 performs the process related to coin payout (step S2310). During this process, the main CPU 2041 pays out the number of coins determined based on the data showing the relationship between the combination of symbols and number of coins to be paid out (see FIG. 82A to 82C). For example, in a game in which one coin is BET, as shown in FIG. 83, when the symbol combination "3bar-1bar-1bar" is rearranged on the winning line WL, ten coins are paid out because this combination corresponds to "anybar-anybar-anybar".

When coins are to be pooled, the main CPU 2041 executes the process for adding up the credit amount corresponding to the determined payout amount in the RAM 2043. On the other hand, when paying out the coins, the main CPU 2041 sends a control signal to the hopper 2066, and pays out coins corresponding to the determined payout amount.

When it is determined in step S2309 that a winning is not achieved, or after the process of step S2310 is executed, the main CPU 2041 ends this subroutine.

Figure 84:
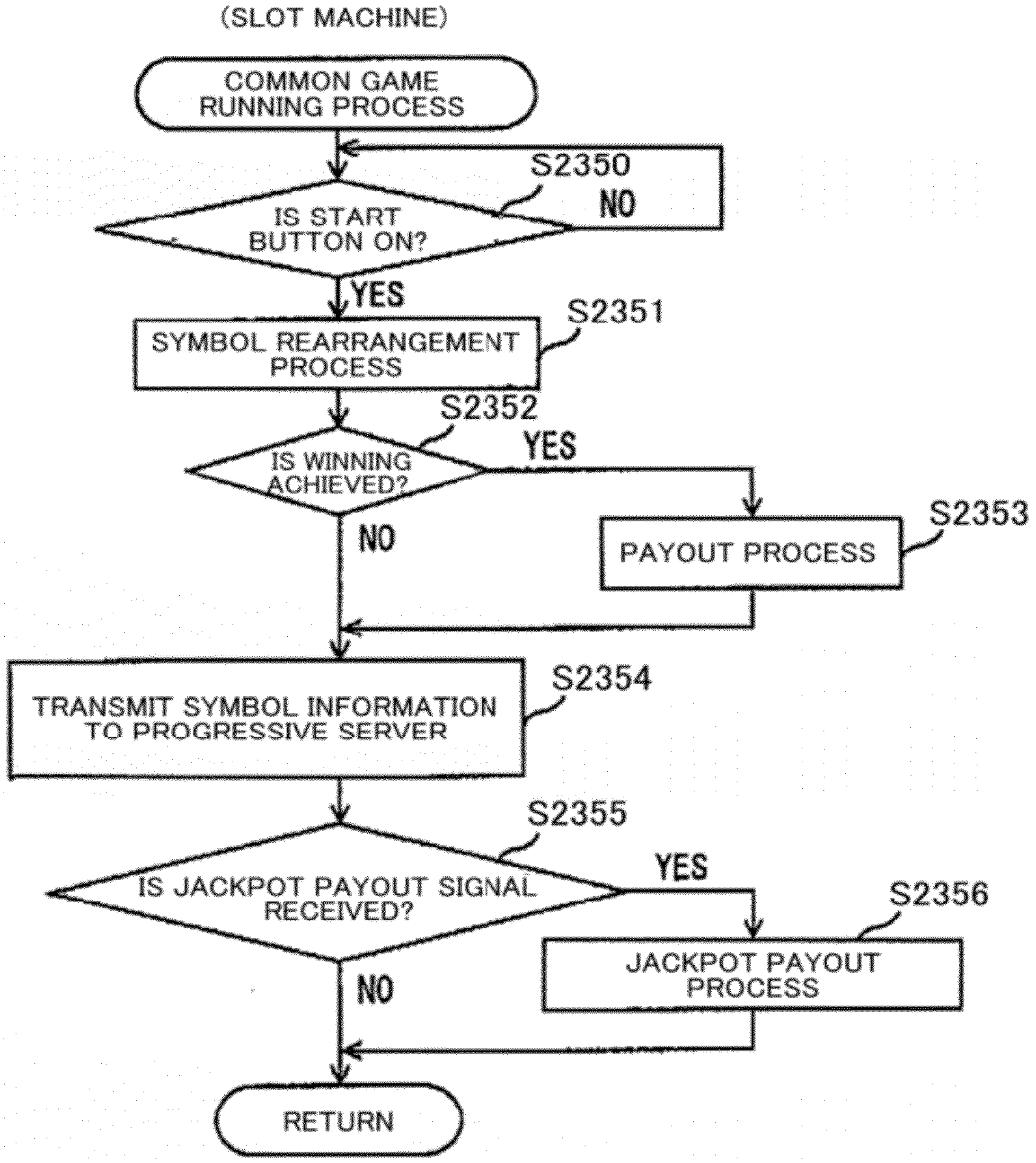
FIG. 84 is a flowchart showing a subroutine of a common game running process.

Next, the common game running process is explained by using FIG. 84.

FIG. 84 is a flowchart showing a subroutine of a common game running process.

First of all, the main CPU 2041 executes the processes of step S2350 to step S2353, but these processes are almost same as the processes of step S2304, or step S2308 to step S2310 of FIG. 81. Here, only the parts that are different from the step S2304, or step S2308 to step S2310 of FIG. 81 are explained.

When it is determined in step S2352 that a winning is not achieved, or after the process of step S2353 is executed, the main CPU 2041 sends the symbol information to the progressive server 2266 via the PTS terminal 2064 (step S2354). The symbol information is information showing the symbols that are rearranged in step S2351.

Next, the main CPU 2041 determines whether or not a jackpot payout signal is received from the progressive server 2266 via the PTS terminal 2064 (step S2355). The jackpot payout signal is sent when all LEDs 2351 provided in the connected luminescent belt 2310 installed on any slot machine 2010 are lit up, and is sent from the progressive server 2266 to the said slot machine 2010 via the PTS terminal 2064 (see FIG. 88). The jackpot payout signal includes the information showing the cumulative value for EVENT TIME.

When it is determined that the jackpot payout signal is received, the main CPU 2041 executes the jackpot payout process (step S2356). During this process, the main CPU 2041 pays out coins corresponding to the cumulative value for EVENT TIME based on the information indicating the cumulative value for EVENT TIME included in the jackpot payout signal. The process executed by the main CPU 2041 in step S2356 can include, for example, output of the notification sound from the speaker 2029, lighting of the lamp 2030, and printing of barcoded ticket 2039 in which a bar code indicating the payout amount is printed.

When it is determined in step S2355 that a jackpot payout signal is not received, or after the process of step S2356 is executed, the main CPU 2041 ends this subroutine.

Next, the process executed in the progressive server 2266 is explained.

Figure 85:
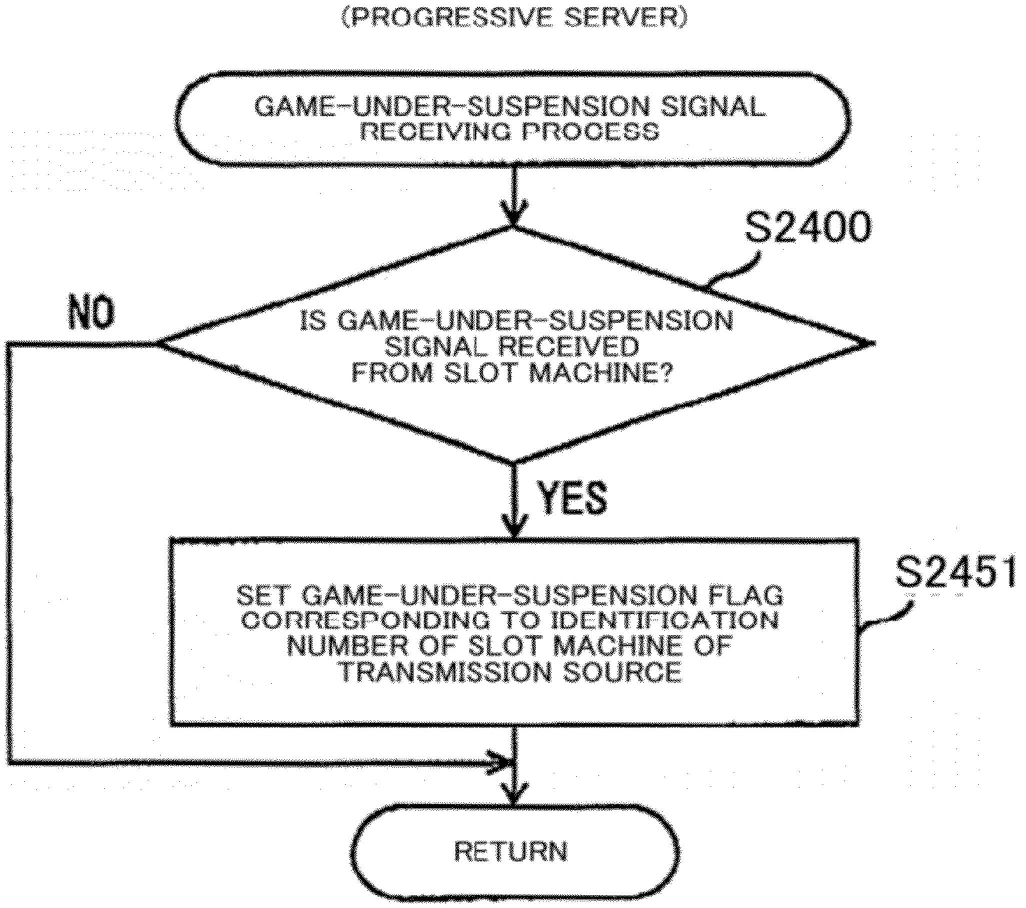
FIG. 85 is a flowchart showing a subroutine of a game-under-suspension signal receiving process.

FIG. 85 is a flowchart showing a subroutine of a game-under-suspension signal receiving process.

First of all, the main CPU 2201 determines at the predetermined timing whether or not a game-under-suspension signal (see FIG. 15) is received from the slot machine 2010 via the PTS terminal 2064 (step S2450).

When it is determined that the game-under-suspension signal is not received, the CPU 2201 ends this subroutine. On the other hand, when it is determined that the game-under-suspension signal is received, the CPU 2201 associates the game-under-suspension flag with the identification number of the slot machine 2010 included in the game-under-suspension signal that is received, and sets the same (step S2451).

Figure 86:
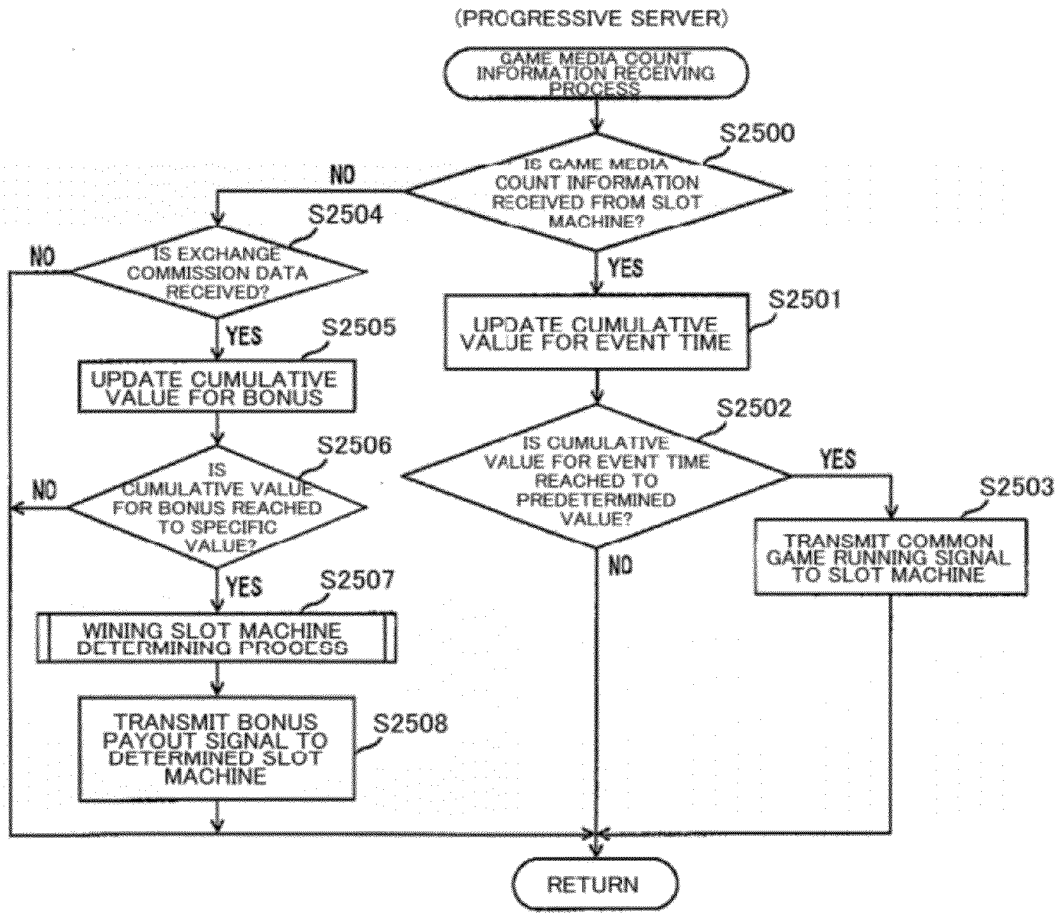
FIG. 86 is a flowchart showing a subroutine of a game media count information receiving process.

FIG. 86 is a flowchart showing a subroutine of a game media count information receiving process.

First of all, the CPU 2201 determines at the predetermined timing whether or not the game medium count information is received from the slot machine 2010 via the PTS terminal 2064 (step S2500).

When it is determined that the game medium count information is received, the CPU 2201 adds a value corresponding to a part of the number of coins indicated in the received game medium count information (in the present embodiment, a number obtained by subtracting 1 from the number of coins indicated in the game medium count information) to the cumulative value for EVENT TIME indicated in the cumulative value data for EVENT TIME stored in the RAM 2203 and then sets the numeric value obtained from addition as the new cumulative value for EVENT TIME and stores this data in the RAM 2203 (step S2501). Note that if the number of coins obtained by subtracting 1 from the number of coins indicated in the game medium count information becomes 0 or less, the process of step S2501 is halted.

Next, based on the cumulative value data for EVENT TIME that is stored in the RAM 2203, the CPU 2201 determines whether or not the cumulative value for EVENT TIME has reached the predetermined value (step S2502).

When it is determined that the cumulative value for EVENT TIME has reached the predetermined value, the CPU 2201 sends the common game running signal to the slot machine 2010 via the PTS terminal 2064 (step S2503).

On the other hand, when it is determined that the game medium count information is not received, the CPU 2201 determines whether or not the exchange commission data is received (step S2504). When it is determined that the exchange commission data is received, the CPU 2201 adds up the number of coins corresponding to the currency amount indicated in the received exchange commission data to the cumulative value for bonus indicated in the cumulative value data for bonus stored in the RAM 2203, and then sets the numeric value obtained from addition as the new cumulative value for bonus and stores this data in the RAM 2203 (step S2505).

The currency amount indicated in the received exchange commission data corresponds to the amount of the basic currency corresponding to the predetermined commission of the present invention.

Next, based on the cumulative value data for bonus that is stored in the RAM 2203, the CPU 2201 determines whether or not the cumulative value for bonus has reached a specific value (step S2506).

The event when the cumulative value for bonus reaches a specific value corresponds to a predetermined progressive payout condition in the present invention.

When it is determined that the cumulative value for bonus has reached a specific value, the CPU 2201 executes the winning slot machine determining process (step S2507). During the winning slot machine determining process, the first winning slot machine 2010 and the second winning slot machine 2010 on which bonus is presented are determined. The winning slot machine determining process is explained later in detail by using drawings.

The CPU 2201 sends the bonus payout signal via the PTS terminal 2064 to the first winning slot machine 2010 and second winning slot machine 2010 determined in step S2507 (step S2508). The bonus payout signal sent to the first winning slot machine 2010 includes information indicating that the said machine is the first winning slot machine 2010. The bonus payout signal sent to the second winning slot machine 2010 includes information indicating that the said machine is the second winning slot machine 2010.

When it is determined in step S2503 that the cumulative value for EVENT TIME has not reached the predetermined value, or when the process of step S2503 is executed, or when it is determined in step S2504 that the exchange commission data is not received, or when it is determined in step S2506 that the cumulative value for bonus has not reached the specific value, when the process of step 2508 is executed, the CPU 2201 ends this subroutine.

Figure 87:
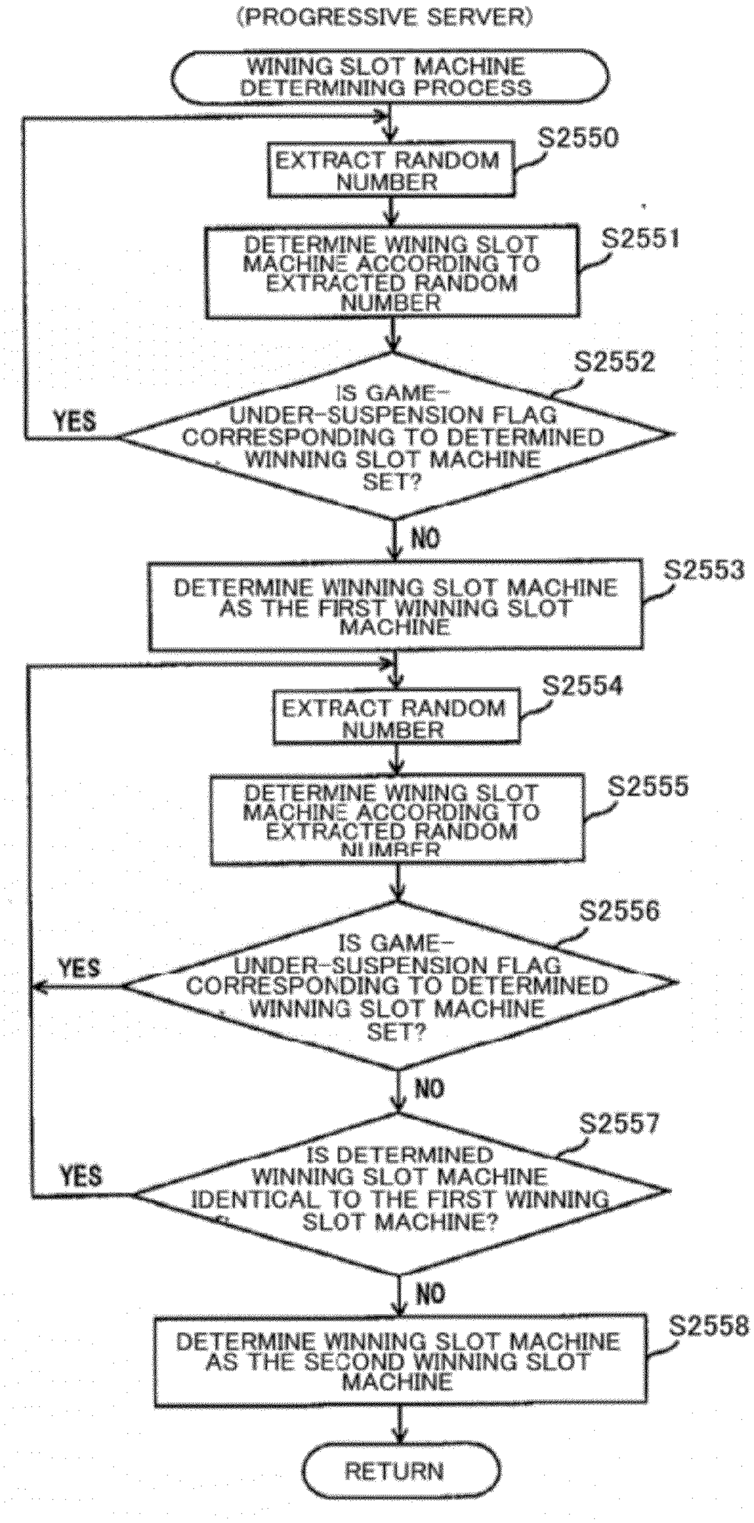
FIG. 87 is a flowchart showing a subroutine of a winning slot machine determining process.

FIG. 87 is a flowchart showing a subroutine of a winning slot machine determining process.

First of all, the CPU 2201 extracts the random number generated by the random number generator 2063 (step S2550).

Based on the random number extracted in step S2550, the CPU 2201 determines one slot machine 2010 from among the 10 slot machines 2010. Then, the CPU 2201 determines the said slot machine 2010 as the winning slot machine 2010 (step S2551).

The CPU 2201 correlates with the identification number of the winning slot machine 2010 determined in step S2551, and determines whether or not the game-under-suspension flag has been set (step S2552). When it is determined that the game-under-suspension flag has been set, the CPU 2201 returns the process to step S2550.

When it is determined in step S2552 that the game-under-suspension flag has not been set, the CPU 2201 determines the winning slot machine 2010 determined in step S2551 as the first winning slot machine 2010 (step S2553).

The CPU 2201 extracts the random number generated by the random number generator 2063 (step S2554).

Based on the random number extracted in step S2554, the CPU 2201 determines one slot machine 2010 from among the 10 slot machines 2010. Then, the CPU 2201 determines the said slot machine 2010 as the winning slot machine 2010 (step S2555).

The CPU 2201 correlates with the identification number of the winning slot machine 2010 determined in step S2555, and determines whether or not the game-under-suspension flag has been set (step S2556). When it is determined that the game-under-suspension flag has been set, the CPU 2201 returns the process to step S2554.

When it is determined in step S2556 that the game-under-suspension flag has not been set, the CPU 2201 determines whether or not the winning slot machine 2010 determined in step S2555 and the first winning slot machine 2010 determined in step S2553 are the same slot machine 2010 (step S2557). When it is determined that the slot machine 2010 is the same, the CPU 2201 returns the process to step S2554.

When it is determined in step S2557 that the slot machine 2010 is not the same, the CPU 2201 determines the winning slot machine 2010 determined in step S2555 as the second winning slot machine 2010 (step S2558).

Figure 88:
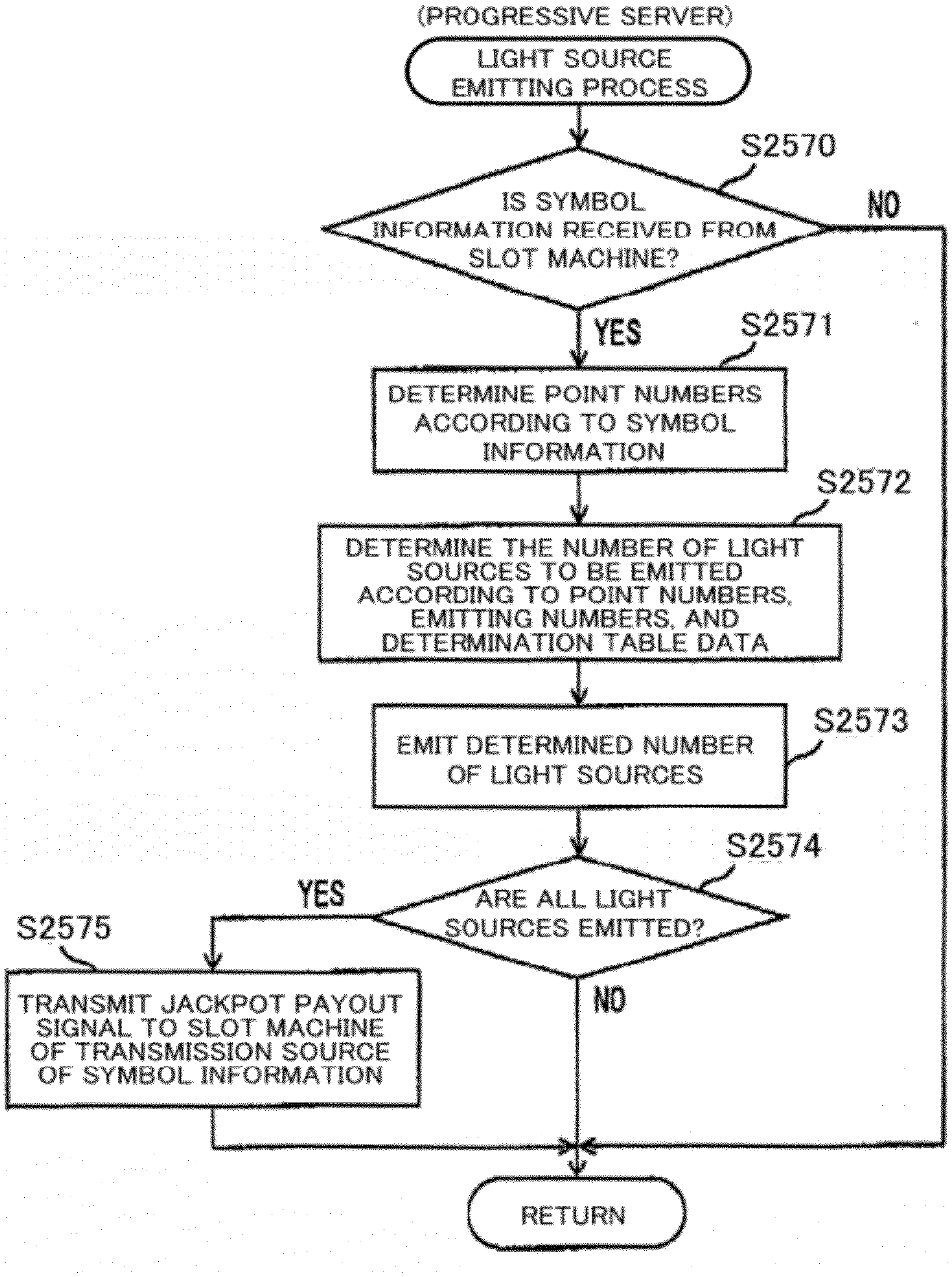
FIG. 88 is a flowchart showing a subroutine of a light source emitting process.

FIG. 88 is a flowchart showing a subroutine of a light source emitting process. First of all, the CPU 2201 determines at the predetermined timing whether or not the symbol information (see FIG. 84) is received from the slot machine 2010 via the PTS terminal 2064 (step S2570). When it is determined that the symbol information is not received, the CPU 2201 ends this subroutine.

On the other hand, when it is determined that the symbol information is received, the CPU 2201 determines the point number based on the said symbol information and the point number determination table data stored in the hard disk drive 2205 (step S2571).

FIG. 89 is a diagram showing a point number determining process.

As shown in FIG. 89, the symbols or symbol combinations rearranged on the winning line WL are associated with the point number and set in the point number determination table. For example, when one “1bar” is rearranged on the winning line WL, the CPU 2201 determines 10 as the point number.

Next, based on the determined point number and the emission count determination table data, the CPU 2201 determines the number of LEDs (light sources) 2351 that are lit up (luminescent) (step S2572).

FIG. 90A and FIG. 90B show the emission count determination tables.

In the emission count determination table, the range of the point number that can be acquired and the number of LEDs 2351 that are lit up are associated. Further, the corresponding relationship between the point number and the number of LEDs 2351 that will be lit up is associated with each slot machine 2010.

The emission count determination table comprises the bending portion-use emission count determination table (FIG. 90A) and the straight portion-use emission count determination table (FIG. 90B).

In the bending portion-use emission count determination table, the corresponding relationship between the point number and the number of LEDs 2351 that will be lit up differs depending on the slot machine 2010.

In the straight portion-use emission count determination table, the corresponding relationship between the point number and the number of LEDs 2351 that are lit up are the same for all slot machines 2010.

During the process of step S2572, first of all, the CPU 2201 determines whether or not the lit-up count indicated in the lit-up count data stored in the RAM 2203 in association with the identification number of the slot machine 2010 from which the symbol information received in step S2570 is sent is above the predetermined count (number of LEDs 2351 provided on the bending portion of the connected luminescent belt 2310).

When it is determined that the said lit-up count is above the predetermined count, the CPU 2201 determines the number of LEDs 2351 that are lit up based on the straight portion-use emission count determination table.

On the other hand, when it is determined that the said lit-up count is below the predetermined count, the CPU 2201 determines the number of LEDs 2351 that will be lit up based on the bending portion-use emission count determination table.

Next, the CPU 2201 lights up (luminescence) as many LEDs (light sources) as the determined number in the connected luminescent belt 2310 installed on the slot machine 2010 from which the symbol information received in step S2570 is sent (step S2573).

During this process, the CPU 2201 identifies the identification number of the lit up LEDs 2351 based on the number determined in step S2572, and the lit-up count indicated in the lit-up count data stored in the RAM 2203 in association with the identification number of the said slot machine 2010. Then, the CPU 2201 sends the signal including the information indicating the identified identification number to the LED drive circuit 2350. When the LED drive circuit 2350 receives the said signal, it lights up the LED 2351 having the identification number included in the signal.

Further, after sending the said signal, the CPU 2201 adds up the number determined in step S2572 to the lit-up count indicated in the lit-up count data stored in association with the identification number of the said slot machine 2010, and stores it in the RAM 2203.

Next, the CPU 2201 determines whether or not all LEDs 2351 (light sources) provided in the connected luminescent belt 2310 installed on the slot machine 2010 from which the symbol information received in step S2570 is sent are lit up (luminescent) (step S2574). During this process, the CPU 2201 determines whether or not the lit-up count after adding up the number determined in step S2572 based on the lit-up count data stored in the RAM 2203 has reached the number of LEDs 2351 provided on the connected luminescent belt 2310.

When it is determined that all LEDs 2351 provided on the connected luminescent belt 2310 installed on the slot machine 2010 from which the symbol information received in step S2570 is sent are lit up, the CPU 2201 sends the jackpot payout signal to the slot machine 2010 via the PTS terminal 2064 (step S2575).

When it is determined in step S2574 that not all LEDs 2351 are lit up, or after the process of step S2575 is executed, the CPU 2201 ends this subroutine.

Thus, according to the PTS terminal 2064 of the second embodiment and the control method thereof, if the storeable area of the hard disk drive 2246 becomes lesser than the predetermined amount (100 MB), then of the image data stored in the hard disk drive 2246, the image data set to a deletable state will be deleted. As a result, the volume of the image data stored in the hard disk drive 2246 can be reduced comparatively.

Further, when the card normal extraction signal (non-detection signal) is received after receiving the ID read signal (detection signal) from the IC card R/W 2253, the IC card is left behind. Thus, no problems occur even if image data stored during that time is erased. On the other hand, when the card normal extraction signal (non-detection signal) is not received after receiving the ID read signal (detection signal) from the IC card R/W 2253, it implies that the IC card has been left behind. However, in such a case, the image data is not erased. Consequently, it is possible to specify a player with a face by using an image of the face indicated by the image data. In this way, the volume of the image data stored in the hard disk drive 2246 can be reduced as much as possible and maintenance can be reduced to the minimum required extent, and at the same time, the image data for tracking of individuals can be acquired precisely. As a result, it is possible to apply a technology for performing the tracking of an individual by using the image of a face to a game field while maintaining convenience.

[Other Embodiments]

Next, another embodiment of the individual tracking system according to the second embodiment of the present invention is described.

Note that description of the parts common with the gaming system according to the second embodiment has been omitted. Further, the same numbers have been used for the constituent elements corresponding to the gaming system according to the second embodiment.

Figure 91:
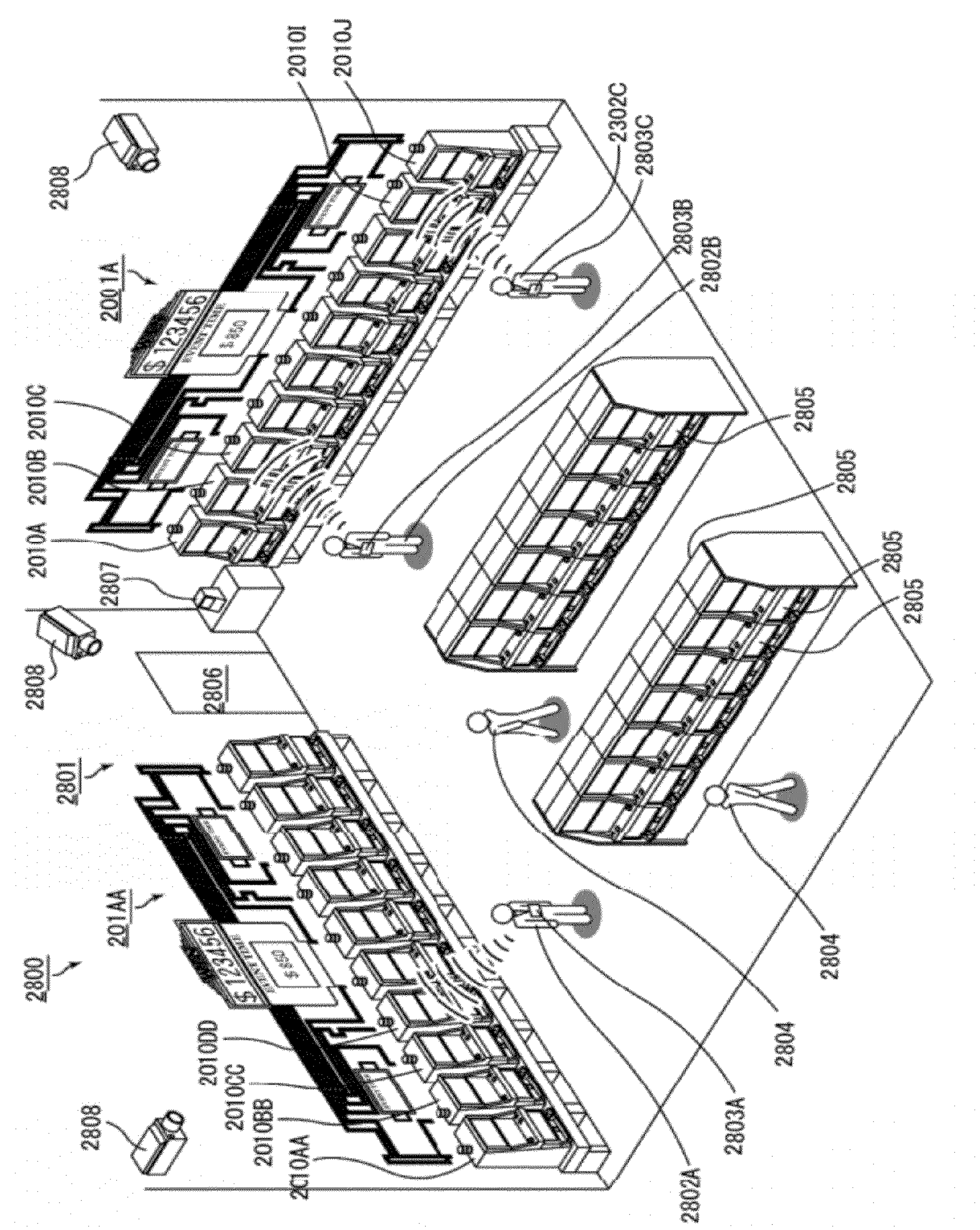
FIG. 91 is a bird's eye view schematically showing the individual tracking system according to another embodiment.

FIG. 91 is a bird's eye view schematically showing the individual tracking system according to another embodiment of the present invention.

The individual tracking system 2800 is used to manage the staff 2802 (staff 2802A, staff 2802B, and staff 2802C in FIG. 91) present inside the casino arcade 2801. In the casino arcade 2801 shown in FIG. 91, staff 2802 and customers 2804 are present. Note that casino arcade 2801 corresponds to the facility of the present invention.

This individual tracking system 2800 includes a plurality of PTS terminals 2064, a management server 2200, and a plurality of RFID-R 2255. One PTS terminal 2064 is installed within each cabinet 2011 of each slot machine 2010 installed inside the casino arcade 2801. One RFID-R 2255 is installed within each cabinet 2011 of each slot machine 2010 installed inside the casino arcade 2801. The RFID-R 2255 corresponds to the card reader of the present invention.

The RFID-R 2255 installed in each slot machine 2010 wirelessly reads out the staff ID from the staff ID card 2803 possessed by the staff 2802. Note that the staff ID is read out when the staff ID card 2803 is inserted within the attainment range of the radio waves of each RFID-R 2255. In the present embodiment, an active type RFID tag that allows communication within a distance of 10 m is used as the RFID tag provided on the staff ID card 2803.

With the staff ID read from each RFID-R 2255, the information for identifying the RFID-R 2255 and the reception strength is appended, and it is then sent to the management server 2200. In the management server 2200, based on the staff ID that is sent, the position of each RFID tag (staff) is detected. Note that the detection of the position of the RFID tag is performed by using the reception strength of the electric waves transmitted by the RFID tag provided on the staff ID card 2803 in the RFID-R 2255. The explanation of the method for detecting the position of the RFID tag by using the reception strength of the electric waves transmitted by the RFID tag in the reader is omitted here because the conventionally known methods, such as the trilateration method can be adopted.

Meanwhile, when a problem is detected in the slot machine 2010, an error signal is sent to the management server 2200. The management server 220 identifies the staff closest to the slot machine 2010 for which the error signal is output, and initiates communication with that staff through a mobile terminal device. In this way, an instruction asking to report promptly to the slot machine 2010 in which the error is detected can be issued to the staff 2802 closest to that slot machine 2010.

Furthermore, as shown in FIG. 91, an entry card reader 2807 is installed at the entry gate 2806 of the casino arcade 2801, and when the staff 2802 enters the casino arcade 2801, the staff ID is read from the staff ID card 2803 by the entry card reader 2807. Note that when read at the time of entry, the staff ID is stored in the RAM of the staff management server 2263, and when read at the time of departure, it is deleted from the RAM of the staff management server 2263. In this way, it is possible to manage the number of staff 2802 inside the casino arcade 2801, and also which staff 2802 is inside the casino arcade 2801. The staff management server 2263 corresponds to the server of the present invention.

As shown in FIG. 91, a security camera 2808 is installed inside the casino arcade 2801, which photographs the situation inside the casino arcade 2801. Furthermore, a gaming machine 2805 that provides games of a different type than the gaming system 2001 is also installed in the casino arcade 2801.

Figure 92:
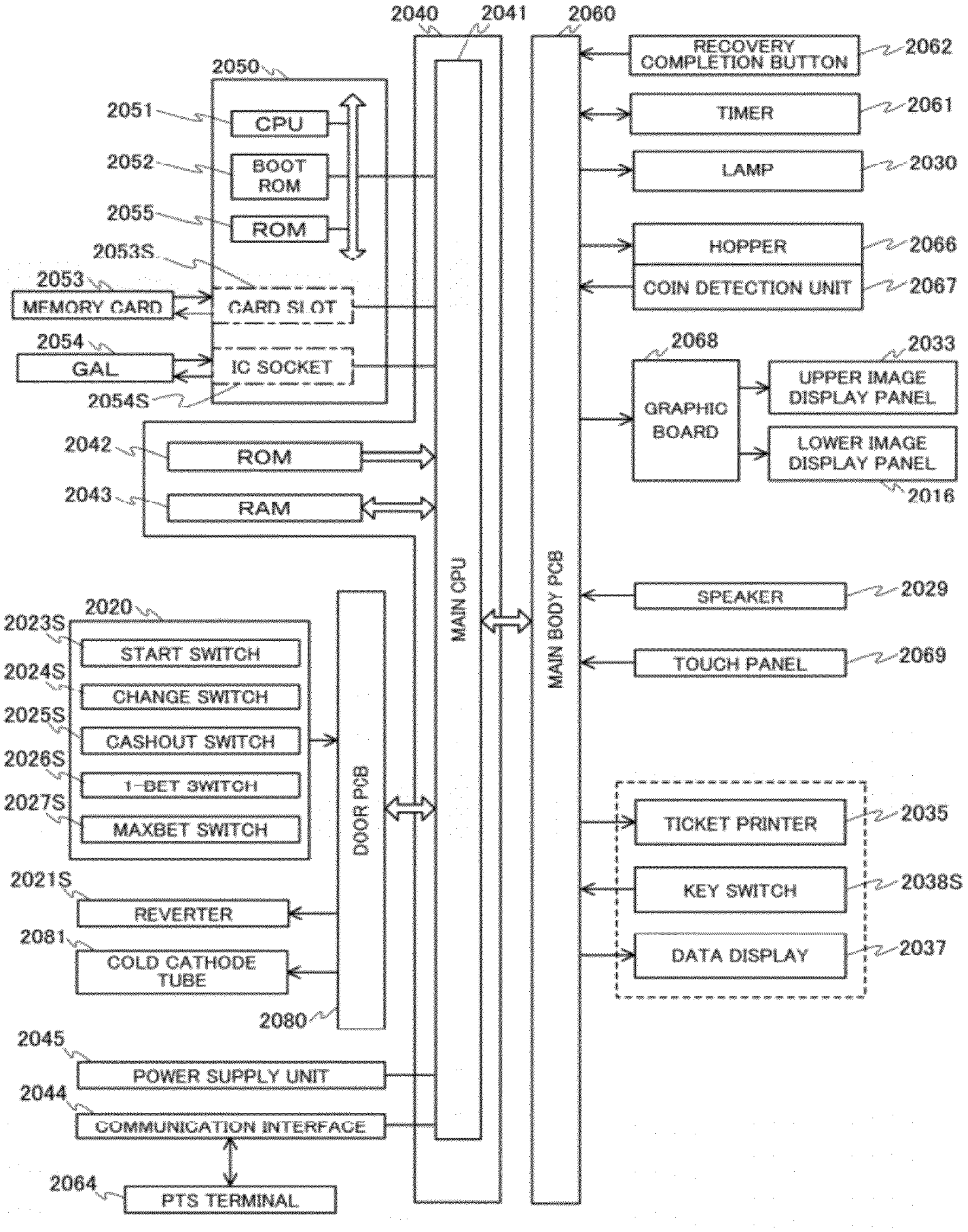
FIG. 92 is a block diagram showing the internal configuration of the slot machine according to the other embodiment.

FIG. 92 is a diagram showing the internal configuration of the slot machine according to the other embodiment of the present invention.

A recovery completion button 2062 is connected to the main body PCB 2060. The recovery completion button 2062 is installed inside the cabinet 2011, and can be operated in opening the cabinet 2011. When an error is detected in a slot machine 2010, along with the output of an error detection signal, the functions of the game are stopped. Following that, when the recovery completion button 2062 is operated by the staff, the lock on the functions of the game is released, and at the same time, a recovery completion signal is sent to the PTS terminal 2064. Note that the other configuration is the same as the slot machine according to the second embodiment, and therefore, its explanation is omitted here.

Note that the staff management server 2263 has the same configuration as that explained above in FIG. 67 and FIG. 68, and therefore, its explanation is omitted as well.

Figure 93:
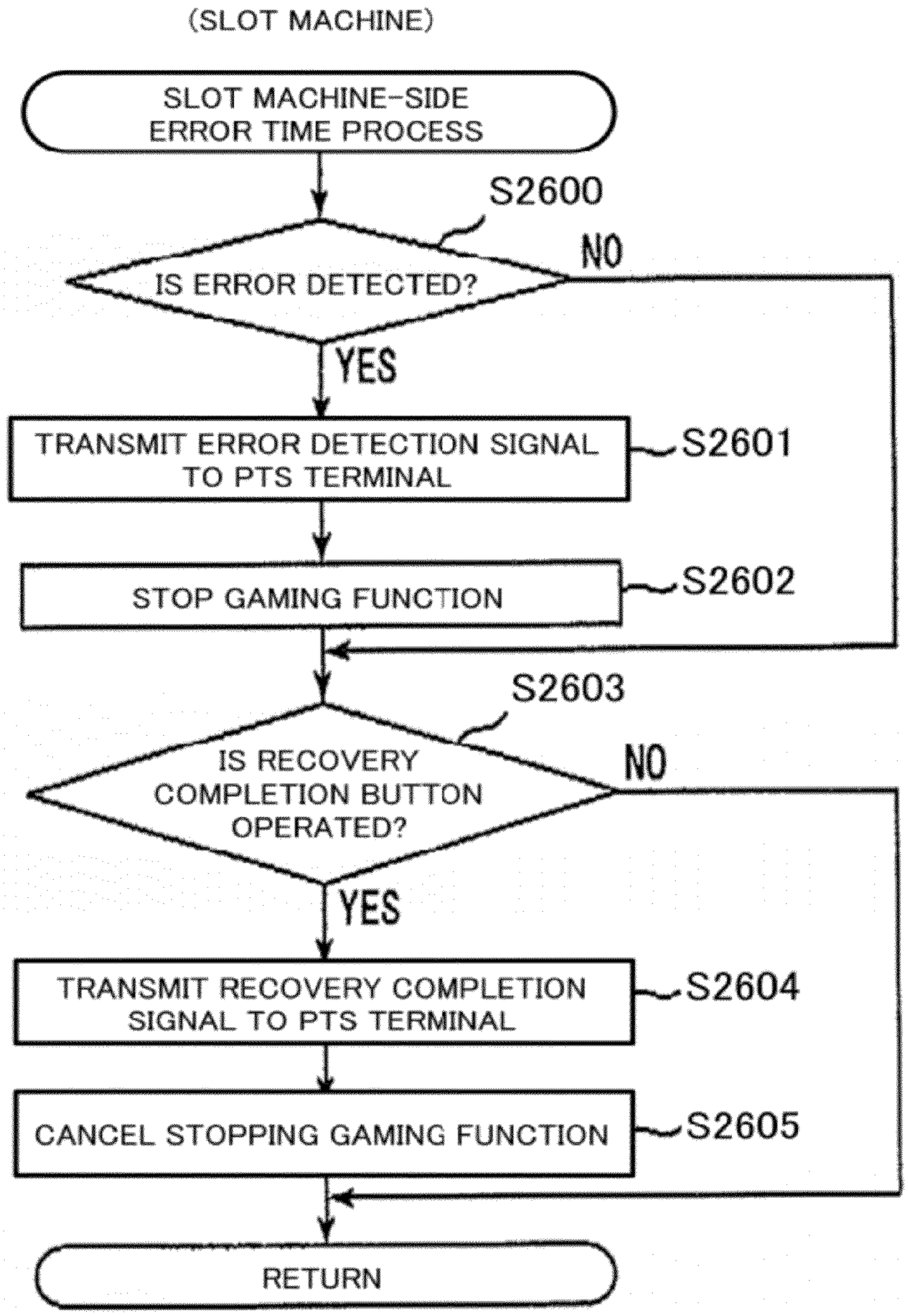
FIG. 93 is a flowchart showing a slot machine-side error time process executed in the slot machine according to the other embodiment.

FIG. 93 is a flowchart showing the slot machine-side error process executed in the slot machine according to the other embodiment of the present invention.

First of all, the main CPU 2041 provided in the slot machine 2010 determines whether or not an error is detected in step S2600. During this process, it is determined that an error is detected when the main CPU 2041 detects an impact that is more than the predetermined amount, and provides a voltage that is above the predetermined amount. Note that although not shown in the figure, sensors for detecting an impact and voltage are installed in the slot machine 2010.

When it is determined that an error is detected, the main CPU 2041 sends an error detection signal to the PTS terminal 2064 (step S2601). Next, the main CPU 2041 stops the game functions (step S2602). More specifically, the main CPU 2041 controls the input signals from the start switch 2023S in such a way that the input signals are considered undetected even when they are detected.

If it is determined in step S2600 that no error is detected, or after the process of step S2602, the main CPU 2041 determines whether or not it is detected that the recovery completion button 2062 has been operated (step S2603). When it is determined that the recovery completion button 2062 has been operated, the main CPU 2041 sends a recovery completion signal to the PTS terminal 2064 (step S2604). Next, the main CPU 2041 releases the lock on the game functions (step S2605). If it is determined in step S2603 that the recovery completion button 2062 has not been operated, or after the process of step S2605, this subroutine is ended.

Figure 94:
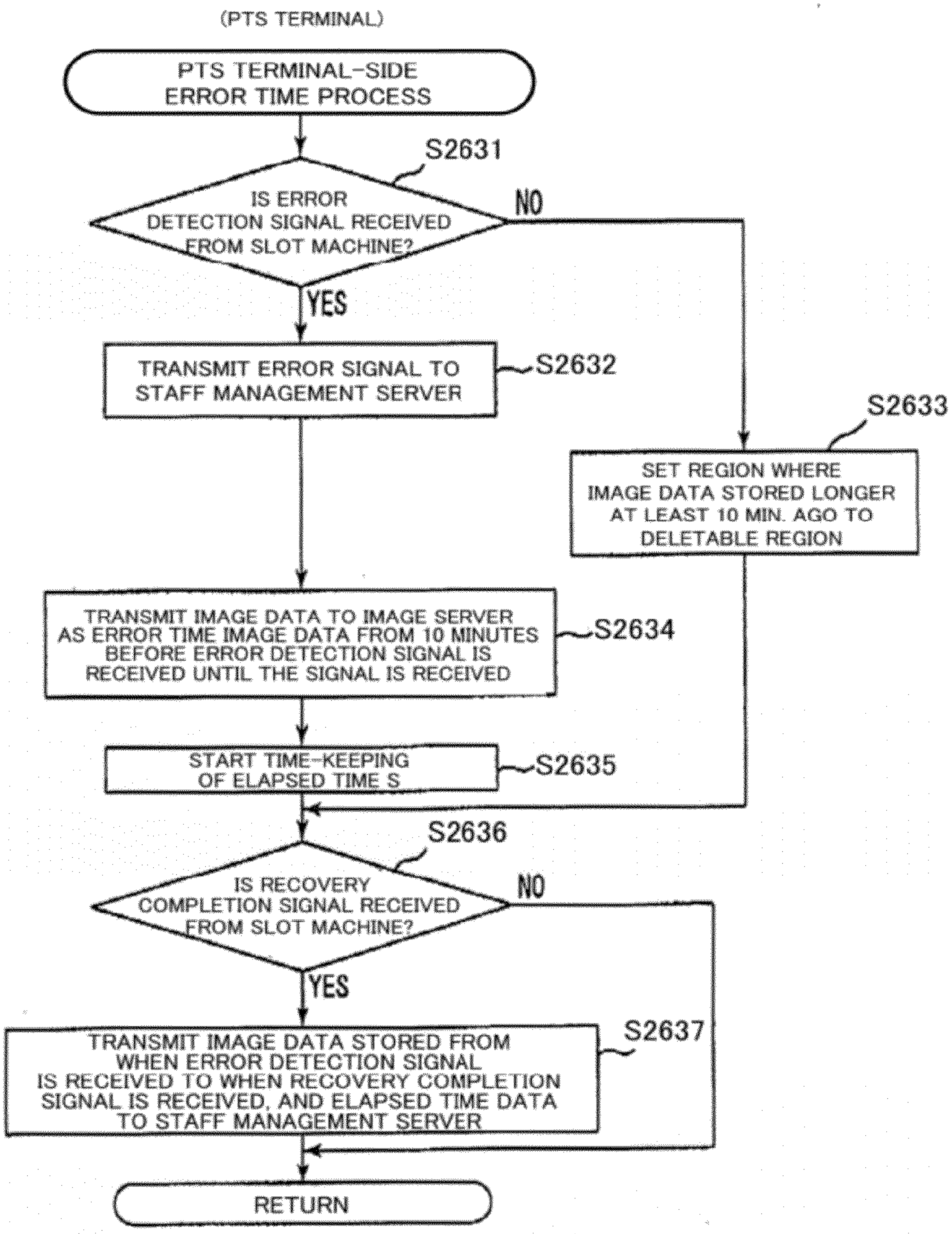
FIG. 94 is a flowchart showing a PTS terminal-side error time process executed at the PTS terminal according to the other embodiment.

FIG. 94 is a flowchart showing the PTS terminal-side error process executed in the PTS terminal according to the other embodiment of the present invention.

First of all, the CPU 2241 provided in the PTS terminal 2064 determines whether or not an error detection signal is received from the slot machine 2010 (step S2631). When it is determined that an error detection signal is received from the slot machine 2010, the CPU 2241 sends the error signal to the staff management server 2263 (step S2632).

After the process of step S2632, the CPU 2241 sends the image data stored in the hard disk drive 2246 from 10 minutes prior to the receipt of the error detection signal until after the receipt of the signal as error image data to the image server 2267 (step S2634). Thus, the player who was playing on the slot machine 2010 at the time of occurrence of the error can be identified.

After the process of the step S2634, the CPU 2241 starts clocking the elapsed time S. The elapsed time S is used to clock the time from the receipt of the error detection signal until the receipt of the recovery completion signal.

If it is determined in step S2631 that an error detection signal is not received from the slot machine 2010, the CPU 2241, sets the area of the hard disk drive 2246 on which the image data stored 10 minutes or earlier from the current time is stored to a deletable region (step S2633).

After the process of step S2633 or step S2635, the CPU 2241 determines whether or not a recovery completion signal is received from the slot machine 2010 (step S2636). When it is determined that a recovery completion signal is received from the slot machine 2010, the CPU 2241 sends the image data stored in the hard disk drive 2246 from the receipt of the error detection signal up to the receipt of the recovery completion signal, and the elapsed time data indicated by the elapsed time S to the staff management server 2263 (step S2637). If it is determined in step S2636 that the recovery completion signal is not received from the slot machine 2010, or after the process of step S2637, this subroutine is ended.

Figure 95:
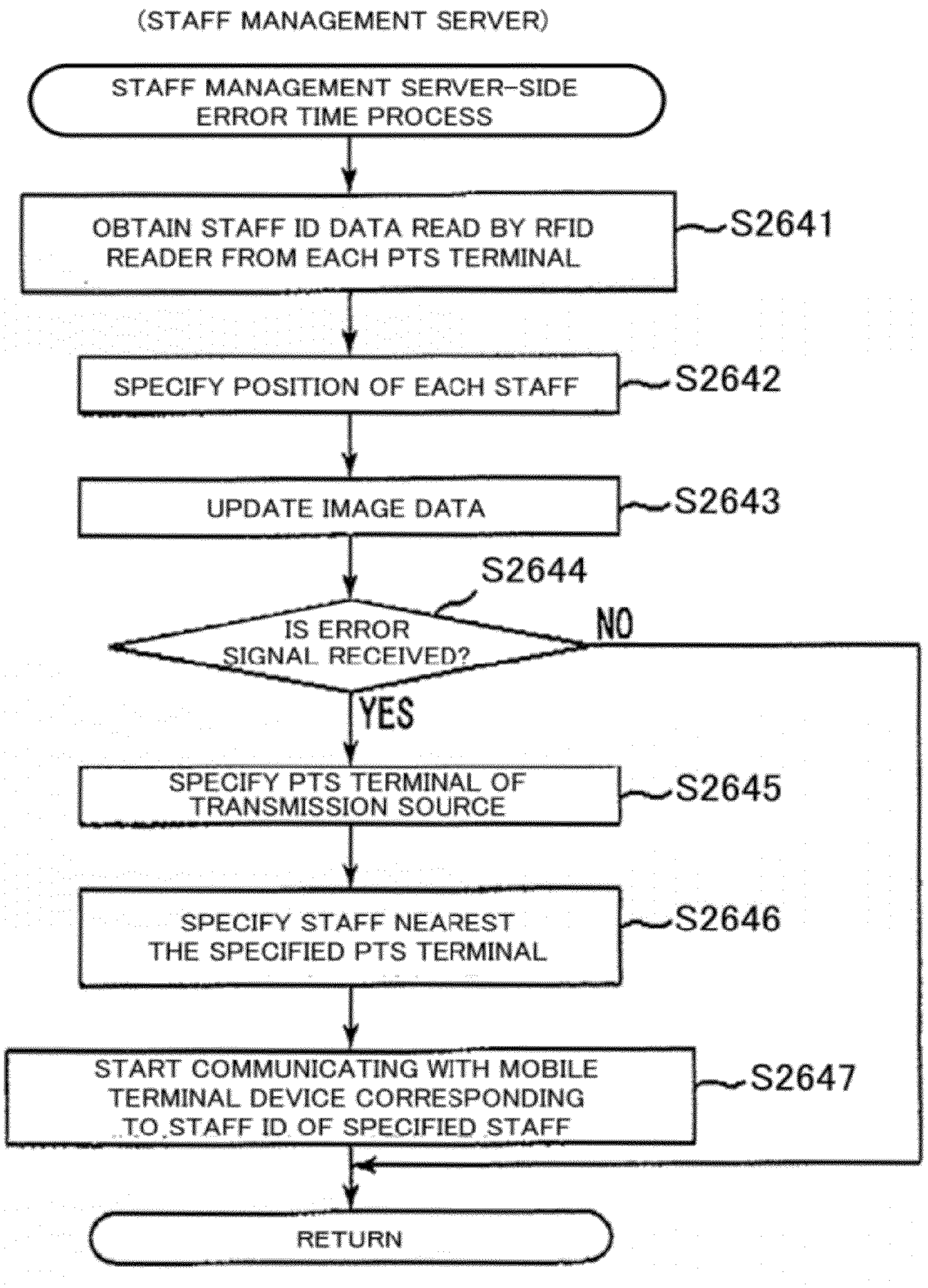
FIG. 95 is a flowchart showing a staff management server-side error time process executed in the staff management server according to the other embodiment.

FIG. 95 is a flowchart showing a staff management server-side error time process executed in the staff management server according to the other embodiment of the present invention. First of all, the CPU 2501 provided in the staff management server 2263 acquires the staff ID data read by the RFID-R 2255 connected to each PTS terminal 2064 (step S2641). Note that the information for identifying the RFID-R 2255 that reads the staff ID and the reception strength are appended to the acquired staff ID.

Next, the CPU 2501 identifies the position of each staff ID card 2803 (each staff 2802) inside the casino arcade 2801 based on the acquired staff ID data (step S2642). During this process, the CPU 2501 identifies the position of each staff ID card 2803 by using the trilateration method based on each staff ID detected by each RFID-R 2255, and its reception strength.

Next, the CPU 2501 updates the image of the display 2506 (step S2643).

Figure 96:
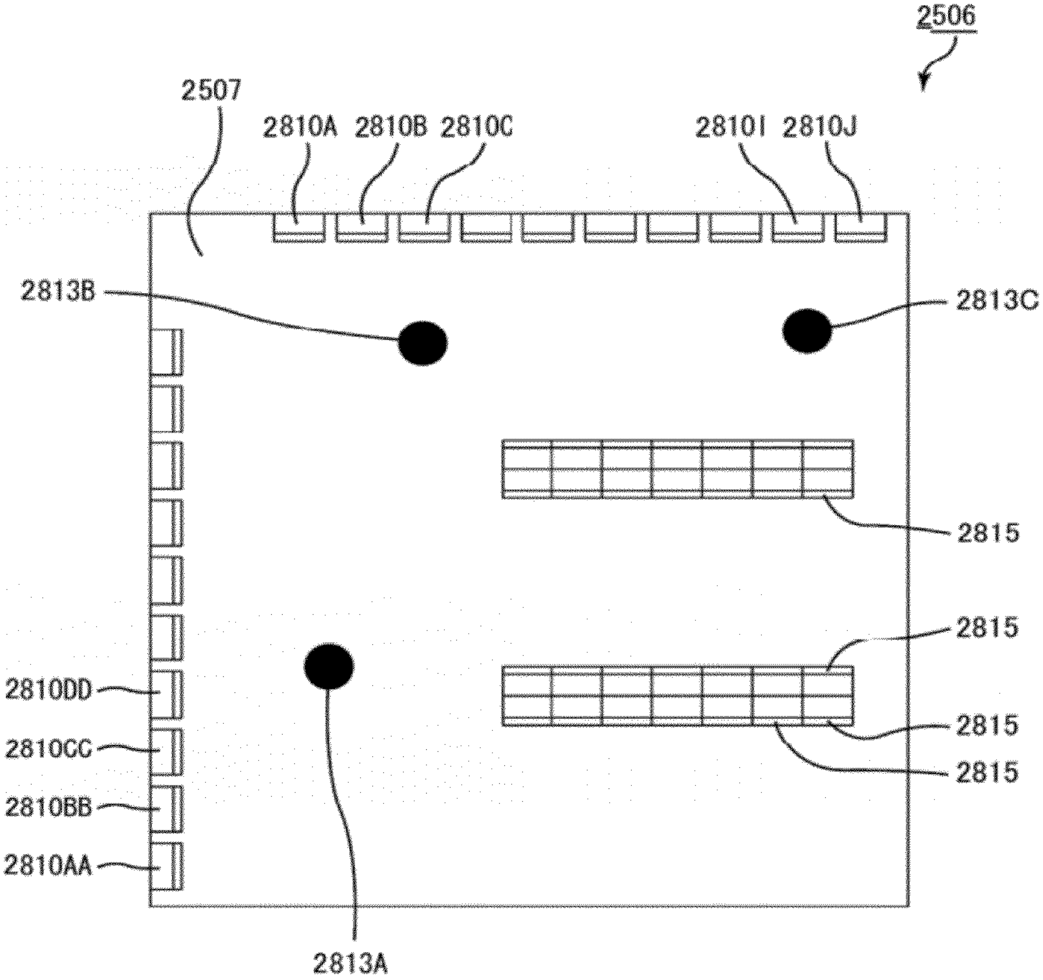
FIG. 96 is a diagram showing one example of an image displayed on a display provided in the staff management server.

FIG. 96 is a diagram showing one example of an image displayed on a display provided in the staff management server.

As shown in FIG. 96, the display 2506 displays an image illustrating the situation when the casino arcade 2801 is viewed from the top. On the upper side of the display 2506, images 2810A to 2810J corresponding to the slot machines 2010A to 2010J are displayed. Further, on the left side of the display 2506, images 2810AA to 2810JJ corresponding to the slot machines 2010AA to 2010JJ are displayed. Further, towards the right of the center of the display 2506, images 2815 corresponding to each gaming machine 2805 are displayed.

An image 2813 formed by a black circle is displayed at the position corresponding to the location of the staff ID card 2803 inside the casino arcade 2801. More specifically, the image 2813A is displayed at the position corresponding to the location of the staff ID card 2803A owned by the staff 2802A shown in FIG. 91. Further, the image 2813B is displayed at the position corresponding to the location of the staff ID card 2803B owned by the staff 2802B. Further, the image 2813C is displayed at the position corresponding to the location of the staff ID card 2803C owned by the staff 2802C.

During the process of step S2643, the CPU 2501 updates and displays the image 2813 at the predetermined time interval based on the position of the staff ID card 2803 identified during the process of step S2642.

After the process of step S2643, the CPU 2501 determines whether or not an error signal is received from the PTS terminal 2064 (step S2644). When it is determined that an error signal is received from the PTS terminal 2064, the CPU 2501 identifies the source from where the error signal is sent based on the PTS terminal identification data for identifying the PTS terminal 2064 that is sent along with the error signal (step S2645).

Next, in step S2646, the CPU 2501 identifies the staff ID card 2803 (staff 2802) that is closest to the identified PTS terminal 2064. For example, when an error signal is sent from the PTS terminal 2064 connected to the slot machine 2010C, the staff ID card 2803B (staff 2802B) is identified as the closest staff ID card 2803 (staff 2802) to the slot machine 2010C.

Next, in step S2647, the CPU 2501 initiates communication with the mobile terminal device corresponding to the staff ID of the identified staff ID card 2803. For example, when the staff ID card 2803B (staff 2802B) is identified, communication is initiated with the mobile terminal device corresponding to the staff ID "002" stored in the staff ID card 2803B (see FIG. 28). If it is determined in step S2644 that an error signal is not received, or after the process of step S2647, this subroutine is ended.

Note that a touch panel 2507 is disposed on the front face of the display 2506 shown in FIG. 32, and by touching the image 2813 formed by a black circle showing the location of the staff, communication with the mobile terminal device corresponding to the image 2813 can be initiated.

Thus, according to the PTS terminal 2064 of the second embodiment and the control method thereof, if the storeable area of the hard disk drive 2246 becomes lesser than the predetermined amount (100 MB), then of the image data stored in the hard disk drive 2246, the image data set to a deletable state will be deleted. As a result, the volume of the image data stored in the hard disk drive 2246 can be reduced comparatively.

Further, even for image data for which the time period since storing in the hard disk drive 2246 has exceeded 10 minutes (predetermined time period), if an error detection signal is received during that period, the image data is not deleted. That is, image data of an image, which is photographed until abnormality is detected at a time preceding a predetermined period for which the abnormality is detected, is not erased. During this period, there is a large possibility of photographing images of the player who has been performing behaviors that may lead to detection of an error. Consequently, since such image data is not erased, it is possible to specify a player with a face by using an image of the face indicated by the image data and to specify a player exhibiting abnormal behavior.

In this way, the volume of the image data stored in the hard disk drive 2246 can be reduced as much as possible and maintenance can be reduced to the minimum required extent, and at the same time, the image data for tracking of individuals can be acquired precisely. As a result, it is possible to apply a technology for performing the tracking of an individual by using the image of a face to a game field while maintaining convenience.

Further, according to the individual tracking system 2800 of the other embodiment, and the control method of the individual tracking system 2800 of the other embodiment, the staff management server 2263 initiates communication with the mobile terminal device possessed by the staff who is closest to the slot machine 2010 for which an error detection signal is output. In this way, an instruction asking to report promptly to the game machine 1010 for which an error detection signal is output can be issued to the staff closest to that slot machine 2010.

Furthermore, the time period taken up to recovery from the time an error was detected in a slot machine 2010 (time period from the receipt of an error detection signal up to the receipt of the recovery completion signal), and the image data showing images of the face of the staff who had performed the task during that time period are sent to the staff management server 2263. As a result, it can be checked if any person posing as a staff member had performed the task. Further, it is also possible to evaluate which slot machine 2010 takes the least time up to recovery.

In the second embodiment described above, the explanation is provided for the case wherein the predetermined condition for the present invention is that the image data is not that of images photographed from the time of receipt of an ID read signal up to the time of receipt of a card normal extraction signal.

Further, in the other embodiment described above, the explanation is provided for the case wherein the predetermined condition of the present invention is that the image data is not the one which has exceeded the predetermined time period (10 minutes in the other embodiment) since the time of storing in the hard disk drive 2246, and no error detection signal is received.

However, the predetermined conditions for the present invention are not limited to those described above.

The predetermined conditions for the present invention can even be conditions wherein it can be determined that it would be better not to delete the image data, for example, the image data must not be the image data of images photographed within the predetermined time period including the timing of achievement of a winning when payment equal to or more than the predetermined amount occurs.

In the other embodiment, the explanation is provided for the case wherein one RFID-R 2255, which is considered as the card reader, is installed on each slot machine 2010, however, the present invention is not limited to this example, and the RFID-R 2255 may be installed on the walls and floor of the facility, for example.

In the embodiments described above, the explanation is provided for the case wherein one PTS terminal 2064 (individual tracking device) is connected to each slot machine 2010 (gaming machine). However, the present invention is not limited to this example, and one individual tracking device may be connected to a plurality of gaming machines.

In the embodiments described above, the explanation is provided for the case wherein the facility of the present invention is a casino arcade 2801. However, the facility of the present invention is not limited thereto, and various facilities where deployment of staff (employees) is required, such as sports facilities like baseball parks and soccer parks, and event facilities where cars and houses are exhibited are also applicable, for example.

In the embodiments described above, the explanation is provided for the case wherein the gaming machine of the present invention is a slot machine 2010, however, the gaming machine of the present invention is not limited thereto, and gaming machines used to play card games like poker and shooting games, as well combat sports are also applicable, for example.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process executed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes executed in the steps or blocks, these processes are essentially executed by various devices. Further, the other structures necessary for the steps or blocks are obvious from the above descriptions.

Thus, according to the individual tracking system 2800 of the present embodiment and the control method thereof, the face image data of persons for whom the staff ID data is not read, in other words, the face image data of persons who do not possess a staff ID card 2803 in which the staff ID data is stored, as well as the staff ID data of such persons is displayed on the display 2506. As a result, the persons for whom the staff ID data is not read (persons who do not possess a staff ID card 2803) can be identified.

In the embodiments described above, the explanation is provided for the case wherein only staff is present inside the casino arcade.

Next, the explanation is provided for a case wherein staff and customers are present inside the casino arcade. Note that other than the fact that the staff management process is different, the configuration is almost same as the individual tracking system according to the above embodiments, and therefore, the explanation is omitted hereinafter for parts that are common with the individual tracking system according to the above embodiments. Further, the same numbers have been used for the constituent elements corresponding to the individual tracking system according to the above embodiments.

Figure 97:
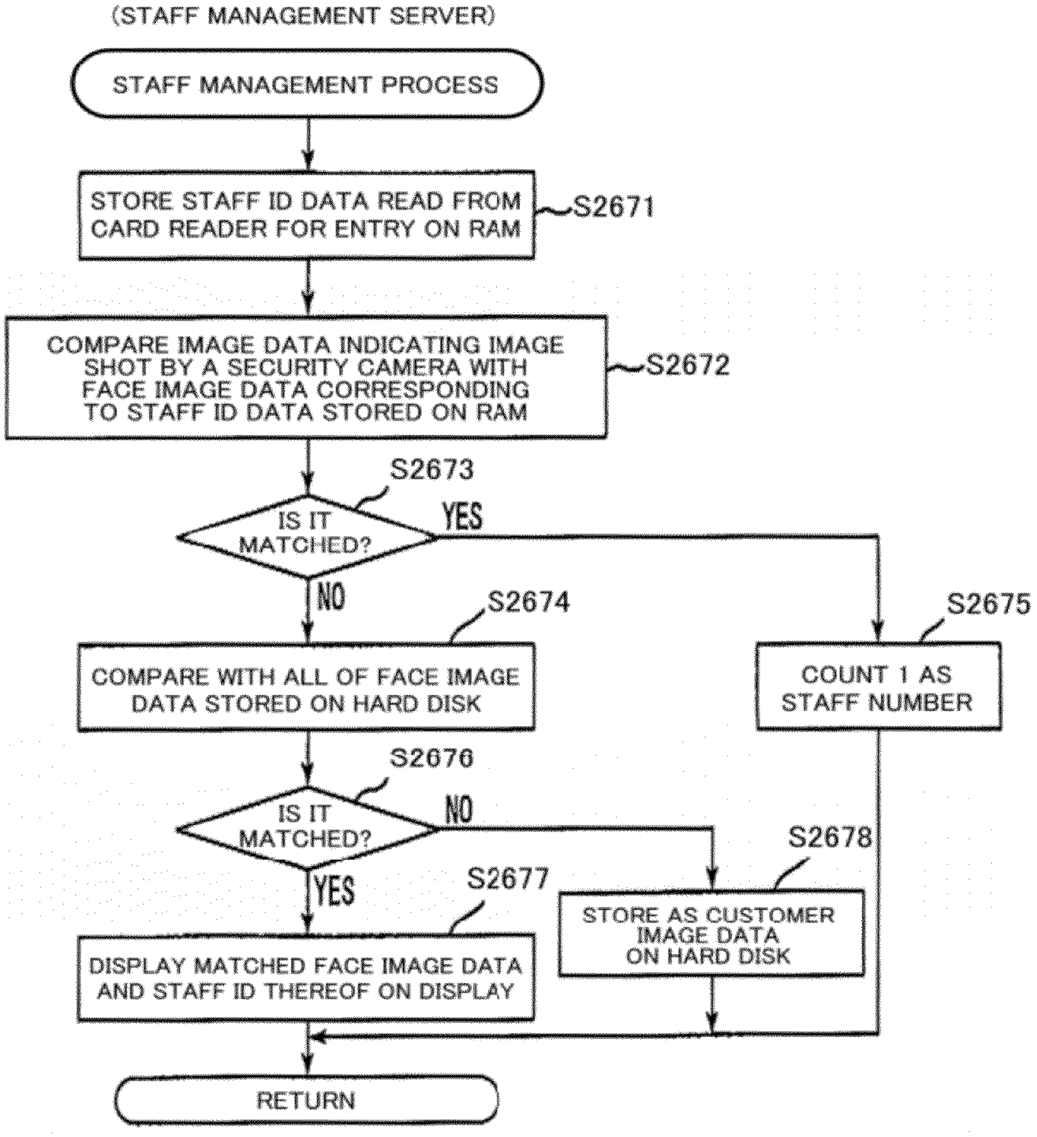
FIG. 97 is a flowchart showing a staff management process executed in the staff management server according to the other embodiment.

FIG. 97 is a flowchart showing a staff management process executed in the staff management server according to a still another embodiment of the present invention.

First of all, the CPU 2501 provided in the staff management server 2263 stores the staff ID data read from the staff ID card 2803 by using the entry card reader 2807 in the RAM 2503 (step S2671).

Next, the CPU 2501 compares the image data sent from the security camera 2808 with the face image data corresponding to the staff ID data that is already stored in the RAM 2503 in step S2671, and determines whether the standard for judging that the person indicated by the face image data matches the person indicated by the image data is fulfilled (step S2672).

When it is determined that the standard for judging that the person indicated by the face image data matches the person indicated by the image data is fulfilled (step S2673: YES), the CPU 2501 counts 1 as the staff count. Note that the face image data that is included in the staff count is removed from the comparison target in step S2672. Thus, the same face image data is prevented from being counted twice as staff count.

On the other hand when it is determined that the standard for judging that the person indicated by the face image data matches the person indicated by the image data is not fulfilled (step S2673: NO), the CPU 2501 compares the image data sent from the security camera 2808 with the entire face image data stored in the hard disk drive 2505, and determines whether or not the standard for judging that the person indicated by the face image data matches the person indicated by the image data is fulfilled (step S2674).

When it is determined that the standard for judging that the person indicated by the face image data matches the person indicated by the image data is fulfilled (step S2676: YES), the CPU 2501 displays the image based on the face image data that is judged as matching and the staff ID associated with that face image data on the display 2506 (step S2677).

On the other hand when it is determined that the standard for judging that the person indicated by the face image data matches the person indicated by the image data is not fulfilled (step S2676: NO), the CPU 2501 stores the image data (image data sent from the security camera 2808) in the hard disk drive 2505 as customer image data. At this point, the CPU 2501 further sends the customer image data to the image server 2267. As a result, the customer image data is managed within the image server 2267 as well. This subroutine is ended after the process of the step S2675, step S2677, or step S2678.

According to the individual tracking system 2800 described above, and also according to the control method of the individual tracking system 2800, the customer image data is stored in the hard disk drive 2246, and therefore, it can be checked what sort of a customer was inside the casino arcade 2801. Further, the face image data of persons for whom the staff ID data is not read, in other words, the face image data of persons who do not possess a staff ID card 2803 in which the staff ID data is stored, as well as the staff ID data of such persons are displayed on the display 2506. As a result, the persons for whom the staff ID data is not read (persons who do not possess a staff ID card 2803) can be identified.

In the present embodiment, the explanation is provided for the case wherein the face image data of persons who do not possess a staff ID card 2803 in which the staff ID data is stored, as well as the staff ID data of such persons are displayed on the display 2506. However, the present invention is not limited to this example, and only the face image data, or only the staff ID data may be displayed.

In the present embodiment, the explanation is provided for the case wherein the output device of the present invention is the display 2506.

However, the output device of the present invention is not limited thereto, and a printing device is also applicable. In such a case, a printout of the face image, and/or the staff ID can be output. Further, the output device can also be a sound output device, such as a speaker. In such a case, the staff ID may be output.

In the present embodiment, the explanation is provided for the case wherein the customer image data is stored in the hard disk drive 2246. However, the present invention is not limited thereto, and the customer image data may even be deleted. This is because, by doing so, free space can be acquired in the hard disk drive 2246.

In the embodiments described above, the explanation is provided for the case wherein the facility of the present invention is a casino arcade 2801. However, the facility of the present invention is not limited thereto, and various facilities where deployment of staff (employees) is required, such as sports facilities like baseball parks and soccer parks, and event facilities where cars and houses are exhibited are also applicable, for example.

In the embodiments described above, the explanation is provided for the case wherein the gaming machine of the present invention is a slot machine 2010, however, the gaming machine of the present invention is not limited thereto, and gaming machines used to play card games like poker and shooting games, as well combat sports are also applicable, for example.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process executed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes executed in the steps or blocks, these processes are essentially executed by various devices. Further, the other structures necessary for the steps or blocks are obvious from the above descriptions.

Thus, according to the gaming system 2001 of the present embodiment, and the control method thereof, in the PTS terminal 2064, when bill is accepted in the exchange bill validator 2065, the converted currency amount data indicating the amount of the basic currency (for example, 1 dollar) identified based on the type of the corresponding currency (for example, Japanese currency), amount of the currency (for example, 100 yen), and currency exchange rate is sent to the motherboard 2040 provided on the slot machine 2010. Then, the game is played on the slot machine 2010 based on the sent converted currency amount data. Consequently, a player can play the game by using various types of currency different from one another such as currency in USA and currency in Japan. Therefore, even if the basic currency (American currency) available with the player were to get over, the player would not have to exchange other currencies into the basic currency, and could continue his/her game by using other currencies (for example, Japanese currency) that he/she may be having. In this way, it is possible to prevent the player from feeling inconvenience. Furthermore, when all basic currency on hand is spent, it is possible to reduce the probability that a player will stop the game and to adjust environments in which a player can easily play the game for a long time without inconvenience.

According to the gaming system 2001 of the present embodiment, and the control method thereof, when bill is accepted in the exchange bill validator 2065, the amount of the corresponding currency (for example, 100 yen) is converted to the amount of the basic currency (for example, 1 dollar) based on the type of the corresponding currency (for example, Japanese currency), amount of the currency, and the currency exchange rate, by the PTS terminal 2064.

Therefore, even when a gaming system 2001 that enables payout for a progressive jackpot is set up, the amount of money can be pooled based on the amount of the basic currency thus obtained through conversion, and this does not lead to any particular warning as such.

Further, according to the gaming system 2001 of the present embodiment and the control method thereof, when bill is accepted in the exchange bill validator 2065, the game is executed by assuming the amount of currency obtained by deducting the amount of basic currency corresponding to the predetermined commission from the amount of the basic currency indicated by the converted currency amount data as the BET value. Further, the CPU 2201 provided in the progressive server 2266 performs cumulative counting of the amount of the basic currency corresponding to the predetermined commission as the cumulative value for bonus. Thus, when the predetermined progressive payout condition is established, the game medium is paid out to any one slot machine 2010 from among a plurality of slot machines 2010 based on the cumulative value for bonus.

In other words, according to the above-mentioned gaming system 2001, by using currencies of various types other than the basic currency, the amount of basic currency corresponding to the predetermined commission is pooled as the cumulative value for bonus. Thus, when the predetermined progressive payout condition is established, bonus funded from the predetermined commission is presented to any one slot machine 2010 from among a plurality of slot machines 2010 at the time of using a currency of a type other than the basic currency. By providing bonus having a difference in funds as compared with the conventional game, the interest of game can be increased.

In the present embodiment, the explanation is provided for the case wherein the basic currency is the American currency, however, the basic currency of the present invention is not particularly limited, and the currency of the country in which the gaming system of the present invention is installed can also be used as the basic currency.

In the present embodiment, the explanation is provided for the case wherein the progressive server 2266 performs cumulative counting of the cumulative value for bonus, however, in the present invention, the slot machine can also perform cumulative counting of the cumulative value for bonus.

More specifically, the CPU 2241 provided in the PTS terminal 2064 sends the exchange commission data to the corresponding slot machine 2010 in the money receiving process. When the exchange commission data is received, the main CPU 2041 provided in the slot machine 2010 adds up the number of coins corresponding to the currency amount indicated in the received exchange commission data to the cumulative value for bonus indicated in the cumulative value data for bonus stored in the RAM 2043, and then sets the numeric value obtained from addition as the new cumulative value for bonus and stores this data in the RAM 2043. Then, when the main CPU 2041 determines that the cumulative value for bonus indicated in the cumulative value data for bonus stored in the RAM 2043 has reached a specific value, coins are paid out.

When such a configuration is set up, a person can himself/herself receive the bonus based on the cumulative value for bonus accumulated by self, and therefore, the feeling of unfairness among the players can be avoided. Further, the more the currencies other than the American currency are used, the higher the cumulative value for bonus gets, and therefore, the player can be actively urged to use currencies other than the American currency.

In the present embodiment, the explanation is provided for the case wherein the currency exchange rate is the same for all players, however, in the present invention, different currency exchange rates can also be offered to different players. For example, if the data for identifying the player stored in the IC card inserted in the IC card R/W 2253 matches the loyal customer data stored in the member management server 2264, a favorable treatment can be given to the currency exchange rate.

Further, for example, if it is determined from the data related to the history of the games played by the player stored in the IC card inserted in the IC card R/W 2253 that the amount of money lost by the player is above a fixed amount of money, a favorable currency exchange rate may be offered.

In the present embodiment, the explanation is provided for the case wherein the entire amount of the exchange commission is counted as the cumulative value for bonus, however, in the present invention, a part of the exchange commission can also be counted as the cumulative value for bonus. In such a case, for example, with the condition that the basic currency unit amount for which the exchange commission is already predetermined does not double up naturally, the broken number amount obtained by dividing the exchange commission with the basic currency unit amount is counted in a cumulative manner as the cumulative value for bonus.

In such a configuration, for example, when the exchange commission is 2.75 dollars, the broken number amount 0.75 dollar obtained by dividing 2.75 dollar with the basic currency unit amount of 1 dollar is counted as the cumulative value for bonus. Further, when the exchange commission is 2.0 dollars, counting of the cumulative value for bonus is not performed.

In the present embodiment, the explanation is provided for the case wherein the predetermined progressive payout condition is that the cumulative value for bonus must reach a specific value, however, in the present invention, the predetermined progressive payout condition is not particularly restricted. For example, the passage of a predetermined time period since the establishment of the last progressive payout condition can also be assumed as the predetermined progressive payout condition.

In the present embodiment, the explanation is provided for the case wherein the symbols rearranged in the display blocks 2028 are symbols that decide a winning when rearranged on the winning line WL, however, the symbols of the present invention can be scatter symbols as well. Further, for example, symbols that determine a winning when rearranged on the winning line WL and scatter symbols may be combined.

Further, in the present embodiment, the explanation is provided based on the fact that the point number is determined in the progressive server 2266. However, in the present invention, the point number may be determined in the slot machine 2010, and then the information showing the determined point number may be sent to the progressive server 2266.

Further, in the present embodiment, the explanation is provided for the case wherein out of the 10 slot machines 2010, one slot machine 2010 is determined, however, the method of determining the winning gaming machine of the present invention is not particularly limited as long as the method is based on a random number, for example, one gaming machine from among the gaming machines on which games are being played can be determined.

Further, in the present embodiment, the explanation is provided for separate cases of the first winning slot machine 2010 and the second winning slot machine 2010, however, in the present invention, the first winning slot machine 2010 and the second winning slot machine 2010 can even be the same machine.

Furthermore, in the present embodiment, the explanation is provided for the case wherein the winning slot machines 2010 are two in number, however, in the present invention, the number of the winning slot machine 2010 is not particularly restricted, for example, there may be one winning machine.

Further, in the present embodiment, the explanation is provided for the case wherein the number of LEDs 2351 that are lit up when the number of currently lit up LEDs 2351 is below the predetermined count (number of LEDs 2351 provided on the bending portion of the connected luminescent belt 2310) is determined based on the bending portion-use emission count determination table data, and the number of LEDs 2351 that are lit up when the number of currently lit up LEDs 2351 is above the predetermined count (number of LEDs 2351 provided on the bending portion of the connected luminescent belt 2310) is determined based on the straight portion-use emission count determination table data. In such a case, the configuration must be such that the number of lit up LEDs for point number "1" must be more on the bending portion than on the straight section. This is because if such a configuration were to be adopted, the expectation of acquiring a large point number immediately before the lit-up count of LEDs reaches the predetermined count can be raised among the players.

Further, in the present embodiment, the explanation is provided for the case wherein the game contents of the common game indicate that it is a game (regular slot machine game) whose game results are determined based on the rearranged symbols. However, in the present invention, the game contents of the common game are not limited thereto, and a game different from a slot machine can also be played. For example, games like card games such as poker and shooting games, as well combat sports can also be played. In such a case, the configuration must be such that two players can compete with each other. This is because the competitive spirit of the player can be increased, and the player can get engrossed in a common game.

For example, the following configuration can be adopted.

In other words, a gaming machine can store programs for executing such common games. When a common game running signal is received, each gaming machine reads out and executes the program. Further, the information indicating the results of the common game is sent to the progressive server 2266. By comparing the results of the common game in each gaming machine based on the information, the progressive server 2266 determines the number of LEDs to be lit up in the connected luminescent belt installed in each gaming machine.

Furthermore, in the present embodiment, the explanation is provided for the case wherein the number of slot machines 2010 is 10, however, in the present invention, the number of the gaming machines is not particularly restricted, for example, there may be 50 gaming machines.

Furthermore, in the present embodiment, the explanation is provided for the case wherein the number of the small common display 2301 is two, however, in the present invention, the number of the small common display is not particularly restricted, for example, there may be three small common displays.

Further, in the present embodiment, the explanation is provided for the case wherein the gaming machine is a slot machine 2010, however, in the present invention, the type of the gaming machine is not particularly restricted, and a card game machine can also be used, for example.

In the embodiments described above, the explanation is provided for the case wherein the bonus funded from the exchange commission can be presented even to players who do not use any currency other than the basic American currency, however, the bonus funded from the exchange commission can also be presented only to players who use a currency other than the basic American currency.

Note that hereinafter, the same numbers have been used for the constituent elements that are same as the constituent elements of the gaming system 2001 according to the embodiments described above.

Further, the explanation has been omitted below in the following embodiment for parts to which the explanation provided for the above embodiments is applicable.

Figure 98:
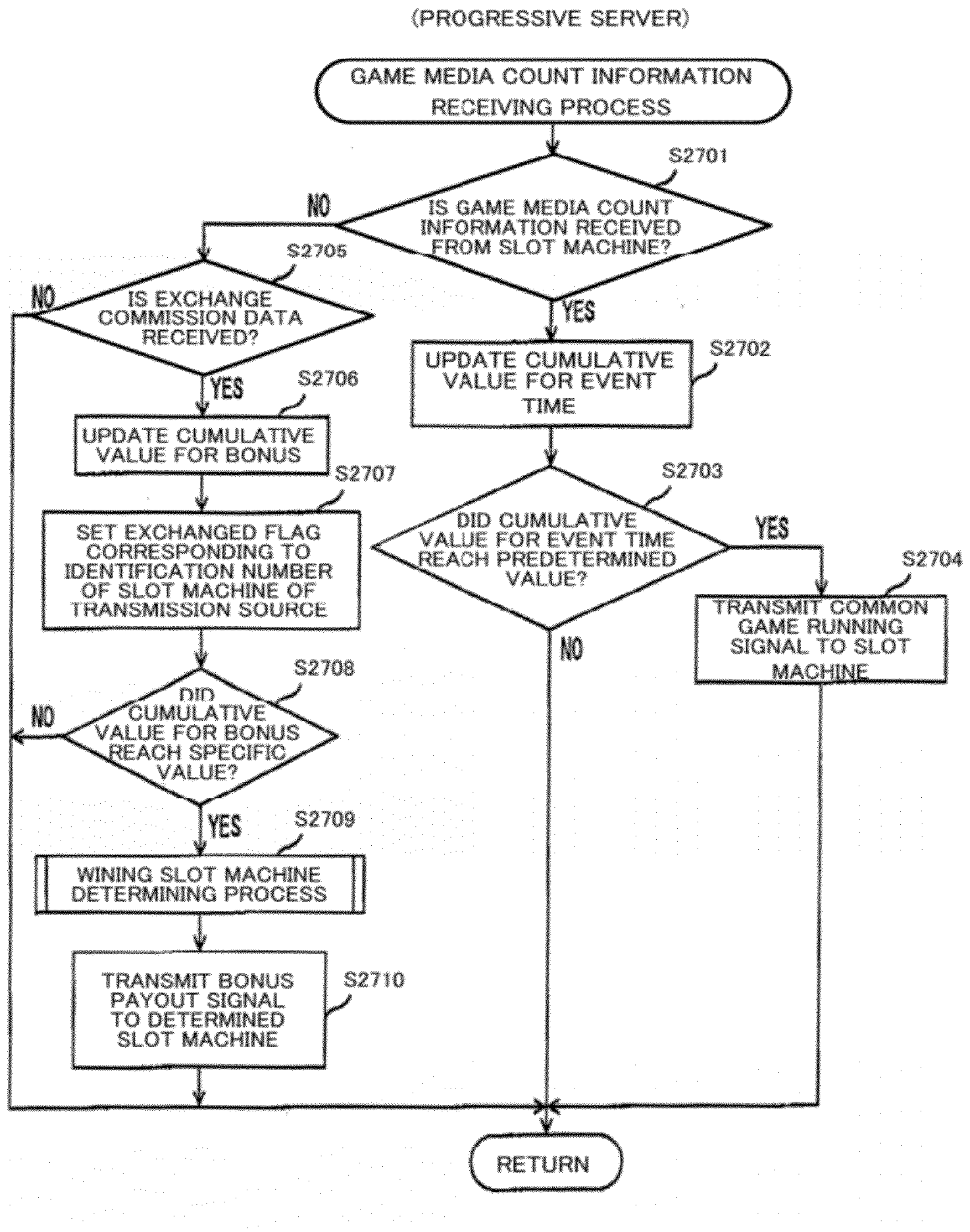
FIG. 98 is a flowchart showing a subroutine of the game media count information receiving process according to the other embodiment.

First of all, the game medium count information receiving process according to the other embodiment is described by using FIG. 98.

FIG. 98 is a flowchart showing the subroutine of the game medium count information receiving process according to the second embodiment.

First of all, the CPU 2201 executes the processes of step S2701 to step S2706, but these processes are almost same as the processes of step S2500 to step S2505 of FIG. 86. Here, only the parts that are different from the step S2500 to step S2505 of FIG. 86 are explained.

The CPU 2201 associates the exchange flag with the identification number of the slot machine 2010 corresponding to the PTS terminal 2064 from which the exchange commission data that is determined to have been received in step S2705 is sent, and then sets the same (step S2707).

Next, based on the cumulative value data for bonus that is stored in the RAM 2203, the CPU 2201 determines whether or not the cumulative value for bonus has reached a specific value (step S2708).

When it is determined that the cumulative value for bonus has reached a specific value, the CPU 2201 executes the winning slot machine determining process (step S2709). In the winning slot machine determining process, the winning slot machine 2010 on which the bonus is presented is determined from among the slot machines on which a currency other than the basic American currency is used. The winning slot machine determining process is explained later in detail by using drawings.

The CPU 2201 sends the bonus payout signal via the PTS terminal 2064 to the winning slot machine 2013 determined in step S2709 (step S2710). The slot machine 2010 that receives the bonus payout signal pays out as many coins as the total number of the first constant and second constant.

Figure 99:
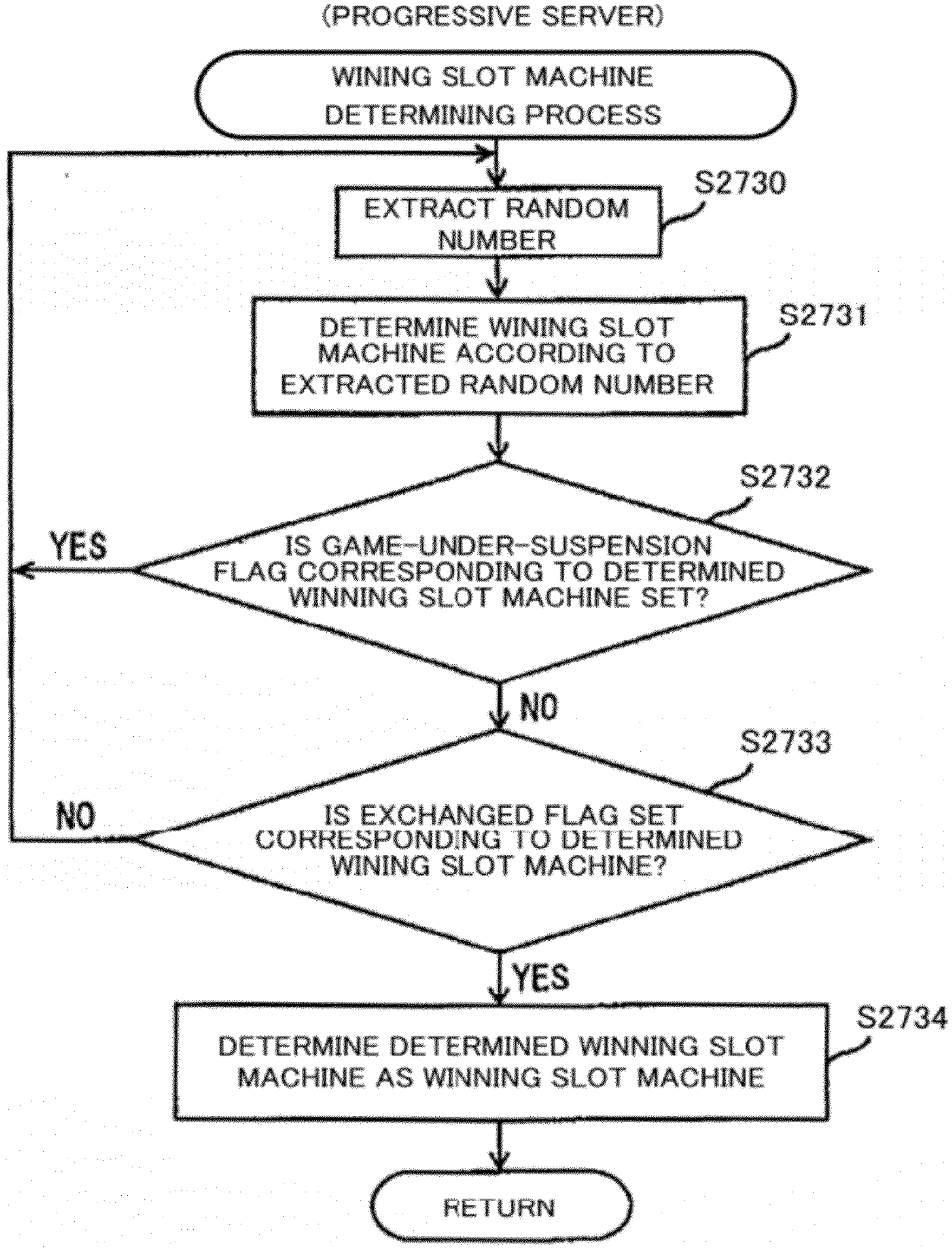
FIG. 99 is a flowchart showing a subroutine of a winning slot machine determining process according to the other embodiment.

Next, the winning slot machine determining process according to the other embodiment is explained by using FIG. 99.

FIG. 99 is a flowchart showing a subroutine of a winning slot machine determining process according to the other embodiment.

First of all, the CPU 2201 executes the processes of step S2730 to step S2732, but these processes are almost same as the processes of step S2550 to step S2552 of FIG. 87. Here, only the parts that are different from the step S2550 to step S2552 of FIG. 87 are explained.

When it is determined in step S2732 that the game-under-suspension flag has not been set, the CPU 2201 correlates with the identification number of the winning slot machine 2010 determined in step S2731, and determines whether or not the exchanged flag has been set (step S2733). When it is determined that the exchanged flag has not been set, the CPU 2201 returns the process to step S2730.

When it is determined in step S62733 that the exchanged flag has been set, the CPU 2201 determines the winning slot machine 2010 determined in step S2731 as the winning slot machine 2010 (step S2734). After the execution of the process of step S3734, the CPU 2201 ends this subroutine.

Thus, according to the gaming system 2001 of the other embodiment and the control method thereof, the bonus funded from the exchange commission can be presented only to players who use a currency other than the basic American currency. In other words, the bonus funded from the exchange commission is not presented to players who use only the American currency, and are therefore not contributing at all to the accumulation of funds for the bonus. Consequently, it is possible to prevent a sense of injustice from developing among players.

Further, in the embodiments described above, the explanation is provided for the case wherein the bill validator 2011 and the exchange bill validator 2065 are both connected to the PTS terminal 2064, however, the configuration can also be such wherein only the exchange bill validator 2065A is connected to the PTS terminal 2064.

In such a case, the exchange bill validator 2065A is different from the exchange bill validator 2065 according to the embodiments described above in that it can accept even American currency instead of accepting only currencies other than the American currency. In other words, the exchange bill validator 2065A is used to accept the bill of a plurality of countries including the bill of America, which is the basic currency, and can read the legitimacy, type, and quantity of the accepted bill.

Note that hereinafter, the same numbers have been used for the constituent elements that are same as the constituent elements of the gaming system 2001 according to the embodiments described above.

Further, the explanation has been omitted below in the following embodiment for parts to which the explanation provided for the above embodiments is applicable.

Figure 100:
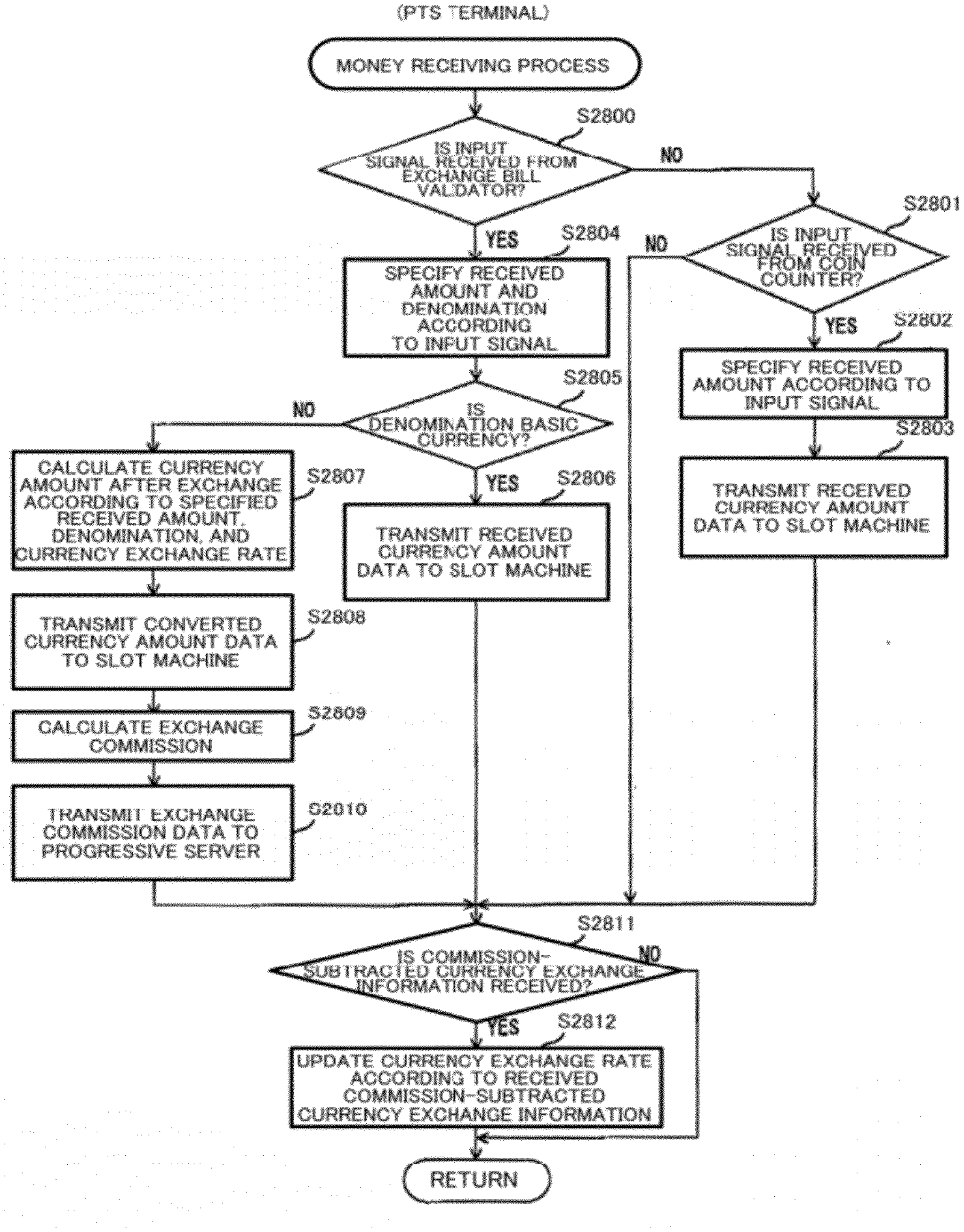
FIG. 100 is a flowchart showing the money receiving process performed at the PTS terminal according to the other embodiment.

First of all, the money receiving process executed in the PTS terminal according to the other embodiment is described by using FIG. 100.

FIG. 100 is a flowchart showing the money receiving process performed at the PTS terminal according to the other embodiment.

First of all, at the predetermined timing, the CPU 2241 determines whether or not an input signal is received from the exchange bill validator 2065A (step S2800).

When it is determined in step S2800 that an input signal is not received, the CPU 2241 determines whether or not an input signal is received from the coin counter 2021C (step S2801). When it is determined in step S2801 that an input signal is not received, the CPU 2241 moves the process to step S2811.

On the other hand, when it is determined in step S2801 that an input signal is received, the CPU 2241 identifies the received amount based on the received input signal (step S2802). Then, the CPU 2241 sends the received currency amount data indicating the identified received amount to the corresponding slot machine 2010 (step S2803).

When it is determined in step S2800 that an input signal is received, the CPU 2241 identifies the received amount and the type of bill accepted by the exchange bill validator 2065A based on the currency type data and currency amount data included in the received input signal (step S28904).

The CPU 2241 determines whether or not the type of the bill identified in step S2804 is the basic currency (step S2805). When it is determined that the type of the identified bill is the basic currency, the CPU 2241 sends the received currency amount data indicating the received amount that is identified in step S2804 to the corresponding slot machine 2010 (step S2806).

The CPU 2241 calculates the converted currency amount to the American currency (for example, 98 dollars), which is the basic currency, based on the received amount (for example, 10000 yen) that is identified in step S2804, the type of bill, and the currency exchange rate (for example, 0.98 dollar=100 yen) indicated by the currency exchange rate data stored in the RAM 2243 (step S2807). Then, the CPU 2241 sends the converted currency amount data that indicates the currency amount after exchange to the corresponding slot machine 2010 (step S2808).

The CPU 2241 calculates the exchange commission based on the converted currency amount data that indicates the converted currency amount as calculated in step S2807, and the exchange commission calculation value data that indicates the exchange commission calculation value stored in the CPU 2241 (step S2809). The exchange commission corresponds to the amount of money (for example, 2 dollars) obtained by multiplying the exchange commission calculation value P/1−P (P is the exchange commission rate (0.02 in the present embodiment)) (In the present embodiment, the exchange commission calculation value is 2/98) with the converted currency amount as calculated in step S2807 (for example, 98 dollars). Then, the CPU 2241 sends the exchange commission data indicating the exchange commission to the progressive server 2266 (step S2810).

When the process of step S2803, or step S2806, or else step S2810 is executed, or when it is determined in step S2801 that an input signal is not received, the CPU 2241 determines whether or not the commission-subtracted currency exchange information is received from the currency exchange server 2262 (step S2811).

When it is determined in step S2811 that the commission-subtracted currency exchange information is received, the CPU 2241 updates the currency exchange rate data stored in the RAM 2243 based on the received commission-subtracted currency exchange information (step S2812). For example, when the corresponding relationship of the various amounts of currencies in the currency exchange rate indicated by the currency exchange rate data stored in the RAM 2243 is 1 dollar=100 yen=0.68 euro=6.85 Yuan, the CPU 2241 stores the currency exchange rate data indicating a new currency exchange rate, that is, 1 dollar=110 yen=0.68 euro=6.85 Yuan in the RAM 2243 when the commission-subtracted currency exchange information that indicates the corresponding relationship of 1 dollar=110 yen is received.

When the process of step S2812 is executed, or when it is determined in step S2811 that the commission-subtracted currency exchange information is not received, the CPU 2241 ends the money receiving process.

Thus, according to the gaming system 2001 of the other embodiment, both the bill validator 2022 and the exchange bill validator 2065A need not be connected to the PTS terminal 2064, and only the exchange bill validator 2065A may be connected to the PTS terminal 2064. Thus, equipment costs can be controlled.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process executed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes executed in the steps or blocks, these processes are essentially executed by various devices. Further, the other structures necessary for the steps or blocks are obvious from the above descriptions.

<<<<Third Embodiment>>>>

Hereinafter, a third embodiment of the present invention will be described with reference to the drawings. In the third embodiment, as described later, control means 3200 has three modes, i.e., a first mode to a third mode.

Figure 101:
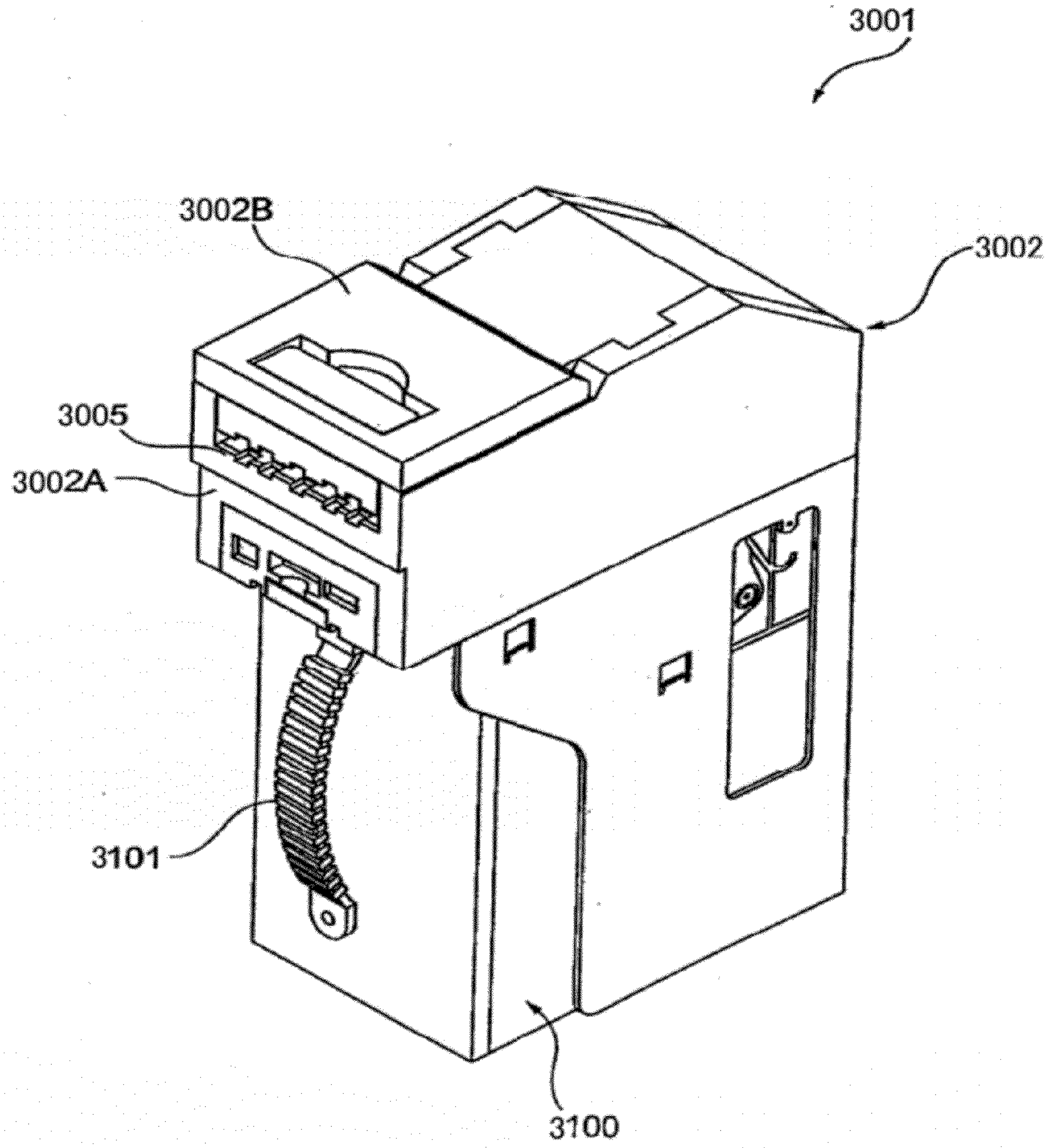
FIG. 101 is a diagram showing the configuration of the bill processing device according to a third embodiment, and is a perspective view showing the entire configuration.
Figure 102:
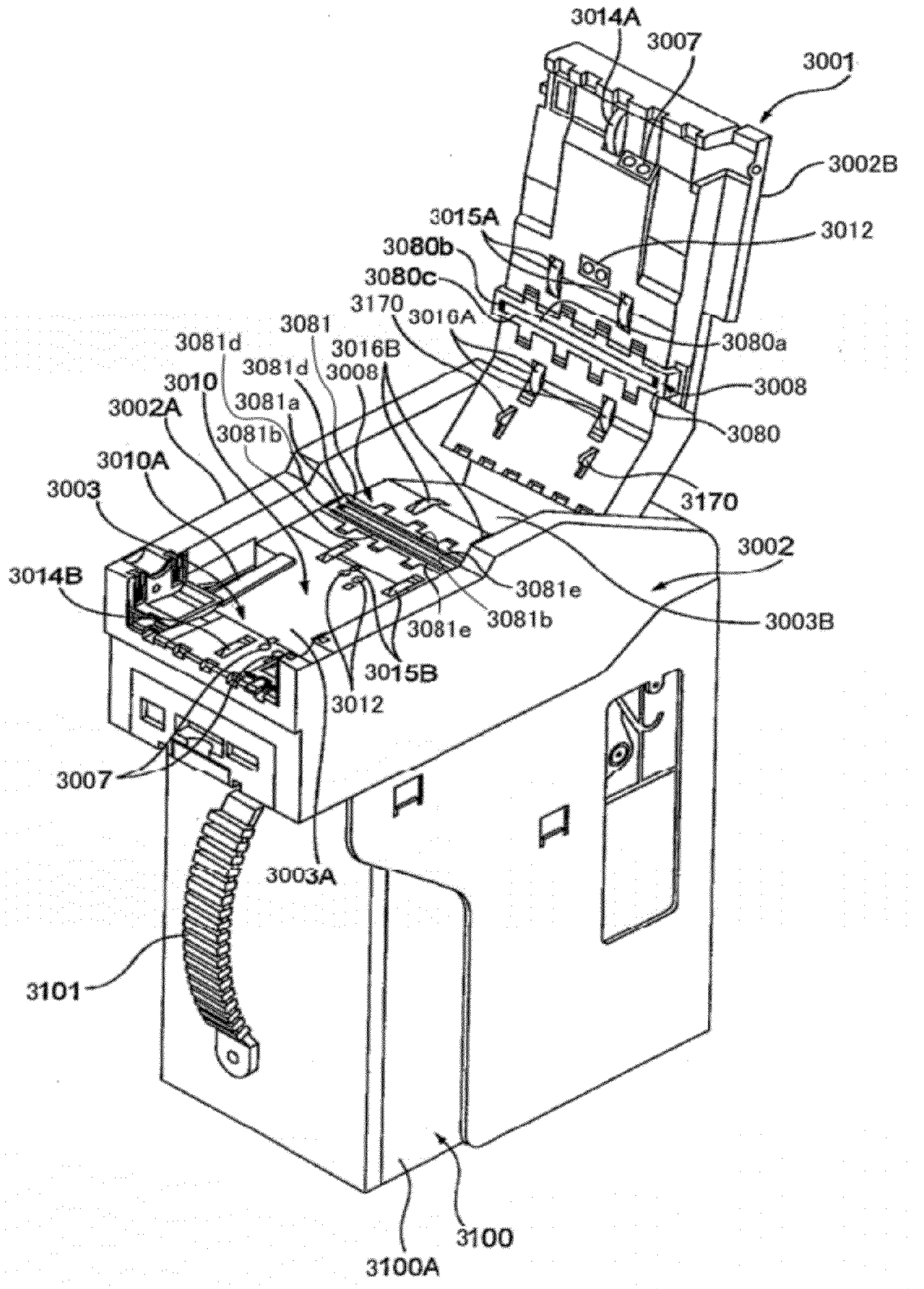
FIG. 102 is a perspective view showing a state where an opening/closing member is opened relative to a main body frame of the device main body.
Figure 103:
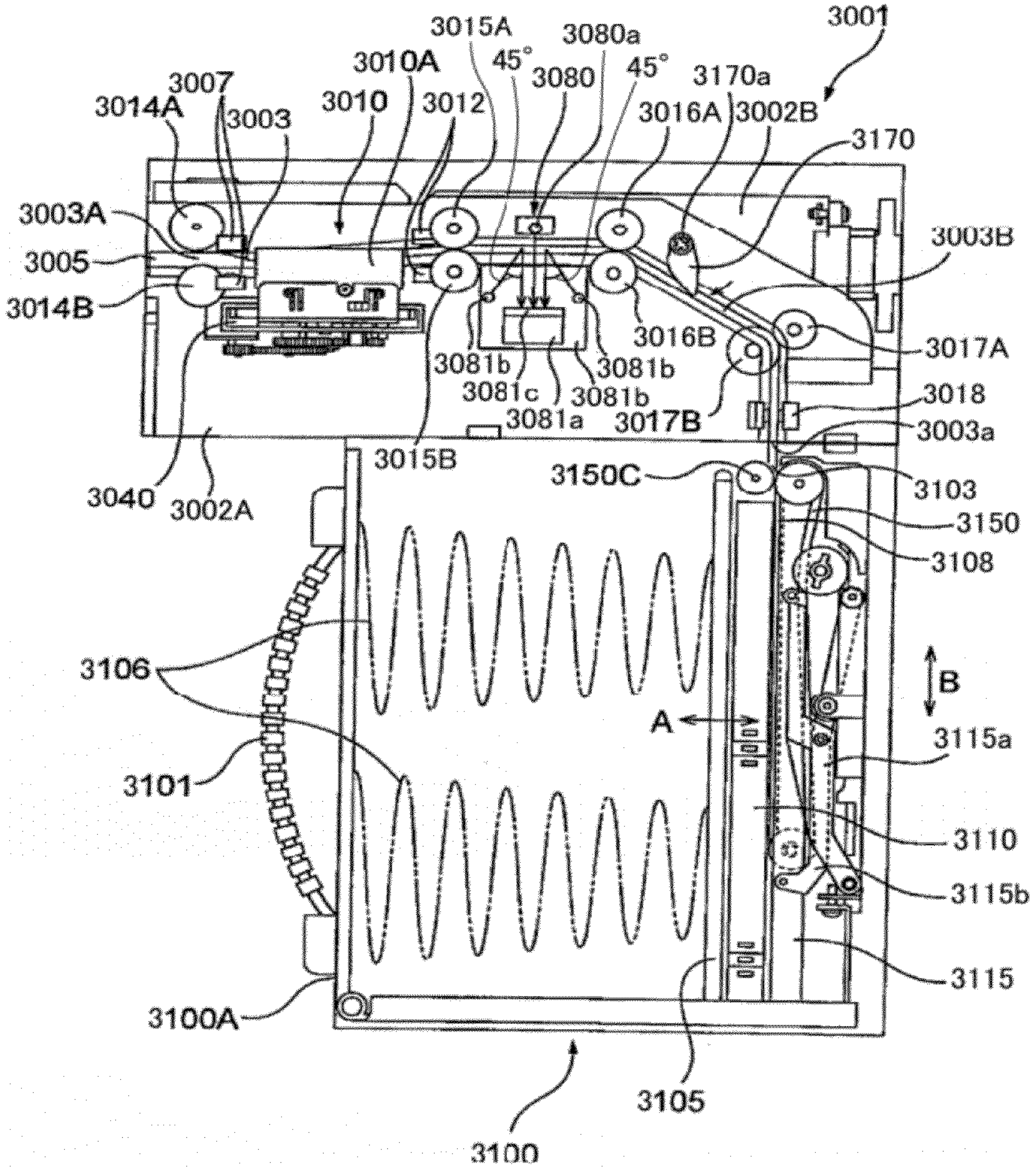
FIG. 103 is a right-side lateral view schematically showing a transport route of a bill inserted from an insertion slot.
Figure 104:
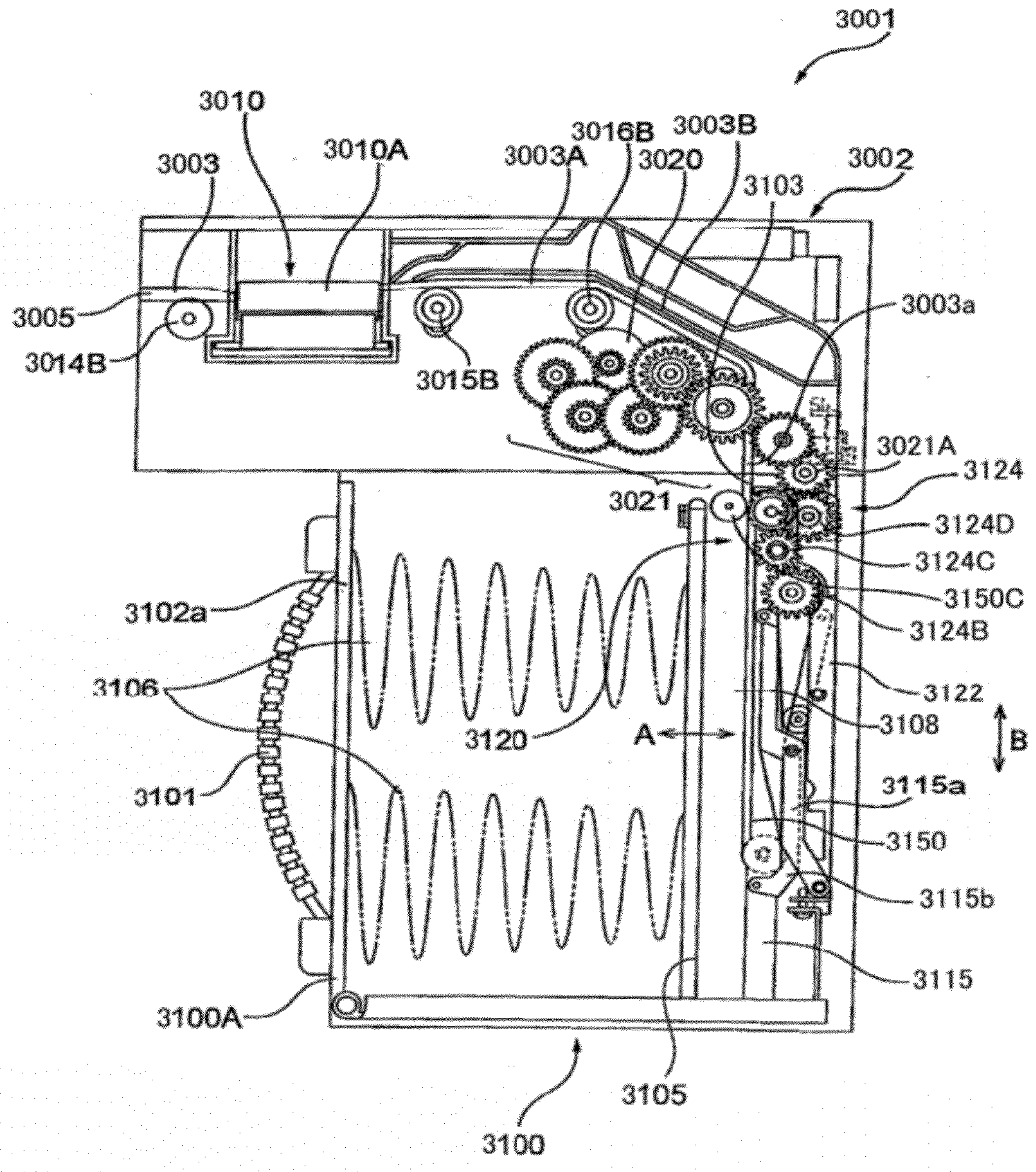
FIG. 104 is a right-side lateral view showing a schematic configuration of a power transmission mechanism for driving a press plate disposed in a bill containing unit.
Figure 105:
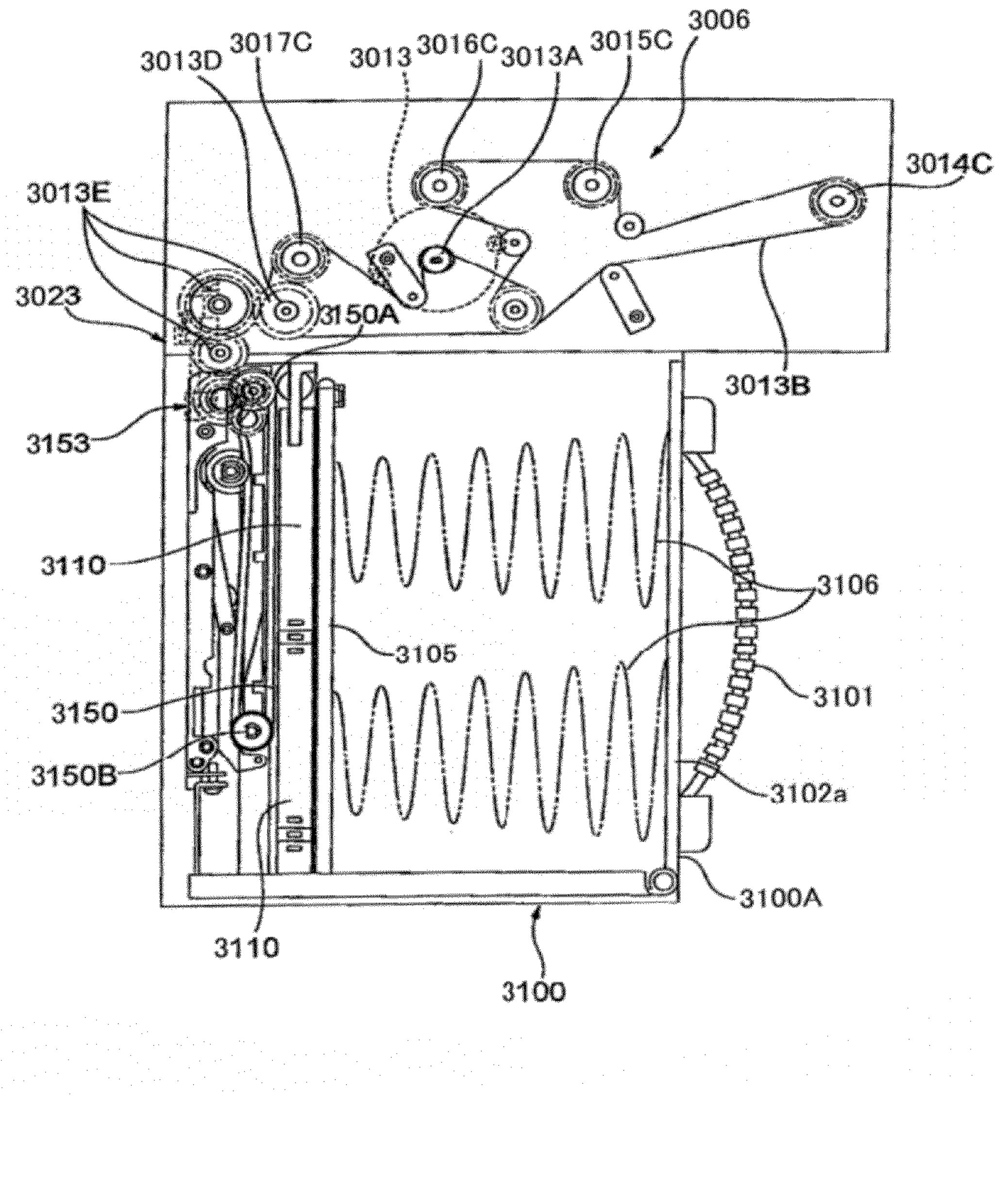
FIG. 105 is a left-side lateral view showing a schematic configuration of a drive source and a drive power transmission mechanism for driving the bill transport mechanism.

FIG. 101 to FIG. 105 are views showing a configuration of a bill handling apparatus according to the third embodiment; FIG. 101 is a perspective view showing an entire configuration; FIG. 102 is a perspective view showing a state in which an opening/closing member is opened with respect to a main body frame of an apparatus main body; FIG. 103 is a right side view schematically showing a path of feeding a bill to be inserted through an insertion slot; FIG. 104 is a right side view showing an outline configuration of a power transmission mechanism for driving a pressurization plate which is arranged at a bill housing section; and FIG. 105 is a left side view showing an outline configuration of a driving source and a driving force transmission mechanism, for driving a bill feeding mechanism.

A bill handling apparatus 3001 of the third embodiment is configured to be incorporable into various kinds of gaming machines such as slot machines, for example. This bill handling apparatus is provided with: an apparatus main body 3002; and a housing section (a housing stacker: a safe) 3100 which is provided at the apparatus main body 3002 and is capable of stacking and housing a number of bills or the like. This housing section 3100 may be removably mountable on the apparatus main body 3002 and can be removed from the apparatus main body 3002 by pulling a grip 3101 which is provided on a front face in a state in which a lock mechanism, although not shown, for example, is released.

The apparatus main body 3002, as shown in FIG. 102, has: a main body frame 3002A; and an opening/closing member 3002B which is configured so as to be opened or closed while one end part is defined as a turning center with respect to the main body frame 3002A. These main body frame 3002A and opening/closing member 3002B, as shown in FIG. 103, are configured in such a manner that: when the opening/closing member 3002B is closed with respect to the main body frame 3002A, a clearance (bill feeding path 3003) through which a bill is to be fed is formed at an opposite portion of each frame; and a bill insertion slot 3005 is formed so as to be coincident with the bill feeding path 3003 at a front exposure side of each frame. The bill insertion slot 3005 is formed in the shape of a slit-like opening so that a bill can be inserted from a short edge side of the bill into the apparatus main body 3002.

In the apparatus main body 3002, there are provided: a bill feeding mechanism 3006 for feeding a bill along the bill feeding path 3003; an insertion detecting sensor 3007 for detecting a bill inserted into the bill insertion slot 3005; bill reading means 3008 which is installed at a downstream side of the insertion detecting sensor 3007 and reads information of a bill being fed; a skew correction mechanism 3010 for precisely positioning and feeding a bill with respect to the bill reading means 3008; a movable piece passage detecting sensor 3012 for detecting that a bill has passed through a pair of movable pieces configuring the skew correction mechanism; and a discharge detecting sensor 3018 for detecting that a bill has been discharged to the bill housing section 3100.

Hereinafter, the abovementioned constituent elements will be described in detail.

The bill feeding path 3003 extends from the bill insertion slot 3005 to a rear side, and is provided with: a first feeding path 3003A; and a second feeding path 3003B which extends from the first feeding path 3003A to a downstream side and tilts to a downward side at a predetermined angle with respect to the first feeding path 3003A. The downstream side of the second feeding path 3003B bents in a vertical direction; a discharge outlet 3003*a* for discharging a bill to the bill housing section 3100 is formed at a downstream side end part thereof. The bill to be discharged therefrom is fed to an inlet (acceptance inlet) 3103 of the bill housing section 3100 in the vertical direction.

The bill feeding mechanism 3006 is a mechanism which is capable of feeding a bill inserted through the bill insertion slot 3005 along an insertion direction and is capable of returning the inserted bill to the bill insertion slot 3005. This bill feeding mechanism 3006 is provided with: a motor 3013 (see FIG. 105) which is a driving source installed in the apparatus main body 3002; and feeding roller pairs (3014A, 3014B), (3015A, 3015B), (3016A, 3016B), and (3017A, 3017B) which are rotationally driven by means of the motor 3013 and are arranged at the bill feeding path 3003 at predetermined intervals along the bill feeding direction.

The feeding roller pairs are installed so as to be partly exposed on the bill feeding path 3003. All of the roller pairs are made of rollers such that the feeding rollers 3014B, 3015B, 3016B, and 3017B that are installed at the lower side of the bill feeding path 3003 are driven by means of the motor 3013. The feeding rollers 3014A, 3015A, 3016A, and 3017A that are installed at the upper side are pinch rollers that follow these feeding rollers. The feeding roller pairs (3014A, 3014B) for first pinching and feeding to the rear side the fill inserted through the bill insertion slot 3005, as shown in FIG. 102, are installed at one site at a center position of the bill feeding path 3003. The feeding roller pairs (3015A, 3015B), (3016A, 3016B), and (3017A, 3017B) that are sequentially disposed at the downstream side thereof are installed at two sites with predetermined intervals along the widthwise direction of the bill feeding path 3003.

As to the feeding roller pairs (3014A, 3014B) that are disposed in the vicinity of the abovementioned bill insertion slot 3005, in general, an upper feeding roller 3014A is spaced from a lower feeding roller 3014B. When the insertion detecting sensor 3007 detects insertion of a bill, the upper feeding roller 3014A is driven to the lower feeding roller 3014B so as to pinch the inserted bill.

That is, the upper feeding roller 3014A is driven to be controlled so as to abut against or to be spaced from the lower feeding roller 3014B, by means of a roller elevation motor 3070 (see FIG. 106) which is a driving source. In this case, when the skew correction mechanism 3010 performs processing of eliminating a tilt of the inserted bill and alignment with respect to the bill reading means 3008 (skew correction processing) the upper feeding roller 3014A is spaced from the lower feeding roller 3014B to thereby release a load on the bill. When skew correction processing completes, the upper feeding roller 3014A is driven again to the lower feeding roller 3014B to thereby pinch the bill between these two rollers. The driving source may be comprised of a solenoid or the like other than the motor.

The skew correction mechanism 3010 is provided with a pair of left and right movable pieces 3010A serving to correct a skew (only one side is shown here). A skew correction mechanism motor 3040 is driven to thereby move the pair of the left and right movable pieces 3010A so as to approach each other, whereby skew correction processing with respect to a bill is performed.

Bills of various denominations are entered into the bill handling apparatus 3001. These bills are different from each other in size (length or width). Thus, it is also presupposed that a bill is inserted in a tilted manner through the bill insertion slot 3005. In particular, in a case where a bill with its large width and a bill with its small width are inserted through the bill insertion slot 3005, the bill insertion slot 3005 is provided so that the bill with its large width can be inserted. Therefore, if a bill with its small width is inserted from the bill insertion slot 3005, the bill is prone to tilt with respect to a bill feeding direction. Even in such a case, the skew correction mechanism 3010 can adjust a bill's behavior so as to be parallel to the bill feeding direction. By doing this, the bill handling apparatus 3001 can be provided which is capable of entering bills of various denominations with their different sizes.

The feeding rollers 3014B, 3015B, 3016B, and 3017B that are installed at the lower side of the abovementioned bill feeding path 3003, as shown in FIG. 105, are rotationally driven via a motor 3013 and pulleys 3014C, 3015C, 3016C, and 3017C, each of which is installed at an end part of a drive shaft of each of the feeding rollers. That is, the driving pulley 3013A is installed at an output shaft of the motor 3013, and a driving belt 3013B is wound between the driving pulley 3013A and each of the pulleys 3014C, 3015C, 3016C, and 3017C that is installed at the end part of the driving shaft of each of the feeding rollers. A tension pulley is engaged with the driving belt 3013B at its appropriate site to thereby prevent slackness.

With the abovementioned configuration, when the motor 3013 is driven to normally rotate, the feeding rollers 3014B, 3015B, 3016B, and 3017B are also driven to normally rotate synchronously and then a bill is fed in an insertion direction. When the motor 3013 is driven to reversely rotate, the feeding rollers 3014B, 3015B, 3016B, and 3017B are driven to reversely rotate synchronously and then a bill is fed to the bill insertion slot 3005 side.

The insertion detecting sensor 3007 generates a detection signal at the time of detecting the bill inserted into the bill insertion slot 3005. When this detection signal is generated, the motor 3013 is driven to normally rotate and then the bill is fed in the insertion direction. While the insertion detecting sensor 3007 of the third embodiment is installed between the feeding roller pairs (3014A, 3014B) and the skew correction mechanism 3010, and is comprised of an optical sensor, for example, recursive reflection type photo sensor, the sensor may be otherwise comprised of a mechanical sensor.

The movable piece passage detecting sensor 3012 generates a detecting sensor at the time of detecting that a tip end of a bill has passed through a pair of left and right movable pieces 3010A configuring the skew correction mechanism 3010. When this detecting sensor is generated, driving of the motor 3013 is stopped and then skew correction processing is performed. The movable piece passage detecting sensor 3012 of the third embodiment is installed at the upstream side of the bill reading means 3008, and is comprised of an optical sensor or a mechanical sensor, like the insertion detecting sensor.

The discharge detecting sensor 3018 detects a rear end of a bill that passes and then detects that the bill has been discharged to a bill housing section 3100. At the downstream side of the second feeding path 3003B, this sensor is arranged immediately before an acceptance inlet 3103 of the bill housing section 3100. When a detection signal is generated from the discharge detecting sensor 3018, driving of the motor 3013 is stopped and then bill feeding processing completes. This discharge detecting sensor 3018 is also comprised of an optical sensor or a mechanical sensor, like the insertion detecting sensor.

As to a bill fed in a state in which the skew correction mechanism 3010 corrects a skew, the bill reading means 3008 reads information on the bill and identifies effectiveness (authentication) of the read information. In the third embodiment, the bill reading means 3008 is configured to have a line sensor for emitting light from each side of a bill fed and then detecting the transmitted light and the reflected light to thereby perform reading. This reading means is installed in the first feeding path 3003A.

The bill reading means 3008 has a function of first judging whether or not a bill has been damaged at the time of executing reading of a bill fed. That is, a predetermined tip end region of a bill fed is read by utilizing the bill reading means 3008, and based upon the read information, damage judgment means to be described later judges whether or not any damage has occurred to a tip end region. This bill damage judgment processing is executed before authentication judgment processing of this bill is executed. At least a judgment is made as to whether or not the bill has been damaged until before reading of bill information completes in order to execute authentication judgment processing (specific technique or timing of judgment processing will be described later).

Authentication judgment processing is executed for a bill determined that no damage has occurred thereto after the abovementioned damage judgment processing has been executed. This authentication judgment processing is performed by emitting light with a predetermined wavelength from light-emitting means, acquiring the transmitted-light data of light having transmitted light and the reflected-light data of reflected light, and then, comparing the acquired data with reference data of an authentic bill that is stored in advance.

In this case, an authentic bill has a region in which there are different items of image data to be acquired, depending on a wavelength of light to be emitted (for example, visible light or infrared ray of light). Therefore, in the authentication judgment processing, while attention is focused on this matter, a bill is irradiated with light having a wavelength which is different depending on a plurality of light sources (for example, emitting red light and infrared ray of light), and the transmitted light and reflected light are determined so as thereby enhance authentication identification precision more remarkably. That is, the red light and infrared ray of light have their own wavelengths which are different from each other; and thus, if the transmitted-light data or the reflected-light data associated with light having a plurality of different wavelengths are employed for authentication judgment, the transmitted light having passed through a specific region of an authentic bill and a bogus bill; and the reflected light reflected from the specific region have a property that these rays of light these rays of light are different from each other in transmittance and reflection index. Therefore, light sources of a plurality of wavelengths are employed so as to thereby enhance identifying precision of bill authentication more remarkably.

A specific method for identifying bill authentication is not described in detail, since various light-receiving data (transmitted-light data, reflected-light data) can be acquired depending on a wavelength or an emission region of light to be emitted to a bill. However, in a bill watermark region for example, an image can be seen greatly differently if the image of the region is seen with rays of light having their different wavelengths. Thus, it is considered that: this portion is defined as a specific region; the transmitted-light data or reflected-light data in the specific region is acquired; and whether a bill targeted to be identified is an authentic bill or a bogus bill is identified in comparison with authentic data in the same specific region of the authentic bill stored in advance in storage means (ROM). At this time, a specific region is defined according to denomination, and then predetermined weighting is set to the transmitted-light data or reflected-light data in the specific region, to be able to further improve authentication identifying precision.

The abovementioned bill reading means 3008, as described later, lights and controls a light-emitting section at predetermined intervals, and detects the transmitted light and reflected light when a bill passes by means of a line sensor, thus enabling the line sensor to acquire image data which is based on a plurality of pixel information with a predetermined size being defined as one unit.

In this case, image data acquired by the line sensor is converted to data including color information having brightness on a pixel-by-pixel basis, by means of a converting section which will be described later. The color information on a pixel-by-pixel basis, having brightness converted at the converting section corresponds to a contrast value, i.e., density value (luminescence value), and for example, as one-byte information, a numeric value from 0 to 255 (0: black to 255: white) is assigned to each pixel in accordance with the density value.

Therefore, in authentication judgment processing, it is possible to identify authentication by means of a correlative coefficient obtained by extracting a predetermined area of a bill, employing pixel information (density value) included in that region and pixel information in the same region of an authentic bill, and substituting these items of pixel information into an appropriate correlation formula and performing computation in accordance with the thus substituted correction formula. Alternatively, apart from the above, analog waveforms, for example, are generated from transmitted-light data or reflected-light data, the shapes of these waveforms are compared with each other to be thereby able to identify authentication. Further, there may be provided processing of detecting a length of a bill's printed region and identifying authentication by utilizing the length.

In damage judgment processing executed prior to authentication judgment processing, while attention is focused on the fact that: the abovementioned line sensor is capable of reading an entire width of a bill; and that a two-dimensional image can be acquired with bill feeding, image information of a tip-end region of a bill obtained by a line sensor is compared with a reference bill shape (reference-shape image) so as to judge that any damage has occurred thereto if it is not coincident with the reference-shape image.

In the damage judgment processing executed prior to authentication judgment processing, while attention is focused on the fact that: the above line sensor is capable of reading an entire width of a bill; and that a two-dimensional image can be acquired with bill feeding, the density value on a pixel-by-pixel basis at a tip end portion of a bill read by the line sensor is compared with a density value on a pixel-by-pixel basis serving as a reference corresponding to the read portion so as to judge whether or not any damage has occurred to the bill. Such judgment, as described later, is effective in a case where a bill tip end portion is folded, and it becomes possible to disable the folded bill from being fed into the apparatus.

In the third embodiment, in addition to the abovementioned judgment technique, image information (shape information) of a tip end region of a bill is further compared with a reference bill shape (reference shape image) so as to judge that any damage has occurred if it is not coincident with the reference-shaped image. Such a judgment, as described later, is effective in a case where a bill tip end portion has been defected, for example, and it becomes possible to disable such defected bill to be fed into the apparatus.

In the third embodiment, there are provided: first authentication judgment processing of emitting light to a print portion of a bill fed by utilizing the abovementioned bill reading means, receiving the transmitted light and reflected light, and identifying whether or not a characterizing point at the print portion (any feature region or any extraction method is available) is coincident with an authentic one; and second authentication judgment processing of actually measuring a print length of each side of a bill (that may be a print length of a whole printed region or that may be a print length between the feature regions with a characterizing portion being extracted) by utilizing either or both of the transmitted light and reflected light and then identifying whether or not the bill is authentic, based on the print length of each side.

In this case, the present invention is characterized by the abovementioned second authentication judgment processing. The second authentication judgment processing may be performed after the first authentication judgment processing has been executed, or alternatively, may be executed prior to the first authentication judgment processing. In the third embodiment, as described later, processing is adapted so as to perform the second authentication judgment processing after the first authentication judgment processing has been executed.

The abovementioned first and second authentication judgment processing both are performed by emitting light with a predetermined wavelength from light-emitting means to a printed region of a top face of a bill fed, acquiring transmitted-light data having passed through the bill and reflected-light data of reflected light, and then, comparing the acquired data with reference data of an authentic bill stored in advance.

In this case, an authentic bill has a region in which there are different items of image data acquired by a wavelength of light to be emitted (for example, visible light or infrared ray of light). Therefore, in the first authentication judgment processing, while attention is focused on this matter, light of different wavelengths depending on a plurality of light sources (for example, emitting red light and infrared ray of light) is emitted to a bill and then the transmitted light and reflected light are detected so as to thereby enhance authentication identifying precision more remarkably. That is, red light and infrared ray of light have wavelengths which are different from each other, and thus, if transmitted-light data or reflected-light data associated with a plurality of light beams having their different wavelengths is employed for bill authentication judgment, the transmitted light passing through a specific region of an authentic bill and a bogus bill and the reflected light reflected from a specific region have a property that these rays of light are different from each other in transmittance and reflection index. Therefore, light sources of a plurality of wavelengths are employed to thereby enhance bill authentication identifying precision more remarkably.

A specific bill authentication identifying method will not be described in detail, since various items of light-receiving data (transmitted-light data, reflected-light data) can be acquired depending on a wavelength or an emission region of light to be emitted to a bill. However, in a bill watermark region, for example, if an image of that region is seen with rays of light having their different wavelengths, the image is seen greatly differently. Thus, it is considered that this portion is defined as a specific region, transmitted-light data or reflected-light data in the specific region is acquired, the acquired data is compared with normal data in the same specific region of an authentic bill, and then, whether a bill targeted to be identified is an authentic bill or a bogus bill is identified. At this time, it is possible to define a specific region according to denomination, set predetermined weighting to the transmitted-light data or the reflected-light data in the specific region, and further improve authentication identifying precision.

In the second authentication judgment processing, the abovementioned bill reading means 3008 acquires image information of each side of a bill as pixel information taken along a bill feeding direction, for example, derives a print length in each face from the pixel information taken along the feeding direction, and then, performs authentication judgment processing in accordance with the print length. In the second authentication judgment processing, a bill with its print length which is different from that of an authentic bill is eliminated to be bogus. It becomes possible to enhance bill identifying precision more remarkably by performing such authentication judgment processing.

Incidentally, a bill is employed under various kinds of environments and thus the entire bill may be extended or shrunk (bills are formed of a fibrous material; and therefore, it is considered that there are many cases of drying and shrinking after moisture or the like has been contained). As described above, it is desirable to acquire a print length of each side and perform authentication judgment processing in order to improve precision of authentication judgment. However, if bill shrinking is not considered, even if it is an authentic bill, it could be judged to be bogus (mistaken judgment processing could be made). Thus, when the second authentication judgment processing is executed, such incorrect judgment processing is eliminated by employing the technique as described later.

The abovementioned bill reading means 3008, as described later, controls a light-emitting section to light up at predetermined intervals, and a line sensor detects the transmitted light and reflected light when a bill passes through the sensor. Thus, the line sensor becomes capable of acquiring image data which is based on a plurality of pixel information with a predetermined size being defined as one unit.

In this case, a converting section to be described later converts the image data acquired by the line sensor to data including color information having brightness on a pixel-by-pixel basis. The color information on a pixel-by-pixel basis having brightness, to be converted at the converting section, corresponds to a contrast value, i.e., a density value (luminescence value), and for example, as one-byte information, a numeric value of 0 to 255 (0: black to 255: white) are assigned to each pixel in accordance with the density value.

Therefore, in the first authentication judgment processing, it is possible to identify authentication by a correlative coefficient obtained by extracting a predetermined area of a bill, employing pixel information (density value) included in that region and pixel information of the same region of an authentic bill, and substituting these items of pixel information into an appropriate correlation formula and performing computation in accordance with the thus substituted correction formula. Alternatively, apart from the above, analog waveforms, for example, are generated from the transmitted-light data or reflected-light data, and the shapes of these waveforms are compared with each other, thereby making it possible to identify authentication.

In the second authentication judgment processing, it is possible to acquire length data (actually measured data) with respect to a printed region from image information acquired from each side of a bill. In this case, although image data acquired as pixel information depends on resolution of a line sensor, for example, it becomes possible to eliminate to be bogus the one whose print length is different at least by the order of 1-2 mm when the length is acquired from the number of pixels in the whole bill feeding direction as long as one pixel is a resolution of the order of 0.508 mm in a lengthwise direction of a bill. If an attempt is made to further enhance identifying precision which is based on a print length, it is sufficient if the resolution of a line sensor is enhanced. However, if the identification precision is extremely enhanced, even if it is an authentic bill, the one with a slight creation error at the time of printing may be eliminated. Therefore, it is considered that the abovementioned resolution of the line sensor suffices.

Hereinafter, a configuration of the abovementioned bill reading means 3008 will be described in detail with reference to FIG. 102 and FIG. 103.

The abovementioned bill reading means 3008 has: a light-emitting unit 3080 which is arranged at the opening/closing member 3002 side and is provided with a first light-emitting section 3080*a* which is capable of emitting infrared ray of light and red light on a top side of a bill fed; and a light-receiving/emitting unit 3081 which is arranged at the main body frame 3002A side.

The light-receiving/emitting unit 3081 has: a light-receiving portion 3081*a* which is provided with a light-receiving sensor opposed to the first light-emitting portion 3080*a* so as to sandwich a bill (bill feeding path); and a second light-emitting portion 3081*b* which is arranged adjacent to each side of the bill feeding direction of the light-receiving portion 3081*a* and is capable of emitting infrared ray of light and red light.

The first light-emitting portion 3080*a* disposed to be opposed to the light-receiving portion 3081*a* functions as a transmission light source. The first light-emitting portion 3080*a*, as shown in FIG. 102, is comprised of a synthetic resin-based, rectangular rod-like member for emitting the light from an LED element 3080*b* which is mounted to one end through a light guide 3080*c* provided inside thereof. The first light-emitting portion thus configured is arranged in line in parallel to the light-receiving portion 3081*a* (light-receiving sensor). With a simple configuration, it becomes possible to emit light entirely uniformly with respect to a range of a whole feeding path widthwise direction of a bill fed.

A light-receiving portion 3081*a* of the light-receiving/emitting unit 3081 is formed in a thin plate shape which extends in an intersection direction with respect to a bill feeding path 3003 and which is shaped like a band having a width to an extent such that there could not be affected the sensitivity of a light-receiving sensor, although not shown, the sensor being provided at the light-receiving portion 3081*a*. The light-receiving sensor provides a plurality of CCD (Charge Coupled Device) in line at the center of the thickness direction of the light-receiving portion 3081*a*. In addition, this sensor is configured as a so called line sensor at which GRIN lens arrays 3081*c* are disposed in line so as to cause the transmitted light and reflected light to focus on an upward position of the CCD.

Therefore, it becomes possible to receive transmitted light or reflected light of infrared ray of light or red light from the first light-emitting portion 3080*a* or the second light-emitting portion 3081*b*, the rays of light being emitted to a bill targeted for authentication judgment, and generate contrast data according to the luminescence (pixel data including brightness data) or a two-dimensional image from the contrast data, as light-receiving data.

The second light-emitting portion 3081*b* of the light-receiving/emitting unit 3081 functions as a reflection light source. The second light-emitting portion 3081*b*, like the first light-emitting portion 3080*a*, is comprised of a synthetic resin-based, rectangular rod-like member which is capable of emitting the light from an LED element 3081*d* mounted to one end entirely uniformly through a light guide 3081*e* provided inside thereof. The second light-emitting portion 3081*b* is configured to be arranged in line in parallel to the light-receiving portion 3081*a* (line sensor).

The second light-emitting portion 3081*b* is capable of emitting light at an elevation angle of 45 degrees, for example, to a bill, and is arranged so as to allow the light-receiving portion 3081*a* to receive reflected light from a bill. In this case, while the light emitted from the second light-emitting portion 3081*b* is incident to the light-receiving portion 3081*a* at 45 degrees, the incidence angle is not limitative to 45 degrees. Its disposition state can be appropriately set as long as light can be uniformly emitted to a top face of a bill. Therefore, as to the disposition of the second light-emitting portion 3081*b* and the light-receiving portion 3081*a*, an appropriate design change is possible in accordance with a structure of a bill handling apparatus.

The second light-emitting portion 3081*b* is provided at each side while the light-receiving portion 3081*a* is sandwiched therebetween so as to emit light at an incidence angle of 45 degrees, respectively, from each side. This is because, if there is any damage or winkle on a bill surface, if light is emitted only from one side to irregularities occur with these damaged or winkled portions, it has been occasionally unavoidable that: the light is interrupted at such irregular portions; and a shaded site occurs. Thus, by emitting light is from each side, it becomes possible to prevent the shading at irregular portions and obtain more precious image data than emission from one side. Of course, the second light-emitting portion 3081*b* may be configured to be installed at one side and the configuration and layout or the like of the abovementioned light-emitting unit 3080 and light-receiving/emitting unit 3081 can be appropriately modified without being limitative to the third embodiment.

Figure 115:
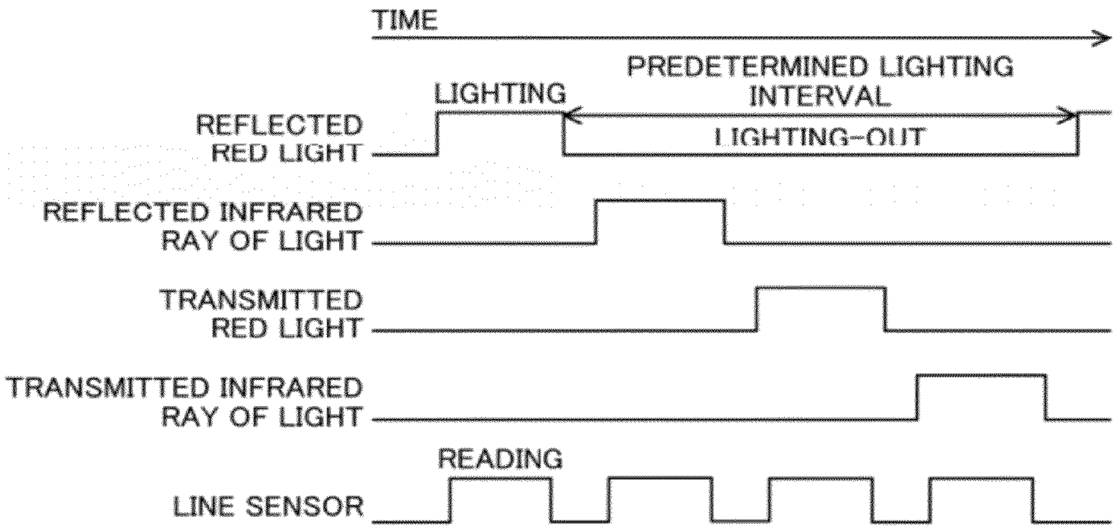
FIG. 115 shows lighting control of a light emission unit in the bill reading means, and is a timing chart showing the lighting control of the light emission unit when the bill is read.

In the abovementioned light-emitting unit 3080 and each of the first light-emitting portion 3080*a* of the light-receiving/emitting unit 3081 and the second light-emitting portion 3081*b*, at the time of reading a bill, infrared ray of light and red light are controlled to be turned on at predetermined intervals as shown in the timing chart of FIG. 115. That is, four light sources, which are comprised of: transmission light sources of red light and infrared ray of light in the first light-emitting portion 3080*a* and the second light-emitting portion 3081*b*; and reflection light sources of red light and infrared ray of light, repeat lighting-up and lighting-out at predetermined intervals (predetermined lighting intervals), and are controlled to light up so that two or more light sources do not light at the same time without overlapping phases of the light sources. In other words, lighting is controlled so that when one light source lights up, the other three light sources light out. In this manner, as in the third embodiment, even with the use of one light-receiving portion 3081*a*, it becomes possible to detect light of each light source at predetermined intervals and read an image made of contrast data of a printed region of a bill exerted by transmitted light and reflected light of red light and transmitted light and reflected light of infrared ray of light. A print length of each side can also be measured. In this case, it is also possible to enhance the resolution by controlling lighting intervals to be short.

Image data, which is obtained by the transmitted light (emitted light of the first light-emitting portion 3080*a*) and the reflected light (emitted light of the second light-emitting portion 3081*b*) from the bill, these rays of light being acquired at the light-receiving portion 3081*a*, are compared with image data relating to an authentic bill, whereby authentication judgment processing is performed. In this case, an authentic bill has a region in which image data acquired is different depending on a wavelength of light to be emitted (for example, visible light or infrared ray of light). Thus, in the authentication judgment processing of the third embodiment, while attention is focused on this matter, a bill is emitted with light of different wavelengths depending on a plurality of light sources (emitting red light and infrared ray of light in the third embodiment), and the transmitted light and reflected light are detected, thereby enhancing authentication identifying precision more remarkably. That is, the red light and infrared ray of light have their different wavelengths, and thus, if transmitted-light data or reflected-light data exerted by a plurality of light beams with different wavelengths is employed for bill authentication judgment, the transmitted-light passing through a specific region of an authentic bill and a bogus bill; and the reflected light reflected from the specific region have a property that transmittance and a reflection index are different from each other. Therefore, the abovementioned light-emitting portions (first light-emitting portion 3080*a* and second light-emitting portion 3081*b*) employ a light source of a plurality of wavelengths so as to thereby enhance bill authentication identifying precision more remarkably.

A specific bill authentication identifying method is not described in detail, since various items of light-receiving data (transmitted-light data, reflected-light data) can be acquired depending on a wavelength or an emission region of light to be emitted to a bill. However, in a bill watermark region for example, if an image of that region is seen with rays of light having their different wavelengths, the image is seen greatly differently. Thus, it is considered that: this portion is defined as a feature region; transmitted-light data or reflected-light data in the feature region is acquired; the acquired data is compared with normal data in the same specific region of an authentic bill stored in advance in storage means such as a ROM. At this time, a feature region is defined according to denomination, and predetermined weighting is set to the transmitted-light data or reflected-light data in the feature region, making it possible to further improve authentication identifying precision as well.

The abovementioned light-emitting portions (first light-emitting portion 3080*a* and second light-emitting portion 3081*b*) are controlled to light up at predetermined intervals. A light-receiving portion (line sensor) 3081*a* then detects the transmitted light and reflected light when a bill pass through the sensor. The light-receiving portion (line sensor) 3081*a* is capable of acquiring pixel data according to brightness of the detected rays of light (a plurality of pixel data including brightness with a predetermined size being defined as one unit) and generating a two-dimensional image from the pixel data.

That is, a converting section described later converts the pixel acquired by means of the line sensor to data including color information having brightness on a pixel-by-pixel basis. Here, color information on a pixel-by-pixel basis, having brightness, to be converted at the converting section, is the one obtained by assigning a numeric value of 0 to 255 (for example, 0: black to 255: white) in according to the brightness as one-byte information.

Therefore, in the abovementioned authentication judgment processing, it is possible to identify authentication by means of a correlative coefficient obtained by extracting a predetermined area of a bill, employing color information on a pixel-by-pixel basis having brightness included in that region and color information on a pixel-by-pixel basis having brightness in the same region of an authentic bill, and substituting these items of information into an appropriate correlation formula. Alternatively, apart from the above, it is also possible to identify authentication by generating analog wavelengths, for example, from transmitted-light data or reflected-light data, and comparing the shapes of these wavelengths. Further, there may be provided processing of detecting a length of a printed region of a bill and then identifying authentication by utilizing the length information.

Prior to executing the abovementioned authentication judgment processing, processing (processing of eliminating authentication judgment) is executed of: setting a predetermined area in advance as to a bill to be inserted; as to the set region, comparing a transmitted image comprised of a plurality of pixels converted by a converting section from the transmitted light received by the light-receiving portion 3081*a* with a reflected image comprised of a plurality of pixels converted by the converting section from the reflected light received by the light-receiving portion 3081*a*; and then, on the basis of the comparison result, eliminating the predetermined area from a target for authentication judgment.

Now, processing of eliminating authentication judgment will be described.

As described above, in bill authentication judgment processing, light is emitted from a light-emitting portion to a bill fed; the transmitted light and the reflected light are received by a light-receiving portion; and the received rays of light are converted in a photoelectric manner and are converted into image data (transmitted image data, reflected image data) including color information having brightness on a pixel-by-pixel basis. The information on a pixel-by-pixel basis to be converted at the converting section corresponds to brightness (luminescence value). A numeric value of 0 to 255 (for example, 0: black to 255: white) is assigned to each pixel in accordance with the brightness. The assigned value is compared with pixel data relating to an authentic bill stored in advance, and authentication judgment processing is executed.

Incidentally, if a state change (a state change such that moisture adheres to a bill or perforation is found) has occurred to a bill inserted by a user, at a portion where such a state change has occurred, the transmitted image data becomes brighter than reflected image data (the brightness of pixels increases). In this case, with a bill without such a state change as described above, the transmitted image data is never brighter than reflected image data. Therefore, as to the bill to which such a state change has occurred, it is identified to be bogus when it is compared with pixel data relating to an authentic bill in the authentication judgment processing to be routinely performed.

In other words, if a state change such as adhering of moisture or perforation has occurred, even if it is an authentic bill, the bill can be identified to be bogus as a result of comparison processing at the state change portion, which may be inconvenient to users.

Therefore, in the present invention, a predetermined area is defined as to a bill to be inserted; even if the state change as described above has occurred to that portion, it is not identified to be bogus immediately; and comparison processing is performed at the other portion to thereby perform authentication processing. That is, pixel data in a predetermined area is acquired, and even if transmitted image data is brighter than reflected mage data in the predetermined area, it is assumed that a state change has merely occurred to a bill, so that authentication judgment processing in another region can be performed.

In this case, when it is identified that a state change merely has occurred after comparing the transmitted image data and reflected image data in the predetermined area with each other, if a numeric value of 0 to 255 (0: black to 255: white) is assigned in accordance with brightness of each pixel in the transmitted image data and reflected image data, for example, it is assumed that the following formula is met.

$$\Sigma aij-\Sigma bij\geq 0 \qquad \text{[Mathematical Formula 1]}$$

In the formula, a is a numeric value assigned to one pixel in a transmitted image, and (i, j) is a coordinate of a bill, a predetermined area is specified in advance in the coordinate, and a sum of pixels in the transmitted image of the predetermined area is derived. In addition, b is a numeric value assigned to one pixel in a reflected image, and a sum of pixels in the reflected image of the predetermined area is derived.

As in the formula described above, if a sum of the degrees of brightness in a transmitted image (which may be an average value) is greater than that of the reflected image, it is assumed that the transmitted image is brighter in the predetermined area. Then, it is assumed that a state change (adhering of moisture or perforation) has occurred; the predetermined area is eliminated, and actual authentication judgment processing is carried out.

In the third embodiment, the abovementioned predetermined area is set in a region other than the one in which different items of pixel information are acquired (such a region is referred to as a feature region) when light with different wavelengths is emitted from a light-emitting portion). That is, when light with different wavelengths is emitted from light-emitting portions (first light-emitting portion 3080*a* and second light-emitting portion 3081*b*), the region in which different items of pixel information are acquired is considered to be an important portion when bill authentication judgment is actually carried out. Thus, the other regions are eliminated from a target for actual authentication judgment as the abovementioned predetermined area. Therefore, even if a sum of degrees of brightness in a transmitted image (that may be an average value) is greater than that of a reflected image, the feature portion is never eliminated when authentication judgment processing is performed.

This is because, even if the state change as described above has occurred, there is a low possibility that such state change affects authentication judgment in particular. Such a region other than the feature region is set in the abovementioned predetermined area, whereby authentication judgment precision is prevented from being lowered.

The abovementioned bill feature region is considered to be a region in which a watermark image, for example, is formed. If moisture or the like adheres in the bill feature region, i.e., in the feature region, if a sum of degrees of brightness in a transmitted image (that may be an average value) is greater than that of a reflected image, that bill may be discharged immediately.

Actual authentication judgment processing is performed by comparing: reference pixel data relating to an authentic bill stored in advance by a ROM or the like with: transmitted-light data of light having transmitted the bill, the data being obtained by emitting light of a predetermined wavelength from light-emitting portions (first light-emitting portion 3080*a* and second light-emitting portion 3081*b*) to a printed region of a top face of a bill fed; and pixel data caused by reflected-light data of reflected light. As described above, even if the abovementioned formula is met in a predetermined area at a previous stage of the authentication judgment processing, it is judged to be a state change having occurred to an authentic bill. At the time of executing actual authentication judgment processing, the predetermined area is eliminated, and comparison processing with reference data (reference data obtained by eliminating predetermined area in advance) is executed.

Next, a description will be given with respect to a bill housing portion 3100 of sequentially stacking and housing bills identified to be authentic by means of the abovementioned bill reading means 3008.

As shown in FIG. 103 to FIG. 105, a main body frame 3100A configuring the bill housing portion 3100 is configured in a substantially rectangular parallelepiped shape. At the inside of a front wall 3102*a* thereof, one end of biasing means (biasing spring) 3106 is mounted, and at the other end thereof, a placement plate 3105 for substantially stacking bills fed via the abovementioned acceptance inlet 3103 is provided. Therefore, the placement plate 3105 is biased to the pressurization plate 3115 side described later via the biasing means 3106.

A pressurization waiting portion 3108 for waiting for and retaining a dropping bill as it is, so as to be continuous to the acceptance inlet 3103 is provided in the main body frame 3100A. A pair of restriction members 3110 is disposed to extend in a vertical direction at each side of the placement plate side of the pressurization waiting portion 3108. Between the pair of restriction members 3110, an opening is formed so that the pressurization plate 3115 passes when bills are sequentially stacked on the placement plate 3105.

On each side wall in the main body plate 3100A, a protrusion wall is formed so that the placement plate abuts when the placement plate 3105 is pressurized by the biasing means 3106. This protrusion wall serves to abut each side of a top bill and stably retain bills stacked when bills are sequentially stacked on the placement plate 3105 and the placement plate is biased by the biasing means 3106.

Further, a pressurization plate 3115 for pressurizing a bill having dropped on the pressurization waiting portion 3108 from the acceptance inlet 3103 to the placement plate 3105 is arranged in the main body frame 3100A. This pressurization plate 3115 is configured in size to an extent such that an opening formed between the pair of restriction members 3110 can be reciprocally moved. This pressurization plate is reciprocally driven between a position (pressurization position) where the plate enters the opening and the bill is pressed against the placement plate 3105 and a position (initial position) of releasing the pressurization waiting portion 3108. In this case, by a pressing operation of the pressurization plate 3115, the bill passes through the opening while slacking, and then, is placed on the placement plate 3105.

The pressurization plate 3115 is reciprocally driven as described above via a pressurization plate driving mechanism 3120 arranged in the main body frame 3100A. The pressurization plate driving mechanism 3120 includes one pair of link members 3115*a*, 3115*b*, both ends of which are pivoted by the pressurization plate 3115, so as to enable the pressurization plate 3115 to be reciprocally moved in the direction indicated by the arrow A of FIG. 103 and FIG. 104. These link members 3115*a*, 3115*b* are coupled with each other in an X-shape, and their opposite end parts are pivoted by a movable member 3122 movably installed in a vertical direction (the direction indicated by the arrow B). A rack is formed at the movable member 3122, and a pinion configuring the pressurization plate driving mechanism 3120 is meshed with the rack.

A housing section side gear train 3124 configuring the pressurization plate driving mechanism 3120 is coupled with this pinion, as shown in FIG. 104. In this case, in the third embodiment, as shown in FIG. 104, a driving source (motor 3020) and a main body side gear train 3021 which is sequentially meshed with the motor 3020 are arranged in the abovementioned apparatus main body 3002. The bill housing section 3100 is attached to the apparatus main body 3002 so that the main body side gear train 3021 is coupled with the housing section side gear train 3124. That is, the housing section side gear train 3124 includes: gears 3124B coaxially arranged with the pinion; and gears 3124C, 3124D sequentially meshed therewith, and is configured that the gear 3124D is meshed with or spaced from a final gear 3021A of the main body side gear train 3021 when the bill housing section 3100 is mounted to or removed from the frame 3002A of the apparatus main body 3002.

As a result, a motor 3020 provided in the apparatus main body 3002 is rotationally driven, whereby the abovementioned pressurization plate 3115 is reciprocally driven in the direction indicated by the arrow A via the main body side gear train 3021 and the pressurization plate driving mechanism 3120 (such as a housing section side gear train 3124, a rack formed at movable member 3122, and link members 3115*a*, 3115*b*).

A feeding member 3150, which is capable of coming into contact with a bill fed-in from the acceptance inlet 3103, is installed in the main body frame 3100A. The feeding member 3150 serves to touch a fed-in bill and stably guide the bill to an appropriate position of a pressurization waiting portion 3108 (the position at which the bill can be stably pressurized without being one-sided to the left or right when it is pressurized by the pressurization plate 3115). In the third embodiment, the feeding member is comprised of a belt-shaped member (hereinafter, referred to as a belt 3150) which is installed so as to be seen at the pressurization waiting portion 3108.

In this case, the belt 3150 is installed so as to extend along the feed-in direction to a bill, and is wound around one pair of pulleys 3150A, 3150B rotationally supported at both ends of the feed-in direction. The belt 3150 abuts against a feeding roller 3150C extending in an axial direction, the roller being rotatably supported in a region of the acceptance inlet 3103, so as to guide a bill to the pressurization waiting portion 3108 as it is while the bill fed into the acceptance inlet 3103 is sandwiched therebetween. Further, while in the third embodiment the belt 3150 is horizontally provided in one pair so as to sandwich the abovementioned pressurization plate 3115, the belt 3150 may be abutted against a tension pulley at an intermediate position other than winding of the pulleys 3150A, 3150B at both ends so as to prevent slackness.

The pair of belts 3150 is adapted to be driven by means of a motor 3013 for driving the abovementioned plurality of feeding rollers which are installed in the apparatus main body 3002. Specifically, as shown in FIG. 105, the abovementioned driving belt 3013B driven by the motor 3013 is wound around a driving force transmission pulley 3013D so that a gear train 3153, which is installed at an end part of a support shaft of the pulley 3150A that is rotatably supported at the acceptance inlet 3103 side, is meshed with a power transmission gear trains 3013E which are sequentially instated at the pulley 3013D. That is, when the bill housing section 3100 is attached to the apparatus main body 3002, an input gear of the gear train 3153 is meshed with a final gear of the gear train 3013E so that one pair of belts 3150 are rotationally driven integrally with the abovementioned feeding rollers 3014B, 3015B, 3016B, 3017B for feeding a bill by means of rotational driving of the motor 3013.

As described above, when a bill is inserted via the bill insertion slot 3005, the bill is moved into the bill feeding path 3003 by means of the abovementioned bill feeding mechanism 3006. The bill feeding path 3003, as shown in FIG. 103, is provided with: a first feeding path 3003A extending from the bill insertion slot 3005 to the back side; and a second feeding path 3003B extending from the first feeding path 3003A to the downstream side and tilting at a predetermined angle with respect to the first feeding path 3003A.

On the second feeding path 3003B, a pullout preventing member (shutter member) 3170 is installed for preventing a bill from moving to the bill insertion slot 3005 side by way of illegal act or the like. The pullout preventing member 3170 is turnably biased via a support shaft 3170*a* in the direction indicated by the arrow of FIG. 103 (the direction of closing the second feeding path 3003B). When a bill moves to the bill housing section 3100 side, this member turns so as to release the second feeding path against a biasing force. Once the bill passes, the pullout preventing member is turned in the direction indicated by the arrow, due to its biasing force, and then, the second feeding path 3003B is closed. That is, when a rear end of a bill passes through the pullout preventing member 3170, the second feeding 3003B is closed by the pullout preventing member 3170 so as to disable pullout of bills.

Such a pullout preventing member may be installed at a plurality of sites along a feeding path at the downstream side of the bill reading means 3008. As to its installation position, as described later, it is sufficient if the pullout preventing member is positioned more a downstream side than a position at which a bill stops while bill authentication judgment processing is performed (Escrow position; in the third embodiment, this position is defined as a position by about 13 mm at the downstream side of the bill reading means 3008).

<<<Control Means 3200 of the First Mode>>>

Next, control means 3200 for controlling driving of a driving member such as the abovementioned bill feeding mechanism 3006 or bill reading member 3008 will be described with reference to a block diagram of FIG. 106.

Figure 106:
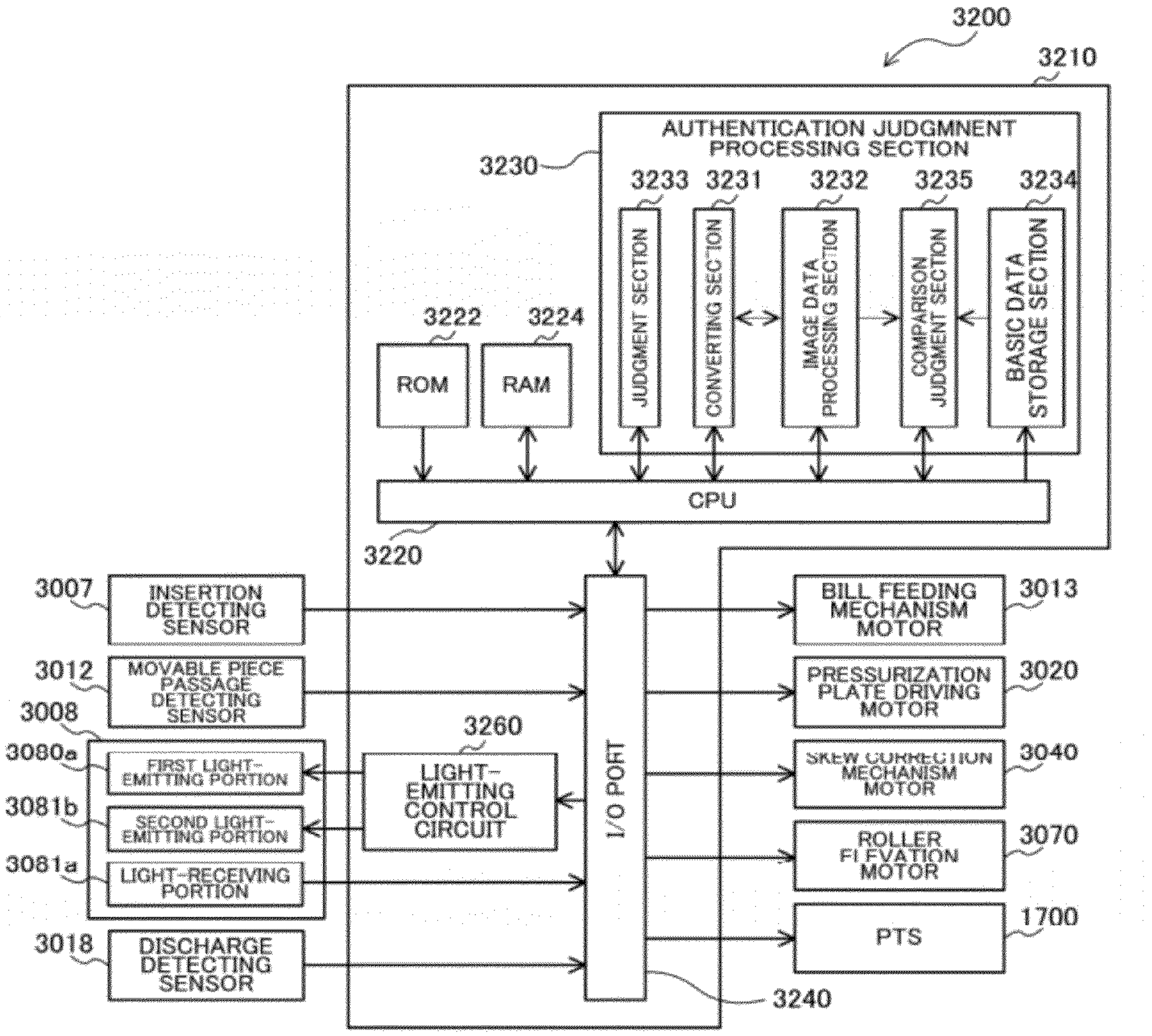
FIG. 106 is a block diagram showing the configuration of control means for controlling drive of drive members such as the bill transport mechanism and bill reading means.
Figure 107:
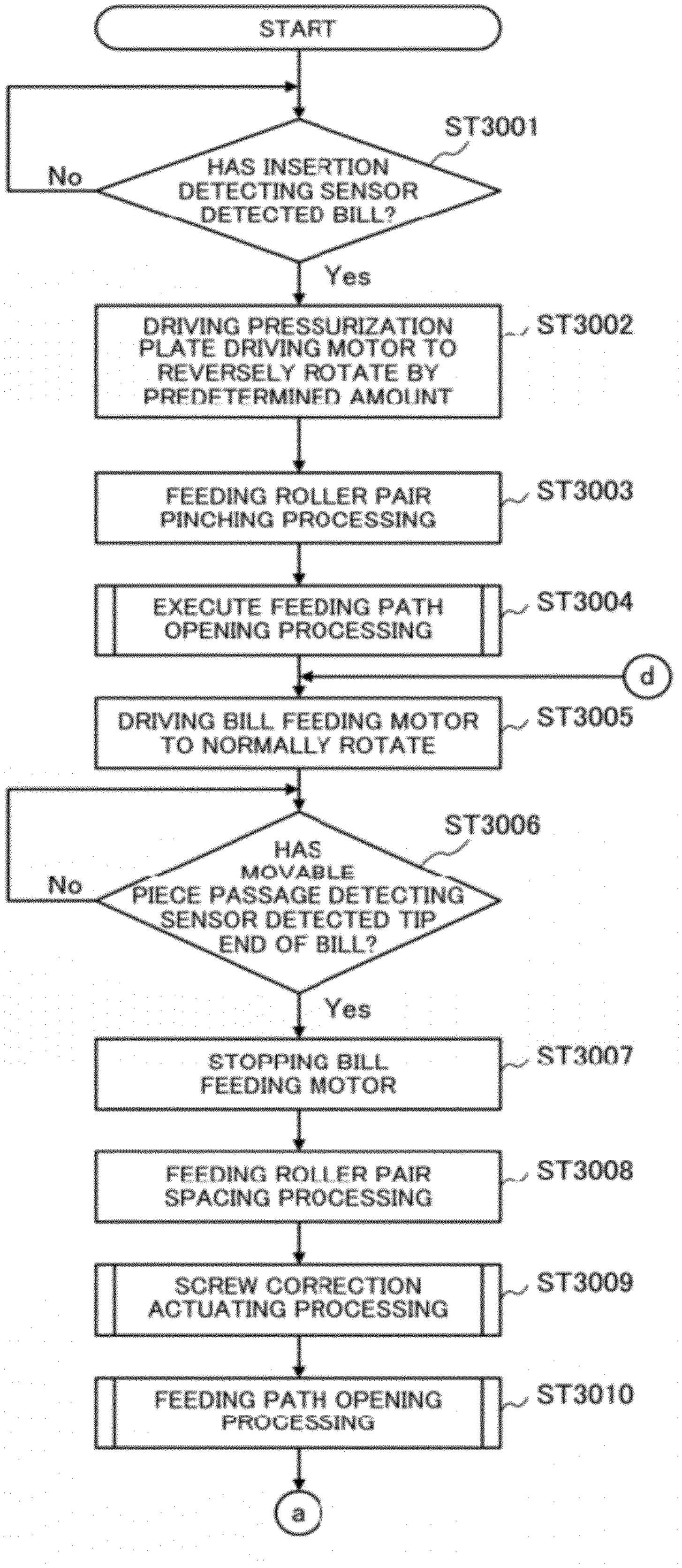
FIG. 107 is a flowchart explaining a processing operation of a bill in the bill processing device of the third embodiment (part 1)

The control means 3200 depicted in the block diagram of FIG. 106 is provided with a control board 3210 for controlling operation of each of the driving devices mentioned above. On the control board 3210, there are mounted: a CPU (Central Processing Unit) 3220 for controlling driving of each of the driving devices and configures bill identifying means; a ROM (Read Only Memory) 3222; a RAM (Random Access Memory) 3224; and an authentication judgment processing section 3230.

The abovementioned ROM 3222 stores permanent data such as: operating programs of various kinds of driving devices such as a bill feeding mechanism motor 3013, a pressurization plate driving motor 3020, a skew correction mechanism motor 3040, and roller elevation motor 3070; an authentication judgment program in the authentication judgment processing section 3230; and various kinds of programs such as a duplicate-feed judgment program for judging a fold or a duplicate-feed at a tip end portion of a bill.

The abovementioned CPU 3220 operates in accordance with the programs stored in the ROM 3222, inputs/outputs a signal to/from the variety of driving devices via an I/O port 3240, and performs entire operational control of the bill handling apparatus. That is, the bill feeding mechanism motor 3013, the pressurization plate driving motor 3020, the skew correction mechanism motor 3040, and the roller elevation motor 3070 are connected to the CPU 3220 via the I/O port 3240. These driving devices are operatively controlled by means of a control signal from the CPU 3220 in accordance with the operating program stored in the ROM 3222. Detection signals from an insertion detecting sensor 3007, a movable piece passage detecting sensor 3012, and a discharge detecting sensor 3018 are inputted to the CPU 3220 via the I/O port 3240, and based on these detection signals, each of the driving devices is controlled to be driven.

To the CPU 3220, via the I/O port 3240, a detection signal which is based on transmitted light or reflected light of the light emitted to a bill targeted for identification is inputted from a light-receiving portion 3081*a* in the abovementioned bill reading means 3008. As to a first light-emitting portion 3080*a* and a second light-emitting portion 3081*b* in the bill reading means 3008, in accordance with the operating program stored in the abovementioned ROM 3222, lighting intervals and lighting-out are controlled via a light-emitting control circuit 3260 by means of a control signal from the CPU 3220.

Further, the I/O port 3240 has a portion to be connected to a PTS terminal 1700 mentioned above. As described later, denomination data indicating denomination of a bill having entered into the bill handling apparatus 3001; and amount-of-money data indicating an amount of money of that bill, are transmitted to the PTS terminal 1700 via the I/O port 3240.

The RAM 3224 temporarily stores data or programs employed when the CPU 3220 operates and has a function of acquiring and temporarily storing light-receiving data of a bill targeted to be identified. The RAM 3224 stores: transmitted image data comprised of a plurality of pixels converted by a converting section 3231 to be described later from the transmitted light received by the light-receiving portion 3081*a*; and reflected image data comprised of a plurality of pixels converted by the converting section 3231 from the reflected light received by the light-receiving portion 3081*a*.

The authentication judgment processing section 3230 has a function of judging whether or not a bill fed is authentic. The authentication judgment processing section 3230 is provided with: a converting section 3231 for converting light-receiving data of an identification target stored in the RAM 3224 to pixel information including color information (density value) having brightness on a pixel-by-pixel basis; an image data processing section 3232 which acquires image data which is based on the pixel information converted by the converting section 3231; and a judgment section 3233 for comparing a degree of pixels of the abovementioned transmitted image in the predetermined area with brightness of the reflected image corresponding to the predetermined area of the transmitted image, and then, based on a result of the comparison, eliminating the predetermined area from a target for authentication judgment. Thus, in a case where the judgment section 3233 judges that the brightness of a transmitted image in a predetermined area is higher than that of a reflected image in the same predetermined area, based on the abovementioned formula, image data of a state in which image data which is based on the transmitted light obtained in the predetermined area and the image data which is based on the reflected light are eliminated is inputted to the image data processing section 3232.

The authentication judgment processing section 3230 is provided with: a reference data storage section 3234 which stores reference data relating to an authentic bill (pixel data relating to an authentic bill); and a comparison judgment section 3235 which compares image data (pixel data) of a bill acquired in the image data processing section 3232 with reference data (reference pixel data) stored in the reference data storage section 3234 and then performs judgment processing as to whether or not a bill fed is authentic.

In this case, the reference data storage section 3234 stores: image data relating to an authentic bill employed at the time of carrying out the abovementioned authentication judgment processing; and image data relating to an authentic bill eliminating the abovementioned predetermined area. That is, while in regular authentication judgment processing the one including image data in the predetermined area is defined as reference data, if a predetermined area is eliminated in the judgment section 3233, the image data eliminating the predetermined area is employed as reference data. Apart from the above reference data, the reference data storage section 3234 stores, on a denomination-by-denomination basis, various items of reference data employed at the time of authentication judgment such as a reference value of a print length relating to an authentic bill, for example.

While such reference data is stored in a dedicated reference data storage section 3233, the data may be stored in the abovementioned ROM 3222.

Actual authentication judgment processing in the above authentication judgment processing section 3230 is performed by emitting light with a predetermined wavelength is emitted from light-emitting portions (first light-emitting portion 3080*a* and second light-emitting portion 3081*b*) to a printed region of a top face of a bill fed; converting transmitted-light data of the light having transmitted the bill to a plurality of pixel data including color information having brightness and defining a predetermined size as one unit in the converting section 3231; and comparing the converted data with reference pixel data relating to an authentic bill stored in advance in the reference data storage section 3234. As described above, in a case where the judgment section 3233 judges that a state change has occurred in a predetermined area of a bill, image data of a portion eliminating the predetermined area is acquired and then authentication judgment processing is performed.

Next, a bill handling operation in a bill handling apparatus 3001, which is executed by the abovementioned control means 3200, will be described in accordance with the flowcharts of FIG. 107 to FIG. 113.

When an operator inserts a bill into a bill insertion slot 3005, feeding roller pairs (3014A, 3014B) installed in the vicinity of the bill insertion slot are spaced from each other in an initial state (refer to ST3016, ST3056 to be described later). A pressurization plate 3115 allows one pair of link members 3115*a*, 3115*b* for driving the pressurization plate 3115 to be positioned at the pressurization waiting portion 3108. The bill is set a standby position at which it cannot be fed into the pressurization waiting portion 3108 from an acceptance inlet 3103 by means of one pair of link members 3115*a*, 3115*b*. That is, in this state, the pressurization plate 3115 enters an opening formed between one pair of restricting member 3110, so that a bill housed in a bill housing section cannot be pulled out via the opening.

Further, one pair of movable pieces 3010A configuring a skew correction mechanism 3010 positioned at the downstream side of a feeding roller pair (3014A, 3014B) has moved to a minimum width (for example, an interval of one pair of movable pieces 3010A is 52 mm; refer to ST3015, ST3057 to be described later) so as to disable pullout of every bill in an initial state.

In the initial state of the feeding roller pair (3014A, 3014B) described above, an operator can easily insert even a winkled bill. When the insertion detecting sensor 3007 detects insertion of a bill (ST3001), the motor 3020 for driving the abovementioned pressurization plate 3115 is driven reversely by a predetermined amount (ST3002), the pressurization plate 3115 is moved to an initial position. That is, until the insertion detecting sensor 3007 detects insertion of a bill, the pressurization plate 3115 has moved to an opening formed between one pair of restricting members 3110, and is set so as to disable a bill from passing via the opening.

When the pressurization plate 3115 has been moved from a standby position to an initial position, the pressurization waiting portion 3108 is released (see FIG. 104). A bill can then be fed into the bill housing section 3100. That is, the motor 3020 is reversely driven by a predetermined amount, whereby the pressurization plate 3115 is moved from the standby position to the initial position via a main body side gear train 3021 and a pressurization plate driving mechanism 3120 (a housing section side gear train 3124, a rack, which is formed at a movable member 3122, and link members 3115*a*, 3115*b*).

The abovementioned roller elevation motor 3070 is driven to move an upper feeding roller 3014A so as to abut against a lower feeding roller 3014B. In this manner, the inserted bill is pinched by feeding roller pairs (3014A, 3014B) (ST3003).

Figure 110:
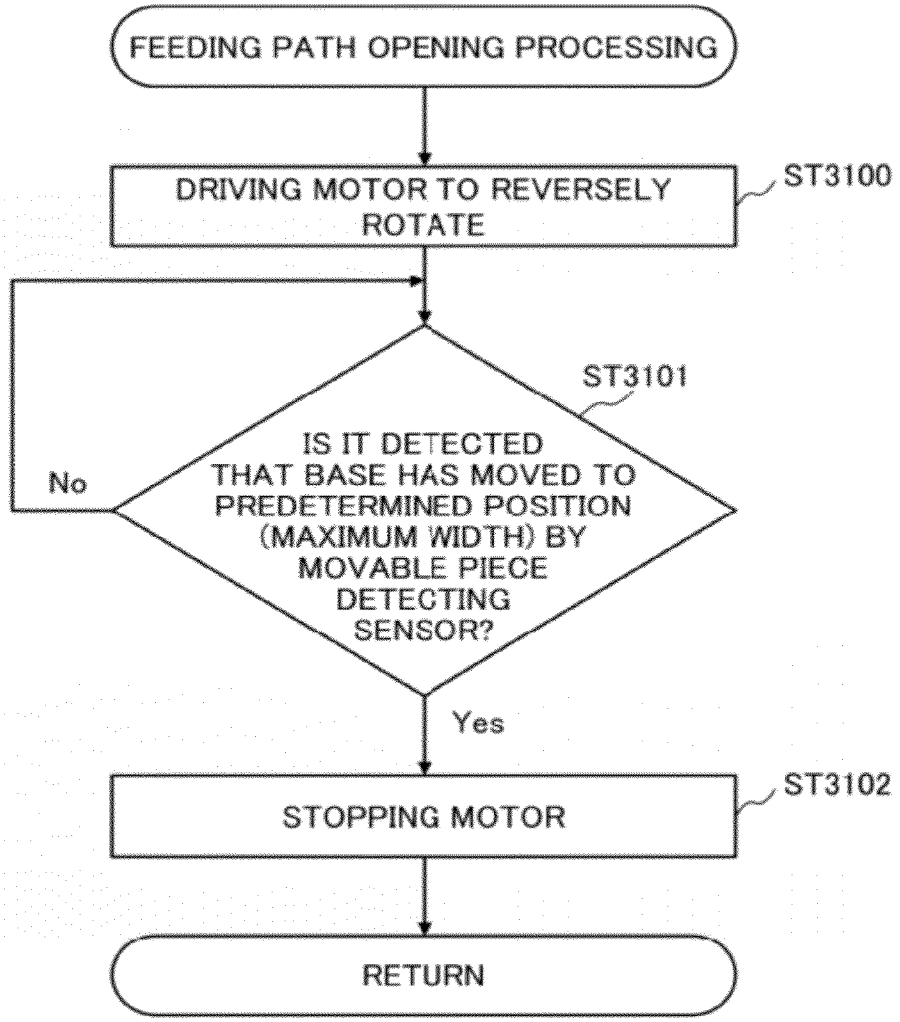
FIG. 110 is a flowchart explaining a transport path release process procedure.

Next, opening processing of a bill feeding path is performed (ST3004). This opening processing, as shown in the flowchart shown in FIG. 110, is performed by reversely driving the abovementioned skew correction mechanism motor 3040 to thereby driving one pair of movable pieces 3010A in a direction in which they are spaced from each other (ST3100). At this time, if a movable piece detecting sensor for detecting a position of one pair of movable pieces 3010A detects that one pair of movable pieces 3010A has moved to a predetermined position (maximum width position) (ST 3101), reverse driving of the motor 3040 is stopped (ST3102). By this feeding path opening processing, a bill can be advanced into one pair of movable pieces 3010A. At the previous stage of ST3004, while the bill feeding path 3003 is closed by feeding path closing processing (ST3015, ST3057) to be described later, the bill feeding path 3003 is closed before inserting a bill. This makes it possible to prevent an element such as a line sensor from being broken by inserting a plate-like member through a bill insertion slot for illegal purpose or the like, for example.

Next, the bill feeding motor 3013 is driven to normally rotate (ST3005). A bill is fed into the apparatus by means of a feeding roller pair (3014A, 3014B). When the movable piece passage detecting section sensor 3012 arranged at the downstream side than the skew correction mechanism 3010 detects a tip end of the bill, the bill feeding motor 3013 is stopped (ST3006, ST3007). At this time, the bill is positioned between one pair of movable pieces 3010A configuring the skew correction mechanism 3010.

Subsequently, the abovementioned roller elevation motor 3070 is driven and then the feeding roller pair (3014A, 3014B) having pinching the bill are spaced from each other (ST3008). At this time, no load acts on the bill.

Figure 111:
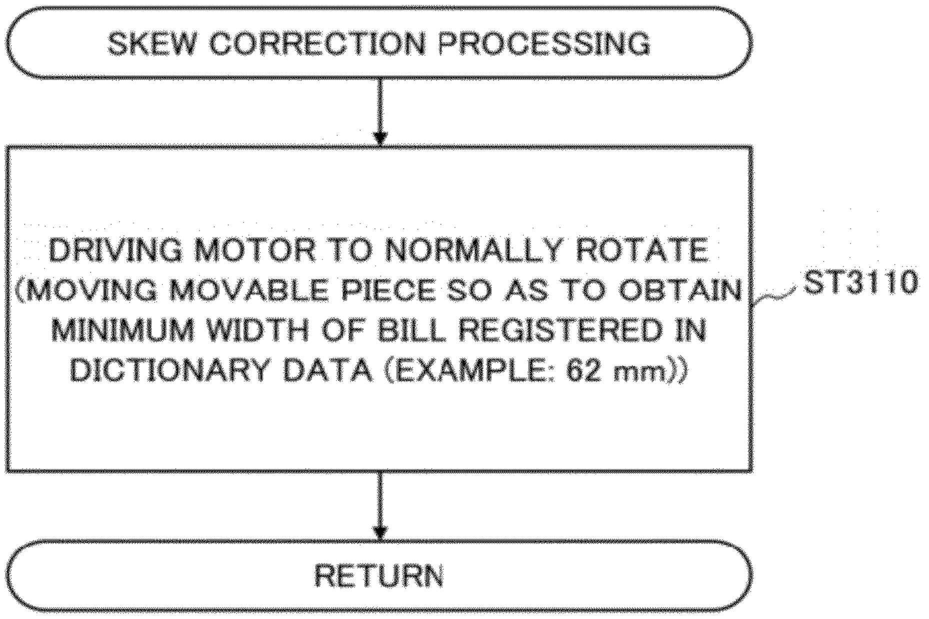
FIG. 111 is a flowchart explaining a skew correction activation process procedure.

Skew correction actuation processing is then performed in this state (ST3009). This skew correction actuation processing is performed by driving the abovementioned skew correction mechanism motor 3040 to normally rotate, thereby driving one pair of movable pieces 3010A in a direction in which they approach each other. That is, in this skew correction actuation processing, as shown in the flowchart of FIG. 111, the abovementioned motor 3040 is driven to normally rotate, thereby moving one pair of movable pieces 3010A in a direction in which they approach each other (ST3110). The movement of these movable pieces is executed until a minimum width (for example, 62 mm in width) of a bill registered in a reference data storage section in control means has been reached, whereby a skew is corrected by means of the movable pieces 3010A abutting against each side and then the bill is positioned so as to be set at a precise center position.

When the skew correction actuation processing as described above completes, feeding path opening processing is subsequently executed (ST3010). This processing is performed by reversely driving the abovementioned skew correction mechanism motor 3040 to thereby move one pair of movable pieces 3010A in a direction in which they are spaced from each other (see ST3100 to ST3102 of FIG. 110).

Subsequently, the abovementioned roller elevation motor 3070 is driven, an upper feeding roller 3014A is moved to abut against a lower feeding roller 3014B, and a bill is pinched between the feeding roller pair (3014A, 3014B) (ST3011). Then, the bill feeding motor 3013 is driven to normally rotate to feed the bill into the apparatus, and when the bill passes through the bill reading means 3008, bill reading processing is started (ST3012, ST3013).

Figure 112:
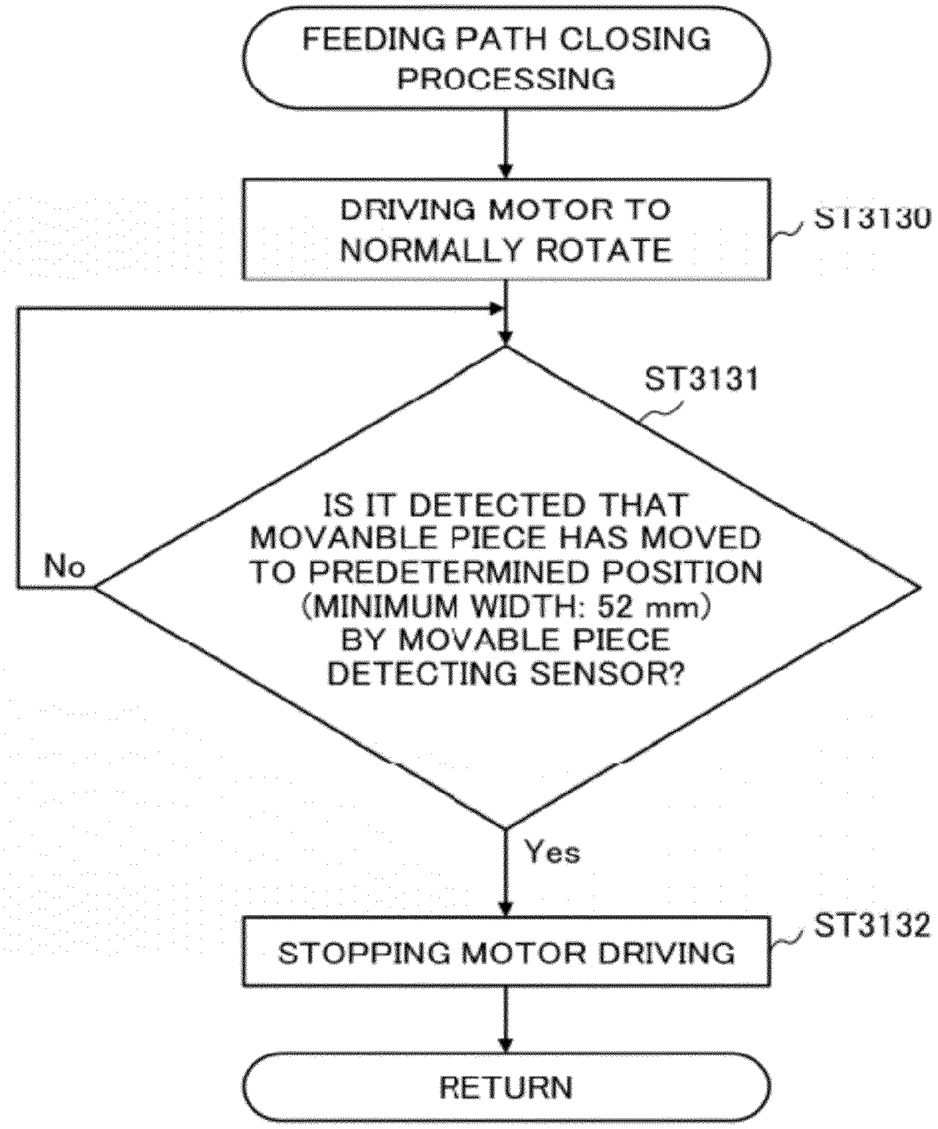
FIG. 112 is a flowchart showing a transport path closing process procedure.

After the fed bill has passed through the bill reading means 3008, when the movable piece passage detecting sensor 3012 detects a rear end of the fill (ST3014), closing processing of the bill feeding path 3003 is executed (ST3015). In this processing, first, as shown in the flowchart of FIG. 112, after the movable piece passage detecting sensor 3012 has detected the rear end of the bill, the abovementioned motor 3040 is driven to normally rotate, thereby moving one pair of movable pieces 3010A in a direction in which they approach each other (ST3130). Next, when the movable piece detecting sensor detects that the movable piece 3010A has moved to a predetermined position (minimum width position, for example, 52 mm) (ST3131), normal rotation driving of the motor 3040 is stopped (ST3132).

By means of the feeding path closing processing, one pair of movable pieces 3010A is moved to a minimum width position (52 mm in width) which is narrower than a width of every bill which can be inserted, so as to thereby effectively prevent pullout of the bill. That is, such closing processing of the bill feeding path is executed, whereby a distance between the movable pieces 3010A is shorter than the width of the inserted bill, to be able to effectively prevent an operator from an illegal act such as pulling out a bill to the insertion slot direction for illegal purpose.

Subsequent to the abovementioned feeding path closing processing (ST3015), feeding roller pair spacing processing is performed of driving the abovementioned roller elevation motor 3070 to space a feeding roller pair (3014A, 3014B) set in a state in which a bill can be pinched therebetween (ST3016). By performing the feeding roller pair spacing processing, even if an operator mistakenly additionally enters a bill (double entry), the bill is not subjected to feed operation by the feeding roller pair (3014A, 3014B). In addition, the bill abuts against a front face of one pair of movable piece 3010A having approached in ST3015, to thus able to reliably prevent double entry operation of bills.

With the abovementioned closing processing of the bill feeding path, when the bill reading means 3008 reads data up to a rear end of a bill, the bill feeding motor 3013 is driven by a predetermined amount. Then a bill is stopped at a predetermined position (Escrow position: the position at which a bill is fed to the downstream side by 13 mm from a center position of the bill reading means 3008). At this time, in the authentication judgment processing section 3230 of the control means 3200, the comparison judgment section 3235 executes bill authentication judgment processing by referring to reference data stored in the reference data storage section 3234 (ST3017 to ST3020).

Figure 113:
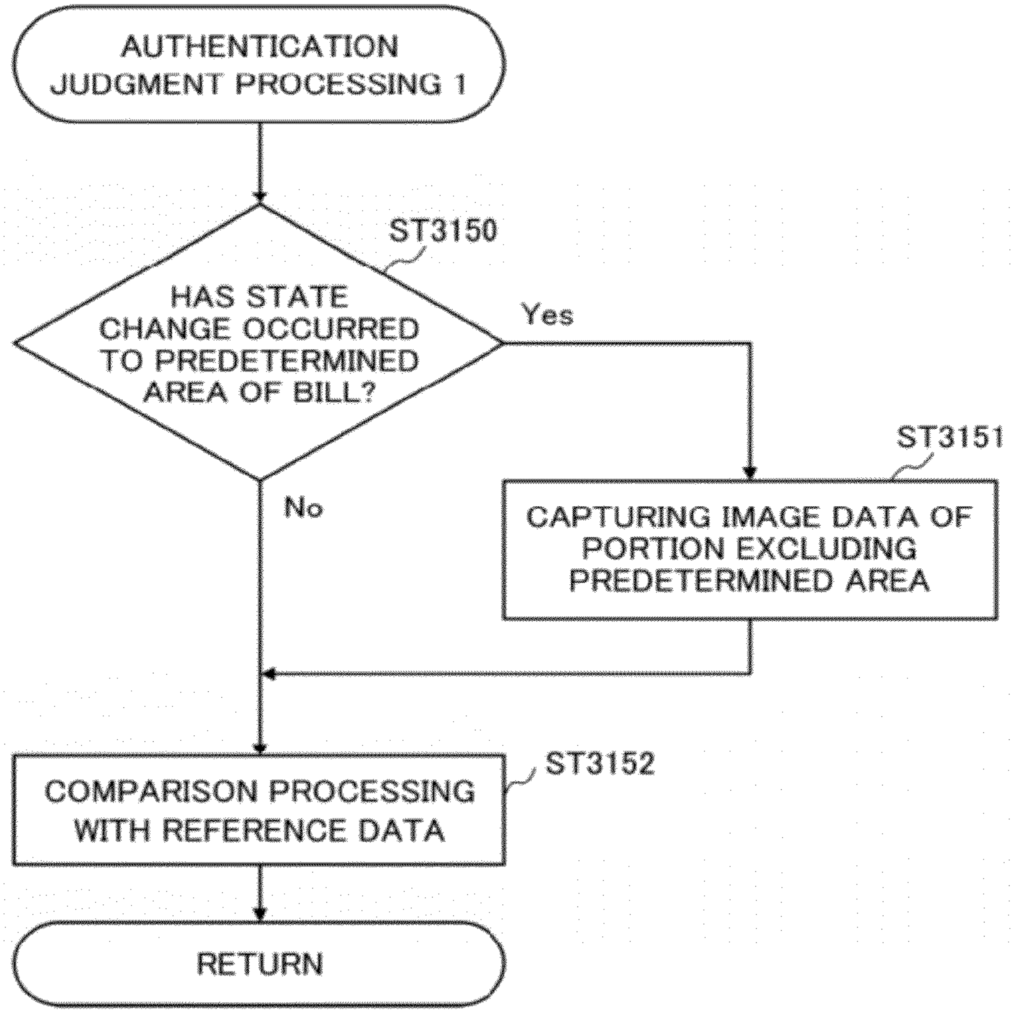
FIG. 113 is a flowchart explaining an authenticity determining process.

In the authentication judgment processing, first, as shown in FIG. 113, the judgment section 3233 compares brightness of pixels of a transmitted image in a predetermined area of a bill with brightness of pixels of a reflected image corresponding to the predetermined area of the transmitted image, and then, judges whether or not a state change has occurred in the predetermined area (ST3150). This judgment is performed based on the abovementioned formula, by comparing a sum of degrees of brightness of the transmitted image in the predetermined area with a sum of degrees of brightness of the reflected image in the same predetermined area. Where it is judged that no state change has occurred, the image data processing section 3232 acquires image data including the predetermined area and then the comparison judgment section 3235 performs comparison processing with the reference data stored in the reference data storage section 3234 (reference data eliminating the predetermined area) (ST3152). On the other hand, where the judgment section 3233 judges that a state change has occurred in the predetermined area, the image data processing section 3232 acquires image data eliminating the predetermined area (ST3151) and then the comparison judgment section 3235 performs comparison processing with the reference data stored in the reference data storage section 3234 (reference data eliminating the predetermined area) (ST3152).

In the abovementioned comparison processing in ST3152, when it is judged that an entered bill is authentic, denomination data indicating denomination of the entered bill and amount-of-money data indicating an amount of money are acquired by applying processing such as character recognition with the use of image data read by the bill reading means 3008; and the acquired denomination data and amount-of-money data are stored in the RAM 3224. These items of information are transmitted to a PTS terminal 1700 as described later.

In the abovementioned authentication judgment processing of ST3020, when it is judged that a bill is authentic (ST3021; Yes), the bill feeding motor 3013 is driven to normally rotate (ST3022). At the time of feeding the bill, the bill feeding motor 3013 is driven to normally rotate until he discharge detecting sensor 3018 detects a rear end of the bill (ST3023). After the discharge detecting sensor 3018 has detected the rear end of the bill, the bill feeding motor 3013 is driven to normally rotate by a predetermined amount (ST3024, ST3025).

In normal rotation driving processing of the bill feeding motor 3013 in ST3024 and ST3025, a bill is fed into the acceptance inlet 3103 of the bill housing section 3100 from the discharge outlet 3003 situated at the downstream side of the bill feeding path 3003 of the apparatus main body 3002; the pair of belts 3150 comes into contact with an each-side top face of a bill fed and then is stabilized, and corresponds to the driving amount to be guided to the pressurization standby section 3108. That is, after the discharge detecting sensor has detected the rear end of the bill, the bill feeding motor 3013 is further driven to normally rotate the bill feeding motor 3013, whereby the pair of belts 3150 is driven in a bill feeding direction while it comes into contact with the fed bill, so as to guide the bill to the pressurization standby section 3108 in a stable state.

After the abovementioned bill feeding motor 3013 has stopped, driving processing of the pressurization plate 3115 is executed so as to place a bill onto a placement plate 3105 (ST3026). When pressurization processing completes, the pressurization plate 3115 is moved again to its standby position and then is stopped at that position.

In ST3021 of the abovementioned operating procedures, where it is judged that the inserted bill is not authentic, feeding path opening processing is executed (see ST3051 and ST3100 to ST3102 of FIG. 110). Afterwards, the bill feeding motor 3013 is driven to rotate; pinching processing of the feeding roller pair (3014A, 3014B) is executed and then the bill that is on standby at an Escrow position is fed to the bill insertion slot 3005 (ST3052, ST3053). When the insertion detecting sensor 3007 has detected a rear end of a bill to be returned to the bill insertion slot 3005, reverse rotation driving of the bill feeding motor 3013 is stopped. In addition, the abovementioned roller elevation motor 3070 is driven to space the feeding roller pair (3014A, 3014B) having pinched a bill (ST3054 to ST3056). Afterwards, feeding path closing processing is carried out (see ST3057 and ST3130 to ST 3132 of FIG. 112) and the driving motor 3020 of the pressurization plate 3113 is driven to normally rotate by a predetermined amount (ST3058), thereby driving the pressurization plate 3115 to move from an initial position to a standby position.

Figure 114:
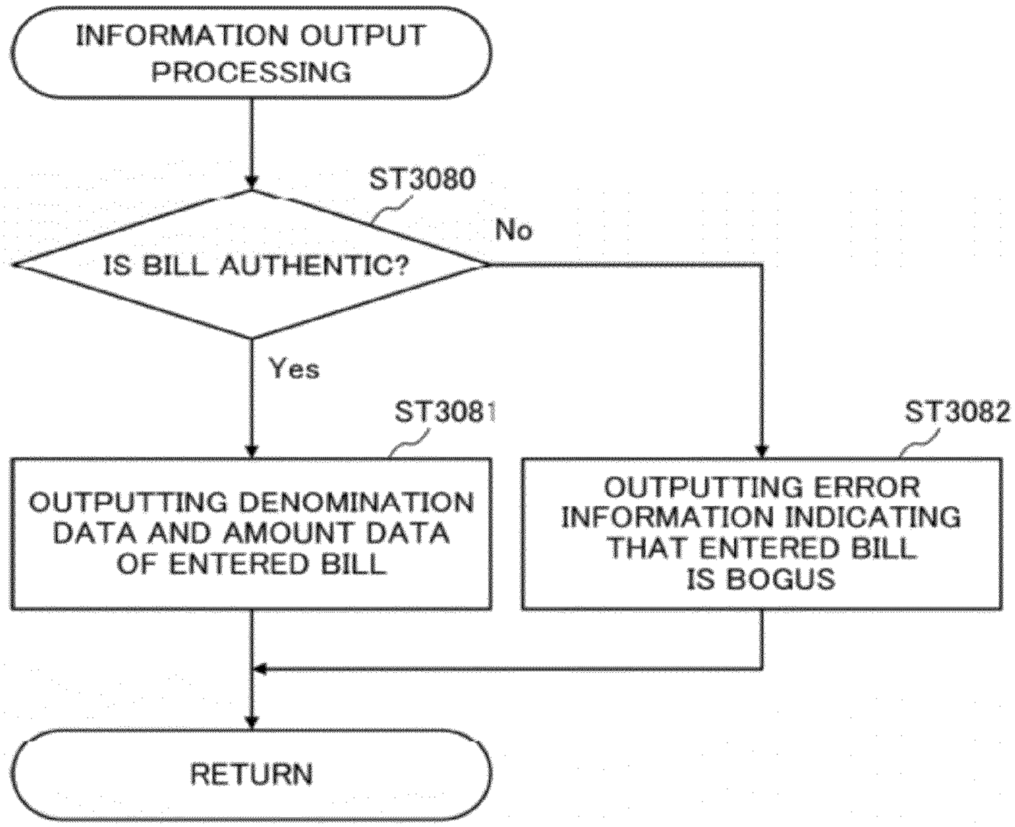
FIG. 114 is a flowchart depicting a subroutine of an information output process.

After the abovementioned processing of ST3026 or the processing of ST3058 has been executed, a subroutine of information output processing shown in FIG. 114 is invoked and executed (ST3070).

FIG. 114 is a flowchart showing a subroutine of processing of outputting various items of information to the PTS terminal 1700.

First, it is judged whether or not a result of bill authentication judgment is authentic (step ST3071). The result of bill authentication judgment can be obtained by executing the abovementioned subroutine shown in FIG. 113.

When it is judged that the result of bill authentication judgment is authentic (YES), the denomination data indicating denomination of a bill and amount-of-money data indicating an amount of money are outputted to the PTS terminal 1700 via the I/O port 3240 (step ST3072) and then this subroutine is completed. The denomination of the bill consists of bill attribute information indicating attributes of bills including countries, governments, or governmental banks or regions and the like issuing and administering bills such as US-dollar bills, Yen bills, or Hong Kong bills. The amount used herein is an amount corresponds to a currency unit defined depending on the attribute of that bill. The currency unit used herein includes US dollars or Yen, for example.

When it is judged that the result of bill authentication result is bogus (NO), error information indicating that the entered bill is bogus is outputted to the PTS terminal 1700 via the I/O port 3240 (step ST3073), and then, this subroutine is terminated.

The denomination data indicating denomination and amount-of-money data indicating an amount of money are thus transmitted to the PTS terminal 1700, whereby the PTS terminal 1700 can acquire denomination data and amount-of-money data of the bill entered into the bill handling apparatus 3001, and based on these items of data, various kinds of processing operations such as credit conversion or money exchange according to an exchange rate at that time can be executed.

According to the bill handling apparatus of the abovementioned configuration, in a case where a bill such that a state change has occurred in a predetermined area has been inserted in spite of an authentic bill, first, the judgment section judges whether or not the state change has occurred (mainly defective one such as those containing moisture or perforation), and if a state change has occurred in the predetermined area, the predetermined area is eliminated from a target for authentication judgment. Therefore, even if it is an authentic bill, a possibility that a bogus bill is judged due to the state change is reduced, and it becomes possible to improve authentication judgment precision.

In particular, in a gaming facility such as casino, a player may eat and drink something during a play. In a case where the player eats and drinks something, it is presumed that a bill is made dirty by something to drink or eat. Such contaminated bill makes the player trouble and makes processing of the gaming facility complicated where it is judged to be bogus in spite of an authentic bill. The abovementioned bill handling apparatus 3001 can reduce a possibility that it is judged to be bogus due to a state change, to thus able to prevent a player from annoyance or response of the gaming facility from being complicated. The bill handling apparatus 3001 can be mounted on a gaming machine in addition to being mounted on a gaming machine renting machine, auto vending machine, ticket machine or the like.

In the third embodiment, a predetermined area of a bill is set in a region other than a feature region for acquiring different items of pixel information when light with different wavelengths is emitted from a light-emitting portion configuring bill reading means (an important region for judging bill authentication). Even if the state change as described above has occurred in the predetermined area, a possibility of affecting authentication judgment is lowered, and the lowering of authentication judgment precision is prevented.

In the abovementioned third embodiment, a light-receiving portion is comprised of a line sensor reading a range of the entire widthwise direction of a bill, to thus able to precisely specify the abovementioned predetermined area or feature region and to be able to improve authentication judgment precision more remarkably.

While the embodiment of the present invention has been described hereinabove, the present invention can be variously modified and carried out without being limitative thereto.

For example, the predetermined area eliminated from authentication judgment if a state change has occurred may be provided at a plurality of sites on a bill, or that square region can be appropriately changed. In addition, the present invention is characterized in that if a state change has occurred to a predetermined area in a bill authentication judgment processing, authentication judgment processing is performed while the predetermined area is eliminated. Other configurations can be variously changes without being limitative to the third embodiment. For example, the configuration or layout and the like of the bill reading means 3008 can be appropriately changed.

The present invention is not limitative to the bill handling apparatus, and can be incorporated into an apparatus providing various kinds of commodities or services by inserting sheets such as coupon tickets or service tickets.

<<<Control Means 3200 of the Second Mode>>>

Next, control means 3200 for controlling driving of driving members such as the abovementioned bill feeding mechanism 3006 and bill reading means 3008 will be described with reference to the block diagram of FIG. 116.

Figure 116:
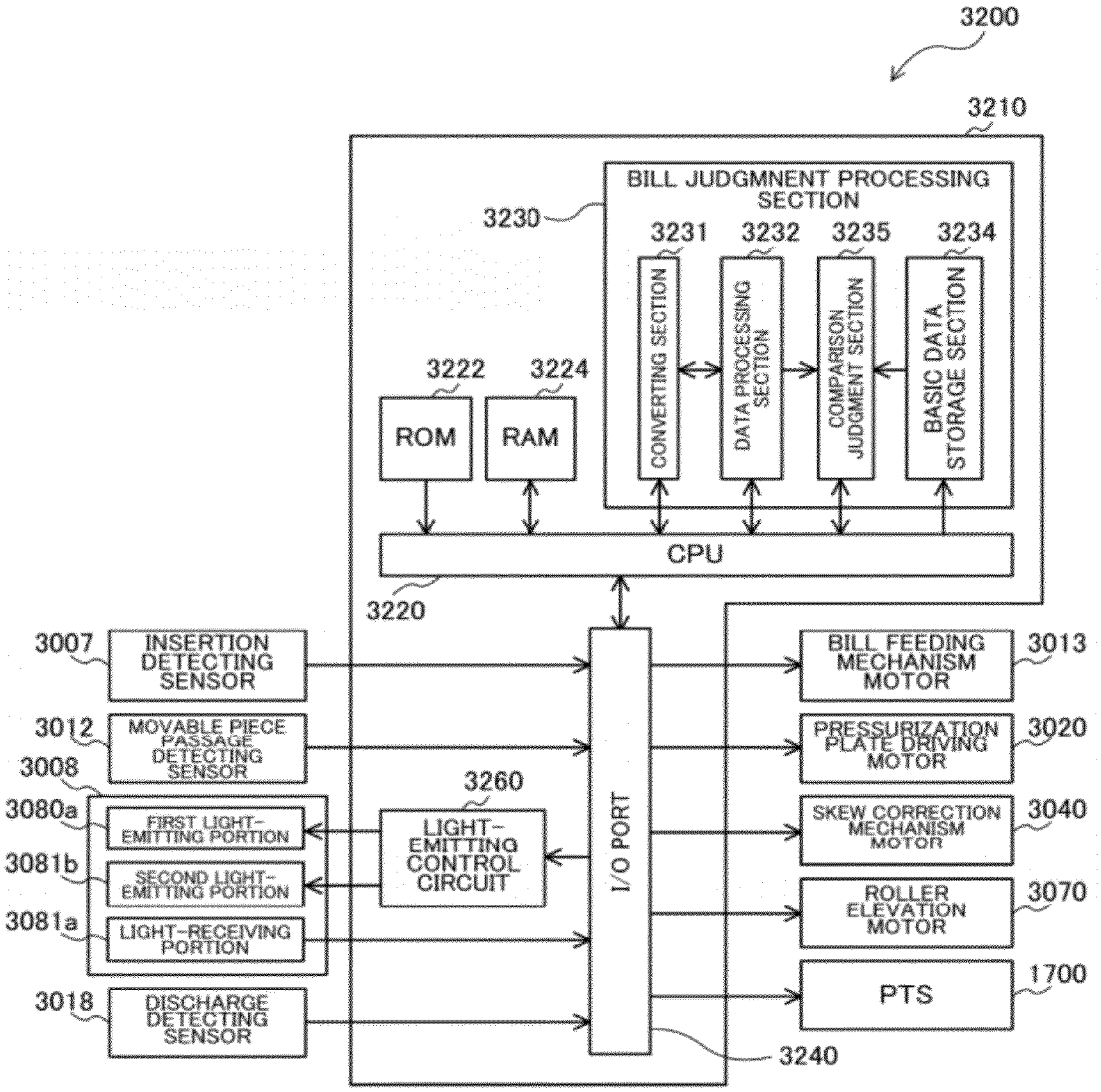

The control means 3200 depicted in the block diagram of FIG. 116 is provided with a control board 3210 for controlling operation of each of the driving devices. On the control board 3210, there are mounted a CPU (Central Processing Unit) 3220 which controls driving of each driving device and configures bill identifying means; a ROM (Read Only Memory) 3222; a RAM (Random Access Memory) 3224; and a bill judgment processing section 3230.

The ROM 3222 stores permanent data such as operating programs of various kinds of driving devices such as the bill feeding mechanism motor 3013, the pressurization plate driving motor 3020, the skew correction mechanism motor 3040, and various kinds of programs such as the roller elevation motor 3070; an authentication judgment program in the authentication judgment section 3230, and a bill damage judgment program for judging damage of a bill.

The CPU 3220 operates in accordance with the programs stored in the ROM 3222, inputs/outputs a signal to/from the variety of driving devices via the I/O port 3249, and performs entire operational control of the bill handling apparatus. That is, the bill feeding mechanism motor 3013, the pressurization plate driving motor 3020, the skew correction mechanism motor 3040, and the roller elevation motor 3070 are connected to the CPU 3220 via the I/O port 3240. These driving devices are operatively controlled by means of a control signal from the CPU 3220 in accordance with the operating programs stored in the ROM 3222. Detection signals from the insertion detecting sensor 3007, the movable piece passage detecting sensor 3012, and the discharge detecting sensor 3018 are inputted to the CPU 3220 via the I/O port 3240, and based on these detection signals, the variety of driving devices described above is controlled to be driven.

Further, to the CPU 3220, via the I/O port 3240, a detecting signal which is based on the transmitted light or reflected light of the light emitted to an object targeted to be identified is inputted from the light-receiving portion 3081*a* in the abovementioned bill reading means 3008.

Furthermore, the I/O port 3240 has a portion to be electrically connected to the abovementioned PTS terminal 1700. As described later, denomination data and amount-of-money data of the bill entered into the bill handling apparatus 3001 are transmitted to the PTS terminal 1700 via the I/O port 3240.

The RAM 3224 temporarily stores data or programs employed when the CPU 3220 operates and has a function of acquiring and temporarily storing light-receiving data of a bill targeted to be identified (pixel data comprised of a plurality of pixels).

The bill judgment processing section 3230 has a function of carrying out damage judgment processing of judging damage such as defective tip end of a bill fed and authentication judgment processing of judging whether or not a bill having not damaged has occurred is authentic. The bill judgment processing section 3230 has a converting section 3231 for converting light-receiving data of a target to be identified, stored in the RAM 3224, to pixel information including color information (density value) having brightness on a pixel-by-pixel basis; a data processing section 3232 for acquiring edge information, for example, and specifying a tip end shape of the fed bill, based on the pixel information converted by the converting section 3231.

The bill judgment processing section 3230 has a function of carrying out damage judgment processing of judging damage such as a folded or defective tip end of a bill fed and authentication judgment processing of judging whether or not a bill having not damaged is authentic. The bill judgment processing section 3230 has a converting section 3231 of converting light-receiving data of a target to be identified, stored in the RAM 3224 to pixel information including color information (density value) having brightness on a pixel-by-pixel basis; and a data processing section 3232 of acquiring edge information, for example, and specifying a tip end shape of the fed bill, based on the pixel information converted by the converting section 3231.

The bill judgment processing section 3230 is provided with: a reference data storage section 3234 storing reference data relating to an authentic bill (shape data relating to an authentic bill); and a comparison judgment section 3235 for comprising the shape data of a bill serving as a judgment target specified in the data processing section 3232 with the reference data stored in the reference data storage section 3234 and then performing judgment processing as to whether or not any damage has occurred to a bill fed.

The reference data storage section 3234 stores, on a denomination-by-denomination basis, image data relating to an authentic bill employed at the time of carrying out the abovementioned authentication judgment processing or various items of reference data employed at the time of authentication judgment such as a reference value of a print length relating to an authentic bill. In this case, while the abovementioned reference data is stored in an exclusive reference data storage section 3234, the data may be stored in the abovementioned ROM 3222.

Further, the first light-emitting portion 3080*a* and the second light-emitting portion 3081*b* in the abovementioned bill reading means 3008 are connected to the CPU 3220 via the I/O port 3240. As to these first light-emitting portion 3080*a* and second light-emitting portion 3081*b*, lighting intervals and lighting-out are controlled via the light-emitting control circuit 3260 by means of a control signal from the CPU 3220 in accordance with the operating programs stored in the ROM 3222.

<<Damage Judgment Techniques (First Damage Judgment Technique and Second Damage Judgment Technique)>>

Figure 117:
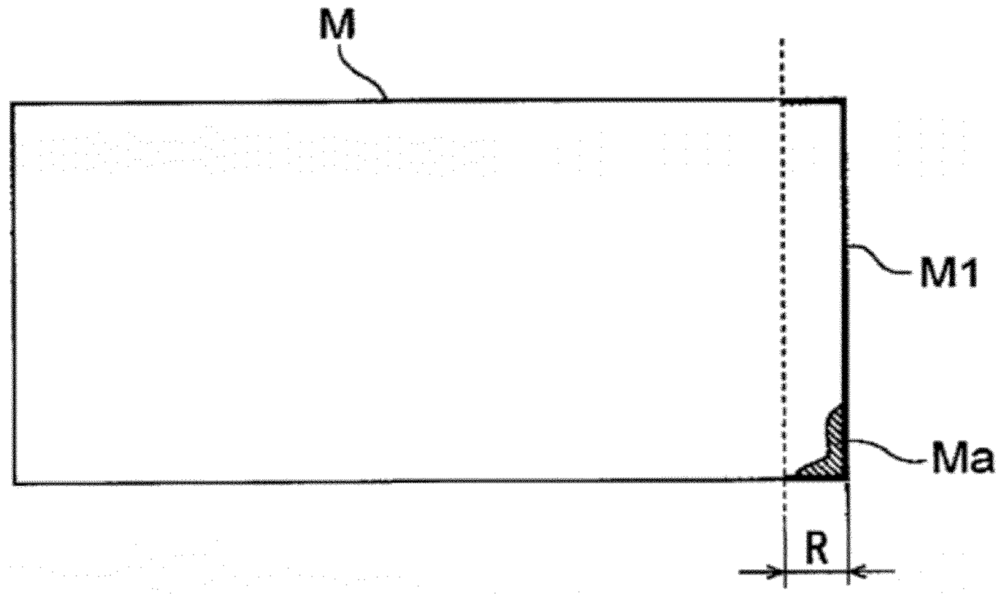

Hereinafter, a case in which a defective bill M has been inserted into a bill tip end portion, as shown in FIG. 117, will be described.

As described above, the bill reading means 3008 emits light beams (red light, infrared ray of light) from the first light-emitting portion 3080*a* and the second light-emitting portion 3081*b* to a bill fed by the bill feeding mechanism 3006, and a light-receiving portion (line sensor) 3081*a* receives the transmitted light or reflected light to thereby execute reading a bill. At the time of the reading, while bill feeding processing is performed, a number of pixel information, a predetermined size of which is defined as one unit (for example, one pixel in the feeding direction is 0.508 mm) can be acquired. Image data comprised of a number of pixels (a plurality of pixels) thus acquired is stored in storage means such as a RAM 3224. The image data comprised of a number of pixels stored therein is converted to information including color information having brightness on a pixel-by-pixel basis (color information in which a numeric value of 0 to 255 (0: black to 255: white) is assigned in accordance with density value) by means of the converting section 3231.

<First Damage Judgment Technique>

In this case, if a bill is inserted such that a defect Ma exists at a corner of a tip end of a bill M to be fed, and then, the bill passes through bill reading means 3008, a light-receiving portion 3081*a* having a CCD line sensor arranged over the widthwise direction of the bill can specifically acquire the shape of the defect Ma. This is because the transmitted-light data received in the light-receiving portion 3081*a*, there increases an amount of light reception of the transmitted light transmitting a portion of the defect Ma, or alternatively, in the reflected-light data, no reflected light cannot be obtained from a portion of the defect Ma, for example, and it becomes possible to acquire data of a specific edge shape of a bill M fed (edge shape with a defect Ma) by the pixel information converted by the converting section 3231.

The comparison judgment section 3235 compares the data of the acquired edge shape with reference data stored in the reference data storage section 3234 (data of edge shape of a defect-free bill). A bill with its high degree of analogousness is judged to be the one having not been defected, and the other bill is judged to be the one having been defected.

In this case, although a technique of judging the degree of analogousness is not limited in particular, for example, the one having a predetermined threshold value or more may be judged to be analogous (a defect-free bill) by acquiring edge information and then comparing the number of pixels included in the edge, and the one that is less than the threshold value may be judged not to be analogous (a bill having been defected).

A judgment of whether or not such a defect has occurred is executed until before bill reading by the bill reading means 3008 completes. In the third embodiment, at a stage of reading a predetermined range R (that is set to 20 mm, for example) from a tip end M1 of a bill M fed, the abovementioned judgment processing is executed, and at least the bill is set so as not to pass through the bill reading means 3008 until judgment processing completes. The CPU 3220 mentioned above reversely drives the bill feeding mechanism motor 3013 in a damage such as a defect has occurred to the bill, and ejects the inserted bill as it is from the bill insertion slot 3005.

<<Second Damage Judgment Technique>>

Figure 118:
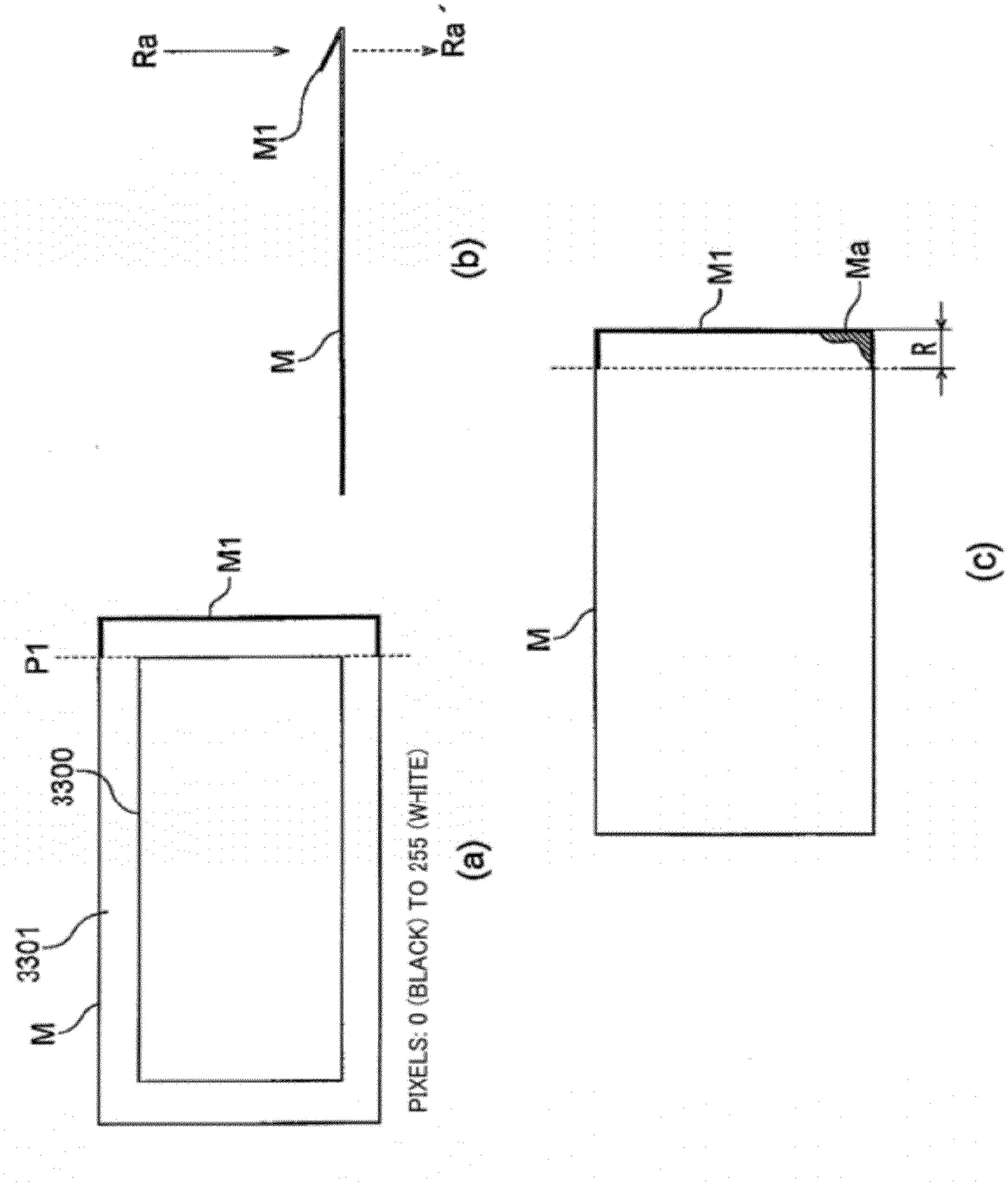
Figure 119:
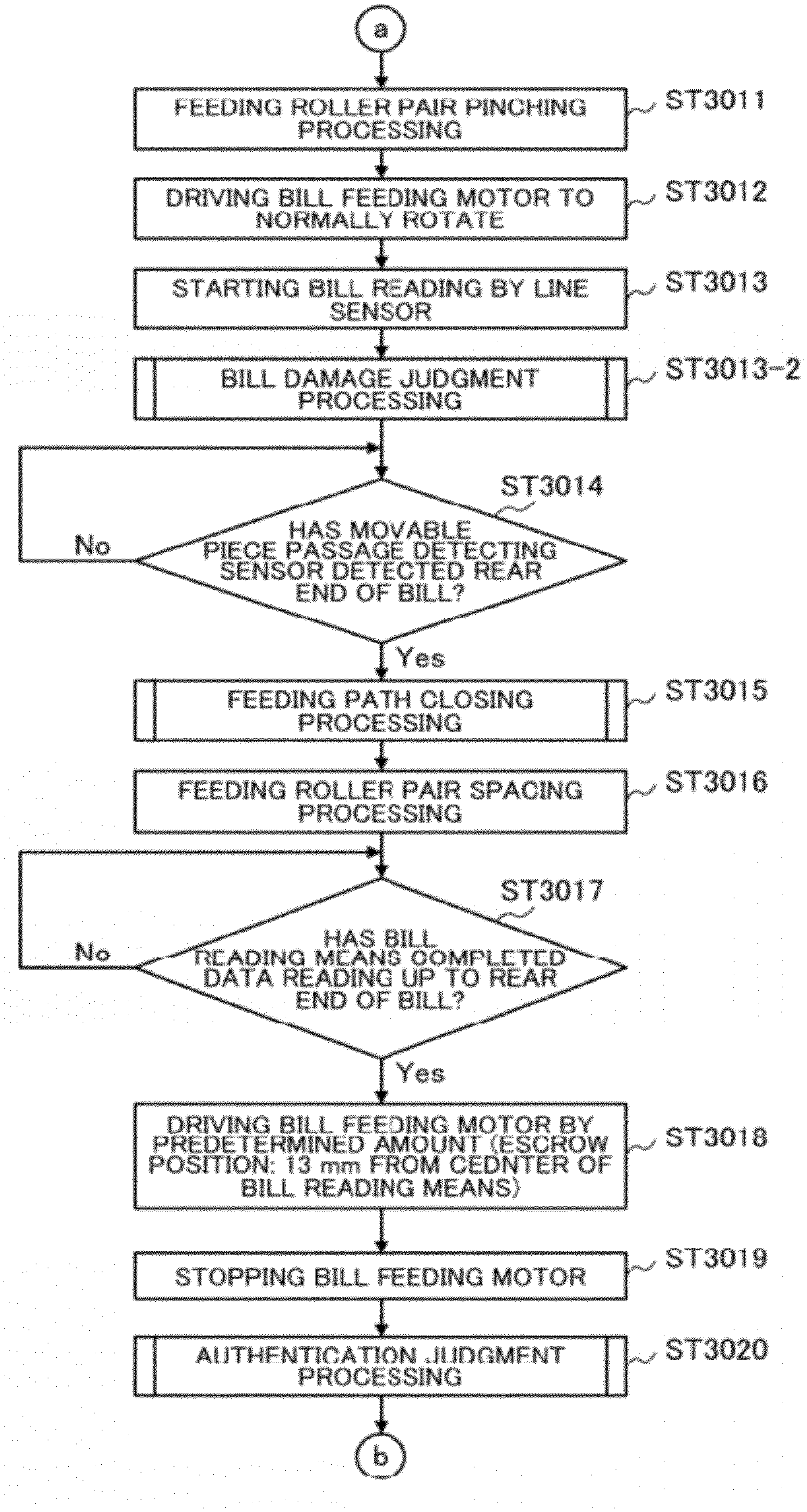
Figure 120:
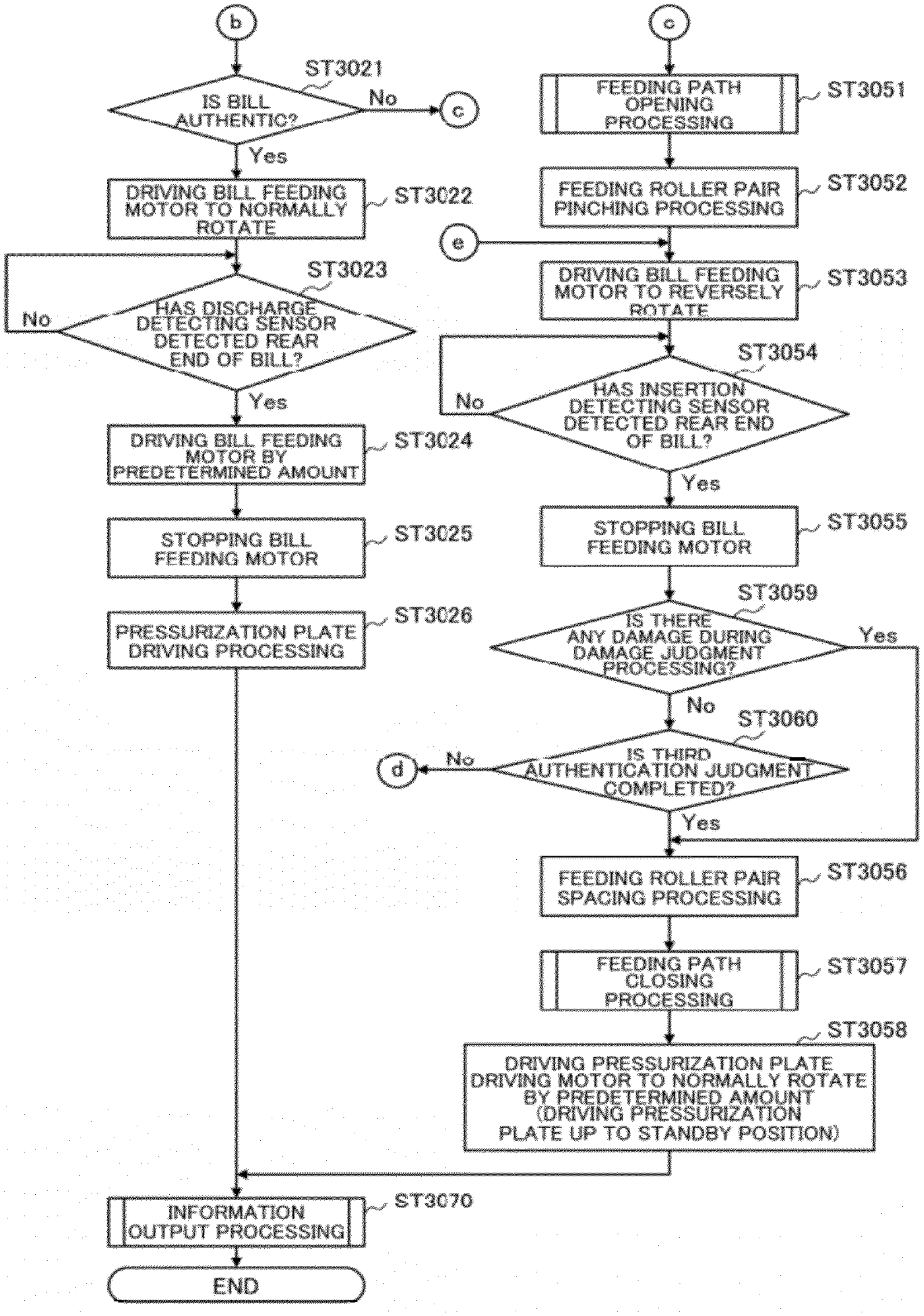

Usually, a bill, as shown in FIG. 118(*a*), is configured in such a manner that a non-print region 3301 is formed around a print region 3300 in consideration of a cutting process or the like. Since the non-print region 3301 is a region to which no ink adheres, if transmitted light is acquired at the light-receiving portion 3081*a*, the density value on a pixel-by-pixel basis can be obtained as a high value while a line P1 is defined as a border, in comparison with the print region 3300.

However, if a portion of the tip end M1 of the bill is folded to the inside, as shown in FIG. 118(*b*), for example, the transmitted light Ra at that portion passes through the folded portion, whereby the transmitted light quantity Ra' becomes weaker than that shown in FIG. 118(*a*). Therefore, if the light-receiving portion 3081*a* acquires the transmitted light, the light quantity becomes considerably darker than usual transmitted-light quantity. That is, in comparison with a normal bill having not folded, the density value on a pixel-by-pixel basis, which is obtained in the tip end region, lowers.

Therefore, when the light-receiving portion 3081*a* having a CCD line sensor arranged over the widthwise direction of a bill executes reading of a tip end portion of a bill fed, it becomes possible to judge whether or not folding has occurred to the bill M fed, by means of pixel information converted by the converting section 3231. For example, the comparison judgment section 3235 compares a total value in the widthwise direction of pixel data at the tip end region of the entered bill M with the reference data stored in the reference data storage section 3234 (a total value of pixel data of the non-print region 3301 in which no folding has occurred at the tip end portion, as in FIG. 118(*a*)), the one whose total density value is higher than a predetermined threshold value is judged to be a bill having not folded, and the one whose total density value is lower than the predetermined threshold value is judged to be a bill having not folded.

As shown in FIG. 118(*b*), if folding has occurred to the tip end M1 portion of the bill, when that portion passes through the pullout preventing member 3170 mentioned above, in particular, if the bill is reversely fed without being judged to be authentic in authentication judgment processing, a folded portion is caught in the pullout preventing member 3170, and there is a possibility that a feeding trouble has occurred. However, the bill reading means 3008 detects the bill not having thus folded, and the bill feeding mechanism 3006 is controlled, thereby making it possible to prevent such a feeding trouble in advance.

In the third embodiment, as shown in FIG. 118(*c*), if a bill is inserted such that a defect Ma has occurred into a corner of the tip end of the bill M fed, and then the inserted bill passes the bill reading means 3008, the light-receiving portion 3081*a* having a CCD line sensor arranged over the widthwise direction of the bill can specifically acquire the shape of the defect Ma.

This is because in the transmitted-light data received at the light-receiving portion 3081*a*, there increases an amount of light receiving of the transmitted light transmitting a portion of the defect Ma, or alternatively, in the reflected data, reflected light cannot be obtained from a portion of the defect Ma, for example. Thus, it becomes possible to acquire data of a specific edge shape (edge shape of the defect Ma) of the bill M fed, by means of the pixel information converted by the converting section 3231. The comparison judgment section 3235 compares the data of the acquired edge shape with the reference data stored in the reference data storage section 3234 (data of edge shape of a defect-free bill). The one having its high degree of analogousness is judged to be a bill which is not defected, and the other one is judged to a bill which is defected.

In the case of the second damage judgment technique as well, although the technique of judging the degree of analogousness is not limitative in particular, for example, the one having a predetermined threshold value or more may be judged to be analogous (defect-free bill) or the one that is less than the threshold value may be judged not to be analogous (a bill which is not defected), subsequent to acquiring edge information and comparing the number of pixels included in that edge.

As described above, judgment of whether or not a fold or a defect has occurred is executed until before bill reading by the bill reading means 3008 completes. In the third embodiment, at a stage of reading a predetermined range R (that is set to 20 mm, for example) from the tip end M1 of the bill M fed, the abovementioned judgment processing is executed. Until the judgment processing completes, at least a bill is set so as not to pass through the bill reading means 3008. The abovementioned CPU 3220 reversely drives the bill feeding mechanism motor 3013, where it is judged that a damage such as a defect has occurred to a bill, so as to discharge the inserted bill as it is through the bill insertion slot 3005.

The first damage judgment technique or second damage judgment technique of the bill may be executed until before a tip end of the bill passes through the abovementioned pullout preventing member 3170 at the latest. By setting in this way, when a bill is reversely fed, it becomes possible to reliably prevent the bill from being caught. In addition, in a configuration in which the pullout preventing member 3170 is installed at a plurality of sites along the feeding direction, such a judgment may be executed until before the bill passes through the pullout preventing member installed at the most upstream side.

<<Damage Judgment Processing>>

Next, a bill handling operation in a bill handling apparatus 3001, which is executed by the abovementioned control means 3200, will be described in accordance with the flowcharts of FIG. 107, FIG. 119, FIG. 120, FIG. 110 to FIG. 112, FIG. 121, and FIG. 122. The flowchart of performing processing in a manner similar to that of the abovementioned third embodiment is omitted here. Like steps of performing processing in a manner similar to that of the abovementioned third embodiment are designated by like reference numerals.

When an operator inserts a bill into the bill insertion slot 3005, a feeding roller pair (3014A, 3014B) installed in the vicinity of the bill insertion slot are spaced from each other in an initial state (see ST3016, ST3056 to be described later). A pressurization plate 3115 allows one pair of link members 3115*a*, 3115*b* for driving the pressurization plate 3115 to be positioned at a pressurization standby section 3108. The bill is set at a standby position so as to be disabled from being fed into the pressurization standby section 3108 from an acceptance inlet 3103 by means of one pair of link members 3115*a*, 3115*b*. That is, in this state, the pressurization plate 3115 enters an opening formed between one pair of restricting members 3110, so that a bill housed in a bill housing section cannot be removed via an opening.

Further, one pair of movable pieces 3010A configuring a skew correction mechanism 3010 positioned at the downstream side of the feeding roller pair (3014A, 3014B) has moved to a minimum width (for example, an interval of one pair of movable pieces 3010A is 52 mm; see ST3015, ST3057 to be described later) so as to disable pullout of every bill in an initial state.

In an initial state of the abovementioned feeding roller pair (3014A, 3014B), an operator can easily insert a bill even if the bill is wrinkled. When the insertion detecting sensor 3007 detects insertion of the bill (ST3001), the motor 3020 for driving the abovementioned pressurization plate 3115 is driven to reversely rotate by a predetermined amount (ST3002) to move the pressurization plate 3115 to an initial position. That is, the pressurization plate 3115 has moved to an opening formed between one pair of restricting members 3110 until the insertion detecting sensor 3007 detects insertion of the bill. The bill is set so as to disabled from passing via the opening.

When the pressurization plate 3115 is moved from a standby position to an initial position, the pressurization standby section 3108 is released (see FIG. 104), and then, a bill can be fed into the bill housing section 3100. That is, the motor 3020 is driven to reversely rotate by a predetermined amount, whereby the pressurization plate 3115 is moved from the standby position to the initial position via the main body side gear train 3021 and the pressurization plate driving mechanism 3120 (a housing section side gear train 3124, a rack formed at the movable member 3122, and link members 3115*a*, 3115*b*).

The roller elevation motor 3070 is driven to move an upper feeding roller 3014A so as to abut against a lower feeding roller 3014B. In this manner, the inserted bill is pinched between the feeding roller pair (3014A, 3014B) (ST3003).

Next, opening processing of the bill feeding path is performed (ST3004). This opening processing, as shown in the flowchart shown in FIG. 110, is performed by driving the abovementioned skew correction mechanism motor 3040 to reversely rotate, thereby driving one pair of movable pieces 3010A in a direction in which they are spaced from each other (ST3100). At this time, when the movable piece detecting sensor for detecting the position of one pair of movable pieces 3010A detects that one pair of movable pieces 3010A has moved to a predetermined position (maximum width position) (ST3101), reverse rotation driving of the motor 3040 is stopped (ST3102). By this opening processing of the feeding path, a bill can be advanced into one pair of movable pieces 3010A. At the previous stage of ST3004, the bill feeding path 3003 is closed by means of feeding path closing processing (ST3015, ST3057) to be described later. The bill feeding path 3003 is thus closed before bill insertion, thereby making it possible to prevent an element such as a line sensor from being damaged by inserting a plate-shaped member from a bill insertion slot for illegal purpose or the like, for example.

Next, the bill feeding motor 3013 is driven to normally rotate (ST3005). A bill is fed into the apparatus by means of the feeding roller pair (3014A, 3014B). When the movable piece passage detecting sensor 3012 arranged at the downstream side than the skew correction mechanism 3010 detects a tip end of the bill, the bill feeding motor 3013 is stopped (ST3006, ST3007). At this time, the bill is positioned between one pair of movable pieces 3010A configuring the skew correction mechanism 3010.

Subsequently, the abovementioned roller elevation motor 3070 is driven to space the feeding roller pair (3014A, 3014B) from each other, where a bill is pinched therebetween (ST3008). At this time, no load is acted on the bill.

In this state, skew correction actuation processing is performed (ST3009). This skew correction actuation processing is performed by driving the abovementioned skew correction mechanism motor 3040 to normally rotate, thereby driving one pair of movable pieces 3010A in a direction in which they approach each other. That is, in the skew correction actuation processing, as shown in the flowchart of FIG. 111, the abovementioned motor 3040 is driven to normally rotate, thereby moving one pair of movable pieces 3010A in a direction in which they approach each other (ST3110).

This movement of the movable pieces is executed until a minimum width (for example, 62 mm in width) of a bill registered in the reference data storage section in control means has been reached, whereby a skew is corrected by means of the movable pieces 3010A abutting against each side, and the bill is positioned so as to be set at a precise center position.

After the skew correction actuation processing as described above completes, feeding path opening processing is subsequently executed (ST3010). This processing is performed by reversely driving the abovementioned skew correction mechanism motor 3040 to thereby move one pair of movable pieces 3010A in a direction in which they are spaced from each other (see ST3100 to ST3102 of FIG. 110).

Subsequently, the abovementioned roller elevation motor 3070 is driven to move the upper feeding roller 3014A so as to abut against the lower feeding roller 3014B, and a bill is pinched between the feeding roller pair (3014A, 3014B) (ST3011). Afterwards, the bill feeding motor 3013 is driven to normally rotate so as to feed a bill into the apparatus, and when the bill passes through the bill reading means 3008, bill reading processing is started (ST3012, ST3013).

Concurrently with the start of bill reading processing, the abovementioned bill damage judgment processing is executed (ST3013-2). The damage judgment processing includes first damage judgment processing shown in the flowchart of FIG. 121 and second damage judgment processing shown in the flowchart of FIG. 122. In the processing of ST3013-2, at least one of the first damage judgment processing and the second damage judgment processing may be invoked and executed. Both of the first damage judgment processing and the second damage judgment processing may be sequentially executed. Bill damage can be precisely judged by executing two types of damage judgment processing.

<First Damage Judgment Processing>

Figure 121:
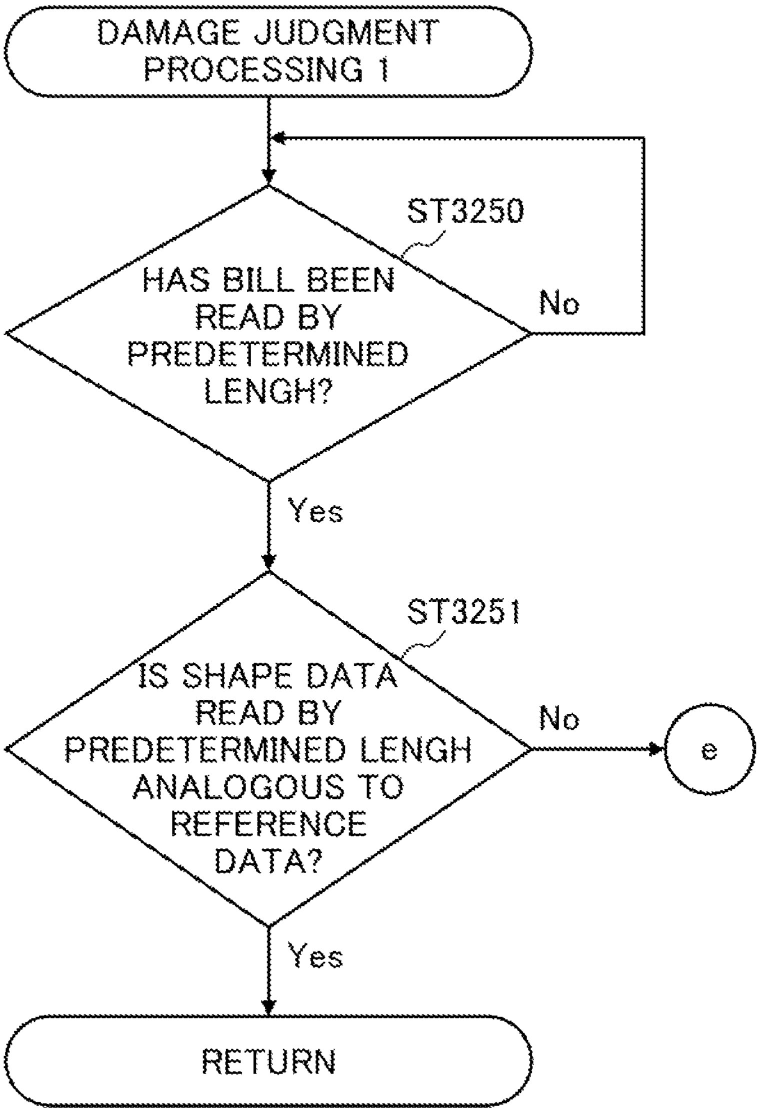

In the first damage judgment processing, as shown in the flowchart of FIG. 121, it is first judged whether or not a bill has been read by a predetermined length (ST3250). The predetermined length, as described above, set to 20 mm from a tip end M1 of a bill M fed, in the third embodiment (See FIG. 117; R). At a stage when reading of the length completes, the bill judgment processing section 3230 of control means 3200 refers to the reference data stored in the reference data storage section 3234, compares the shape data of the bill obtained by the comparison judgment section 3235 with reference data, and executes judgment processing of bill damage (ST3251).

In the processing of ST3251, where it is judged that a bill has been damaged, the CPU 3220 drives the bill feeding motor 3013 to reversely rotate so as to discharge the bill from the bill insertion clot 3005 immediately (ST3251, No, ST3053 to ST3055). That is, in the processing of ST3251, where it is judged that a bill has been damaged before bill reading processing completes, the bill is reversely fed immediately without performing reading processing of the subsequent bills, and is discharged from the bill insertion slot 3005; and a series of processing operations of the bill completes (ST3053 to ST3060). In the abovementioned damage judgment processing (ST3013-2), where it is judged that a bill has not been damaged, reading processing of the bill is continued as it is (ST3014).

<Second Damage Judgment Processing>

Figure 122:
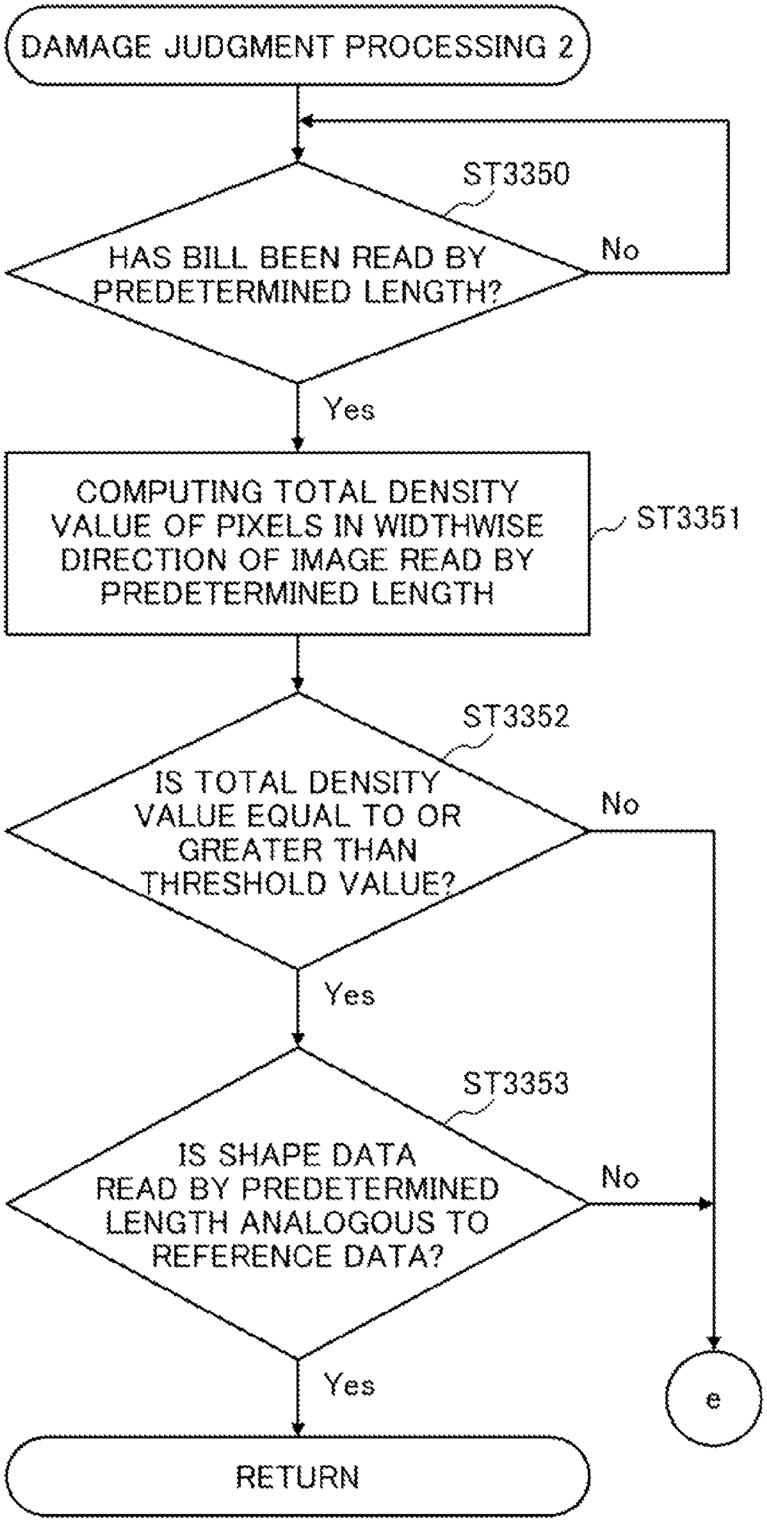

In the second damage judgment processing, as shown in the flowchart of FIG. 122, it is first judged whether or not a bill has been read by a predetermined length (ST3350). The predetermined length, as described above, is set to 20 mm from a tip end M1 of a bill M fed, in the third embodiment (See FIG. 118(*c*); R), and at the stage when reading of the length completes, a total density value of pixels by the transmitted light in a tip end region of the entered bill M is computed (ST3351).

The bill judgment processing section 3230 of the control means 3200 compares a total density value of pixel data in a tip end region of the entered bill M with a density value of reference data in the same region, stored in the reference data storage section 3234; and executes judgment processing of whether or not a bill has a fold has occurred to a bill, based on a predetermined threshold value (ST3352).

In the processing of ST3352, where it is judged that a damage such as a fold has occurred to a bill, the CPU 3220 drives the bill feeding motor 3013 to reversely rotate so as to discharge the bill from the bill insertion slot 3005 immediately (ST3352, No, ST3053 to ST3055). That is, in the processing of ST3352, where it is judged that a fold has occurred to a bill before bill reading processing completes, the bill is reversely fed immediately without performing the subsequent bill reading processing, and is discharged from the bill insertion slot 3005; and a series of processing operations of the bill completes (ST3053 to ST3060).

In the abovementioned ST3352, where it is judged that no fold has occurred to with a bill, it is subsequently judged whether or not a damage such as a defect has occurred to a bill (ST3352, Yes, ST3353). This judgment processing is executed by referring to the reference data stored in the reference data storage section 3234 and then comparing the shape data of the bill obtained by the comparison judgment section 3235 with reference shape data (ST3353).

In the processing of ST3353, where it is judged that a damage such as a fold has occurred to a bill, as in the foregoing description, the CPU 3220 drives the bill feeding motor 3013 to reversely rotate so as to discharge the bill from the bill insertion slot 3005 immediately (ST3351, No, ST3053 to ST3055). That is, in the processing of ST3353, where it is judged that any damage such as a defect has occurred to a bill before bill reading processing completes, the bill is reversely fed immediately without performing the subsequent bill reading processing and is discharged from the bill insertion slot 3005, and a series of processing operations of the bill completes (ST3053 to ST3060).

In the abovementioned damage judgment processing (ST3352, St3353), where it is judged that no damage has occurred to a bill, bill reading processing is continued as it is (ST3015).

In the abovementioned bill reading processing, as shown in the timing chart of FIG. 106, four light sources, which are comprised of transmission light sources of red light and infrared ray of light in the abovementioned first light-emitting portion 3080*a* and the second light-emitting portion 3081*b* and reflection light sources of red light and infrared ray of light, repeat lighting up and lighting out at predetermined intervals. Moreover, without overlapping the phase of each light source, lighting is controlled so that two or more light sources do not light simultaneously. In this manner, as in the third embodiment, even one light-receiving portion 3081*a* detects light of each light source at predetermined intervals, to be able to read an image consisting of contrast data in a printed region of a target to be identified, caused by the transmitted light and reflected light of red light and the transmitted light and reflected light of infrared ray of light.

After a bill fed has passed through the bill reading means 3008, when the movable piece passage detecting sensor 3012 detects a rear end of the bill (ST3014), closing processing of the bill feeding path 3003 is executed (ST3015). In this processing, first, as shown in the flowchart of FIG. 112, after the movable piece passage detecting sensor 3012 has detected the rear end of the bill, the abovementioned motor 3040 is driven to normally rotate, thereby moving one pair of movable pieces 3010A in a direction in which they approach each other (ST3130). Next, when the movable piece detecting sensor detects that the movable piece 3010A has moved to a predetermined position (minimum width position, for example, 52 mm) (ST3131), normal rotation driving of the motor 3040 is stopped (ST3132).

By the feeding path closing processing, one pair of movable pieces 3010A is moved to a minimum width position (52 mm in width) which is narrower than a width of every bill that can be inserted, so as to thereby effectively prevent pullout of a bill. That is, such closing processing of the bill feeding path is executed, whereby a distance between the movable pieces 3010A is narrower than the width of the inserted bill, to be able to effectively prevent an illegal act such as operator's pulling out a bill to the insertion slot for illegal purpose.

Subsequent to the abovementioned feeding path closing processing (ST3015), feeding roller pair spacing processing is performed of driving the abovementioned roller elevation motor 3070 to space the feeding roller pair (3014A, 3014B) from each other between which a bill can be pinched (ST3016). By performing the feeding roller pair spacing processing, even if an operator mistakenly additionally enter bills (double-entry), the bills are not subjected to a feed operation by the feeding roller pair (3014A, 3014B) and the bill abuts against a front face of one pair of movable pieces 3010A having approached to each other in ST3017, to thus able to reliably prevent double-entry operation of bills.

With the abovementioned closing processing of the bill feeding path, when the bill reading means 3008 reads data up to the end of the bill, the bill feeding motor 3013 is driven by a predetermined amount to stop a bill at a predetermined position (Escrow position; the position at which a bill has been fed to the downstream side by 13 mm from the center position of the bill reading means 3008). At this time, the bill judgment processing section 3230 of the control means 3200 refers to the reference data stored in the reference data storage section 3234 and the comparison judgment section 3235 executes bill authentication judgment processing (ST3017 to ST3020).

In the abovementioned authentication judgment processing of ST3020, where it is judged that a bill is authentic (ST3021: Yes), the bill feeding motor 3013 is driven to normally rotate (ST3022). At the time of feeding of the bill, the bill feeding motor 3013 is driven to normally rotate until the discharge detecting sensor 3018 detects a rear end of the bill (ST3023), and the bill feeding motor 3013 is driven to normally rotate by a predetermined amount after the discharge detecting sensor 3018 has detected the rear end of the bill (ST3024, ST3025).

The abovementioned authentication judgment processing of ST3020, as in the control means 3200 of a first mode, is executed when the subroutine shown in FIG. 113 is invoked. In the control means 3200 of the second mode as well, when it is judged that an entered bill is authentic in the comparison processing in ST3152 of the subroutine of the authentication judgment processing shown in FIG. 113, the denomination data and amount-of-money data of the entered bill are acquired by applying processing such as character recognition with the use of the image data read by the bill reading means 3008, allowing the RAM 3224 to store the acquired denomination data and amount-of-money data. These items of information are transmitted to the PTS terminal 1700, as described later.

In the normal rotation driving processing of the bill feeding motor 3013 in ST3024 and ST3025, a bill is fed from the discharge outlet 3003*a* situated at the downstream side of the bill feeding path 3003 of the apparatus main body 3002 to an acceptance inlet 3103 of the bill housing section 3100, and the aforementioned one pair of belts 3150 comes into contact with an each-side top face of a bill to be fed-in and is stabilized, and then, corresponds to the driving amount guided to the pressurization standby section 3108. That is, after the discharge detecting sensor 3018 has detected the rear end of the bill, the bill feeding motor 3013 is further driven to normally rotate, whereby the foregoing one pair of belts 3150 is driven in a bill feeding direction while coming into contact with the bill fed-in, and the bill is guided to the pressurization standby section 3108 in a stable state.

After the abovementioned bill feeding motor 3013 has stopped, driving processing of the pressurization plate 3115 is executed so as to place a bill onto a placement plate 3105 (ST3026). When pressurization processing completes, the pressurization plate 3115 is moved to a standby position again and then is stopped at that position.

In ST3021 of the abovementioned operational procedures, where it is judged that the inserted bill is not authentic, feeding path opening processing is executed (see ST3051, ST3001 to ST3102 of FIG. 110). Then, the bill feeding motor 3013 is driven to reversely rotate, and pinching processing of the feeding roller pair (3014A, 3014B) is executed. Afterwards, the bill that is on standby at an Escrow position is fed to the bill insertion slot 3005 (ST3052, ST3052).

In the configuration of the third embodiment, even where it is judged that the read bill is not authentic, reading processing is repeated a predetermined number of times (three times), as in the following process, without discharging the bill immediately outside of the apparatus.

That is, the bill is fed to the bill insertion slot 3005 in accordance with ST3053 described above; and when the insertion detecting sensor 3007 detects a rear end of the bill to be returned back to the bill insertion slot 3005, reverse rotation driving of the bill feeding motor 3013 is stopped (ST3054, ST3055). At this time, in the abovementioned bill damage judgment processing, if the bill is judged not to be damaged (ST3059, No), it is judged whether or not bill authentication judgment processing has been carried out three times (ST3060). If the authentication judgment processing is not carried out three times (ST3060, No), the processing subsequent to ST3005 described above is executed (the retry processing is executed two times). If the authentication judgment processing is carried out three times (ST3060, Yes), discharge processing is performed for that bill without carrying out authentication judgment processing.

The discharge processing is executed by driving the roller elevation motor 3070 to thereby space the feeding roller pair (3014A, 3014B) having pinched the bill in ST3052 (ST3056). Afterwards, feeding path closing processing is carried out (see ST3057 and ST3130 to ST3132 of FIG. 112) and the motor 3020 for driving the pressurization plate 3115 is driven to normally rotate by a predetermined amount (ST3058). The pressurization plate 3115 set at an initial position is then driven to be set at a standby position.

After the abovementioned processing of ST3026 or processing of ST3058 has been executed, the subroutine of the information output processing shown in FIG. 114 is invoked and executed (ST3070).

FIG. 114 is a flowchart showing a subroutine of the processing of outputting various items of information to the PTS terminal 1700.

First, it is judged whether or not a result of bill authentication judgment is authentic (step ST71). The result of the bill authentication judgment can be obtained by executing the abovementioned subroutine shown in FIG. 113.

When it is judged that the result of the bill authentication judgment is authentic (YES), denomination data indicating denomination of a bill and amount-of-money data indicating an amount of money are outputted to the PTS terminal 1700 via the I/O port 3240 (step ST72) and then this subroutine is completed. The denomination of a bill used herein consists of bill attribute information indicating attributes of bills including countries, governments, governmental banks or regions issuing or administering bills such as US dollar bills, Yen bills, or Hong King bills. The amount used herein is the amount corresponding to a currency unit defined depending on the attribute of the bill. The currency unit used herein includes US dollar or Yen, for example.

When it is judged that the result of the bill authentication judgment is bogus (NO), error information indicating that the entered bill is bogus outputted to the PTS terminal 1700 via the I/O port 3240 (step ST73) and then this subroutine is completed.

The denomination data indicating denomination and amount-of-money data indicating an amount of money are thus transmitted to the PTS terminal 1700, whereby the PTS terminal 1700 can acquire denomination data and amount-of-money data of a bill entered into the bill handling apparatus 3001. Based on these items of data, various kinds of processing operations such as credit conversion or money exchange according to the exchange rate at that time can be executed.

As described above, as to a bill judged to be damaged, the bill feeding motor 3013 is driven to reversely rotate during reading operation, whereby discharge processing is executed immediately through the bill insertion slot 3005 (ST3053 to ST 3055). Discharge processing is then performed as it is without carrying out a total of three authentication judgment processing operations of ST3060 (ST3059, Yes) so as to complete a series of processing operations (ST3056 to ST3058).

According to the bill handling apparatus of the abovementioned configuration, the bill feeding mechanism 3006 feeds a bill; the bill judgment processing section 3230 judges whether or not a damage has occurred to a tip end region of the bill (within the range of 20 mm from the tip end) before the bill passes through the bill reading means 3008; and depending on the judgment result, the motor 3013 of the bill feeding mechanism 3006 is controlled to be driven. Thus, a damaged bill is not fed to the downward of the apparatus, thereby making it possible to prevent a bill feeding failure.

In particular, in the third embodiment described above, where it is judged that any damage such as a fold or defect has occurred to the tip end region of a bill, the bill is fed to the bill insertion slot 3005 side without carrying out the subsequent reading processing. Thus, a damaged bill can be reliably returned back to the bill insertion slot 3005 side before the bill passes through the pullout preventing member 3170, to be able to prevent a bill feeding failure more reliably. That is, when the bill has been fed in a reverse orientation, damage judgment processing is executed before the bill passes through the pullout preventing member 3170 where a failure such as jamming is prone to occur so as to return the damaged bill. Thus, a bill feeding failure is prevented more reliably.

As to bill reading processing, a line sensor reading a range of the entire widthwise direction of the feeding path of the fed bill is utilized, to thus able to reliably detect a damage of a bill even if the bill is fed to be biased to any position in the widthwise direction of the feeding path.

In particular, if the bill handling apparatus 3001 is adapted to be able to enter bills of various denominations whose sizes (widths) are different from each other, a narrow bill can be fed biased to any position in the widthwise direction of the feeding path. In such a case as well, the bill handling apparatus 3001 can reliably detect a damage of the bill and the bill handling apparatus 3001 compatible with various kinds of denominations can be provided.

While the embodiment of the present invention has been described hereinabove, the present invention can be variously modified and carried out without being limitative to the abovementioned embodiments.

The present invention is characterized that if a damage such as a fold or defect has occurred to a tip end portion of an inserted bill, the damage is detected and control is performed so as not to feed the bill to the downstream side of the apparatus. The other configuration is not limitative to the abovementioned embodiment, and can be variously modified. For example, the configuration or layout and the like of the bill reading means 3008 or pullout preventing member 3170 can be appropriately modified. The judgment means for judging whether or not any damage has occurred to a bill can also be appropriately modified according to the configuration of the bill reading means.

The present invention can be incorporated into various kinds of apparatuses providing commodities or services by inserting a bill, for example.

In the first damage judgment processing or second damage judgment processing mentioned above, it is judged whether or not a bill is read by a predetermined length. In this judgment, when bill reading completes, the reference data stored in the reference data storage section 3234 is compared with the shape data of the bill obtained by the comparison judgment section 3235. Therefore, the reference data storage section 3234 is caused to store the shape data of various kinds of bills according to denomination, whereby a type of the entered bill can be judged. The shape data includes a width of a bill or the like as well as a length of a bill.

For example, in the case where the currency unit is Yen, there are four types, a 1,000-Yen bill, a 2,000-Yen bill, a 5,000-Yen bill, and 10,000-Yen bill. The shape data according to these bills is stored in the reference data storage section 3234 and then is compared with the shape data of the entered bill, whereby the type of the bill can be judged for each denomination. As described above, denomination data and amount-of-money data are acquired by applying processing such as character recognition with the use of the image data read by the bill reading means 3008. Judging whether or not the denomination data and amount-of-money data thus acquired from the image data is coincident with a result of comparing the shape data, the precision of judgment of denomination and amount can be enhanced.

If there is no coincidence with any of the lengths of bills stored in the reference data storage section 3234, it can be judged to be a bill which is not compatible with the bill handling device 3001 or to be bogus.

<<<Control Means 3200 of the Third Mode>>>

Next, the control means 3200 for controlling driving of driving members such as the abovementioned bill feeding mechanism 3006 and bill reading means 3008 will be described with reference to the block diagram of FIG. 123.

Figure 123:
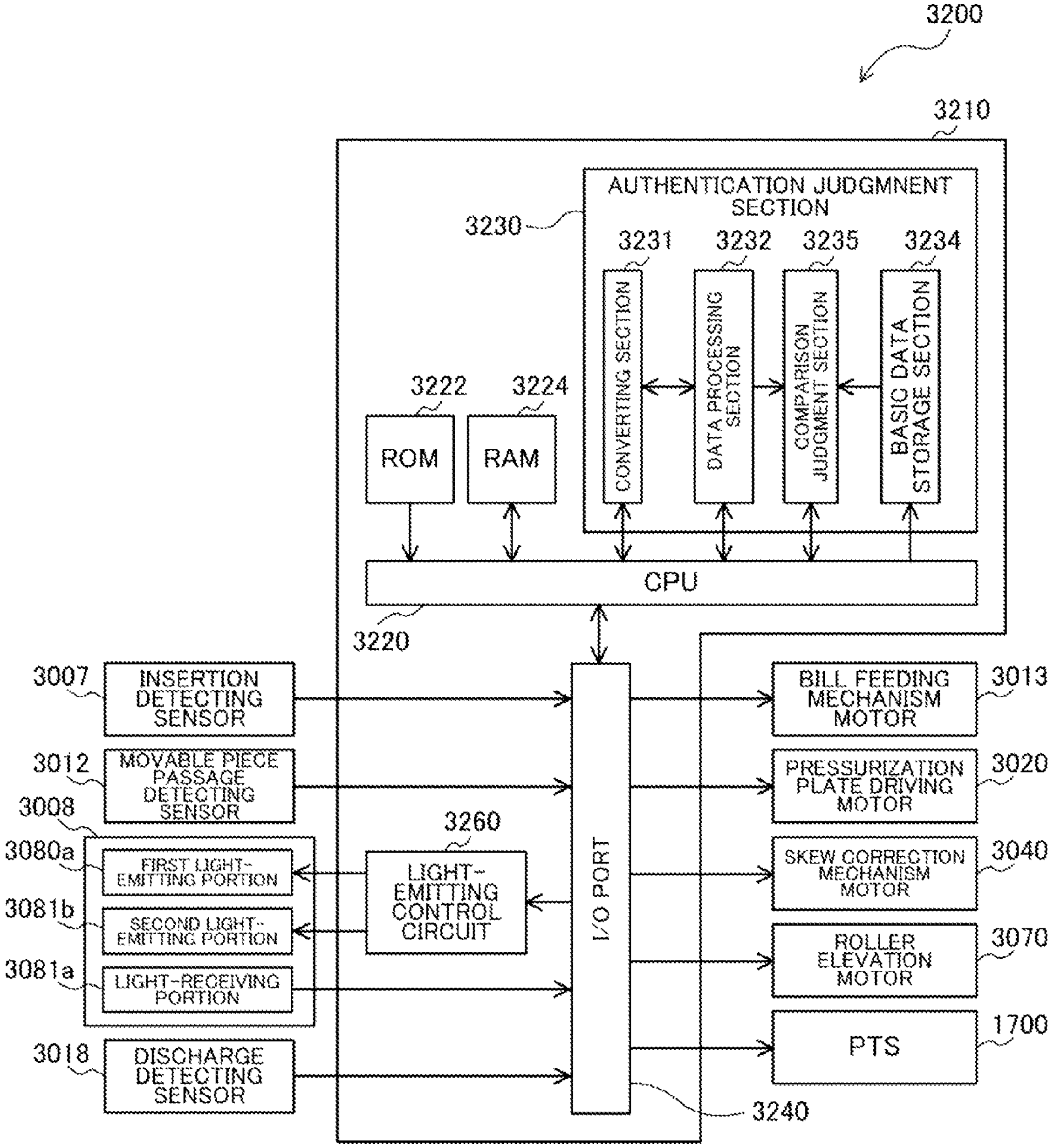

The control means 3200 depicted in the block diagram of FIG. 123 is provided with a control board 3210 for controlling operation of each of the driving devices mentioned above. On the control board 3210, there are mounted: a CPU (Central Processing Unit) 3220 configuring bill identifying means; a ROM (Read Only Memory) 3222; a RAM (Random Access Memory) 3224; and an authentication judgment section 3230.

The ROM 3222 stores permanent data such as operating programs of various kinds of driving devices such as a bill feeding mechanism motor 3013, a pressurization plate driving motor 3020, a skew correction mechanism motor 3040, and a roller elevation motor 3070, and various kinds of programs such as an authentication judgment program in the authentication judgment section 3230.

The CPU 3220 operates in accordance with the programs stored in the ROM 3222, inputs/outputs a signal to/from various kinds of driving devices described above, via the I/O port 3240, and performs entire operational control of the bill handling apparatus. That is, the bill reading mechanism motor 3013, the pressurization driving motor 3020, the skew correction mechanism motor 3040, and the roller elevation motor 3070 are connected to the CPU 3220 via the I/O port 1240. These driving devices are operatively controlled by means of a control signal from the CPU 3220 in accordance with the actuation program stored in the ROM 3222. In addition, the detection signals from the insertion detecting sensor 3007, the movable piece passage detecting sensor 3012, the discharge detecting sensor 3018 are inputted to the CPU 3220 via the I/O port 3240, and based on these detection signals, each of the abovementioned various driving devices is controlled to be driven.

Further, to the CPU 3220, via the I/O port 3240, a detection signal based on the transmitted light or reflected light of the light emitted to a target to be identified is inputted from the light-receiving portion 3081*a* in the bill reading means 3008 mentioned above.

Further, the IO port 3240 has a portion to be electrically connected to the abovementioned PTS terminal 1700. As described later, denomination data and amount-of-money data of a bill entered into the bill handling apparatus 3001 are transmitted to the PTS terminal 1700 via the I/O port 3240.

The RAM 3224 stores data or programs employed when the CPU 3220 operates and acquiring and has a function of temporarily storing light-receiving data of a target for identification (image data comprised of a plurality of pixels).

The authentication judgment section 3230 has a function of carrying out the abovementioned first authentication judgment processing and second authentication judgment processing as to a bill fed and then identifying authentication of that bill. The authentication judgment section 3230 has: a converting section 3231 for converting light-receiving data of a target to be identified, stored in the RAM 3224, to pixel information including color information (density value) having brightness; and a data processing section 3232 having a function of processing image data relating to a bill obtained from the reflected light and transmitted light such as specifying a print length of the fed bill based on the pixel information converted by the converting section 3231 or carrying out correction processing as described later, based on the print length.

The authentication judgment section 3230 is provided with: a reference data storage section 3234 storing reference data relating to an authentic bill; a comparison judgment section 3235 for comparing data undergoing variety of data processing operations of a bill targeted to be authentic or bogus in the data processing section 3232 with reference data stored in the reference data storage section 3234 and then performing authentication processing. In this case, the reference data storage section 3234 stores image data relating to an authentic bill employed at the time of carrying out the abovementioned first authentication judgment processing or a reference value of a print length relating to an authentic bill employed in the abovementioned second authentication judgment processing, and allowable range data or the like allowed from the reference value.

While the abovementioned reference data is stored in a dedicated reference data storage section 3234, the data may be stored in the abovementioned ROM 3222. While the reference value or allowable range data referred to as a comparison target may be stored in advance in the reference data storage section 3234, as in the second authentication judgment processing to be described later, for example, a configuration may be such that: light-receiving data is acquired while a predetermined number of authentic bills are fed through the bill feeding mechanism 3006; and the reference value or allowable range is computed from the acquired data so as to be stored as reference data.

Further, the first light-emitting portion 3080*a* and the second light-emitting portion 3081*b* in the abovementioned bill reading means 3008 are connected to the CPU 3220 via the I/O port 3240. As to these first light-emitting portion 3080*a* and second light-emitting portion 3081*b*, a lighting interval and lighting-out are controlled via the light-emitting control circuit 3260 by means of a control signal from the CPU 3220 in accordance with the operating program stored in the above-mentioned ROM 3222.

Next, one example of a specific processing method of second authentication judgment processing, which is a feature of the present invention, will be described.

As described above, the bill reading means 3008 emits light (red light, infrared ray of light) from the first light-emitting portion 3080*a* and the second light-emitting portion 3081*b* to the bill fed by means of a bill feeding mechanism 3006. The light-receiving portion (line sensor) 3081*a* receives the transmitted light or reflected light to execute bill reading. At the time of the reading, while bill feeding processing is performed, a number of pixel information with a predetermined size being defined as one unit (for example, one pixel in the feeding direction is 0.508 mm) can be acquired. The thus acquired image data comprised of a number of pixels (a plenty of pixels) is stored in storage means such as a RAM 3224. The thus stored image data comprised of a number of pixels is converted into information including color information having brightness on a pixel-by-pixel basis (color information obtained by assigning a numeric value from 0 to 255 according to the density value (0: black to 255: white) by means of a converting section 3231.

Figure 124:
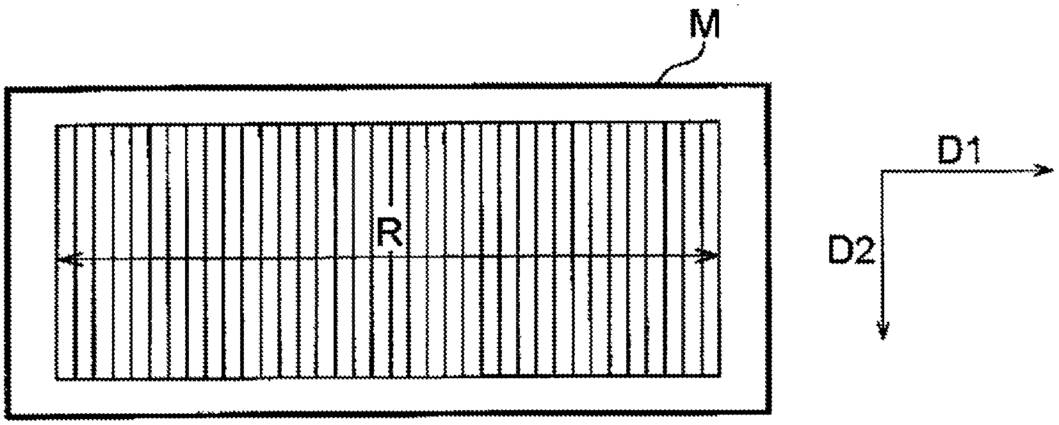

The image thus obtained by the line sensor is converted to pixel information including color information (density value) having brightness by means of the converting section. This makes it possible to actually measure a print length of another face. For example, as shown in FIG. 124, when a bill is fed (fed to a D1 direction), if a non-print region is moved to a print region, the density value of pixel information is lowered in the print region. Therefore, the average density value of pixel information in a widthwise direction D2 is measured, and the displaced position is set by setting a threshold value. This makes it possible to acquire actually measured data relating to the print length R of a predetermined area as to each side of the bill (here, all print regions over the longitudinal direction fall into the print length).

By utilizing actually measured data of both faces of a bill obtained as described above, it is possible to set a reference value and an allowable range with respect to the reference value, based on a predetermined number of authentic bills. In this processing, even with an authentic bill, a slight deviation has occurred due to an influence such as displacement at the time of printing. Thus, a reference value is first defined referring to a number of bills, and from the reference value, an allowable range allowed to be authentic is set.

Hereinafter, an example of setting a reference value and an allowable range, based on statistical finding, will be described.

For example, the bill reading means 3008 reads 50 authentic bills and then acquires actually measured data as to that length. FIG. 125 shows an example of the actually measured data in one face of each of the 50 authentic bills. The length (X) is specified by the number of pixels (one pixel: 0.508 mm). An average value (μ) is acquired from the thus obtained actually measured data, a deviation (X−μ) of the length of the printed region of each bill is computed and the dispersion (average of $(X-\mu)^2$) is computed. Then, a standard deviation (σ) is acquired from the obtained deviation, thereby making it possible to set the allowable range.

That is, the reference value of a printed region of a bill is specified by the average value (μ) of a number of authentic bills, thereby making it possible to specify a reference value of a dispersion in the printed region. From the specified reference value, the present embodiment, a range of ±3σ is set as an allowable range. Of course, the allowable range can be arbitrarily set in consideration of the precision of a bogus bill.

In an illustrative example of the table shown in FIG. 125, the average value (μ) of the predetermined print length of 50 authentic bills, i.e., the reference value is computed as 264.36, the dispersion is computed as 10.27, and the standard deviation is computed as 3.20, and thus, the average value and the standard deviation (pixels in unit) are stored as reference data (dictionary data) in the abovementioned reference data storage section 3224. As to such reference data (dictionary data), processing of the other face is executed, and as to both faces of the bill, the reference value and allowable range relating to the print length is specified as to the predetermined print region.

FIG. 126 is a graph depicting a dispersion state derived by the technique as described above, where (μ±3σ) is set as an allowable range R1 around (μ) which is the reference value.

Next, after a bill has been actually fed, when authentication of the bill is identified in the second authentication judgment processing, first, from each side of the bill passing through the bill reading means 3008, actually measured data is acquired as to both faces of the bill by means of the same procedures described above.

With actually measured data, if both faces exist in the allowable range R1 (set on each of the faces) in the graph depicted in FIG. 126, it is judged that the bill is authentic. If actually measured data of one face does not exist in the abovementioned allowable range R1, authentication of that bill is doubtful. Thus, correction processing is applied to the actually measured data of the back face. For example, this seems to be because, in a case where a fed bill is shrunk due to influence such as moisture, even with an authentic bill, actually measured data (top face) exists at a position such as dot P1 of the graph of FIG. 126. Alternatively, there is considered a case in which if actually measured data is positioned at such dot P1, the print length is reduced based on counterfeiting.

In this case, with an authentic bill, if shrinkage has occurred due to influence such as drying after containing moisture or the like, a print region of a back face is also shrunk similarly. Thus, correction processing is performed for actually measured data of the back face, based on actually measured data of a top face, and if the corrected actually measured data exists in the abovementioned allowable range R1, it becomes possible to judge that the bill is authentic. Of course, with a bogus bill such that actually measured data of only the top face is short, if correction processing is carried out, actually measured data of the back face will be beyond the allowable range R1.

A specific description will be given with reference to the abovementioned example. If the actually measured data exists in regions indicated by dot P1 or dot P2 of the graph shown in FIG. 126, the corrected value (r) of a top face is computed. The corrected value (r) of the top face can be derived by [1+(1−μ)/μ], for example (1: actually measured value of printed region of top face; μ: average value of printed region of top face).

Dividing processing (L)/(r) is carried out for the actually measured value (L) of the printed region of the back face with respect to the obtained corrected value (r), whereby the corrected value (r') relating to the actually measured data about the back face can be derived. If the corrected value (r') relating to the actually measured data about the back face exists in the preset allowable range R1 (μ±3σ), it is evaluated as being shrunk in the same manner as that on the top face, and is judged to be authentic. In the correction processing, if the corrected value of the back face deviated from the allowable range R1, it is judged to be bogus.

The correction processing as described above may be carried out when actually measured data of one face is beyond the allowable range R1 or may be carried only when the data is below the allowable range R1 (the region indicated by dot P1 of the graph of FIG. 126). That is, in general, it is considered that there is almost no case in which a bill inflates or expands, and thus, even if the data is beyond the allowable range R1, if it is within than the allowable range R1 or more (the region indicated by dot P2 of the graph of FIG. 126), it may be judged to be bogus immediately. With such configuration, correction processing can be simplified.

Next, a bill handling operation in the bill handling apparatus 3001, executed by the abovementioned control means 3200 will be described in accordance with the flowcharts of FIG. 107, FIG. 108, FIG. 127, FIG. 110 to FIG. 112, and FIG. 128.

When an operator inserts a bill into the bill insertion slot 3005, a feeding roller pair (3014A, 3014B) installed in the vicinity of the bill insertion slot is spaced from each other in an initial state (see ST3016, ST3056 to be described later). The pressurization plate 3115 allows one pair of link members 3115*a*, 3115*b* for driving the pressurization plate 3115 to be positioned at the pressurization standby section 3108. The bill is set at a standby position to disable from being fed into the pressurization standby section 3108 from an acceptance inlet 3103 by means of one pair of link members 3115*a*, 3115*b*. That is, in this state, the pressurization plate 3115 entered an opening formed between one pair of restricting members 3110, thus disabling the bill housed in the bill housing section from being pulled out via the opening.

Further, one pair of movable pieces 3010A configuring the skew correction mechanism 3010 positioned at the downstream side of the feeding roller pair (3014A, 3014B) has moved to a minimum width (for example, the interval of one pair of movable pieces 3010A is 52 mm: see ST3015, ST3057 to be described later) so as to disable pull out of every bill in an initial state.

In the initial state of the abovementioned feeding roller pair (3014A, 3014B), an operator can easily insert even a wrinkled bill. When the insertion detecting sensor 3007 detects insertion of the bill (ST3100), the motor 3020 for driving the abovementioned pressurization plate 3115 is driven to reversely rotate by a predetermined amount (ST3002) and then the pressurization plate 3115 is moved to the initial state. That is, the pressurization plate 3115 has moved to the opening formed between one pair of restricting member 3110 until the insertion detecting sensor 3007 detects the insertion of the bill. The bill is set so as to be disabled from passing via the opening.

After the pressurization plate 3115 has been moved from a standby position to an initial position, the pressurization standby section 3108 is opened (see FIG. 104) and then a bill can be fed into the bill housing section 3100. That is, the motor 3020 is driven to reversely move by a predetermined amount, whereby the pressurization plate 3115 is moved to the standby position to the initial position via the main body side gear train 3021 and the pressurization plate driving mechanism 3120 (housing section side gear train 3124, rack formed at the movable member 3122, and link members 3115*a*, 3115*b*).

The abovementioned roller elevation motor 3070 is driven to move the upper feeding roller 3014A so as to abut against the lower feeding roller 3014B. In this manner, the inserted bill is pinched between the feeding roller pair (3014A, 3014B) (ST3003).

Next, opening processing of the bill feeding path is performed (ST3004). This opening processing, as shown in the flowchart shown in FIG. 110, is performed by driving the abovementioned skew correction mechanism motor 3040 to reversely rotate to thereby drive one pair of movable pieces 3010A in a direction in which they are spaced from each other (ST3100). At this time, when the movable piece detecting sensor for detecting the position of one pair of movable pieces 3010A detects that one pair of movable pieces 3010A has moved to the predetermined position (maximum width position) (ST3101), reverse rotation driving of the motor 3040 is stopped (ST3102). By this feeding path opening processing a bill can be advanced into one pair of movable pieces 3010A. At the previous stage of ST3004, the bill feeding path 3003 is closed by way of the feeding path closing processing (ST3015, ST3057) to be described later. The bill feeding path 3003 is thus closed before bill insertion, thereby making it possible to prevent an element such as a line sensor from being damaged by inserting a plate-shaped member through the bill insertion slot for an illegal purpose or the like.

Next, the bill feeding motor 3013 is driven to normally rotate (ST3005). A bill is fed into the apparatus by means of the feeding roller pair (3014A, 3014B). When the movable piece passage detecting sensor 3012 arranged at the downstream side than the skew correction mechanism 3010 detects a tip end of the bill, the bill feeding motor 3013 is stopped (ST3006, ST3007). At this time, the bill is positioned between one pair of movable pieces 3010A configuring the skew correction mechanism 3010.

Subsequently, the abovementioned roller elevation motor 3071 is driven to space the feeding roller pair (3014A, 3014B) having pinched a bill therebetween from each other (ST3008). At this time, no load is acted on the bill.

Figure 108:
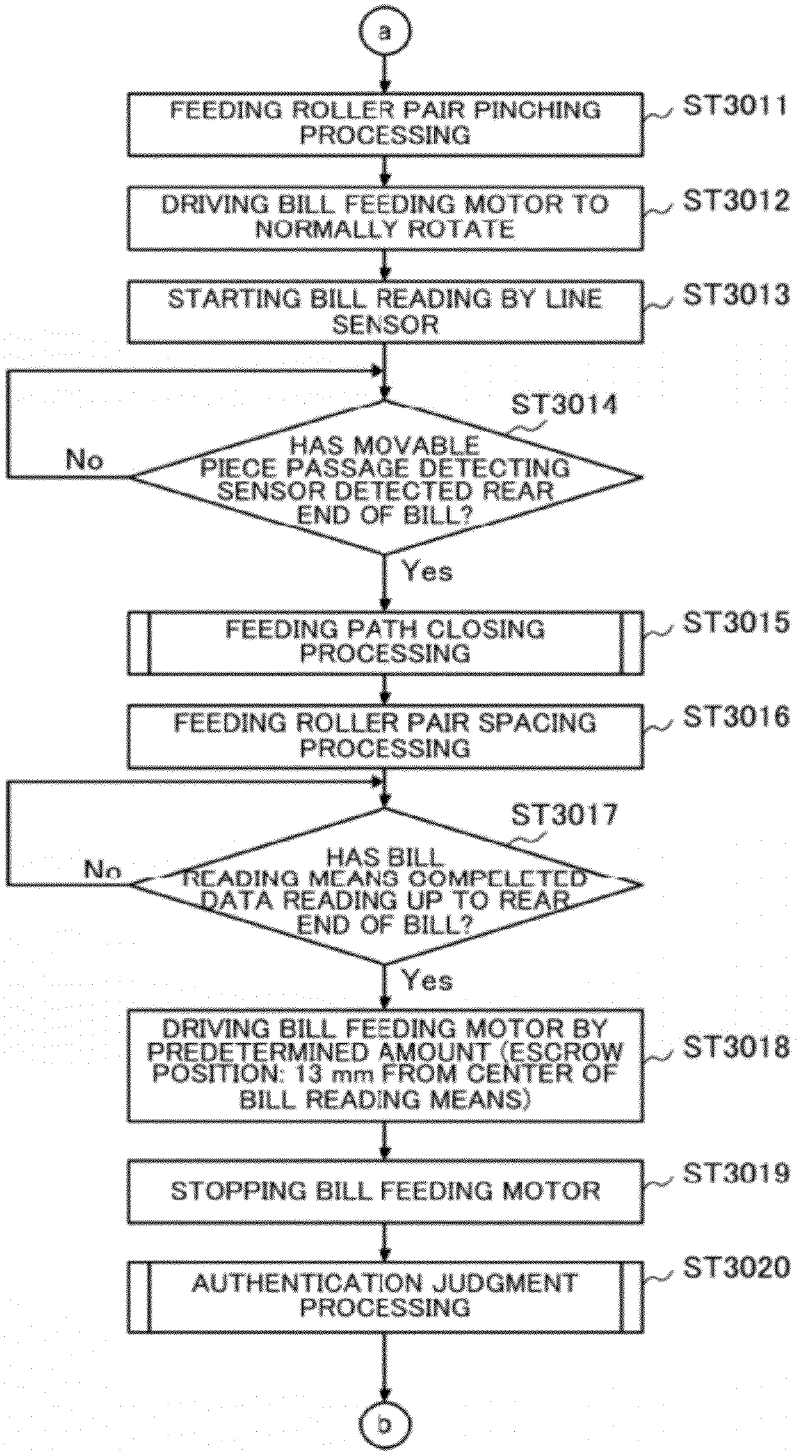
FIG. 108 is a flowchart explaining the processing operation of a bill in the bill processing device of the third embodiment (part 2)
Figure 109:
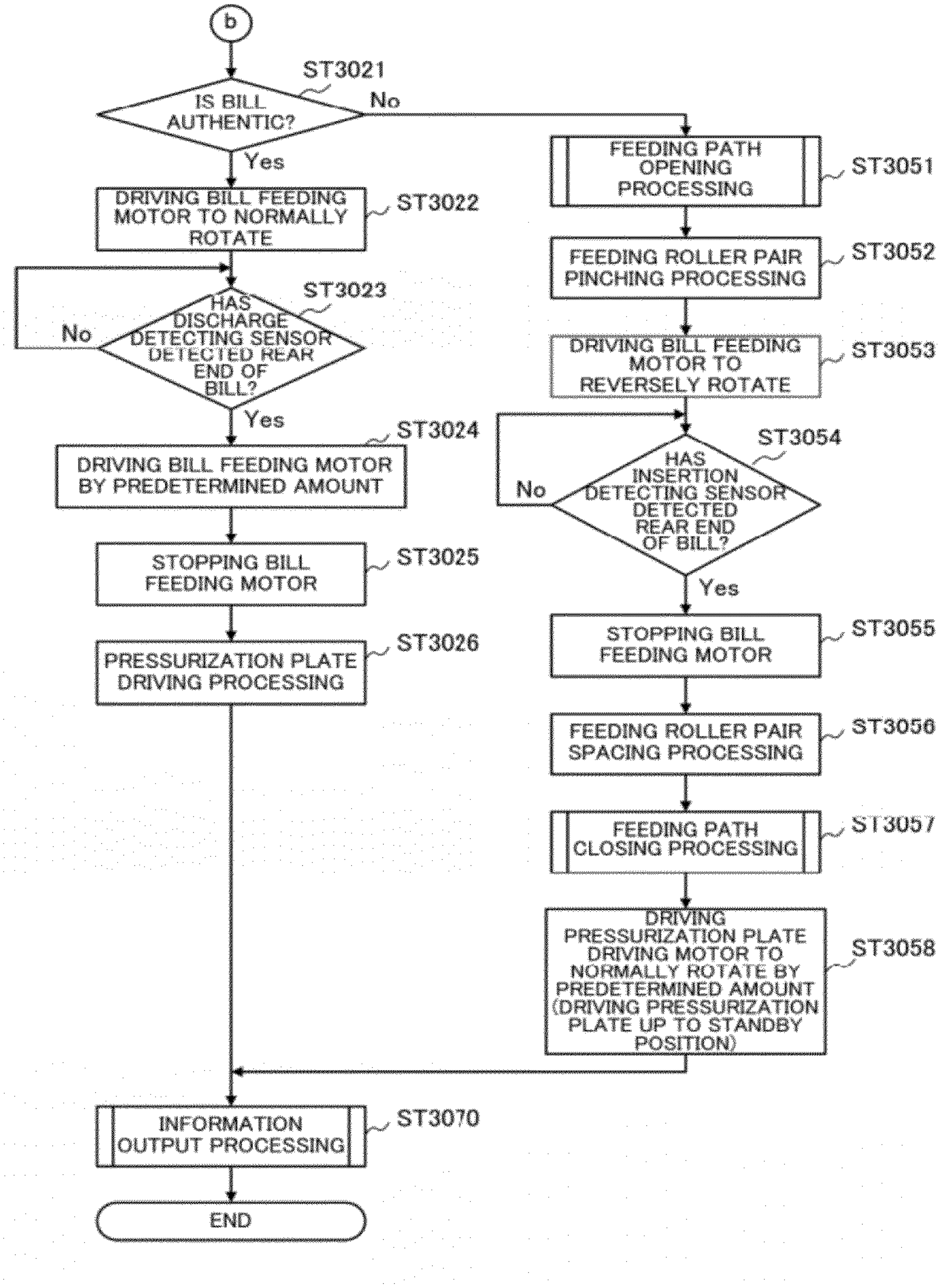
FIG. 109 is a flowchart explaining the processing operation of a bill in the bill processing device of the third embodiment (part 3)

In this state, skew correction actuation processing is performed (ST3009). This skew correction actuation processing is performed by driving the abovementioned skew correction mechanism motor 3040 to normally rotate to thereby drive one pair of movable pieces 3010A in a direction in which they approach each other. That is, in the skew correction actuation processing, as shown in the flowchart of FIG. 108, the abovementioned motor 3040 is driven to normally rotate, thereby moving one pair of movable pieces 3010A in a direction in which they approach each other (ST3110). The movement of the movable pieces is executed until a minimum width (for example, 62 mm in width) of the bill registered in the reference data storage section in control means has been reached. In this manner, a skew is corrected by means of the movable pieces 3010A abutting against each side and then the bill is positioned at a precise center position.

When the skew correction actuation processing as described above completes, feeding path opening processing is subsequently executed (ST3010). This processing is performed by driving the abovementioned skew correction mechanism motor 3040 to reversely rotate, thereby moving one pair of movable pieces 3010A in a direction in which they are spaced from each other (see ST3100 to ST3102 of FIG. 110).

Subsequently, the abovementioned roller elevation motor 3070 is driven; the upper feeding roller 3014A is moved so as to abut against the lower feeding roller 3014B; and a bill is pinched between the feeding roller pair (3014A, 3014B) (ST3011). Afterwards, the bill feeding motor 3013 is driven to normally rotate to feed the bill into the apparatus, and when the bill passes through the bill reading means 3008, reading processing of the bill is started (ST3012, ST3013).

In the bill reading processing, as shown in the timing chart of FIG. 115, four light sources, which is comprised of transmission light sources of red light and infrared ray of light in the abovementioned first light-emitting portion 3080*a* and the second light-emitting portion 3081*b* and reflection light sources of red light and infrared ray of light, repeat lighting-up and lighting-out at predetermined intervals. Moreover, lighting is controlled so that two or more light sources light simultaneously without overlapping the phase of each light source. In other words, lighting is controlled so that when one light source lights, the other three light sources light out. In this manner, as in the embodiment, even one light-receiving portion 3081*a* detects the light of each light source at predetermined intervals and can read an image consisting of contrast data in the printed region of a target to be identified, caused by the transmitted light and reflected light of red light and the transmitted light and reflected light of infrared ray of light.

After a bill fed passes through the bill reading means 3008, if the movable piece passage detecting sensor 3012 detects a rear end of the bill (ST3014), closing processing of the bill feeding path 3003 is executed (ST3015). In the processing, first, as shown in the flowchart of FIG. 112, after the movable piece passage detecting sensor 3012 detects the rear end of the bill, the abovementioned motor 3040 is driven to normally rotate, thereby moving one pair of movable pieces 3010A in a direction in which they approach each other (ST3130). Next, when the movable piece detecting sensor detects that the pair of movable pieces 3010A has moved to a predetermined position (minimum width position, for example, 52 mm) (ST3131), normal rotation driving of the motor 3040 is stopped (ST3132).

By the feeding path closing processing, one pair of movable pieces 3010A is moved to a minimum width position (52 mm in width) which is narrower than a width of every bill that can be inserted, to thereby effectively prevent pullout of a bill. That is, such closing processing of the bill feeding path is executed thereby making it possible to reduce a distance between the movable pieces 3010A and effectively prevent an illegal act such as operator's pulling out a bill to the insertion slot direction for illegal purpose.

In this state, the abovementioned movable piece detecting sensor may execute predetermined processing, assuming that an operator makes any illegal act when detecting movement of movable pieces 3010A. For example, processing may be executed of transmitting an illegal operation signal (error detection signal) to an upper apparatus managing operation of the bill handling apparatus, providing an alert lamp at the bill handling apparatus to blink the lamp and then forcibly performing discharge operation without validating processing of input acceptance (ST3061) inputted by the operator. Alternatively, appropriate processing may be performed of disabling operation of the bill handling apparatus (such as processing stop processing or bill discharge processing or the like).

Subsequent to the abovementioned feeding path closing processing (ST3015), feeding roller pair spacing processing is performed of driving the abovementioned roller elevation motor 3070 to space the feeding roller pair (3014A, 3014B) having pinched a bill from each other (ST3016). By performing the feeding roller pair spacing processing, even if an operator mistakenly additionally enter a bill (double entry), the bill is not subjected to feed operation by the feeding roller pair (3014A, 3014B). In addition, the bill abuts against a front edge of one pair of movable pieces 3010A having approached each other in ST3015, to thus able to reliably prevent double bill entry operation.

With the abovementioned closing processing of the bill feeding path, when the bill reading means 3008 reads data up to the rear end of a bill, the bill feeding motor 3013 is driven by a predetermined amount specified in advance to stop a bill at a predetermined position (Escrow position: the position at which a bill is fed to the downstream side by 13 mm from the center position of the bill reading means 3008). At this time, the authentication judgment section 3230 of the abovementioned control means 3200 refers to the reference data stored in the reference data storage section 3234 and then the comparison judgment section 3235 executes bill authentication judgment processing (ST3017 to ST3020).

In the authentication judgment processing, first, as shown in the flowchart of FIG. 128, the first authentication judgment processing described above is executed (ST3450). In the first authentication judgment processing, where it is judged that a bill is authentic (ST3451, Yes), the second authentication judgment processing as described below, i.e., authentication judgment processing based on a print length is carried out. In the first authentication judgment processing, where it is judged that a bill is bogus (ST3451, No), the bill is judged to bogus without executing the second authentication judgment processing and processing is completed (ST3457).

In the second authentication judgment processing, first, the bill reading means 3008 detects a length of a predetermined printed region (actually measured data of both faces) in both faces of a bill (ST3452). Next, it is judged whether or not actually measured data of one face (top face) exists in an allowable range R1 set on the top face as depicted in the graph of FIG. 126, for example (ST3453). If actually measured data of one face exists in the allowable range R1 (ST3453, Yes), it is subsequently judged whether or not actually measured data of the other face (back face) also exists in the allowable range R1 set on the back face as shown in the graph of FIG. 126 (ST3456). If actually measured data of the other face exists in the allowable range R1 (ST3456, Yes), it is judged that the bill is authentic (ST3458).

In ST3453 described above, if actually measured data of one face (defined as top face) does not exist in the allowable range R1 set on a top face (ST3453, No), a corrected value (r) is computed as to the top face in accordance with the abovementioned technique, for example (ST3454). Correction processing is then performed as to actually measured value of the printed region of the back face, based on the obtained corrected value (r) of the top face (ST3455). Based on the corrected actually measured value, it is judged whether the corrected value is in the allowable range (ST3456). If a value corrected as to the actually measured data for the back face exists in the preset allowable range R1 as to the back face, the bill is evaluated as being shrunk in the same manner as that on the top face and it is judged that the bill is authentic (ST3456, Yes, ST3458). In contrast, in the correction processing, if the corrected value of the back face deviates from the allowable range R1, it is judged that the bill is bogus (ST3456, No, ST3457).

In the abovementioned processing of ST3458, when it is judged that the bill is authentic, denomination data and amount-of-money data of the entered bill are acquired by applying processing such as character recognition with the use of the image data read by the bill reading means 3008. Then, the RAM 3224 is caused to store the acquired denomination data and amount-of-money data. These items of information are transmitted to the PTS terminal 1700, as described later.

The precision of authentication judgment can be enhanced by carrying out authentication judgment processing which is based on a print length of a printed region of a bill. Even in a case where a bill is authentic and enlargement has occurred, authentic judgment processing can be appropriately performed.

In the abovementioned authentication processing of ST3020, where it is judged that a bill is authentic (ST3021; Yes), an operator's input is accepted (ST3061). This processing corresponds to acceptance operation of an operator to press an acceptance button in order to accept provision of service (for example, acceptance processing together with the start of a game in a game machine) and processing of pressing a return button in order to perform return processing of an inserted bill.

When an operation of accepting provision of various kinds of services is inputted (ST3062; Yes), the bill feeding motor 3013 is subsequently driven to normally rotate in this state and then a bill is fed to the bill housing section 3100 (ST3022).

At the time of feeding a bill in the processing of ST3022, the bill feeding motor 3013 is driven to normally rotate until the discharge detecting sensor 3018 detects the rear end of the bill (ST3023). After the discharge detecting sensor 3018 has detected the rear end of the bill, the bill feeding motor 3013 is driven to normally rotate by a predetermined amount (ST3024, ST3025).

In the normal rotation driving processing of the bill feeding motor 3013 in ST3024 and ST3025, a bill is fed into the acceptance inlet 3103 of the bill housing section 3100 from the discharge outlet 3003 situated at the downstream side of the bill feeding path 3003 of the apparatus main body 3002. The abovementioned pair of belts 3150 comes into contact with an each-side top face of a bill fed and corresponds to the drive amount to be stably guided to the pressurization standby section 3108. That is, after the discharge detecting sensor 3018 has detected the rear end of the bill, the bill feeding motor 3013 is further driven to normally rotate by a predetermined amount, whereby the abovementioned one pair of belts 3150 is driven in a feeding direction while coming into contact with a bill fed-in, to guide a bill to the pressurization standby section 3108 in a stable state.

After the abovementioned bill feeding motor 3013 has stopped, driving processing of the pressurization plate 3115 is executed so as to place the bill on the placement plate 3105 (ST3026). When pressurization processing completes, the pressurization plate 3115 is moved to the standby position again and is stopped at that position.

In ST3021 of the abovementioned operating procedures, if it is identified that the inserted bill is not authentic or if an operator presses a return button (ST3062; No), feeding path opening processing is executed (see ST3051, ST3100 to ST3102 of FIG. 110) is executed. Afterwards, the bill feeding motor 3013 is driven to reversely rotate; pinching processing of the feeding roller pair (3014A, 3014B) is executed, and then, the bill that is on standby at the Escrow position is fed to the bill insertion slot 3005 (ST3052, ST3053). When the insertion detecting sensor 3007 detects a rear end of a bill to be returned to the bill insertion slot 3005, reverse driving of the bill feeding motor 3013 is stopped and the abovementioned roller elevation motor 3070 is driven to space the feeding roller pair (3014A, 3014B) having pinched a bill from each other (ST3054 to ST3056). Afterwards, feeding path closing processing is carried out (see ST3057, ST3130 to ST3132 of FIG. 112) and the driving motor 3020 of the pressurization plate 3115 is driven to normally rotate by a predetermined amount (ST3058), whereby the pressurization plate 3115 that is situated at the initial position is driven to move to the standby position, and a series of processing completes.

After the abovementioned processing of ST3026 or processing of ST3058 has been executed, the subroutine of information output processing shown in FIG. 114 is invoked and executed (ST3070).

FIG. 114 is a flowchart showing the subroutine of the processing of outputting various kinds of information to the PTS terminal 1700.

First, it is judged whether or not a result of bill authentication judgment is authentic (step ST71). The result of bill authentication judgment can be obtained by executing the abovementioned subroutine shown in FIG. 113.

When it is judged that the result of bill authentication judgment is authentic (YES), denomination data indicating denomination of a bill and amount-of-money data indicating an amount of money are outputted to the PTS terminal 1700 via the I/O port 3240 (step ST72). This subroutine is then completed. The denomination of bill used herein consists of bill attribute information indicating attributes of bills including countries, governments, governmental banks, and regions or the like issuing and administering bills such as US dollar bills, Yen bills, or Hong Kong dollar bills. The amount used herein is the amount corresponding to a currency unit defined depending on the attribute of that bill. The currency unit used herein includes US dollars or Yen, for example.

When it is judged that the result of bill authentication judgment is bogus (NO), error information indicating that the entered bill is bogus is outputted to the PTS terminal 1700 via the I/O port 3240 (step ST73). This subroutine is then completed.

The denomination data indicating denomination and amount-of-money data indicating an amount of money is thus transmitted to the PTS terminal 1700, whereby the PTS terminal 1700 can acquire the denomination data and amount-of-money data of the bill entered to the bill handling apparatus 3001. Based on the acquired items of data, various kinds of processing operations such as credit conversion or money exchange according to an exchange rate at that time can be executed.

According to the bill handling apparatus 3001 of the abovementioned configuration, the precision of authentication judgment can be enhanced, since authentication judgment processing based on a print length of a bill is executed. In addition, at the time of executing authentication judgment processing based on such a print length, even if contraction has occurred to a bill, authentication judgment can be precisely performed.

While the embodiment of the present invention has been described hereinabove, the present invention can be variously modified and carried out without being limitative thereto.

The present invention is characterized by specifying a print region from both faces of a bill as described above, acquiring length information (actually measured data), and identifying authentication of a bill (second authentication judgment processing) based on the actually measured data (correction processing is carried out if required), and the other configurations are not limitative to the abovementioned embodiments. Thus, it is possible to modify the abovementioned specific identifying method in the first authentication judgment processing, the configuration of bill reading means (that may be a configuration other than that of line sensor) and a mechanism for driving various kinds of driving members.

It is also possible to appropriately change a method of acquiring the abovementioned length data and a region (length) to be acquired. For example, there may be such a configuration so as to acquire length data of only a region in which bill watermark is formed, for example.

Further, various kinds of techniques can be employed as to an allowable range of actually measured data of a printed region or a method of setting the allowable range as well. For example, while in the aforementioned embodiments a predetermined number of authentic bills was caused to read by the bill reading means 3008 so as to derive a reference value and the allowable range based on the statistical finding from image data of each of the read bill, the reference value and the allowable range may be preset and the preset values may be stored in a reference data storage section.

The present invention can be incorporated into various kinds of apparatuses providing commodities or services by inserting a bill.

<<<Fourth Embodiment>>>

Hereinafter, a fourth embodiment of the present invention will be described with reference to the drawings.

FIG. 129 to FIG. 131 are views showing examples of a sheet identifying apparatus according to the present invention is applied to a bill identifying apparatus;

FIG. 129 is a perspective view showing an entire configuration; FIG. 130 is a perspective view showing a state in which an opening/closing member is opened with respect to a main body frame of an apparatus main body; and FIG. 131 is a right side view schematically showing a feeding path of a bill inserted through an insertion slot.

A bill identifying apparatus 4001 of a fourth embodiment is configured to be able to incorporated into various kinds of gaming machines such as slot machines. This apparatus is provided with: an apparatus main body 4002; and a housing section (housing stacker; safe) 4100 which provided in the apparatus main body 4002 and is capable of stacking and housing a number of bills. The housing section 4100 may be removably mounted to the apparatus main body 4002, and for example, a grip 4101 provided on a front face in a state in which a lock mechanism, although not shown, is released, is pulled thereby making it possible to remove the apparatus main body 4002.

The apparatus main body 4002, as shown in FIG. 130, has a main body frame 4002; and an opening/closing member 4002B configured so as to be opened/closed while one end is defined as a turning center with respect to the main body frame 4002A. These main body frame 4002A and opening/closing member 4002B, as shown in FIG. 131, are configured so that: a clearance (bill feeding path 4003) in which a bill is fed to an opposite portion of both is formed when the opening/closing member 4002B is closed with respect to the main body frame 4002A; and a bill insertion slot 4005 is formed so as to be coincident with the bill feeding path 4003 at the front face exposure side of both. The bill insertion slot 4005 serves as a slot-like opening so as to be able to be inserted into the apparatus main body 4002 from a short edge side of a bill.

In the apparatus main body 4002, there are provided: a bill feeding mechanism 4006 for feeding a bill along the bill feeding path 4003; an insertion detecting sensor 4007 for detecting a bill inserted into a bill insertion slot 4005; bill reading means 4008 which is installed at the downstream side of the insertion detecting sensor 4007, for reading information of a bill being fed; and a skew correction mechanism 4010 for precisely positioning and feeding a bill with respect to the bill reading means 4008.

Hereinafter, each of the abovementioned constituent elements will be described in detail.

The bill feeding path 4003 extends to the back side from the bill insertion slot 4005, and at the downstream side thereof, a discharge slot 4003*a* for discharging a bill to a bill housing section 4100 is formed.

The bill feeding mechanism 4006 is a mechanism that is capable of feeding the bill inserted through the bill insertion slot 4005 along the insertion direction and is capable of feeding back the inserted bill to the bill insertion slot 4005. The bill feeding mechanism 4006 is provided with: a motor 4013 (see FIG. 133) serving as a driving source installed in the apparatus main body 4002; and feeding roller pairs (4014A, 4014B), (4015A, 4015B), (4016A, 4016B), and (4017A, 4017B) which are driven by means of the motor 4013 and are arranged at predetermined intervals along the bill feeding direction on the bill feeding path 4003.

The feeding roller pairs are installed so as to be partially exposed on the bill feeding path 4003, all of which are provided as rollers in which the feeding rollers 4014B, 4015B, 4016B, and 4017B installed at the lower side of the bill feeding path 4003 are driven by means of the motor 4013, and the feeding rollers 4014A, 4015A, 4016A, and 4017A installed at the upper side serve as pinch rollers following these roller. The feeding roller pair (4014A, 4014B) for first pinching the bill inserted through the bill insertion slot 4005 and feeding it to the back side, as shown in FIG. 130, are installed at one site at the center position of the bill feeding path 4003, and the feeding roller pairs (4015A, 4015B), (4016A, 4016B), and (4017A, 4017B) sequentially installed at the downstream side are installed at two sites at predetermined intervals along the widthwise direction of the bill feeding path 4003.

As to the feeding roller pairs (4014A, 4014B) disposed in the vicinity of the abovementioned bill insertion slot 4005, in general, the upper feeding roller 4014A is spaced from the lower feeding roller 4014B. When the insertion detecting sensor 4007 detects bill insertion, the upper feeding roller 4014A is driven to the lower feeding roller 4014B so as to pinch the inserted bill.

The skew correction mechanism 4010 is provided with one pair of left and right movable pieces 4010A (only one side is shown) serving as skew correction. The skew correction mechanism motor 4040 is driven to thereby move one pair of left and right movable pieces 4010A so as to approach each other, whereby skew correction processing with respect to a bill is performed.

Various denominations of bills are inserted into the bill handling apparatus 4001. The sizes (length or width) of these bills are different from each other. Thus, it is presupposed that a bill is inserted through a bill insertion slot 4005 while it is tilted. In particular, in a case where a bill with a large width and a bill with a small width are inserted through the bill insertion slot 4005, the bill with the large width can be inserted into the bill insertion slot 4005. Therefore, if the bill with the small width is inserted through the bill insertion slot 4005, the bill is prone to tilt with respect to the bill feeding direction. In such a case also, the posture of the bill can be adjusted so as to be parallel to the bill feeding direction by means of the skew correction mechanism 4010. By doing this, there can be provided a bill handling apparatus 4001 which is capable of entering bills of different size and various denominations.

The insertion detecting sensor 4007 generates a detection signal when detecting the bill inserted into the bill insertion slot 4005. When this detection signal is issued, the motor 4013 is driven to normally rotate to feed a bill to the insertion direction. The insertion detecting sensor 4007 of the fourth embodiment is installed between the feeding roller pair (4014A, 4014B) and the skew correction mechanism 4010. This sensor is comprised of an optical sensor, for example, a recursive reflection type photosensor, whereas it may be otherwise comprised of a mechanical sensor.

As to a bill fed while a skew is corrected by means of the skew correction mechanism 4010, the bill reading means 4008 reads information and effectiveness (authentication) of the bill. In the fourth embodiment, the bill reading means 4008 is comprised of a line sensor for emitting light from the double-face side of a bill fed and then detecting the transmitted light and the reflected light by means of a light-receiving element, thereby performing reading.

In the authentication identifying processing of the fourth embodiment, in order to enhance the identifying precision, light is emitted to a printed portion of a bill fed, by utilizing the abovementioned bill reading means, the transmitted light and the reflected light are received, and it is identified whether or not a feature point at the printed portion (a region of the feature point targeted to be identified and a method of extract the region are arbitrarily available) is coincident with an authentic one.

In the present invention, when such authentication identifying processing is executed, a watermark portion formed on a bill is defined as a region targeted to be identified, in authentication judgment. As described later, bill information at the watermark portion, which is read by the bill reading means 4008, is converted to a two-dimensional image so as to perform authentication judgment. That is, the watermark portion is a portion characterized as one means for preventing bill counterfeit. Thus, a two-dimensional image is acquired as to such a watermark region, and the acquired image is compared with data of the watermark portion of an authentic bill, thereby making it possible to improve the identifying precision more remarkably.

An authentic bill includes a region in which there are different items of image data acquired depending on a wavelength of light emitted (for example, visible light or infrared ray of light). Thus, in the fourth embodiment, while attention is paid to this matter, light with different wavelengths depending on a plurality of light sources is emitted to a bill (for example, red light and infrared ray of light is emitted thereto), the transmitted light and reflected light are detected, thereby enhancing authentication identifying precision more remarkably. That is, the red light and infrared ray of light has different wavelengths, and thus, if the transmitted-light data or reflected-light data caused by a plurality of light beams with different wavelengths are employed for bill authentication judgment, the transmitted light passing through a specific region between an authentic bill and a bogus bill; and the reflected light reflected from the specific region have a property that these rays of light are different from each other in transmittance and reflection index. Therefore, bill authentication identifying precision is enhanced by employing a light source of a plurality of wavelength.

A specific bill authentication identifying method is not described in detail, since various items of light-receiving data (transmitted-light data, reflected-light data) can be acquired depending on the wavelength of light emitted to a bill or emitting region. However, in the bill watermark region for example, if an image of that region is seen with light of different wavelengths, the image can be seen greatly differently. Thus, it is considered that: that portion is defined as a specific region; transmitted-light data or reflected-light data in the specific region; and whether a bill targeted to be identified is authentic or bogus is identified in comparison with normal data in the same specific region of the authentic bill stored in advance in storage means (ROM). At this time, a specific region is defined according to denomination, predetermined weighting is set to the transmitted-light data or reflected-light data in the specific region, and it is possible to further improve authentication identifying precision.

The abovementioned bill reading means 4008, as described later, light-controls a light-emitting portion at predetermined intervals, as described later, and a line sensor detects the transmitted light and reflected light when a bill pass through the line sensor. Thus, the line sensor becomes capable of acquiring image data which is based on a plurality of pixel information with a predetermined size being defined as one unit.

In this case, the image data acquired by the line sensor is converted to data including color information having brightness on a pixel-by-pixel basis by means of a converting section to be described later. The color information on a pixel-by-pixel basis having brightness, to be converted at the converting section, corresponds to a contrast value, i.e., a density value (luminescence value), and for example, as one-byte information, a numeric value (0: black to 255: white) from 0 to 255 are assigned to each pixel according to the density value.

Thus, in the abovementioned authentication identifying processing, it is possible to identify authentication by a correlation coefficient obtained by: extracting various kinds of regions of a bill without being limitative to the watermark portion formed on a bill; employing the pixel information (density value) included in that region and pixel information in the same region of an authentic bill; and substituting these items of pixel information into an appropriate correction formula and then performing computation in accordance with the thus substituted correction formula. Alternatively, apart from the above, analog waveforms are generated from the transmitted-light data or reflected-light data, for example, and the shapes of the wavelengths are compared with each other, thereby making it possible to identify authentication.

Hereinafter, a configuration of the abovementioned bill reading means 4008 will be described in detail with reference to FIG. 130 and FIG. 131.

The abovementioned bill reading means 4008 has: a light-emitting unit 4080 provided with a first light-emitting portion 4080*a* which is arranged at the opening/closing member 4002B side, and is capable of emitting infrared ray of light and red light to the upper side of a bill fed; and a light-receiving/emitting unit 4081 which is arranged at the main frame 4002A side.

The light-receiving/emitting unit 4081 has: a light-receiving portion 4081*a* which is provided with a light receiving sensor opposite to the first light-emitting portion 4080*a* so as to sandwich a bill; and a second light-emitting portion 4081*b* which is arranged adjacent to each side in the bill feeding direction of the light-receiving portion 4081*a*, making it possible to emit infrared ray of light and red light.

The first light-emitting portion 4080*a* disposed to be opposed to the light-emitting portion 4081*a* functions as a transmission light source. The first light-emitting portion 4080*a*, as shown in FIG. 130, is comprised of a synthetic resin-based rectangular rod-like member that emits light from an LED element 4080*b* which is mounted to one end through a light guide 4080*c* provided inside thereof. The first light-emitting portion of such configuration is arranged in line in parallel to the light-receiving portion 4081*a* (light-receiving sensor). With such a simple configuration, it becomes possible to emit light entirely uniformly with respect to the widthwise direction of the feeding path of a bill fed.

The light-receiving portion 4081*a* of the light-receiving/emitting unit 4081 is formed in a thin plate shape which extends an intersection direction with respect to the bill feeding path 4003 and is shaped like a band having a width to extent such that there could not be affected the sensitivity of the light-receiving sensor, although not shown, the sensor being provided at the light-receiving portion 4081*a*. The light-receiving sensor is configured as a so called line sensor such that: a plurality of CCDs (Charge Coupled Devices) are provided in line at the center in the thickness direction of the light-receiving portion 4081*a*; and a GRIN lens array 4081*c* is disposed in line. Thus, it becomes possible to receive the transmitted light or reflected light of infrared ray of light or red light from the first light-emitting portion 4080*a* or the second light-emitting portion 4081*b*, which is emitted to a bill targeted for authentication identification, and then, generate, as light-receiving data, contrast data according to the luminescence (pixel data including brightness information) or a two-dimensional image from the contrast data.

The second light-emitting portion 4081*b* of the light-receiving/emitting unit 4081 functions as a reflection light source. The second light-emitting portion 4081*b*, like the first light-emitting portion 4080*a*, is comprised of a synthetic resin-based rectangular rod-like member which is capable of emitting the light from the LED element 4081*d* mounted to one end entirely uniformly through a light guide 4081*e* provided inside. The second light-emitting portion 4081*b* is configured to be arranged in line in parallel to the light-receiving portion 4081*a* (line sensor).

The second light-emitting portion 4081*b* is capable of emitting light to a bill at an elevation angle of 45 degrees, for example, and is arranged so that the light-receiving portion 4081*a* receives reflected light from the bill. In this case, although the light emitted from the second light-emitting portion 4081*b* is incident to the light-receiving portion 4081*a* at 45 degrees, the incidence angle is not limited to 45 degrees. If light can be emitted uniformly without shading with respect to a top face of a bill, its setup state can be appropriately set. Thus, as to disposition of the second light-emitting portion 4081*b* and the light-receiving portion 4081*a*, design change can be appropriately made according to a structure of the bill handling apparatus. The second light-emitting portion 4081*b* is installed at each side while the light-receiving portion 4081*a* is sandwiched therebetween so as to emit light from each side at an incidence angle of 45 degrees. If there is any damage or a wrinkle on a bill surface, if light is emitted from one side to irregularities having occurred to these damaged or wrinkled portions, light may be interrupted at such irregular portions, and a shaded portion may occur. Thus, by emitting light from each side, the shading produced at the irregular portion is prevented, making it possible to acquire image data with higher precision than the one obtained when emission from one side is performed. Of course, the second light-emitting portion 4081*b* may be configured to be installed at one side.

The configuration or layout or the like of the abovementioned light-emitting unit 4080 and light-receiving/emitting unit 4081 can be appropriately modified without being limitative to the embodiment.

In each of the first light-emitting portion 4080*a* and second light-emitting portion 4081*b* of the abovementioned light-emitting unit 4080 and the light-receiving/emitting unit 4081, at the time of bill reading, the infrared ray of light and red light is controlled to light up at predetermined intervals as shown in the timing chart of FIG. 132. That is, four light sources, which are comprised of transmission light sources of red light and infrared ray of light at the first light-emitting portion 4080*a* and the second light-emitting portion 4081*b* and reflection light sources of led light and infrared ray of light, repeat lighting-up and lighting-out, and are controlled to light up so that two or more light sources do not light simultaneously without overlapping the phase of each light source. In other words, lighting is controlled so that when one light source lights, the other three light sources. In this manner, as in the fourth embodiment, even one light-receiving portion 4081*a* detects light of each light source at predetermined intervals and can read an image consisting of contrast data in a printed region of a bill, caused by the transmitted light and reflected light of red light and the transmitted light and reflected light of infrared ray of light, making it possible to measure a print length of each face. In this case, it is also possible to enhance resolution by controlling the lighting intervals to be short.

The bills identified to be authentic in the bill reading means 4008 configured as described above are fed to the abovementioned bill housing section 4100 via the discharge outlet 4003*a* of the bill feeding path 4003 by means of the bill feeding mechanism 4006. The thus fed bills are sequentially stacked and housed in the bill housing section. The bill feeding mechanism 4006 is reversely driven, whereby the bills identified to be bogus are returned to the bill insertion slot 4005 side and then are discharged from the bill insertion slot 4005.

<<<Control Means 4200 of the First Mode>>>

Next, control means 4200 for controlling operation of the abovementioned bill identifying apparatus 4001 will be described with reference to the block diagram of FIG. 133.

The control means 4200 depicted in the block diagram of FIG. 133 is provided with a control board 4210 for controlling operation of each of the driving devices. On the control board 4210, there are mounted: a CPU (Central Processing Unit) 4220 controlling driving of each of the driving devices and configuring bill identifying means; a ROM (Read Only Memory) 4222; a RAM (Random Access Memory) 4224; and an authentication judgment section 4230.

The ROM 4222 stores permanent data such as operating programs of various kinds of driving devices such as a bill feeding mechanism motor 4013 or a skew correction mechanism motor 4040 or various kinds of programs such as an authentication judgment program in the authentication judgment section 4230.

The CPU 4220 operates in accordance with the programs stored in the ROM 4222, inputs/outputs a signal to/from various kinds of the driving devices mentioned above via an I/O port 4240, and performs entire operational control of the bill identifying apparatus. That is, the driving devices such as the bill feeding mechanism motor 4013 and the skew correction mechanism motor 4040 are connected to the CPU 4220 via the I/O port 4240. These driving devices are operatively controlled by means of a control signal from the CPU 4220 in accordance with the operating programs stored in the ROM 4222. A detection signal from the insertion detecting sensor 4007 is inputted to the CPU 4220 via the I/O port 4240, and based on this detection signal, the driving devices mentioned above are controlled to be driven.

Further, to the CPU 4220, a detection signal based on the transmitted light and reflected light of the light emitted to a bill is inputted from a light-receiving portion 4081*a* in the abovementioned bill reading means 4008 via the I/O port 4240.

Furthermore, the I/O port 4240 has a portion to be electrically connected to the abovementioned PTS terminal 1700. As described later, the denomination data and amount-of-money data of a bill entered into the bill handling apparatus 4001 are transmitted to the PTS terminal 1700 via the I/O port 4240.

The RAM 4224 temporarily stores the data or programs employed when the CPU 4220 operates and has a function of acquiring and temporarily storing light-receiving data of a bill (image data comprised of a plurality of pixels).

The authentication judgment section 4230 has a function of carrying out authentication identifying processing as to a bill fed and identifying authentication as to that bill. The authentication judgment section 4230 has: a converting section 4231 for converting pixel information including color information having brightness (density value) on a pixel-by-pixel basis, relating to the light-receiving data of a bill stored in the RAM 4224; and an image correction processing section 4231 for applying correction processing of color information of each pixel, based on the pixel information converted by the converting section 4231.

The authentication judgment section 4230 is provided with: a reference data storage section 4233 storing reference data relating to an authentic bill; and an identifying processing section 4235 for comparing comparison data, to which correction processing of an image about a bill targeted for authentication at the image correction processing section 4231 is applied, with reference data stored in the reference data storage section 4233, and then performing authentication identifying processing. In this case, the reference data storage section 4233 stores the image data (standard image) relating to an authentic bill employed at the time of carrying out authentication identifying processing to be associated with predetermined parameters (xStart, yStart, zsize, ysize) with respect to a watermark image.

While the abovementioned reference data (including standard image) is stored in an exclusive reference data storage section 4233, the data may be stored in the abovementioned ROM 4222. While the reference data to be referred to at the time of authentication identifying processing may be stored in advance in the reference data storage section 4233, for example, there may be a construction such that: light-receiving data is acquired while a predetermined number of authentic bills is fed through the bill feeding mechanism 4006; an average value is computed from data of a number of authentic bills obtained; and the computed value is stored as reference data.

Further, the first light-emitting portion 4080*a* and the second light-emitting portion 4081*b* in the above reading means 4008 are connected to the CPU 4220 via the I/O port 4240. At these first light-emitting portion 4080*a* and second light-emitting portion 4081*b*, a lighting interval and lighting-out are controlled via a light emission control circuit 4260 by means of a control signal from the CPU 4220 in accordance with the operating programs stored in the abovementioned ROM 4222.

According to the bill reading means (line sensor) configured as described above, two-dimensional image information can be acquired from a number of pixel information. For example, a region targeted for identifying authentication is extracted based on brightness information of each pixel converted by the abovementioned converting section 4232, and the extracted image information are compared with reference data, thereby identifying authentication. In this case, it is preferable that a region targeted for identifying authentication is defined as a portion which is difficult to counterfeit, in a printed region of a bill. In the present invention, a two-dimensional image of a region of a watermark portion of a bill is extracted and then the extracted image is compared with reference data so as to thereby perform authentication identifying processing.

Incidentally, as described above, a watermark portion of a bill is often formed in a center region of a bill, and if such a bill is formed, a fold may has occurred to the watermark portion. In the thus folded bill, if a two-dimensional image is acquired with the use of the line sensor as described above, a change has occurred to pixel information along the folded portion, and a trouble may has occurred in comparison with reference data. The factors that a change has occurred to pixel information along such a folded portion are considered as follows. In a case of acquitting transmitted light at the light-receiving portion 4081*a*, all of the transmitted-light quantity cannot be detected at the light-receiving portion, since the light emitted to a bill is refracted at the folded portion. Alternatively, in a case of acquiring reflected light, the light emitted to a bill is randomly reflected at the folded portion, and like the transmitted light, all of the reflected-light quantity cannot be detected at the light-receiving portion. As a result, a fold has occurred in the authentication identifying region, whereby an inserted bill may be judged to be bogus in spite of the fact that the inserted bill is authentic.

In the fourth embodiment, even if a fold has occurred to an authentication identifying target region (defined as a watermark region), an influence of the fold is mitigated.

Hereinafter, an example of a technique of authentication identifying processed based on a watermark image including fold elimination processing will be specifically described with reference to the flowchart of FIG. 134 and FIG. 135 to FIG. 136. Authentication identifying processing based on such a watermark image is executed one of some of the bill authentication identifying processing operations that otherwise exist.

First, the bill reading means 4008 performs reading of a bill fed, and the converting section 4232 performs conversion processing from the read image to pixel information including color information (ST4001). As described above, the bill reading means 4008 emits light (red light, infrared ray of light) from the first light-emitting section 4080*a* and the second light-emitting portion 4081*b* to a bill fed by the bill feeding mechanism 4006 and the light-receiving portion (line sensor) 4081*a* receives the transmitted light and the reflected light to execute reading of the bill. At the time of the reading, while bill feeding processing is performed, it is possible to acquire a number of pixel information with a predetermined size being defined as one unit every time light is emitted. The image data comprised of the number of pixels thus acquired is stored in storage means such as the RAM 4224. The image data comprised of a number of pixels stored here is converted to information including color information having brightness on a pixel-by-pixel basis (color information obtained by assigning a numeric value of 0 to 255 (0: black to 255: white according to the density value) by means of the converting section 4232.

Next, extraction processing of a watermark image region is performed from the thus converted pixel information (ST4002). For example, at the time of feeding a bill, at a stage of migrating from a printed region to a watermark image region, the density value of pixel information increases (whitens). Thus, it becomes possible to extract a watermark image region by detecting a displaced position while setting a threshold value. Of course, it is possible to extract the watermark image region by means of various kinds of technique, based on the obtained image information or the converted image information. As to the emitted light employed to extract a watermark image, there is employed any of the red light or infrared ray of light of the transmitted light and the red light or infrared ray of light of the reflected light (a combination of them may also be used).

In the watermark image region 4100 of a fed bill, for example, as shown in FIG. 135(*a*), if a fold (4105) has occurred in an orthogonal direction along the feeding direction (widthwise direction and Y direction to be described later), as to a number of pixel information in a watermark image region including the color information converted by the converting section 4232, as shown in FIG. 135(*b*), a region in which the density value is lowered in comparison with the vertical direction of the other region has occurred at a given position of the corresponding direction (vertical direction. This direction is defined as Y direction).

In FIG. 135(*b*), for the simplification of explanation, a 12-pixel component is extracted in the Y direction in the watermark image region 4100, and a 7-pixel component is extracted in the feeding direction (horizontal direction. This direction is defined as X direction). For the sake of clear understanding, the pixel information corresponding to a fold 4105 of a bill shown in FIG. 135(*a*) is shown as the fact that a line with a low density value has occurred along the vertical line at a position of X=4 in FIG. 135(*b*) (Of course, it is considered that influence due to a fold exists as to a peripheral position such as X=3, 5). In addition, while a direction (one direction and the other direction) is associated with a widthwise direction and a lengthwise direction of a bill, the direction is not limitative thereto.

Next, computation processing of an average density value of the respective one of the vertical line (Y direction) and horizontal line (X direction) is performed as to a number of pixel information (watermark image) in the thus obtained watermark image region 4100 (ST4003). When the density value in a coordinate [x, y] of a watermark image is defined as f[x, y], and a horizontal width in each pixel is size and the vertical width is ysize, the average density of the vertical line at a point of the coordinate [x, y] and the average density value of the horizontal line are derived by Mathematical Formula 2 below.

$$\overline{fy}[x] = \frac{\sum_j f[x, j]}{ysize} \qquad \overline{fx}[y] = \frac{\sum_i f[i, y]}{xsize}$$ [Mathematical Formula 2]

Subsequently, computation processing of the average density value of the entire watermark region is performed (ST4004). The average density value is derived by Mathematical Formula 3 below.

$$\overline{f} = \frac{\sum_i \sum_j f[i, j]}{xsize \times ysize}$$ [Mathematical Formula 3]

By means of the computation processing average density value as described above, the average density value (144, 121, 150 . . . ) of the vertical lie, the average density value (105, 132, 105 . . . ) of the horizontal line, and the average density value (118) of the entire watermark image are computed as to a number of pixel information including color information obtained at the converting section 4232.

Correction processing is performed as to the density value of each pixel in FIG. 135(*b*) (ST4005). This correction processing is performed so that each of the average density values of the vertical line and horizontal line computed as described above is coincident to the average density value (118) of the entire watermark image region. The density value corrected in each pixel at a point of the coordinate [x, y] is derived by Mathematical Formula 4 below.

$$g[x,y]=f[x,y]+(\overline{f}-\overline{fy}[x])+(\overline{f}-\overline{fx}[y])$$ [Mathematical Formula 4]

In Mathematical Formula 4 mentioned above, the inside of brackets of the second term of the right side is a correction component with respect to a vertical fold; the inside of brackets of the third embodiment is a correction component; the density value in a source image is defined as f[x, y]; and the correction component is added thereto, thereby eliminating folds in the vertical and horizontal directions. That is, by means of the correction processing, as shown in FIG. 136(*b*), correction processing of the vertical and horizontal pixel information is executed. By means of such correction processing, as shown in FIG. 136(*a*), it becomes possible to obtain a two-dimensional image whose fold is eliminated, in the watermark image region 4100.

As to the correction processing, instead of additive and subtractive operation as in Mathematical Formula 4 mentioned above, for example, it is also possible to correct the density value of each pixel by employing multiplying or dividing operation as in Mathematical Formula 5 below.

$$g[x, y] = f[x, y] \times \left(\frac{\overline{f}}{\overline{fy}[x]}\right) \times \left(\frac{\overline{f}}{\overline{fx}[y]}\right)$$ [Mathematical Formula 5]

In Mathematical Formula 5 mentioned above, the inside of brackets of the second term of the right side is a correction component with respect to a vertical fold; the inside of brackets of the third term is a correction component with respect to a horizontal fold, the density value in a source image is defined as f[x, y], and the correction component is multiplied therefor, making it possible to eliminate the folds in the vertical and horizontal direction.

By the correction processing of each pixel in ST4005 mentioned above, an influence due to a linear fold 4105 shown in FIG. 135(*a*) is reduced, and moreover, the feature of a human image in a watermark image is never eliminated by the fold elimination processing (ST4001 to ST4005).

The identifying processing section 4235 extracts an image of a watermark region from a standard image stored in advance in the reference data storage section 4233 with the use of the abovementioned parameters; and compares the feature quantity of extracted image with a two-dimensional image whose fold has been eliminated, by means of the abovementioned correction processing, thereby identifying whether or not the watermark image is correct (ST4006).

In comparison processing (ST4006) carried out in the identifying processing section 4235 of the fourth embodiment, a correlation coefficient R shown in Mathematical Formula 6 below is derived between the image data corrected shown in FIG. 136(*b*) and the reference data stored in the reference data storage section 4233 so as to thereby identify authentication.

[Mathematical Formula 6]

$$R = \frac{\sum_i \sum_j (g[i, j] - F)(s[i, j] - S)}{\sqrt{\sum_i \sum_j (g[i, j] - F)^2}\sqrt{\sum_i \sum_j (s[i, j] - S)^2}}$$

In Mathematical Formula 6 mentioned above, [i, j] corresponds to a coordinate of a bill watermark forming region; the density value of a two-dimensional image of acquired data from a bill targeted to be identified, in the bill coordinate [i, j] is defined f [i, j]; the density value in reference data is defined as s [i, j]; the average density in acquired data is defined as F; and the average density value of reference data is defined as S.

The correlation coefficient R derived by Mathematical Formula 6 mentioned above, as publicly known, takes a value of −1 to +1, the one close to +1 (high correlation coefficient) is defined to be high in degree of analogousness. Thus, a predetermined threshold value is set as to the correlation coefficient R to be derived, and if the correlation coefficient R is equal to or greater than the threshold value, it is judged that the bill is authentic (ST4007: Yes, ST4008), and if the correlation coefficient R is lower than the threshold value, it is judged that the bill is bogus (ST4007: No, ST4009).

In the abovementioned processing of judging that the bill is authentic in ST4008, the denomination data and amount-of-money data of a bill entered are acquired by applying processing such as character recognition with the use of the image data read by the bill reading means 4008. The acquired denomination data and amount-of-money data are stored in the RAM 4224. These items of information are transmitted to the PTS terminal 1700, as described later.

After the abovementioned processing of ST4007 or processing of ST4008 has been executed, the subroutine of information output processing shown in FIG. 114 of the first embodiment is invoked and executed (ST3070).

FIG. 114 is a flowchart showing a subroutine of processing of outputting various kinds of information to the PTS terminal 1700.

First, it is judged whether or not a result of bill authentication judgment is authentic (step ST71). The result of bill authentication judgment can be obtained by executing the abovementioned subroutine shown in FIG. 134.

When it is judged that the result of bill authentication judgment is authentic (YES), the denomination data indicating denomination of the bill and amount-of-money data indicating an amount of money are outputted to the PTS terminal 1700 via the I/O port 4240 (step S72) and then this subroutine is completed. The denomination of a bill used herein consists of bill attribute information indicating attributes of bills including countries, Governments, Governmental banks, or regions issuing or managing US dollar bills, Yen bills, Hong Kong dollar bills. The amount used herein is an amount corresponding to a currency unit defined depending on the attribute of that bill. The currency unit used herein includes US dollars, Yen and the like, for example.

When it is judged that the result of bill authentication judgment is bogus (NO), error information indicating that the entered bill is bogus is outputted to the PTS terminal 1700 via the I/O port 4240 (step ST73) and then this subroutine is completed.

The denomination data indicating denomination and amount-of-money data indicating an amount of money are transmitted to the PTS terminal 1700, whereby the PTS terminal 1700 can acquire the denomination data and amount-of-money data of the bill entered into the bill handling apparatus 4001. Based on these items of information, various kinds of processing operations such as credit conversion or money exchange according to an exchange rate at that time can be executed.

It becomes possible to identify authentication further precisely by thus deriving a correlation coefficient from an entire watermark image instead of a partial region of the watermark image acquired and then comparing authentication.

In the fourth embodiment, the precision of authentication identifying can be improved by acquiring information of a watermark image for preventing counterfeit in a bill (two-dimensional image information and then comparing the acquired information with reference image watermark information (standard image). In such authentication identifying method, even if a fold has occurred to a portion of the watermark image, fold elimination processing as described above is applied, making it possible to acquire an appropriate two-dimensional image reducing an influence caused by the fold and making it possible to precisely execute authentication identifying processing. Although a fold occurring in a widthwise direction has been shown, even in a case where the fold along the feeding direction has occurred or a wrinkle has occurred in the watermark image region, it becomes possible to perform authentication identifying processing by eliminating the fold or the wrinkle by means of the abovementioned technique.

In the abovementioned correction processing in the image correction processing section 4231, although an average density value on a pixel-by-pixel basis array in a vertical direction, an average density value on a pixel-by-pixel basis array in a horizontal direction, and an average density value of the entire watermark image are computed from the watermark image on a pixel-by-pixel basis, which is converted by means of the converting section 4232, and then, the density value of each pixel is processed to be corrected so as to be coincide with the average density value of the entire watermark image, there is no need to strictly coincide with the average density value of the entire watermark image. Even if correction processing is performed so as to approximate to the average density value of the entire watermark image, it is possible to eliminate the influence caused by a fold. Thus, it is possible to appropriately set the approximation amount depending on an elimination degree of a fold and the precision of identifying authentication.

In the abovementioned fourth embodiment, as to the reference watermark image (standard image) stored in the reference data storage section 4233 as well, like the read data of a bill acquired as an identifying target, the average density value on a pixel-by-pixel basis array in the vertical direction, the average density value on a pixel-by-pixel basis array in the horizontal direction, and the average density value of the entire watermark image are computed; and then, correction processing of the density value of each pixel may be applied so as to approximate or coincide with the average density value of the entire watermark image.

Correction processing similar to that of a watermark image of a read bill is thus applied to a reference watermark image as well, thereby enhancing connectivity when comparing feature amounts of both and making it possible to identify authentication more precisely.

In the abovementioned configuration, although the identifying processing section 4235 computes a correlation coefficient from the density value on a pixel-by-pixel basis, which is corrected by means of the watermark image correction processing section, and the density value on a pixel-by-pixel basis of the reference watermark image that is stored in the reference data storage section 4233, and it is judged whether the bill is authentic or bogus, based on the correlation coefficient, various kinds of techniques can be employed as to the identifying method. A specific authentication identifying technique can be appropriately modified including computing a distortion amount of each of the pixels to be compared with each other between the corrected image data and reference image data and then identifying authentication based on the average value.

Although the embodiment of the present invention has been described hereinabove, the present invention can be variously modified and carried out without being limitative thereto.

As described above, the present invention is characterized by eliminating a fold from image information of a watermark portion of a bill targeted to be identified and comparing the information after eliminated with image information in a watermark region of an authentic bill, thereby identifying authentication, the other configurations are not limitative to the abovementioned embodiment. Thus, the abovementioned technique may be employed as one of the authentication identifying processing operations by various kinds of techniques, and further, a configuration provided with other authentication identifying processing may be employed. In this case, the priority executed by other authentication identifying processing is not limitative thereto.

A configuration of the abovementioned bill reading means 4008 (that may be a configuration of an element other than the line sensor) and a mechanism for driving various kinds of driving members can be appropriately modified.

Apart from the abovementioned bills, the present invention can be incorporated into various kinds of apparatuses for identifying authentication of sheets or the like other than bills such as commodity tickets or coupon tickets.

<<<Control Means 4200 of the First Mode>>>

Next, control means 4200 for controlling operation of the abovementioned bill identifying apparatus 4001 will be described with reference to the block diagram of FIG. 137.

The control means 4200 depicted in the block diagram of FIG. 137 is provided with a control board 4210 for controlling operation of each of the abovementioned drive devices. On the control board 4210, there are mounted: a CPU (Central Processing Unit) 4220 controlling driving of each of the driving devices and configuring bill identifying means; a ROM (Read Only Memory) 4222; a RAM (Random Access Memory) 4224; and an authentication judgment section 4230.

The ROM 4222 stores permanent data such as various kinds of programs such as operating programs of various kinds of driving devices such as the bill feeding mechanism motor 4013, the skew correction mechanism motor 4040 or an authentication program in the authentication judgment section 4230.

The CPU 4220 operates in accordance with the programs stored in the ROM 4222; inputs/outputs a signal to/from various kinds of driving devices via the I/O port 4240; and performs entire operation control of the bill identifying apparatus. That is, the driving devices such as the bill feeding mechanism motor 4013 and/or skew correction mechanism motor 4040 are connected to the CPU 4220 via the I/O port 4240. These driving devices are operatively controlled by means of a control signal from the CPU 4220 in accordance with the operating programs stored in the ROM 4222. A detection signal from the insertion detecting sensor 4007 is inputted to the CPU 4220 via the I/O port 4240, and based on the detection signal the driving devices mentioned above are controlled to be driven.

Further, a detection signal based on the transmitted light or reflected light of the light emitted to a bill is inputted from the light-receiving portion 4081*a* in the abovementioned bill reading means 4008 to the CPU 4220 via the I/O port 4240.

Furthermore, the I/O port 4240 has a portion to be electrically connected to the abovementioned PTS terminal 1700. As described later, the denomination data and amount-of-money data of a bill entered into the bill handling apparatus 4001 are transmitted to the PTS terminal 1700 via the I/O port 4240.

The RAM 4224 temporarily stores data or programs employed when the CPU 4220 operates and acquiring and has a function of temporarily storing light-receiving data of a bill (image data comprised of a plurality of pixels).

The authentication judgment section 4230 has a function of carrying out authentication identifying processing as to a bill fed and then identifying authentication as to the bill. The authentication judgment section 4230 is provided with: a converting section 4231 for converting light-receiving data of a bill stored in the RAM 4224 with pixel information including color information (density value) having brightness on a pixel-by-pixel basis; a reference data storage section 4233 storing reference data relating to authentic bills; and an identifying processing section 4235 for comparing the image data (comparison data) converted by the converting section 4231 with the reference data stored in the reference data storage section 4233 and then performing authentication identifying processing.

In this case, the reference data storage section 4233 stores image data (standard image) of a watermark portion relating to an authentic bill employed at the time of carrying out authentication identifying processing. Specifically, this standard image comes under image data caused by a number of pixels obtained at the time of emitting light to the watermark image region of the authentic bill and receiving the transmitted light, and is stored to be associated with predetermined parameters (xStart, yStart, xsize, ysize).

While the abovementioned reference data (including standard image) is stored in an exclusive reference data storage section 4233, the data may be stored in the abovementioned ROM 4222. While the reference data (reference data) referred to at the time of authentication identifying processing may be stored in advance in the reference data storage section 4233, for example, there may be a configuration such that: light-receiving data is acquired while a predetermined number of authentic bills is fed through the gill feeding mechanism 4006; an average value is computed from the obtained data of a number of authentic bills; and the computed value is stored as reference data.

Further, a first light-emitting portion 4080*a* and a second light-emitting portion 4081*b* in the abovementioned bill reading means 4008 are connected to the CPU 4220 via the I/O port 4240. As to these first light-emitting portion 4080*a* and second light-emitting portion 4081*b*, lighting intervals and lighting-out are controlled via a light-emitting control circuit 4260 by means of a control signal from the CPU 4220 in accordance with the operating programs stored in the abovementioned ROM 4222.

According to the bill reading means (line sensor) configured as described above, two-dimensional image information can be acquired from a number of pixel information. For example, a target region at the time of identifying authentication is extracted based on brightness information of each pixel, which is converted by means of the abovementioned converting section 4232, and then, the extracted image information is converted with reference data, thereby identifying authentication. In this case, it is preferable that a region targeted for identifying authentication is defined as a portion which is difficult to counterfeit in a printed region of a bill. In the present invention, a two-dimensional image of a region of a bill watermark portion is extracted and then the extracted image is compared with reference data so as to thereby perform authentication identifying processing.

Incidentally, as described above, as to a watermark portion of a bill, there has occurred a phenomenon that bright and dark matters are reversed when the portion is seen with transmitted light and when it is seen with reflected light. The present invention focuses on such phenomenon so as to identify authentication of a watermark portion by means of the light-receiving portion 4081*a* installed only one side of a bill fed. Such bright and dark matters inversion phenomenon can be clearly verified when a light source used is a near infrared ray of light. Thus, in the fourth embodiment, in a processing step of identifying authentication by utilizing a watermark portion, among a plurality of light sources, a light source of emitting transmission infrared ray of light or reflection infrared ray of light is utilized. That is, this makes it possible to improve authentication identifying precision more remarkably.

Specifically, the density value on a pixel-by-pixel basis, which is obtained by the reflected light of a watermark image in the converting section 4232, has a conflicting relationship with the density value on a pixel-by-pixel basis caused by the transmitted light obtained at the same position (the density value is stored in advance in the reference data storage section 4233 as reference data). Thus, when a correlation coefficient R is computed from the density value on a pixel-by-pixel basis of both, a correlation coefficient shifted to the negative side (negative correlation coefficient) can be obtained in a range of $-1 \leq R \leq 1$, which is an allowable range of the correlation coefficient R. While a correlation coefficient of −1 is considered to be an ideal value, a greater value than −1 is actually obtained due to an influence such as bill contamination, winkles, or watermark displacement.

By setting a threshold value equal to or smaller than predetermined values of both, therefore, it becomes possible to derive a relationship in which such conflicting density values are obtained. It is also becomes possible to identify authentication of a watermark formed on a bill even by the light-receiving portion 4081*a* installed at one side with respect to a bill fed.

Hereinafter, an exemplary technique of authentication identifying processing based on the abovementioned watermark image will be specifically described with reference to the flowchart of FIG. 138 and FIG. 139 to FIG. 141. Authentication identifying processing based on such watermark image is executed one of several bill authentication identifying processing operations which otherwise exist.

First, the bill reading means 4008 performed reading of a bill fed, and from the read image, the converting section 4232 performs conversion processing into pixel information including color information (ST4011). As described above, the bill reading means 4008 emits light (red light, infrared ray of light) from the first light-emitting section 4080*a* and the second light-emitting section 4081*b* to the bill fed by the bill feeding mechanism 4006 and the light-receiving portion (line sensor) 4081*a* receives the transmitted light or reflected light to execute reading of the bill. At the time of the reading, while bill feeding processing is performed, it is possible to acquire a number of pixel information with a predetermined size being defined as one unit every time light is emitted. The image data comprised of a number of pixel thus acquired is stored in storage means such as the RAM 4224. The converting section 4232 converts image data configured a number of pixels to information including color information having brightness on a pixel-by-pixel basis (color information obtained by assigning a numeric value of 0 to 255 (0: black to 255: white) according to the density value).

Next, extraction processing of a watermark image region from the thus converted pixel information is performed (ST4012). For example, when a bill is fed, the density value of pixel information increases (whitens) at a stage of migrating from a printed region to a watermark image region. Thus, it becomes possible to extract the watermark image region by setting the displaced position and detecting the displaced position. Of course, the watermark image region can be extracted by means of various kinds of techniques based on the obtained image information or converted image information. As to the emitting light employed to extract a watermark image, among a plurality of light sources, there is employed any of the red light and infrared ray of light of the transmitted light and the red light and infrared ray of light of the reflected light (these rays of light may be used in combination).

Next, the identifying processing section 4235 extracts the reference data stored in advance in the reference data storage section 4233 (reference data relating to watermark image) with the use of the abovementioned parameters; and compares and processes the extracted reference data with image data caused by the reflected light converted by the converting section (ST4013). In this case, as to the reference data extracted, for example, as shown in FIG. 139, the standard image relating to a bill M is stored in the reference data storage section 4233, a two-dimensional image of a watermark region 4101 or a filter mark forming region 4105 is obtained with the use of the abovementioned parameters.

The abovementioned comparison processing in ST4013 (first comparison processing) is processing for judging whether or not a watermark exists. Authentication of a bill fed is identified by deriving the correlation coefficient R shown in Mathematical Formula 7 below between image information of a watermark region caused by the transmitted light acquired from a bill fed and image information caused by the transmitted light of a watermark region of a standard image.

[Mathematical Formula 7]

$$R = \frac{\sum_i \sum_j (f[i, j] - F)(s[i, j] - S)}{\sqrt{\sum_i \sum_j (f[i, j] - F)^2} \sqrt{\sum_i \sum_j (s[i, j] - S)^2}}$$

In Mathematical Formula 7 above, [i, j] corresponds to a coordinate of a bill watermark forming region. The density value of a two-dimensional image of data acquired from a bill targeted to be identified in the bill coordinate [i, j] is defined as f[i, j]: the density value in reference data is defined as s [i, j]; the average density in acquired data is defined as F; and the average density value of reference data is defined as S.

The correlation coefficient R derived by Mathematical Formula 7 above takes a value of −1 to +1 as publicly known, and a value close to +1 (high correlation coefficient) is defined as high degree of analogousness. In this case, if no watermark is formed on a bill fed, there is no correlation therebetween (correlation coefficient close to 0). Thus, a predetermined threshold value is set as to the correlation coefficient R defined, and if the correlation coefficient R is lower than the threshold value, it is judged that the bill is bogus, since no watermark is formed (ST4014; No, ST4018).

In ST4014 above, if the correlation coefficient R is equal to or greater than a predetermined threshold value, second comparison processing is subsequently executed (ST4015). In this comparison processing, as described above, the image data that is obtained by the transmitted light and the reflected light is reversed in bright and dark matters (image data caused by a reflection light source for emitting infrared ray of light of light sources is employed, since the data can be remarkably observed with near infrared ray of light), and thus, processing of identifying authentication is performed by utilizing that relationship. Authentication of a bill fed is identified by deriving a correlation coefficient R' shown in Mathematical Formula 7 above between the image information in a watermark region caused by the reflected light acquired from the bill fed and the image information caused by the transmitted light in the watermark region of a standard image.

The authentication identifying processing will be described with reference to FIG. 140.

FIG. 140(*a*) shows image data caused by the reflected light in the filter mark forming region 4105 of a bill fed (reflected data based on near infrared ray of light) and show pixel information including color information converted by the converting section 4232. In FIG. 140(*a*), for the sake of clarity, a 12-pixel component is extracted in one direction (vertical direction) in the filter mark forming region 4105, and a 7-pixel component is extracted in the feeding direction (horizontal direction). FIG. 140(*b*) shows reference data in the filter mark forming region stored in advance in the reference data storage section 4233 and shows image data caused by the transmitted light at the same position as that of FIG. 140(*a*).

The image data of both parties has a relationship in which bright and dark matters are reversed as described above. That is, at the converting section 4232, the density value on a pixel-by-pixel basis, which is obtained by the reflected light of a watermark image, has a relationship which conflicts with the density value on a pixel-by-pixel basis, caused by the transmitted light obtained at the same position. Thus, if a correlation coefficient R' is computed from the density value on a pixel-by-pixel basis of both, a correlation coefficient shifted to the negative size (negative correlation coefficient) can be obtained in a range of $-1 \leq R' \leq 1$, which is an allowable range of the correlation coefficient R'.

In a relationship of the image data shown in FIG. 140(*a*) and FIG. 140(*b*), all of the density values at the corresponding pixel position is obtained as 255 in total, and a correlation coefficient of −1 can be ideally obtained. However, in practice, this value is obtained as the one which is greater than −1 due to an influence such as bill contamination, wrinkle, or watermark displacement. Thus, when a threshold value is set to 1 (a numeric value close to −1), the bill can be eliminated as bogus in spite of the authentic bill. Therefore, the correlation coefficient R' is set to be a value which is greater than −1 (that may be at the positive side). If the correlation coefficient R' is lower than the threshold value, it is judged that the bill is authentic (ST4016; Yes, ST4017), and if the correlation coefficient R' is equal to or greater than the threshold value, it is judged that the bill is bogus (S4016; No, ST4018).

In the abovementioned processing of judging that the bill is authentic, of ST4018, denomination data and amount-of-money data of the bill fed are acquired by applying processing such as character recognition with the use of the image data read by the bill reading means 4008 and then the acquired denomination data and amount-of-money data are stored in the RAM 4224. These items of information are transmitted to the PTS terminal 1700 as described later.

After the abovementioned processing of 54017 or processing of ST4018 has been executed, a subroutine of the information output processing shown in FIG. 114 of the first embodiment is invoked and executed (ST3070).

FIG. 114 is a flowchart showing a subroutine of processing of outputting various kinds of information to the PTS terminal 1700.

First, it is judged whether or not a result of bill authentication judgment is authentic (step ST71). The result of the bill authentication judgment can be obtained by executing the abovementioned subroutine shown in FIG. 138.

When it is judged that the result of the bill authentication judgment is authentic (YES), the denomination data indicating denomination of the bill and amount-of-money data indicating an amount of money are outputted to the PTS terminal 1700 via the I/O port 4240 (step S72) and then this subroutine is completed. The denomination of a bill used herein consists of bill attribute information indicating attributes of bills including countries, governments, governmental banks, or regions issuing or administering bills such as US dollar bills, Yen bills, or Hong Kong dollar bills. The money used herein is an amount corresponding to a currency unit defined depending on the attribute of that bill. The currency unit used herein includes US dollars, Yen and the like, for example.

When it is judged that the result of the bill authentication judgment is bogus (NO), error information indicating that the entered bill is bogus is outputted to the PTS terminal 1700 via the I/O port 4240 (step ST73) and then this subroutine is completed.

The denomination data indicating denomination and the amount-of-money data indicating an amount of money are thus transmitted to the PTS terminal 1700, whereby the PTS terminal 1700 can acquire the denomination data and amount-of-money data of the bill entered into the bill handling apparatus 4001. Based on these items of information, various kinds of processing operations such as credit conversion or money exchange according to an exchange rate at that time can be executed.

As described above, it becomes possible to derive a relationship in which such conflicting density value is obtained between the reflected light and transmitted light emitted to a bill. It is also possible to identify authentication of a watermark formed on a bill even by the light-receiving portion 4081*a* installed at one side, with respect to the bill fed.

In ST4013, ST4015 described above, in comparison processing at the identifying processing section 4235, when a correlation coefficient is computed, it is preferable to execute position correction (referred to as proximity search) after moving a pixel position of the acquired watermark image so as to correspond to the pixel position of a standard image of a reference bill and then extract the highest position whose absolute value of correlation coefficient is the highest among them to identify authentication.

That is, there is considered to be a case in which a bill to be fed includes slight distortion at a position at which a watermark is formed or a case in which the bill slightly tilts depending on the feeding state. Thus, it is considered that the watermark image read by the bill reading means 4008 is slightly displaced from the bill fed. Even if a correlation coefficient is acquired in this state, there is a possibility that appropriate identifying cannot be performed.

Thus, as schematically shown in FIG. 141, the obtained image data of a watermark region is displaced by a predetermined number of pixels vertically and horizontally, as indicated by the arrow, for example (in the figure, it is shown that when the image data is entirely shifted upward by three pixels, a position P1 of a characterizing image 4110 is moved to P2 as an image 4110'). At the respective displaced positions, a correlation coefficient is computed by Mathematical Formula 7 described above. That is, when such position correction is executed, for example, if search is executed by shifting ±4 pixels in the vertical and horizontal directions, for example, a total of 81 correlation coefficients are derived as a proximity search. The respective correlation coefficients derived are sequentially stored in the RAM 4224, and all of the correlation coefficients are finally computed. Then, a position at which the absolute value of the correlation coefficient is the highest is specified as a target for identifying authentication.

In this manner, even though there is fed an authentic bill having a slight distortion at a position at which a watermark is formed, position correction is performed in such a manner that the pixel position of the acquired image is moved to the periphery. Thus, there is a low possibility that an authentic bill is identified to be bogus, and it becomes possible to improve identifying precision. In the abovementioned comparison processing of ST4013, if the abovementioned proximity search is executed, the position-corrected information may be applied as it is in the abovementioned processing of ST4015.

In the fourth embodiment, information of a watermark image for preventing counterfeit in a bill (two-dimensional image information) is acquired, and the acquired information is compared with standard watermark pixel information (standard image), thereby improving precision of identifying authentication. In the configuration as described above, authentication can be identified at only the light-receiving portion 4081*a* installed at one side of a bill fed, and higher cost does not occur.

The identifying processing step of the watermark portion as described above is configured so as to be carried out subsequent to identifying processing of denomination of a bill (which amount, which issue series, or which country) completes if the bill identifying apparatus is configured so as to be able to handle multiple types of bills. Thus, a position at which a watermark is formed is predetermined on a denomination-by-denomination basis, and thus, reference data may be stored according to the predetermined position.

In the abovementioned configuration, while reference data caused by transmitted light of a transmission region was employed as those stored in advance in the reference data storage section 4233, such data caused by the transmitted light may be acquired from a bill fed. That is, after the image data caused by the reflected light and transmitted light has been acquired from a watermark region of a bill fed, even if the abovementioned processing is performed, it is possible to identify authentication of the watermark region.

While the embodiment of the present invention has been described hereinabove, the present invention can be variously modified and carried out without being limitative thereto.

As described above, the present invention is characterized by identifying authentication, while attention is focused on the fact that bright and dark matters are reversed in the transmitted light and reflected light as to image information of a watermark portion of a bill targeted to be identified, and other configurations are not limitative to the abovementioned embodiment. Thus, a configuration may be such that the first comparison processing is not performed. As the authentication identifying method as described above, the technique as described above may be employed as one of the authentication identifying processing operations by various kinds of techniques and further there may be a configuration provided with other authentication identifying processing operation. In this case, the priority executed with other authentication identifying processing is not limited.

The configuration of the abovementioned bill reading means 4008 (that may be a configuration of the line sensor) and a mechanism for driving various kinds of driving members can be appropriately modified.

Apart from the abovementioned bills, the present invention can be incorporated into various kinds of apparatuses for identifying authentication of sheets other than commodity tickets, coupon tickets.

<<<<Fifth Embodiment>>>>

Hereinafter, one embodiment of the present invention will be described with reference to the drawings. The embodiment describes a target for authentication judgment processing as a bill and describes an apparatus for handling the bill (sheet identifying apparatus) as a bill identifying apparatus.

FIG. 142 to FIG. 145 are views showing configurations of a bill identifying apparatus (sheet identifying apparatus); FIG. 142 is a perspective view showing an entire configuration; FIG. 143 is a perspective view showing a state in which an upper frame is opened with respect to a lower frame. FIG. 144 is a plan view showing a bill feeding portion of the lower frame; and FIG. 145 is a view of a back face of the lower frame.

A bill identifying apparatus 5001 of the embodiment is configured so as to be able to incorporated into a gaming media lending apparatus (not shown) installed between gaming machines such as slot machines. In this case, at the gaming medium lending apparatus, other units (such as a bill housing unit, a coin identifying unit, a recording medium processing unit, a power unit, for example) may be installed at the upper side or lower side of the bill identifying apparatus 5001, and the bill identifying apparatus 5001 may be integrated with these other units or may be configured separately. After a bill has been inserted into such a bill identifying apparatus 5001, if the validity of the inserted bill is judged, lending processing of gaming mediums according to the valid of the bill, or alternatively, writing processing into a recording medium such as a prepaid card is performed.

The bill identifying apparatus 5001 is provided with a frame 5002 formed in a substantially rectangular parallelepiped shape. The frame 5002 is attached to an engagingly lock section of a gaming medium lending apparatus (not shown). The frame 5002 has: a lower frame 5002B serving as a base side; and an upper frame 5002A which can be opened or closed with respect to the lower frame 5002B so as to cover the base side. These frames 5002A, 5002B are configured so as to be opened or closed with a proximal section being its turning center, as shown in FIG. 143.

The abovementioned lower frame 5002B has a substantially rectangular parallelepiped shape. This frame is provided with: a bill feeding face 5003*a* to which a bill is fed; and a side wall section 5003*b* which is formed at each side of the bill feeding face 5003*a*. The upper frame 5002A is configured in a plate-shape provided with a bill feeding face 5003*c*, and when the upper frame 5002A is closed so as to enter between the side wall 5003*b* of each side of the lower frame 5003B, a clearance (bill feeding path) 5005 to which a bill is fed is formed at an opposite portion between the bill feeding face 5003*a* and the bill feeding face 5003*c*.

At the upper frame 5002A and the lower frame 5002B, bill insertion sections 5006A, 5006B are formed respectively so as to coincide with the bill feeding path 5005. These bill insertion sections 5006A, 5006B form a slit-like bill insertion slot 5006 when the upper frame 5002A and the lower frame 5002B are closed. As shown in FIG. 142, a bill M is inserted into the apparatus along the direction indicated by the arrow A from a short edge side of the bill.

A lock shaft 5004 which can be engagingly locked with the lower frame 5002B is arranged at the tip end side of the upper frame 5002A. An operating section 5004*a* is provided at the lock shaft 5004. The operating section 5004*a* is operated to turn against a biasing force of a biasing spring 5004*b*, whereby the lock shaft 5004 turns around a turning fulcrum P, and a lock state (a state in which both of the frames are closed: overlapped state) of the upper frame 5002A and the lower frame 5002B is released.

At the lower frame 5002B, there are provided: a bill feeding mechanism 5008; a bill detecting sensor 5018 for detecting a bill inserted into a bill insertion slot 5006; bill reading means 5020 installed at the downstream side of the bill detecting sensor 5018, for reading information of a bill being fed; a shutter mechanism 5050 installed at a bill feeding path 5005 between the bill insertion slot 5006 and the bill detecting sensor 5018 and driven so as to close the bill insertion slot 5006; and control means (control board 5100) for controlling driving of constituent elements such as the abovementioned bill feeding mechanism 5008, bill reading means 5020, and shutter mechanism 5050 and identifying validity of the read bill (performing authentication judgment processing).

The bill feeding mechanism 5008 is a mechanism which is capable of feeding the bill inserted through the bill insertion slot 5006 along the insertion direction A and is capable of feeding the bill being inserted so as to be returned to the bill insertion slot 5006. The bill feeding mechanism 5008 is provided with: a driving motor 5010 serving as a driving source installed at the lower frame 5002B side; and feeding roller pairs 5012, 5013, 5014 rotationally driven by means of the driving motor 5010 and arranged at predetermined intervals along the bill feeding direction at the bill feeding path 5005.

The feeding roller pair 5012 is provided with: driving rollers 5012 arranged at the lower frame 5002 side; and pinch rollers 5012B arranged at the upper frame 5002A and abutted against the driving roller 5012A. These driving rollers 5012A and pinch rollers 5012B are installed at two sites at predetermined intervals along the direction orthogonal to the bill feeding direction. These driving rollers 5012A and pinch roller 5012B are partly exposed to the bill feeding path 5005.

The driving rollers 5012A installed at the two sites are fixed to a driving shaft 5012*a* rotatably supported at the lower frame 5002B, and the two pinch rollers 5012B are rotatably supported on a support shaft 5012*b* supported at the upper frame 5002A. In this case, a biasing member 5012*c* for biasing the support shaft 5012*b* to the driving shaft 5012*a* side is provided at the upper frame 5002A, and the pinch rollers 5012B are abutted against the driving roller 5012A side at a predetermined pressure.

Like the roller pair 5012, the abovementioned feeding roller pairs 5013, 5014 are also comprised of: two driving rollers 5013A, 5014A fixed to the driving shafts 5013*a*, 5014*a*, respectively; and two pinch rollers 5013B, 5014B which are rotatably supported at the support shafts 5013*b*, 5014*b*. Each of the pinch rollers 5013B, 5014B is abutted against each of the driving rollers 5013A, 5014A at a predetermined pressure by means of biasing members 5013*c*, 5014*c*, respectively.

The feeding roller pairs 5012, 5013, 5014 are synchronously driven by means of a driving force transmission mechanism 5015 coupled with a driving motor 5010. The driving force transmission mechanism 5015 is comprised of a gear train rotatably arranged at one side wall section 5003*b* of the lower frame 5002B. Specifically, this mechanism is comprised of a gear train provided with: an output gear 5010*a* fixed to an output shaft of the driving motor 5010; input gears 5012G, 5013G, 5014G which are sequentially meshed with the output gear 5010*a* and attached to end parts of the driving shafts 5012*a*, 5013*a*, 5014*a*; and an idle gear 5016 which is installed between these gears.

With the abovementioned configuration, when the driving motor 5010 is driven to normally rotate, each of the feeding roller pairs 5012, 5013, 5014 is driven so as to feed a bill to an insertion direction A. When the driving motor 5010 is driven to reversely rotate, each of the feeding roller pairs 5012, 5013, 5014 is driven to reversely rotate so as to return a bill to the bill insertion slot side.

The bill detecting sensor 5018 generates a detection signal when detecting a bill inserted into the bill insertion slot 5006. In the embodiment, this sensor is installed between a turning piece configuring a shutter mechanism to be described later and bill reading means 5020 for reading a bill. The bill detecting sensor 5018 is comprised of an optical sensor, for example, a recursive reflection type photosensor in more detail. As shown in FIG. 146, this sensor is comprised of a prism 5018*a* which is installed at the upper frame 5002A side and a sensor main body 5018*b* which is installed at the lower frame 5002B side. Specifically, the prism 5018*a* and the sensor main body 5018*b* are disposed in such a manner that the light emitted from a light-emitting portion 5018*c* of the sensor main body 5018*b* is detected via the prism 5018*a* by a light-receiving portion 5018*c* of the sensor main body 5018*b*. The bill passes through a bill feeding path 5005 positioned between the prism 5018*a* and the sensor main body 5018*b* and then a detection signal is generated if light is not detected at the light-receiving portion 5018*d*.

The abovementioned bill detecting sensor 5018 may be comprised of a mechanical sensor other than the optical sensor.

At the downstream side of the bill detecting sensor 5018, as to a bill being fed, bill reading means 5020 for reading information on the bill is installed. The bill reading means 5020 may be configured so as to read bill information by emitting light to a bill when the bill feeding mechanism 5008 feeds the bill and then judges effectiveness (authentication) of the bill. In the embodiment, light is emitted to each side of the bill and the transmitted light and reflected light are detected by a light-receiving element such as a photodiode so as to thereby read the bill.

In this case, among the transmitted light and reflected light obtained from the bill, as to the reflected light, as described later, reading on a pixel-by-pixel basis with a predetermined size being defined as one unit are executed by means of a line sensor having a light-receiving portion. Image data of the bill, comprised of a plurality of pixels thus read, is stored in storage means, and at an image processing section, image processing is applied to the stored image data so as to increase and/or decrease the number of pixels. The image data whose number of pixels is processed to be increased and/or decreased is compared with image data of an authentic bill stored in advance, whereby authentication judgment processing is executed.

Among the transmitted light and reflected light obtained from the bill, as to the reflected light, as described later, reading is executed on a pixel-by-pixel basis with a predetermined size being defined as one unit by means of a line sensor having a light-receiving portion. In this vase, when reading is executed on a pixel-by-pixel basis with a predetermined size being defined as one unit, processing of decreasing the number of read pixels in another direction than that in one direction is performed. Specifically, in the embodiment, as described later, when reading is executed, thinning processing is performed by the line sensor extending along the bill feeding widthwise direction so as to decrease the number of read pixels in the bill feeding direction (another direction) in comparison with a bill feeding widthwise direction (one direction). Thus, in another direction, the image data whose number of pixels is processed to be thinned is compared with image data of an authentic bill stored in advance, whereby authentication judgment processing is executed.

As to the transmitted light having transmitted a bill, authentication judgment processing may be performed by a technique similar to that in the reflected light or authentication judgment processing may be performed with the use of another technique.

A shutter mechanism 5050 for closing a bill insertion slot 5006 is arranged at the downstream side of the bill insertion slot 5006. The shutter mechanism 5050 always opens the bill insertion slot 5006. This mechanism is configured to be closed so as to prevent an illegal act or the like if a bill is inserted and then the bill detecting sensor 5018 detects a rear end of the bill (the bill detecting sensor 5018 is turned OFF).

Specifically, the shutter mechanism 5050 has: a turning piece 5052 to be driven to turn so as to appear or disappear at predetermined intervals in a direction orthogonal to the bill feeding direction of the bill feeding path 5005; and a solenoid (pull-type) 5054 serving as a driving source for driving the turning piece 5052 to turn. In this case, the turning piece 5052 is installed at two sites in a widthwise direction of a support shaft 5050; and an elongated piece 5005*c* extending in a bill feeding direction is formed so that each turning piece 5052 can appear or disappear on the bill feeding face 5003*a* of the lower frame 5002B forming the bill feeding path 5005.

A bill passage detecting sensor 5060 for detecting passing of a bill is provided at the downstream side of the bill reading means 5020. The bill passage detecting sensor 5060 generates a detection signal when a bill judged to be valid is further fed to the downstream side and then a rear end of the bill is detected. Based on generation of the detection signal, power supply of the abovementioned solenoid 5054 is released (solenoid OFF) and then the driving shaft 5054*a* moves in a protrusion direction by means of a biasing force of a biasing spring provided at the driving shaft 5054*a*. In this manner, the turning piece 5052 configuring the shutter mechanism is driven to turn so as to open the bill feeding path via the support shaft 5055 interlocked with the driving shaft 5054*a*.

The bill passage detecting sensor 5060, like the abovementioned bill detecting sensor 5018, is comprised of an optical sensor (recursive reflection type photosensor). This sensor is comprised of: a prism 5060*a* installed at the upper frame 5002A side; and a sensor main body 5060*b* installed at the lower frame 5002B side. Of course, the abovementioned bill passage detecting sensor 5060 may be comprised of a mechanical sensor other than the optic al sensor.

A notifying element for visually notifying that a bill has been inserted is provided in the vicinity of the bill insertion slot 5006. Such notifying element can be comprised of a blinking LED 5070, for example. This element lights by a user inserting a bill into the bill insertion slot 5006 and notifies that a bill handling state is established. Thus, it becomes possible to prevent a user from mistakenly inserting an additional bill.

Next, a configuration of bill reading means 5020 installed at the upper frame 5002A and the lower frame 5002B will be described with reference to FIG. 143 to FIG. 145 and FIG. 147.

The bill reading means 5020 is arranged at the upper frame 5002A side. This reading means has: a light-emitting unit 5024 provided with a first light-emitting portion 5023 which is capable of emitting slit-like light all over the feeding path widthwise direction at the upside of a bill fed; and a line sensor 5025 arranged at the lower frame 5002B side.

The line sensor 5025 installed at the lower frame 5002B side has: a light-receiving portion 5026 arranged to be opposed to the first light-emitting portion 5023 so as to sandwich a bill; and a second light-emitting portion 5027 which is arranged adjacent to each side in the bill feeding direction of the light-receiving portion 5026 and is capable of emitting slit-like light.

The first light-emitting portion 5023 disposed to be opposed to the light-receiving portion 5026 of the line sensor 5025 functions as a light source for transmission. The first light-emitting portion 5023, as shown in FIG. 143, is configured as a so called light guide formed in a synthetic resin-based rectangular rod-like shape, and preferably has a function of inputting emitted light from the light-emitting element 5023*a* such as an LED installed at an end part and then emitting light while guiding light along the longitudinal direction. In this manner, with a simple configuration, it becomes possible to emit slit-like light uniformly with respect to a range all over the feeding path widthwise direction of a bill fed.

The light-receiving portion 5026 of the line sensor 5025 is arranged in line in parallel to the first light-emitting portion 5023 which is a light guide. This light-receiving portion is formed in a thin plate shape which extends in an intersection direction with respect to the bill feeding path 5005 and which is shaped like a band having a width to an extent such that there could not be affected the sensitivity of a light-receiving sensor, although not shown, the sensor being provided at the light-receiving portion 5026. Specifically, a plurality of CCDs (Charge Coupled Devices) are provided in line at the center in the thickness direction of the light-receiving portion 5026 and are configured so that Selfoc lens array 5026*a* is disposed in line so as to focus the transmitted light and reflected light at an upward position of the CCDs.

The second light-emitting portion 5027 of the line sensor 5025 functions as a reflection light source. The second light-emitting portion 5027, like the first light-emitting portion 5023, as shown in FIG. 144, is configured as a so called light guide formed in a synthetic resin-based rectangular rod-like member. Preferably, this light-emitting portion has a function of inputting emitted light from the light-emitting element 5027*a* such as an LED installed at an end part and then emitting light while guiding light in the longitudinal direction. In this manner, with a simple configuration, it becomes possible to emit slit-like light uniformly with respect to the range of the entire feeding path widthwise direction of a bill fed.

The second light-emitting portion 5027 is capable of emitting light to a bill at an elevation angle of 45 degrees, and is arranged so that the light-receiving portion 5026 (light-receiving sensor) receives the reflected light from the bill. In this case, while the light emitted from the second light-emitting portion 5027 is incident to the light-receiving portion 5026 at 45 degrees, the incidence angle is not limitative to 45 degrees. This incidence angle can be appropriately set as long as the reflected light can be reliably received. Therefore, as to disposition of the second light-emitting portion 5027 and the light-receiving portion 5026, a design change can be appropriately made according to a structure of a bill identifying apparatus. The second light-emitting portion 5027 is installed at each side while the light-receiving portion 5026 it is sandwiched therebetween, and emits light at the incidence angle of 45 degrees, respectively, from each side. This is because, if any damage or a wrinkle or the like has occurred to a bill surface, if light is emitted from only one side to irregularities having occurred at these damaged or wrinkled portions, the light will be interrupted at irregular portions and shaded site may occur. Thus, the shading at an irregular portion is prevented by emitting light from each side, making it possible to obtain image data with higher precision than that of emission from one side. Of course, the second light-emitting portion 5027 may be configured to be installed at only one side.

The abovementioned line sensor 5025 is exposed to the bill feeding path 5005. Thus, irregular portion 5025*a* is formed as shown in FIG. 143 at each end in the bill feeding direction of its surface portion (a portion which is substantially in flush with the feeding face 5003*a*), and the bill fed is hardly caught. At the light-emitting unit 5024 also, like the line sensor 5025, an irregular portion 5024*a* is formed as shown in FIG. 143 at each end in the bill feeding direction of the surface portion, so that the bill fed is hardly caught.

Next, a bill authentication judgment method executed in bill identifying means for identifying authentication of a bill, based on the information on the bill read by the abovementioned bill reading means 5020 will be specifically described. Hereinafter, as mentioned above, authentication judgment processing by utilizing the reflected light will be described.

In general, on a bill, microprint (such as very fine characters or patterns which could be hardly reproduced) is formed as one means for preventing counterfeiting. This microprint, as schematically shown in FIG. 148, is configured by forming a number of fine lines 5200 in a unit width, and can be formed by means of engraving letterpress, for example. Although a configuration of microprint is not described here in detail, such microprint is configured by depicting a number of straight thin lines in a unit width for the purpose of clarity in the figure. Of course, the thin lines may be curved, or alternatively, may be a combination of straight lines and curves other than the linear shape shown in the figure. A character or a pattern may be configured separately by these thin lines.

In the bill authentication judgment technique according to the embodiment, first, in a state in which the bill feeding mechanism 5008 feeds a bill M, light is emitted to the bill from the second light-emitting portion 5027 in the line sensor 5025 and then the light-receiving portion 5026 receives the reflected light and executes reading of the bill. This reading is executed on a pixel-by-pixel basis with a predetermined size being defined as one unit while bill feeding processing is in progress. The thus read image data of the bill comprised of a number of pixels (a plurality of pixels) is stored in storage means such as a RAM. The image processing section then applies image processing to the thus stored image data comprised of a plurality of pixels so as to increase or decrease the number of pixels.

As mentioned above, as to the bill image data to which image processing is applied so as to increase and/or decrease the number of pixels, it becomes possible to acquire moire data having emerged with a fringe-like pattern (moire fringe) specific to the bill at the abovementioned microprint portion. The moire data can be obtained as the one specific to the enlargement/reduction rate by increasing or reducing the number of pixels. Thus, it becomes possible to perform authentication judgment by comparing the above moire data with moire data of an authentic bill stored in advance.

As described above, as to image data of a bill whose number of pixels are processed to be thinned (for which processing of decreasing the number of pixels is performed) in a direction along the bill feeding direction, it becomes possible to acquire moire data having emerged with a fringe-like pattern (moire fringe) at the abovementioned microprint portion. As to the moire data, the number of pixels obtained at the time of reading is processed to be thinned at a predetermined rate (reduction rate), whereby the one specific to the reduction rate can be obtained. Thus, the thus obtained moire data is compared with moire data of an authentic bill stored in advance, thereby making it possible to judge authentication.

<<<Control Means 5030 of the First Mode>>>

FIG. 149 is a block diagram depicting a schematic configuration of control means for controlling a bill identifying apparatus 5001 provided with: the abovementioned bill feeding mechanism 5008; bill reading means 5020; a shutter mechanism 5050, and a bill judgment section 5150 or the like for executing bill authentication judgment processing.

The control means 5030 is provided with a control board 5100 for controlling operation of each of the driving devices mentioned above. On the control board 5100, there are mounted: a CPU (Central Processing Unit) 5110 controlling driving of each driving device and configuring bill identifying means; a ROM (Read Only Memory) 5112; a RAM (Random Access Memory) 5114; and an image processing section 5116.

The ROM 5112 stores permanent data such as: operating programs of variety of driving devices such as the abovementioned driving motor 5010, solenoid 5054, and LED 5070; various kinds of programs such as an authentication judgment program; and a conversion table consisting of data for determining whether to enlarge, equalize, or thin the pixel data, which is executed at a pixel data increasing/decreasing processing section 5116*a* in the image processing section 5116.

The CPU 5110 operates in accordance with the programs stored in the ROM 5112; inputs/outputs a signal to/from various kinds of the driving devices mentioned above via the I/O port 5120; and performs entire operational control of the bill identifying apparatus. That is, a driving motor driving circuit 5125 (driving motor 5010), a solenoid 5054, and an LED 5070 are connected to the CPU 5110 via the I/O port 5120. These driving devices are operatively controlled by means of a control signal from the CPU 5110 in accordance with the operating programs stored in the ROM 5112. Detection signals from a bill detecting sensor 5018 or a passage detecting sensor 5060 are inputted to the CPU 5110 via the I/O port 5120, and based on these detection signals, driving control of the driving motor 5010 and blinking control of the LED 5070 or driving control of the solenoid 5054 are performed.

The RAM 5114 temporarily stores data or programs when the CPU 5110 operates and has a function of acquiring and temporarily storing light-receiving data of a bill targeted to be judged (image data of a bill, which is comprised of a plurality of pixels).

The image processing section 5116 is provided with: a pixel data increasing/decreasing processing section 5116*a* for, with respect to image data of a bill, which is stored in the RAM 5114, performing increasing/decreasing processing of a pixel of the image data; a reference data storage section 5116*b* storing reference data relating to bills; and a judgment processing section 5115*c* for comparing image data for which pixel increasing/decreasing processing is performed in the image data increasing/decreasing processing section 5116*a* with the reference data stored in the reference data increasing/decreasing processing section 5116*a* and then performing bill judgment processing. In this case, while in the embodiment the reference data is stored in an exclusive reference data storage section 5116*b*, the data may be stored in the abovementioned ROM 5112. That is, an enlargement/reduction rate of image data is associated with a conversion table to be specified, and the authentic bill data may be stored. While the reference data of authentic bills may be stored in advance in the reference data storage section 5116*b*, for example, light-receiving data may be stored as reference data, the light-receiving data having being acquired while an authentic bill is fed through the bill feeding mechanism 5008.

Further, a first light-emitting portion (light guide) 5023 in the abovementioned light-emitting unit 5024 and the light-receiving portion 5026 and the second light-emitting portion (light guide) 5027 in the line sensor 5025 are connected to the CPU 5110 via the I/O port 5120. These elements configure a bill authentication judgment section 5150 together with the CPU 5110, the ROM 5112, the RAM 5114, and an image processing section 5116, and perform operational control required for authentication judgment in the bill identifying apparatus 5001. While in the embodiment the bill judgment section 5150 is commonly used as a control section for controlling a driving system of a bill, a function of authentication judgment processing may be employed as its dedicated hardware configuration.

The CPU 5110 is connected to a control section of a gaming medium lending apparatus in which the bill identifying apparatus 5001 is incorporated via the I/O port 5120 or an upper apparatus 5300 such as a host computer as an external device so as to transmit various kinds of signals (such as information relating to a bill or a alerting signal) to the upper apparatus.

Furthermore, the I/O port 5120 has a portion to be electrically connected to the abovementioned PTS terminal 1700. As described later, the denomination data and amount-of-money data of a bill entered into the bill handling apparatus 5001 are transmitted to the PTS terminal 1700 via the I/O port 5120.

Hereinafter, one example of procedures for increasing/decreasing pixels of image data in the abovementioned pixel data increasing/decreasing processing section 5116*a* will be described with reference to a conceptual view of FIG. 150.

FIG. 150(*a*) schematically shows source data obtained by defining image data of a bill first read via the reading means 5020 on a pixel-by-pixel basis (vertical direction:horizontal direction=1:1 and the number of pixels is shown while it is reduced). One square corresponds to one pixel, the numeral assigned in each square indicates brightness of a color in the pixel of the read bill. Actually, in each pixel, the brightness of each RGB is controlled by means of filter control of RGB, thus including color information of different brightness on a pixel-by-pixel basis (In FIG. 150(*a*), all pixels are comprised of color information of their different brightness.

The source data of the bill thus read by the bill reading means 5020 is stored in the RAM 5114 which is storage means and then increasing/decreasing processing of pixel data is applied in the image data increasing/decreasing processing section 5116*a*. For example, if the number of pixels is increased while being kept unchanged in the vertical direction and being doubled in the horizontal direction (vertical direction:horizontal direction=1:2), first, as shown in FIG. 150(*b*), one pixel is compensated for in the horizontal direction of each pixel; next, as shown in FIG. 150(*c*), assignment processing of the same color information as that of the horizontal pixel is performed for the compensated pixel portion. In this manner, it becomes possible to generate image data obtained while being kept the number of pixels unchanged in the vertical direction and the number of pixels is magnified in the horizontal direction. If enlargement processing is not performed, for example, it may be determined in advance as to which number of pixel data is subjected to assignment processing of color information.

On the other hand, if the number of pixels is reduced while being kept unchanged in the vertical direction and being 0.25 time (vertical direction:horizontal direction=1:0.25), for example, as shown in FIG. 150(*d*), reduction processing may be performed by a method of dividing all pixels in the horizontal direction is averagely by ¼ and then thinning the pixels therebetween (pixels indicated by blanks) (FIG. 150(*e*)). In this manner, it becomes possible to generate image data while being kept the number of pixels unchanged in the vertical direction and reducing the number of pixels to ¼ in the horizontal direction.

FIG. 151 shows image data of a bill, obtained after increasing/decreasing processing of the number of pixels is performed as mentioned above. As shown in FIG. 151(*a*), if the number of pixels is increased so as to be (vertical direction: horizontal direction=1:2), moire data specific to the increasing rate (moire fringe) 520A is obtained at a microprint portion (a number of thin lines, portion 5200) formed on a bill M shown in FIG. 148. As shown in FIG. 151(*b*), if the number of pixels is decreased so as to be (vertical direction:horizontal direction=1:0.25), moire data specific to the decreasing rate (moire fringe) 5200B is obtained at a microprint portion (a number of thin lines, portion 5200) formed on the bill shown in FIG. 148.

Hereinafter, principles of, and conditions for, generating the abovementioned moire fringes will be described with reference to FIG. 152 to FIG. 155. As shown in FIG. 152, in a case where an interval of thin lines 5200 (indicated by the adjacent black bars) formed on the bill M is defined as b, if the interval b is wider than an interval d for which the line sensor 5025 configuring the abovementioned bill reading means 5020 reads one pixel, the thin lines 5200 of the bill can be precisely read. Thus, the read image data (a) is established in a state in which thin lines are reproduced as they are, and no moire stream is generated.

On the other hand, as shown in FIG. 153, if the interval b of thin lines 5200 formed on the bill M is equal to or smaller than the interval d for which the line sensor 5025 reads one pixel (b≤d), the black bar which is thin lines cannot be reproduced as image data (a) as shown in FIG. 152, and the read image data is read as a completely black state. That is, when b≤d, the thin lines 5200 of the bill cannot be precisely read, fine lines become coarse, thereby causing generation of moire fringes.

As described above, in a case where decrease processing of the number of pixels is performed, for example, as shown in FIG. 154, when the interval b of essential thin lines of the bill becomes the interval d or less between the pixels obtained by thinning pixel data (when decreasing rate of the number of pixels meets a condition of b≤d), it becomes difficult to clearly identify the adjacent thin lines (read lines of the thin line data becomes coarse), and a moire fringe is generated by the thin lines that become coarse.

On the other hand, as shown in FIG. 155, if increase processing of the number of pixels is performed while the interval of the thin lines 5200 of acquired image data is b, the interval of thin lines 5200 obtained by the image data after enlarged is obtained as b' by enlargement processing. If the interval b' of the thin lines 5200, obtained by the image data after enlarged is the interval d or less for reading one pixel (when the increasing rate meets a condition of b'≤d), a moire fringe is generated as it is in the abovementioned principle.

As described above, increasing/decreasing of the number of pixels of image data related the entered bill is performed at a different rate in a bill acquisition direction and a direction orthogonal thereto, making it possible to generate a moire stream with image data and easily acquire moire data.

As a result, the judgment processing section 5116*c* compares the current data with reference data stored in advance in the reference data storage section 5116*b* (moire stream data stored according to the enlargement/reduction rate), thereby making it possible to perform authentication judgment processing of the bill. Specifically, for example, image data relating to brightness (density) is detected as to each pixel of a portion at which a moire stream is generated and the detected data is compared with reference data. If the difference is equal to or smaller than a predetermined value, it is assumed to be equal at that pixel portion. This procedure is executed as to all pixels at which moire fringes are generated, thereby making it possible to judge authentication.

FIG. 156 is a flowchart of operational processing in the abovementioned bill identifying apparatus, showing an example of a procedure for authentication judgment processing by utilizing the abovementioned moire data. Hereinafter, a processing operation of the bill identifying apparatus according to the embodiment will be described with reference to the flowchart.

First, the CPU 5110 of the bill identifying apparatus 5001 judges whether or not a bill has been detected (step S5001). This is judged by the bill detecting sensor 5018 detecting insertion of a bill and then judging whether or not a detection signal has been generated. If the bill detecting sensor 5018 detects a bill, the driving motor 5010 is driven and then bill feeding processing is performed via the bill feeding mechanism 5008 (step S5002). At this time, the LED 5070 is processed so as to light and then notifies to a user that bill handling in progress. Thus, an additional bill insertion is prevented.

Having been synchronous with the bill feeding processing, the bill reading means 5020 executes bill reading processing (step S5003). The bill reading processing is performed by the CPU 5110 outputting an emitting signal to first and second light-emitting portions 5023, 5027; each of the light-emitting portions 5023, 5027 emitting light to a bill; and the light-receiving portion 5026 receiving the reflected light. The moire data employed for bill identifying processing is acquired based on the reflected light of the light emitted from the light-emitting portion 5027, as described above.

By feeding a bill into the apparatus, the bill reading means 5020 read the information, and authentication judgment processing is executed in the control means 5030. The abovementioned bill reading is performed by the light-receiving portion 5026 of the line sensor 5025 receiving the reflected light from a bill being fed, the light being emitted from the second light-emitting portion 5027. At the time of the reading, as described above, image information of a bill is acquired on a pixel-by-pixel basis with a predetermined size being defined as one unit. The transmitted light having transmitted a bill, emitted from the first light-emitting portion 5023, can be employed for another authentication judgment processing (such as authentication judgment processing using contrast data).

When the authentication judgment processing is executed, if the bill detecting sensor 5018 detects a rear end of a bill (when the bill detecting sensor 5018 is OFF), the solenoid 5054 is powered on, whereby the turning piece 5052 is turnably driven to close the bill insertion slot 5006 and prevent additional entry of a bill.

As described above, the information on the bill read on a pixel-by-pixel basis configures image data of the entire bill by a plurality of pixels, and the image data is stored in the RAM 5114 which is storage means (step S5004). Subsequently, the image processing section 5116 applies image processing to the image data stored in the RAM 5114 so that the number of pixels increases and/or decreases (step S5005). Increasing/decreasing processing of the number of pixels is executed based on the conversion table stored in the ROM 5112, and then, as to image data of a bill, which is obtained in accordance with the processing, as described above, specific moire data can be obtained at a microprint portion according to an increasing/decreasing rate.

Subsequently, in step S5006, bill authentication judgment processing is performed. As described above, specific moire data (moire fringe) is obtained by an increasing/decreasing rate with the conversion table stored in the ROM. Thus, the judgment processing section 5116*c* compares the moire data with the reference data stored in advance in the reference data storage section 5116*b* (moire fringe data stored according to an enlargement/reduction rate), whereby authentication of the bill is judged.

In the abovementioned authentication processing, it is judged that the fed bill is authentic (Yes of step S5007), bill judgment good processing is executed (step S5008). This processing includes processing of feeding a bill as it is to a stacker situated at the downstream side; processing of stopping driving of the driving motor 5010 at a stage at which the bill passage detecting sensor 5060 detects a rear end of the bill fed to the downstream side; and processing or the like of concurrently turning OFF (releasing power supply) driving of the solenoid 5054 to pull the turning piece 5052 from the bill feeding path 5005 to open the bill insertion slot 5006 and turning OFF the LED 5070.

On the other hand, in the abovementioned processing of step S5007, where it is judged that the fed bill is bogus (including a case in which a bill is extremely contaminated or damaged), bill judgment NG processing is executed (step S5009). This processing includes reversing processing of the driving motor 5010 in order to return the inserted bill or processing of outputting an alert signal to the upper apparatus 5300, for example.

In the abovementioned bill judgment good processing of step S5008, the denomination data and amount-of-money data of the entered bill are acquired by applying processing such as character recognition with the use of the image data read by the bill reading means 5020, and the acquired denomination data and amount-of-money data is stored in the RAM 5114. These items of information are transmitted to the PTS terminal 1700 as described later.

After the above processing of step S5008 or processing of step S5009 has been executed, a subroutine of information output processing shown in FIG. 114 of the first embodiment is invoked and executed (ST3070).

FIG. 114 is a flowchart of a subroutine of processing of outputting various kinds of information to the PTS terminal 1700.

First, it is judged whether or not a result of bill authentication judgment is authentic (step ST71). The result of bill authentication judgment can be obtained by executing the abovementioned subroutine shown in FIG. 156.

When it is judged that the result of bill authentication judgment is authentic (YES), the denomination data indicating denomination of the bill and amount-of-money data indicating an amount of money are outputted to the PTS terminal 1700 via the I/O port 5120 (step ST72) and then this subroutine is completed. The denomination of a bill used herein consists of bill attribute information indicating attributes of bills including countries, governments, governmental banks, or regions issuing or administering bills such as US dollar bills, Yen bills, or Hong Kong dollar bills. The amount use here includes an amount corresponding to a currency unit defined depending on the attribute of the bill. The currency unit used herein includes US dollars or Yen and the like, for example.

When it is judged that the result of bill authentication judgment is bogus (NO), error information indicating that the entered bill is bogus is outputted to the PTS terminal 1700 via the I/O port 5120 (step S73) and then this subroutine is completed.

The denomination data indicating denomination and the amount-of-money data indicating an amount of money are thus transmitted to the PTS terminal 1700, whereby the PTS terminal 1700 can acquire the denomination data and the amount-of-money data of the bill entered into the bill handling apparatus 5001. Based on these items of information, various kinds of processing operations such as credit conversion or money exchange according to an exchange rate at that time can be executed.

According to the bill identifying apparatus 5001 configured as described above, the number of pixels of image data relating to an entered bill is increased/decreased, thereby making it possible to acquire moire data having emerged with the bill specific fringe-like pattern (moire fringe). In this manner, for example, in order to improve identifying precision, even if a sensor configuring the bill reading means 5020 is changed to the one with high resolution, there is no need to newly manufacture a filter or the like for generating a moire fringe and it becomes possible to restrain higher cost.

With the abovementioned configuration, increasing/decreasing the number of pixels in the pixel data increasing/decreasing processing section 5116*a* is set based on the conversion table stored in the ROM 5112 so as to be executed at a predetermined increasing/decreasing rate in a bill reading direction and in a direction orthogonal thereto. Therefore, it becomes possible to acquire optimal moire data according to resolution of a sensor merely by changing parameters (such as vertical direction; 50%, horizontal direction; 50%). Thus, it is sufficient if parameters for enlarging/reducing image data are allocated in the ROM storage region, there is no need to allocate an unnecessary storage region, and it is possible to restrain higher cost.

While the embodiment of the present invention has been described hereinabove, the present invention may be a configuration of when reading a bill fed, acquiring moire data by increasing/decreasing the number of pixels of the read image data and identifying authentication of the bill, based on image data of the bill having the moire data, and other configurations can be appropriately modified. For example, the configuration of reading means (sensor) for reading a bill can be variously changed without being limitative to the abovementioned embodiment.

The bill identifying apparatus of the present invention can be incorporated into various kinds of devices for providing commodities or services by inserting a bill without being limitative to the gaming media lending apparatus. While the abovementioned embodiment illustrated and described the sheet identifying apparatus of the present invention as the one for handling bill, an apparatus for performing authentication judgment of money tickets or other marketable securities and the like other than bills is also applicable.

<<<Control Means 5030 of the Second Mode>>>

FIG. 157 is a block diagram depicting a schematic configuration of control means for controlling a bill identifying apparatus 5001 provided with the abovementioned bill feeding mechanism 5008, bill reading means 5020, shutter mechanism 5050, and authentication judgment section 5150 or the like for executing bill authentication judgment processing.

The control means 5030 is provided with a control board 5100 for controlling operation of each of the driving devices mentioned above. On the control board 5100, there are mounted: a CPU (Central Processing Unit) 5110 controlling driving of each driving device and configuring bill identifying means; a ROM (Read only Memory) 5112; a RAM (Random Access Memory) 5114; and an image processing section 5116.

The ROM 5112 stores permanent data such as operating programs of various kinds of driving devices such as the abovementioned driving motor 5010, solenoid 5054, and LED 5070; various kinds of programs such as an authentication judgment program; and a program relating to a thinning rate of pixel data, executed at a pixel data thinning processing section 5116*a* in the image processing section 5116.

The CPU 5110 operates in accordance with the programs stored in the ROM 5112; inputs/outputs a signal to/from various kinds of the driving devices mentioned above via an I/O port 5120; and performs entire operation control of the bill identifying apparatus. That is, a driving motor driving circuit 5125 (driving motor 5110), a solenoid 5054, and an LED 5070 are connected to the CPU 5110 via the I/O port 5120. These driving devices are operatively controlled by means of a control signal from the CPU 5110 in accordance with the operating programs stored in the ROM 5112. Detection signals from a bill detecting sensor 5018 or passage detecting sensor 5060 are inputted to the CPU 5110 via the I/O port 5120, and based on these detection signals, driving control of the driving motor 5010 and blinking control of the LED 5070 or driving control of the solenoid 5054 are performed.

The RAM 5114 temporarily stores data or programs employed when the CPU 5110 operates and has a function of acquiring and temporarily storing light-receiving data of a bill targeted to be judged (image data of a bill, which is comprised of a plurality of pixels).

The image processing section 5116 is provided with: a pixel data thinning processing section 5116*a* for performing thinning processing of pixels relating to image data of a bill, which is stored in the RAM 5114; a reference data storage section 5116*b* storing reference data relating to bills; and judgment processing section 5116*c* for comparing image data for which thinning processing of pixels are performed at the pixel data increasing/decreasing processing section 5116*a* with reference data stored in the reference data storage section 5116*b* and then performing bill judgment processing. In this case, while in the embodiment the reference data is stored in an exclusive reference data storage section 5116*b*, the data may be stored in the abovementioned ROM 5112. That is, the authentic bill data may be stored to be associated with a thinning rate of image data. Reference data of authentic bills may be stored in advance in the reference data storage section 5116*b*. For example, light-receiving data is acquired while an authentic bill is fed through the bill feeding mechanism 5008 and then the acquired data may be stored as reference data.

Further, a first light-emitting portion (light guide) 5023 in the abovementioned light-emitting unit 5024; and a light-receiving portion 5026 and a second light-emitting portion (light guide) 5027 in the line sensor 5025 are connected to the CPU 5110 via the I/O port 5120. These elements configure a bill authentication judgment section 5150 together with the CPU 5110, the ROM 5112, the RAM 5114, and the image processing section 5116 and then perform operational control required for authentication judgment in the bill identifying apparatus 5001. While in the embodiment the authentication judgment section 5150 is commonly used with a control section for controlling a driving system of a bill, a function for authentication judgment processing may be employed as its exclusive hardware configuration.

The CPU 5110 is connected to a control section of a gaming medium lending apparatus in which the bill identifying apparatus 5001 is incorporated via the I/O port 5120 or an upper apparatus 5300 such as a host computer as an external device so as to transmit various kinds of signals (such as information relating to bills, alerting signal) to the upper apparatus.

Furthermore, the I/O port 5120 has a portion to be electrically connected to the abovementioned PTS terminal 1700. As described later, the denomination data and amount-of-money data of a bill entered into the bill handling apparatus 5001 are transmitted to the PTS terminal 1700 via the I/O port 5120.

An example of a procedure for increasing/decreasing a pixel of image data in the abovementioned pixel data thinning processing section 5116*a* will be described with reference to a conceptual diagram of FIG. 158.

FIG. 158(*a*) schematically depicts the source data obtained by first defining image data of a bill read via reading means 5020 on a pixel-by-pixel basis (vertical direction:horizontal direction=1:1 and the number of pixels is shown while it is reduced). One square corresponds to one pixel, and the numeral assigned in each square indicates the brightness of colors in the pixels of the read bill. Actually, in each pixel, the brightness of each RGB in the pixels of RGB is controlled by means of filter control of RGB, thus including color information of different colors on a pixel-by-pixel basis (In FIG. 158(*a*), all pixels are comprised of color information of different brightness).

The source data thus read by the bill reading means 5020 is stored in the RAM 5114 which is storage means and then thinning processing of pixel data is applied in the image data thinning processing section 5116*a*. For example, if the number of pixels are thinned to be kept unchanged in the vertical direction and to be 0.25 time in the horizontal direction, for example (vertical direction:horizontal direction=1:0.25), for example, as shown in FIG. 158(*b*), reduction processing may be performed by a method of averagely dividing all pixels the horizontal direction by ¼ and then thinning the pixels therebetween (pixels indicated by blanks) (FIG. 158(*c*)). In this manner, it becomes possible to generate image data whose size is kept unchanged in the vertical direction and whose size is reduced to ¼ in the horizontal direction.

FIG. 159 shows image data of a bill, obtained after thinning processing of the number of pixels has been performed as described above. As described above, if the number of pixels is reduced to be (vertical direction:horizontal direction=1:0.25) with respect to source data, the moire data specific to the decreasing rate (moire fringe) 5200A can be obtained by a microprint portion formed on the bill M shown in FIG. 148 (a portion 5200 with a number of thin lines). That is, it becomes possible to acquire moire data specific to the bill by decreasing the number of read pixels in another direction (bill feeding direction) than in one direction (bill feeding widthwise direction) relating to image data relating to an entered bill.

Hereinafter, the principles and conditions in which the abovementioned moire fringes occur will be described with reference to FIG. 152 to FIG. 154.

As shown in FIG. 152, if intervals of thin lines formed on a bill M (indicated by the adjacent black bars) 5200 are defined as b, the interval b is wider than an interval d at which a line sensor 5025 configuring the abovementioned bill reading means 5020 reads one pixel (b>d), the thin lines 5200 of the bill can be precisely read, so that: the thus read image data (a) is established in a state in which the thin lines of the bill are reproduced as they are; and no moire data is generated.

In contrast, as shown in FIG. 153, if the interval b of the thin lines 5200 formed on the bill M is equal to or smaller than the interval d at which the line sensor 5025 reads one pixel (b≤d), the black bar which is thin lines cannot be reproduced as image data (a) as shown in FIG. 152, and the read image data is read as a completely black state. That is, when b≤d, the thin lines 5200 of the bill cannot be precisely read and then fine lines becomes coarse, thereby causing generation of moire fringes.

As described above, in thinning processing of the number of pixels is performed, for example, as shown in FIG. 154, when the interval b of essential thin lines of a bill is equal to or smaller than the interval d between pixels obtained by thinning pixel data (when the decreasing rate of the number satisfies b≤d), it becomes difficult to clearly distinguish the adjacent thin lines (the read lines of thin line data become coarse) and then moire fringes are generated by the thin lines having become coarse).

As a result, a judgment comparison section 5116*c* compares the above moire data with reference data stored in advance in the reference data storage section 5116*b* (moire fringe data stored according to an enlargement/reduction rate), thereby making it possible to perform authentication judgment processing of the bill. Specifically, for example, pixel data relating to brightness (density) is detected as to each pixel of a portion to which a moire fringe has occurred; the detected data is compared with reference data; if the difference is equal to or smaller than a predetermined value, it is assumed to be equal with respect to the pixel portion. This processing is executed as to all of the pixels of portions to which moire fringes occur, thereby making it possible to perform authentication judgment. Moire data is obtained by reducing bill reading precision, so that the amount of the data is reduced and data amount of comparative data to be compared therewith can be reduced, making it possible to improve a processing speed of authentication judgment processing.

FIG. 160 is a flowchart showing operational processing in the abovementioned bill identifying apparatus and an example of a procedure for authentication judgment processing by utilizing the abovementioned moire data. Hereinafter, a processing operation of the bill identifying apparatus according to the embodiment will be described with reference to the flowchart.

First, the CPU 5110 of the bill identifying apparatus 5001 judges whether or not a bill has been detected (step S5011). This is judged by the bill detecting sensor 5018 detecting insertion of a bill and judging whether or not a detection signal has been generated. If the bill detecting sensor 5018 detects a bill, the driving motor 5010 is driven and then bill feeding processing is performed via the bill feeding mechanism 5008 (step S5012). At this time, the LED 5070 is processed to light and then notifies a user that bill handling is in progress. Thus, additional bill insertion is prevented.

Having been synchronous with the bill feeding processing, the bill reading means 5020 executes bill reading processing (step S5013). This bill reading processing is performed by the CPU 5110 outputting an emitting signal to the first and second light-emitting portions 5023, 5027; each of the light-emitting portions 5023, 5027 emitting light to a bill; and the light-receiving portion 5026 receiving the reflected light. The moire data employed for bill identifying processing is acquired based on the reflected light of the light emitted from the light-emitting portion 5027, as described above.

By feeding bill into the apparatus, the bill reading means 5020 reads the information and then authentication judgment processing is executed in the control means 5030. The abovementioned bill reading is performed by the light-receiving portion 5026 of the line sensor 5025 receiving reflected light from a bill being fed, the reflected light being emitted from the second light-emitting portion 5027. At the time of the reading, as described above, image information of a bill is acquired on a pixel-by-pixel basis with a predetermined size being defined as one unit. Transmitted light transmitting a bill, which is emitted from the first light-emitting portion 5023, can be employed for another authentication judgment processing (such as authentication judgment processing using contract data or the like).

While the authentication judgment processing is executed, if the bill detecting sensor 5018 detects a rear end of a bill being fed (when the bill detecting sensor 5018 is turned OFF) and then a solenoid 5054 is powered on, whereby a turning piece 5052 is turnably driven to close a bill insertion slot 5006 and prevent additional entry of a bill.

As described above, the information on the bill read on a pixel-by-pixel basis configures image data of the entire bill by a plurality of pixels and then the image data is stored in the RAM 5114 which is storage means (step S5014). Subsequently, the image processing section 5116 applies image processing of thinning the number of pixels to the image data stored in the RAM 5114 (step S5015). Determination of a thinning rate in the image processing is executed based on a program stored in the ROM 5112. For image data of a bill, obtained by this processing, as described above, specific moire data is obtained at a microprint portion in accordance with the thinning rate.

Subsequently, bill authentication judgment processing is performed in step S5016. As described above, specific moire data (moire stream) is obtained by an increasing/decreasing rate with the conversion table stored in the ROM. Thus, the judgment processing section 5116*c* compares the above more data with the reference data stored in advance in the reference data storage section 5116*b* (moire fringe data stored according to a thinning rate), whereby authentication of the bill is judged.

Where it is judged that the fed bill is authentic in the abovementioned authentication judgment processing (Yes of step S5017), bill judgment good processing is executed (step S5018). This processing includes: processing of feeding a bill to a stacker situated at the downstream side as it is, for example; processing of stopping driving of the driving motor 5010 at a stage at which the bill passage detecting sensor 5060 detects a rear end of the bill fed to the downstream side; and concurrently, turning OFF driving of solenoid 5054 (releasing power supply) to draw the turning piece 5052 through the bill feeding path 5005 to open the bill insertion slot 5006 and light out the LED 5070.

On the other hand, where it is judged that the fed bill is bogus in the abovementioned processing of step S5017 (including a case in which a bill is extremely contaminated and damaged), bill judgment NG processing is executed (step S5019). This processing includes reversing processing of the driving motor 5010 to return the inserted bill, for example, or processing or the like of outputting an alerting signal to the upper apparatus 5300.

In the abovementioned bill judgment good processing of step S5018, the denomination data and the amount-of-money data of the entered bill are acquired by applying processing such as character recognition with the use of the image data read by the bill acquisition means 5020 and then the acquired denomination data and amount-of-money data are stored in the RAM 5114. These items of information are transmitted to the PTS terminal 1700 as described later.

After the abovementioned processing of step S5018 or processing of step S5019 has been executed, a subroutine of information output processing shown in FIG. 114 of the first embodiment is invoked and executed (ST3070).

FIG. 114 is a flowchart showing a subroutine of processing of outputting various kinds of information to the PTS terminal 1700.

First, it is judged whether or not a result of bill authentication judgment is authentic (step ST71). The result of the bill authentication judgment can be obtained by executing the abovementioned subroutine shown in FIG. 160.

When it is judged that the result of the bill authentication judgment is authentic (YES), the denomination data indicating denomination of a bill and the amount-of-money data indicating an amount of money are outputted to the PTS terminal 1700 via the I/O port 5120 (step S72) and then this subroutine is completed. The denomination if a bill used herein consists of bill attribution information indicating attributes of bills including countries, governments, governmental banks, or regions issuing or administering bills such as US dollar bills, Yen bills, or Hong Kong dollar bills. The amount used herein is an amount corresponding to a currency unit defined by the attribute of the bill. The currency unit used herein includes US dollars or Yen, for example.

When it is judged that the result of bill authentication judgment is bogus (NO), error information indicating that the entered bill is bogus is outputted to the PTS terminal 1700 via the I/O port 5120 (step ST73) and then this subroutine is completed.

The denomination data indicating denomination and the amount-of-money data indicating an amount of money are thus transmitted to the PTS terminal 1700, whereby the PTS terminal 1700 can acquire the denomination data and the amount-of-money data of the bill entered into the bill handling apparatus 5001. Based on these items of information, various kinds of processing operations such as credit conversion or money exchange according to an exchange rate at that time can be executed.

According to the bill identifying apparatus 5001 configured as described above, the number of pixels of image data relating to the fed bill is thinned, thereby making it possible to acquire moire data having emerged with stream-like pattern specific to the bill (moire fringe). In this manner, the amount of data acquired and the data amount of the reference data targeted to be compared can be reduced, making it possible to improve a processing speed associated with authentication judgment. For example, in order to improve identifying precision, even if a sensor configuring bill reading means 5020 is changed to the one having high resolution, there is no need to newly manufacture a filter or the like for generating moire fringes, and it becomes possible to restrain higher cost.

While in the abovementioned configuration the image processing section 5116 performs processing of thinning temporarily acquired image data of a bill (a plurality of pixel data) as means for reducing reading precession of the bill read in the bill reading means 5020, another configuration may be employed in such a manner that reading precision is lowered by changing an image acquisition period at the time of reading of the line sensor in the reading means 5020.

FIG. 161 is a block diagram depicting a configuration of changing means for changing the number of pixels of image data to be reduced (image acquisition period changing circuit for changing an image acquisition period).

An image acquisition period changing circuit 5250 is configured so as to change a period of acquiring an image of a light-receiving portion 5026 of the line sensor 5025. This circuit is provided with: a counter 5251 for generating a clock signal with a predetermined timing; a setting section 5252 for setting any period; a comparator 5253 for generating a read trigger signal by a counting time from the counter 5251 being coincident with a setting time (image acquisition period: image acquisition timing) of the setting section 5252. The image acquisition period changing circuit 5250 is provided with: an A/D converter 5260 for A/D converting a bill image signal of a bill, which is obtained from the light-receiving portion 5026; a line buffer 5261; a frame memory 5262; and a control section 5265 for transmitting and controlling at the CPU 5110 side at a set period, pixel information by line, which is stored in a frame memory 5262, based on a trigger signal from the comparator 5253.

In the image acquisition period changing circuit 5250 having the abovementioned configuration, the image data outputted from the light-receiving portion 5026 to be converted to digital data by means of the A/D converter 5260 and then the converted digital data is accumulated in the line buffer 5261 by one line of the pixel in the bill feeding widthwise direction. Image data relating to a bill by one line, accumulated in the line buffer 5261 is transmitted to the frame memory 5262 and then is accumulated and retained as image data by line. The image data by one line, accumulated and retained in the frame memory 5262, is extracted by a predetermined period, by means of a trigger signal transmitted from the comparator 5253. The thus extracted image data is transmitted to the CPU 5110 side.

According to such an image acquisition period changing circuit 5250, an image acquisition timing set at the setting section 5252 is set to be changed (set to be delayed), whereby reading precision of a bill in the bill feeding direction can be lowered (pixels can be thinned). Like the abovementioned configuration, specific moire data can be acquired. The moire data obtained by lowering the reading precision is compared with the reference data stored in advance according to the lowering rate, thereby making it possible to judge authentication of the bill.

With such a configuration also, moire data can be obtained by lowering the reading pre cession with the line sensor, so that the amount of data can be reduced, making it possible to improve a processing speed associated with authentication judgment processing.

As means for lowering reading precision by the abovementioned line sensor 5025, apart from installing the image acquisition period changing circuit 5250, it is possible to lower the reading precision by changing a bill feeding speed while controlling a driving speed of the driving motor 5010 via the abovementioned CPU 5110 and driving motor driving circuit 5125. That is, in a state in which an image acquisition timing by one line by means of the line sensor is made uniform, the driving speed of the driving motor 5010 is changed to a high speed and the feeding speed of a bill is set at a high speed, thereby making it possible to lower the reading precision in the bill feeding direction (to thin out pixels), like the abovementioned configuration and making it possible to acquire similar moire data.

In such a configuration also, moire data can be obtained by lowering the reading precision with the line sensor, so that the amount of data can be reduced, making it possible to improve a processing speed associated with authentication judgment processing.

While the embodiments of the present invention have been described hereinabove, the present invention may be a configuration of, at the time of reading a bill fed, lowering the number of read pixels of image data read (reading precision) and then identifying authentication of a bill, based on image data of the bill having the moire data, and other configurations can be appropriately modified. For example, the configuration or layout and mode of the reading means (sensor) for reading a bill can be variously changed without being limitative to the abovementioned embodiment.

The bill identifying apparatus of the present invention is not limitative to the gaming media lending apparatus, and can be incorporated into various kinds of apparatuses providing commodities or services by insertion a bill. While the abovementioned embodiment illustrated and described the sheet identifying apparatus of the present invention as the one for handling bills, it can be applied as an apparatus for performing authentication judgment such a money tickets or other variable securities other than bills.

DESCRIPTION OF REFERENCE NUMERALS

1802, 2002 Casino system
1010, 2010 Gaming machine
1011, 2011 Cabinet
1016, 2016 Image display panel
1030 Control panel
1105 PTS panel
1121 Card stacker
1707A, 1708A Duct
1700, 2064 PTS terminal
1704 (1705) Microphone
1707, 1708 Speaker
1712, 1713 Human body detection camera
1719 LCD
1820 Management server block
1861, 2261 Casino hall server
1862, 2262 Currency exchange server
1863, 2263 Staff management server
1864, 2264 Member management server
1865, 2265 IC card & monetary management server
1866 Megabucks server
2266 Progressive server
1867, 2267 Image server
3001 Bill processing device (Bill handling apparatus, Bill validator)
3002 Apparatus main body
3003 Bill feeding path
3005 Bill insertion slot
3006 Bill feeding mechanism
3008 Bill reading means
3010 Skew correction mechanism
3080*a* First light-emitting portion
3081 Light-receiving/emitting unit
3081*a* Light-receiving portion
3081*b* Second light-emitting portion
3200 Control means
4001 Bill handling apparatus (Bill identifying apparatus)
4002 Apparatus main body
4003 Bill feeding path
4005 Bill insertion slot
4006 Bill feeding mechanism
4008 Bill reading means
4010 Skew correction mechanism
4080*a* First light-emitting portion
4081 Light-receiving/emitting unit
4081*a* Light-receiving portion
4081*b* Second light-emitting portion
4200 Control means
5001 Bill handling apparatus (Bill identifying apparatus)
5002 Frame
5005 Bill feeding path
5006 Bill insertion slot
5008 Bill feeding mechanism
5020 Bill reading means
5026 Light-receiving portion

The invention claimed is:

1. A game system comprising:

a plurality of gaming machines;

a bill identifying device that is associated with each of the gaming machines, for identifying bills of different currencies and an amount of the bills, and outputting data representative of an identified result;

a player tracking device that is integrated with each of the gaming machines, for converting data output from the bill identifying device to credit data for executing a game, based on a money exchange rate stored therein, and sending out the converted credit data to the gaming machine;

a control device for inputting a money exchange rate, providing the input money exchange rate to the player tracking device, and updating the money exchange rate stored in the player tracking device; and an information card device that is integrated with the player tracking device, for causing an information card to store data equivalent to an amount of money to be awarded to a player according to a game result of the gaming machine, and sending out credit data for executing a game to the gaming machine, based on data equivalent to the read money from the information card, wherein the player tracking device comprises:

a card writer for storing information associated with a play result in gaming machine, in at least one information card;

a card stacker for stacking a plurality of the information cards;

a detection portion for detecting a number of cards that is stacked in the card stacker;

a memory for storing the detected number of cards;

a light emitting portion for emitting light according to the number of cards; and a controller programmed to execute processing operations of:

(A) causing the light emitting portion to emit light in a first mode in a case where the number of cards stored in the memory is equal to or smaller than a predetermined first reference number; and (B) causing the light emitting portion to emit light in a second mode in a case where the number of cards stored in the memory is equal to or more than a predetermined second reference number.

2. The game system according to claim 1, wherein the player tracking device comprises a guidance output portion for, based on data representative of a type of a currency output from the bill identifying device, outputting guidance in a language according to the type of the currency.

3. The game system according to claim 1, wherein the player tracking device comprises:

a player detection device for detecting an existence of a player who is playing at the gaming machine;

a carrying device for carrying a removable information data recording medium to a housing position or an eject position;

a recording medium detection device for detecting that the information data recording medium exists at the eject position; and a controller programmed to execute processing operations of:

(A) determining whether or not the information data recording medium exists at the eject position by means of the recording medium detection device;

(B) determining whether or not a player exists by means of the player detection device;

(C) when it is determined that the information data recording medium exists at the eject portion and when it is determined that no player exists, carrying the information data recording medium from the eject position to the housing position by means of the carrying device.

4. A device for reading information storage medium, comprising:

a player detection device for detecting existence of a player who is playing at the gaming machine;

a carrying device for carrying a removable information data recording medium to a housing position or an eject position;

a recording medium detection device for detecting that the information data recording medium exists at the eject position;

a reader/writer for reading or writing amount-of-money information relating to cash for a game to be played at a gaming machine from or into the information data recording medium; and a controller programmed to execute processing operations of:

(A) determining whether or not the information data recording medium exists at the eject position by means of the recording medium detection device;

(B) determining whether or not a player exists by means of the player detection device;

(C) when it is determined that the information data recording medium exists at the eject portion and when it is determined that no player exists, carrying the information data recording medium from the eject position to the housing position by means of the carrying device;

(E) writing amount-of-money information relating to cash for a game to be played at a gaming machine into the information data recording medium;

(F) executing a mini-game when an amount of money that is indicated by the amount-of-money information that is written into the information data recording medium is less than a predetermined number, and according to a result of the mini-game, changing the amount-of-money information; and (G) carrying the information data recording medium to an eject position by means of the carrying device when an amount of money that is indicated by the amount-of-money information that is written into the information data recording medium is equal to or more than a predetermined number.

5. The device for reading information data storage medium, according to claim 4, comprising an alert output device for outputting alert information, wherein the controller is programmed to execute a processing operation of (D) outputting alert information from the alert output device when it is determined that the information data recording medium exists at the eject position and when it is determined that no player exists.

6. The device for reading information data storage medium, according to claim 4, wherein the controller is programmed to execute a processing operation of (H) converting cash that is entered into a gaming machine, to amount-of-money information according to a rate that corresponds to a predetermined money type.

* * * * *